US012802361B2

(12) United States Patent
Dessero et al.

(10) Patent No.: US 12,802,361 B2
(45) Date of Patent: Nov. 17, 2026

(54) METHODS FOR OPTIMIZATION OF VIRTUAL USER INTERFACES IN A THREE-DIMENSIONAL ENVIRONMENT

(71) Applicant: Apple Inc., Cupertino, CA (US)

(72) Inventors: James M. Dessero, Morgan Hill, CA (US); Michael A. Breymann, San Francisco, CA (US); Matthew G. Plec, Santa Clara, CA (US); Michael A. Dunkley, Sunnyvale, CA (US); Ryan W. Baker, Los Angeles, CA (US); Jonathan Moorman, San Jose, CA (US); Daniel J. Rubenfield, Seattle, WA (US); Alexander J. Haworth, San Rafael, CA (US); Austin C. Germer, Novato, CA (US); Peter Dollar, San Jose, CA (US)

(73) Assignee: Apple Inc., Cupertino, CA (US)

( * ) Notice: Subject to any disclaimer, the term of this patent is extended or adjusted under 35 U.S.C. 154(b) by 78 days.

(21) Appl. No.: 18/671,943

(22) Filed: May 22, 2024

(65) Prior Publication Data

US 2025/0005864 A1 Jan. 2, 2025

Related U.S. Application Data

(60) Provisional application No. 63/515,117, filed on Jul. 23, 2023, provisional application No. 63/506,093, (Continued)

(51) Int. Cl.
*G06T 19/00* (2011.01)
*G06T 13/60* (2011.01)

(52) U.S. Cl.
CPC .............. *G06T 19/00* (2013.01); *G06T 13/60* (2013.01)

(58) Field of Classification Search
None
See application file for complete search history.

(56) References Cited

U.S. PATENT DOCUMENTS 6,323,846 B1 11/2001 Westerman et al.
6,538,651 B1 * 3/2003 Hayman ................. G06T 17/00 375/E7.006

(Continued)

FOREIGN PATENT DOCUMENTS

WO 2013169849 A2 11/2013
WO 2014105276 A1 7/2014

OTHER PUBLICATIONS

International Search Report received for PCT Patent Application No. PCT/US2024/030661, mailed on Nov. 4, 2024, 5 pages.

*Primary Examiner* — Tapas Mazumder
(74) *Attorney, Agent, or Firm* — Kubota & Basol LLP

(57) ABSTRACT

In some embodiments, a computer system changes a level of detail with which a respective environment is being displayed. In some embodiments, a computer system applies a neutralization adjustment to generate a representation of the physical environment. In some embodiments, a computer system displays a user interface object in a three-dimensional environment with a three-dimensional stereoscopic effect. In some embodiments, a computer system facilitates light blending. In some embodiments, a computer system transitions between three-dimensional environments using visual effects. In some embodiments, a computer system detects a movement in a viewpoint of a user while displaying a portal to a virtual environment, and either maintains or ceases display of the portal based on the amount of movement and/or a direction in which the portal opens. In some embodiments, a computer system outputs a different sound effect when initiating display of different virtual three-dimensional environments.

48 Claims, 150 Drawing Sheets

Related U.S. Application Data filed on Jun. 4, 2023, provisional application No. 63/503,934, filed on May 23, 2023.

(56) References Cited

U.S. PATENT DOCUMENTS

| | | | |
|---|---|---|---|
| 6,570,557 | B1 | 5/2003 | Westerman et al. |
| 6,677,932 | B1 | 1/2004 | Westerman |
| 7,614,008 | B2 | 11/2009 | Ording |
| 7,633,076 | B2 | 12/2009 | Huppi et al. |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,844,914 | B2 | 11/2010 | Andre et al. |
| 7,957,762 | B2 | 6/2011 | Herz et al. |
| 8,006,002 | B2 | 8/2011 | Kalayjian et al. |
| 8,239,784 | B2 | 8/2012 | Hotelling et al. |
| 8,279,180 | B2 | 10/2012 | Hotelling et al. |
| 8,381,135 | B2 | 2/2013 | Hotelling et al. |
| 8,479,122 | B2 | 7/2013 | Hotelling et al. |
| 9,348,458 | B2 | 5/2016 | Hotelling et al. |
| 9,933,937 | B2 | 4/2018 | Lemay et al. |
| 2002/0015024 | A1 | 2/2002 | Westerman et al. |
| 2005/0190059 | A1 | 9/2005 | Wehrenberg |
| 2006/0017692 | A1 | 1/2006 | Wehrenberg et al. |
| 2006/0033724 | A1 | 2/2006 | Chaudhri et al. |
| 2006/0197753 | A1 | 9/2006 | Hotelling |
| 2021/0142552 | A1* | 5/2021 | Kimura .................. G06T 17/20 |

* cited by examiner

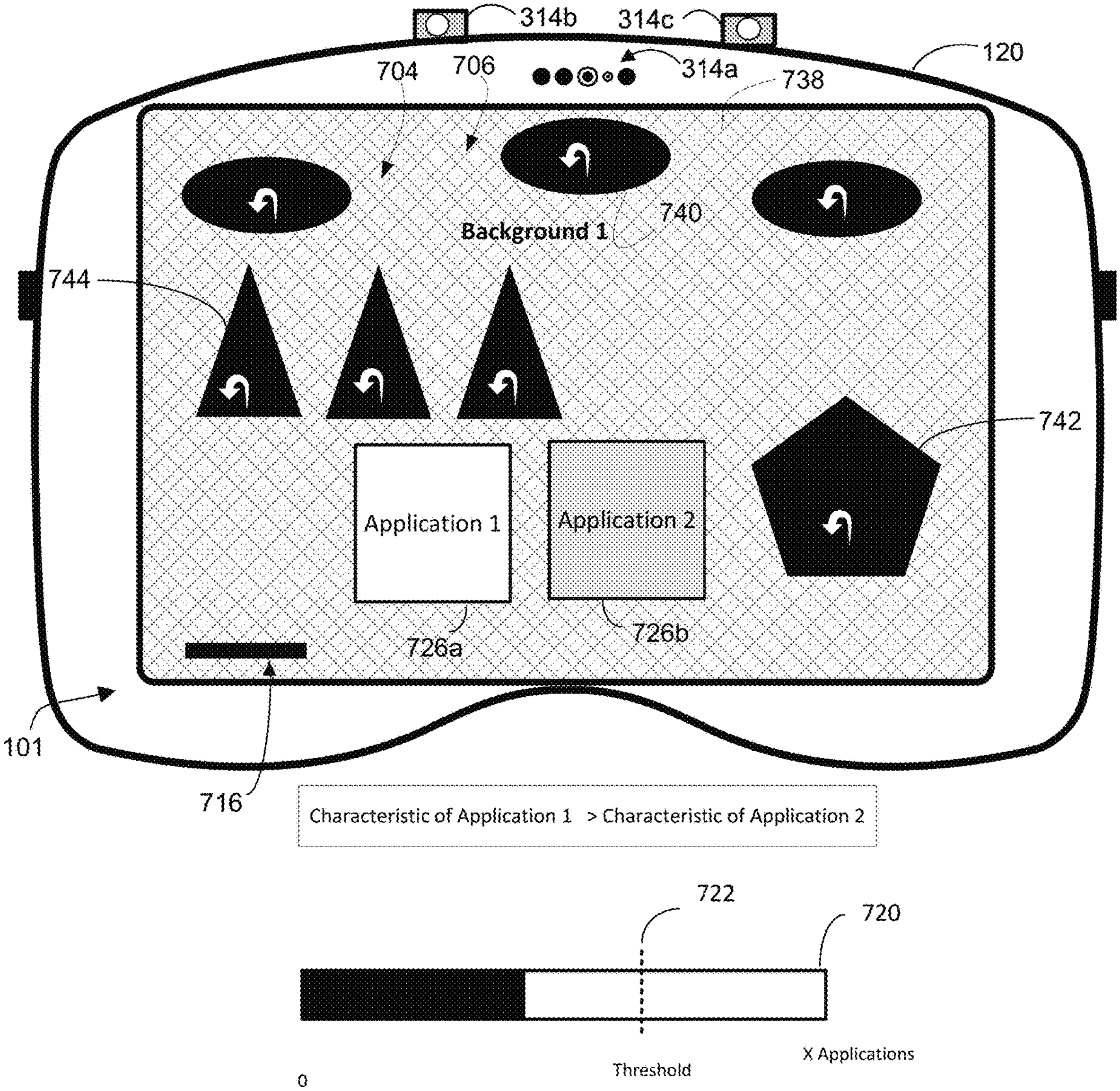
FIG. 7A1

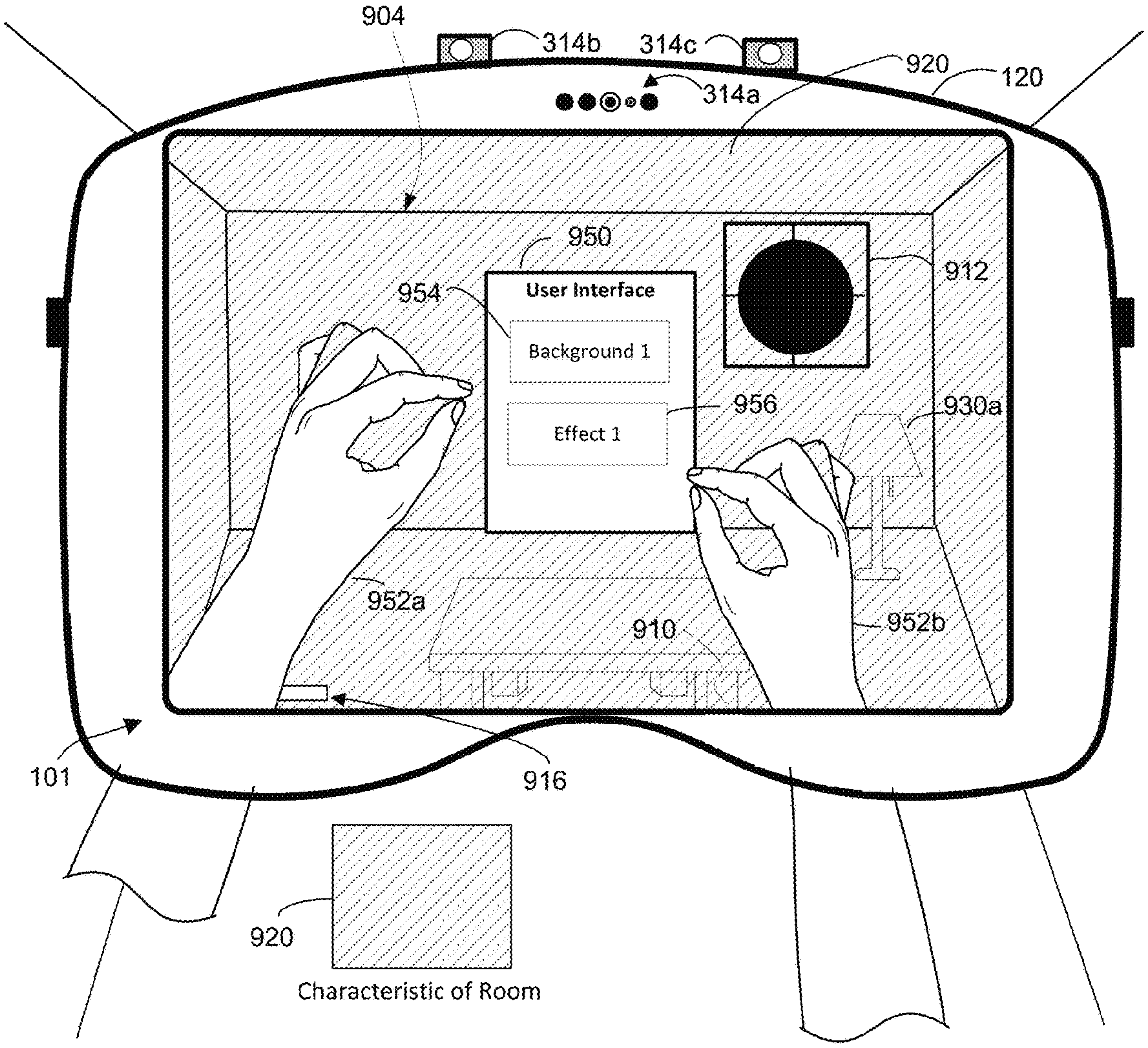
FIG. 9A1

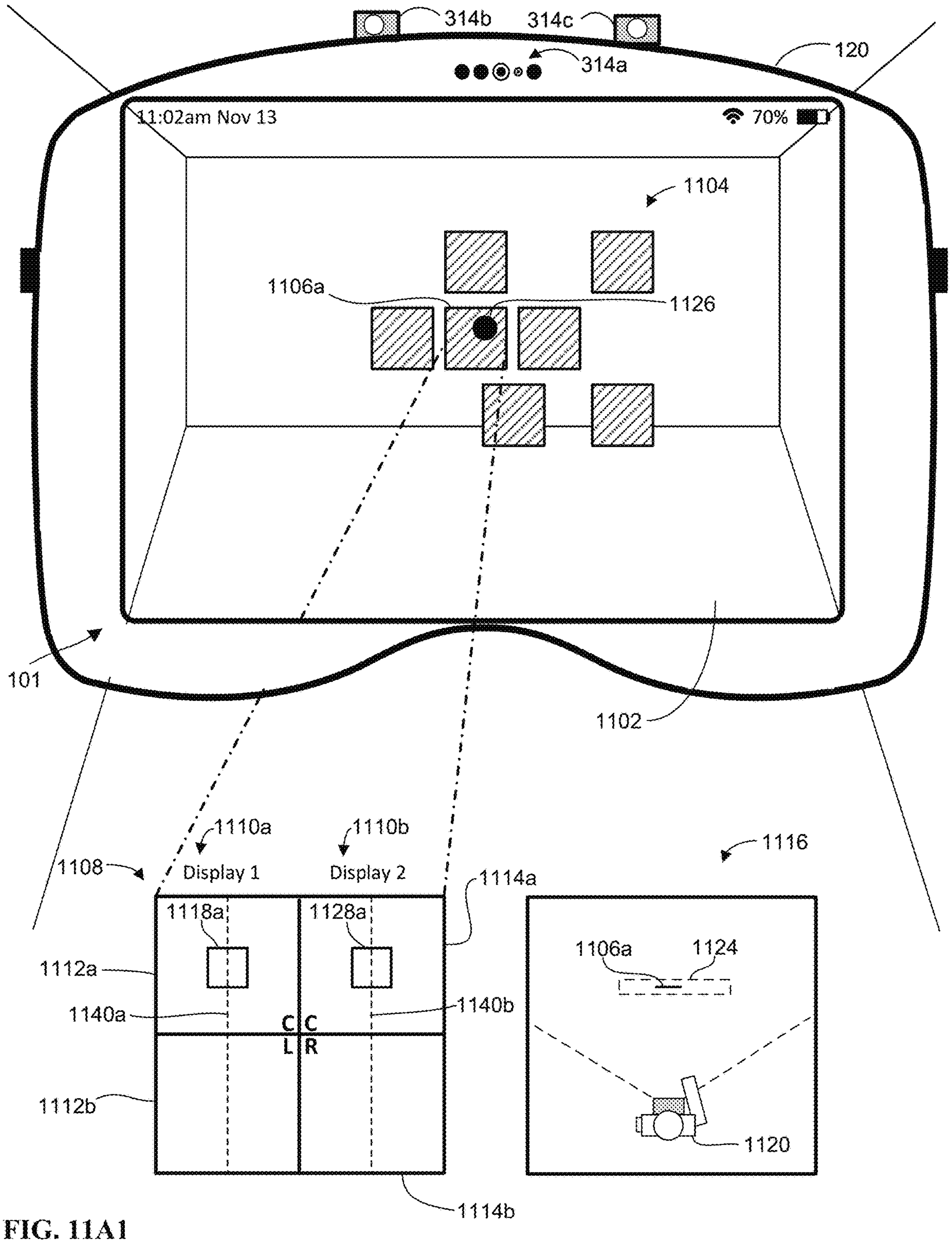
FIG. 11A1

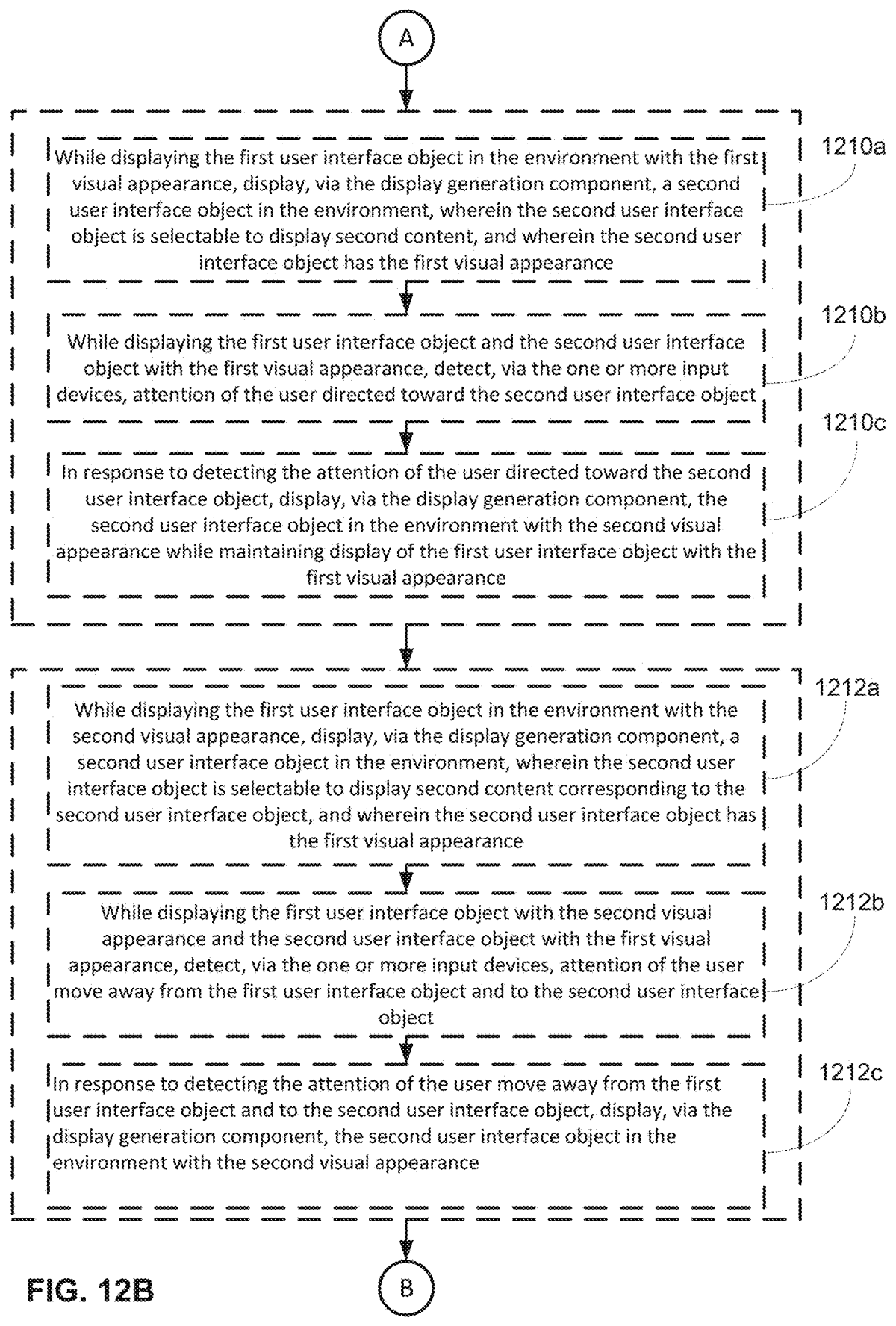

A

1210a While displaying the first user interface object in the environment with the first visual appearance, display, via the display generation component, a second user interface object in the environment, wherein the second user interface object is selectable to display second content, and wherein the second user interface object has the first visual appearance 1210b While displaying the first user interface object and the second user interface object with the first visual appearance, detect, via the one or more input devices, attention of the user directed toward the second user interface object 1210c In response to detecting the attention of the user directed toward the second user interface object, display, via the display generation component, the second user interface object in the environment with the second visual appearance while maintaining display of the first user interface object with the first visual appearance 1212a While displaying the first user interface object in the environment with the second visual appearance, display, via the display generation component, a second user interface object in the environment, wherein the second user interface object is selectable to display second content corresponding to the second user interface object, and wherein the second user interface object has the first visual appearance 1212b While displaying the first user interface object with the second visual appearance and the second user interface object with the first visual appearance, detect, via the one or more input devices, attention of the user move away from the first user interface object and to the second user interface object 1212c In response to detecting the attention of the user move away from the first user interface object and to the second user interface object, display, via the display generation component, the second user interface object in the environment with the second visual appearance

B

FIG. 12B

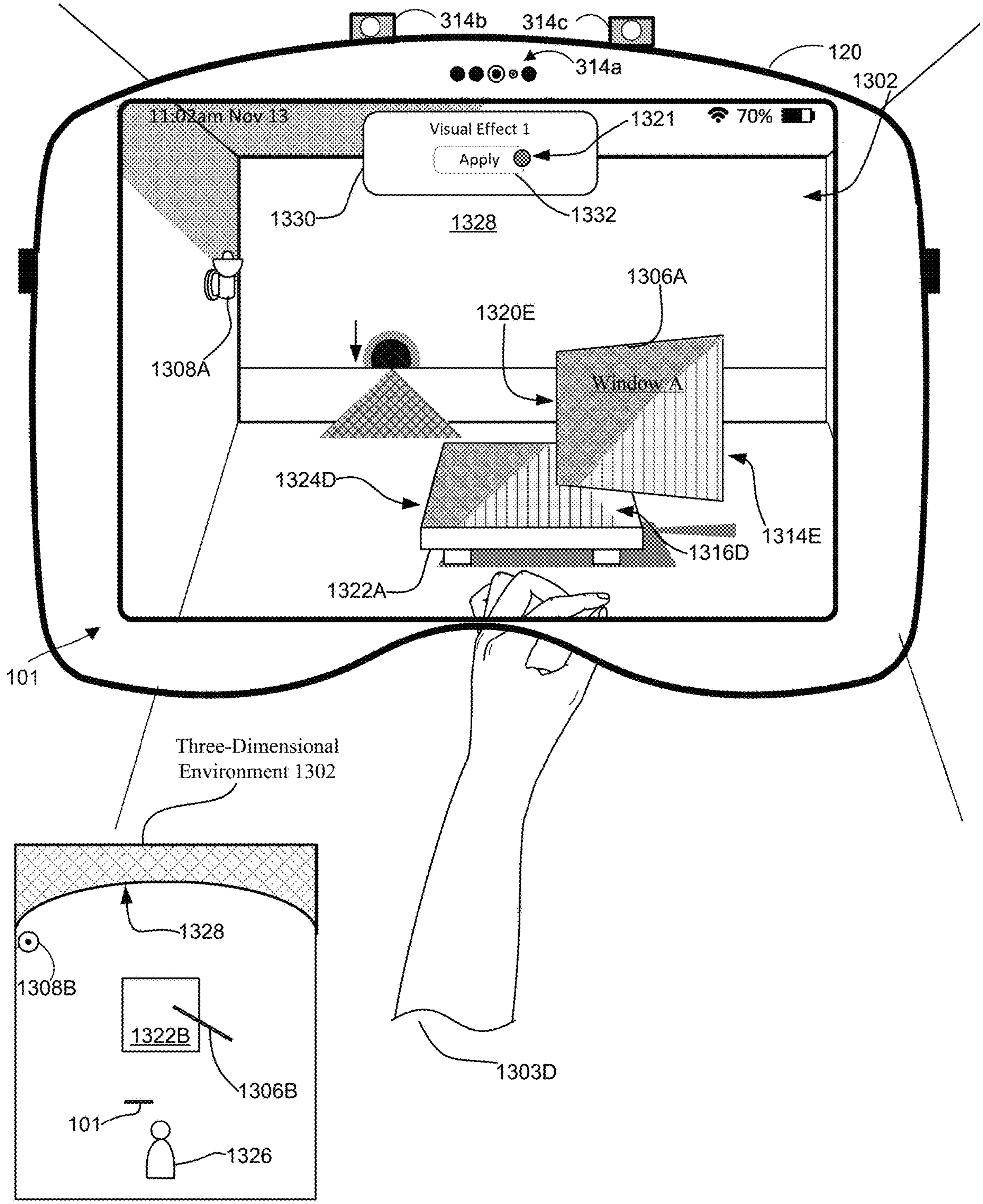
FIG. 13F1

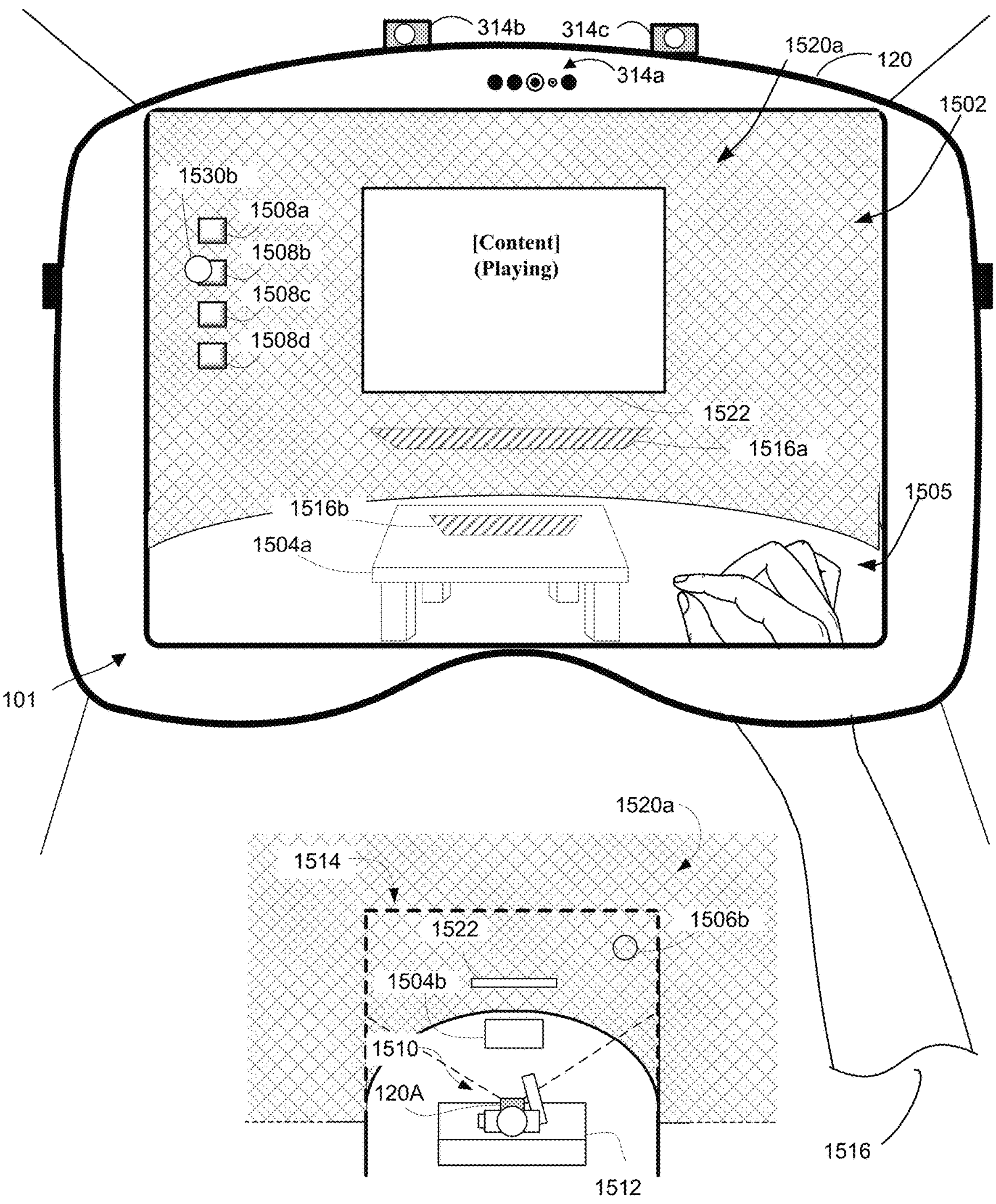
FIG. 15C1

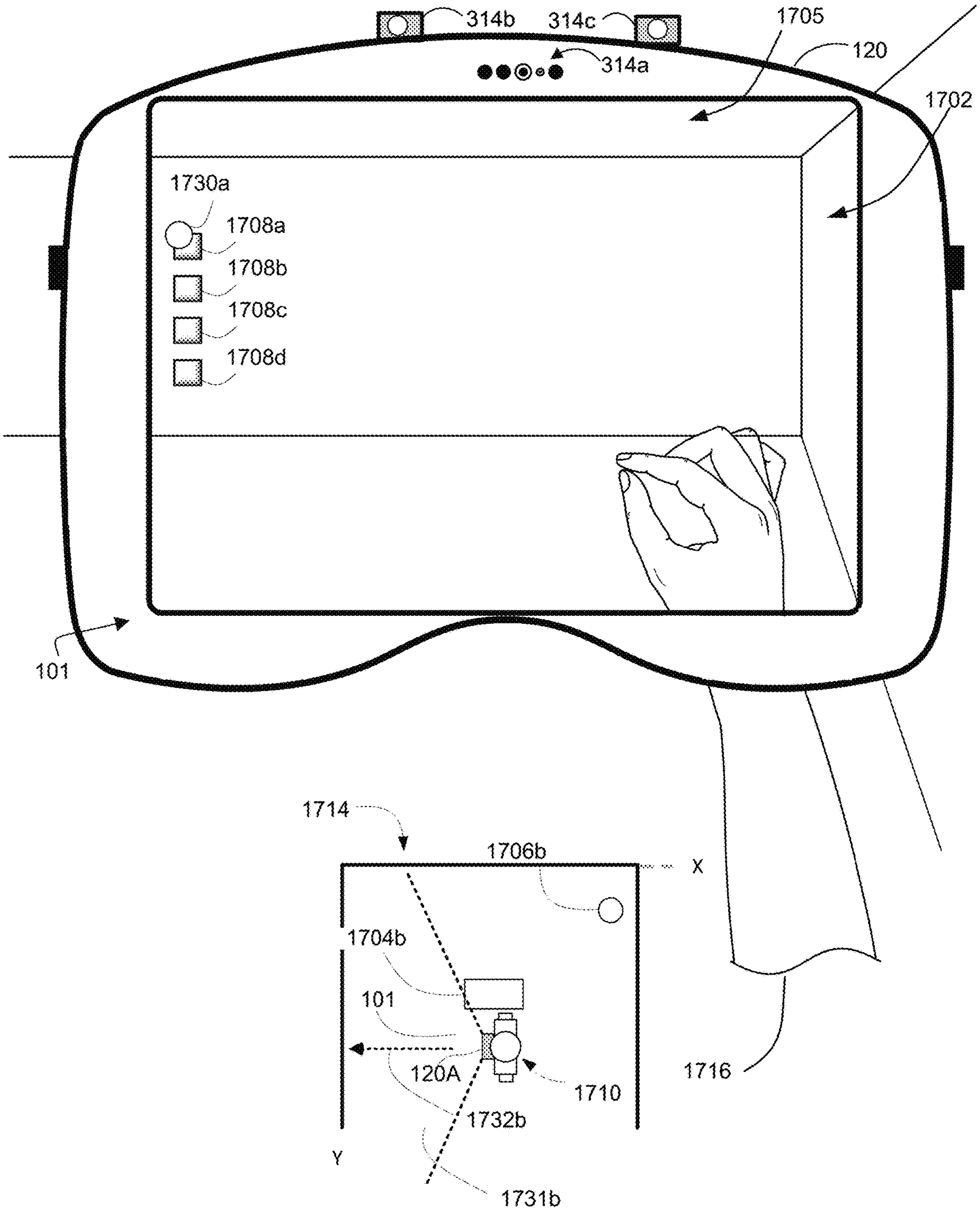
FIG. 17J1

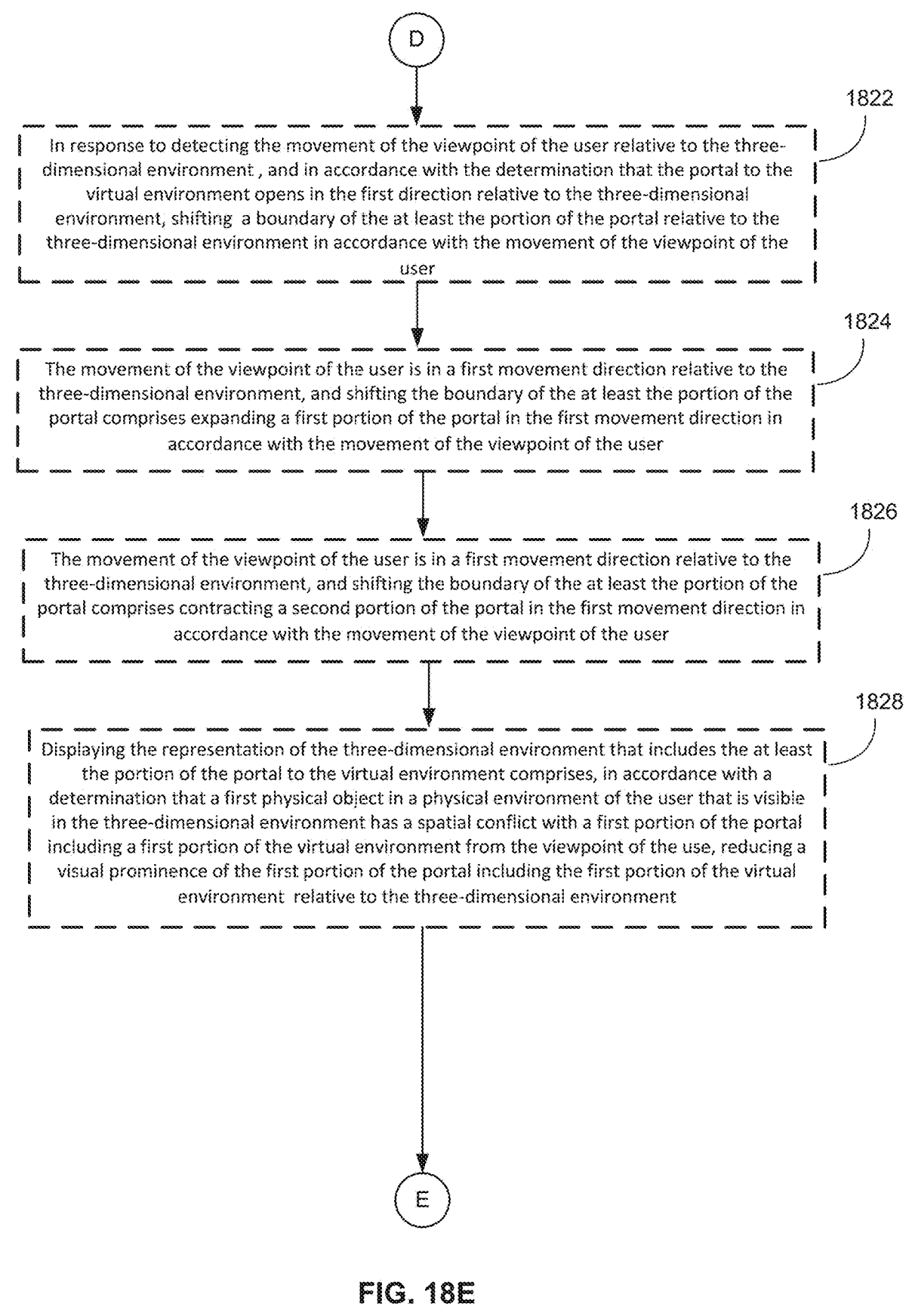

D

1822

In response to detecting the movement of the viewpoint of the user relative to the three-dimensional environment , and in accordance with the determination that the portal to the virtual environment opens in the first direction relative to the three-dimensional environment, shifting a boundary of the at least the portion of the portal relative to the three-dimensional environment in accordance with the movement of the viewpoint of the user

1824

The movement of the viewpoint of the user is in a first movement direction relative to the three-dimensional environment, and shifting the boundary of the at least the portion of the portal comprises expanding a first portion of the portal in the first movement direction in accordance with the movement of the viewpoint of the user

1826

The movement of the viewpoint of the user is in a first movement direction relative to the three-dimensional environment, and shifting the boundary of the at least the portion of the portal comprises contracting a second portion of the portal in the first movement direction in accordance with the movement of the viewpoint of the user

1828

Displaying the representation of the three-dimensional environment that includes the at least the portion of the portal to the virtual environment comprises, in accordance with a determination that a first physical object in a physical environment of the user that is visible in the three-dimensional environment has a spatial conflict with a first portion of the portal including a first portion of the virtual environment from the viewpoint of the use, reducing a visual prominence of the first portion of the portal including the first portion of the virtual environment relative to the three-dimensional environment

E

FIG. 18E

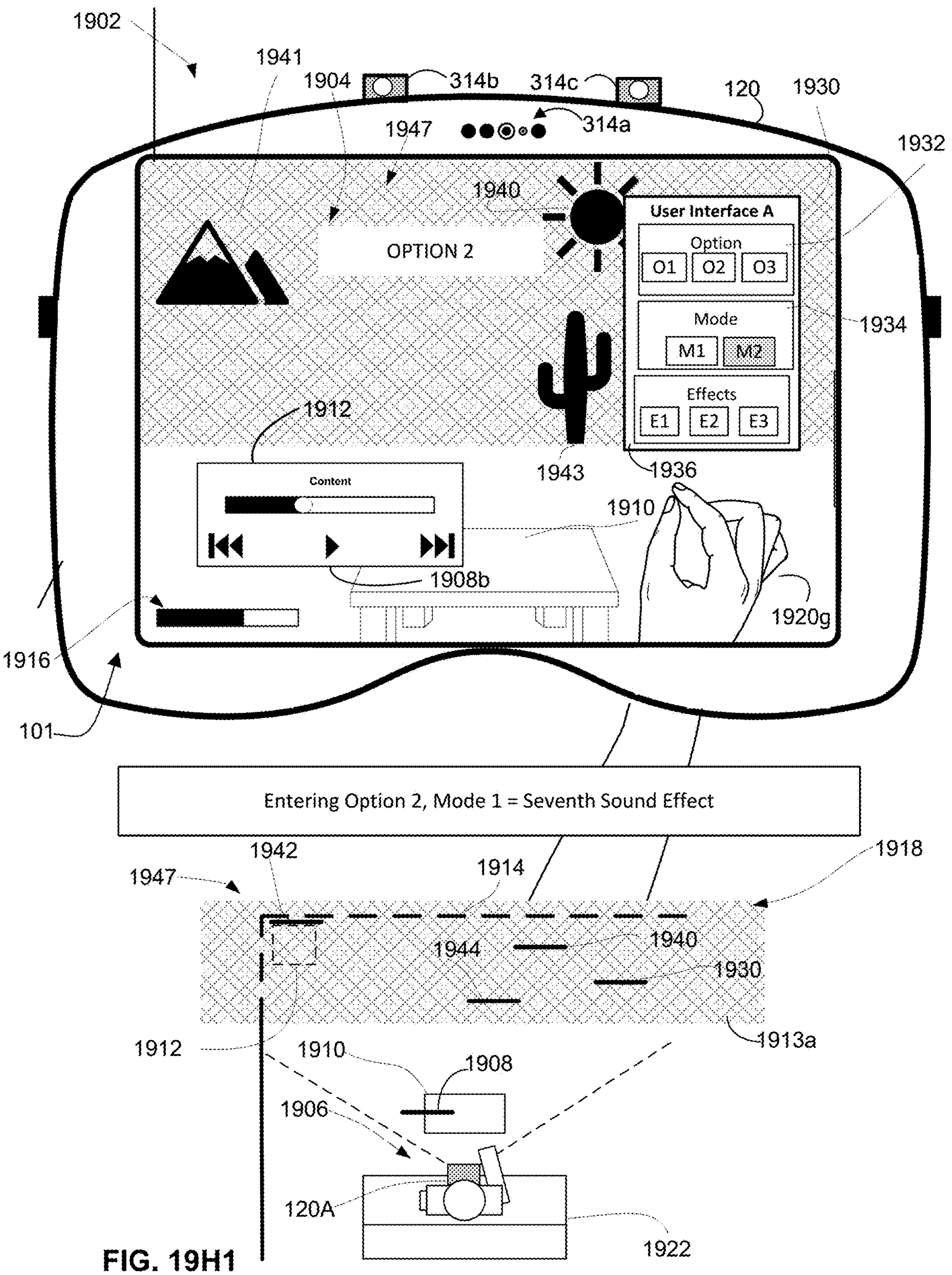
FIG. 19H1

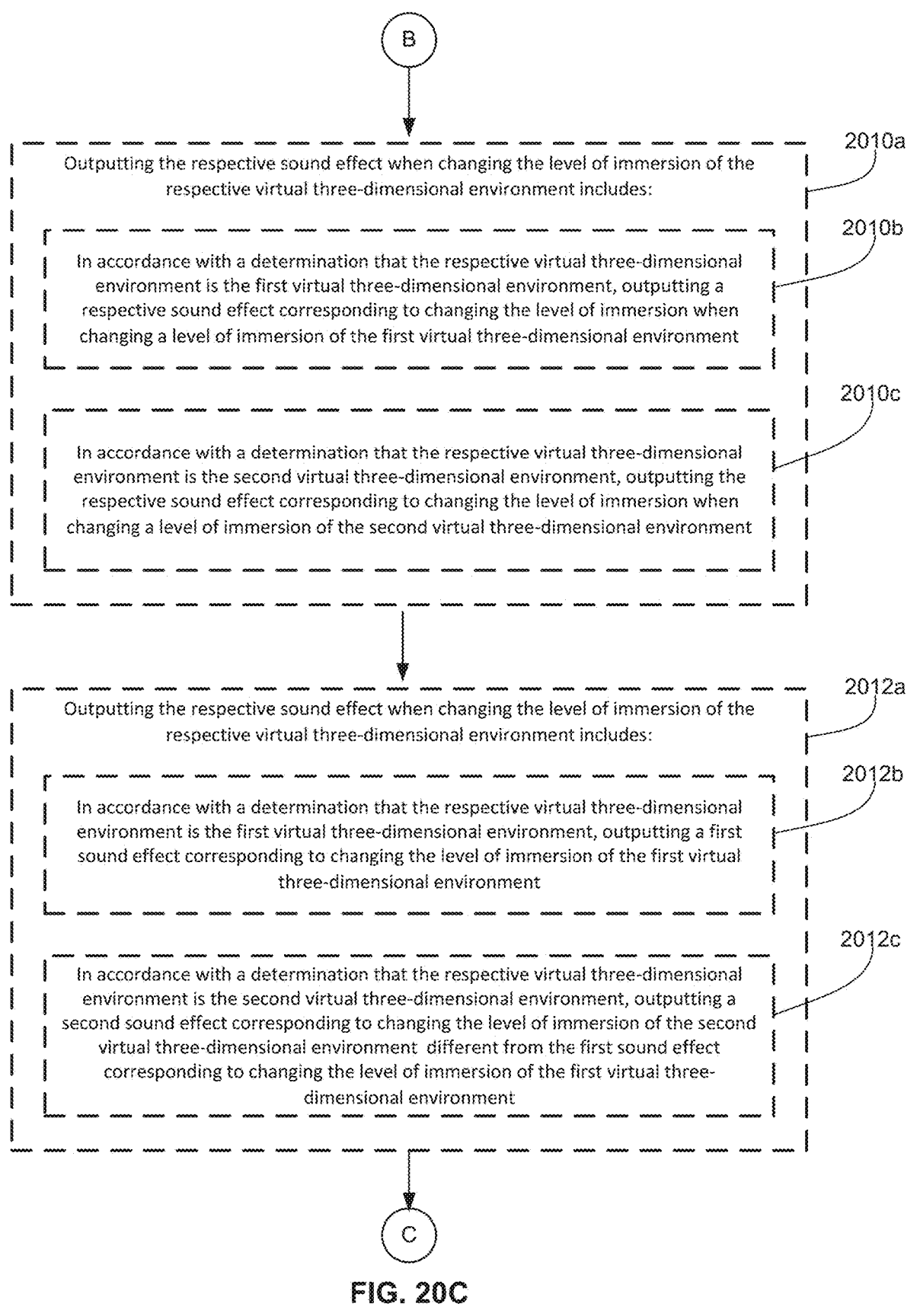

B

2010a

Outputting the respective sound effect when changing the level of immersion of the respective virtual three-dimensional environment includes:

2010b

In accordance with a determination that the respective virtual three-dimensional environment is the first virtual three-dimensional environment, outputting a respective sound effect corresponding to changing the level of immersion when changing a level of immersion of the first virtual three-dimensional environment 2010c In accordance with a determination that the respective virtual three-dimensional environment is the second virtual three-dimensional environment, outputting the respective sound effect corresponding to changing the level of immersion when changing a level of immersion of the second virtual three-dimensional environment 2012a Outputting the respective sound effect when changing the level of immersion of the respective virtual three-dimensional environment includes:

2012b

In accordance with a determination that the respective virtual three-dimensional environment is the first virtual three-dimensional environment, outputting a first sound effect corresponding to changing the level of immersion of the first virtual three-dimensional environment 2012c In accordance with a determination that the respective virtual three-dimensional environment is the second virtual three-dimensional environment, outputting a second sound effect corresponding to changing the level of immersion of the second virtual three-dimensional environment different from the first sound effect corresponding to changing the level of immersion of the first virtual three-dimensional environment

C

FIG. 20C

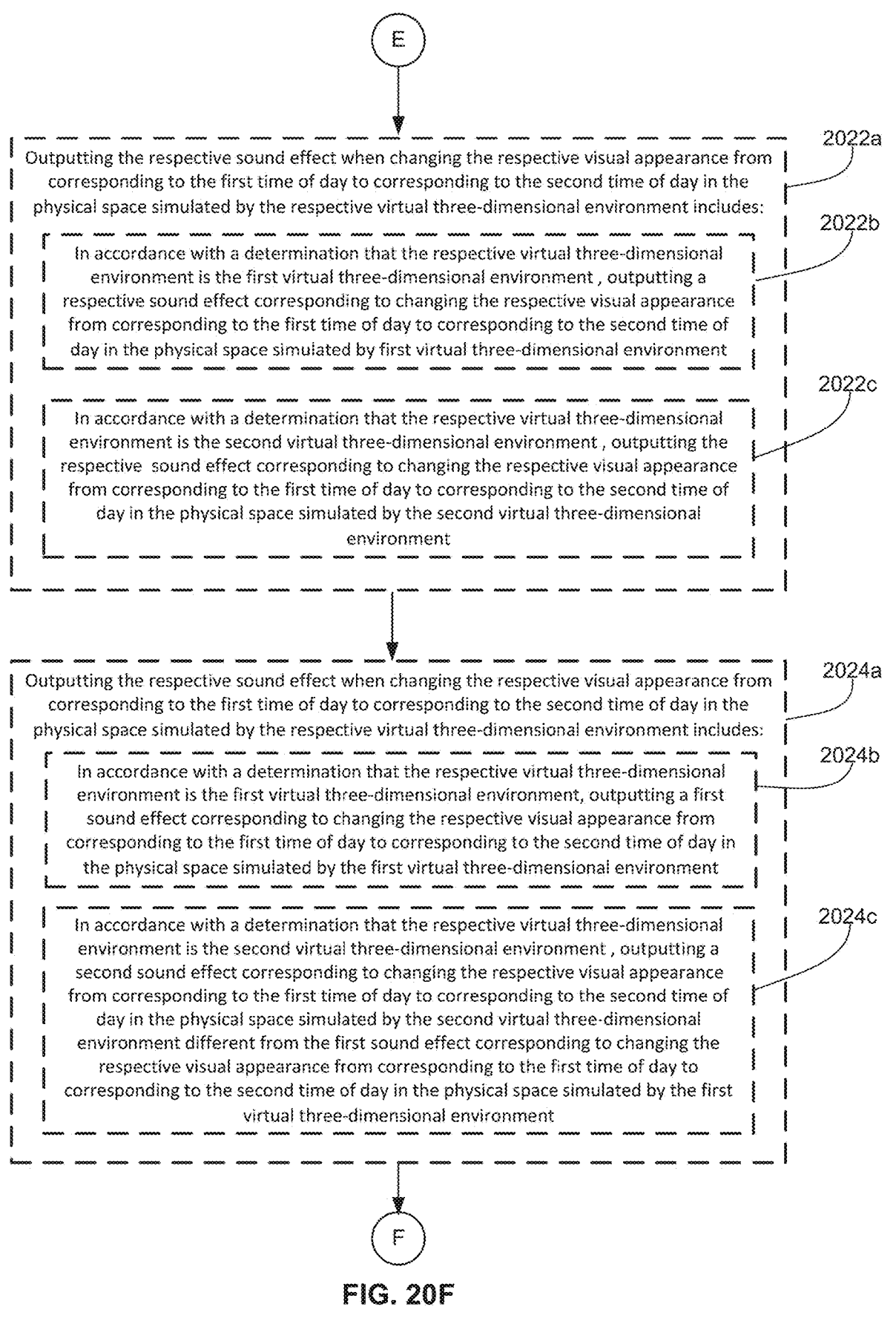

E

2022a
Outputting the respective sound effect when changing the respective visual appearance from corresponding to the first time of day to corresponding to the second time of day in the physical space simulated by the respective virtual three-dimensional environment includes:

2022b
In accordance with a determination that the respective virtual three-dimensional environment is the first virtual three-dimensional environment , outputting a respective sound effect corresponding to changing the respective visual appearance from corresponding to the first time of day to corresponding to the second time of day in the physical space simulated by first virtual three-dimensional environment 2022c
In accordance with a determination that the respective virtual three-dimensional environment is the second virtual three-dimensional environment , outputting the respective sound effect corresponding to changing the respective visual appearance from corresponding to the first time of day to corresponding to the second time of day in the physical space simulated by the second virtual three-dimensional environment 2024a
Outputting the respective sound effect when changing the respective visual appearance from corresponding to the first time of day to corresponding to the second time of day in the physical space simulated by the respective virtual three-dimensional environment includes:

2024b
In accordance with a determination that the respective virtual three-dimensional environment is the first virtual three-dimensional environment, outputting a first sound effect corresponding to changing the respective visual appearance from corresponding to the first time of day to corresponding to the second time of day in the physical space simulated by the first virtual three-dimensional environment 2024c
In accordance with a determination that the respective virtual three-dimensional environment is the second virtual three-dimensional environment , outputting a second sound effect corresponding to changing the respective visual appearance from corresponding to the first time of day to corresponding to the second time of day in the physical space simulated by the second virtual three-dimensional environment different from the first sound effect corresponding to changing the respective visual appearance from corresponding to the first time of day to corresponding to the second time of day in the physical space simulated by the first virtual three-dimensional environment

F

FIG. 20F

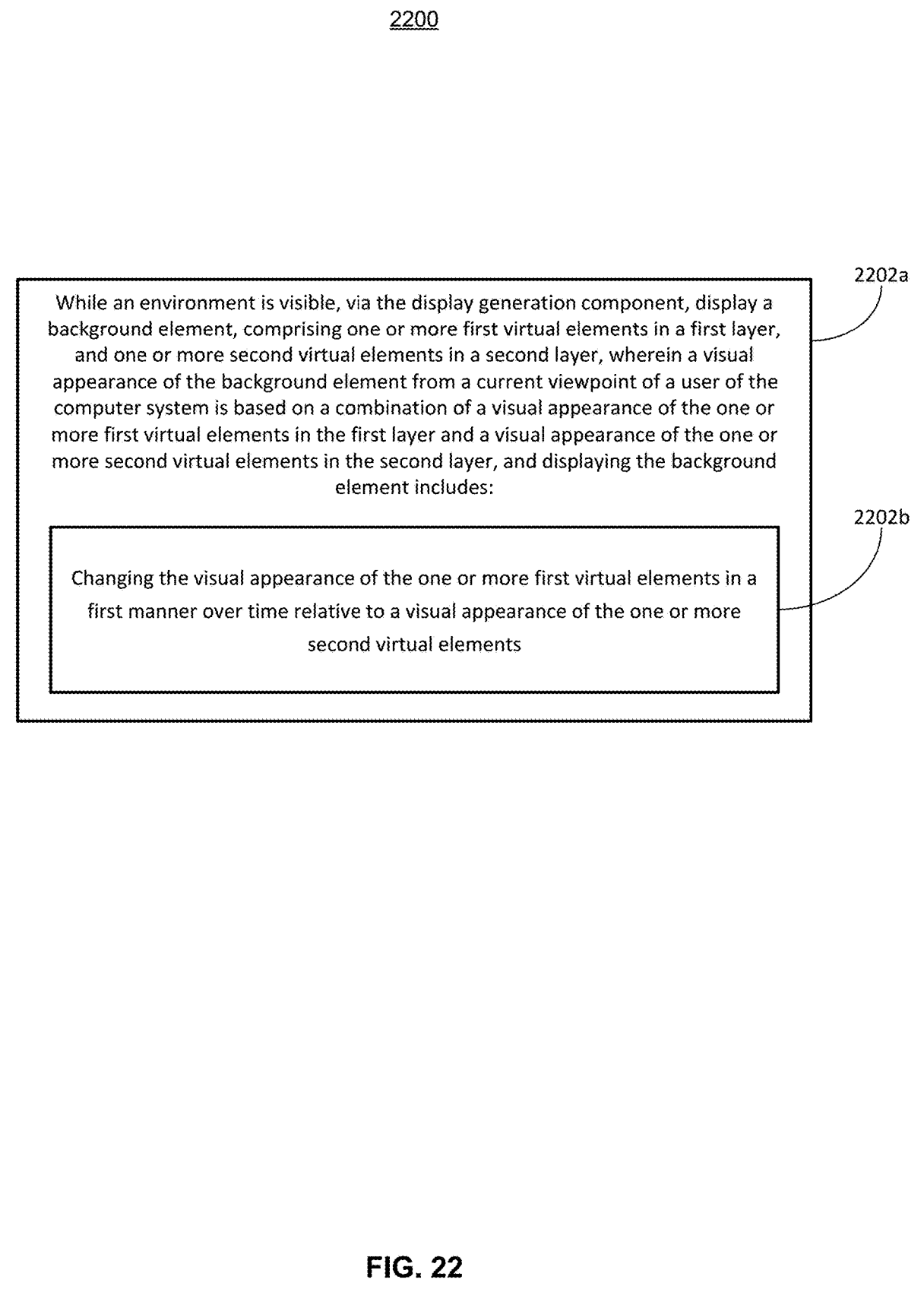

2200

2202a

While an environment is visible, via the display generation component, display a background element, comprising one or more first virtual elements in a first layer, and one or more second virtual elements in a second layer, wherein a visual appearance of the background element from a current viewpoint of a user of the computer system is based on a combination of a visual appearance of the one or more first virtual elements in the first layer and a visual appearance of the one or more second virtual elements in the second layer, and displaying the background element includes:

2202b

Changing the visual appearance of the one or more first virtual elements in a first manner over time relative to a visual appearance of the one or more second virtual elements

FIG. 22

METHODS FOR OPTIMIZATION OF VIRTUAL USER INTERFACES IN A THREE-DIMENSIONAL ENVIRONMENT

CROSS-REFERENCE TO RELATED APPLICATIONS

This application claims the benefit of U.S. Provisional Application No. 63/515,117, filed Jul. 23, 2023, U.S. Provisional Application No. 63/506,093, filed Jun. 4, 2023, and U.S. Provisional Application No. 63/503,934, filed May 23, 2023, the contents of which are herein incorporated by reference in their entireties for all purposes.

TECHNICAL FIELD

This relates generally to computer systems that provide computer-generated experiences, including, but no limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing computer-generated experiences to users that make interaction with the computer systems more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has (e.g., includes or is in communication with) a display generation component (e.g., a display device such as a head-mounted device (HMD), a display, a projector, a touch-sensitive display (also known as a "touch screen" or "touch-screen display"), or other device or component that presents visual content to a user, for example on or in the display generation component itself or produced from the display generation component and visible elsewhere). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for interacting with content in a three-dimensional environment. Such methods and interfaces may complement or replace conventional methods for interacting with content in a three-dimensional environment. Such methods and interfaces reduce the number, extent, and/or the nature of the inputs from a user and produce a more efficient human-machine interface. For battery-operated computing devices, such methods and interfaces conserve power and increase the time between battery charges.

In some embodiments, a computer system changes a level of detail with which a respective environment is being displayed based on a number of application user interfaces that are being displayed concurrently with the respective environment. In some embodiments, a computer system applies a neutralization adjustment to generate a representation of the physical environment. In some embodiments, a computer system displays a user interface object in a three-dimensional environment with a three-dimensional stereoscopic effect corresponding to different views of content associated with the user interface object. In some embodiments, a computer system facilitates light blending with respect to one or more objects in a three-dimensional environment. In some embodiments, a computer system transitions from displaying one three-dimensional environment to displaying another three-dimensional environment using visual effects that depend on the type(s) of environment. In some embodiments, a computer system detects a movement in a viewpoint of a user while displaying a portal to a virtual environment, and either maintains or ceases display of the portal based on the amount of movement and/or based on a direction in which the portal opens. In some embodiments, a computer system outputs a different sound effect when initiating display of different virtual three-dimensional environments. In some embodiments, a computer system outputs a different sound effect when initiating display of different virtual three-dimensional environments. In some embodiments, a computer system displays simulated clouds in an environment. In some embodiments, a computer system displays a background element in an environment.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the FIGS.

FIGS. 12A-12I is a flowchart illustrating a method of displaying a user interface object in a three-dimensional environment with a three-dimensional stereoscopic effect corresponding to different views of content associated with the user interface object in accordance with some embodiments.

FIGS. 18A-18F depict a flowchart illustrating a method of displaying and ceasing to display portals to virtual environments in accordance with some embodiments.

FIGS. 20A-20L depict a flowchart illustrating a method of outputting a different sound effect when initiating display of different virtual three-dimensional environments in accordance with some embodiments.

FIG. 22 depicts a flowchart illustrating a method of displaying a background element in an environment in accordance with some embodiments.

DESCRIPTION OF EMBODIMENTS

Figure 1A:
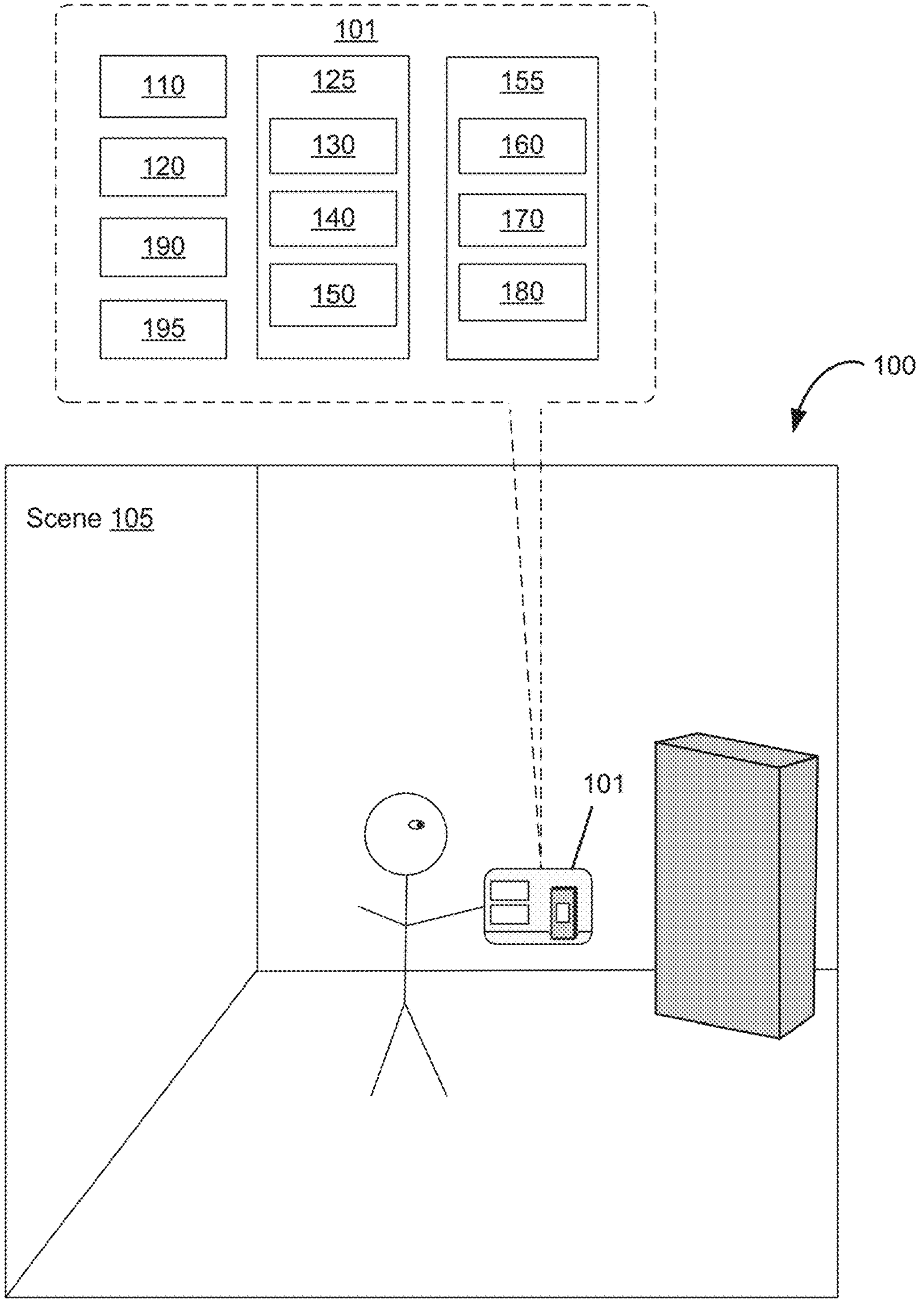
FIG. 1A is a block diagram illustrating an operating environment of a computer system for providing XR experiences in accordance with some embodiments.

The present disclosure relates to user interfaces for providing an extended reality (XR) experience to a user, in accordance with some embodiments.

The systems, methods, and GUIs described herein improve user interface interactions with virtual/augmented reality environments in multiple ways.

In some embodiments, while displaying a respective environment, the computer system detects a change in a number of application user interfaces that are being displayed concurrently with the respective environment. In some embodiments, in response to detecting the change in the number of application user interfaces that are being displayed concurrently with the respective environment, the computer system changes a level of detail with which the respective environment is being displayed.

In some embodiments, while at least a portion of a physical environment of a user of the computer system is visible, the computer system receives a first input corresponding to a request to apply a first visual effect to a representation of the physical environment. In some embodiments, in response to receiving the first input, the computer system displays the representation of the physical environment. In some embodiments, in accordance with a determination that the at least the portion of the physical environment has a first visual appearance, the computer system applies a first visual adjustment to generate the representation of the physical environment. In some embodiments, in accordance with a determination that the at least the portion of the physical environment has a second visual appearance different from the first visual appearance, the computer system applies a second visual adjustment different from the first visual adjustment to generate the representation of the physical environment.

In some embodiments, a computer system displays a user interface object with a first visual appearance in an environment that is selectable to display content. In some embodiments, while displaying the user interface object with the first visual appearance, the computer system detects attention of a user of the computer system directed toward the user interface object. In some embodiments, in response to detecting the attention of the user directed toward the user interface object, the computer system displays the user interface object with a second visual appearance different from the first visual appearance, the second visual appearance including a three-dimensional stereoscopic effect corresponding to a plurality of different views of the content corresponding to the user interface object. In some embodiments, the first visual appearance of the user interface object, displayed before the attention of the user was directed to the user interface object, does not include the three-dimensional stereoscopic effect.

In some embodiments, a computer system displays a three-dimensional environment including a virtual object and/or one or more physical objects. In some embodiments, the three-dimensional environment includes a portion of a physical environment surrounding the computer system that is visible in a first region of the three-dimensional environment and a portion of a virtual environment that is displayed in a second region of the three-dimensional environment. In some embodiments, the computer system displays the virtual object with a visual lighting effect that is based on one or more visual characteristics of the at least the portion of the physical environment and one or more visual characteristics of the at least the portion of the virtual environment in the three-dimensional environment. In some embodiments, the computer system displays a physical object of the one or more physical objects with a visual lighting effect that is based on the one or more visual characteristics of the at least the portion of the physical environment and the one or more visual characteristics of the at least the portion of the virtual environment in the three-dimensional environment.

In some embodiments, a computer system displays a first three-dimensional environment that optionally includes a virtual environment, a representation of a physical environment, an atmosphere environment, and/or a mixed environment. In response to detecting a user input corresponding to a request to display a second (different) three-dimensional environment, the computer system transitions from displaying the first three-dimensional environment to displaying the second three-dimensional environment using a visual effect that depends on the type of the first three-dimensional environment (and optionally, on the type of the second three-dimensional environment). The visual effect optionally includes, for example, crossfading a tint of the first three-dimensional environment with a tint of the second three-dimensional environment, fading out the first three-dimensional environment before fading in the second three-dimensional environment, and/or using other visual effects as described herein.

In some embodiments, a computer system displays a portal to a virtual environment within a three-dimensional environment, where the portal has a first opening direction or a second opening direction. For example, a portal optionally opens in a first direction (e.g., vertically, orthogonally to a plane of a floor or ceiling of the three-dimensional environment) or in a second direction (e.g., horizontally, orthogonally to a wall or horizon of the three-dimensional environment). For example, a portal optionally opens from above the viewpoint of the user or below the viewpoint of the user (e.g., vertically) or from in front of the viewpoint of the user (e.g., horizontally). The computer system detects a movement in the viewpoint of a user of the computer system, and in response, the computer system either maintains display of the portal or ceases display of the portal, depending on the amount of movement and/or on the opening direction of the portal.

In some embodiments, the computer system receives a first user input corresponding to a request to display a respective virtual three-dimensional environment. In some embodiments, in response to receiving the first user input, the computer system displays the respective virtual three-dimensional environment. In some embodiments, in accordance with a determination that the respective virtual three-dimensional environment is a first virtual three-dimensional environment, the computer system outputs a first sound effect when initiating display of the first virtual three-dimensional environment. In some embodiments, in accordance with a determination that the respective virtual three-dimensional environment is a second virtual three-dimensional environment different from the first virtual three-dimensional environment, the computer system outputs a second sound effect different from the first sound effect when initiating display of the second virtual three-dimensional environment.

Figure 15A:
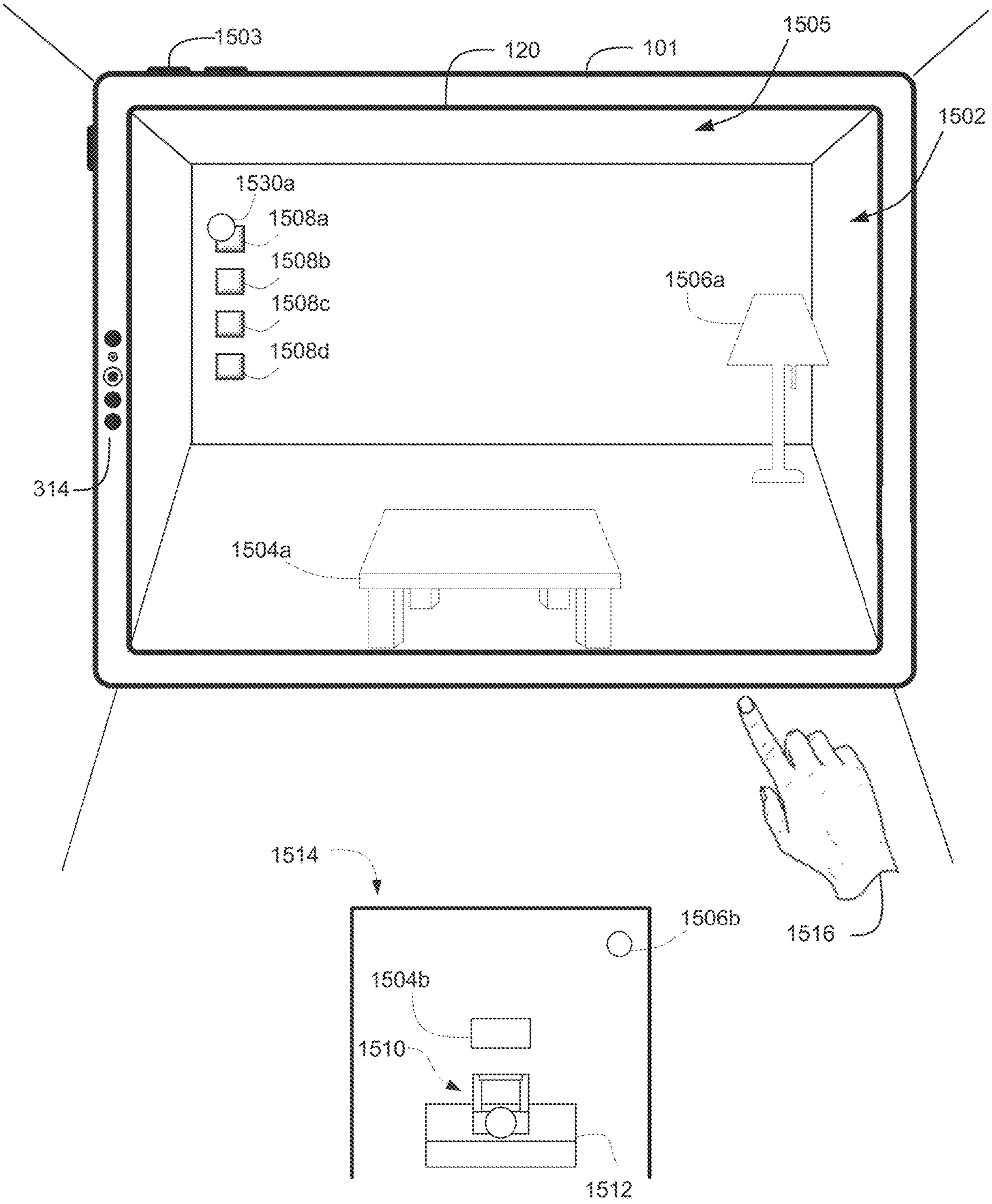
FIGS. 15A-15O illustrate examples of a computer system transitioning between display of different three-dimensional environments in accordance with some embodiments.
Figure 21:
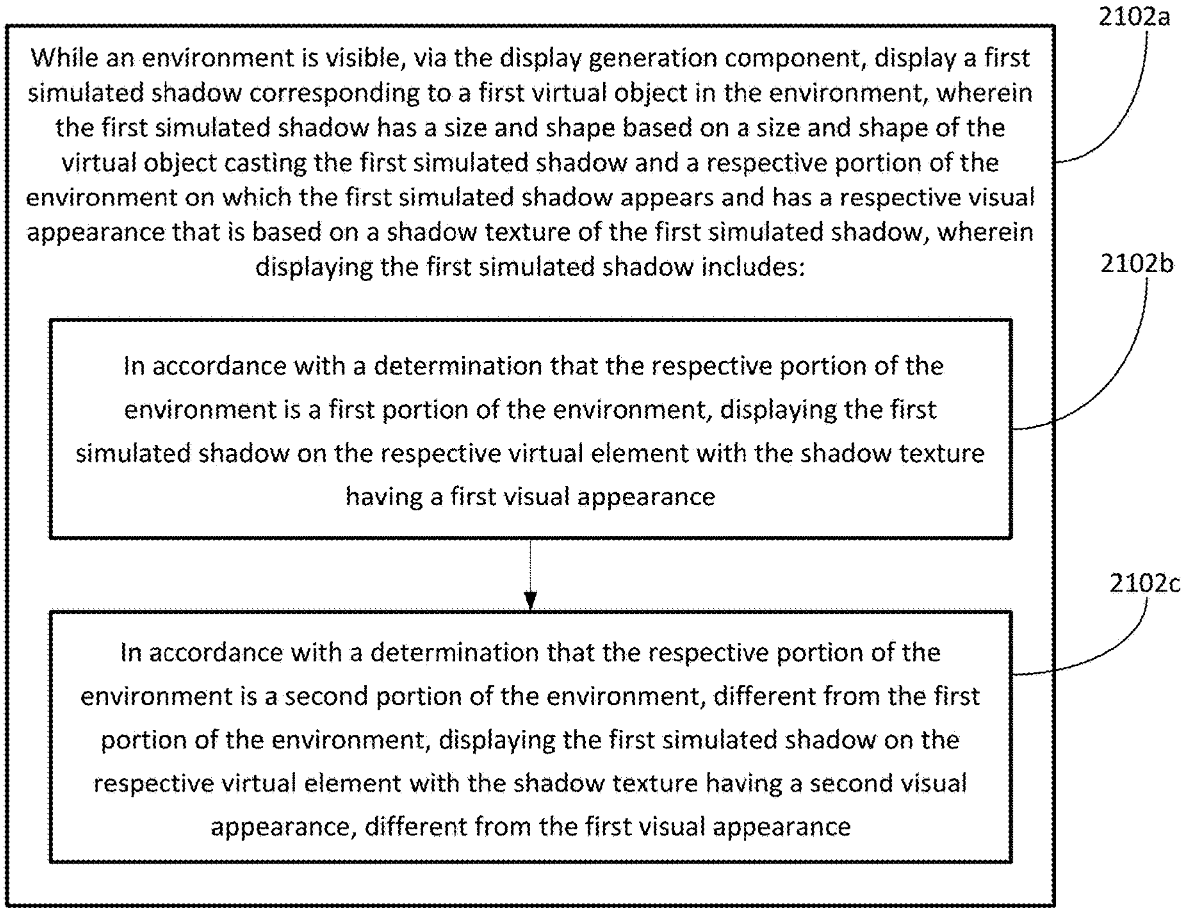
FIG. 21 depicts a flowchart illustrating a method of displaying simulated clouds in an environment in accordance with some embodiments.

FIGS. 1A-6 provide a description of example computer systems for providing XR experiences to users (such as described below with respect to methods 800, 1000, 1200, 1400, 1600, 1800, and/or 2000). FIGS. 7A-7D illustrate example techniques for changing a level of detail with which a respective environment is being displayed based on a number of application user interfaces that are being displayed concurrently with the respective environment in accordance with some embodiments. FIGS. 8A-8F is a flow diagram of methods of changing a level of detail with which a respective environment is being displayed based on a number of application user interfaces that are being displayed concurrently with the respective environment in accordance with some embodiments. The user interfaces in FIGS. 7A-7D are used to illustrate the processes in FIGS. 8A-8F. FIGS. 7E-7J illustrate examples of displaying simulated clouds and/or background elements in an environment in accordance with some embodiments. FIGS. 21 and 22 are flow diagrams of methods of displaying simulated clouds and/or background elements in an environment in accordance with some embodiments. The user interfaces of FIGS. 7E-7J are used to illustrate the processes in FIGS. 21 and 22. FIGS. 9A-9E illustrate example techniques for applying a neutralization adjustment to generate a representation of the physical environment in accordance with some embodiments. FIGS. 10A-10D is a flow diagram of methods of applying a neutralization adjustment to generate a representation of the physical environment in accordance with some embodiments. The user interfaces in FIGS. 9A-9E are used to illustrate the processes in FIGS. 10A-10D. FIGS. 11A-11I illustrate example techniques for displaying a user interface object in a three-dimensional environment with a three-dimensional stereoscopic effect corresponding to different views of content associated with the user interface object in accordance with some embodiments. FIGS. 12A-12I is a flow diagram of methods of displaying a user interface object in a three-dimensional environment with a three-dimensional stereoscopic effect corresponding to different views of content associated with the user interface object in accordance with some embodiments. The user interfaces in FIGS. 11A-11I are used to illustrate the processes in FIGS. 12A-12I. FIGS. 13A-13G illustrate example techniques for facilitating light blending techniques for one or more objects in a three-dimensional environment in accordance with some embodiments. FIGS. 14A-14J is a flow diagram of methods of facilitating light blending techniques for one or more objects in a three-dimensional environment in accordance with some embodiments. The user interfaces in FIGS. 13A-13G are used to illustrate the processes in FIGS. 14A-14J. FIGS. 15A-15O illustrate techniques for transitioning between display of different three-dimensional environments. FIGS. 16A-16J depict a flow diagram of methods of transitioning between display of different three-dimensional environments. The user interfaces in FIGS. 15A-15O are used to illustrate the processes in FIGS. 16A-16J. FIGS. 17A-17M illustrate techniques for displaying and ceasing to display portals to virtual environments. FIGS. 18A-18D depict a flow diagram of methods of displaying and ceasing to display portals to virtual environments. The user interfaces in FIGS. 17A-17M are used to illustrate the processes in FIGS. 18A-18D. FIGS. 19A-19I illustrate example techniques for outputting a different sound effect when initiating display of different virtual three-dimensional environments in accordance with some embodiments. FIGS. 20A-20L is a flow diagram of methods of outputting a different sound effect when initiating display of different virtual three-dimensional environments in accordance with some embodiments. The user interfaces in FIGS. 19A-19I are used to illustrate the processes in FIGS. 20A-20L.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less-precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location an direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment). In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides an XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

Figure 1B:
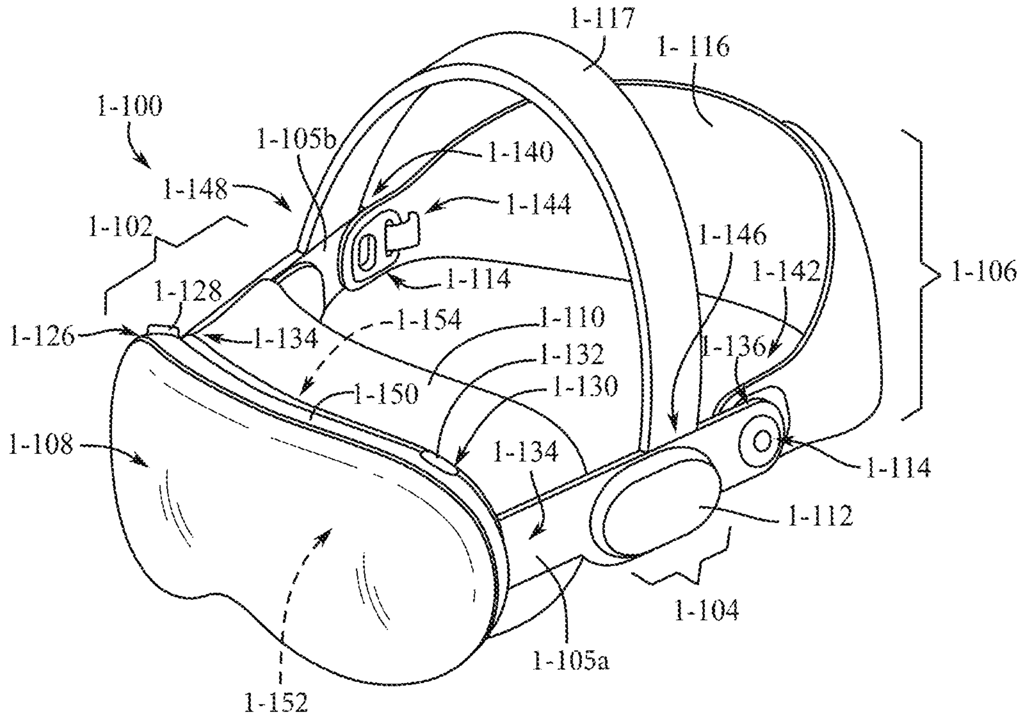
FIGS. 1B-1P are examples of a computer system for providing XR experiences in the operating environment of FIG. 1A.
Figure 1C:
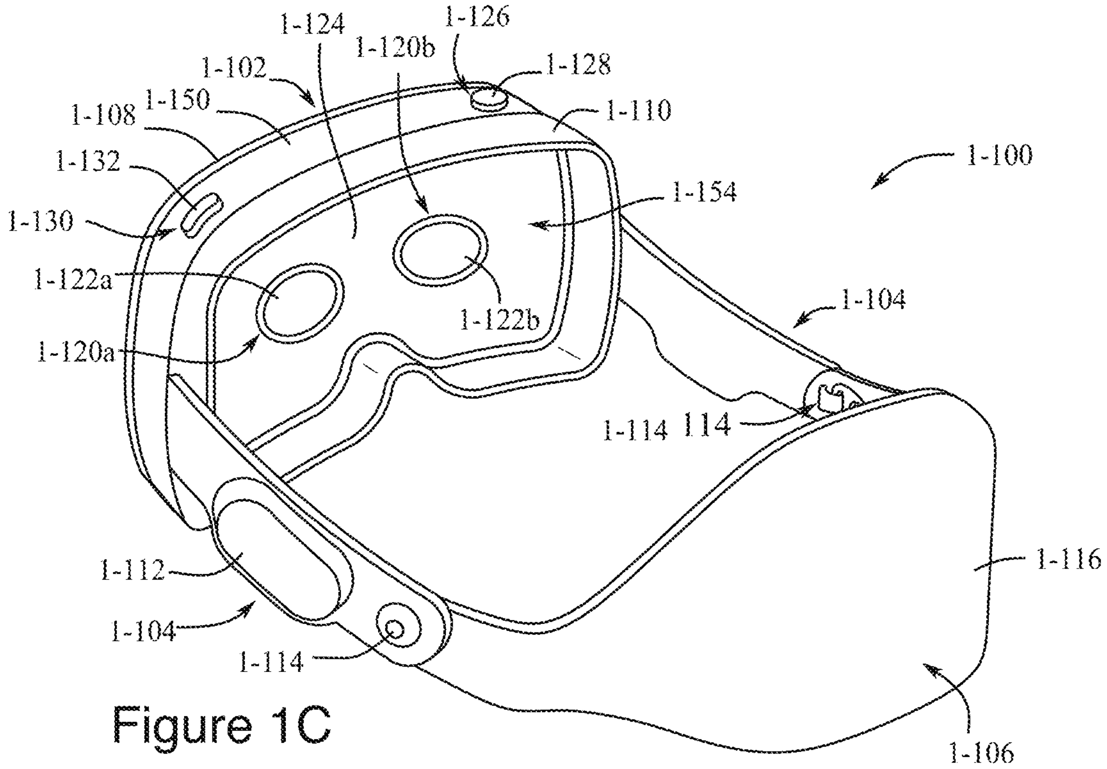
Figure 1D:
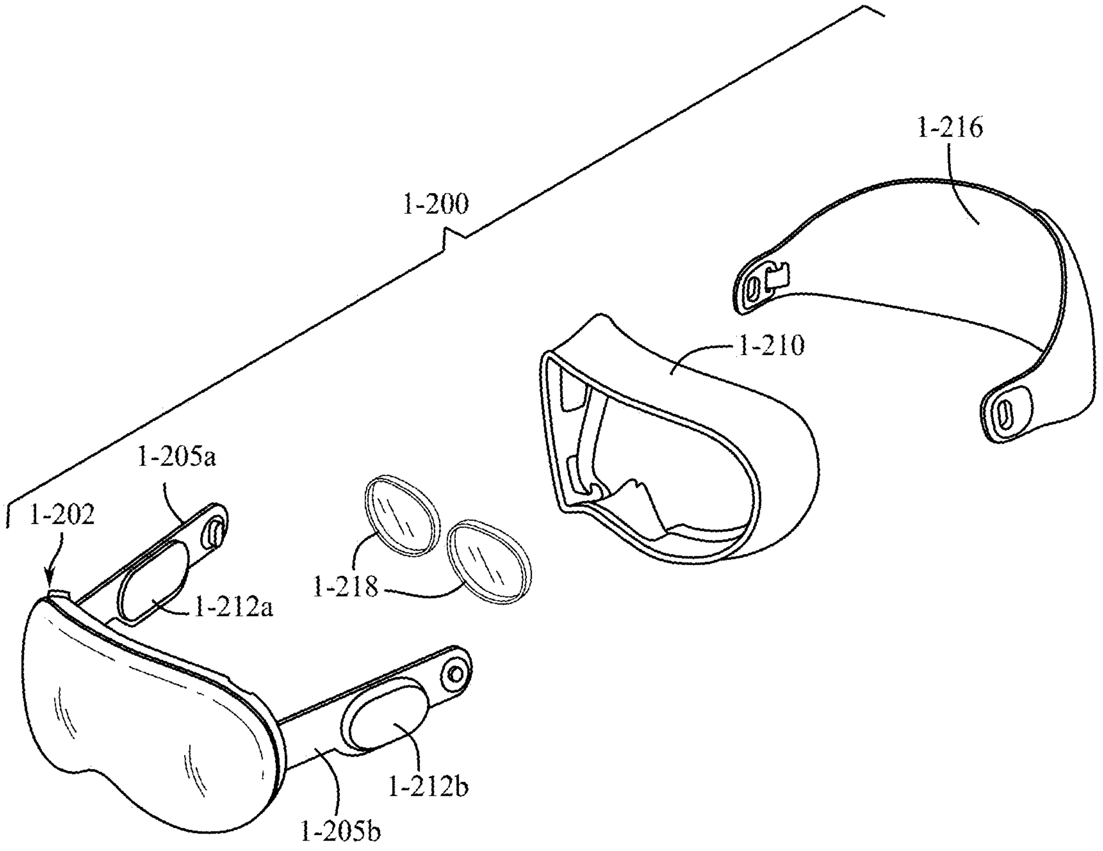
Figure 1E:
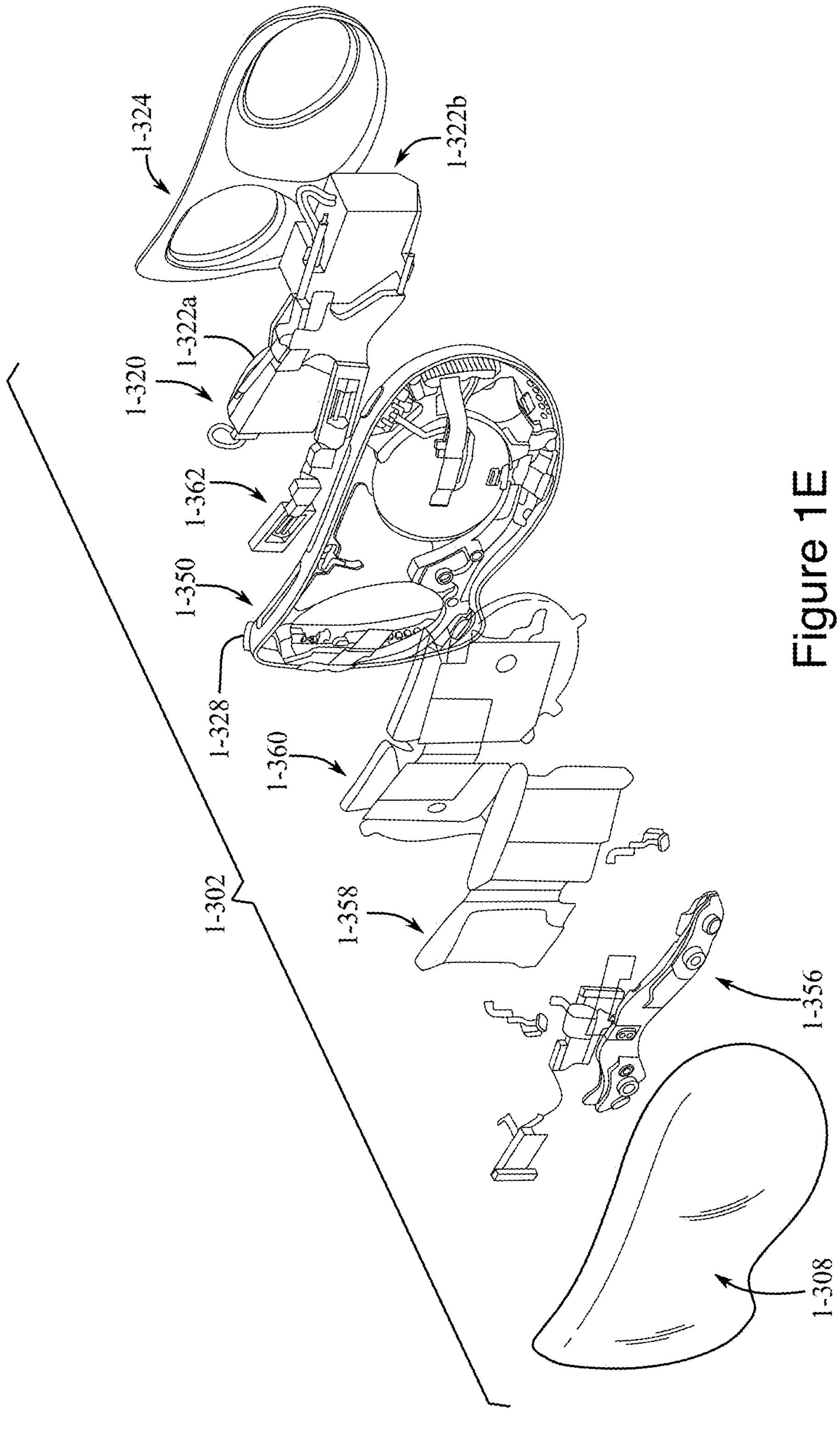
Figure 1F:
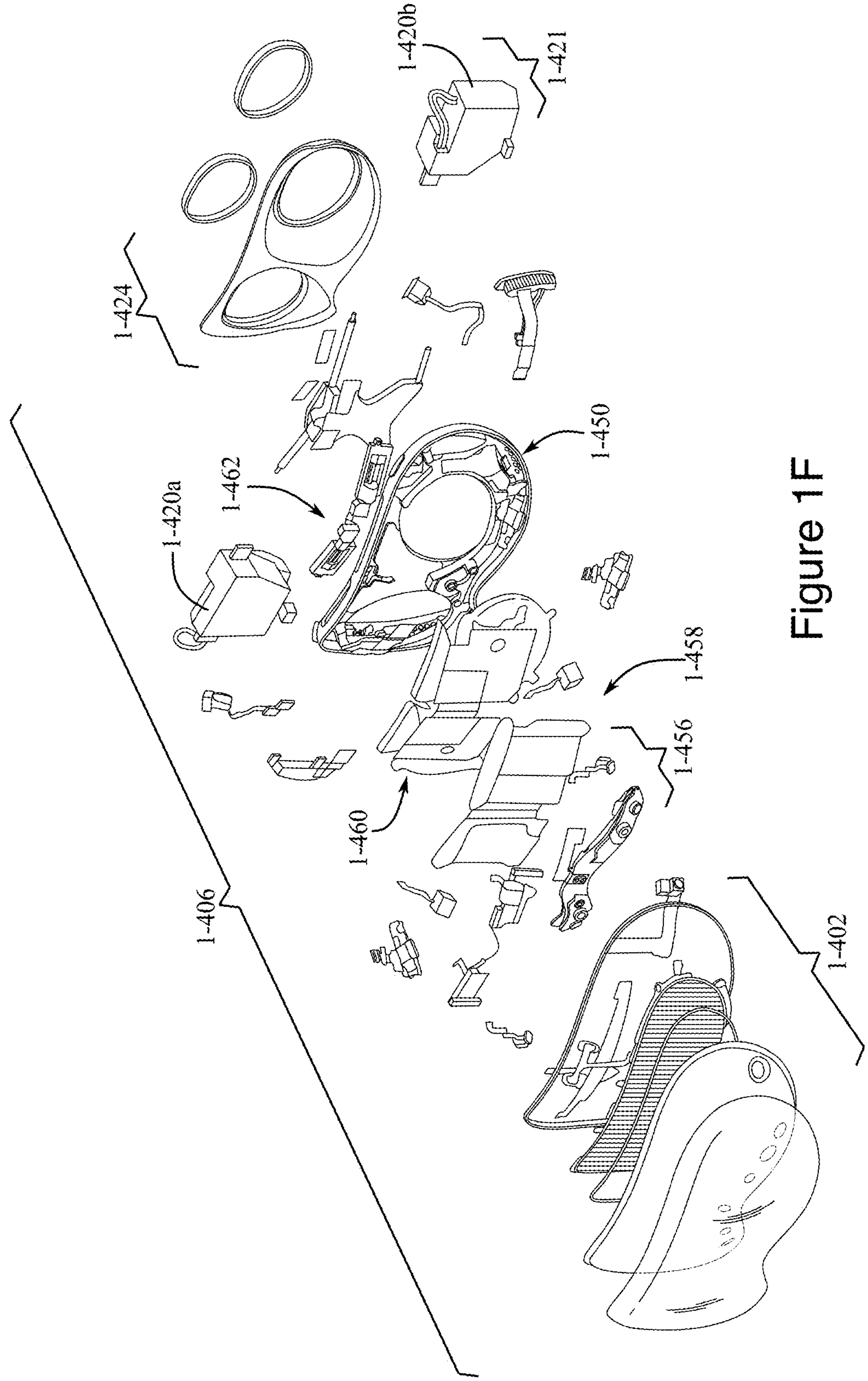
Figure 1G:
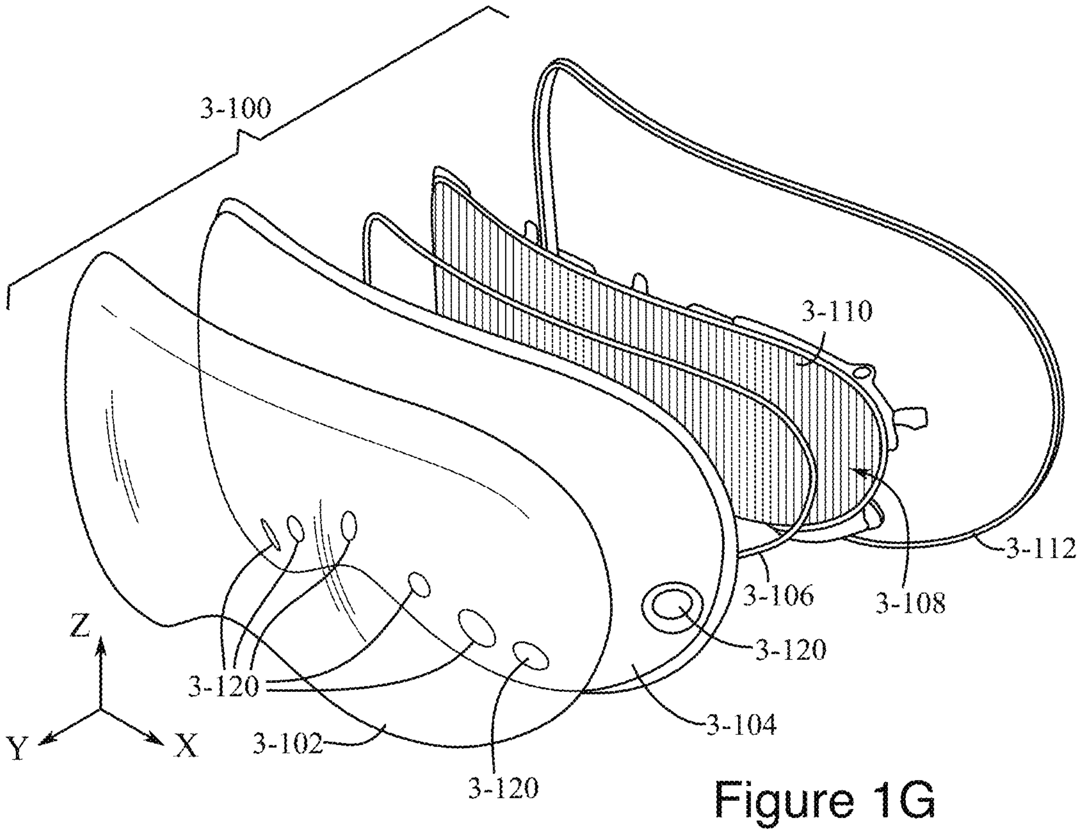
Figure 1H:
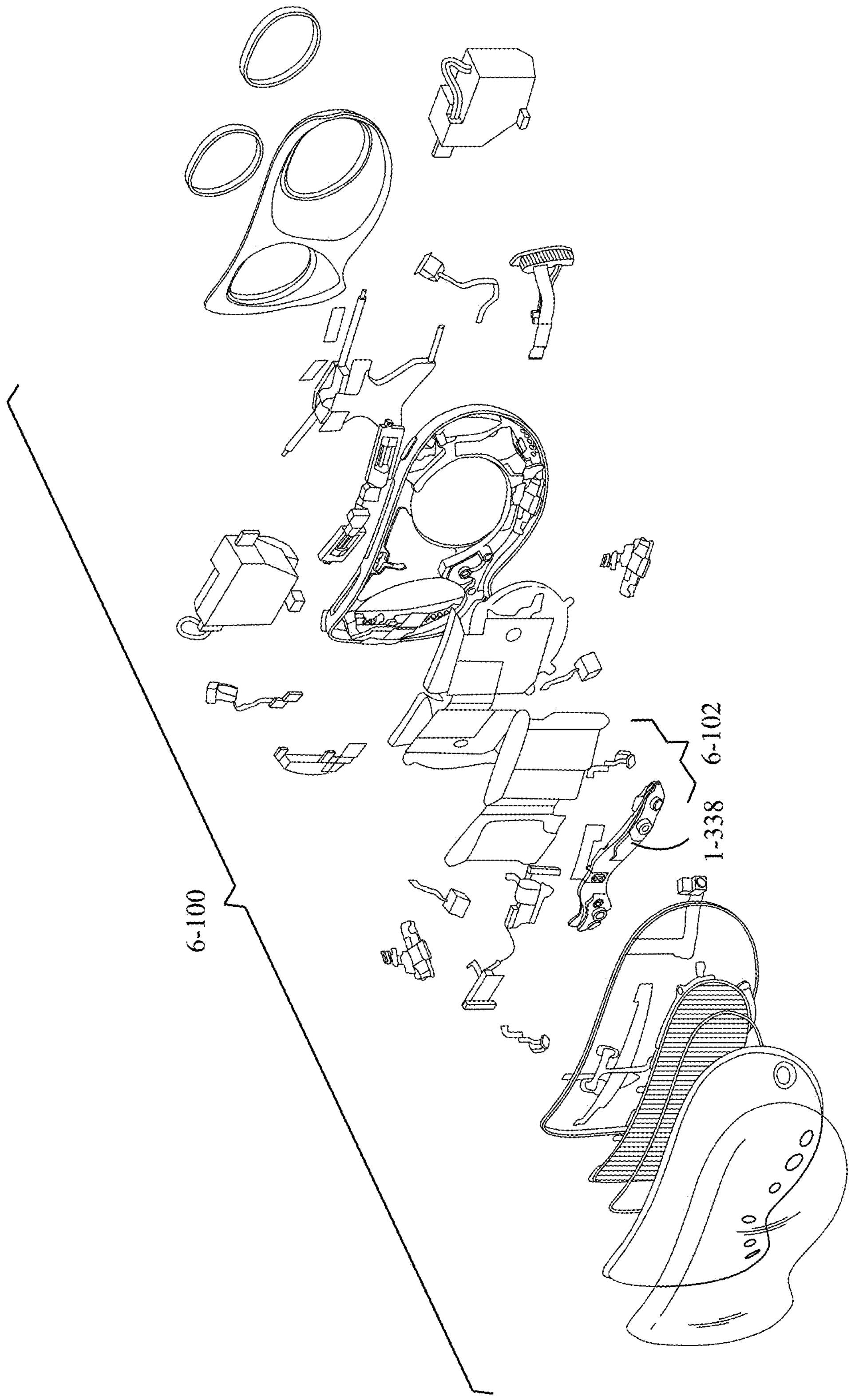
Figure 1I:
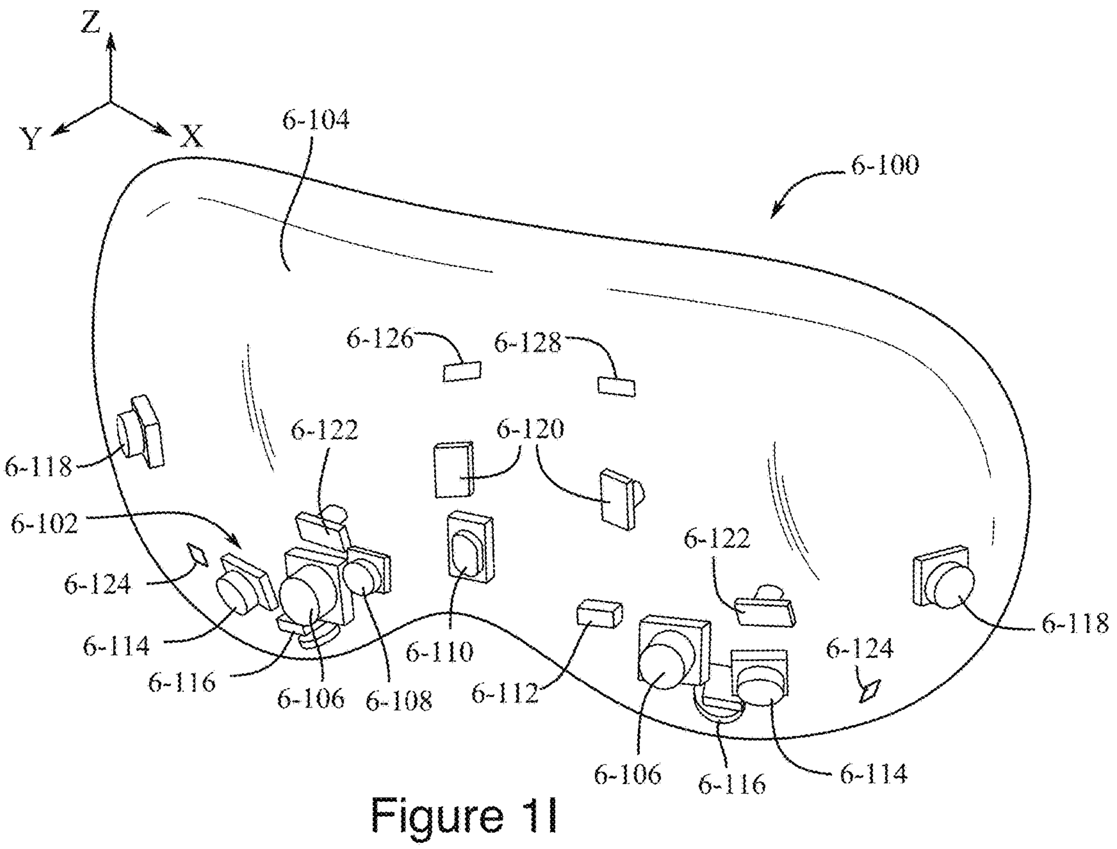
Figure 1J:
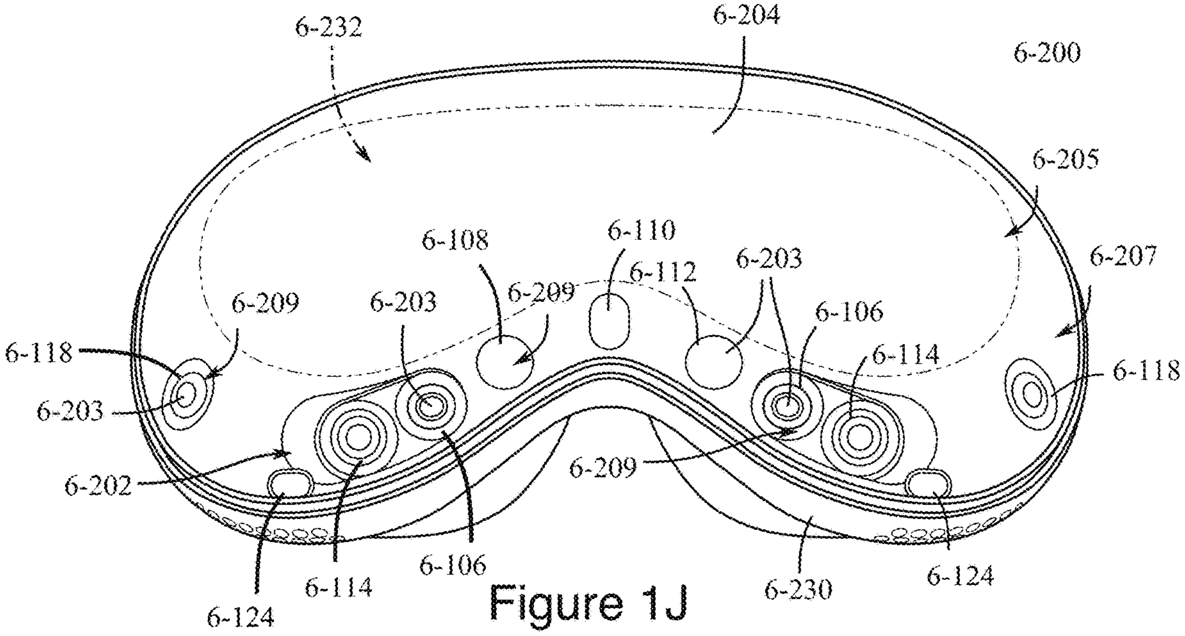
Figure 1K:
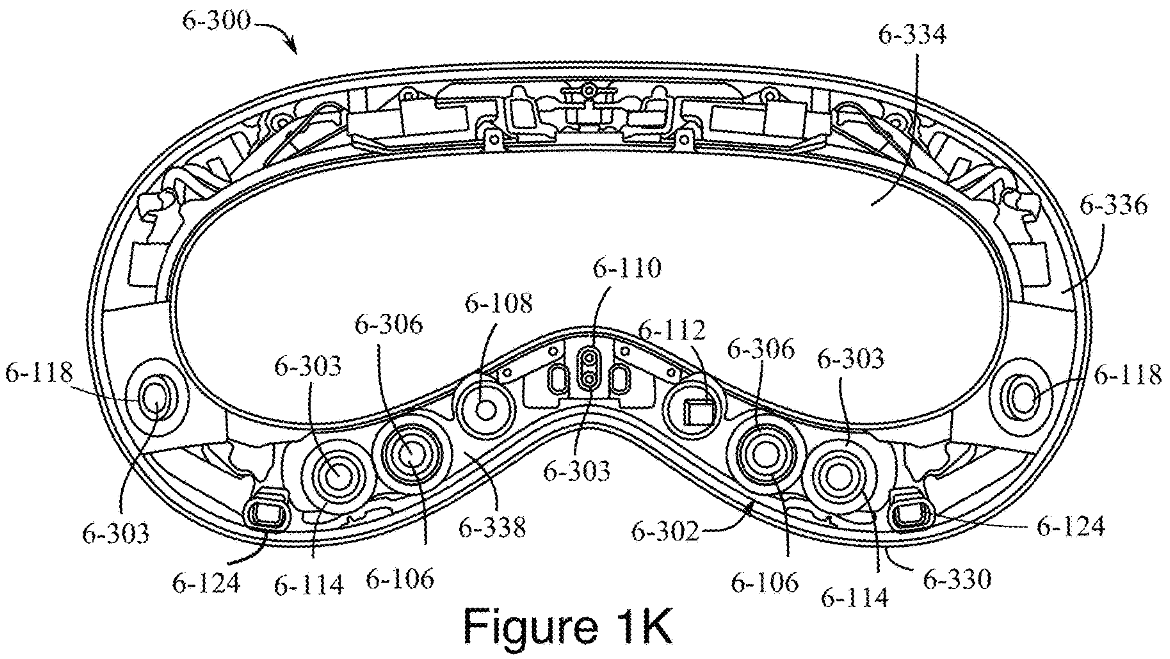
Figure 1L:
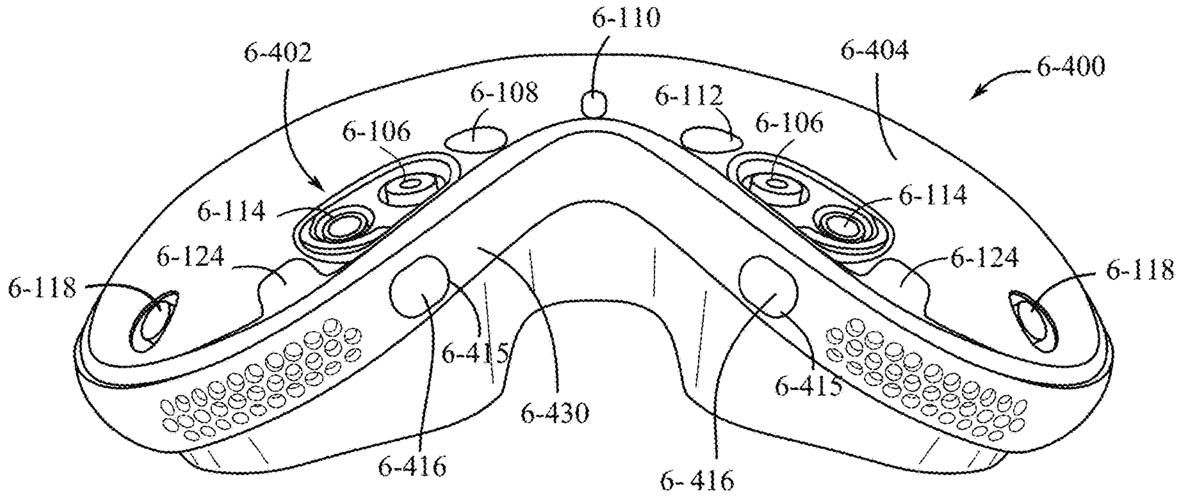
Figure 1M:
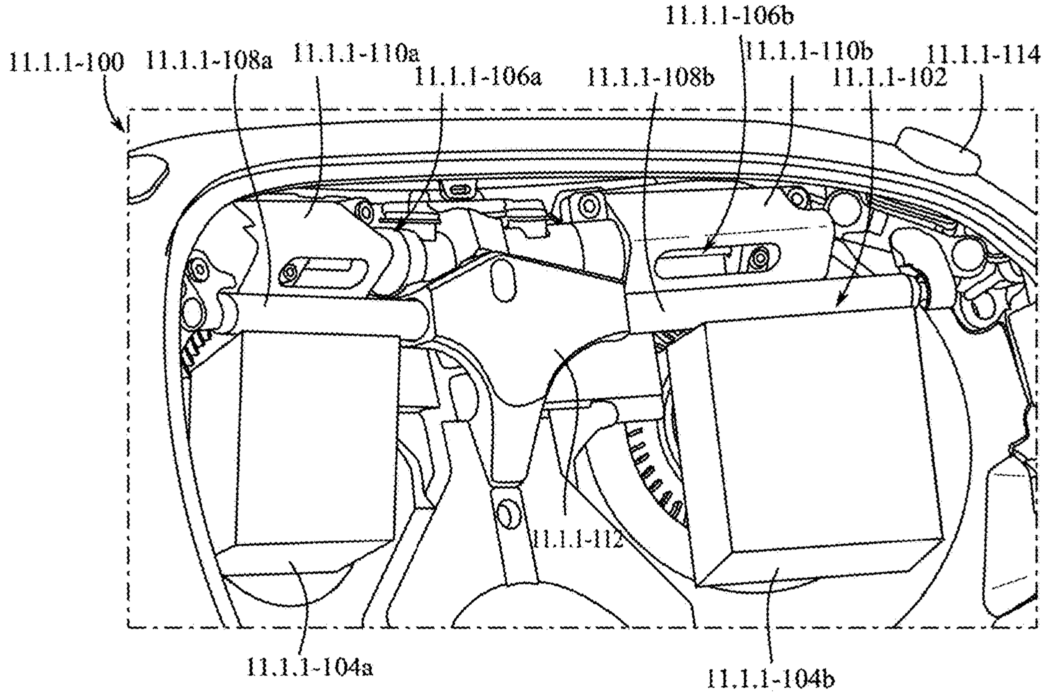
Figure 1N:
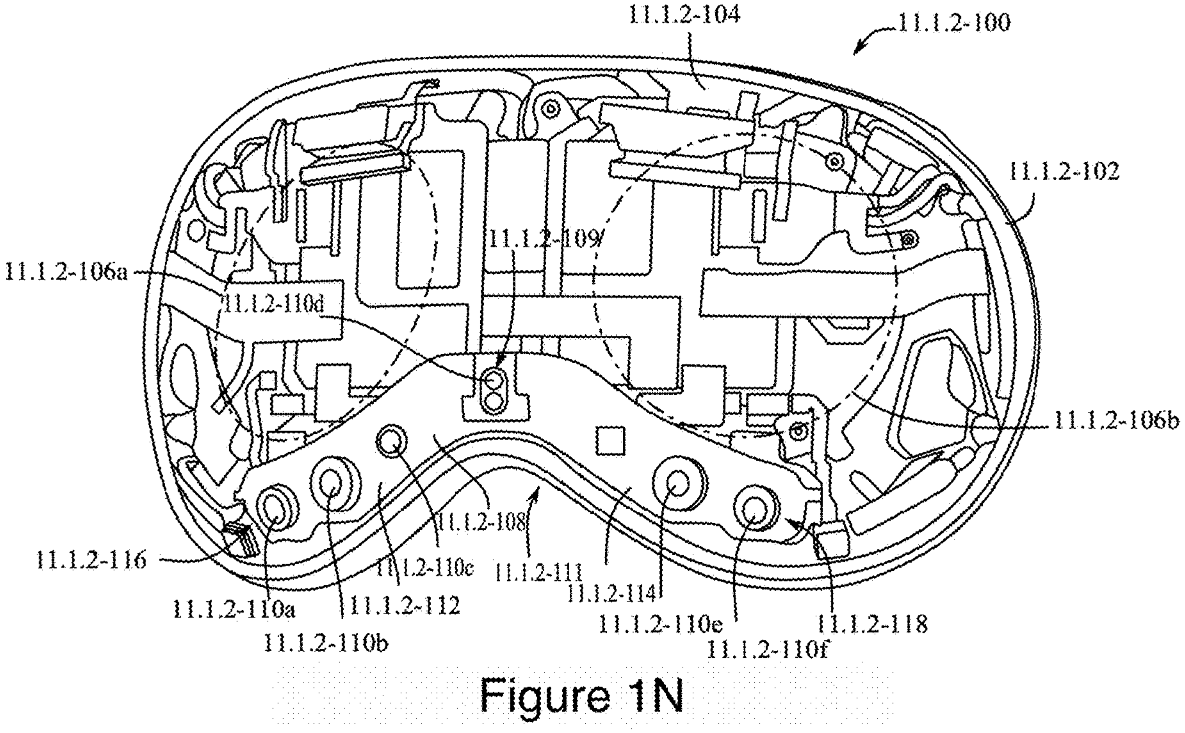
Figure 1O:
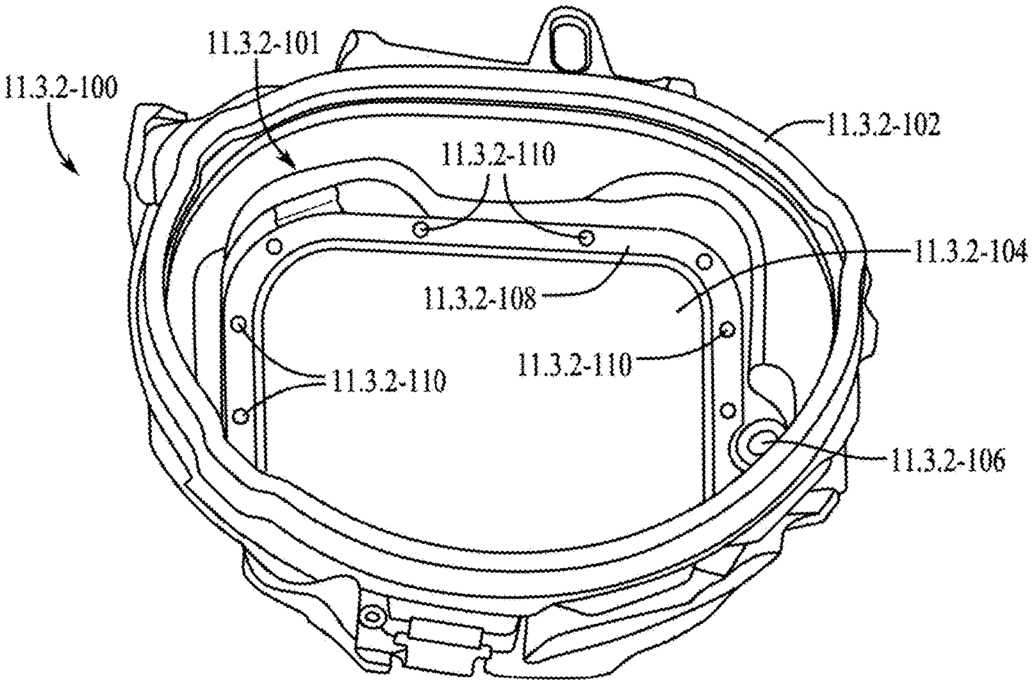
Figure 1P:
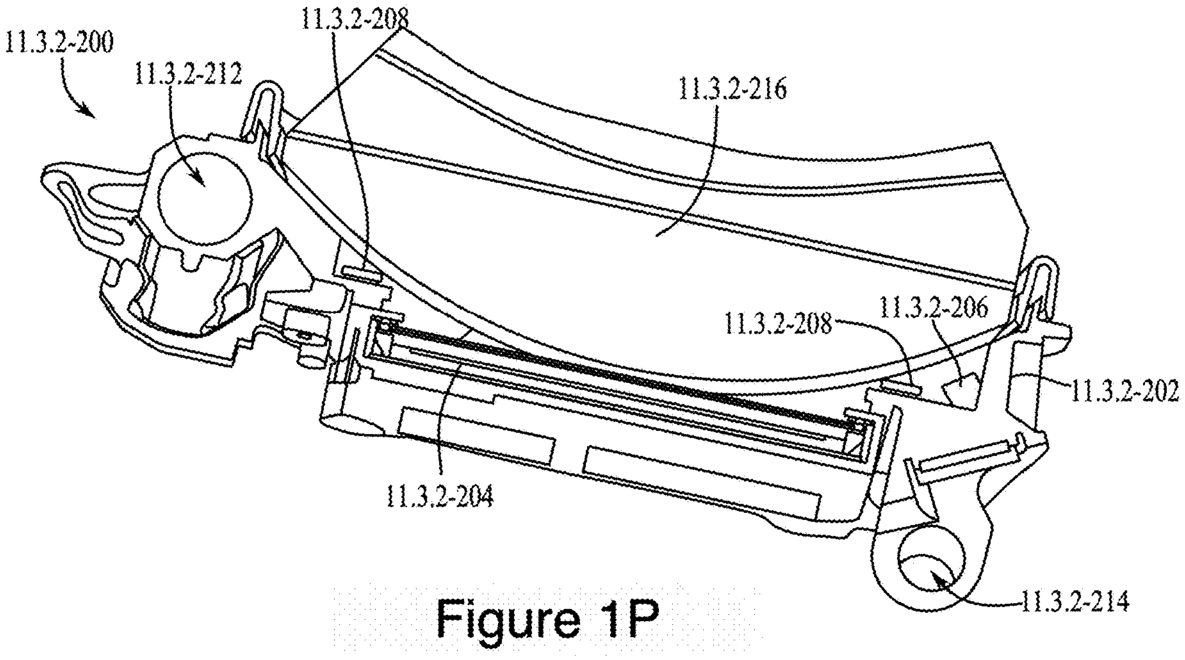

FIGS. 1A-1P illustrate various examples of a computer system that is used to perform the methods and provide audio, visual and/or haptic feedback as part of user interfaces described herein. In some embodiments, the computer system includes one or more display generation components (e.g., first and second display assemblies 1-120*a*, 1-120*b* and/or first and second optical modules 11.1.1-104*a* and 11.1.1-104*b*) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120*a*, 1-120*b* and/or first and second optical modules 11.1.1-104*a* and 11.1.1-104*b*), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, the computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, the computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators described in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 1I) that can be used (optionally in conjunction with one or more illuminators such as the illuminators 6-124 described in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 1O) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120*a*, 1-120*b* and/or first and second optical modules 11.1.1-104*a* and 11.1.1-104*b*).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105*a*, 1-105*b* of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105*a* including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105*b* including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105*a* and the second electronic strap 1-105*b*. The straps 1-105*a-b* and band 1-116 can be coupled via connection mechanisms or assemblies 1-114. In at least one example, the second band 1-117 includes a first end 1-146 coupled to the first electronic strap 1-105*a* between the first proximal end 1-134 and the first distal end 1-136 and a second end 1-148 coupled to the second electronic strap 1-105*b* between the second proximal end 1-138 and the second distal end 1-140.

In at least one example, the first and second electronic straps 1-105*a-b* include plastic, metal, or other structural materials forming the shape the substantially rigid straps 1-105*a-b*. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105*a-b* can define internal strap volumes and include one or more electronic components disposed in the internal strap volumes. In one example, as shown in FIG. 1B, the first electronic strap 1-105*a* can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120*a*, 1-120*b* disposed at or in the rearward facing second opening 1-154 defined by the housing 1-150 and/or disposed in the internal volume of the housing 1-150 and configured to project light through the second opening 1-154. In at least one example, each display assembly 1-120*a-b* can include respective display screens 1-122*a*, 1-122*b* configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122*a-b* can be configured to project light in a second, rearward direction opposite the first direction. As noted above, the light seal 1-110 can be configured to block light external to the HMD 1-100 from reaching the user's eyes, including light projected by the forward facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120*a-b*. In at least one example, the curtain 1-124 can be clastic or at least partially elastic.

Any of the features, components, and/or parts, including the arrangements and configurations thereof shown in FIGS. 1B and 1C can be included, either alone or in any combination, in any of the other examples of devices, features, components, and parts shown in FIGS. 1D-IF and described herein. Likewise, any of the features, components, and/or parts, including the arrangements and configurations thereof shown and described with reference to FIGS. 1D-IF can be included, either alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205*a*, 1-205*b*. The first securement strap 1-205*a* can include a first electronic component 1-212*a* and the second securement strap 1-205*b* can include a second electronic component 1-212*b*. In at least one example, the first and second straps 1-205*a-b* can be removably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205*a-b* can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1B, 1C, and 1E-1F and described herein. Likewise, any of the features, components, and/or parts, including the arrangements and configurations thereof shown and described with reference to FIGS. 1B, 1C, and 1E-1F can be included, either alone or in any combination, in the example of the devices, features, components, and parts shown in FIG. 1D.

FIG. 1E illustrates an exploded view of an example of a display unit 1-306 of a HMD. The display unit 1-306 can include a front display assembly 1-308, a frame/housing assembly 1-350, and a curtain assembly 1-324. The display unit 1-306 can also include a sensor assembly 1-356, logic board assembly 1-358, and cooling assembly 1-360 disposed between the frame assembly 1-350 and the front display assembly 1-308. In at least one example, the display unit 1-306 can also include a rear-facing display assembly 1-320 including first and second rear-facing display screens 1-322*a*, 1-322*b* disposed between the frame 1-350 and the curtain assembly 1-324.

In at least one example, the display unit 1-306 can also include a motor assembly 1-362 configured as an adjustment mechanism for adjusting the positions of the display screens 1-322*a-b* of the display assembly 1-320 relative to the frame 1-350. In at least one example, the display assembly 1-320 is mechanically coupled to the motor assembly 1-362, with at least one motor for each display screen 1-322*a-b*, such that the motors can translate the display screens 1-322*a-b* to match an interpupillary distance of the user's eyes.

In at least one example, the display unit 1-306 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322*a-b*.

Any of the features, components, and/or parts, including the arrangements and configurations thereof shown in FIG. 1E can be included, either alone or in any combination, in any of the other examples of devices, features, components, and parts shown in FIGS. 1B-1D and 1F and described herein. Likewise, any of the features, components, and/or parts, including the arrangements and configurations thereof shown and described with reference to FIGS. 1B-1D and 1F can be included, either alone or in any combination, in the example of the devices, features, components, and parts shown in FIG. 1E.

FIG. 1F illustrates an exploded view of another example of a display unit 1-406 of a HMD device similar to other HMD devices described herein. The display unit 1-406 can include a front display assembly 1-402, a sensor assembly

1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420*a*, 1-420*b* of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the front cover assembly 3-1 of the HMD 3-100 shown in FIG. 1G or any other HMD device shown and described herein. The front cover assembly 3-100 shown in FIG. 1G can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 1I. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HDM device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The downward cameras 6-114, for example, can be used to capture facial expressions and movements for the face of the user below the HMD device 6-100, including the checks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin. for hand and body tracking, headset tracking, and facial avatar In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, either alone or in any combination, in any of the other examples of devices, features, components, and parts shown in FIGS. 1J-1L and described herein. Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HDM 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124. These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 11 and 1K-1L and described herein. Likewise, any of the features, components, and/or parts, including the arrangements and configurations thereof shown and described with reference to FIGS. 11 and 1K-1L can be included, either alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 1I-1J and 1L and described herein. Likewise, any of the features, components, and/or parts, including the arrangements and configurations thereof shown and described with reference to FIGS. 1I-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 1I-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, cither alone or in any combination, in any of the other examples of devices, features, components, and parts shown in FIGS. 1I-1K and described herein. Likewise, any of the features, components, and/or parts, including the arrangements and configurations thereof shown and described with reference to FIGS. 1I-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules 11.1.1-104*a-b* slidably engaging/coupled to respective guide-rods 11.1.1-108*a-b* and motors 11.1.1-110*a-b* of left and right adjustment subsystems 11.1.1-106*a-b*. The IPD adjustment system 11.1.1-102 can be coupled to a bracket 11.1.1-112 and include a button 11.1.1-114 in electrical communication with the motors 11.1.1-110*a-b*. In at least one example, the button 11.1.1-114 can electrically communicate with the first and second motors 11.1.1-110*a-b* via a processor or other circuitry components to cause the first and second motors 11.1.1-110*a-b* to activate and cause the first and second optical modules 11.1.1-104*a-b*, respectively, to change position relative to one another.

In at least one example, the first and second optical modules 11.1.1-104*a-b* can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104*a-b* to match the inter-pupillary distance of the user's eyes. The optical modules 11.1.1-104*a-b* can also include one or more cameras or other sensors/sensor systems for imaging and measuring the IPD of the user such that the optical modules 11.1.1-104*a-b* can be adjusted to match the IPD.

In one example, the user can manipulate the button 11.1.1-114 to cause an automatic positional adjustment of the first and second optical modules 11.1.1-104*a-b*. In one example, the user can manipulate the button 11.1.1-114 to cause a manual adjustment such that the optical modules 11.1.1-104*a-b* move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104*a-b* via the motors 11.1.1-110*a-b* is provided by an electrical power source. In one example, the adjustment and movement of the optical modules 11.1.1-104*a-b* via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106*a*, 11.1.2-106*b*. The apertures 11.1.2-106*a-b* are shown in dotted lines in FIG. 1N because a view of the apertures 11.1.2-106*a-b* can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106*a-b*.

The mounting bracket 11.1.2-108 can include a middle or central portion 11.1.2-109 coupled to the inner frame 11.1.2-104. In some examples, the middle or central portion 11.1.2-

109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106*a-b* such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110*a-f*. Each sensor of the plurality of sensors 11.1.2-110*a-f* can include various types of sensors, including cameras, IR sensors, and so forth. In some examples, one or more of the sensors 11.1.2-110*a-f* can be used for object recognition in three-dimensional space such that it is important to maintain a precise relative position of two or more of the plurality of sensors 11.1.2-110*a-f*. The cantilevered nature of the mounting bracket 11.1.2-108 can protect the sensors 11.1.2-110*a-f* from damage and altered positioning in the case of accidental drops by the user. Because the sensors 11.1.2-110*a-f* are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110*a-f* coupled/mounted to the mounting bracket 11.1.2-108.

Any of the features, components, and/or parts, including the arrangements and configurations thereof shown in FIG. 1N can be included, cither alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 1O illustrates an example of an optical module 11.3.2-100 for use in an electronic device such as an HMD, including HDM devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned. The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 1O can be replicated in another (e.g., second) optical module disposed with the HMD to interact (e.g., project light and capture images) of another eye of the user.

Any of the features, components, and/or parts, including the arrangements and configurations thereof shown in FIG. 1O can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, either alone or in any combination, in the example of the devices, features, components, and parts shown in FIG. 1O.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

Figure 2:
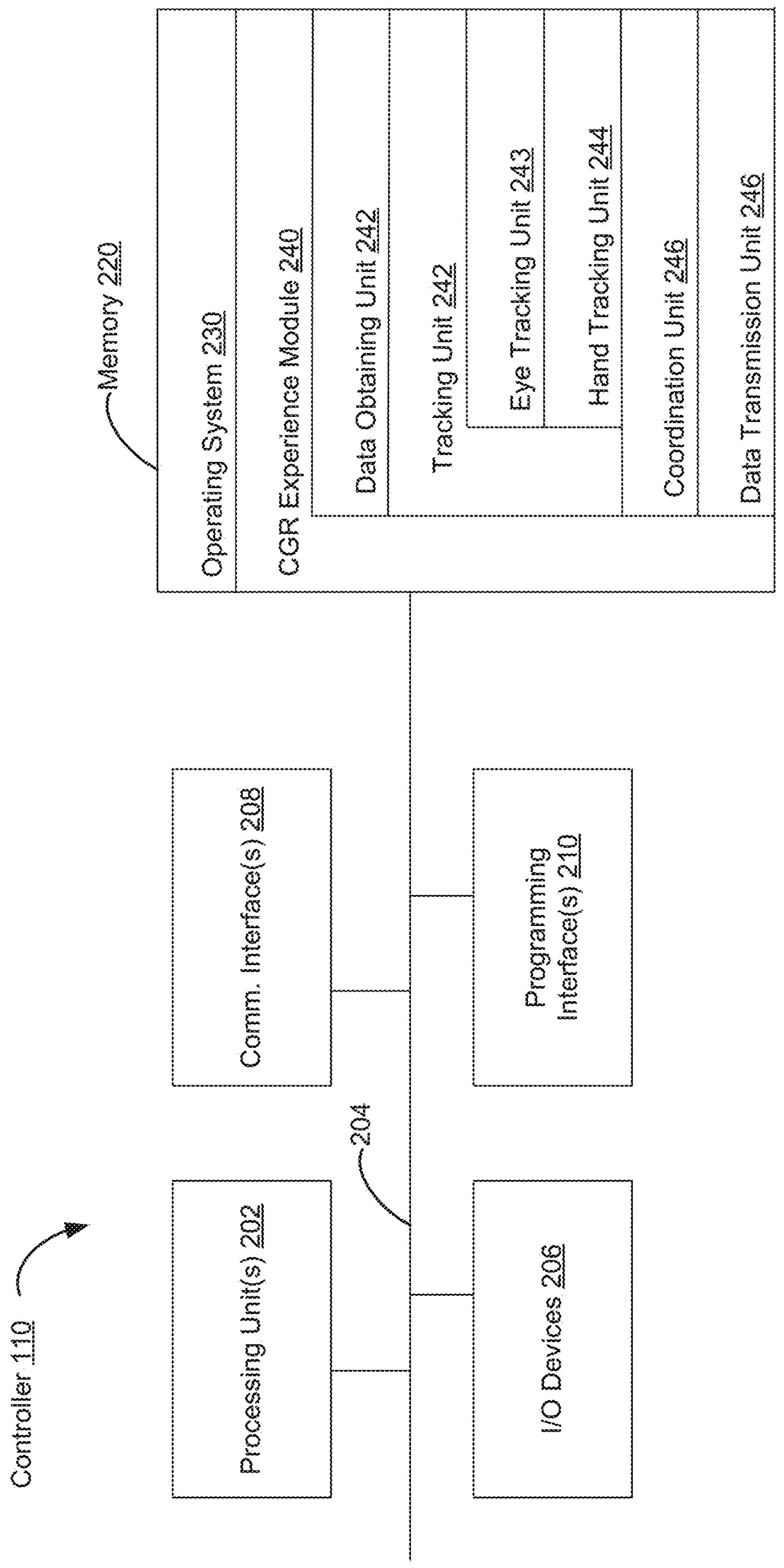
FIG. 2 is a block diagram illustrating a controller of a computer system that is configured to manage and coordinate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
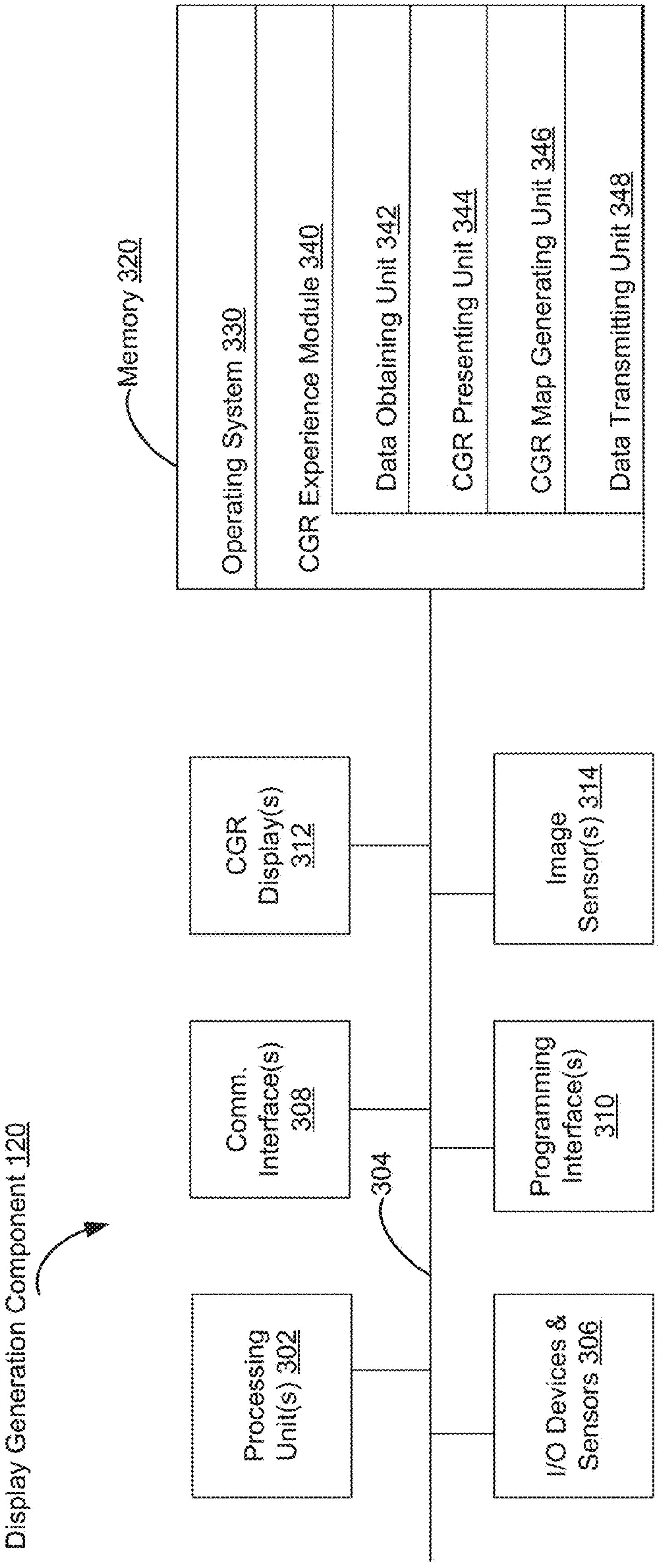
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1A), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
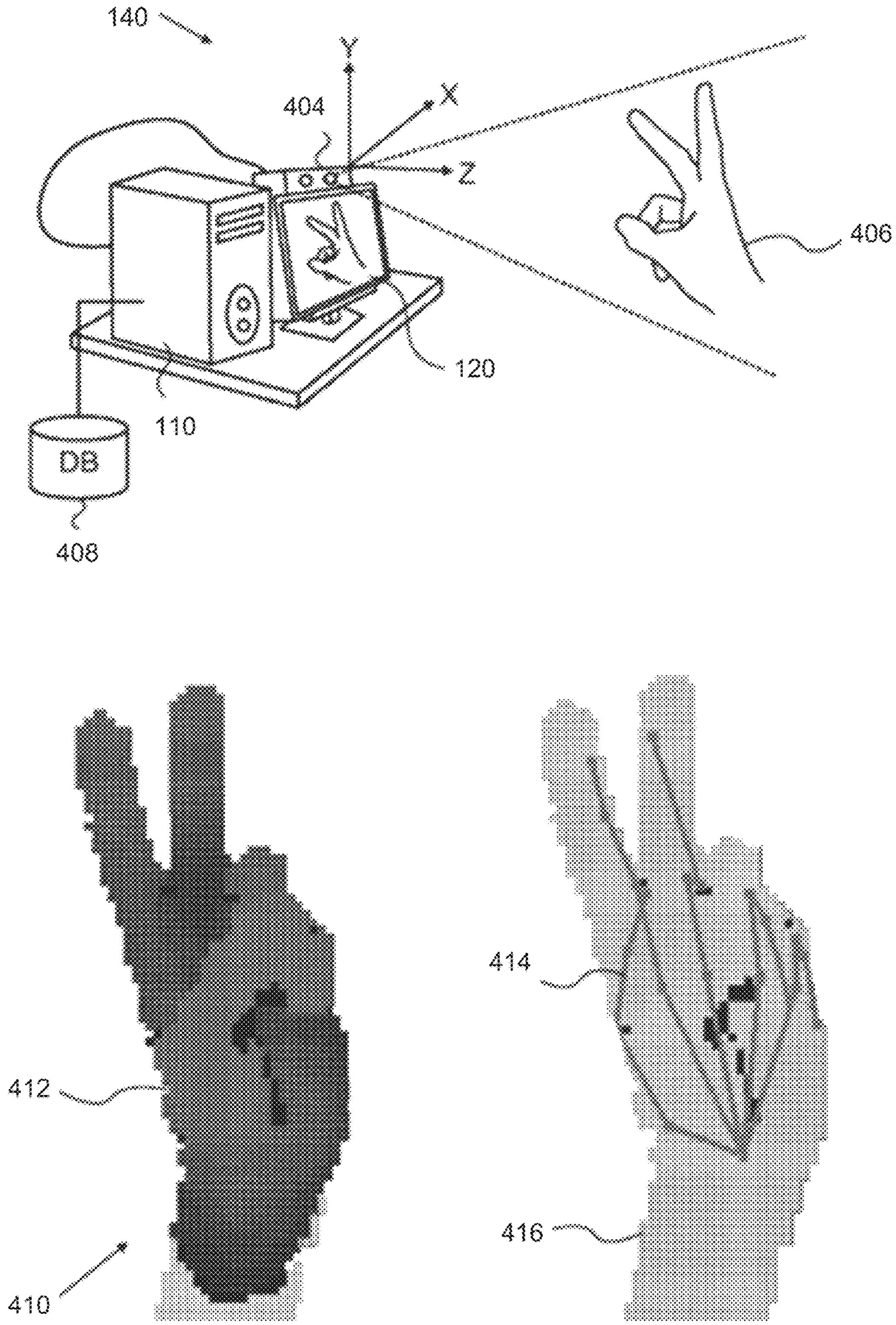
FIG. 4 is a block diagram illustrating a hand tracking unit of a computer system that is configured to capture gesture inputs of the user in accordance with some embodiments.

FIG. 4 is a schematic, pictorial illustration of an example embodiment of the hand tracking device 140. In some embodiments, hand tracking device 140 (FIG. 1A) is controlled by hand tracking unit 244 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user. User inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, where the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag (e.g., an air drag gesture or an air swipe gesture) could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
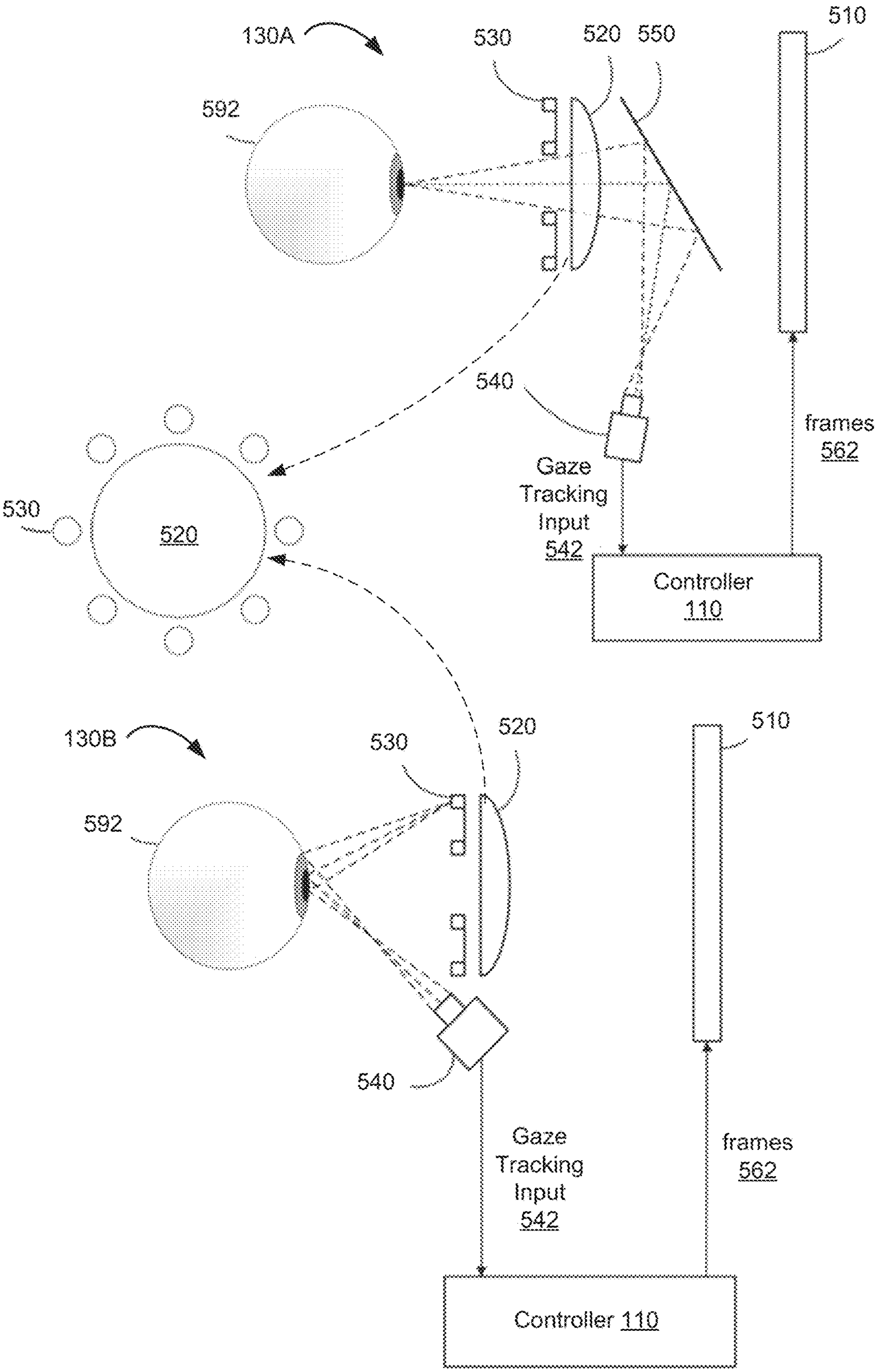
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., illumination sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight illumination sources 530 (e.g., LEDs) are arranged around each lens 520 as an example. However, more or fewer illumination sources 530 may be used, and other arrangements and locations of illumination sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
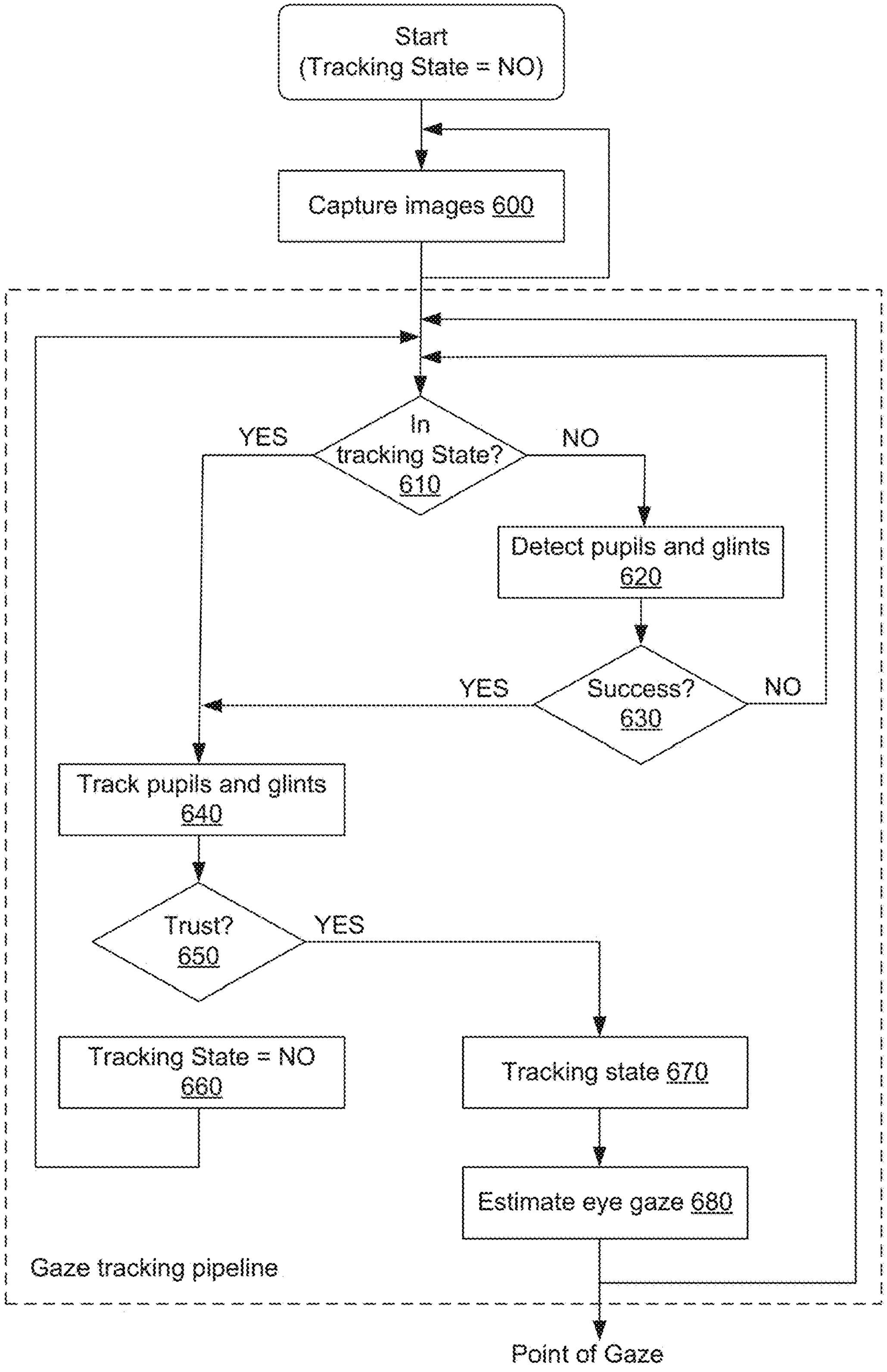
FIG. 6 is a flowchart illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1A and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or cameras.

FIGS. 7A-7D illustrate examples of a computer system changing a level of detail with which a respective environment is being displayed based on a number of application user interfaces that are being displayed concurrently with the respective environment in accordance with some embodiments.

Figure 7A:
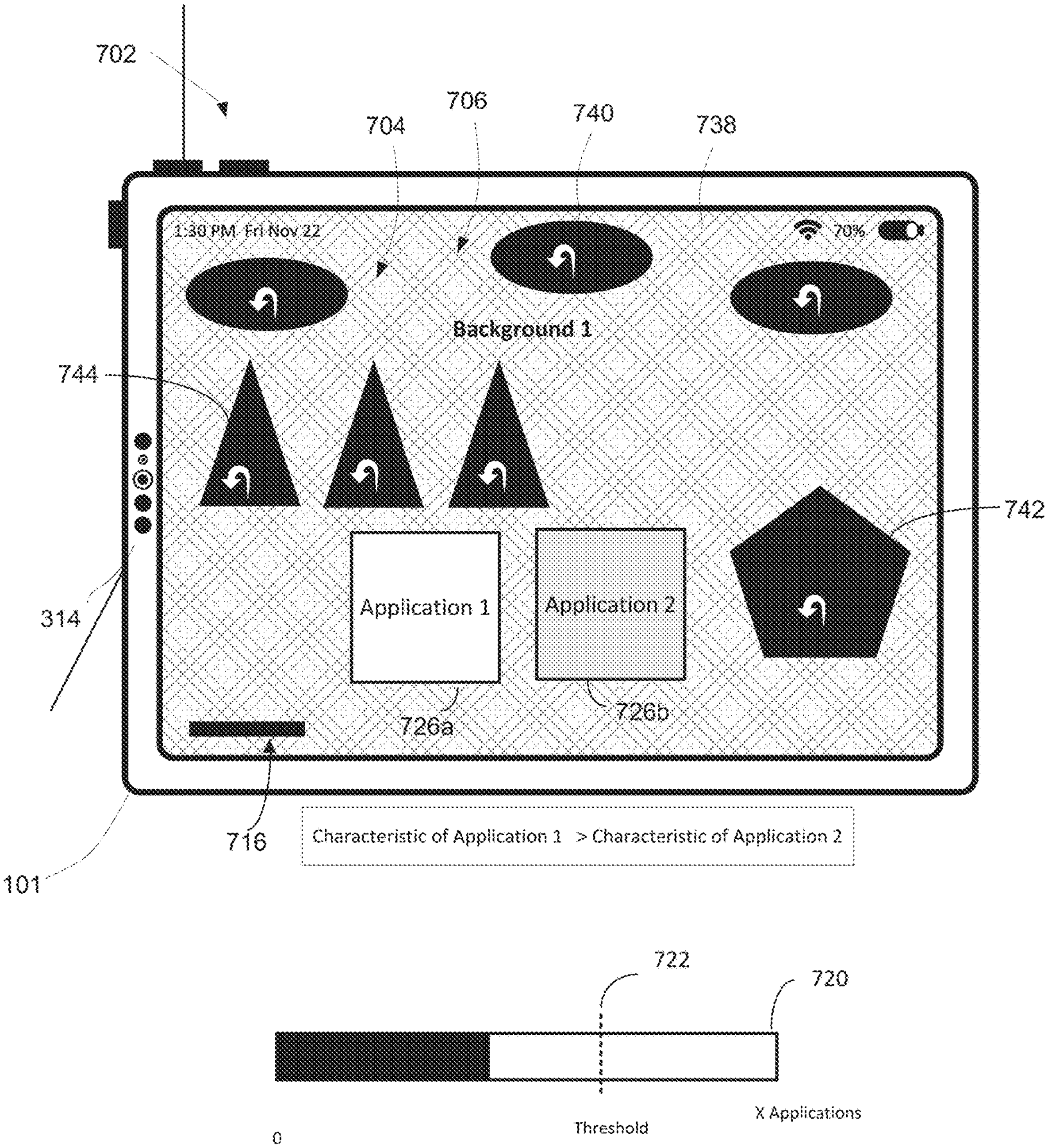
FIGS. 7A-7D illustrate examples of a computer system changing a level of detail with which a respective environment is being displayed based on a number of application user interfaces that are being displayed concurrently with the respective environment in accordance with some embodiments.

FIG. 7A illustrates a computer system 101 (e.g., an electronic device) displaying, via a display generation component (e.g., display generation component 120 of FIG. 1), a three-dimensional environment 704 from a viewpoint of a user of the computer system 101 (e.g., facing the back wall of the physical environment in which computer system 101 is located). In some embodiments, the computer system 101 includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or attention (e.g., including gaze) of the user (e.g., internal sensors facing inwards towards the face of the user).

In some embodiments, the computer system 101 captures one or more images of a physical environment around computer system 101 (e.g., operating environment 100), including one or more objects in the physical environment around computer the system 101. In some embodiments, the computer system 101 displays representations of the physical environment in the three-dimensional environment or portions of the physical environment are visible via the display generation component 120 of computer system 101. In some embodiments, a respective environment, optionally a simulated three-dimensional environment (e.g., virtual environment), is displayed in three-dimensional environment, optionally concurrently with the representation of a physical environment or optionally instead of the representations of the physical environment.

As shown in FIG. 7A, the computer system 101 is displaying a respective environment 706 in the three-dimensional environment 704 instead of the representations of a physical environment 702 (e.g., full immersion). In FIG. 7A, the computer system 101 is displaying an immersion level indicator 716. In some embodiments, the immersion level indicator 716 indicates the current level of immersion (e.g., out of a maximum number of levels of immersion) with which computer system 101 is displaying the three-dimensional environment 704. In some embodiments, a level of immersion includes an amount of view of the physical environment that is obscured (e.g., replaced) by the respective environment 706. In FIG. 7A, the immersion level indicator 716 indicates full immersion; thus, the physical environment is fully replaced by the respective environment 706. In some embodiments, the computer system does not display an immersion level indicator in the three-dimensional environment.

As shown in FIG. 7A, the respective environment 706 is Background 1. Some examples of Background 1 include a desert background, a mountain background, a beach background, a sports event background, and so forth. In some embodiments, the respective environment 706 is based on a physical location. In some embodiments, the respective environment 706 is an artist-designed location or a simulated physical space. Thus, displaying the respective environment 706 in the three-dimensional environment 704 provides the user with a virtual experience as if the user is physically located in the respective environment 706. In FIG. 7A, the respective environment 706 corresponding to Background 1 includes ambient elements 738, 740, 742, and 744 such as a virtual sky, virtual clouds, a virtual animal, and virtual trees.

In some embodiments, the three-dimensional environment 704 includes virtual content, such as application user interfaces. For example, the virtual content optionally includes user interfaces for a messaging application, a content browsing application, a media playback application, and so forth as described with reference to method 800. As shown in FIG. 7A, the computer system displays application user interfaces 726*a* and 726*b* concurrently with the respective environment 706. In some embodiments, the computer system 101 displays the respective environment 706 with a decreased level of detail when at least one application user interface is displayed concurrently with the respective environment 706 compared to no application user interfaces displayed concurrently with the respective environment 706. In some embodiments, the computer system 101 increases or decreases the level of detail at which it displays the respective environment 706 based on an increase or a decrease in the number of application user interfaces displayed concurrently with the respective environment 706. As described with reference to method 800, the level of detail at which to display the respective environment 706 corresponds to a number of animations of virtual content to display in the respective environment, types of animations to display in the respective environment, resolution associated with the animations to display in the respective environment, and/or frame rate associated with the animations to display in the respective environment.

As shown in FIG. 7A, the ambient elements 738, 740, 742, and 744 displayed in the respective environment 706 are animated as illustrated by the curved arrows. Animation of the ambient elements 740, 742, and 744 optionally depends on whether the number of application user interfaces displayed concurrently with the respective environment 706 exceeds a threshold number of application user interfaces (e.g., 1, 2, 3, 4, 5, 10, 20, 50, or 100 application user interfaces). In FIG. 7A, the number of application user interfaces (e.g., two application user interfaces) displayed concurrently with the respective environment 706 does not exceed the threshold number of application user interfaces as illustrated by threshold 722 of application user interfaces indicator 720. However, the number of application user interfaces (e.g., as indicated by X applications in FIG. 7A) displayed is optionally greater than the threshold number of application user interfaces. Additionally or alternatively, the computer system 101 optionally changes the level of detail at which to display the respective environment 706 based on whether the application user interfaces displayed concurrently with the respective environment 706 are active (e.g., currently used by the user and/or actively consuming resources). In FIG. 7A, application user interface 726*a* is currently active while application user interface 726*b* is not active (as illustrated by the shading). In some embodiments, the computer system maintains a characteristic (e.g., a frame rate or a pixel density) of the application user interface 726*a* at a higher level than a characteristic (e.g., a frame rate or a pixel density) of the respective environment 706 because the application user interface 726*a* is active as described with reference to method 800. Conversely, in some embodiments, the computer system maintains a characteristic (e.g., a frame rate or a pixel density) of the application user interface 726*b* at a lower level than the characteristic (e.g., the frame rate or the pixel density) of the respective environment 706 because the application user interface 726*b* is not active. In some embodiments, the computer system 101 maintains the characteristic (e.g., a frame rate or a pixel density) of the application user interface 726*a* at a higher level than the characteristic (e.g., a frame rate or a pixel density) of the application user interface 726*b* because the application user interface 726*a* is active but the application user interface 726*b* is not active.

Figure 7B:
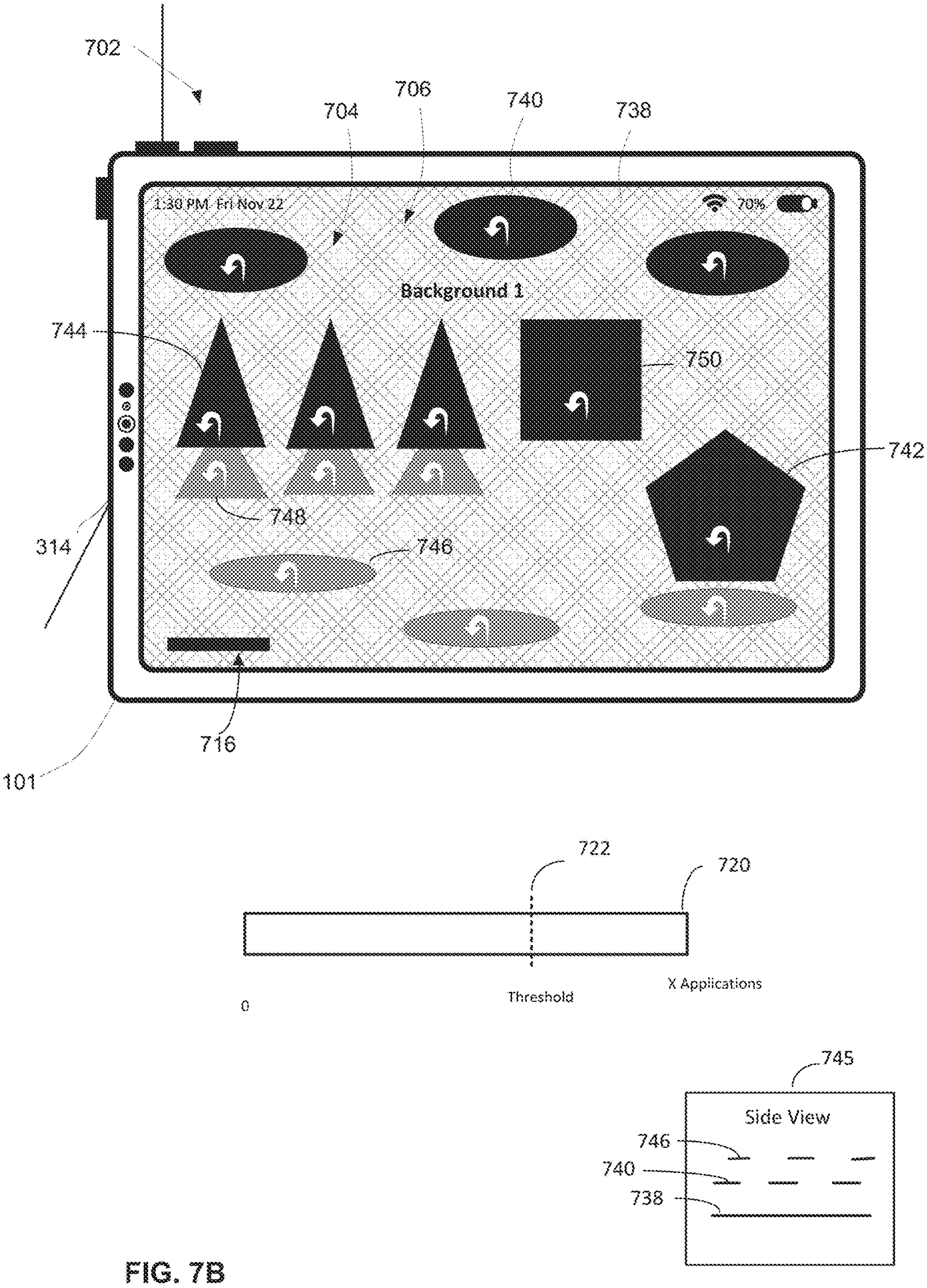

In some embodiments, the computer system 101 receives user input corresponding to a request to cease display of all application user interfaces (e.g., two application user interfaces from FIG. 7A). In some embodiments, in response to not detecting attention of a user directed towards the displayed application user interface interfaces (e.g., two application user interfaces from FIG. 7A) for longer than a threshold amount of time (e.g., 10 min, 30 min, 1 hr, 5 hr, or 24 hr), the computer system ceases display of the application user interfaces. Accordingly, in FIG. 7B, the computer system 101 displays zero application user interfaces concurrently with the respective environment 706. Because the number of application user interfaces displayed has decreased from FIG. 7A to FIG. 7B, the computer system 101 increases the level of detail of the respective environment 706 from FIG. 7A to FIG. 7B. In some embodiments, increasing the level of detail of the respective environment 706 include increasing a frame rate of the respective environment 706, a pixel density of the respective environment 706, a number of animations displayed in the respective environment 706, a frame rate of animations displayed in the respective environment 706, a number of ambient elements (e.g., ambient elements 738, 740, 742, and 744 corresponding to a virtual sky, virtual clouds, a virtual animal, and virtual trees) displayed in the respective environment 706, and/or a pixel density of the ambient elements displayed in the respective environment 706 as described in detail with reference to method 800. In some embodiments, if no application user interfaces are displayed concurrently with the respective environment 706, then the computer system 101 displays the respective environment 706 with a maximum level of detail. Accordingly, the computer system 101 displays the respective environment 706 with a maximum level of detail in FIG. 7B by displaying ambient elements 738, 740, 742, and 744 (corresponding to a virtual sky, virtual clouds, a virtual animal, and virtual trees) from FIG. 7A and additional ambient elements 746, 748, and 750 not displayed in FIG. 7A. As illustrated in FIG. 7B, additional ambient elements 746 and 748 are virtual shadows (e.g., virtual cloud shadows 746 and virtual tree shadows 748). As an example, additional ambient element 750 corresponds to virtual water. In some embodiments, as described with reference to method 800, a distortion effect (e.g., rippling effect) is applied to the ambient element 750 (e.g., virtual water) based on changes in the ambient elements and/or other content displayed in the respective environment 706. For example, changing an animation of simulated wind in the respective environment optionally changes distortion (e.g., rippling or other textural movement effect) of the virtual water displayed in the respective environment (e.g., increased rippling effect in the virtual water with increased simulated wind or decreased rippling effect in the virtual water with decreased simulated wind). In addition to the increase in the number of ambient elements displayed from FIG. 7A to FIG. 7B, each of the ambient elements 738, 740, 742, 744, 746, 748, and 750 are animated in FIG. 7B (as indicated by the curved arrows).

FIG. 7A1 illustrates similar and/or the same concepts as those shown in FIG. 7A (with many of the same reference numbers). It is understood that unless indicated below, elements shown in FIG. 7A1 that have the same reference numbers as elements shown in FIGS. 7A-7D have one or more or all of the same characteristics. FIG. 7A1 includes computer system 101, which includes (or is the same as) display generation component 120. In some embodiments, computer system 101 and display generation component 120 have one or more of the characteristics of computer system 101 shown in FIGS. 7A and 7A-7D and display generation component 120 shown in FIGS. 1 and 3, respectively, and in some embodiments, computer system 101 and display generation component 120 shown in FIGS. 7A-7D have one or more of the characteristics of computer system 101 and display generation component 120 shown in FIG. 7A1.

In FIG. 7A1, display generation component 120 includes one or more internal image sensors 314*a* oriented towards the face of the user (e.g., eye tracking cameras 540 described with reference to FIG. 5). In some embodiments, internal image sensors 314*a* are used for eye tracking (e.g., detecting a gaze of the user). Internal image sensors 314*a* are optionally arranged on the left and right portions of display generation component 120 to enable eye tracking of the user's left and right eyes. Display generation component 120 also includes external image sensors 314*b* and 314*c* facing outwards from the user to detect and/or capture the physical environment and/or movements of the user's hands. In some embodiments, image sensors 314*a*, 314*b*, and 314*c* have one or more of the characteristics of image sensors 314 described with reference to FIGS. 7A-7D.

In FIG. 7A1, display generation component 120 is illustrated as displaying content that optionally corresponds to the content that is described as being displayed and/or visible via display generation component 120 with reference to FIGS. 7A-7D. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 7A1.

Display generation component 120 has a field of view (e.g., a field of view captured by external image sensors 314*b* and 314*c* and/or visible to the user via display generation component 120, indicated by dashed lines in the overhead view) that corresponds to the content shown in FIG. 7A1. Because display generation component 120 is optionally a head-mounted device, the field of view of display generation component 120 is optionally the same as or similar to the field of view of the user.

In FIG. 7A1, the user is depicted as performing an air pinch gesture to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 7A-7D.

In some embodiments, computer system 101 responds to user inputs as described with reference to FIGS. 7A-7D.

In the example of FIG. 7A1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 7A-7D and/or described with reference to the corresponding method(s) are optionally implemented on computer system 101 and display generation unit 120 in a manner similar or analogous to that shown in FIG. 7A1.

In some embodiments, changing the level of detail of the respective environment 706 (e.g., increasing the level of detail in FIG. 7B) includes changing the level of detail of a simulated sky with a flow map as described in detail with respect to method 800. The flow map optionally includes at least two layers of virtual content corresponding the simulated sky. FIG. 7B illustrates a side view 745 of the simulated sky to illustrate the different layers of the simulated sky and relative locations of the layers. As illustrated in the side view 745, the flow map for the simulated sky includes a layer for a virtual sky (represented by ambient element 738), a layer for virtual clouds (represented by ambient elements 740), and a layer for virtual cloud shadows (represented by ambient elements 746). In some embodiments, the computer system 101 changes one or more or each of the layers corresponding to the simulated sky with the same level of detail when changing the level of detail of the respective environment 706. In some embodiments, the computer system each of the layers corresponding to the simulated sky with different levels of detail when changing the level of detail of the respective environment 706 as described in detail with respect to method 800. For example, the computer system 101 optionally controls movement, content, and/or the level of detail corresponding to one or more or each of the layers corresponding to the simulated sky, separately and/or independently.

Figure 7C:
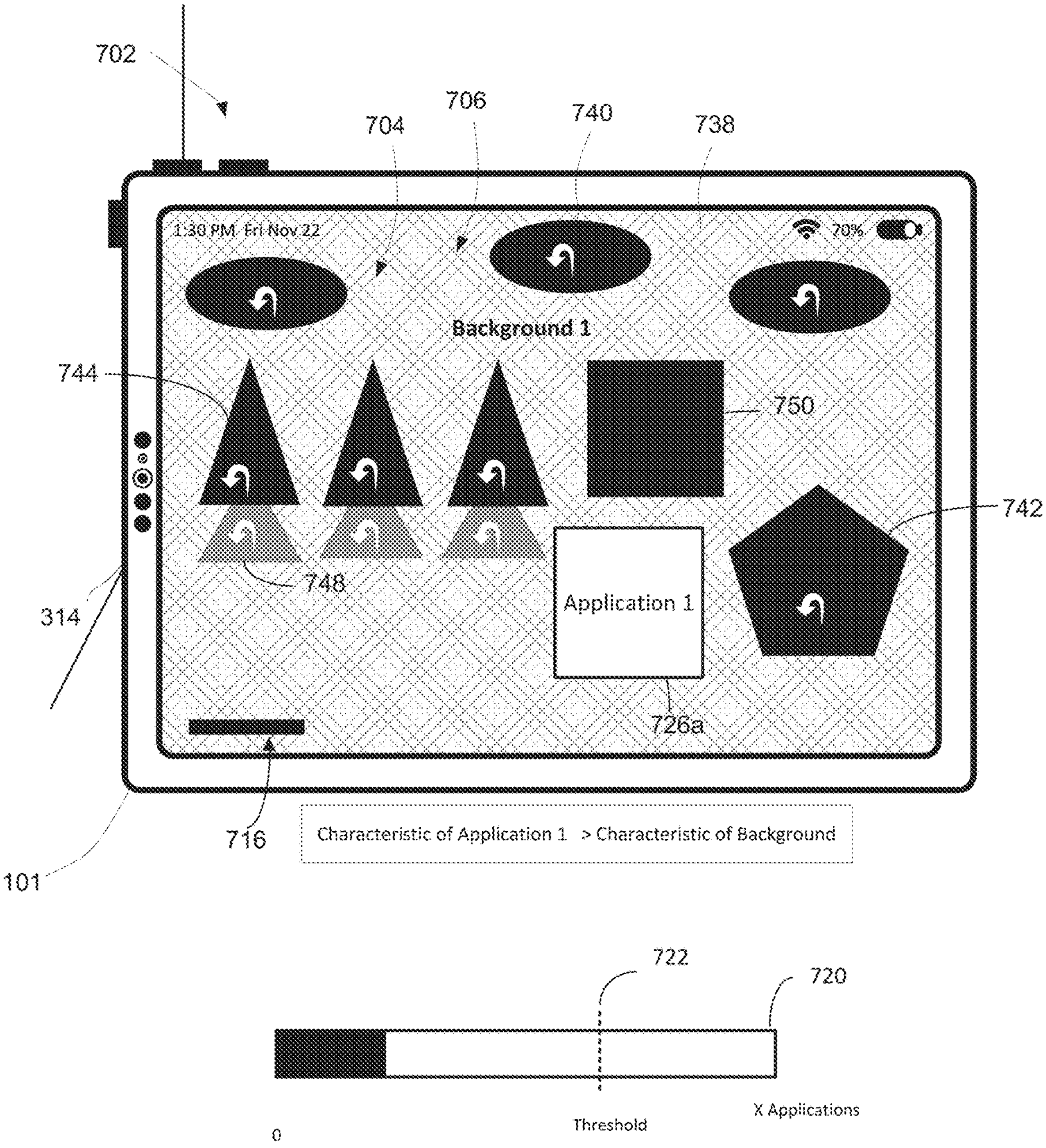

From FIG. 7B to FIG. 7C, the computer system 101 optionally receives user input corresponding to a request to display an application user interface. Accordingly, in FIG. 7C, the computer system 101 displays the application user interface 726*a* concurrently with the respective environment 706. Despite the computer system 101 displaying the application user interface 726*a*, the number of application user interfaces displayed concurrently with the respective environment 706 does not exceed the threshold number of application user interfaces as illustrated by threshold 722 of application user interfaces indicator 720. However, because the number of application user interfaces displayed has increased from FIG. 7B to FIG. 7C, the computer system 101 decreases the level of detail of the respective environment 706 from FIG. 7B to FIG. 7C. In some embodiments, decreasing the level of detail of the respective environment 706 include decreasing a frame rate of the respective environment 706, a pixel density of the respective environment 706, a number of animations displayed in the respective environment 706, a frame rate of animations displayed in the respective environment 706, a number of ambient elements (e.g., ambient elements 738, 740, 742, and 744 corresponding to a virtual sky, virtual clouds, a virtual animal, and virtual trees) displayed in the respective environment 706, and/or a pixel density of the ambient elements displayed in the respective environment 706 as described in detail with reference to method 800. In some embodiments, if at least one application user interface, such as application user interface 726*a* is displayed concurrently with the respective environment 706, then the respective environment 706 is displayed with less detail than if no application user interfaces are displayed. Accordingly, the computer system 101 displays the respective environment 706 with a decreased level of detail in FIG. 7C by ceasing display of some or all ambient elements and respective animations all together or ceasing animation for some or all ambient elements displayed in the respective environment 706 as described with respect to method 800. As illustrated in FIG. 7C, ambient elements 748 and 750 respectively corresponding to virtual tree shadows and the virtual water are not animated. In FIG. 7C, while the computer system 101 maintains display of some ambient elements based on simulated light, such as ambient elements 748 (e.g., virtual tree shadows), the computer system 101 ceases display of some ambient elements based on simulated light, such as ambient elements 746 (e.g., virtual cloud shadows from FIG. 7B), and respective animations. However, the computer system 101 maintains animation for ambient elements 738, 740, 742, 744, and 748 respectively corresponding to the virtual sky, the virtual clouds, the virtual animal, the virtual trees, and the virtual tree shadows from FIG. 7B to FIG. 7C. Further, because the application user interface 726*a* is active, the computer system 101 maintains a characteristic (e.g., a frame rate or a pixel density) of the application user interface 726*a* at a higher level than a characteristic (e.g., a frame rate or a pixel density) of the respective environment 706.

Figure 7D:
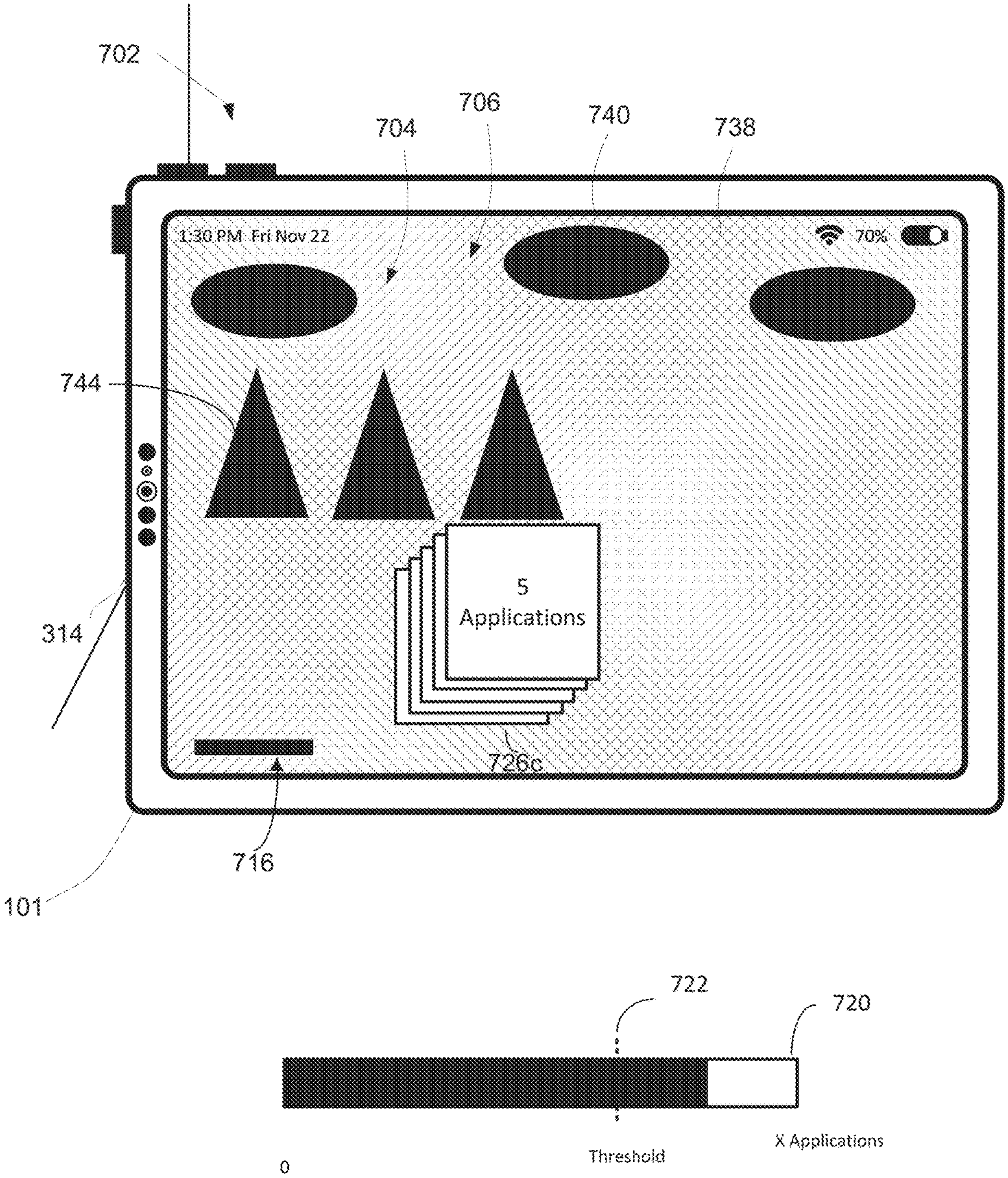

In FIG. 7D, the computer system 101 optionally maintains display of the application user interface from FIG. 7C and receives user input corresponding to a request to display additional application user interfaces. In FIG. 7D, the computer system 101 optionally receives user input corresponding to a request to cease display of the application user interface from FIG. 7B and instead display new application user interfaces. In FIG. 7D, the computer system 101 displays five application user interfaces 726*c* concurrently with the respective environment 706. As illustrated by the threshold 722 of application user interfaces indicator 720, the number of application user interfaces displayed concurrently with the respective environment 706 exceeds the threshold number of application user interfaces (e.g., four application user interfaces). In some embodiments, the computer system 101 ceases to display some or all ambient elements if the number of application user interfaces displayed exceeds the threshold number of application user interfaces (optionally, maintaining display of some ambient elements). As illustrated in FIG. 7D, the computer system 101 decreases the level of detail of the respective environment 706 from FIG. 7C by ceasing to display ambient elements 740, 742, 746, 748, and 750 from FIG. 7C. Additionally or alternatively, the computer system 101 ceases to display animations for some or all ambient elements if the number of application user interfaces displayed exceeds the threshold number of application user interfaces. As illustrated in FIG. 7D, the computer system ceases animation for all ambient elements such as ambient elements 738, 740, and 744 displayed in the respective environment 706. In some embodiments, the computer system 101 resumes animation of some or all ambient elements if the number of application user interfaces displayed is reduced to being within the threshold number of application user interfaces as described in detail with reference to method 800.

FIGS. 7E-7J illustrate examples of displaying simulated clouds and/or background elements in an environment, such as the environments described with reference to FIGS. 7A-7D.

Figure 7E:
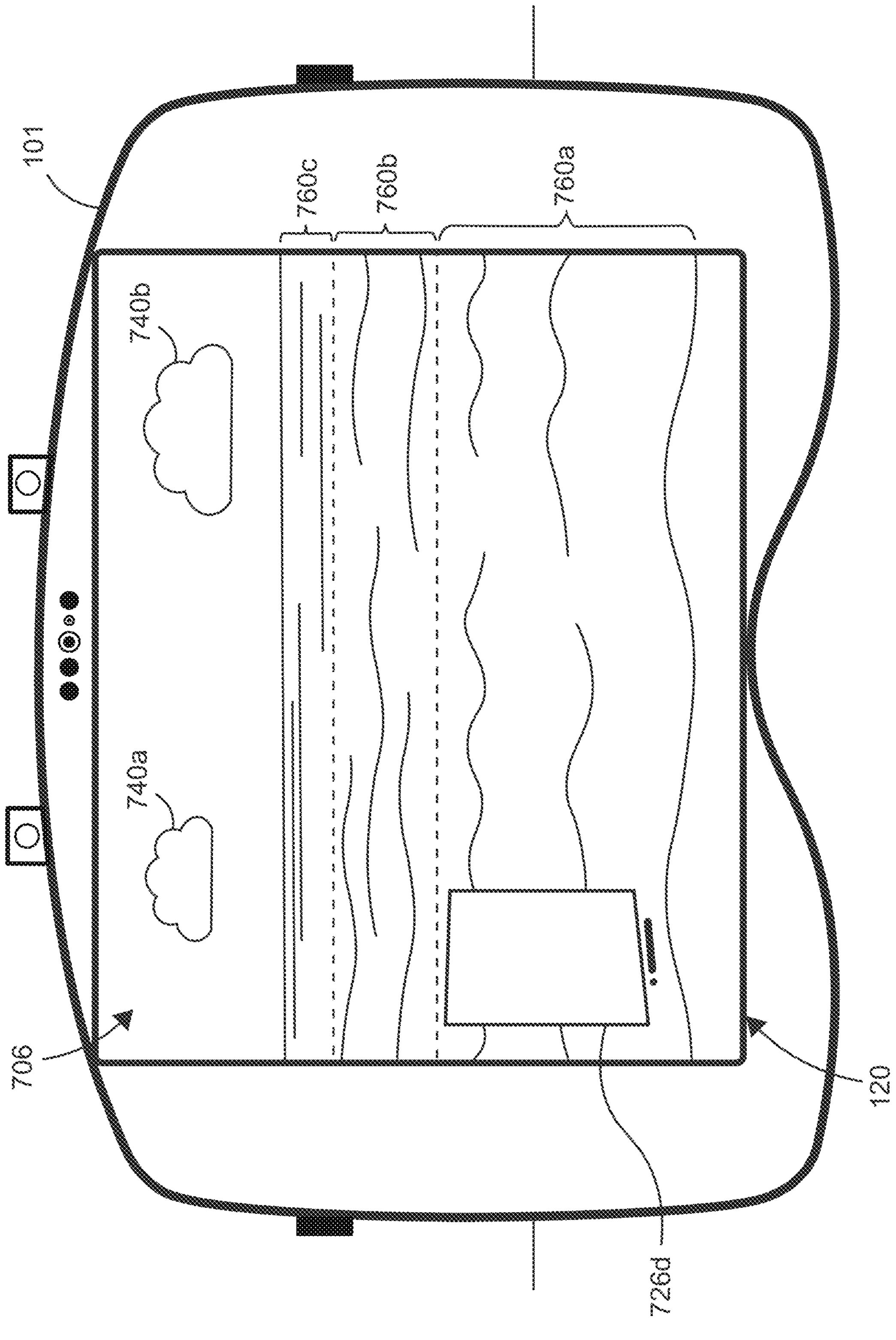
FIGS. 7E-7J illustrate examples of displaying simulated clouds and/or background elements in an environment in accordance with some embodiments.

In FIG. 7E, three-dimensional environment 706 is visible via display generation component 120 of computer system 101. Environment 706 optionally has one or more of the characteristics of the environments of FIGS. 7A-7D. Environment 706 in FIGS. 7E-7J optionally includes user interface element 726*d*, corresponding to one or more of user interface(s) 726*a-c*. Environment 706 in FIG. 7E includes simulated clouds 740*a* and 740*b* (e.g., corresponding to ambient elements 738, 740, 742, and/or 744) in a simulated or real sky, simulated water (e.g., of a simulated ocean) corresponding to illustrated portions 760*a*, 706*b* and 760*c*, and/or simulated sand (e.g., of a simulated beach) corresponding to the portion of environment 706 below/in front of portion 760*a*. In some embodiments, user interface element 726*d* is displayed in front of or overlapping one or more portions of environment 706, as illustrated in FIG. 7E.

In some embodiments, in order to reduce computing resources needed to display environment 706, computer system 101 displays one or more portions of environment 706 in ways that will be described with reference to FIGS. 7E-7J. For example, in the case of the simulated water, computer system 101 optionally displays portion 760*a* of simulated water (e.g., the portion of the simulated water that is closest to the viewpoint of the user) with a relatively high level or quality of animation detail, portion 760*b* of simulated water (e.g., the portion of the simulated water that is further than portion 760*a* but closer than portion 760*c* to the viewpoint of the user) with a moderate level or quality of animation detail, and portion 760*c* (e.g., the portion of the simulated water that is furthest from the viewpoint of the user) with a relatively low level or quality of animation detail, or no animation at all. For example, the animations described above optionally correspond to the animation of the ripples on the surface of the simulated water. The relatively high level of animation detail optionally includes utilizing relatively high resolution elements for portion 760*a*, relatively high numbers of elements that are animated in portion 760*a* and/or relatively high frequency of animation of the elements in portion 760*a*. Analogously, the relative moderate level of animation detail optionally includes utilizing relatively moderate resolution elements for portion 760*a*, relatively moderate numbers of elements that are animated in portion 760*a* and/or relatively moderate frequency of animation of the elements in portion 760*a*.

Figure 7F:
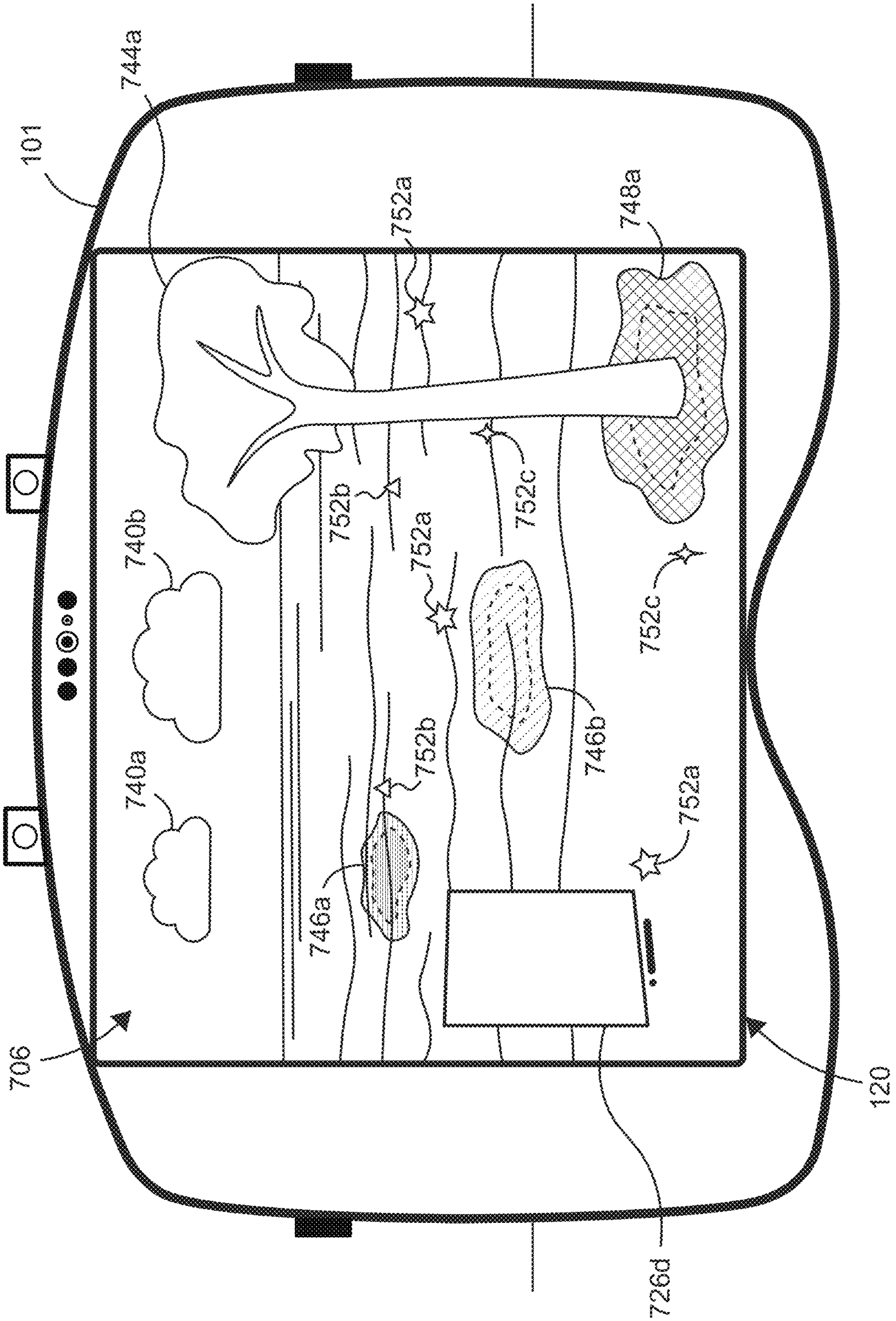

In some embodiments, computer system 101 displays simulated shadows in environment 706, such as shown in FIG. 7F. In FIG. 7F, environment 706 includes simulated shadow 746*a* cast by simulated cloud 740*a*, simulated shadow 746*b* cast by simulated cloud 740*b*, and simulated shadow 748*a* cast by simulated tree 744*a*. As indicated by the dashed-line regions of the simulated shadows, in some embodiments, the texture(s) displayed by computer system 101 as the visual appearance of the simulated shadows is optionally variable across a given shadow. For example, the central region of simulated shadow 746*a* optionally has higher or lower visual prominence (e.g., opacity, diffusivity, color and/or brightness) than the outer region of simulated shadow 746*a*. In some embodiments, the visual prominence of a given simulated shadow varies (optionally smoothly) from the center point of the given shadow to the edge of the given shadow. In some embodiments, the visual appearances of shadows 746*b* and 748*a* have one or more of the above characteristics as well.

The texture (e.g., colors, the brightness, the contours, the reflectivity, and/or the opacity) used to display a given simulated shadow is optionally different depending on what part of environment 706 on which the simulated shadow is displayed. For example, simulated shadow 746*a* in FIG. 7F is optionally displayed on water with a relatively large simulated depth, and therefore is displayed with a texture having a first visual appearance, which is optionally different from the visual appearance of the texture of simulated shadow 746*b*, which is optionally displayed on a portion of the simulated water that has a relatively small simulated depth. Simulated shadow 748*a* optionally has a texture with an appearance that is different from that of simulated shadow 746*a* and/or simulated shadow 746*b*, because simulated shadow 748*a* is displayed on simulated sand in environment 706. Additional details about the visual appearance of the texture of a simulated shadow are provided with reference to method 2100.

In FIG. 7F, computer system 101 is also displayed simulated lighting effects, such as simulated reflections or glints 752, on various surfaces in environment 706. For example, computer system 101 is displaying simulated reflections 752*a*, 752*b* and 752*c* on the surface of the simulated water and the simulated sand. Simulated reflections 752*a* optionally have different visual appearances than simulated reflections 752*b*, which optionally have different visual appearances than simulated reflections 752*c*. The visual appearances of simulated reflections 752*a*, 752*b* and 752*c* are optionally based on characteristics of the lighting sources that are the sources of simulated light for the reflections and/or the portions of environment 706 on which the simulated reflections are displayed. Additional details about the visual appearances of simulated reflections are provided with reference to method 2100.

Figure 7G:
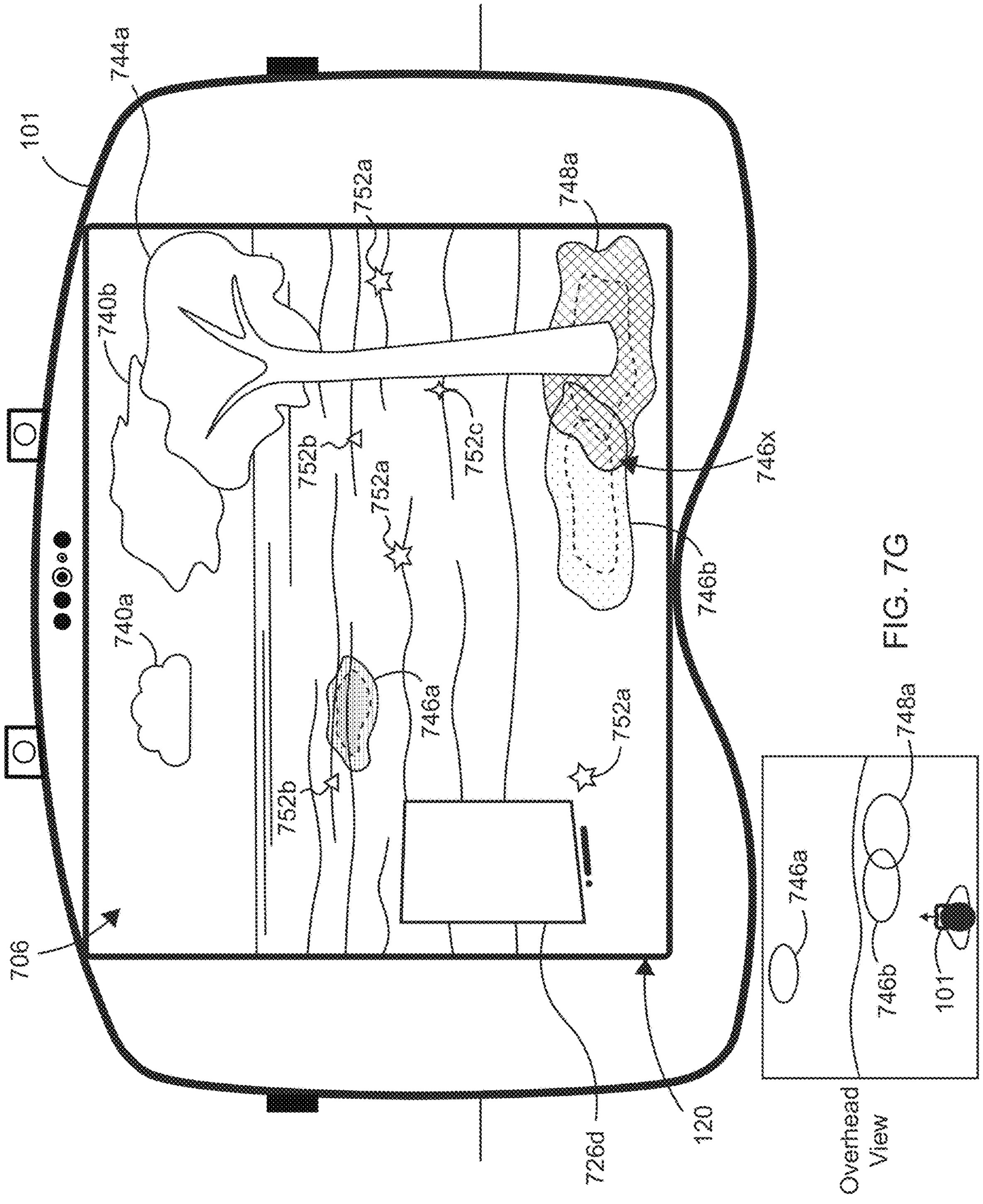

From FIG. 7F to 7G, simulated clouds 740*a* and 740*b* have moved relative to environment 706. Further, simulated cloud 740*b* has changed size and/or shape. As a result, in FIG. 7G, computer system 101 display simulated shadow 746*a* move to the right in environment 706. By moving to the right, simulated shadow 746*a* causes a simulated reflection 752*b* that was displayed in FIG. 7F to cease to be displayed in FIG. 7G (e.g., because simulated shadow 746*a* occupies the area in which simulated reflection 752*b* was displayed in FIG. 7F), and causes a simulated reflection 752*b* that was not displayed in FIG. 7F to be displayed in FIG. 7G (e.g., because simulated shadow 746*a* no longer occupies the area in which simulated reflection 752*b* is displayed in FIG. 7G).

Because simulated cloud 740*b* has changed size and/or shape in FIG. 7G, simulated shadow 746*b* corresponding to simulated cloud 740*b* has also correspondingly changes size and/or shape in FIG. 7G. Further, simulated cloud 740*b* has moved to the right and towards the viewpoint of the user from FIG. 7F to FIG. 7G, and therefore simulated shadow 746*b* has correspondingly moved to the right and towards the viewpoint of the user from FIG. 7F to FIG. 7G. Because simulated shadow 746*b* is now displayed on simulated sand rather than simulated water, computer system 101 optionally changes the visual appearance of the texture used to display simulated shadow 746, as previously described. Further, by moving from FIG. 7F to FIG. 7G, simulated shadow 746*b* causes a simulated reflection 752*c* that was displayed in FIG. 7F to cease to be displayed in FIG. 7G (e.g., because simulated shadow 746*b* occupies the area in which simulated reflection 752*c* was displayed in FIG. 7F).

The movement of simulated shadow 746*b* from FIG. 7F to FIG. 7G also causes simulated shadows 746*b* and 748*a* to at least partially overlap, represented by region 746*x*. In some embodiments, when two (or more) simulated shadows at least partially overlap, computer system 101 selects the texture to use for the overlap region 746*x* based on which simulated shadow has a higher visual prominence in that region. For example, in FIG. 7G, because simulated shadow 748*a* has a higher visual prominence than simulated shadow 746*b*, computer system 101 displays overlap region 746*x* with the texture of simulated shadow 748*a*, and ceases display of the texture of simulated shadow 746*b* in overlap region 746*x*. Computer system 101 does this instead of adding or otherwise combining the textures of the two simulated shadows to generate a more realistic appearance for overlap region 746*x* in a power-efficient manner. Portions of simulated shadows 746*b* and/or 748*a* that are outside of overlap region 746*x* are optionally continued to be displayed with the textures of their respective simulated shadows. Additional details about the visual appearances of simulated shadows are provided with reference to method 2100.

Figure 7H:
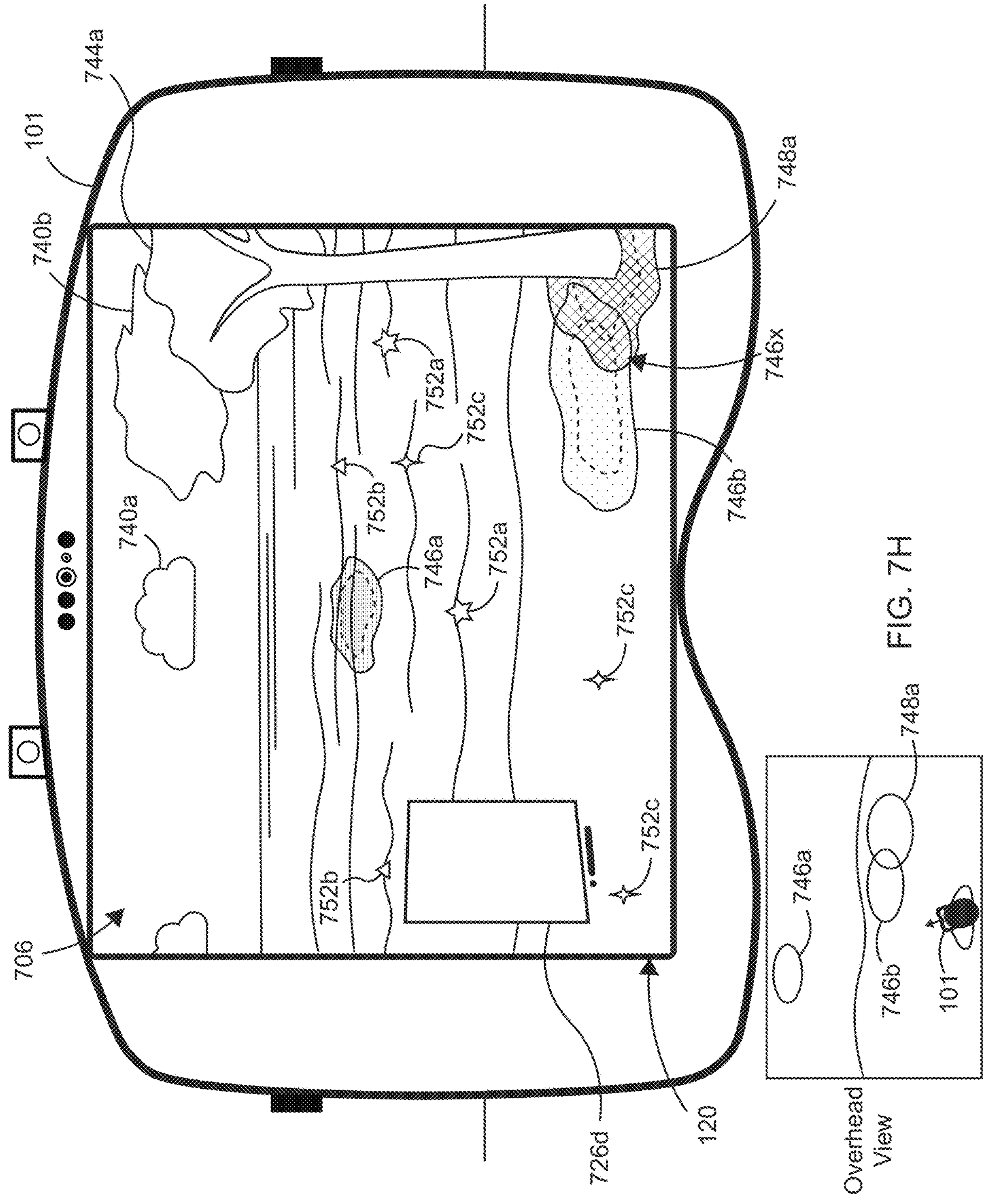

From FIG. 7G to FIG. 7H, the viewpoint of the user changes, as shown in the overhead view schematic. For example, the user turns their head to the left, which causes computer system 101 to update display of environment 706 in FIG. 7H to reveal a portion of environment 706 that is further to the left than the portion of environment 706 that was visible in FIG. 7G. In response to the change in the viewpoint, computer system 101 optionally changes the number and/or positions of simulated reflections 752*a*, 752*b* and/or 752*c*, optionally displays simulated reflections that were previously not displayed (e.g., even though the portion of environment 706 on which the simulated reflections are displayed were also visible from the viewpoint shown in FIG. 7G), and/or optionally ceases display of simulated reflections that were previously displayed (e.g., even though the portion of environment 706 on which the simulated reflections were displayed remain visible from the viewpoint shown in FIG. 7H). Additional details about the changes in the visual appearance of environment 706 based on a change in viewpoint are provided with reference to method 2100.

Figure 7I:
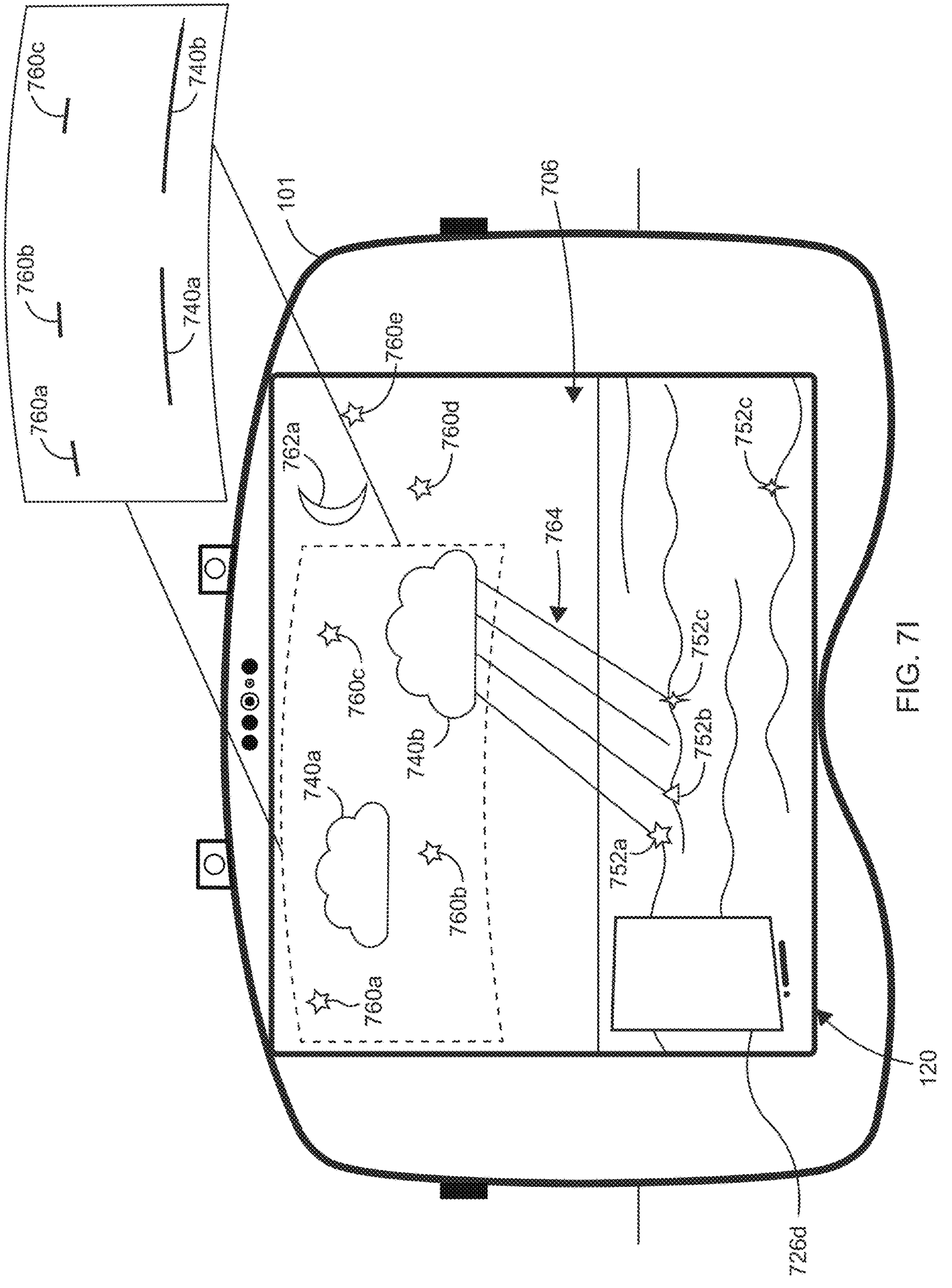
Figure 7J:
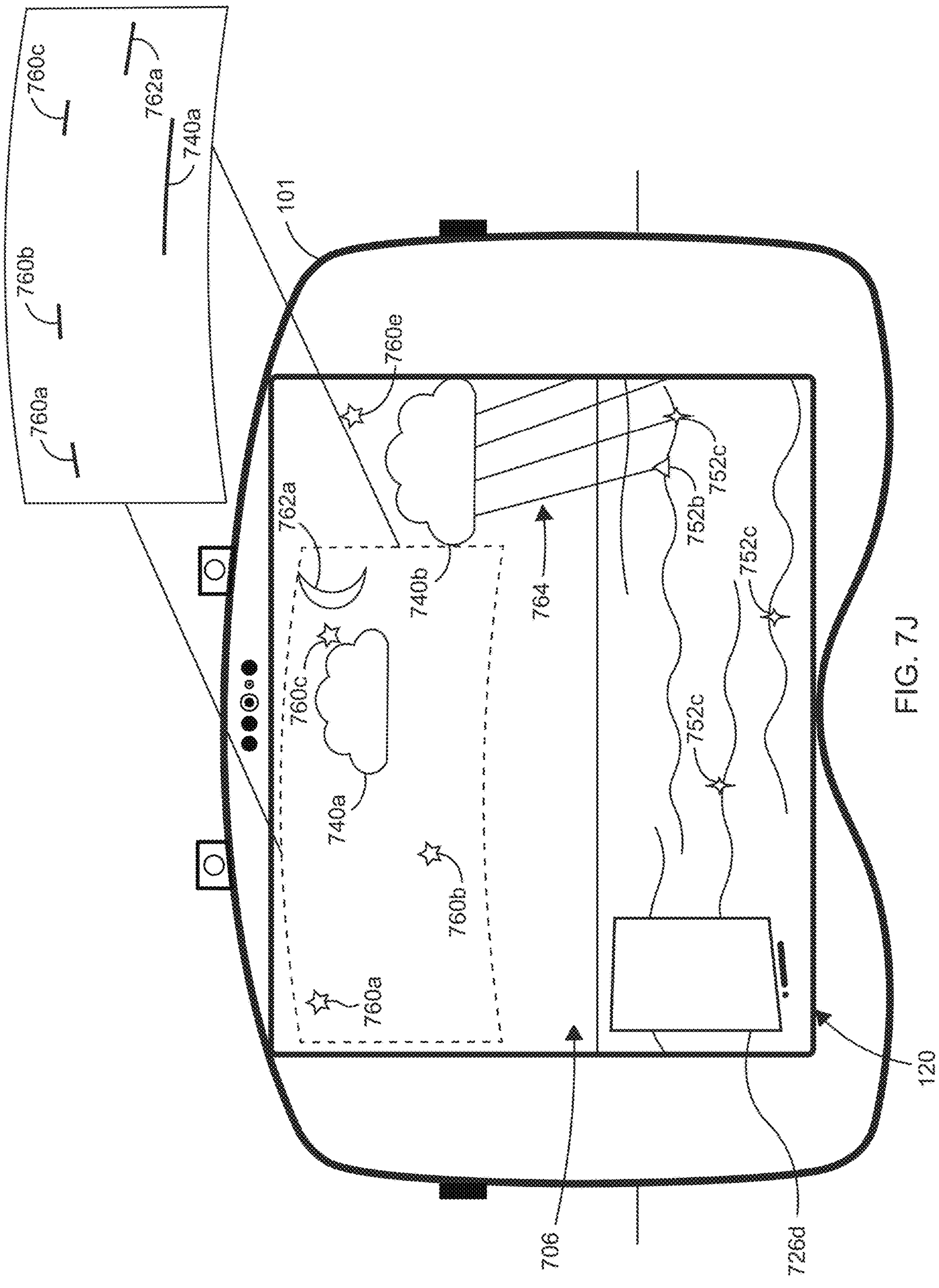
Figure 8A:
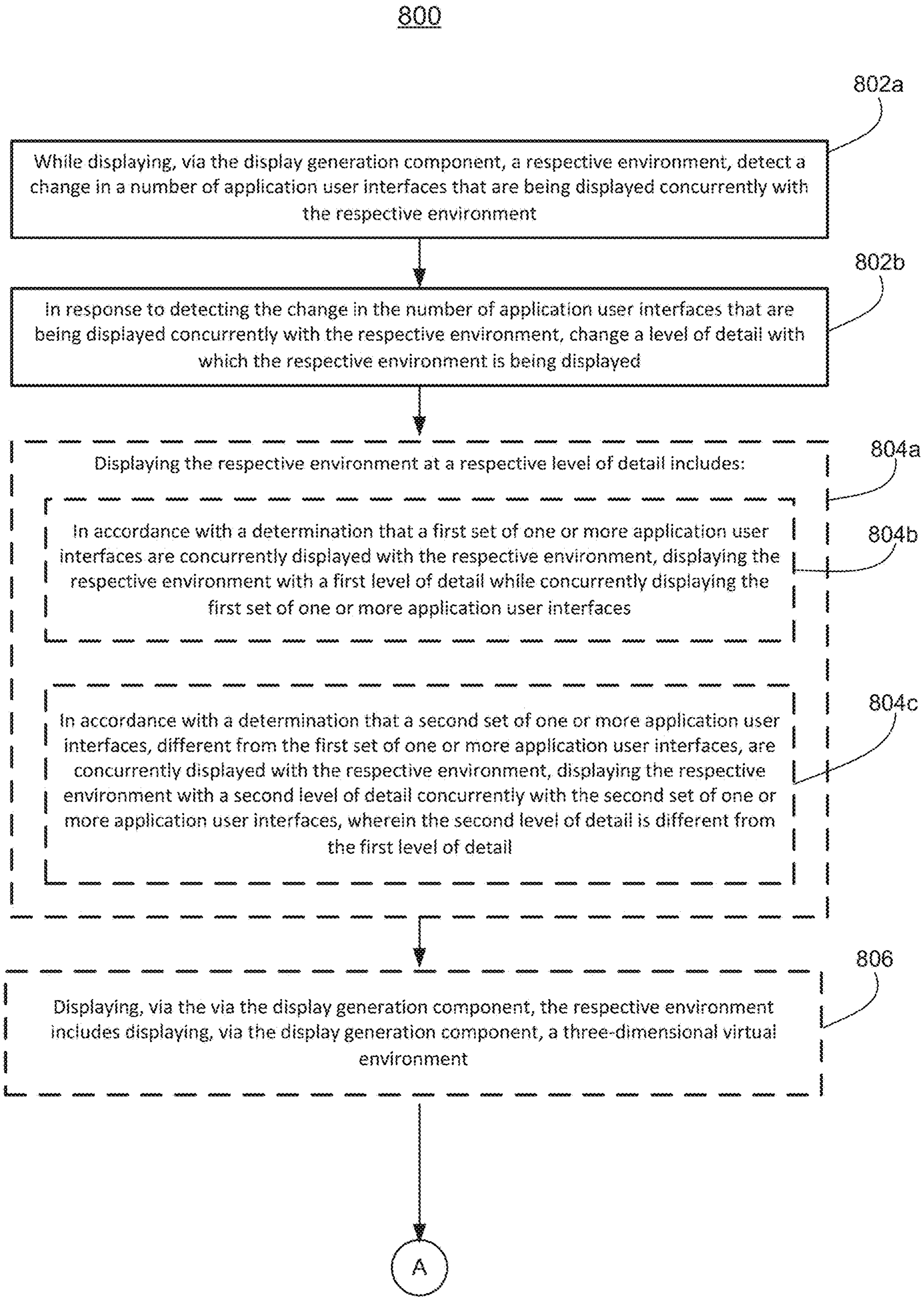
FIGS. 8A-8F is a flowchart illustrating a method of changing a level of detail with which a respective environment is being displayed based on a number of application user interfaces that are being displayed concurrently with the respective environment in accordance with some embodiments.
Figure 8B:
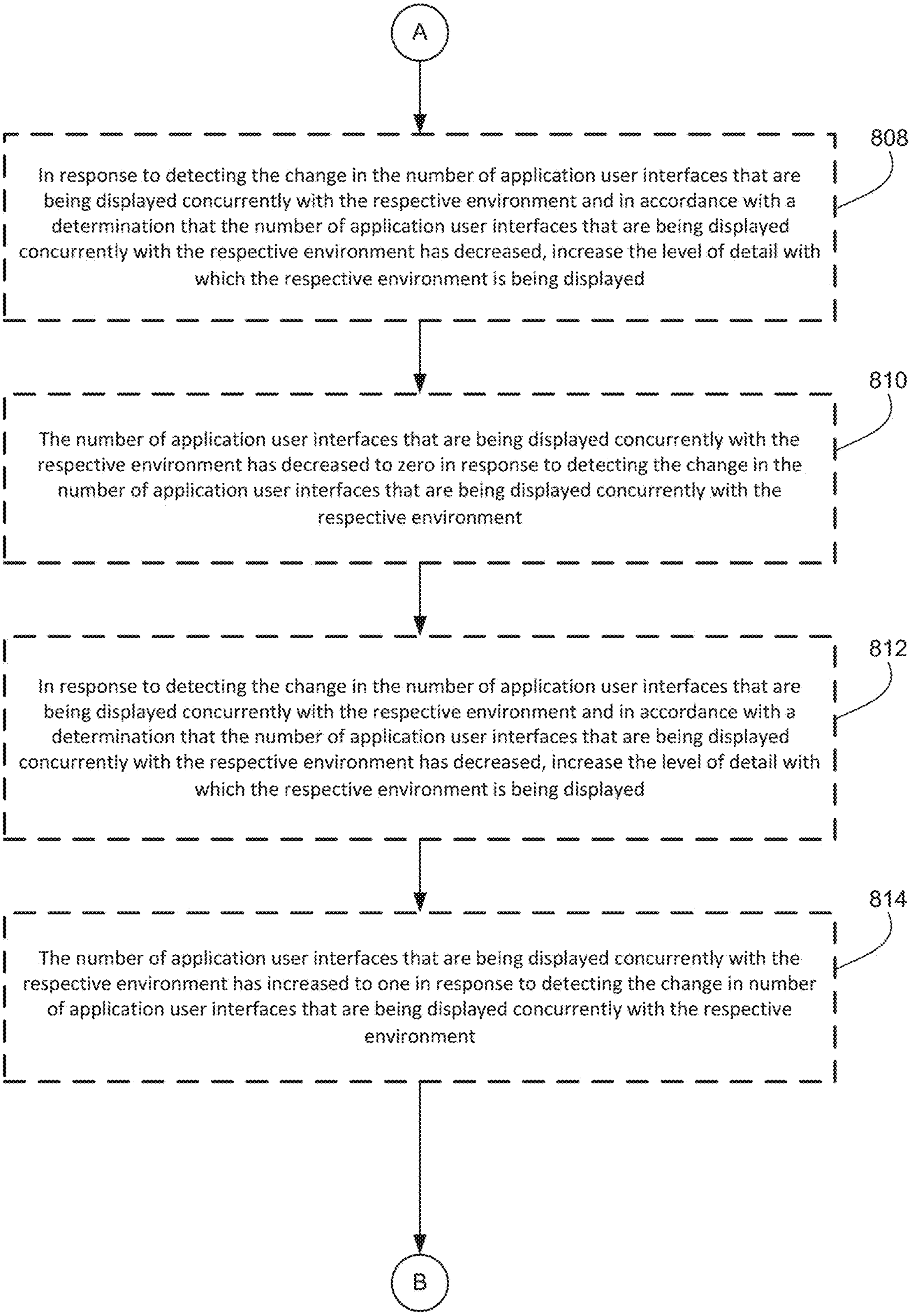
Figure 8C:
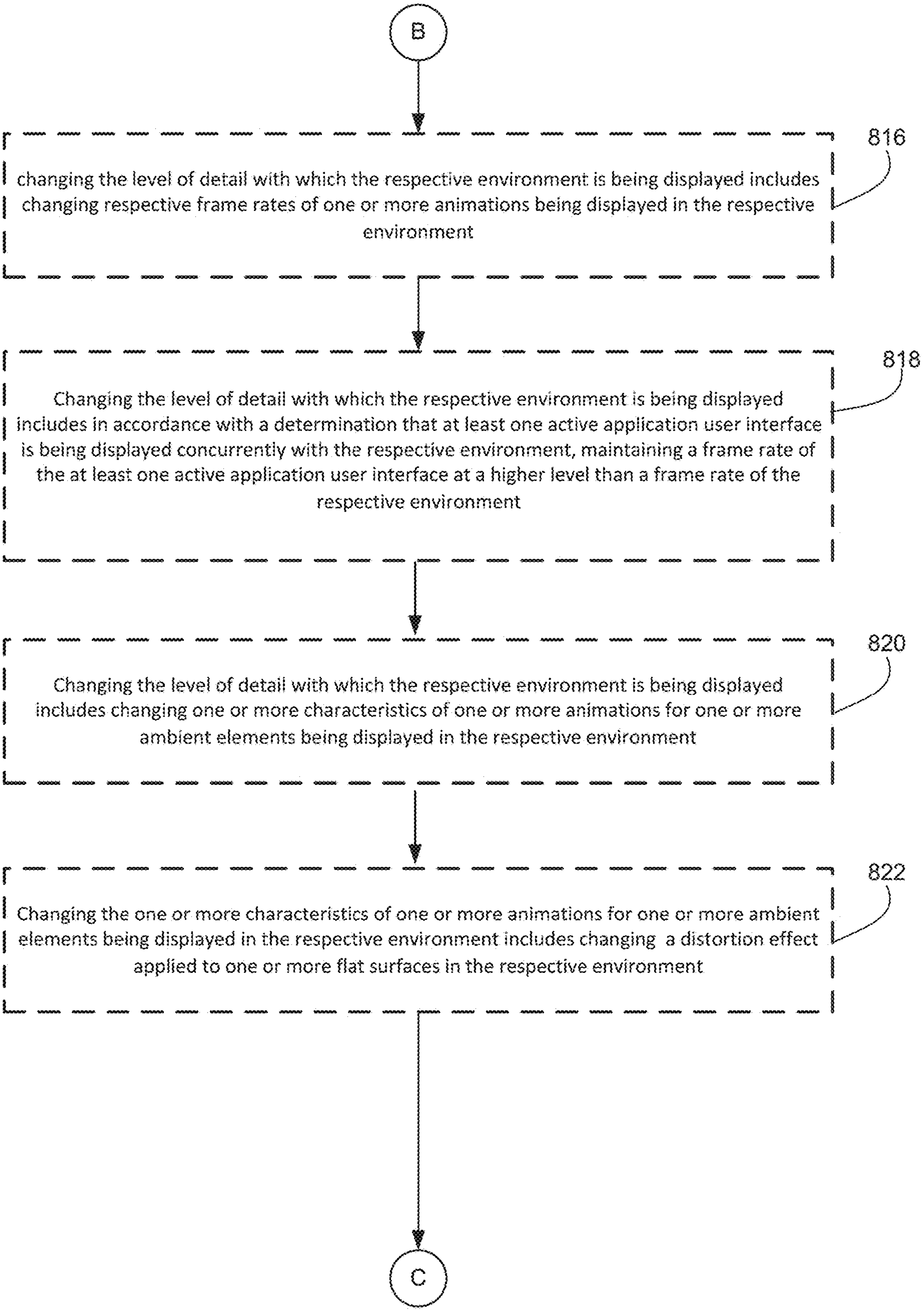
Figure 8D:
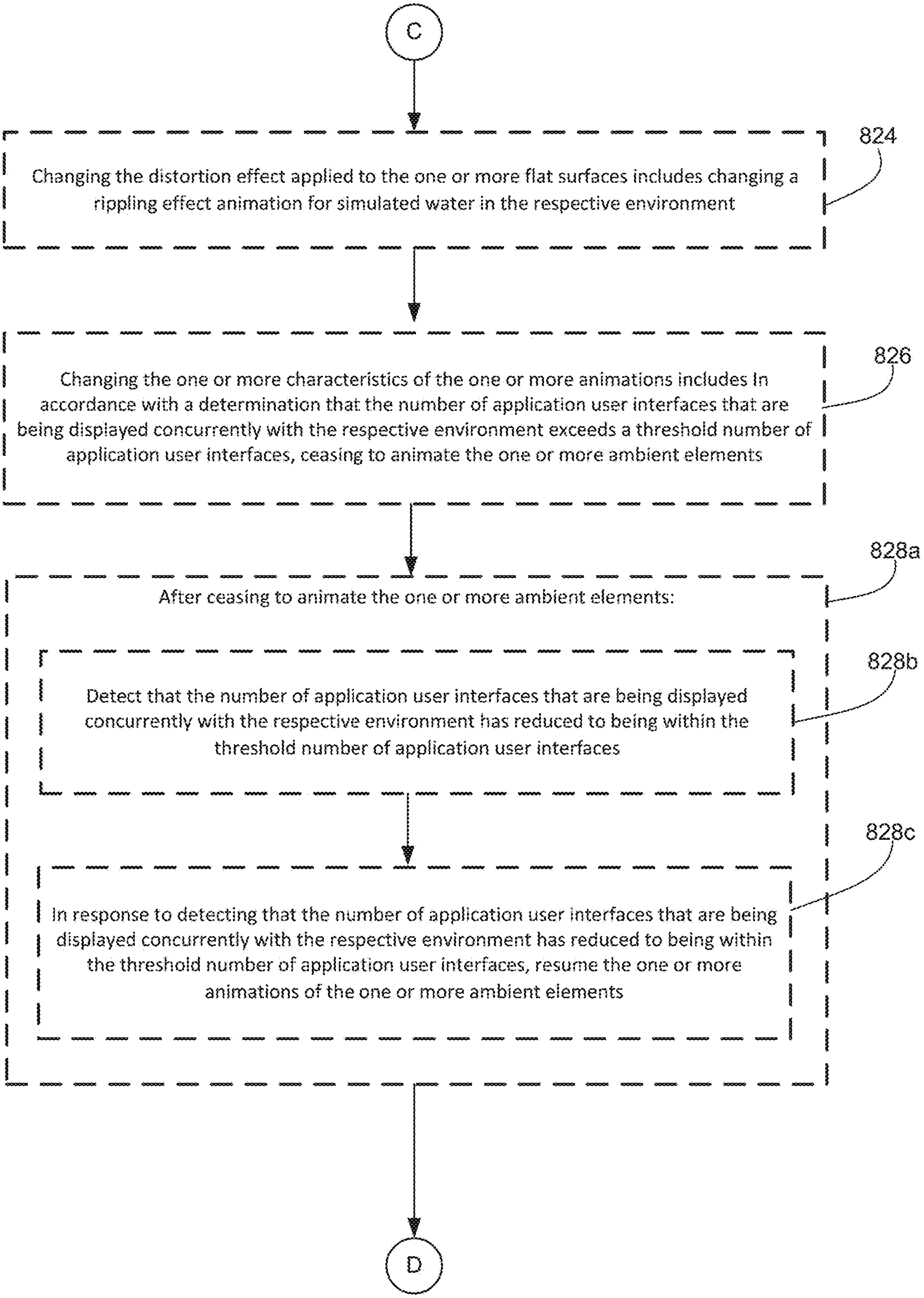
Figure 8E:
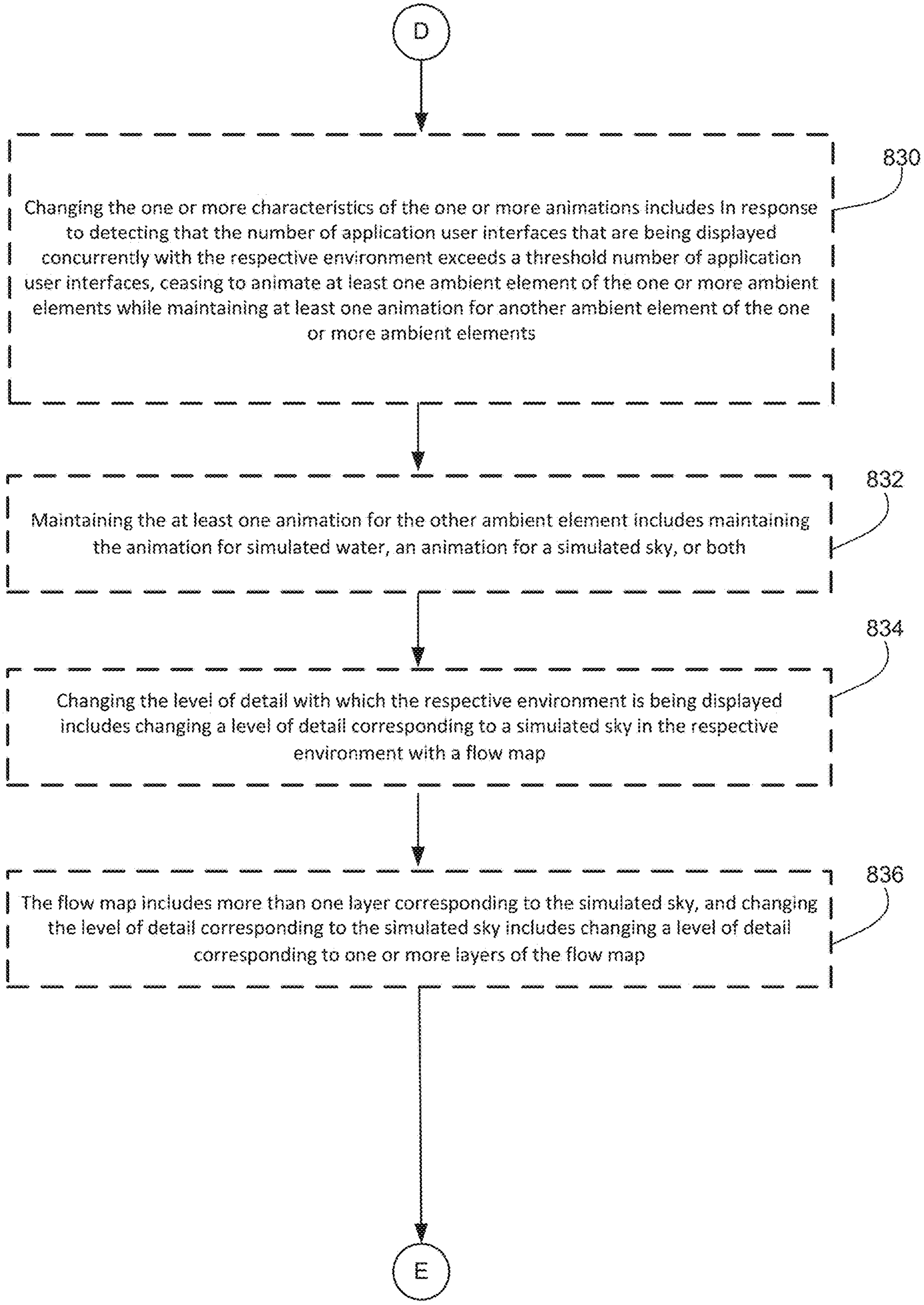
Figure 8F:
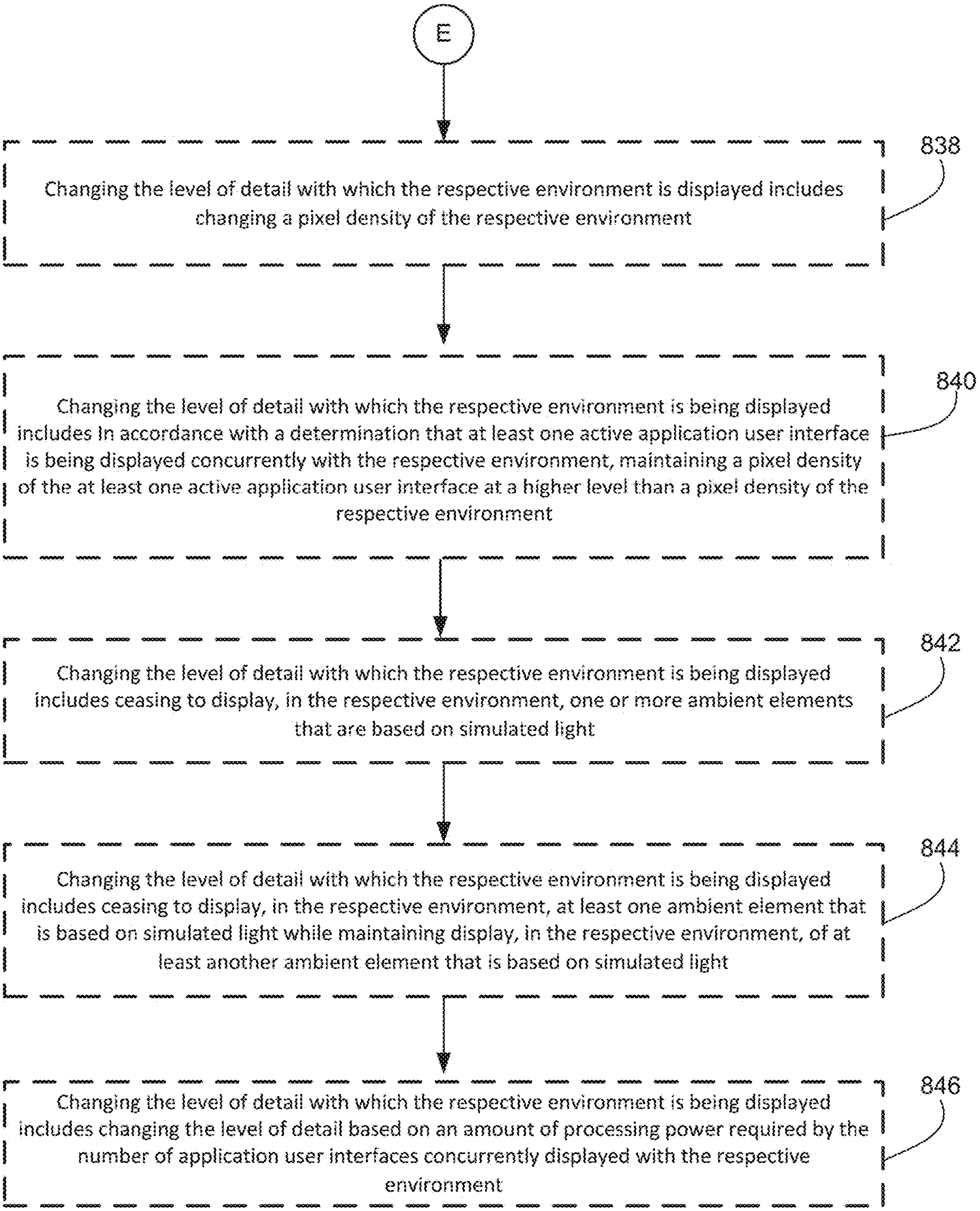

FIGS. 7I and 7J illustrate examples of displaying a background element in an environment (e.g., environment 706) that is made up of multiple layers of virtual elements whose visual appearances are independently controllable. The environment visible via display generation component 120 in FIG. 7I includes simulated water (e.g., as described with reference to FIGS. 7E-7H) and a simulated sky, which is optionally a background element in the environment. The simulated sky is optionally composed of three layers of virtual elements. In a first or bottom layer (e.g., closest to the viewpoint of the user), the simulated sky optionally includes simulated clouds 740*a* and 740*b*. In a second or middle layer (e.g., further from the viewpoint of the user than the first or bottom layer), the simulated sky optionally includes a simulated moon 762*a*. In a third or top layer (e.g., further from the viewpoint of the user than the second or middle layer), the simulated sky optionally includes simulated stars 760*a-c*. The background element is optionally displayed on a surface of a spherical volume, the center of which is optionally the viewpoint of the user, as indicated by the curved appearance of the cross section of the background element in the upper-right region of FIG. 7I. The cross section of the background element optionally reflects the relative placements and/or movements of the virtual elements in the three layers of the background element in the region of the simulated sky indicated by the dashed box.

Computer system 101 in FIG. 7I is also displaying simulated lighting effects 764 (e.g., simulated light rays) corresponding to one or more simulated light sources, whether in the background element or otherwise. Computer system 101 is also displaying various simulated reflections 752*a-c* on the surface of the simulated water, as described with reference to FIGS. 7E-7H. As shown in FIG. 7I, simulated lighting effects 764 are displayed as emanating from below simulated cloud 740*b*, such as if being generated by simulated light from simulated moon 762*a* passing through simulated cloud 740*b*, resulting in simulated lighting effects 764 extending from below simulated cloud 740*b* onto the surface of the simulated water. In some embodiments, as shown in FIG. 7I, computer system 101 displays one or more simulated reflections 752*a-c* on the surface of the simulated water where simulated lighting effects 764 intersect with the surface of the simulated water.

From FIG. 7I to FIG. 7J, simulated stars 760*a* in the top layer of the background element remain stationary, simulated moon 762*a* in the middle layer of the background element moves leftward, and simulated clouds 740*a* and 740*b* in the bottom layer of the background element move rightward. As a result, computer system 101 optionally updates the visual appearance of the environment, as shown in FIG. 7J. For example, simulated lighting effects 764 are updated to have a different orientation relative to the environment (e.g., to maintain the alignment of the simulated lighting effects 764 with simulated moon 762*a*, the simulated light source for those effects), and computer system 101 changes the display of one or more of the simulated reflections 752*a-c*, as shown from FIG. 7I to FIG. 7J. Additional details about the changes in the visual appearance of a background element are provided with reference to method 2200.

FIGS. 8A-8F is a flowchart illustrating an exemplary method 800 of facilitating depth conflict mitigation for one or more virtual objects in a three-dimensional environment by changing visual properties of the one or more virtual objects in accordance with some embodiments. In some embodiments, the method 800 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 800 are, optionally, combined and/or the order of some operations is, optionally, changed.

In some embodiments, the method 800 is performed at a computer system, such as computer system 101 in FIG. 1, in communication with a display generation component and one or more input devices. For example, a mobile device (e.g., a tablet, a smartphone, a media player, or a wearable device), or a computer or other computer system. In some embodiments, the display generation component is a display integrated with the computer system (optionally a touch screen display), external display such as a monitor, projector, television, or a hardware component (optionally integrated or external) for projecting a user interface or causing a user interface to be visible to one or more users. In some embodiments, the one or more input devices include a computer system or component capable of receiving a user input (e.g., capturing a user input and/or detecting a user input) and transmitting information associated with the user input to the computer system. Examples of input devices include a touch screen, mouse (e.g., external), trackpad (optionally integrated or external), touchpad (optionally integrated or external), remote control device (e.g., external), another mobile device (e.g., separate from the computer system), a handheld device (e.g., external), a controller (e.g., external), a camera, a depth sensor, an eye tracking device, and/or a motion sensor (e.g., a hand tracking device, a hand motion sensor). In some embodiments, the computer system is in communication with a hand tracking device (e.g., one or more cameras, depth sensors, proximity sensors, touch sensors (e.g., a touch screen, trackpad). In some embodiments, the hand tracking device is a wearable device, such as a smart glove. In some embodiments, the hand tracking device is a handheld input device, such as a remote control or stylus.

In some embodiments, while displaying, via the display generation component, a respective environment, such as respective environment 704 in FIGS. 7A and 7A1, the computer system detects (802*a*) a change in a number of application user interfaces, such as application user interfaces 726*a* and 726*b* in FIGS. 7A and 7A1 (e.g., a media application (e.g., television or photos), a messages application, a health application, and/or a web browsing application user interface), that are being displayed concurrently with the respective environment. In some embodiments, the respective environment includes a three-dimensional environment. In some embodiments, the three-dimensional environment includes an environment that corresponds to a physical environment surrounding the display generation component. In some embodiments, the three-dimensional environment has one or more of the characteristics of the (three-dimensional) environments of methods 1000, 1200, 1400, 1600, 1800, and/or 2000. In some embodiments, the three-dimensional environment is generated, displayed, or otherwise caused to be viewable by the computer system (e.g., an extended reality (XR) environment such as a virtual reality (VR) environment, a mixed reality (MR) environment, and/or an augmented reality (AR) environment). In some embodiments, the physical environment is visible through a transparent portion of the display generation component (e.g., true or real passthrough). In some embodiments, a representation of the physical environment is displayed in the three-dimensional environment via the display generation component (e.g., virtual or video passthrough). In some embodiments, a respective virtual environment (e.g., a simulated three-dimensional environment) is displayed via the display generation component as described with respect to step(s) 804, optionally instead of the representations of the physical environment (e.g., full immersion) or optionally concurrently with the representation of the physical environment (e.g., partial immersion). In some embodiments, the respective virtual environment represents a simulated physical space. Some examples of a virtual environment include a lake environment, a mountain environment, a sunset scene, a sunrise scene, a nighttime environment, a grassland environment, and/or a concert scene. In some embodiments, a virtual environment is based on a real physical location, such as a museum, and/or an aquarium. In some embodiments, a virtual environment is an artist-designed location. Thus, displaying a virtual environment optionally provides the user with a virtual experience as if the user is physically located in the virtual environment. In some embodiments, the respective environment has one or more characteristics of the environments described with reference to methods 1000, 1200, 1400, 1600, 1800, and/or 2000. In some embodiments, in response to receiving user input for initiating start up or closing of application user interface(s), the computer system displays or ceases display of the application user interface(s), and thereby detects the change in the number of application user interface(s).

In some embodiments, in response to detecting the change in the number of application user interfaces that are being displayed concurrently with the respective environment, the computer system changes (802*b*) a level of detail, such as the level of detail in FIG. 7B, with which the respective environment is being displayed. In some embodiments, the number of application user interfaces corresponds to a number of different applications concurrently running while the respective environment is displayed. In some embodiments, the number of application user interfaces corresponds to a number of windows of the same application and/or different applications concurrently running while the respective environment is displayed. In some embodiments, as described in detail below, changing (e.g., increasing or decreasing) the level of detail is based on the number of application user interfaces that are being displayed concurrently with the respective environment. In some embodiments, the level of detail at which the respective environment is being displayed is decreased based on an increased number of application user interfaces that are being displayed concurrently with the respective environment. In some embodiments, if at least one application user interface is displayed concurrently with the respective environment, then the respective environment is displayed with a decreased level of detail. In some embodiments, the level of detail at which the respective environment is being displayed is increased based on a reduced number of application user interfaces that are being displayed concurrently with the respective environment. In some embodiments, if no application user interfaces are displayed concurrently with the respective environment, then the respective environment is displayed with an increased level of detail. In some embodiments, a level of detail at which to display the respective environment corresponds to a number of animations to display in the respective environment, types of animations to display in the respective environment, resolution associated with the animations to display in the respective environment, and/or frame rate associated with the animations to display in the respective environment. In some embodiments, the frame rate includes a frequency at which frames of an image or a video (e.g., animation) are displayed in the respective environment. In some embodiments, the level of detail is selected based on the resource usage associated with displaying the number of application user interfaces along with the respective environment and/or whether the number of application user interfaces include any active application user interfaces (e.g., any application user interfaces being currently used by the user and/or actively consuming resources). Changing a level of detail at which to display a respective environment according to the number of application user interfaces concurrently displayed with the respective environment ensures efficient consumption of computing resources by the computer system (e.g., reducing level of detail when a higher number of application user interfaces are displayed to reduce computing resource consumption), without the need for user input to do so, and thereby improves user-device interactions.

In some embodiments, displaying the respective environment at a respective level of detail includes (804*a*) in accordance with a determination that a first set of one or more application user interfaces, such as application user interface 726*a* in FIG. 7C, are concurrently displayed with the respective environment, displaying the respective environment with a first level of detail, such as a level of detail in FIG. 7C, while concurrently displaying the first set of one or more application user interfaces (804*b*). In some embodiments, the respective environment is displayed with the first level of detail based on the resource usage associated with displaying the first set of one or more application user interfaces along with the respective environment and/or whether respective application user interfaces of the first set of one or more application user interfaces are active. In some embodiments, after determining the first level of detail at which to display the respective environment, the computer system displays the respective environment with a transitional level of detail for a threshold amount of time (e.g., 0.1, 1, 2, 5 or 10 s) before displaying the respective environment with the first level of detail. For example, prior to determining the first level of detail, the respective environment is optionally displayed with a second level of detail as described below. Thus, the transitional level of detail optionally includes characteristics of the second level of detail and the first level of detail.

In some embodiments, displaying the respective environment at a respective level of detail includes (804*a*) in accordance with a determination that a second set of one or more application user interfaces, such as application user interfaces 726*c* in FIG. 7D, different from the first set of one or more application user interfaces, are concurrently displayed with the respective environment, displaying the respective environment with a second level of detail, such as a level of detail in FIG. 7D, concurrently with the second set of one or more application user interfaces, wherein the second level of detail is different from the first level of detail (804*c*). In some embodiments, if the second set of one or more application user interfaces includes a fewer number of application user interfaces and/or corresponds to a lower amount of resource usage, then the second level of detail is greater than the first level of detail. For example, when the second level of detail is greater than the first level of detail, the respective environment includes an increased number of active animations of ambient elements (e.g., virtual sky, water, rain, fog, grass, plants, and/or animals), increased resolution (e.g., pixel density) of the ambient elements, and/or increased resolution (e.g., pixel density) of application user interfaces. In some embodiments, if no application user interfaces are displayed concurrently with the respective environment, then the respective environment is displayed with an increased level of detail. In some embodiments, if the second set of one or more application user interfaces includes a greater number of application user interfaces and/or corresponds to a higher amount of resource usage, then the second level of detail is less than the first level of detail. For example, when the second level of detail is less than the first level of detail, the respective environment includes a reduced number of active animations of ambient elements (e.g., virtual sky, water, rain, fog, grass, plants, and/or animals), reduced resolution (e.g., pixel density) of the ambient elements, and/or reduced resolution (e.g., pixel density) of application user interfaces. In some embodiments, the computer system automatically (e.g., without user input) displays the respective environment with a level of detail (e.g., the first level of detail or the second level of detail) based on a set of application user interfaces (e.g., the first set of one or more application user interfaces or the second set of one or more application user interfaces). In some embodiments, if at least one application user interface is displayed concurrently with the respective environment, then the respective environment is displayed with a decreased level of detail. In some embodiments, if the set of application user interfaces displayed concurrently with the respective environment changes, then the computer system automatically (e.g., without user input) changes the level of detail for the respective environment. In some embodiments, the computer system detects user input that causes the change in the set of application user interfaces. In some embodiments, the computer system is configured to dynamically switch between the first level of detail and the second level of detail when displaying the respective environment and application user interfaces based on the resource usage associated with displaying the application user interfaces and/or ambient elements. In some embodiments, after determining the second level of detail at which to display the respective environment, the computer system displays the respective environment with a transitional level of detail for a threshold amount of time (e.g., 0.1, 1, 2, 5, or 10 s) before displaying the respective environment with the second level of detail. Displaying a respective environment with a level of detail according to the type, number, and/or other characteristics of application user interfaces concurrently displayed with the respective environment ensures efficient consumption of computing resources by the computer system (e.g., reducing level of detail when a higher number of application user interfaces are displayed to reduce computing resource consumption), without the need for user input to do so, and thereby improves user-device interactions.

In some embodiments, displaying, via the display generation component, the respective environment includes displaying, via the display generation component, a three-dimensional virtual environment, such as the three-dimensional virtual environment 702 in FIGS. 7A and 7A1 (806). In some embodiments, the respective environment is a simulated three-dimensional environment that is displayed in and/or is the three-dimensional environment, optionally instead of the representations of the physical environment (e.g., full immersion) or optionally concurrently with the representation of the physical environment (e.g., partial immersion). Some examples of a three-dimensional virtual environment include a lake environment, a mountain environment, a sunset scene, a sunrise scene, a nighttime environment, a grassland environment, and/or a concert scene. In some embodiments, a three-dimensional virtual environment is based on a real physical location, such as a museum, and/or an aquarium. In some embodiments, a three-dimensional virtual environment is an artist-designed location. Thus, displaying a virtual environment in and/or as the three-dimensional environment optionally provides the user with a virtual experience as if the user is physically located in the virtual environment. In some embodiments, the three-dimensional virtual environment has one or more characteristics of the virtual environments described with reference to methods 1000, 1200, 1400, 1600, 1800 and/or 2000. Displaying a respective environment as a three-dimensional virtual environment and concurrently displaying virtual elements and application and application user interfaces with the three-dimensional virtual environment increases flexibility in using the computer system and improves user-device interactions.

In some embodiments, in response to detecting the change in the number of application user interfaces that are being displayed concurrently with the respective environment and in accordance with a determination that the number of application user interfaces that are being displayed concurrently with the respective environment has decreased, such as the decrease in the number of application user interfaces in FIG. 7C, the computer system increases (808) the level of detail, such as a level of detail in FIG. 7C, with which the respective environment is being displayed (e.g., increasing a frame rate of the respective environment, a pixel density of the respective environment, a number of animations displayed in the respective environment, a frame rate of animations displayed in the respective environment, a number of ambient elements displayed in the respective environment, and/or a pixel density of ambient elements displayed in the respective environment). In some embodiments, a reduced number of application user interfaces displayed concurrently with the respective environment corresponds to a lower amount of resources used by the computer system for displaying those application user interfaces. Thus, reduced resources usage can cause the computer system to optionally increase the level of detail with which the respective environment is displayed. Increasing the level of detail at which the respective environment is displayed in response to a reduced number of application user interfaces displayed with the respective environment ensures efficient consumption of computing resources by the computer system without the need for user input to do so, and thereby improves user-device interactions.

In some embodiments, the number of application user interfaces that are being displayed concurrently with the respective environment has decreased to zero, such as zero application user interfaces displayed in FIG. 7B, in response to detecting the change in the number of application user interfaces that are being displayed concurrently with the respective environment (810). In some embodiments, if no application user interfaces are displayed concurrently with the respective environment, then the respective environment is displayed with a maximum level of detail. Increasing the level of detail at which the respective environment is displayed in response to no application user interfaces displayed with the respective environment ensures efficient consumption of computing resources by the computer system without the need for user input to do so, and thereby improves user-device interactions.

In some embodiments, in response to detecting the change in the number of application user interfaces that are being displayed concurrently with the respective environment and in accordance with a determination that the number of application user interfaces that are being displayed concurrently with the respective environment has increased, such as an increase in number of application user interfaces displayed in FIG. 7C, the computer system decreases (812) the level of detail, such as a decreased level of detail in FIG. 7C, with which the respective environment is being displayed (e.g., decreasing a frame rate of the respective environment, a pixel density of the respective environment, a number of animations displayed in the respective environment, a frame rate of animations displayed in the respective environment, a number of ambient elements displayed in the respective environment, and/or a pixel density of ambient elements displayed in the respective environment). In some embodiments, a greater number of application user interfaces displayed concurrently with the respective environment corresponds to a higher amount of resources used by the computer system to display those application user interfaces. Thus, increased resources usage can cause the computer system to optionally decrease the level of detail with which the respective environment is displayed. Decreasing the level of detail at which the respective environment is displayed in response to a greater number of application user interfaces displayed with the respective environment ensures efficient consumption of computing resources by the computer system without the need for user input to do so, and thereby improves user-device interactions.

In some embodiments, the number of application user interfaces that are being displayed concurrently with the respective environment has increased to one, such as displaying application user interface 726*a* in FIG. 7C, in response to detecting the change in number of application user interfaces that are being displayed concurrently with the respective environment (814). In some embodiments, before detecting the change in application user interfaces (e.g., increased to one), no application user interfaces are displayed concurrently with the respective environment. In some embodiments, if at least one application user interface is displayed concurrently with the respective environment, then the respective environment is displayed with less detail than if no application user interfaces are displayed. Decreasing the level of detail at which the respective environment is displayed in response to at least one application user interface being displayed with the respective environment ensures efficient consumption of computing resources by the computer system without the need for user input to do so, and thereby improves user-device interactions.

In some embodiments, changing the level of detail with which the respective environment is being displayed includes changing respective frame rates of one or more animations, such as the change in frames rates of animation from FIG. 7B to 7C as depicted by the curved arrows (e.g., of virtual element(s) such as a virtual car, ambient element(s) as described with respect to step(s) 804, or any virtual object) being displayed in the respective environment (816). In some embodiments, decreasing the level of detail with which the respective environment is displayed includes reducing the respective frame rates of one or more animations. In some embodiments, increasing the level of detail with which the respective environment is displayed includes increasing the respective frame rates of one or more animations. Changing respective frames rates of one or more animations to increase or decrease the level of detail with which the respective environment is being displayed ensures efficient consumption of computing resources by the computer system, without the need for user input to do so, and thereby improves user-device interactions.

In some embodiments, changing the level of detail with which the respective environment is being displayed includes in accordance with a determination that at least one active application user interface is being displayed concurrently with the respective environment, maintaining a frame rate of the at least one active application user interface, such as the characteristics of application user interface 726*a* in FIG. 7C, at a higher level than a frame rate of the respective environment (818). In some embodiments, the frame rate of the respective environment includes a frame rate of the entire respective environment. In some embodiments, the frame rate of the respective environment includes a frame rate of one or more components (e.g., application user interface(s), virtual element(s) such as a virtual car, and/or ambient element(s) such as virtual clouds or a virtual animal) in the respective environment. In some embodiments, an active application user interface corresponds to an application for media content playback, a navigation application, or a health application. In some embodiments, the computer system determines that an application user interface is active based on receiving inputs from a user interacting with the application user interface (e.g., the application user interface that is the most-recent target of user input is the active application user interface). In some embodiments, the computer system determines that an application user interface is active based on detecting attention of the user directed towards the application user interface (e.g., the application user interface that is the most-recent target of user attention is the active application user interface). In some embodiments, a frame rate of an active application user interface is maintained at the same level of frame rate as the respective environment. In some embodiments, a plurality of active application user interfaces is displayed concurrently with the respective environment. Accordingly, each of the plurality of active application user interfaces is optionally maintained at a higher frame rate than the respective environment. In some embodiments, if non-active application user interfaces are being displayed concurrently with the respective environment, then the respective frame rates of the non-active application user interfaces are changed (e.g., decreased) compared to the frame rate of the respective environment. Maintaining an active application user interface at a higher frame rate than the respective environment helps ensure desired interaction with the active application user interface and reduces errors in interaction with the application user interface, and thus improves user-device interactions.

In some embodiments, changing the level of detail with which the respective environment is being displayed includes changing one or more characteristics (e.g., number, type, duration, pixel density, and/or frame rate) of one or more animations for one or more ambient elements being displayed in the respective environment, such as changing a characteristic of background in FIG. 7C (820). In some embodiments, decreasing the level of detail with which the respective environment is displayed includes reducing the number of ambient elements (e.g., virtual sky or clouds, virtual water, virtual fog, virtual grass, virtual plants, or virtual animals) displayed in the respective environment, reducing the number of animations for the ambient elements (e.g., movement of virtual clouds, virtual rainfall, movement of virtual animals, or virtual sun rising or setting) displayed in the respective environment, reducing respective pixel densities of the ambient elements displayed in the respective environment, and/or reducing respective frame rates of animations for the ambient elements displayed in the respective environment. In some embodiments, increasing the level of detail with which the respective environment is displayed includes increasing the number of ambient elements displayed in the respective environment, increasing the number of animations of the ambient elements displayed in the respective environment, increasing respective pixel densities of the ambient elements displayed in the respective environment, and/or increasing respective frame rates of animations for the ambient elements displayed in the respective environment. Changing respective animations of ambient elements in the respective environment to increase or decrease the level of detail with which the respective environment is being displayed ensures efficient consumption of computing resources by the computer system, without the need for user input to do so, and thereby improves user-device interactions.

In some embodiments, changing the one or more characteristics (e.g., number, type, duration, pixel density, and/or frame rate) of one or more animations for one or more ambient elements being displayed in the respective environment includes changing (and/or applying) a distortion effect applied to one or more flat surfaces, such as a distortion effect applied to virtual water represented by ambient element 750 in FIG. 7C, in the respective environment (822). In some embodiments, ambient elements with a flat surface, such as simulated water, are distorted based on changes in the ambient elements or other content displayed in the respective environment. For example, changing an animation of simulated wind in the respective environment optionally changes distortion (e.g., rippling or other textural movement effect) of a simulated material (e.g., water, sand, snow, fog, grass, leaves, or the like) displayed in the respective environment (e.g., increased rippling effect in the simulated water with increased simulated wind or decreased rippling effect in the simulated water with decreased simulated wind, a movement effect of grass or leaves moving in the wind, movement of particles such as snow or sand with the wind, and/or movement of fog or clouds). In some embodiments, changes in distortion effect applied to animations of ambient elements is based on respective positions of applications displayed in the respective environment (e.g., whether an application is displayed at a viewing location in the respective environment). In some embodiments, simulated light that is cast by content such as media content in the respective environment is virtually reflected off a flat surface corresponding to the simulated water. Accordingly, changing the distortion effect optionally includes changing the reflection of the simulated light cast onto the flat surface corresponding to the simulated material (e.g., water, sand, snow, fog, grass, leaves, or the like). In some embodiments, the change in the distortion effect is not applied to the flat surface unless the media content is displayed in the respective environment. Thus, changing the distortion effect optionally requires reduced processing power for the distortion effect when the content corresponding to the flat surface is displayed. In some embodiments, the change in the distortion effect is not applied to the flat surface unless the content corresponding to flat surface is displayed at a particular location in the respective environment, such as a position in the respective environment at which simulated light would be reflected off the flat surface (e.g., such as at a location in the respective environment that is a fixed or otherwise designated location in the respective environment at which media content can be docked for viewing). In some embodiments, if the content is displayed in the respective environment at a different location in the respective environment, the change in the distortion effect is optionally not applied. In some embodiments, the location of the change in distortion effect on the flat surface varies based on the relative location of the content to the flat surface being distorted (e.g., different locations of changes in distortion effects for different relative locations of the media content relative to the flat surface). In some embodiments, the change in distortion effect applied to the animations of the ambient elements is independent of the number of applications or application user interfaces displayed in the respective environment. Applying distortion effects to animations of ambient elements prevents unintended replication of copyrighted content when displaying the copyrighted content in the respective environment, and reduces the computing power required to display reflections off surfaces, and thus ensures efficient consumption of computing resources by the computer system.

In some embodiments, changing the distortion effect applied to the one or more flat surfaces includes changing a rippling effect animation for simulated water, such as a rippling animation for virtual water represented by ambient element 750 in FIG. 7C, in the respective environment (824). In some embodiments, the distortion effect applied to the animation for simulated water includes one or more rippling effects that appear to break up a reflection of the simulated water, and thus the reflection of the content from the surface of the simulated water. In some embodiments, the distortion effect includes removing rain drop rippling from the simulated water so that the simulated water is displayed to be less realistic (e.g., while optionally maintaining a rippling effect in the water caused by simulated waves or simulated wind). Changing rippling effects of an animation for simulated water prevents unintended replication of copyrighted content when displaying the copyrighted content in the respective environment, and reduces the computing power required to display reflections off surfaces, and thus ensures efficient consumption of computing resources by the computer system.

In some embodiments changing the one or more characteristics of the one or more animations includes in accordance with a determination that the number of application user interfaces that are being displayed concurrently with the respective environment exceeds a threshold number of application user interfaces, such as threshold 722 in FIG. 7D (e.g., 1, 2, 3, 4, 5, 10, 20, 50, or 100 application user interfaces), ceasing to animate the one or more ambient elements, such as ceasing animation for ambient elements 740 and 744 in FIG. 7D (826). In some embodiments, the computer system ceases to animate some or all ambient elements if the number of application user interfaces displayed exceeds the threshold number of application user interfaces. In some embodiments, the computer system ceases to animate some ambient elements if the number of application user interfaces displayed exceeds the threshold number of application user interfaces. In some embodiments, the computer system reduces frame rate and/or pixel density of one or more application user interfaces, reduces number of and/or pixel density of ambient elements, reduces frame rate of animations for the ambient elements, and/or reduces frame rate and/or pixel density of the respect environment if the number of application user interfaces displayed exceeds the threshold number of application user interfaces. In some embodiments, ceasing to animate ambient elements includes freezing animations of the ambient elements while continuing to display the ambient elements as static versions. In some embodiments, ceasing to animate ambient elements includes ceasing display of some or all of the ambient elements and respective animations all together. Ceasing animations in the respective environment if the number of application user interfaces displayed exceeds a threshold number ensures efficient consumption of computing resources by the computer system (e.g., reducing animations to reduce computing resource consumption), without the need for user input to do so, and thereby improves user-device interactions.

In some embodiments, after ceasing to animate the one or more ambient elements (828*a*), the computer system detects (828*b*) that the number of application user interfaces that are being displayed concurrently with the respective environment has reduced to being within the threshold number of application user interfaces (e.g., 1, 3, 5, 10, 20, 50, or 100 application user interfaces), such as number of application user interfaces displayed being within threshold 722 in FIG. 7C.

In some embodiments, in response to detecting that the number of application user interfaces that are being displayed concurrently with the respective environment has reduced to being within the threshold number of application user interfaces, the computer system resumes (828*c*) the one or more animations of the one or more ambient elements, such as resuming animations of ambient elements 738, 742, 744, 748, and 750 from FIG. 7D to 7C. In some embodiments, the computer system resumes animation of some or all ambient elements if the number of application user interfaces displayed is reduced to being within the threshold number of application user interfaces. In some embodiments, the computer system resumes animation for some ambient elements (e.g., those that were ceased) if the number of application user interfaces displayed is reduced to being within the threshold number of application user interfaces. In some embodiments, the computer system increases frame rate and/or pixel density of one or more application user interfaces, increases number of and/or pixel density of ambient elements, increases frame rate of animations for the ambient elements, and/or increases frame rate and/or pixel density of the respect environment if the number of application user interfaces displayed is reduced to being within the threshold number of application user interfaces. In some embodiments, resuming animations of the ambient elements includes unfreezing (e.g., resuming) animations of the ambient elements if the ambient elements were previously frozen as described with respect to step 826. In some embodiments, resuming animations of the ambient elements includes redisplaying some or all of the ambient elements and animating some or all of the ambient elements if display of some or all of the ambient elements and respective animations were ceased all together as described with respect to step 826. Resuming animations in the respective environment if the number of application user interfaces is reduced to being within a threshold number ensures efficient consumption of computing resources by the computer system, without the need for user input to do so, and thereby improves user-device interactions.

In some embodiments, changing the one or more characteristics of the one or more animations includes in response to detecting that the number of application user interfaces that are being displayed concurrently with the respective environment exceeds a threshold number of application user interfaces (e.g., 1, 3, 5, 10, 20, 50, or 100 application user interfaces), ceasing to animate at least one ambient element (e.g., virtual sky or virtual water) of the one or more ambient elements, such as ceasing to animate virtual sky represented by ambient element 738 in FIG. 7D, while maintaining at least one animation for another ambient element (e.g., virtual grass, virtual plants, or virtual animals) of the one or more ambient elements (830), such as maintaining animation of a virtual mountain if it were displayed in FIG. 7D. In some embodiments, ceasing to animate at least one ambient element includes freezing animation of the at least one ambient element or ceasing display of the at least one ambient element and respective animation all together, as described with respect to step 826. Ceasing some animations in the respective environment if the number of application user interfaces displayed exceeds a threshold number ensures efficient consumption of computing resources by the computer system (e.g., reducing unnecessary animations to reduce computing resource consumption), without the need for user input to do so, and thereby improves user-device interactions.

In some embodiments, maintaining the at least one animation for the other ambient element includes maintaining the animation for simulated water (e.g., animation for water reflection), such as virtual water represented by ambient element 750 in FIG. 7C, an animation for a simulated sky (e.g., animation for rainfall, snowfall, wind, or fog), such as virtual sky represented by ambient element 738 in FIG. 7C, or both (832). Maintaining some animations in the respective environment despite the number of application user interfaces exceeding a threshold number ensures efficient consumption of computing resources by the computer system while maintaining consistency of presentation of the environment, without the need for user input to do so, and thereby improves user-device interactions.

In some embodiments, changing the level of detail with which the respective environment is being displayed includes changing a level of detail corresponding to a simulated sky in the respective environment with a flow map (834), such as simulated sky illustrated via side view 745 in FIG. 7B. In some embodiments, the flow map includes one or more layers corresponding to the simulated sky, where each layer represents a visualization of a subset or common features of the simulated sky, and where when put together form the totality of the simulated sky. In some embodiments, the flow map depicts movement of ambient elements and respective animations associated with a change in the level of detail for each layer corresponding to the simulate sky. In some embodiments, changing the level of detail corresponding to the simulated sky includes changing a pixel density of the simulated sky, number of ambient elements (e.g., virtual clouds) displayed, and animations for the ambient elements (e.g., virtual cloud shadows). A flow map helps precisely change the level of detail when generating a simulated sky in the respective environment, and thus improves user-device interactions.

In some embodiments, the flow map includes more than one layer corresponding to the simulated sky (e.g., a layer for a virtual sky, a layer for one or more virtual clouds, and a layer for one or more corresponding virtual cloud shadows), such as layer corresponding to ambient elements 738, 740, and 746 in FIG. 7B, and changing the level of detail corresponding to the simulated sky includes changing a level of detail corresponding to one or more layers of the flow map (836). In some embodiments, the level of detail for respective layers corresponding to the simulated sky are changed simultaneously. In some embodiments, the level of detail for respective layers corresponding to the simulated sky are changed one at a time. In some embodiments, changing the level of detail for the layer for the virtual sky includes changing the pixel density of the virtual sky. In some embodiments, changing the level of detail for the layer for the virtual clouds includes changing the number, pixel density, and/or frame rate of virtual clouds (e.g., animated virtual clouds) displayed. In some embodiments, changing the level of detail for the layer for the virtual cloud shadows includes changing the number, pixel density, and/or frame rate of the virtual cloud shadows (e.g., animated virtual cloud shadows) displayed. In some embodiments, each layer corresponding to the simulated sky are changed by the same level of detail. In some embodiments, respective layers corresponding to the simulated sky are changed different levels of detail. In some embodiments, a set of layers corresponding to the simulated sky are each changed by the same level of detail while another set of layers corresponding to the simulated sky are each changed a different level of detail. In some embodiments, a set of layers corresponding to the simulated sky are each changed by the same or different levels of detail while another set of layers corresponding to the simulated sky are not changed. Changing the level of detail for a simulated sky by changing the level of detail for respective layers of the simulated sky generates a precise simulated sky with a higher level of detail and provides more flexibility for adjustments to the simulating sky while being less resource intensive, and thus improves user-device interactions.

In some embodiments, changing the level of detail with which the respective environment is displayed includes changing a pixel density of the respective environment, such as changing a pixel density of respective environment 704 in FIGS. 7A and 7A1 (838). In some embodiments, the pixel density of the respective environment includes a pixel density of the entire respective environment. In some embodiments, the pixel density of the respective environment includes a pixel density of one or more components (e.g., application user interface(s), virtual element(s) such as a virtual car, and/or ambient element(s) such as virtual clouds or a virtual animal) in the respective environment. In some embodiments, changing the level of detail includes changing respective pixel densities of virtual element(s) such as a virtual car, ambient element(s), or any virtual object displayed in the respective environment, and/or changing respective pixel densities of application user interfaces displayed concurrently with the respective environments. In some embodiments, changing the level of detail includes decreasing the level of detail with which the respective environment is displayed by reducing respective pixel densities of the respective environment, the virtual element(s) such as ambient element(s), and/or the application user interface(s). In some embodiments, the pixel density of the respective environment is reduced from 40 pixels per degree (ppd) to 20 pixels per degree (ppd). In some embodiments, changing the level of detail includes increasing the level of detail with which the respective environment is displayed by increasing respective pixel densities of the respective environment, the virtual element(s) such as ambient element(s), and/or the application user interface(s). In some embodiments, the pixel density of the respective environment is increased from 20 pixels per degree (ppd) to 40 pixels per degree (ppd). Changing pixel density of a respective environment to increase or decrease the level of detail with which the respective environment is being displayed ensures efficient consumption of computing resources by the computer system, without the need for user input to do so, and thereby improves user-device interactions.

In some embodiments, changing the level of detail with which the respective environment is being displayed includes in accordance with a determination that at least one active application user interface is being displayed concurrently with the respective environment, maintaining a pixel density of the at least one active application user interface at a higher level than a pixel density of the respective environment, such as a characteristic of application user interface 726*a* being higher than a characteristic of application user interface 726*b* in FIGS. 7A and 7A1 (840). In some embodiments, the pixel density of the respective environment includes a pixel density of the entire respective environment. In some embodiments, the pixel density of the respective environment includes a pixel density of one or more components (e.g., application user interface(s), virtual element(s) such as a virtual car, and/or ambient element(s) such as virtual clouds or a virtual animal) in the respective environment. In some embodiments, a pixel density of an active application user interface is maintained at the same level of pixel density as the respective environment. In some embodiments, a plurality of active application user interfaces is displayed concurrently with the respective environment. Accordingly, each of the plurality of active application user interfaces is optionally maintained at a higher pixel density than the respective environment. In some embodiments, if non-active application user interfaces are being displayed concurrently with the respective environment, then the respective pixel densities of the non-active application user interfaces are changed (e.g., decreased) compared to the pixel density of the respective environment. Maintaining an active application user interface at a higher pixel density than the respective environment helps ensure desired interaction with the active application user interface and reduces errors in interaction with the application user interface, and thus improves user-device interactions.

In some embodiments, changing (e.g., decreasing) the level of detail with which the respective environment is being displayed includes ceasing to display, in the respective environment, one or more ambient elements that are based on simulated light (e.g., virtual shadows such as virtual cloud shadows or virtual tree shadows), such as ambient elements 746 and 748 in FIG. 7B (842). In some embodiments, decreasing the level of detail includes decreasing the number and/or pixel density of the ambient elements based on simulated light (e.g., in the respective environment). In some embodiments, the simulated light corresponds to natural light (e.g., based on sunrise, afternoon, or sunset from the physical environment) and/or artificial light (e.g., a lamp from the physical environment). Accordingly, virtual shadows based on the natural light and/or artificial light (e.g., afternoon shadows or shadows based on a lamp light) are optionally displayed in the respective environment. In some embodiments, decreasing the level of detail includes decreasing the number, pixel density, and/or frame rate of animations for the ambient elements based on simulated light. Changing a level of detail at which to display the respective environment by ceasing display of ambient elements based on simulated light ensures efficient consumption of computing resources by the computer system (e.g., to reduce computing resource consumption), without the need for user input to do so, and thereby improves user-device interactions.

In some embodiments, changing the level of detail with which the respective environment is being displayed includes ceasing to display, in the respective environment, at least one ambient element that is based on simulated light (e.g., virtual cloud shadows), such as ambient elements 746 from FIG. 7B is not displayed in FIG. 7C, while maintaining display, in the respective environment, of at least another ambient element that is based on simulated light (e.g., virtual tree shadows), such as ambient elements 748 in FIG. 7C (844). In some embodiments, changing the level of detail includes decreasing the number and/or pixel density of the virtual cloud shadows while maintaining the number and/or pixel density of the virtual tree shadows. In some embodiments, changing the level of detail includes decreasing the number, pixel density, and/or frame rate of the virtual cloud shadows while maintaining the level of detail includes decreasing the number, pixel density, and/or frame rate of the virtual tree shadows. Changing a level of detail at which to display the respective environment by ceasing display of some ambient elements based on simulated light while maintaining display of other ambient element based on simulated light ensures efficient consumption of computing resources by the computer system (e.g., ceasing display of unnecessary ambient elements based on simulated light to reduce computing resource consumption), without the need for user input to do so, and thereby improves user-device interactions.

In some embodiments, changing the level of detail with which the respective environment is being displayed includes changing the level of detail based on an amount of processing power required by the number of application user interfaces concurrently displayed with the respective environment, such as the processing power required by application user interfaces 726*a* and 726*b* concurrently displayed with the respective environment 704 in FIGS. 7A and 7A1 (846). In some embodiments, the level of detail is changed based on the amount of processing power required by the respective environment, including virtual element(s) such as ambient element(s) displayed in the respective environment, animations of the virtual element(s) such as ambient element(s), and/or the application user interface(s) displayed concurrently with the respective environment. In some embodiments, if the amount of power required by the application user interfaces concurrently displayed with the respective environment is greater than a threshold (e.g., application user interfaces consume greater than 30%, 50%, 70%, or 90% of the electronic device's battery), the level of detail with which the respective environment is displayed is decreased. For example, the computer system can optionally decrease the level of detail by reducing the total number of application user interface(s) displayed concurrently with the respective environment and/or reducing the number of power intensive application user interface(s) concurrently displayed with the respective environment, and thus reducing the processing power required by the application user interface(s) to be within the threshold. In some embodiments, the computer system can decrease the level of detail by reducing the total number of active application user interface(s) displayed concurrently with the respective environment and consuming processing power, and thus reducing the processing power required by the application user interface(s) to be within the threshold. In some embodiments, the computer system can decrease the level of detail by causing certain application user interface(s) (e.g., application user interface(s) not currently being used by the user) to run in the background to reduce the processing power required by the application user interface(s) to be within the threshold. In some embodiments, decreasing the level of detail with which the respective environment is displayed includes decreasing the number of virtual element(s) such as ambient element(s) displayed and/or the number of virtual element(s) such as ambient element(s) animated. In some embodiments, if the amount of power required by the application user interfaces concurrently displayed with the respective environment is less than the threshold (e.g., application user interfaces consume less than 30%, 50%, 70%, or 90% of the electronic device's current power budget), the level of detail with which the respective environment is displayed is increased. For example, the computer system can optionally increase the level of detail by increasing the total number of application user interface(s) displayed concurrently with the respective environment and/or increasing the number of power intensive application user interface(s) concurrently displayed with the respective environment. In some embodiments, the computer system can increase the level of detail by increasing the total number of active application user interface(s) displayed concurrently with the respective environment and consuming processing power. In some embodiments, increasing the level of detail with which the respective environment is displayed includes increasing the number of virtual element(s) such as ambient element(s) displayed and/or the number of virtual element(s) such as ambient element(s) animated. Changing the amount of processing power required by the number of application user interfaces displayed with the respective environment to increase or decrease the level of detail with which the respective environment is being displayed ensures efficient consumption of computing resources by the computer system, without the need for user input to do so, and thereby improves user-device interactions.

In some embodiments, changing the level of detail with which the respective environment is being displayed includes changing a resolution of one or more virtual elements in the respective environment, such as the virtual elements of FIGS. 7A-7J. For example, reducing the level of detail (e.g., as described herein) optionally includes reducing the resolution of one or more virtual elements in the respective environment, and increasing the level of detail (e.g., as described herein) optionally includes increasing the resolution of one or more virtual elements in the respective environment. In some embodiments, the one or more virtual elements include virtual trees, virtual water, virtual sand, virtual bird, virtual grass, virtual mountains, virtual clouds, virtual shadows, virtual lighting effects and/or any other element that is visible in the respective environment. Changing a resolution at which to display a respective environment when changing a level of detail of the respective environment ensures efficient consumption of computing resources by the computer system when needed, without the need for user input to do so, and thereby improves user-device interactions.

In some embodiments, while displaying the respective environment with a first level of detail such as environment 706 in FIG. 7E (e.g., a relative high level of detail in response to one or more conditions that allow for a relatively higher level of detail, as described herein), higher than a second level of detail at which the respective environment can be displayed (e.g., a relative low level of detail in response to one or more conditions that require a relatively lower level of detail, as described herein), the computer system displays a first portion of the respective environment with a texture that includes a first level of animation, such as portion 760*a* in FIG. 7E. For example, the first portion of the respective environment is a first portion of virtual water, virtual grass, virtual sand, virtual snow, virtual sky and/or any other virtual element that is visible in the respective environment. In some embodiments, the texture defines the appearance of the first portion of the respective environment, optionally different from a size and/or shape of the first portion of the respective environment, such as the colors, the brightness, the contours, the reflectivity, and/or the opacity of the first portion of the respective environment. In some embodiments, the texture has one or more of the characteristics of the texture described with reference to method 2100. In some embodiments, the animation is of one or more characteristics (e.g., position, size, brightness and/or orientation) of one or more portions of the texture, such as the animation of ripples in simulated water, or the animation of simulated sand blowing in response to simulated wind. In some embodiments, the first level of animation corresponds to relatively high quality animation of the first portion of the respective environment, such as utilizing relatively high resolution elements for the first portion of the respective environment, relatively high numbers of elements that are animated in the first portion of the respective environment and/or relatively high frequency of animation of the elements in the first portion of the respective environment.

In some embodiments, while displaying the respective environment with the first level of detail (e.g., a relative high level of detail in response to one or more conditions that allow for a relatively higher level of detail, as described herein), higher than the second level of detail at which the respective environment can be displayed (e.g., a relative low level of detail in response to one or more conditions that require a relatively lower level of detail, as described herein), the computer system displays a second portion of the respective environment with a texture (e.g., having one or more characteristics of the texture of the first portion) that includes a second level of animation, less than the first level of animation, such as portion 760*b* in FIG. 7E. For example, the second portion of the respective environment is a second portion of virtual water, virtual grass, virtual sand, virtual snow, virtual sky and/or any other virtual element that is visible in the respective environment. In some embodiments, the second level of animation corresponds to relatively moderate quality animation of the second portion of the respective environment (e.g., less than the relatively high quality animation of the first portion), such as utilizing relatively moderate resolution elements for the second portion of the respective environment, relatively moderate numbers of elements that are animated in the second portion of the respective environment and/or relatively moderate frequency of animation of the elements in the second portion of the respective environment.

In some embodiments, the first portion of the respective environment is closer to a viewpoint of a user in the respective environment than the second portion, such as portion 760*a* being closer to the viewpoint of the user than portion 760*b* in FIG. 7E. Thus, in some embodiments, the computer system displays parts of the respective environment that are closer to the viewpoint of the user with higher quality animation than parts of the respective environment that are further from the viewpoint of the user. Displaying different parts of the respective environment with differing qualities of animation ensures efficient consumption of computing resources by the computer system (e.g., reduced power consumption) while maintaining the perceived quality of display of the respective environment, and thereby improves user-device interactions.

In some embodiments, the respective environment includes a third portion, the second portion of the respective environment is closer to the viewpoint of the user in the respective environment than the third portion of the respective environment, and the third portion of the respective environment is displayed with a texture (e.g., having one or more characteristics of the texture of the first and/or second portions) that does not include animation, such as portion 760*c* in FIG. 7E. For example, the third portion of the respective environment is a third portion of virtual water, virtual grass, virtual sand, virtual snow, virtual sky and/or any other virtual element that is visible in the respective environment. In some embodiments, the computer system displays parts of the respective environment that are further or furthest from the viewpoint of the user without animation and/or with other aspects of quality that correspond to the quality of display of a portion of the respective environment described herein at a relatively low level, such as a relatively low resolution. Displaying relative distant parts of the respective environment with without animation ensures efficient consumption of computing resources by the computer system (e.g., reduced power consumption) while maintaining the perceived quality of display of the respective environment, and thereby improves user-device interactions.

In some embodiments, the texture that includes the first level of animation and the texture that includes the second level of animation correspond to a surface of simulated water in the respective environment, such as the simulated water in environment 706 in FIG. 7E. In some embodiments, the textures and/or animations correspond to simulated water ripples on the surface of the simulated water. In some embodiments, the computer system displays higher quality animations of the simulated water ripples in the first portion of the respective environment, displays lower quality animations of the simulated water ripples in the second portion of the respective environment, and displays no animations of the simulated water ripples in the third portion of the respective environment. Displaying different parts of simulated water with differing qualities of animation ensures efficient consumption of computing resources by the computer system (e.g., reduced power consumption) while maintaining the perceived quality of display of the simulated water, and thereby improves user-device interactions.

In some embodiments, changing (e.g., reducing or increasing) the level of detail with which the respective environment is displayed from a first level of detail (e.g., as described herein) to a second level of detail (e.g., as described herein), such as the changes in detail described with reference to FIGS. 7A-7D, includes changing the level of detail such that display of the respective environment requires at most a respective amount of power (and/or computing resources) corresponding to the second level of detail (e.g., optionally different levels of detail, such as high, moderate or low, have different respective amounts of power that can be consumed by the computer system to display those levels of detail), wherein the respective amount of power corresponding to the second level of detail is the same whether the respective environment is a first environment or a second environment different from the first environment. In some embodiments, the computer system enforces power consumption limits (e.g., power budgets) on the display of a respective environment for a given level of detail, such that one or more aspects of detail (e.g., as described with reference to method 800) are modulated by the computer system to ensure that display of the respective environment falls within the corresponding power consumption limit. In some embodiments, for a given level of detail (e.g., high, moderate or low), the computer system utilizes the same power consumption limit for different environments. In some embodiments, the computer system modulates different aspects (e.g., animations, resolution and/or any other aspect of detail or quality described herein) of different environments differently to fall within the corresponding power consumption limit. Enforcing the same power consumption limits across different environments for a given level of detail ensures consistent display of different environments, which reduces disjointedness in switching between environments and reduces errors in interaction with the computer system, and thereby improves user-device interactions.

It should be understood that the particular order in which the operations in method 800 have been described is merely exemplary and is not intended to indicate that the described order is the only order in which the operations could be performed. One of ordinary skill in the art would recognize various ways to reorder the operations described herein.

FIGS. 9A-9E illustrate examples of a computer system applying a neutralization adjustment to generate a representation of the physical environment in accordance with some embodiments.

Figure 9A:
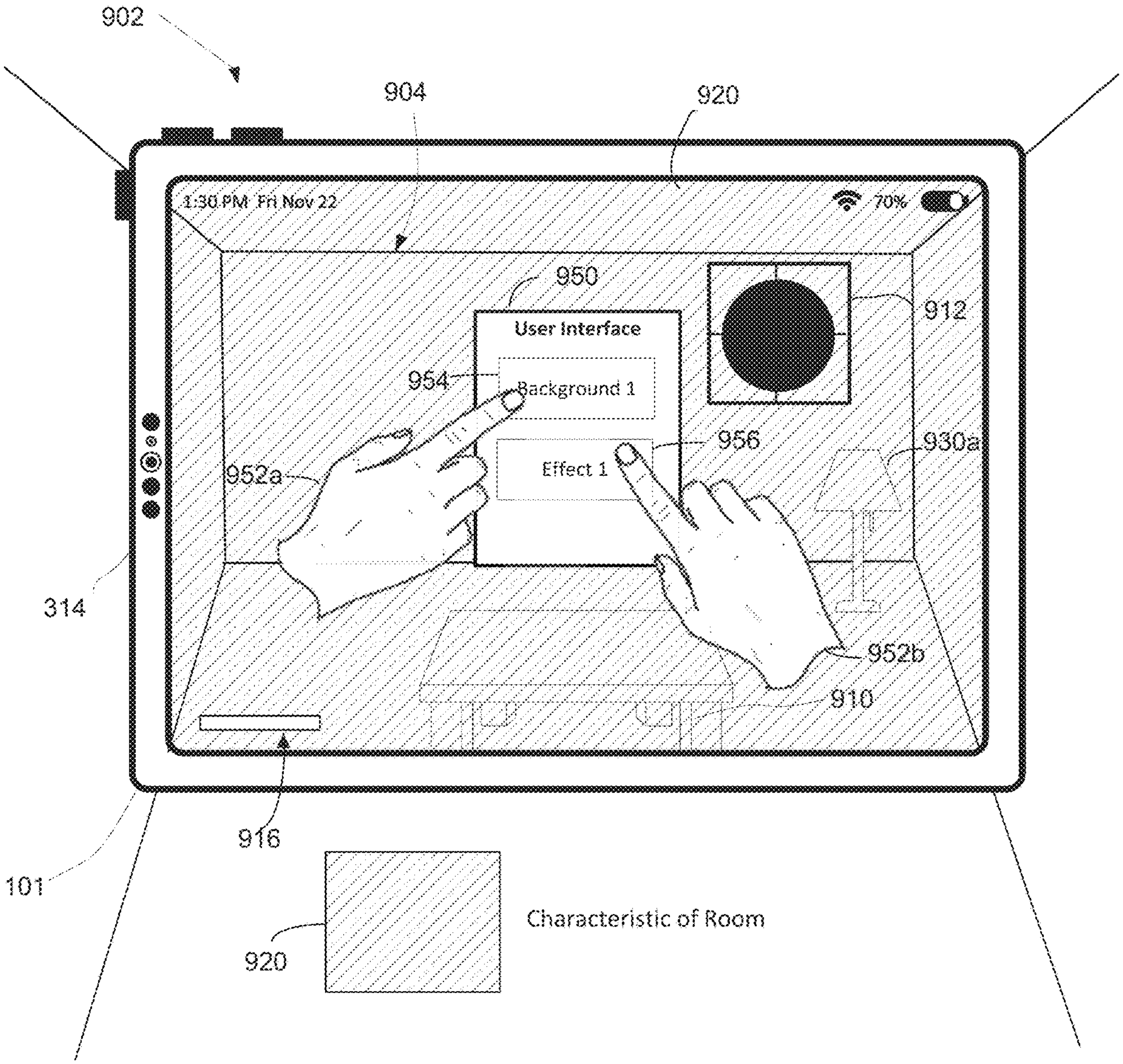
FIGS. 9A-9E illustrate examples of a computer system applies a neutralization adjustment to generate a representation of the physical environment in accordance with some embodiments.

FIG. 9A illustrates a computer system 101 (e.g., an electronic device) displaying, via a display generation component (e.g., display generation component 120 of FIG. 1), a three-dimensional environment 904 from a viewpoint of a user of the computer system 101 (e.g., facing the back wall of the physical environment in which computer system 101 is located). In some embodiments, the computer system 101 includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or attention (e.g., including gaze) of the user (e.g., internal sensors facing inwards towards the face of the user).

As shown in FIG. 9A, the computer system 101 captures one or more images of a physical environment around computer system 101 (e.g., operating environment 100), including one or more objects (e.g., table 910) in the physical environment 902 around computer the system 101. In some embodiments, the computer system 101 displays representations of the physical environment in the three-dimensional environment or portions of the physical environment are visible via the display generation component 120 of computer system 101. For example, the three-dimensional environment 904 includes a table 910, a lamp 930*a* which is turned on, natural light from afternoon sun 912, and portions of the floor in the physical environment 902.

Figure 9B:
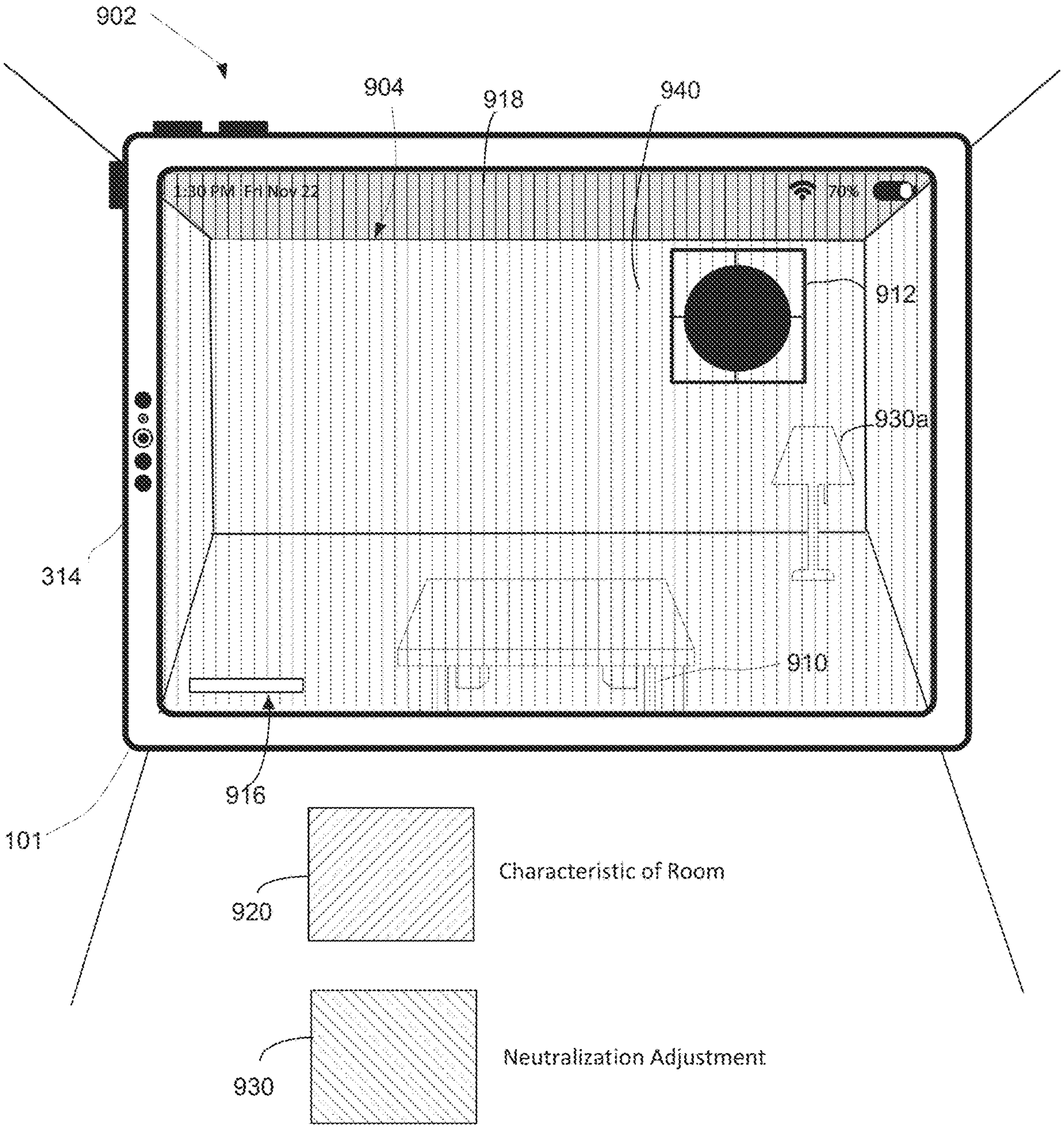
Figure 9C:
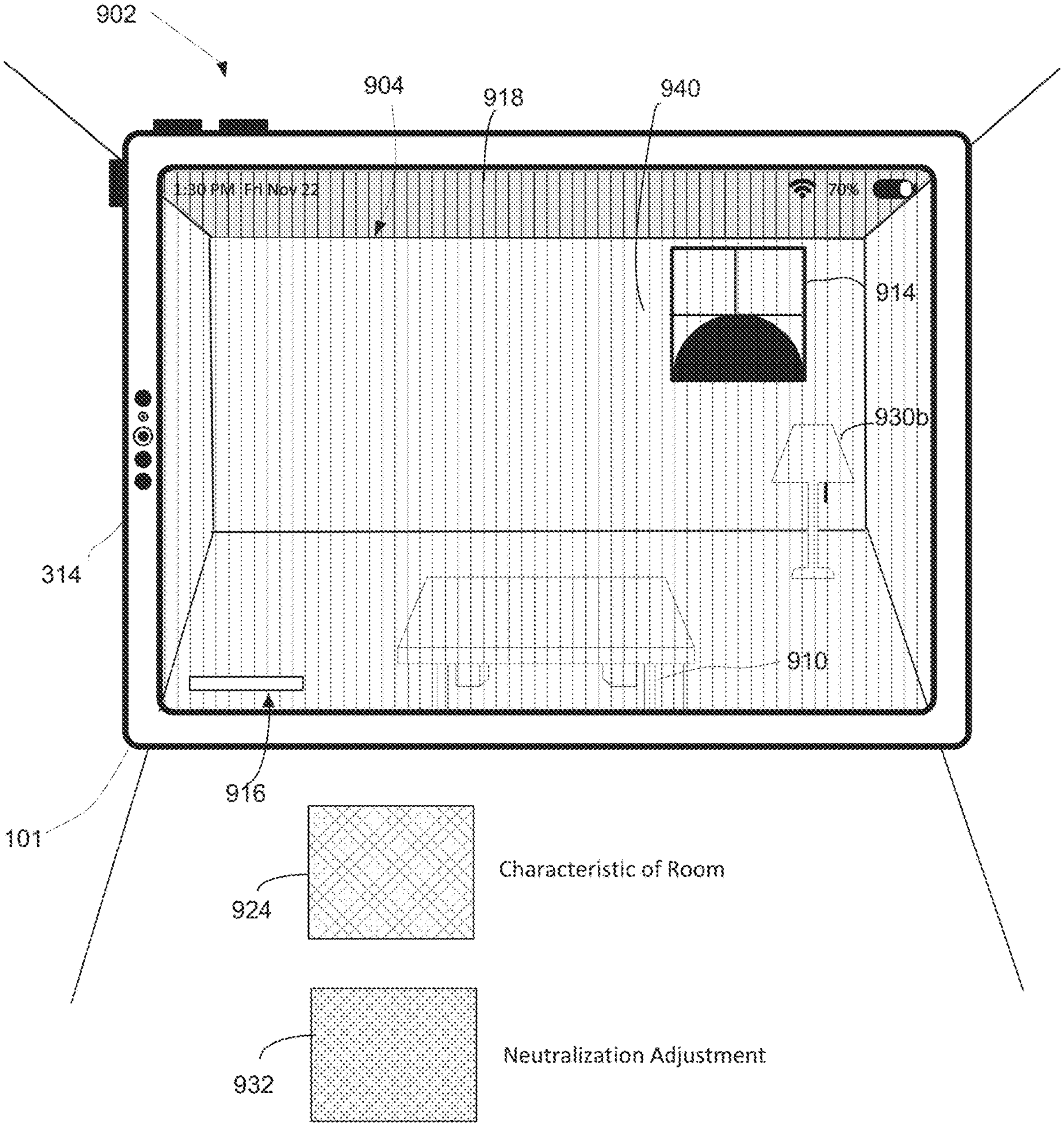

In some embodiments, a virtual environment, optionally a simulated three-dimensional environment, is displayed in three-dimensional environment 904, optionally concurrently with the representation of the physical environment 902 (e.g., partial immersion as illustrated in FIGS. 9B and 9C) or optionally instead of the representations of the physical environment 902 (e.g., full immersion). Some examples of the virtual environment include a virtual sky as illustrated in FIGS. 9B and 9C and further described with reference to methods 1000 and/or 1800. In some embodiments, the virtual environment is based on a physical location. In some embodiments, a virtual environment is an artist-designed location and/or a simulated physical space. Thus, displaying a virtual environment in the three-dimensional environment 904 provides the user with a virtual experience as if the user is physically located in the virtual environment.

In FIG. 9A, the computer system 101 is displaying an immersion level indicator 916. In some embodiments, the immersion level indicator 916 indicates the current level of immersion (e.g., out of a maximum number of levels of immersion) with which computer system 101 is displaying the three-dimensional environment 904. In some embodiments, a level of immersion includes an amount of view of the physical environment that is obscured (e.g., replaced) by the virtual environment. In some embodiments, the level of immersion includes one or more characteristics of immersion described with reference to methods 1400, 1600, and/or 2000. In FIG. 9A, the immersion level indicator 916 indicates no immersion; thus, the physical environment is fully visible in the three-dimensional environment 904. In some embodiments, the computer system does not display the immersion level indicator 916 in the three-dimensional environment 904.

In FIG. 9A, the three-dimensional environment 904 has a visual appearance corresponding to a characteristic 920 of a room in the physical environment 902. The characteristic 920 of the room optionally includes brightness, tint, reflectivity, and/or other visual effect due to physical lighting sources(s) and/or other physical environmental factors with respect to the room in the physical environment 902. As shown in FIG. 9A, the characteristic 920 of the room in the physical environment 902 is based on natural light from the afternoon sun 912 and/or artificial light from the lamp 930*a* which is turned on In some embodiments, the room having characteristic 920 that is displayed, visible, and/or presented to the user is based on (e.g., is a photorealistic representation of) the physical environment 902 around the device and/or user, such as via actual passthrough via the display generation component 120 (e.g., a transparent or semi-transparent display generation component) or digital passthrough via the display generation component 120. For example, the physical environment 902 has a yellow tint due to the characteristic 920 of the room corresponding to the lighting from the afternoon sun 912 and/or artificial light from the lamp 930*a*. In FIG. 9A, the computer system displays user interface 950 including a selectable option 954 for displaying a virtual environment (e.g., Background 1) and a selectable option 956 for applying a color filter (e.g., Effect 1) to the portion of the physical environment 902 that is visible in three-dimensional environment 904. In FIG. 9A, the computer system 101 receives input from hand 952*a* of a user corresponding to a selection to display the virtual environment (e.g., Background 1) from the user interface 950 (e.g., an air pinch gesture from hand 952*a* while attention of the user is directed to selectable option 954 or air tapping the selectable option 954). Alternatively, the computer system 101 receives input from the hand 952*b* of the user corresponding to applying the color filter (e.g., Effect 1) from the user interface 950 (e.g., an air pinch gesture from hand 952*b* while attention of the user is directed to selectable option 956 or air tapping the selectable option 956).

FIG. 9A1 illustrates similar and/or the same concepts as those shown in FIG. 9A (with many of the same reference numbers). It is understood that unless indicated below, elements shown in FIG. 9A1 that have the same reference numbers as elements shown in FIGS. 9A-9E have one or more or all of the same characteristics. FIG. 9A1 includes computer system 101, which includes (or is the same as) display generation component 120. In some embodiments, computer system 101 and display generation component 120 have one or more of the characteristics of computer system 101 shown in FIGS. 9A and 9A-9E and display generation component 120 shown in FIGS. 1 and 3, respectively, and in some embodiments, computer system 101 and display generation component 120 shown in FIGS. 9A-9E have one or more of the characteristics of computer system 101 and display generation component 120 shown in FIG. 9A1.

In FIG. 9A1, display generation component 120 includes one or more internal image sensors 314*a* oriented towards the face of the user (e.g., eye tracking cameras 540 described with reference to FIG. 5). In some embodiments, internal image sensors 314*a* are used for eye tracking (e.g., detecting a gaze of the user). Internal image sensors 314*a* are optionally arranged on the left and right portions of display generation component 120 to enable eye tracking of the user's left and right eyes. Display generation component 120 also includes external image sensors 314*b* and 314*c* facing outwards from the user to detect and/or capture the physical environment and/or movements of the user's hands. In some embodiments, image sensors 314*a*, 314*b*, and 314*c* have one or more of the characteristics of image sensors 314 described with reference to FIGS. 9A-9E.

In FIG. 9A1, display generation component 120 is illustrated as displaying content that optionally corresponds to the content that is described as being displayed and/or visible via display generation component 120 with reference to FIGS. 9A-9E. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 9A1.

Display generation component 120 has a field of view (e.g., a field of view captured by external image sensors 314*b* and 314*c* and/or visible to the user via display generation component 120, indicated by dashed lines in the overhead view) that corresponds to the content shown in FIG. 9A1. Because display generation component 120 is optionally a head-mounted device, the field of view of display generation component 120 is optionally the same as or similar to the field of view of the user.

In FIG. 9A1, the user is depicted as performing an air pinch gesture to provide an input to computer system 101 to provide a user input directed to content displayed by computer system 101 (e.g., an air pinch input from hand 952*a* while attention of the user is directed to the element Effect 1, indicated by gaze point 950*a*, and/or an air pinch input from hand 952*b* while attention of the user is directed to the element Background 1, indicated by gaze point 950*b*). Such depiction is intended to be exemplary rather than limiting; the user optionally provides user inputs using different air gestures and/or using other forms of input as described with reference to FIGS. 9A-9E.

In some embodiments, computer system 101 responds to user inputs as described with reference to FIGS. 9A-9E.

In the example of FIG. 9A1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 9A-9E and/or described with reference to the corresponding method(s) are optionally implemented on computer system 101 and display generation unit 120 in a manner similar or analogous to that shown in FIG. 9A1.

In FIG. 9B, the characteristic 920 of the room in the physical environment 902 is based on natural light from the afternoon sun 912 and/or artificial light from the lamp 930*a* which is turned on. Because the computer system 101 received input from hand 952*a* corresponding to a selection of displaying the virtual environment (e.g., Background 1) in FIG. 9A, the computer system displays Background 1 (e.g., virtual sky 918) in FIG. 9B. As shown in FIG. 9B, displaying the virtual sky 918 includes replacing portions of the physical ceiling in the physical environment 902 with a virtual sky scene. In some embodiments, as described with reference to method 1000, when displaying the virtual sky 918, computer system 101 applies a neutralization adjustment such that other portions of the room in the physical environment 902 (e.g., not obscured by the virtual sky) correspond to characteristic 940. In some embodiments, the characteristic 940 includes a tint, brightness, reflective, and/or other visual effect associated with the virtual sky 918 and is different from the characteristic 920 of the room. By applying the neutralization adjustment, the computer system 101 neutralizes the effects of the characteristic 920 of the room. In some embodiments, as described with reference to method 1000, applying a neutralization adjustment includes applying a color (optionally color temperature) neutralization. In some embodiments, applying a color (optionally color temperature) neutralization includes applying a different and/or opposite color (optionally color temperature) than the color (optionally color temperature) of the characteristic 920 of the room. Accordingly, in FIG. 9A, the computer system 101 applies a neutralization adjustment 930 to neutralize the characteristic 920 of the room based on the natural light from the afternoon sun 912 and/or artificial light from the lamp 930*a*, which is turned on, as in FIG. 9B. The computer system 101 neutralizes the characteristic 920 of the room by removing the yellow tint (e.g., decreasing level of yellow tint) from the three-dimensional environment 904 and/or physical environment 902 that is visible in the three-dimensional environment 904 and optionally subsequently (e.g., or concurrently) adding a tint (e.g., blue tint) to the three-dimensional environment 904 and/or physical environment 902 that is visible in the three-dimensional environment 904 corresponding to the Background 1 (e.g., virtual sky 918) that is displayed. In FIG. 9B, based on the neutralization adjustment 930 and the virtual sky 918 being displayed, the three-dimensional environment 904 has visual appearance corresponding to characteristic 940 different from the characteristic 920 of the room in FIG. 9A. In some embodiments, three-dimensional environment 904 including the virtual sky 918 and the room in the physical environment 902 having characteristic 940 is visible through the display generation component 120 via active and/or passive passthrough. In some embodiments, applying a neutralizing adjustment to the environment includes changing a color characteristic of the physical environment while optionally maintaining differences in color between objects in the room (e.g., a yellow table will be more yellowish than a red chair, and the red chair will be more reddish than the yellow table).

From FIG. 9B to FIG. 9C, the sun has set and/or the lamp is turned off in the room in the physical environment 902. Accordingly, in FIG. 9C, the characteristic 924 of the room in the physical environment 902 is based on natural light from the evening sun 912 and/or no artificial light from the lamp 930*b*, which is turned off. For example, the physical environment 902 has a red tint. In FIG. 9C, the computer system 101 maintains display of the virtual sky 918. In some embodiments, as described with reference to method 1000, while maintaining display of the virtual sky 918, the computer system 101 applies a neutralization adjustment such that other portions of the room in the physical environment 902 (e.g., not obscured by the virtual sky 918) correspond to characteristic 940. In some embodiments, the characteristic 940 includes a tint, brightness, reflective, and/or other visual effect associated with the virtual sky 918 and is different from the characteristic 924 of the room. By applying the neutralization adjustment, the computer system 101 neutralizes the effects of the characteristic 924 of the room. Because the characteristic 924 of the room (e.g., red tint) is different from the characteristic 920 of the room (e.g., yellow tint) of FIG. 9B, the computer system 101 applies a neutralization adjustment 932 different from the neutralization adjustment 930 of FIG. 9B to maintain the visual appearance the three-dimensional environment 904 corresponding to the characteristic 940 (e.g., based on the virtual sky 918 of FIG. 9B). In FIG. 9C, the neutralization adjustment 932 includes neutralizing the characteristic 924 of the room by removing the red tint (e.g., decreasing level of red tint) from the three-dimensional environment 904 and/or physical environment that is visible in the three-dimensional environment 904 and optionally subsequently (e.g., or concurrently) adding a tint (e.g., blue tint) to the three-dimensional environment 904 and/or physical environment that is visible in the three-dimensional environment 904 corresponding to the Background 1 (e.g., virtual sky 918) that is displayed. In FIG. 9C, based on the neutralization adjustment 932 and the virtual sky 918 being displayed, the computer system 101 maintains the visual appearance of the three-dimensional environment 904 corresponding to characteristic 940. As mentioned above, the three-dimensional environment 904 including the virtual sky 918 and the room in the physical environment 902 having characteristic 940 is optionally visible through the display generation component 120 via active and/or passive passthrough.

Figure 9D:
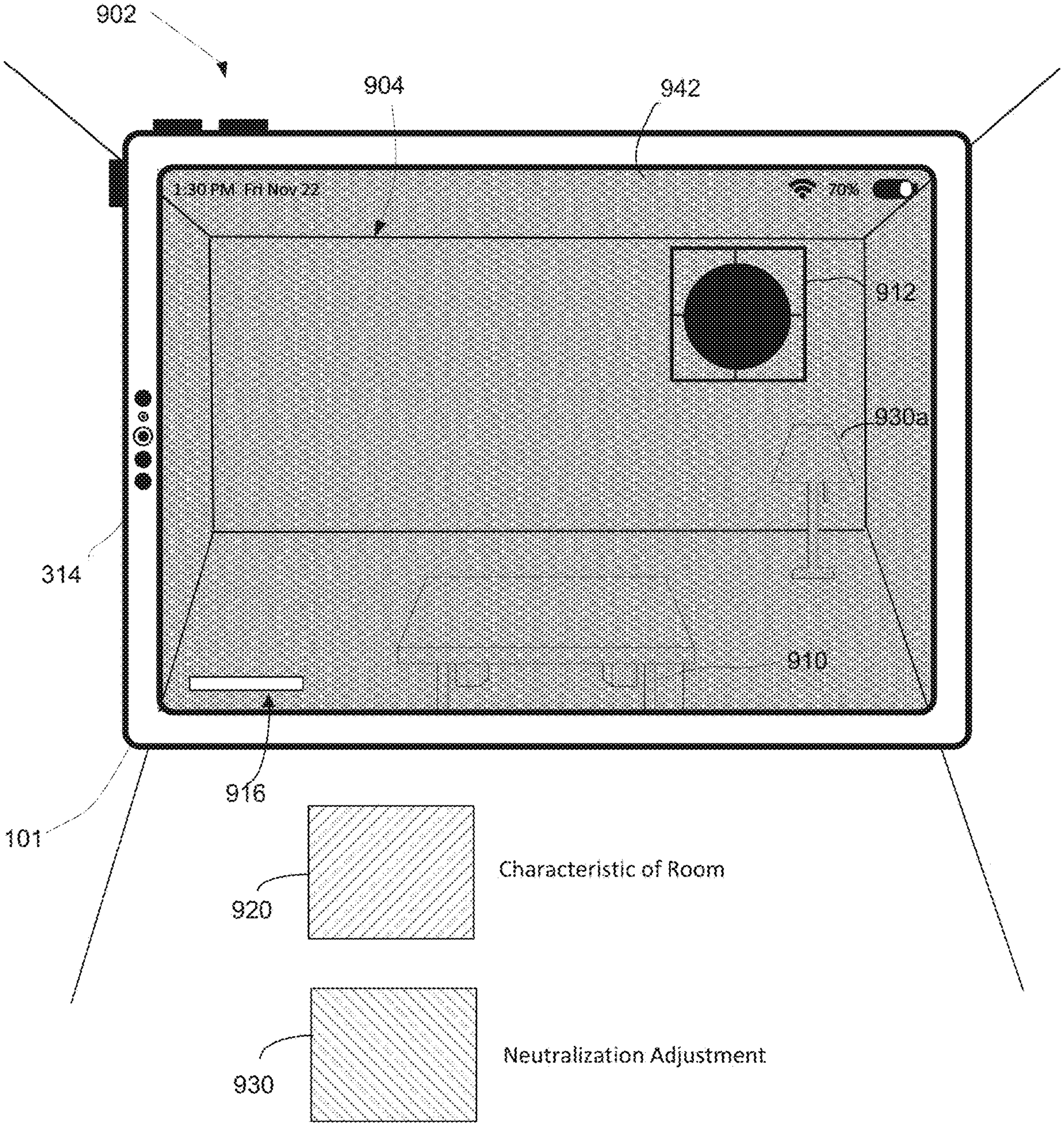

FIG. 9D illustrates display of the three-dimensional environment 904 based on selection of the alternative input (e.g., color filter) in FIG. 9A. Because the computer system 101 receives input from hand 952*b* corresponding to a selection of displaying the color filter (e.g., Effect 1) in FIG. 9A, the computer system 101 displays Effect 1 (e.g., green color filter) in FIG. 9D applied to the physical environment 902 that is visible in three-dimensional environment 904. In FIG. 9D, the characteristic 920 of the room in the physical environment 902 is based on the natural light from the afternoon sun 912 and/or artificial light from the lamp 930*a* which is turned on. In some embodiments, as described with reference to method 1000, while applying and/or displaying a color filter, the computer system 101 applies a neutralization adjustment such that portions of the room in the physical environment 902 correspond to characteristic 942. In some embodiments, the characteristic 942 includes a tint, brightness, reflective, and/or other visual effect associated with the color filter and is different from the characteristic 920 of the room. By applying the neutralization adjustment, the computer system 101 neutralizes the effects of the characteristic 920 of the room. Accordingly, the computer system 101 applies a neutralization adjustment 930 to neutralize the characteristic 920 of the room based on the natural light from the afternoon sun 912 and/or artificial light from the lamp 930*a*, which is turned on, as in FIG. 9D. The neutralization adjustment 930 in FIG. 9D is the same as in FIG. 9B because the computer system 101 applies the neutralization adjustment 930 in FIG. 9D to neutralize the characteristic 920 of the room, which is the same as in FIG. 9B. The computer system 101 neutralizes the characteristic 920 of the room by removing the yellow tint (e.g., decreasing level of yellow tint) from the three-dimensional environment 904 and/or physical environment 902 that is visible in the three-dimensional environment 904 and optionally subsequently (e.g., or concurrently) adding a tint (e.g., green tint) to the three-dimensional environment 904 and/or physical environment 902 that is visible in the three-dimensional environment 904 corresponding to the Effect 1 (e.g., green color filter). In FIG. 9D, based on the neutralization adjustment 930 (same neutralization adjustment from FIG. 9B) and the green color filter being applied, the three-dimensional environment 904 has a visual appearance corresponding to characteristic 942 (e.g., based on Effect 1). In some embodiments, the physical environment 902 corresponding to characteristic 942 based on the color filter is optionally visible through the display generation component 120 via active and/or passive passthrough.

Figure 9E:
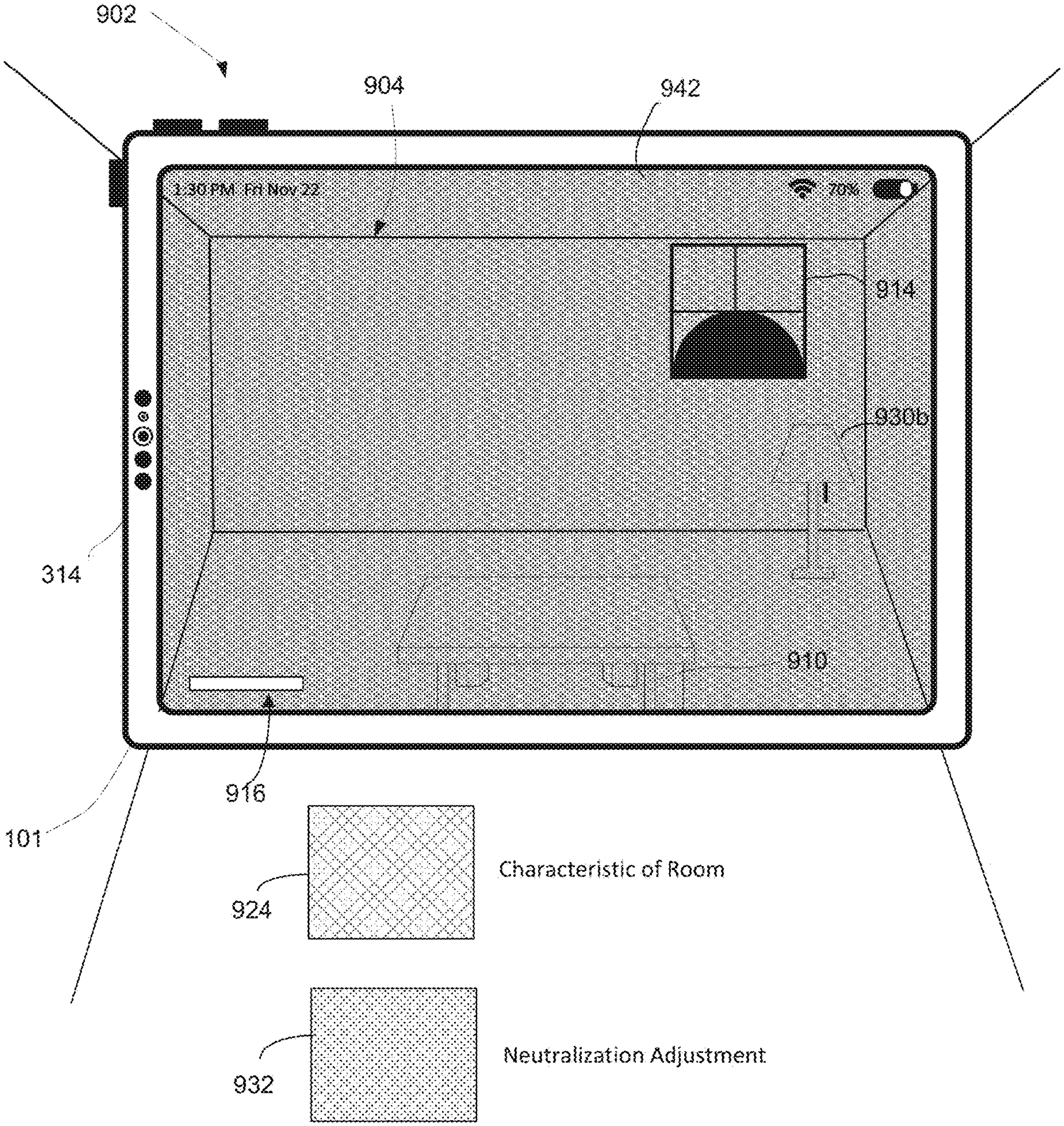
Figure 10A:
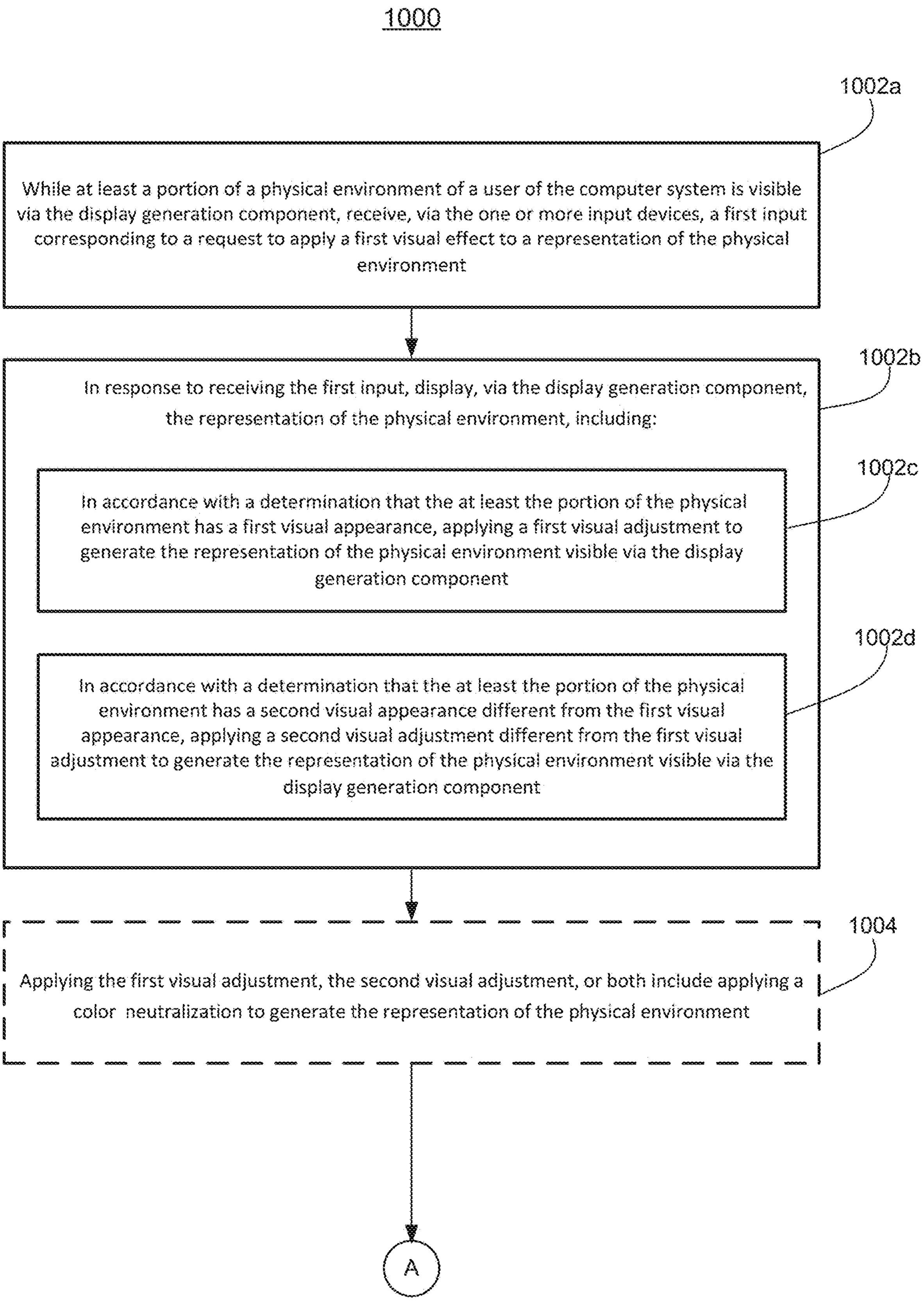
FIGS. 10A-10D is a flowchart illustrating a method of applying a neutralization adjustment to generate a representation of the physical environment in accordance with some embodiments.
Figure 10B:
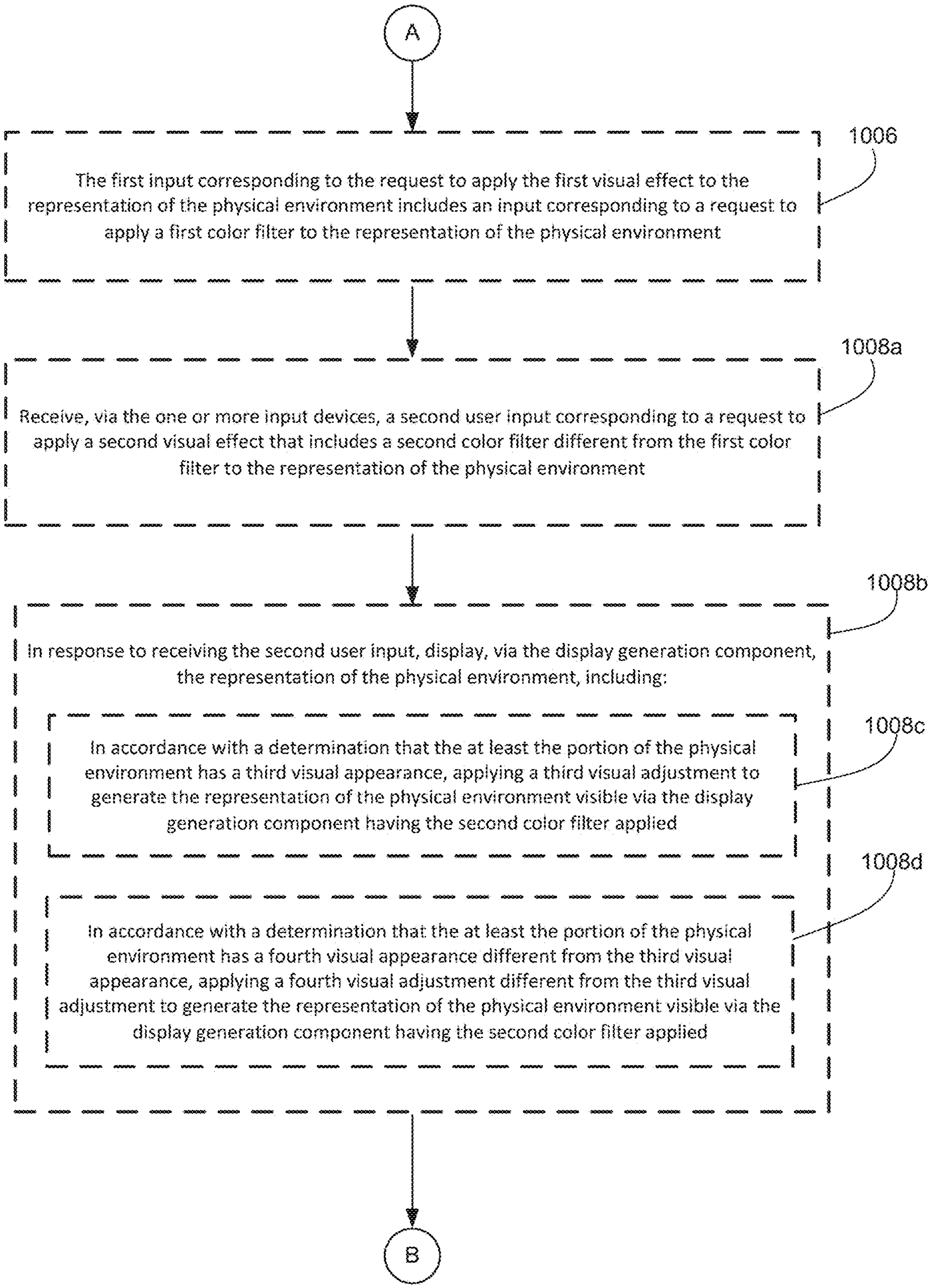
Figure 10C:
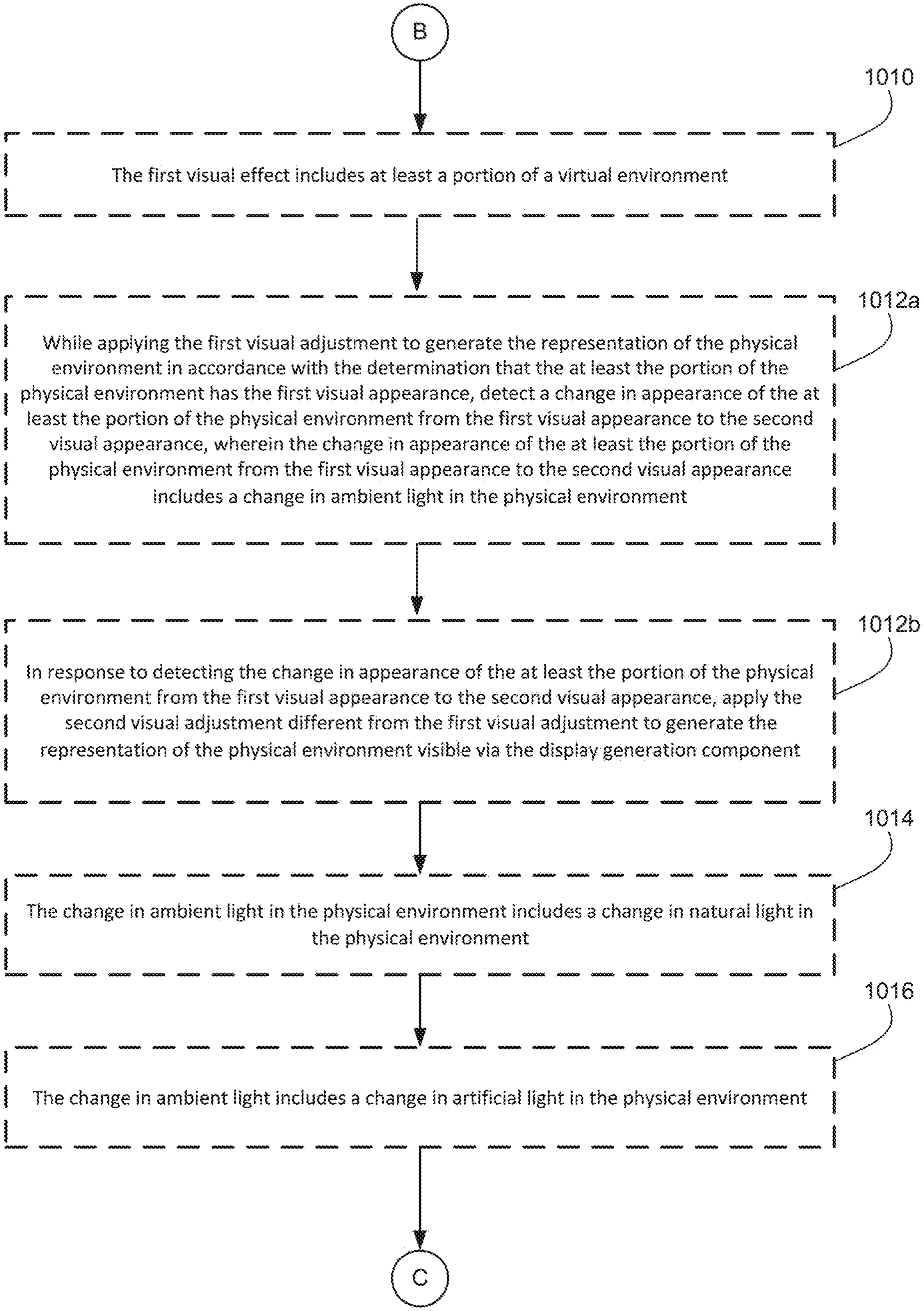
Figure 10D:
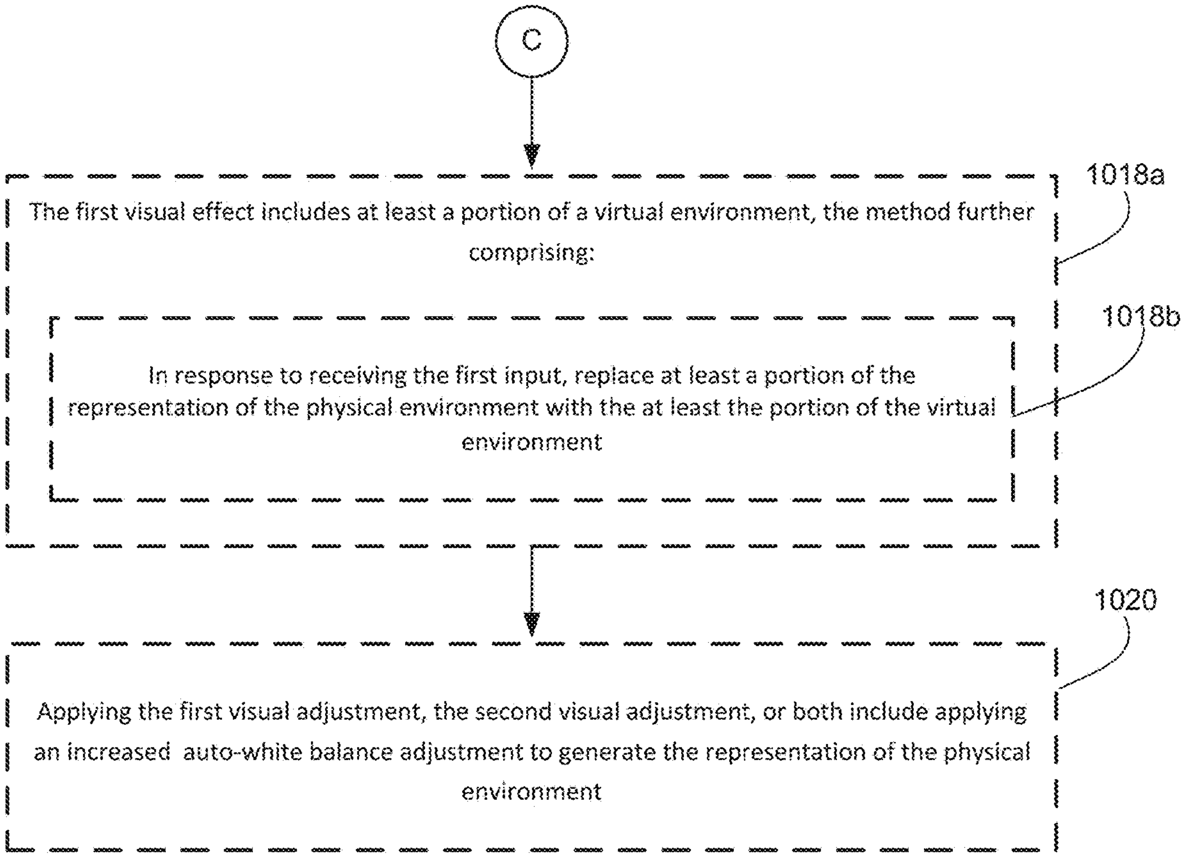

From FIG. 9D to FIG. 9E, the sun has set and/or the lamp is turned off in the physical environment 902. Accordingly, the characteristic 924 of the room in the physical environment 902 is based on the natural light from the evening sun 912 and/or no artificial light from the lamp 930*b* which is turned off. For example, the characteristic 924 of the room includes red tint. In FIG. 9E, the computer system 101 maintains display of Effect 1 (e.g., the green color filter). In some embodiments, as described with reference to method 1000, while maintaining display of the color filter, the computer system 101 applies a neutralization adjustment such that portions of the room in the physical environment 902 correspond to characteristic 942. In some embodiments, the characteristic 942 includes a tint, brightness, reflective, and/or other visual effect associated with the color filter and is different from the characteristic 924 of the room. By applying neutralization adjustment 932, the computer system 101 neutralizes the effects of the characteristic 924 of the room. Because the characteristic 924 of the room (e.g., red tint) is different from the characteristic 920 of the room (e.g., yellow tint) of FIG. 9D, the computer system 101 applies a neutralization adjustment 932 different from the neutralization adjustment 930 of FIG. 9D to maintain the visual appearance of the three-dimensional environment 904 corresponding to characteristic 942 (e.g., based on the green color filter of FIG. 9D). The neutralization adjustment 930 in FIG. 9E is the same as in FIG. 9C because the computer system 101 applies the neutralization adjustment 932 in FIG. 9E to neutralize the characteristic 924 of the room, which is the same as in FIG. 9C (e.g., despite the three-dimensional environment 904 corresponding to characteristic 940 after neutralization in FIG. 9C being different from the three-dimensional environment 904 corresponding to characteristic 942 after neutralization in FIG. 9E). In FIG. 9E, the neutralization adjustment 932 includes neutralizing the characteristic 924 of the room by removing the red tint (e.g., decreasing level of red tint) and optionally subsequently (e.g., or simultaneously) adding a tint (e.g., green tint) corresponding to the Effect 1 (e.g., green color filter). In FIG. 9E, based on the neutralization adjustment 932 and the green color filter being applied, the computer system 101 maintains the visual appearance of the three-dimensional environment 904 corresponding to the characteristic 942. As mentioned above, the physical environment 902 corresponding to characteristic 942 based on the color filter is optionally visible through the display generation component 120 via active and/or passive passthrough.

FIGS. 10A-10D is a flowchart illustrating a method 1000 of facilitating variable depth conflict mitigation for one or more virtual objects in a three-dimensional environment in accordance with some embodiments. In some embodiments, the method 1000 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 1000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1000 are, optionally, combined and/or the order of some operations is, optionally, changed.

In some embodiments, the method 1000 is performed at a computer system, such as computer system 101 in FIG. 1, in communication with a display generation component and one or more input devices. In some embodiments, the computer system has one or more of the characteristics of the computer systems of methods 800, 1200, 1400, 1600, 1800, and/or 2000. In some embodiments, the display generation component has one or more of the characteristics of the display generation component of methods 800, 1200, 1400, 1600, 1800, and/or 2000. In some embodiments, the one or more input devices have one or more of the characteristics of the one or more input devices of methods 800, 1200, 1400, 1600, 1800, and/or 2000.

In some embodiments, while at least a portion of a physical environment, such as physical environment 904 in FIGS. 9A and 9A1, of a user of the computer system is visible via the display generation component, the computer system receives (1002*a*), via the one or more input devices, a first input corresponding to a request to apply a first visual effect to a representation of the physical environment (e.g., corresponding to the portion of the physical environment that is visible via the display generation component), such as input from hand 952*a* of a user directed to option 954 in FIGS. 9A and 9A1. In some embodiments, the first input includes a tap or a hand air gesture in space such as air pointing or air pinching at an icon or other selectable option displayed by the computer system in an augmented reality (AR) or virtual reality (VR) environment to launch and/or display the respective content. In some embodiments, the first input corresponds to using an interface controller in an AR or VR environment to provide input to select an icon or other selectable option to launch and/or display the respective content, (virtual) environments described with respect to methods 800, 1200, 1400, 1600, 1800, and/or 2000. In some embodiments, the first input includes a hand of a user of the computer system performing a pinch air gesture in which the index finger and thumb of the hand of the user come together and touch while attention of the user is directed to the icon or selectable option. In some embodiments, the first user input is an attention-only and/or gaze-only input (e.g., not including input from one or more portions of the user other than those portions providing the attention input). In some embodiments, the first input includes an input to display respective content, optionally in and/or concurrently with the representation of the physical environment, and as a result a visual effect is applied to the representation of the physical environment. Thus, the input to display the respective content in the physical environment optionally corresponds to the request to apply the first visual effect to the representation of the physical environment. In some embodiments, the respective content has one or more characteristics of the (virtual) environments described with respect to methods 800, 1200, 1400, 1600, 1800, and/or 2000. In some embodiments, the respective content has one or more characteristics of a virtual object as described with respect to method 1400. In some embodiments, the respective content includes media content (e.g., image or photograph, video, and/or audio content such as movies, TV shows, or advertisements). In some embodiments, applying the first visual effect to the representation of the physical environment includes applying a color filter to the representation of the physical environment.

In some embodiments, in response to receiving the first input, the computer system displays (1002*b*), via the display generation component, the representation of the physical environment, including in accordance with a determination that the at least the portion of the physical environment has a first visual appearance, such as characteristic of room 920 in FIG. 9B, applying a first visual adjustment, such as neutralization adjustment 930 in FIG. 9B, to generate the representation of the physical environment, such as the representation 940 of the physical environment 904 in FIG. 9B, visible via the display generation component (1002*c*). In some embodiments, a visual appearance, such as the first visual appearance and second visual appearance as described below, includes a physical lighting level, brightness, color, tint, and/or other characteristics of the physical environment (e.g., a room of a user of the computer system). In some embodiments, the visual appearance includes a physical lighting level, brightness, color, tint, reflectivity and/or other characteristics of one or more physical objects (e.g., window, chair, or table) in the physical environment (e.g., the room of the user). In some embodiments, the computer system detects (e.g., using sensors) a visual appearance, such as the first visual appearance or a second visual appearance as described below) of the physical environment. In some embodiments, the physical environment has a first visual appearance (e.g., or the second visual appearance as described below) based on ambient light (e.g., natural light corresponding to sunset, sunrise, or other times of day and/or artificial light such as from a light bulb) of the physical environment), the respective content (e.g., virtual environment) that is displayed, and/or the first visual effect (e.g., color filter) that is applied. In some embodiments, applying a visual adjustment (e.g., the first visual adjustment and second visual adjustment as described below) to generate the representation of the physical environment includes adjusting a visual appearance (e.g., color, tint, and/or brightness) of the physical environment based on changes in the ambient light, the respective content, and/or the first visual effect. In some embodiments, the computer system automatically (e.g., without user input) applies the visual adjustment to the physical environment. In some embodiments, if the visual appearance of the physical environment changes, then the computer system automatically (e.g., without user input) applies the visual adjustment to the physical environment according to the change in the visual appearance. For example, the first visual appearance of the physical environment optionally includes a yellow tint corresponding to warm afternoon sunlight streaming into the room of a user. The first visual adjustment optionally includes neutralizing the first visual appearance by removing the yellow tint (e.g., decreasing level of yellow tint) and optionally subsequently (e.g., or simultaneously) adding a tint (e.g., blue tint) corresponding to the respective content (e.g., virtual environment such as a virtual sky) displayed or the first visual effect (e.g., blue color filter). For example, to display a virtual open sky as described with respect to method 1800, the computer system optionally adjusts the physical environment.

In some embodiments, in response to receiving the first input, the computer system displays (1002*b*), via the display generation component, the representation of the physical environment, including in accordance with a determination that the at least the portion of the physical environment has a second visual appearance, such as characteristic of room 920 in FIG. 9C, different from the first visual appearance, applying a second visual adjustment, such as neutralization adjustment 932 in FIG. 9C, different from the first visual adjustment to generate the representation of the physical environment, such as the representation 940 of the physical environment 904 in FIG. 9C, visible via the display generation component (1002*d*). In some embodiments, the second visual appearance of the physical environment includes a red tint corresponding to light during a sunset streaming into a room of the user. Accordingly, the second visual adjustment optionally includes neutralizing the second visual appearance by removing and/or neutralizing the red tint (e.g., decreasing level of red tint) and optionally subsequently (e.g., or simultaneously) adding a tint (e.g., blue tint) corresponding to the respective content (e.g., virtual environment such as a sky) that is displayed and/or the first visual effect (e.g., blue color filter) that is applied. In some embodiments, the second visual appearance of the physical environment does not include an initial tint (e.g., reduced or no sunlight streaming into the room). Accordingly, the second visual adjustment optionally includes adding a tint (e.g., blue tint) corresponding to the respective content (e.g., virtual environment such as a virtual sky) that is displayed and/or the first visual effect (e.g., blue color filter) that is applied without neutralizing the second visual appearance. Applying a visual adjustment to a visual appearance of a physical environment based on the visual appearance of the physical environment the respective content displayed, and/or the first visual effect applied ensures accurate and consistent display of content by the computer system in different physical environments, provides a more realistic and immersive user experience, reduces the number of inputs needed to update the visual appearance of the physical environment based on changes in ambient light, the respective content, and/or the first visual effect, and simplifies user interaction with the computer system.

In some embodiments, applying the first visual adjustment, the second visual adjustment, or both include applying a color (optionally color temperature) neutralization, such a color neutralization corresponding to the neutralization adjustment 930 in FIG. 9B and the neutralization adjustment 932 in FIG. 9C, to generate the representation of the physical environment (1004). In some embodiments, applying a color (optionally color temperature) neutralization includes applying a different color (optionally color temperature) than the color (optionally color temperature) of the physical environment. In some embodiments, applying a color neutralization includes applying a color (optionally color temperature) opposite of the color (optionally color temperature) of the physical environment to neutralize the color (optionally color temperature) of the physical environment. For example, if the first visual appearance or the second visual appearance of the physical environment corresponds to a yellow tint, then a purple tint (e.g., opposite of the yellow tint) is applied to the physical environment to neutralize the yellow tint of the physical environment. Neutralizing a current color (optionally color temperature) of the representation of the physical environment provides a more realistic and immersive user experience and reduces the number of inputs needed when updating the visual appearance of the physical environment to a new color.

In some embodiments, the first input corresponding to the request to apply the first visual effect to the representation of the physical environment includes an input corresponding to a request to apply a first color filter (e.g., including any suitable one or more colors), such as applying an effect corresponding to option 954 in FIG. 9B, to the representation of the physical environment (1006). In some embodiments, the first color filter is applied to the entirety of the representation of the physical environment. In some embodiments, the first color filter is applied to a portion of the representation of the physical environment (e.g., first color filter applied to 10, 30, 50, or 70% of the area of the physical environment). For example, the first color filter is optionally applied to a ceiling of the physical environment (e.g., but not other portions, such as the floor or walls, of the physical environment). In some embodiments, the first color filter is applied according to any level of transparency (e.g., 10, 30, 50, 70, or 100% transparency). Providing an option to apply a color filter to the representation of the physical environment allows user-specific customization of the representation of the physical environment.

In some embodiments, the computer system receives (1008*a*), via the one or more input devices, a second user input (e.g., different than the first user input and/or includes one or more characteristics of the first user input), such as input from hand 952*b* of the user in FIGS. 9A and 9A1, corresponding to a request to apply a second visual effect that includes a second color filter different from the first color filter, such as applying effect corresponding to option 956 in FIG. 9B, to the representation of the physical environment. In some embodiments, the second color filter corresponds to a different color than the first color filter. In some embodiments, the second color filter and the first color filter correspond to the same color but vary in brightness and/or transparency. In some embodiments, the computer system receives the second user input via a selection menu including selectable options for respective color filters.

In some embodiments, in response to receiving the second user input, the computer system displays (1008*b*), via the display generation component, the representation of the physical environment, including in accordance with a determination that the at least the portion of the physical environment has a third visual appearance (e.g., different from the first visual appearance and/or the second visual appearance), such characteristic of room 920 in FIG. 9D, applying a third visual adjustment (e.g., different from the first visual adjustment and/or the second visual adjustment), such as neutralization adjustment 930 in FIG. 9D, to generate the representation of the physical environment, such as the representation 942 of the physical environment 904 in FIG. 9D, visible via the display generation component having the second color filter applied (1008*c*). In some embodiments, the physical environment has the third visual appearance based on ambient light (e.g., natural light corresponding to sunset, sunrise, or other times of day and/or artificial light such as from a light bulb) of the physical environment), the respective content (e.g., virtual environment) that is displayed, and/or a visual effect (e.g., second color filter) that is applied. In some embodiments, applying the third visual adjustment to generate the representation of the physical environment includes adjusting a visual appearance (e.g., color, tint, and/or brightness) of the physical environment based on changes in the ambient light, the respective content, and/or the visual effect. For example, the third visual appearance of the physical environment optionally includes a green tint. The first visual adjustment optionally includes neutralizing the third visual appearance by removing the green tint (e.g., decreasing level of green tint) and optionally subsequently (e.g., or simultaneously) adding a tint (e.g., purple tint) corresponding to the second visual effect (e.g., second color filter such as a purple color filter).

In some embodiments, in response to receiving the second user input, the computer system displays (1008*b*), via the display generation component, the representation of the physical environment, including in accordance with a determination that the at least the portion of the physical environment has a fourth visual appearance (e.g., different from the first visual appearance and/or the second visual appearance), such characteristic of room 924 in FIG. 9E, different from the third visual appearance, applying a fourth visual adjustment (e.g., different from the first visual adjustment and/or the second visual adjustment), such as neutralization adjustment 932 in FIG. 9E, different from the third visual adjustment to generate the representation of the physical environment, such as the representation 942 of the physical environment 904 in FIG. 9E, visible via the display generation component having the second color filter applied (1008*d*). In some embodiments, the fourth visual appearance of the physical environment includes a white tint. Accordingly, the second visual adjustment optionally includes neutralizing the fourth visual appearance by removing and/or neutralizing the white tint (e.g., decreasing level of white tint) and optionally subsequently (e.g., or simultaneously) adding a tint (e.g., purple tint) corresponding to the second visual effect (e.g., second color filter such as a purple color filter) that is applied. Providing options to apply varying color filters to the representation of the physical environment allows user-specific customization of the representation of the physical environment.

In some embodiments, the first visual effect includes at least a portion of a virtual environment, such as virtual sky 918 in FIG. 9B (1010). In some embodiments, as discussed above, the first user input includes an input to display a virtual environment (e.g., a portion of the virtual environment) in the representation of the physical environment, and as a result a visual effect is applied to the representation of the physical environment. Thus, the input to display the virtual environment (e.g., the portion of the virtual environment) in the physical environment optionally corresponds to the request to apply the first visual effect to the representation of the physical environment. In some embodiments, the portion of the virtual environment includes a virtual sky, a virtual body of water, virtual trees, or any suitable virtual element. In some embodiments, the virtual environment has one or more characteristics of the virtual environments described with reference to methods 800, 1200, 1400, 1600 and/or 1800. Applying a first visual effect by displaying a portion of a virtual environment in the representation of the physical environment allows user-specific customization of the representation of the physical environment.

In some embodiments, while applying the first visual adjustment to generate the representation of the physical environment in accordance with the determination that the at least the portion of the physical environment has the first visual appearance, the computer system detects (1012*a*) a change in appearance of the at least the portion of the physical environment from the first visual appearance to the second visual appearance (e.g., different from the first visual appearance), wherein the change in appearance of the at least the portion of the physical environment from the first visual appearance to the second visual appearance includes a change in ambient light (e.g., natural light and/or artificial light), such as the change from afternoon sun 912 in FIG. 9B to sunset 914 in FIG. 9C or the change from lamp light on 931*a* in FIG. 9D to lamp light off 931*b* in FIG. 9E, in the physical environment. In some embodiments, the change in ambient light includes either a change in natural light or a change in artificial light. In some embodiments, the change in ambient light includes changes in both natural light and artificial light (e.g., changing from afternoon sunlight without artificial light to artificial light from a lamp without natural light, because the sun has set).

In some embodiments, in response to detecting the change in appearance of the at least the portion of the physical environment from the first visual appearance to the second visual appearance, the computer system applies (1012*b*) the second visual adjustment different from the first visual adjustment to generate the representation of the physical environment, such as the representation 940 of the physical environment 904 in FIG. 9C, visible via the display generation component. In some embodiments, if the change in appearance of the at least the portion of the physical environment was from the first visual appearance to a third visual appearance different than the second visual appearance, a third visual adjustment different from the second visual adjustment would be applied to generate the representation of the physical environment. Applying a visual adjustment to a visual appearance of a physical environment based on a change in ambient light in the physical environment provides a more realistic and immersive user experience, reduces the number of inputs needed to update the visual appearance of the physical environment based on changes in ambient light, ensures consistent display of content across different ambient light conditions, and simplifies user interaction with the computer system.

In some embodiments, the change in ambient light in the physical environment includes a change in natural light (e.g., corresponding to sunrise, afternoon, sunset, or midnight), such as the change from afternoon sun 912 in FIG. 9B to sunset 914 in FIG. 9C, in the physical environment (1014). For example, the first visual appearance of the physical environment optionally includes a yellow tint corresponding to warm afternoon sunlight streaming into the room of a user. In response to detecting sunset and red light from the sunset streaming into the room of the user (e.g., change in natural light in the physical environment), the second visual adjustment (e.g., instead of the first visual adjustment) is applied to generate the representation of the physical environment. The second visual adjustment optionally includes neutralizing the second visual appearance by removing the red tint (e.g., decreasing level of red tint) and optionally subsequently (e.g., or simultaneously) adding a tint (e.g., blue tint) if the first visual effect (e.g., blue color filter) is applied to the representation of the physical environment or a virtual sky is displayed in the representation of the physical environment as further described with respect to step(s) 1018. The second visual adjustment optionally includes neutralizing the second visual appearance by applying a tint opposite of the red tint and optionally subsequently (e.g., or simultaneously) adding a tint (e.g., blue tint) if the first visual effect (e.g., blue color filter) is applied to the representation of the physical environment or a virtual sky is displayed in the representation of the physical environment as further described with respect to step(s) 1018. Applying a visual adjustment to a visual appearance of a physical environment based on a change in natural light in the physical environment provides a more realistic and immersive user experience, reduces the number of inputs needed to update the visual appearance of the physical environment based on changes in natural light, ensures consistent display of content across different ambient light conditions, and simplifies user interaction with the computer system.

In some embodiments, the change in ambient light includes a change in artificial light (e.g., lamps, candles, light emitting diodes (LEDs), and/or projectors), such as the change from lamp light on 931*a* in FIG. 9D to lamp light off 931*b* in FIG. 9E, in the physical environment (1016). In some embodiments, the artificial light corresponds to different color temperatures (e.g., smart lights with artificial color temperatures that are optionally adjustable via user input, or light bulbs with preset (e.g., non-adjustable) color temperatures). For example, the first visual appearance of the physical environment optionally includes a yellowish-white tint corresponding to no artificial light in the room of the user or artificial light from a lamp emitting yellowish-white light. In response to detecting artificial light in the room of the user or artificial light from a different lamp emitting orange light (e.g., change in artificial light in the physical environment), the second visual adjustment (e.g., instead of the first visual adjustment) is applied to generate the representation of the physical environment. The second visual adjustment optionally includes neutralizing the second visual appearance by removing the orange tint (e.g., decreasing level of orange tint) and optionally subsequently (e.g., or simultaneously) adding a tint (e.g., blue tint) if the first visual effect (e.g., blue color filter) is applied to the representation of the physical environment or a virtual sky is displayed in the representation of the physical environment as further described with respect to step(s) 1018. The second visual adjustment optionally includes neutralizing the second visual appearance by applying a tint opposite of the orange tint and optionally subsequently (e.g., or simultaneously) adding a tint (e.g., blue tint) if the first visual effect (e.g., blue color filter) is applied to the representation of the physical environment or a virtual sky is displayed in the representation of the physical environment as further described with respect to step(s) 1018. Applying a visual adjustment to a visual appearance of a physical environment based on a change in artificial light in the physical environment provides a more realistic and immersive user experience, reduces the number of inputs needed to update the visual appearance of the physical environment based on changes in artificial light, ensures consistent display of content across different ambient light conditions, and simplifies user interaction with the computer system.

In some embodiments, the first visual effect includes at least a portion of a virtual environment (1018*a*).

In some embodiments, in response to receiving the first input, the computer system replaces (1018*b*) at least a portion of the representation of the physical environment with the at least the portion of the virtual environment, such as replacing at least a portion of the representation 940 of the physical environment 904 with a virtual sky 918 in FIG. 9B. In some embodiments, the portion of the virtual environment includes a virtual sky. For example, the virtual sky, when displayed, optionally appears to replace a ceiling of the representation of the physical environment. The virtual sky and/or environment optionally has one or more of the characteristics of the virtual sky and/or environment of method 1800. Applying a first visual effect by replacing a portion of the representation of the physical environment with a portion of a virtual environment provides a more realistic and immersive user experience and allows for user-specific customization of the representation of the physical environment.

In some embodiments, applying the first visual adjustment, the second visual adjustment, or both include applying an increased (or decreased) auto-white balance adjustment, such as an auto-white balance adjustment corresponding to neutralization adjustment 930 in FIG. 9B or the neutralization adjustment 932 in FIG. 9C, to generate the representation of the physical environment (1020). In some embodiments, the computer system automatically removes unwanted tints from the representation of the physical environment by increasing (or decreasing) auto-white balance of the representation of the physical environment such that the white balance for the representation of the environment converges on a particular target (e.g., 1900K, 2700K, 3000K, 4100K or 4500K). Neutralizing a current color of the representation of the physical environment by increasing (or decreasing) auto-white balance of the representation of the physical environment provides an efficient manner of updating the visual appearance of the physical environment to neutralize a visual appearance of the physical environment.

It should be understood that the particular order in which the operations in method 1000 have been described is merely exemplary and is not intended to indicate that the described order is the only order in which the operations could be performed. One of ordinary skill in the art would recognize various ways to reorder the operations described herein.

FIGS. 11A-11I illustrate examples of a computer system displaying a user interface object in a three-dimensional environment with a three-dimensional stereoscopic effect corresponding to different views of content associated with the user interface object in accordance with some embodiments.

Figure 11A:
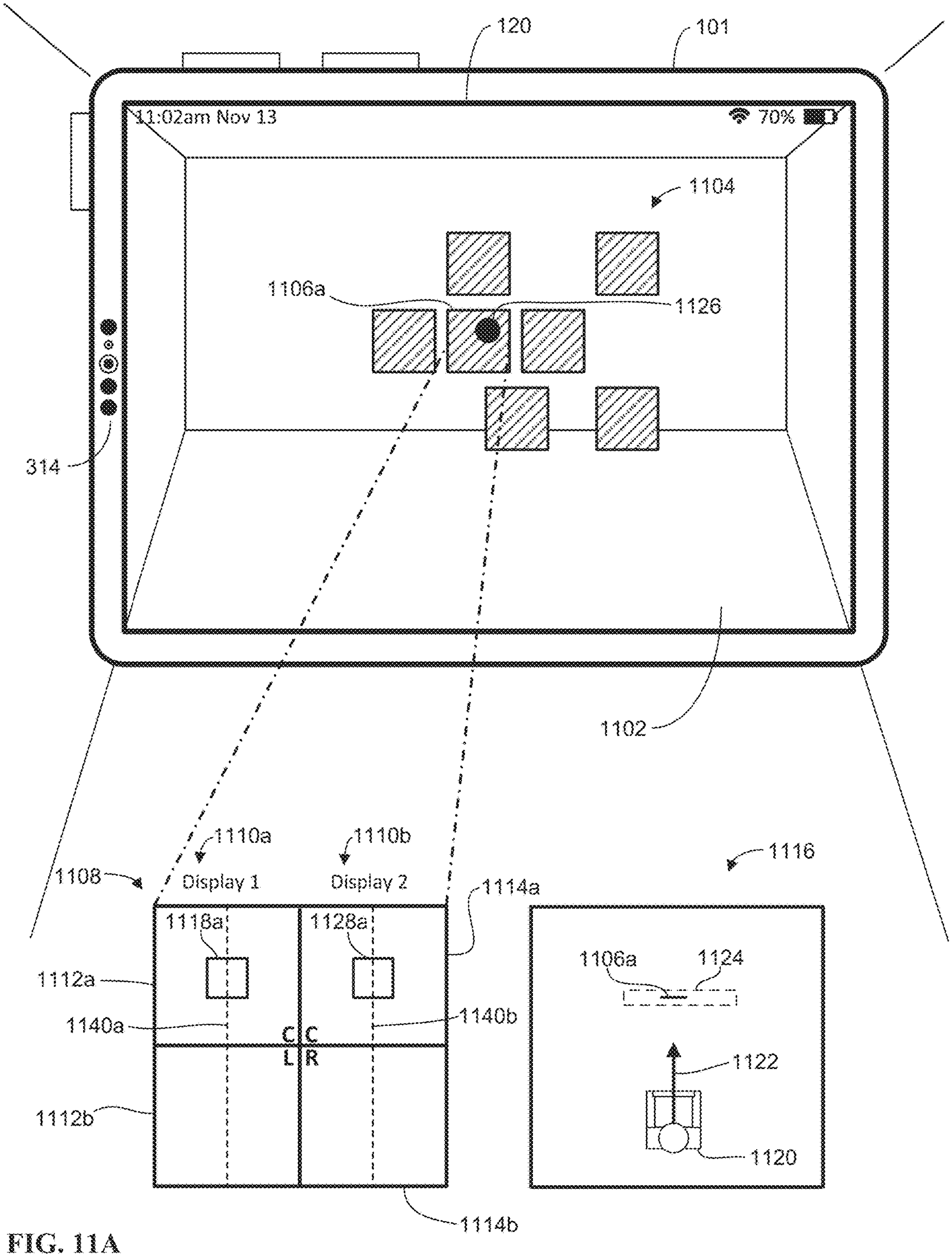
FIGS. 11A-11I illustrate examples of a computer system displaying a user interface object in a three-dimensional environment with a three-dimensional stereoscopic effect corresponding to different views of content associated with the user interface object in accordance with some embodiments.

FIG. 11A illustrates a computer system (e.g., an electronic device) 101 displaying, via a display generation component (e.g., display generation component 120 of FIG. 1), a three-dimensional environment 1102 from a viewpoint of the user 1112 of the computer system 101 (e.g., facing the back wall of the physical environment in which computer system 101 is located). In some embodiments, computer system 101 includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or attention (e.g., gaze) of the user (e.g., internal sensors facing inwards towards the face of the user). In some embodiments, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 1102 and/or the physical environment is visible via the display generation component 120.

In FIG. 11A, a plurality of user interface objects 1104, including a user interface object 1106*a*, are displayed in three-dimensional environment 1102. User interface objects 1104 are shown in FIG. 11A with a first visual appearance (e.g., such as described with reference to method 1200). In some embodiments, the first visual appearance of the user interface objects 1104 correspond to center-views (e.g., perpendicular or normal views) of the content associated with the user interface objects (e.g., the first visual appearance of user interface object 1106*a* includes a center-view of the content associated with user interface object 1106*a*) and do not include a three-dimensional stereoscopic effect (e.g., such as the three-dimensional stereoscopic effect described with reference to method 1200). User interface objects 1104 are displayed in a group. In some embodiments, user interface objects 1104 are displayed in a grid. In some embodiments, user interface objects 1104 are icons for respective applications that present content (e.g., a virtual environment or a stereoscopic image, such as described with reference to method 1200). In FIG. 11A, seven total user interface objects are shown in the plurality of user interface objects 1104. In some embodiments, more or less user interface objects are displayed in three-dimensional environment 1102. In some embodiments, user interface objects 1104 are selectable to display their respective content in three-dimensional environment 1102. For example, selecting a user interface object of the plurality of user interface objects 1104 includes directing attention toward a user interface object (e.g., through gaze) while performing an air gesture (e.g., an air tap, air drag, air pinch or air long pinch).

In FIG. 11A, and in subsequent FIGS. 11B-11I, an overhead view 1116 is shown of three-dimensional environment 1102. Overhead view 1116 includes a user 1120 of computer system 101. In some embodiments, user 1120 represents a location of the user's viewpoint relative to three-dimensional environment 1102. In some embodiments, the viewpoint of user 1120 includes a viewing angle 1122 (represented by an arrow in overhead view 1116) relative to a user interface object 1106*a* of the plurality of user interface objects 1104. As shown in FIG. 11A, viewing angle 1122 is a direct viewing angle to user interface object 1106*a* (e.g., a viewing angle normal to user interface object 1106*a*, or a viewing angle within 0.01, 0.5 1, 2, 5, 10 or 15 degrees of a viewing angle normal to user interface object 1106*a*). In overhead view 1116, user interface object 1106*a* is shown within a region 1124 of three-dimensional environment 1102. In some embodiments, region 1124 represents the area or volume of three-dimensional environment 1102 occupied by the plurality of user interface objects 1104.

In FIG. 11A, user interface object 1106*a* is displayed with the plurality of user interface objects 1104 by display generation component 120. The plurality of user interface objects 1104 have a spatial arrangement relative to user interface object 1106*a* in three-dimensional environment 1102. In FIG. 11A, user interface object 1106*a* and the plurality of user interface objects 1104 are displayed with the same visual appearance (e.g., the first visual appearance). In some embodiments, in response to a change in visual appearance of user interface object 1106*a*, as will be described later, computer system 101 changes the spatial arrangement of the plurality of user interface objects 1104 relative to user interface object 1106*a* (e.g., such as shown and described with reference to FIGS. 11B and 11C).

In FIG. 11A, an input is received corresponding to directed attention of user 1120 toward user interface object 1106*a*. The directed attention of user 1120 toward user interface object 1106*a* optionally corresponds to gaze 1126 (represented by a circle on user interface object 1106*a*) of user 1120 directed toward user interface object 1106*a*. In some embodiments, directed attention toward user interface object 1106*a* includes directed gaze toward user interface object 1106*a* for a threshold period of time (e.g., 0.1, 0.5, 1, 2, 5 or 10 seconds), an input on a touch-sensitive display of computer system 101, and/or a verbal input (e.g., a verbal command). In some embodiments, in response to receiving an input corresponding to directed attention toward user interface object 1106*a*, computer system 101 changes the visual appearance of user interface object 1106*a* in three-dimensional environment 1102 (e.g., from a first visual appearance to a second visual appearance as described with reference to method 1200).

FIG. 11A1 illustrates similar and/or the same concepts as those shown in FIG. 11A (with many of the same reference numbers). It is understood that unless indicated below, elements shown in FIG. 11A1 that have the same reference numbers as elements shown in FIGS. 11A-11I have one or more or all of the same characteristics. FIG. 11A1 includes computer system 101, which includes (or is the same as) display generation component 120. In some embodiments, computer system 101 and display generation component 120 have one or more of the characteristics of computer system 101 shown in FIGS. 11A and 11A-11I and display generation component 120 shown in FIGS. 1 and 3, respectively, and in some embodiments, computer system 101 and display generation component 120 shown in FIGS. 11A-11I have one or more of the characteristics of computer system 101 and display generation component 120 shown in FIG. 11A1.

In FIG. 11A1, display generation component 120 includes one or more internal image sensors 314*a* oriented towards the face of the user (e.g., eye tracking cameras 540 described with reference to FIG. 5). In some embodiments, internal image sensors 314*a* are used for eye tracking (e.g., detecting a gaze of the user). Internal image sensors 314*a* are optionally arranged on the left and right portions of display generation component 120 to enable eye tracking of the user's left and right eyes. Display generation component 120 also includes external image sensors 314*b* and 314*c* facing outwards from the user to detect and/or capture the physical environment and/or movements of the user's hands. In some embodiments, image sensors 314*a*, 314*b*, and 314*c* have one or more of the characteristics of image sensors 314 described with reference to FIGS. 11A-11I.

In FIG. 11A1, display generation component 120 is illustrated as displaying content that optionally corresponds to the content that is described as being displayed and/or visible via display generation component 120 with reference to FIGS. 11A-11I. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 11A1.

Display generation component 120 has a field of view (e.g., a field of view captured by external image sensors 314*b* and 314*c* and/or visible to the user via display generation component 120, indicated by dashed lines in the overhead view) that corresponds to the content shown in FIG. 11A1. Because display generation component 120 is optionally a head-mounted device, the field of view of display generation component 120 is optionally the same as or similar to the field of view of the user.

In FIG. 11A1, the user may perform an air pinch gesture to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 11A-11I.

In some embodiments, computer system 101 responds to user inputs as described with reference to FIGS. 11A-11I.

In the example of FIG. 11A1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 11A-11I and/or described with reference to the corresponding method(s) are optionally implemented on computer system 101 and display generation unit 120 in a manner similar or analogous to that shown in FIG. 11A1.

In FIG. 11A, and in subsequent FIGS. 11B-11I, a legend 1108 is shown corresponding to a schematic representation of the displayed visual appearance of a user interface object of the plurality of user interface objects 1104 in three-dimensional environment 1102. In FIGS. 11A-11H, legend 1108 represents the displayed visual appearance of user interface object 1106*a*. Legend 1108 corresponds to the visual appearance of content associated with user interface object 1106*a* created by representations of the content displayed by a first display 1110*a* and a second display 1110*b*. In some embodiments, display generation component 120 includes first display 1110*a* and second display 1110*b*. In some embodiments, computer system 101 is a head-mounted device that includes first display 1110*a* and second display 1110*b*, first display 1110*a* corresponding to a display for a first eye of user 1120 and second display 1110*b* corresponding to a display for a second eye of user 1120. In some embodiments, first display 1110*a* and second display 1110*b* display the same representation of the content associated with user interface object 1106*a*. In some embodiments, representations of the content associated with user interface object 1106*a* include one or more characteristics of representations of content described with reference to method 1200. In some embodiments, first display 1110*a* and second display 1110*b* display different representations of the content associated with user interface object 1106*a*. In some embodiments, modifying the content (e.g., by modifying the representation of content and/or presenting different portions of the content) displayed by first display 1110*a* and second display 1110*b* changes the visual appearance of user interface object 1106*a* relative to the viewpoint of user 1120.

In legend 1108, quadrants are shown corresponding to representations of the content associated with user interface object 1106*a*. In some embodiments, representations that are available for display via first display 1110*a* include a first representation 1112*a* (e.g., the first representation as described with reference to method 1200) and a second representation 1112*b* (e.g., the third representation as described with reference to method 1200) of the content associated with user interface object 1106*a*. In some embodiments, representations that are available for display via second display 1110*b* include a first representation 1114*a* (e.g., the second representation as described with reference to method 1200) and second representation 1114*b* (e.g., the fourth representation as described with reference to method 1200) of the content associated with user interface object 1106*a*. In some embodiments, first representations 1112*a* and 1114*a* correspond to center-capture representations of the content associated with user interface object 1106*a* (e.g., first representations 1112*a* and 1114*a* include a center-view of the content such as described with reference to method 1200). In some embodiments, first representation 1112*a* includes a variation in viewpoint from first representation 1112*b* (e.g., corresponding to a viewpoint from a left eye compared to a viewpoint of a right eye, or corresponding to a positive viewing angle relative to a reference viewing angle compared to a negative viewing angle relative to the reference viewing angle), such as described with reference to method 1200. Second representation 1112*b* corresponds to a representation of the content associated with user interface object 1106*a* from a left-of-center viewpoint, and second representation 1114*b* corresponds to a representation of the content associated with user interface object 1106*a* from a right-of-center viewpoint. In some embodiments, the second representation 1112*b* differs by a greater amount from second representation 1114*b* than the amount first representation 1112*a* differs from first representation 1112*b*. For example, second representation 1112*b* and second representation 1114*b* include a greater difference in viewing angle compared to the difference in viewing angle between first representation 1112*a* and first representation 1112*b*. For example, the region of the content presented differs by a greater amount between second representation 1112*b* and second representation 1114*b* than between first representation 1114*a* and first representation 1114*b*

In some embodiments, different portions of the respective representations of the content associated with user interface object 1106*a* are displayed via first display 1110*a* and second display 1110*b* at a given moment in time. In legend 1108, the portions of the respective representation that are displayed by first display 1110*a* and second display 1110*b* are schematically represented by rectangles (e.g., corresponding to a schematic representation of the dimensions of the portions displayed of the respective representations of the content). In some embodiments, the different portions of the respective representations correspond to different regions of the content that is displayed by each respective display. In some embodiments, the different portions of the respective representations correspond to different viewpoints and/or viewing angles into the content (e.g., such as described with reference to method 1200).

In legend 1108 shown in FIG. 11A, a first portion 1118*a* of first representation 1112*a* is displayed by first display 1110*a*, and a first portion 1128*a* of first representation 1114*a* is displayed by second display 1110*b*. The display of first portions 1118*a* and 1128*a* correspond to the visual appearance of user interface object 1106*a* displayed in three-dimensional environment 1102 in FIG. 11A. In some embodiments, the display of first portions 1118*a* and 1128*a* correspond to the first visual appearance of user interface object 1106*a*, such as described with reference to method

1200. In some embodiments, first portions 1118*a* and 1128*a* are center portions of the content associated with user interface object 1106*a* (e.g., first portions 1118*a* and 1128*a* are centered about a respective center reference line 1140*a* and 1140*b* of the content and correspond to a direct viewing angle into the content (e.g., a viewing angle normal to the content)). In legend 1108, a center reference line 1140*a* is shown relative to the representations available for display via first display 1110*a* and a center reference line 1140*b* is shown relative to the representations available for display via second display 1110*b*. Center reference lines 1140*a* and 1140*b* are schematic representations of a reference line that divides the representations of the content associated with user interface object 1106*a* displayed by first display 1110*a* and second display 1110*b* into equal portions. In FIG. 11A, portions 1118*a* and 1128*a* are centered relative to the center reference lines 1140*a* and 1140*b*. In some embodiments, changing the portion of the content that is displayed by the first display 1110*a* and/or second display 1110*b* relative to center reference lines 1140*a* and 1140*b* changes the view (e.g., relative to region of the content and/or viewing angle into the content displayed by a respective display) of the content displayed in three-dimensional environment 1102, and thus changes the visual appearance of user interface object 1106*a* in three-dimensional environment 1102, as will be described later.

Figure 11B:
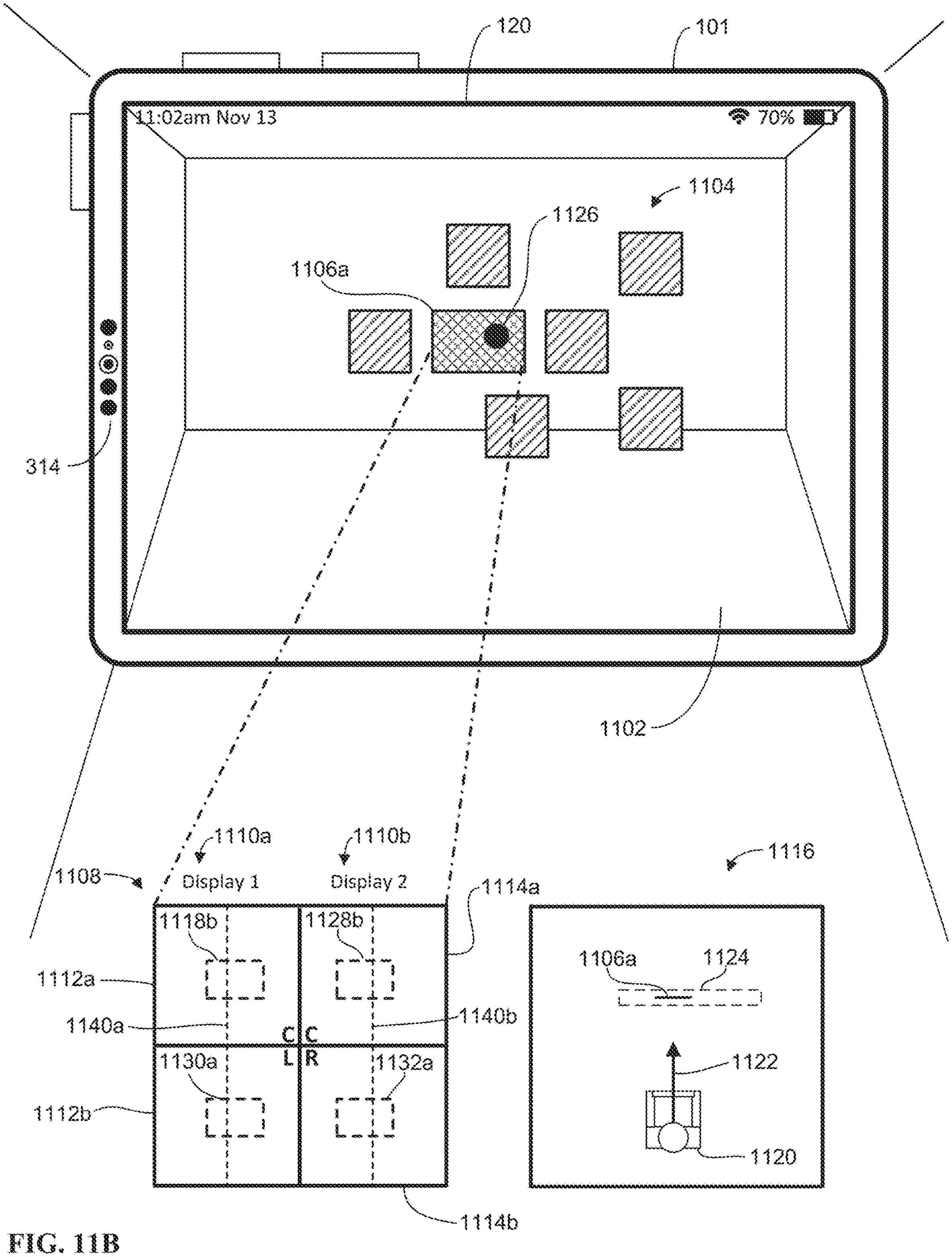

In some embodiments, in response to an input corresponding to directed attention (e.g., such as by gaze 1126) to a user interface object of the plurality of user interface objects 1104, the visual appearance of the user interface object will be changed from the first visual appearance to a second appearance that is different from the first visual appearance (e.g., such as described with reference to method 1200). In some embodiments, the second visual appearance is an appearance that includes a three-dimensional stereoscopic effect (e.g., as described with reference to method 1200). In some embodiments, the second visual appearance of the user interface object 1106*a* includes a three-dimensional stereoscopic view of the content associated with user interface object 1106*a*. FIG. 11B shows user interface object 1106*a* transitioning into the second visual appearance in response to gaze 1126 directed toward user interface object 1106*a*. As shown in FIG. 11B, user interface object 1106*a* is expanded in size compared to the plurality of user interface objects 1104. Particularly, user interface object 1106*a* expands asymmetrically in response to gaze 1126 (e.g., horizontally relative to the viewpoint of user 1120. In some embodiments, to avoid the change of visual appearance (e.g., expansion) of user interface object 1106*a* interfering (e.g., through a spatial conflict) with the display of the plurality of user interface objects 1104, computer system 101 changes the spatial arrangement of the plurality of user interface objects 1104 relative to user interface object 1106*a*. As shown in FIG. 11B, the plurality of user interface objects 1104 have moved away from user interface object 1106*a* (e.g., relative to the spatial arrangement of the plurality of user interface objects 1104 relative to user interface object 1106*a* as shown in FIG. 11A). As shown in overhead view 1116, region 1124 occupied by the plurality of user interface objects 1104 is expanded relative to three-dimension environment 1102 (e.g., compared to region 1124 as shown in FIG. 11A).

As shown in legend 1108 in FIG. 11B, the content displayed by first display 1110*a* and second display 1110*b* is changing. In some embodiments, the change in the display of the content by first display 1110*a* and second display 1110*b* changes the visual appearance of user interface object 1106*a* in three-dimensional environment 1102. In some embodiments, the transition between the first visual appearance and the second visual appearance of user interface object 1106*a* includes transitioning (e.g., by crossfading or blurring) between portions (e.g., including second portion 1118*b* and first portion 1130*a* described below) of first representation 1112*a* and second representation 1112*b* on first display 1110*a*, and portions (e.g., including second portion 1128*b* and first portion 1132*a* described below) of first representation 1114*a* and second representation 1114*b* on second display 1110*b*. In some embodiments, as computer system transitions the display between portions of first representation 1112*a* and second representation 1112*b* via first display 1110*a*, and the display between portions of first representation 1114*a* and second representation 1114*b* via second display 1110*b*, the visual appearance of user interface object 1106*a* changes. As shown in legend 1108, the transition includes displaying portions of first representation 1112*a* and first representation 1114*a* with less than a maximum amount of visual prominence (e.g., 20, 30, 40, 50, 60, 70, 80, or 90 percent of the maximum amount of visual prominence), which is represented by a dashed lines surrounding the perimeters of a second portion 1118*b* of first representation 1112*a* and a second portion 1128*b* of first representation 1114*a*. As shown in legend 1108, the transition includes displaying portions of second representation 1112*b* and second representation 1114*b* with less than a maximum amount of visual prominence (e.g., 20, 30, 40, 50, 60, 70, 80 or 90 percent of the maximum amount of visual prominence), which is represented by a dashed line surrounding the perimeters of a first portion 1130*a* of second representation 1112*b* and a first portion 1132*a* of second representation 1114*b*. In some embodiments, transitioning between displaying portions of the first representation 1112*a* and the second representation 1112*b* includes concurrently displaying second portion 1118*b* and first portion 1130*a* on the same area of display 1110*a* (e.g., the second portion 1118*b* and first portion 1130*a* are overlaid on the same region of display 1110*a*). In some embodiments, transitioning between displaying portions of the first representation 1114*a* and second representation 1114*b* includes concurrently displaying second portion 1128*b* and first portion 1132*a* on the same area of display 1110*b* (e.g., the second portion 1128*b* and first portion 1132*a* are overlaid on the same region of display 1110*b*).

In some embodiments, the transition between the first visual appearance and the second visual appearance of user interface object 1106*a* includes modifying the portions of the content associated with user interface object 1106*a* displayed by first display 1110*a* and second display 1110*b* to become increasingly disparate (e.g., as described with reference to method 1200). As shown in legend 1108, a second portion 1118*b* of first representation 1112*a* and a first portion 1130*a* of second representation 1112*b* are concurrently displayed by first display 1110*a*. Second portion 1118*b* of first representation 1112*a* is a portion of first representation 1112*a* that is right-of-center relative to center reference line 1140*a* (e.g., compared to first portion 1118*a* of first representation 1112*a* shown in FIG. 11A). In some embodiments, the second portion 1118*b* of first representation 1112*a* is a portion of the content associated with first representation 1112*a* that includes a more leftward region of the content compared to the first portion 1118*a* of first representation 1112*a*. The size of second portion 1118*b* is larger than the size of first portion 1118*a* (shown in FIG. 11A) due to the expanded size of user interface object 1106*a*. First portion 1130*a* of second representation 1112*b* includes the same dimensions as second portion 1118*b*. In some embodiments, first portion 1130*a* of second representation 1112*b* includes a viewing angle that differs by a greater angular distance from a reference viewing angle (e.g., a viewing angle normal to the content) compared to the second portion 1118*b* of first representation 1112*a*. For example, the viewing angle associated with first portion 1130*a* is from a more left-of-center viewpoint, and the viewing angle associated with the second portion 1118*b* is a more direct viewing angle to the content. In some embodiments, the transition between first representation 1112*a* and second representation 1112*b* displayed by first display occurs gradually. In some embodiments, as the transition between displaying portions of the first representation 1112*a* and second representation 1112*b* occurs, the displayed portion of the first representation 1112*a* gradually gains transparency (e.g., while second representation 1112*b* optionally gains opacity). In some embodiments, as the transition between the displayed portions of first representation 1112*a* and second representation 1112*b* occurs, the displayed portion of second representation 1112*b* gradually gains opacity (e.g., while first representation 1112*a* gradually gains transparency). In some embodiments, as the transition between the displayed portions of first representation 1112*a* and second representation 1112*b* occurs, the portions of first representation 1112*a* and second representation 1112*b* displayed by first display 1110*a* continue to change. For example, the portions of the first representation 1112*a* and second representation 1112*b* displayed by first display 1110*a* continues to shift rightward relative to center reference line 1140*a* (e.g., and include more leftward regions of the content associated with user interface object 1106*a*). For example, the portions of first representation 1112*a* and second representation 1112*b* displayed by first display 1110*a* continue to expand in size (e.g., asymmetrically). For example, first representation 1112*a* continues to gain transparency until only second representation 1112*b* is displayed by first display 1110*a* (e.g., as shown in FIG. 11C).

As shown in legend 1108 in FIG. 11B, a second portion 1128*b* of first representation 1114*a* and a first portion 1132*a* of second representation 1114*b* are concurrently displayed on second display 1110*b*. Second portion 1128*b* of first representation 1114*b* is a portion of first representation 1114*b* that is left-of-center relative to center reference line 1140*b* (e.g., compared to first portion 1128*a* of first representation 1114*a* shown in FIG. 11A). In some embodiments, the second portion 1128*b* of first representation 1114*a* is a portion of the content associated with first representation 1114*a* that includes a more rightward region of the content compared to the first portion 1128*a* of first representation 1114*a*. The size of second portion 1128*b* is larger than the size of first portion 1128*a* (shown in FIG. 11A) due to the expanded size of user interface object 1106*a*. First portion 1132*a* of second representation 1114*b* includes the same dimensions as second portion 1128*b*. In some embodiments, first portion 1132*a* of second representation 1114*b* includes a viewing angle that differs by a greater angular distance from a reference viewing angle (e.g., a viewing angle normal to the content) compared to the second portion 1128*b* of first representation 1114*a*. For example, the viewing angle associated with first portion 1132*a* is from a more right-of-center viewpoint, and the viewing angle associated with the second portion 1128*b* is a more direct viewing angle to the content. In some embodiments, transitioning between the displayed portions of first representation 1114*a* and second representation 1114*b* occurs gradually. In some embodiments, as the transition between the displayed portions of first representation 1114*a* and second representation 1114*b* occurs, the displayed portions of first representation 1114*a* gradually gains transparency (e.g., while second representation 1114*b* optionally gains opacity). In some embodiments, as the transition between the displayed portions of first representation 1114*a* and second representation 1114*b* occurs, the displayed portions of second representation 1114*b* gradually gains opacity (e.g., while first representation 1114*a* optionally gains transparency). In some embodiments, as the transition between the displayed portions of first representation 1114*a* and second representation 1114*b* occurs, the portions of first representation 1114*a* and second representation 1114*b* displayed by second display 1110*b* continues to change. For example, the portions of the first representation 1114*a* and second representation 1114*b* displayed by second display 1110*b* continues to shift leftward relative to center reference line 1140*a* (e.g., and includes more rightward regions of the content associated with user interface object 1106*a*). For example, the portions of first representation 1114*a* and second representation 1114*b* displayed by second display 1110*b* continue to expand in size (e.g., asymmetrically). For example, first representation 1114*a* continues to gain transparency until only second representation 1114*b* is displayed by second display 1110*b* (e.g., as shown in FIG. 11C).

Figure 11C:
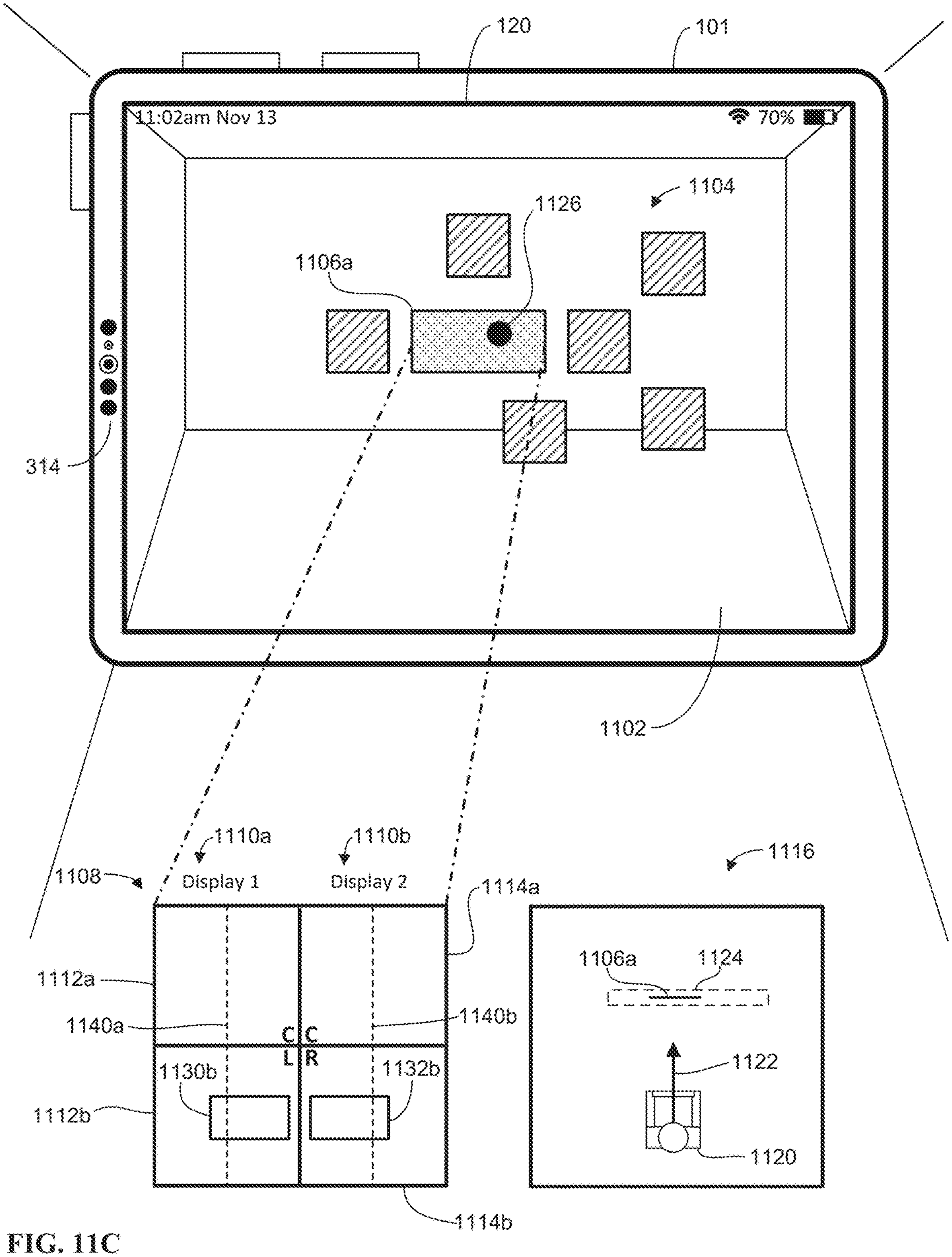

FIG. 11C illustrates user interface object 1106*a* displayed with the second visual appearance in three-dimensional environment 1102. As shown in FIG. 11C, user interface object 1106*a* is expanded in size compared to as shown in FIG. 11B when user interface object 1106*a* is transitioning between the first visual appearance and the second visual appearance. In FIG. 11C, the plurality of user interface objects 1104 are displayed having further moved and positioned away from user interface object 1106*a*. As shown in overhead view 1116, region 1124 occupied by the plurality of user interface objects 1104 is expanded relative to three-dimensional environment 1102 compared to as shown in FIG. 11B. In some embodiments, displaying user interface object 1106*a* with the second visual appearance includes displaying user interface object 1106*a* with a three-dimensional stereoscopic effect (e.g., as described with reference to method 1200) because the computer system 101 displays portions (via first display 1110*a* and second display 1110*b*) of second representation 1112*b* and second representation 1114*b* that include differences in region of content displayed (e.g., the portions includes regions that are left-of-center or right-of-center relative to center references lines 1140*a* and 1140*b*) and/or viewing angles into the content (e.g., left-of-center and/or right-of-center viewing angles in the content) associated with user interface object 1106*a*. In some embodiments, displaying user interface object 1106*a* with the second visual appearance includes displaying the content associated with user interface object 1106*a* with a greater amount of depth compared to the first visual appearance. In some embodiments, user interface object 1106*a* maintains the second visual appearance (e.g., and thus the three-dimensional stereoscopic effect) as long as user 1120 continues to direct their attention (e.g., by gaze 1126) toward user interface object 1106*a*.

As shown in legend 1108 in FIG. 11C, only second representation 1112*b* and second representation 1114*b* are displayed by first display 1110*a* and second display 1110*b*, respectively (e.g., because crossfading between the first representation 1112*a* and second representation 1112*b*, and first representation 1114*a* and second representation 1114*b* are completed). In some embodiments, displaying second representation 1112*b* and second representation 1114*b* corresponds to the second visual appearance of user interface object 1106*a*. In some embodiments, displaying different portions of second representation 1112*b* and second representation 1114*b* corresponds to presenting the three-dimensional stereoscopic effect with different magnitudes (e.g., displaying the content associated with user interface object 1106*a* with different amounts of depth). Particularly, a greater magnitude of the three-dimensional stereoscopic effect is presented in FIG. 11C compared to subsequent FIGS. 11D-11G, as will be described later, because of the portions of the second representation 1112*b* and second representation 1114*b* that are respectively displayed by first display 1110*a* and second display 1110*b*.

In FIG. 11C, a second portion 1130*b* of second representation 1112*b* is displayed by first display 1110*a*, and a second portion 1132*b* of second representation 1114*b* is displayed by second display 1110*b*. Second portion 1130*b* and second portion 1132*b* are larger in size compared to first portion 1130*a* and first portion 1132*a* (as shown and described with reference to FIG. 11B) due to the expanded size of user interface object 1106*a*. Second portion 1130*b* includes a portion of second representation 1112*b* that is more right-of-center relative to center reference line 1140*a* compared to first portion 1130*a*, and second portion 1132*b* includes a portion of second representation 1114*b* that is more left-of-center relative to center reference line 1140*b* compared to first portion 1132*a* In some embodiments, second portion 1130*b* includes a viewing angle into second representation 1112*b* that is more right-of-center relative to a viewing angle that is normal into the content, and second portion 1132*b* includes a viewing angle into second representation 1114*b* that is more left-of-center relative to a viewing angle that is normal into second representation 1114*b*. In some embodiments, by displaying portions of the content on first display 1110*a* and second display 1110*b* that include a greater difference in viewing angle and region of content displayed (e.g., as compared to the difference between first portion 1118*a* of first representation 1112*a* and first portion 1128*a* of first representation 1114*a* as shown and described with reference to FIG. 11A), computer system 101 is able to present a greater magnitude of the three-dimensional stereoscopic effect (e.g., as described with reference to method 1200).

Figure 11D:
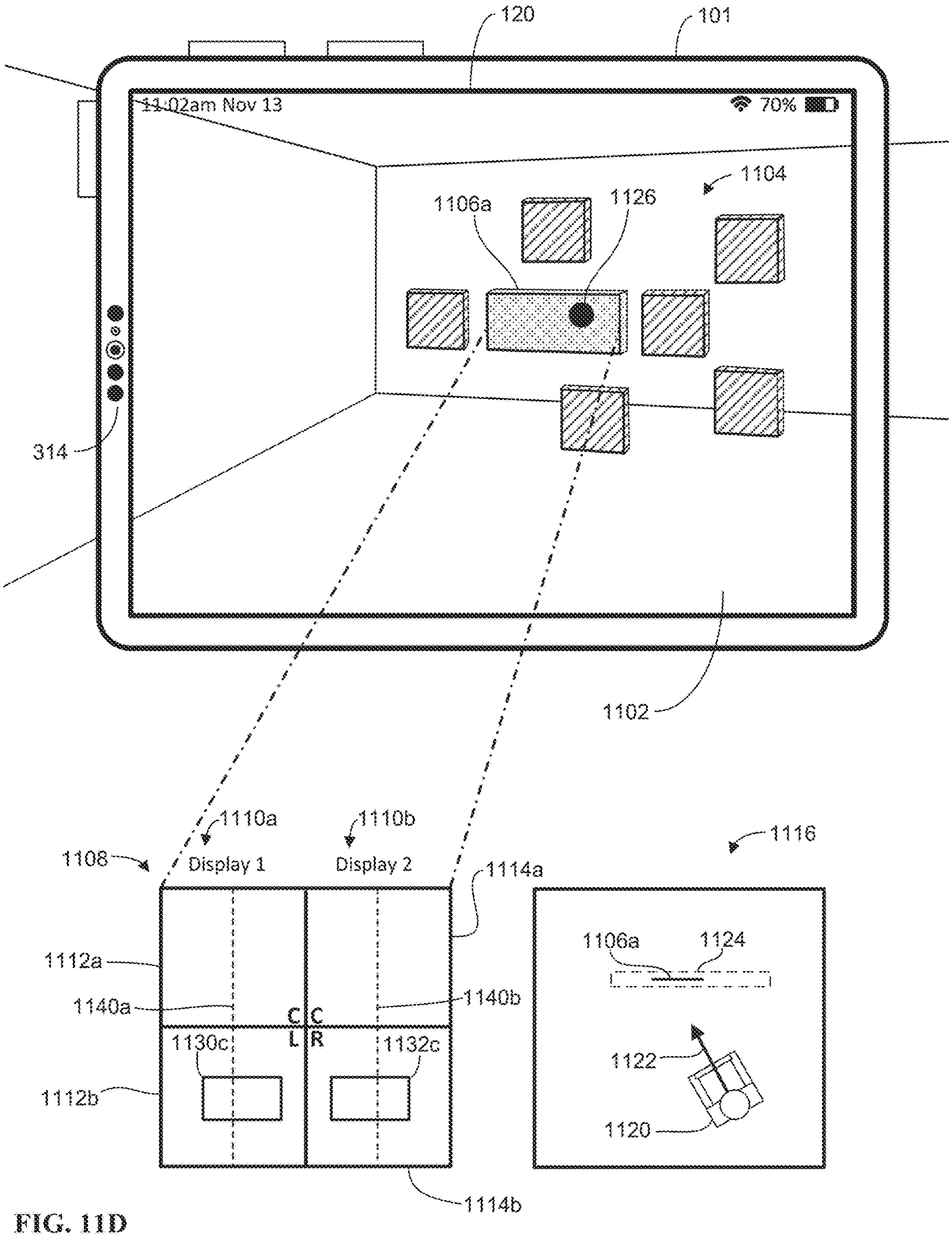

FIG. 11D illustrates user 1120 viewing user interface object 1106*a* from a less direct viewing angle compared to FIGS. 11A-11C. In some embodiments, user 1120 has moved their viewpoint rightward (e.g., caused by physical movement of user 1120 in their physical environment) relative to user interface object 1106*a* in the three-dimensional environment 1102 compared to as shown in FIG. 11C. As shown in FIG. 11D, gaze 1126 continues to be directed to user interface object 1106*a* and the user's viewing angle 1122 has changed to a viewing angle that differs by a greater amount from a direct viewing angle (e.g., a viewing angle normal to user interface object 1106*a*) compared to viewing angle 1122 shown in FIGS. 11A-11C. Particularly, user 1120 has changed their viewpoint to be to the right of user interface object 1106*a* relative to three-dimensional environment 1102. Because attention of user 1120 continues to be directed at user interface object 1106*a* (e.g., through gaze 1126), user interface object 1106*a* maintains the second visual appearance. The plurality of user interface objects 1104, including user interface object 1106*a*, maintain the same location in three-dimensional environment 1102 when user 1120 changes their viewpoint relative to user interface object 1106*a* (e.g., as shown in overhead view 1116, user interface object 1106*a* maintains at the same location in three-dimensional environment 1102, and region 1124 occupied by the plurality of user interface objects 1104 maintains the same size compared to as shown in FIGS. 11A-11C). Based on the new viewpoint of user 1120, the plurality of user interface objects 1104 are visible to user 1120 from a different viewing angle 1122 compared to FIG. 11C (e.g., such that the plurality of user interface objects 1104 appears rotated away from user 1120 relative to the user's new viewpoint because user interface object 1106*a* maintains displayed at the same location relative to three-dimensional environment 1102 while user 1120 changes their viewpoint relative to user interface object 1106*a*).

In some embodiments, as the viewing angle of user 1120 differs by a greater amount compared to a viewing angle normal to user interface object 1106*a*, computer system 101 reduces the magnitude of the three-dimensional stereoscopic effect presented by user interface object 1106*a* (e.g., such as described with reference to method 1200). In FIG. 11D, the three-dimensional stereoscopic effect presented by user interface object 1106*a* includes a reduced magnitude compared to the three-dimensional stereoscopic effect shown in FIG. 11C because viewing angle 1122 is a less direct viewing angle to user interface object 1106*a*. In some embodiments, as user 1120 changes their viewing angle 1122 relative to user interface object 1106*a*, computer system 101 shifts the portions of the content displayed associated with user interface object 1106*a* to become less disparate (e.g., computer system 101 gradually shifts the display of the portions of representations of the content displayed via first display 1110*a* and second display 1110*b* to include less difference in region of content displayed and/or viewing angle to the content). For example, as shown in legend 1108, the computer system has shifted the portions displayed from the second portion 1130*b* of second representation 1112*b* and the second portion 1132*b* of second representation 1114*b* to a third portion 1130*c* of second representation 1112*b* presented by first display 1110*a* and a third portion 1132*c* of second representation 1114*b* presented by second display 1110*b* as a result of the change in viewpoint of user 1120 (e.g., compared to the viewpoint of user 1120 in FIG. 11C). In some embodiments, presenting third portion 1130*c* and third portion 1132*c* correspond to presenting the three-dimensional stereoscopic effect with the magnitude shown in FIG. 11D (e.g., a reduced magnitude compared to as shown in FIG. 11C). Third portion 1130*c* is a portion of second representation 1112*b* that is less right-of-center (e.g., relative to center reference line 1140*a*) compared to second portion 1130*b* (as shown in FIG. 11C), and third portion 1132*c* is a portion of second representation 1114*b* that is less left-of-center (e.g., relative to center reference line 1140*b*) compared to second portion 1132*b* (as shown in FIG. 11B). For example, third portion 1130*c* includes a less leftward region of the content second representation 1112*b* compared to the second portion 1130*b*, and third portion 1132*c* includes a less rightward region of the content associated with second representation 1114*b* compared to second portion 1132*b*. In some embodiments, third portion 1130*c* and third portion 1132*c* include less of a difference in viewing angle and/or region of the content associated with user interface object 1106*a* displayed (e.g., as compared to the difference between second portion 1130*b* and second portion 1132*b* as shown in FIG. 11C). For example, in some embodiments, the angular distance between the viewing angle associated with third portion 1130*c* and the viewing angle associated with third portion 1132*c* is less than the angular distance between the viewing angle associated with second portion 1130*b* and the viewing angle second portion 1132*b*.

Figure 11E:
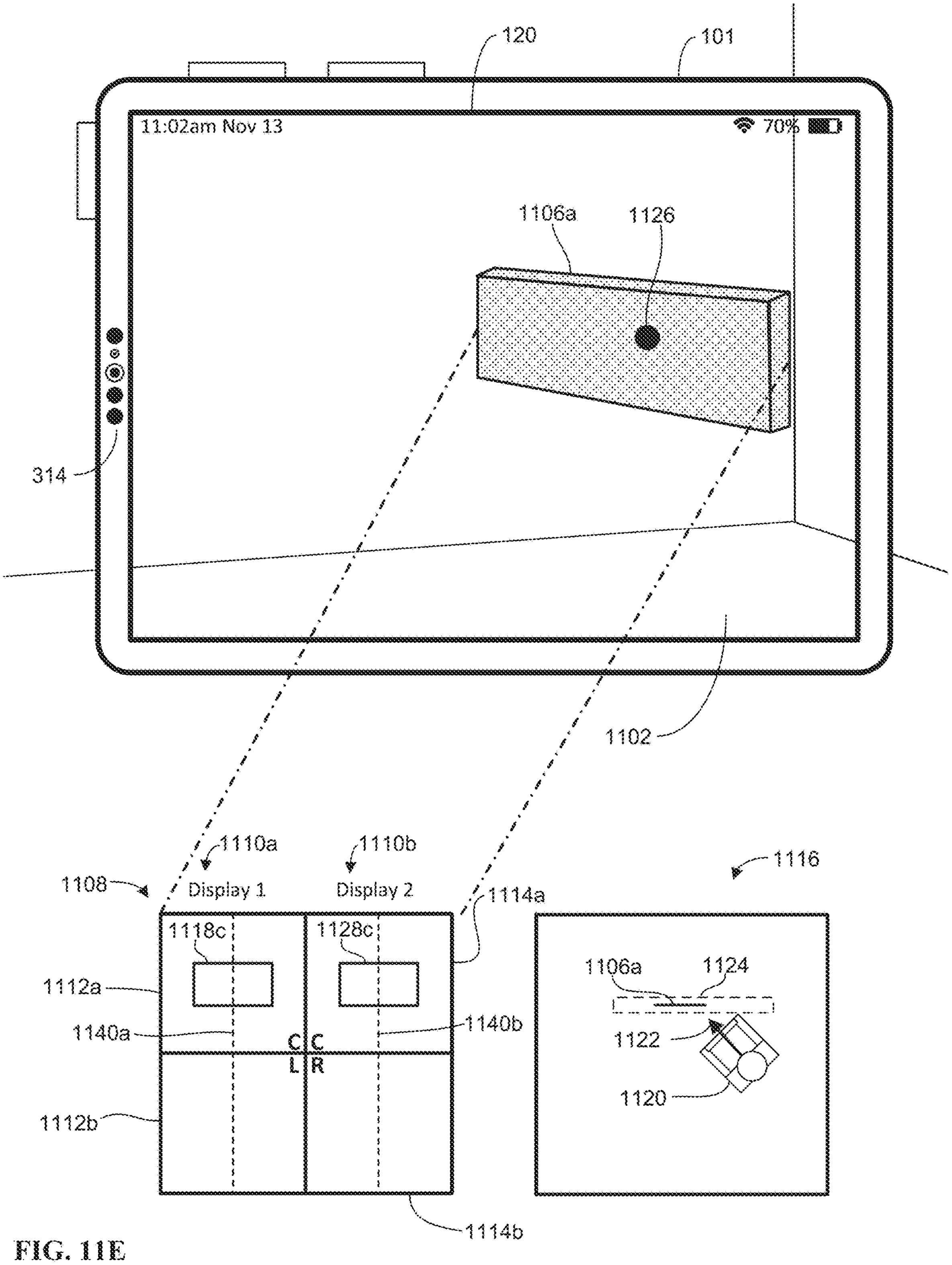

FIG. 11E illustrates user 1120 viewing user interface object 1106*a* from a less direct viewing angle compared to FIG. 11D. In some embodiments, user 1120 has moved their viewpoint more rightward (e.g., caused by physical movement of user 1120 in their physical environment) relative to user interface object 1106*a* in the three-dimensional environment 1102 compared to as shown in FIG. 11D. As shown in FIG. 11D, gaze 1126 continues to be directed to user interface object 1106*a*, but viewing angle 1122 has changed to an angle that differs by a greater amount from a direct viewing angle normal to user interface object 1106*a* compared to the viewing angle shown in FIG. 11D. Because attention of user 1120 continues to be directed at user interface object 1106*a* (through gaze 1126), the plurality of user interface objects 1104, including user interface object 1106*a* (as shown in overhead view 1116), maintain the same location in three-dimensional environment 1102. Based on the new viewpoint of user 1120, user interface object 1106*a* are visible to user 1120 from a different viewing angle compared to FIG. 11D (e.g., such that the plurality of user interface objects 1104 appears rotated away from user 1120 by a greater amount relative to the user's viewpoint compared to as shown in FIG. 11D because user interface object 1106*a* maintains displayed at the same location relative to three-dimensional environment 1102 while user 1120 changes their viewpoint relative to user interface object 1106*a*). It should be appreciated that only user interface object 1106*a* is shown via display generation component 120 in FIG. 11E (and subsequent FIGS. 11F and 11G) to clearly represent the user's viewpoint relative to user interface object 1106*a*, and in some embodiments the plurality of user interface objects 1104 continue to be displayed in three-dimensional environment 1102 as the user's viewpoint changes relative to user interface object 1106*a*.

In FIG. 11E, the second visual appearance of user interface object 1106*a* includes a visual appearance with a reduced magnitude of the three-dimensional stereoscopic effect (e.g., the three-dimensional stereoscopic effect is removed from the visual appearance of user interface object 1106*a*) compared to as shown in FIG. 11D (e.g., because the portions of the content displayed on first display 1110*a* and second display 1110*b* are less disparate). In some embodiments, when viewing angle 1122 differs from a reference viewing angle (e.g., a viewing angle normal to user interface object 1106*a*) by more than a threshold amount (e.g., 5, 10, 20, 30, 40, 50, 50, 60 or 70 degrees), the three-dimensional stereoscopic effect is removed from the second visual appearance of user interface object 1106*a*, or the three-dimensional stereoscopic effect is reduced to its lowest magnitude. As shown in FIG. 11E, second representation 1112*b* and second representation 1114*b* are no longer displayed by first display 1110*a* and second display 1110*b*, respectively, because viewing angle 1122 differs from the reference viewing angle by more than the threshold amount. As shown in legend 1108, a third portion 1118*c* of first representation 1112*a* is displayed by first display 1110*a*, and a third portion 1128*c* of first representation 1114*a* is displayed by second display 1110*b*. Third portion 1118*c* of first representation 1112*a* and third portion 1128*c* of first representation 1114*a* including a larger width compared to first portion 1118*a* of first representation 1112*a* and first portion 1128*a* of second representation 1114*a* (e.g., due to the expanded size of user interface object 1106*a* in FIG. 11E compared to the size of user interface object 1106*a* in FIG. 11A). In some embodiments, in response to a change in the viewing angle 1122 that exceeds the threshold amount relative to the reference viewing angle, computer system 101 change the visual appearance of user interface object 1106*a* to the first visual appearance shown in FIG. 11A (e.g., by gradually reducing the size of user interface object 1106*a* while concurrently removing the three-dimensional stereoscopic effect of the content associated with user interface object 1106*a*). In some embodiments, displaying third portion 1118*c* and third portion 1128*c* corresponds to displaying the content associated with user interface object 1106*a* with less depth (e.g., with a reduced magnitude of the three-dimensional stereoscopic effect) because the third portion 1118*c* of first representation 1112*a* and third portion 1128*c* of first representation 1114*a* include less difference in viewing angle and/or region of content presented (e.g., as compared to the difference between second portion 1130*b* of second representation 1112*b* and second portion 1132*b* of second representation 1114*b* as shown and described with reference to FIG. 11C) because the third portion 1118*c* of first representation 1112*a* and the third portion 1128*c* of first representation 1114*a* are both center portions of the content. It should be appreciated that although FIGS. 11D and 11E illustrate user 1120 viewing user interface object 1106*a* from a right-side viewing angle relative to user interface object 1106*a*, in some embodiments the three-dimensional stereoscopic effect of user interface object 1106*a* reduces in magnitude as user 1120 changes their viewpoint to a left-side viewpoint relative to user interface object 1106*a*.

Figure 11F:
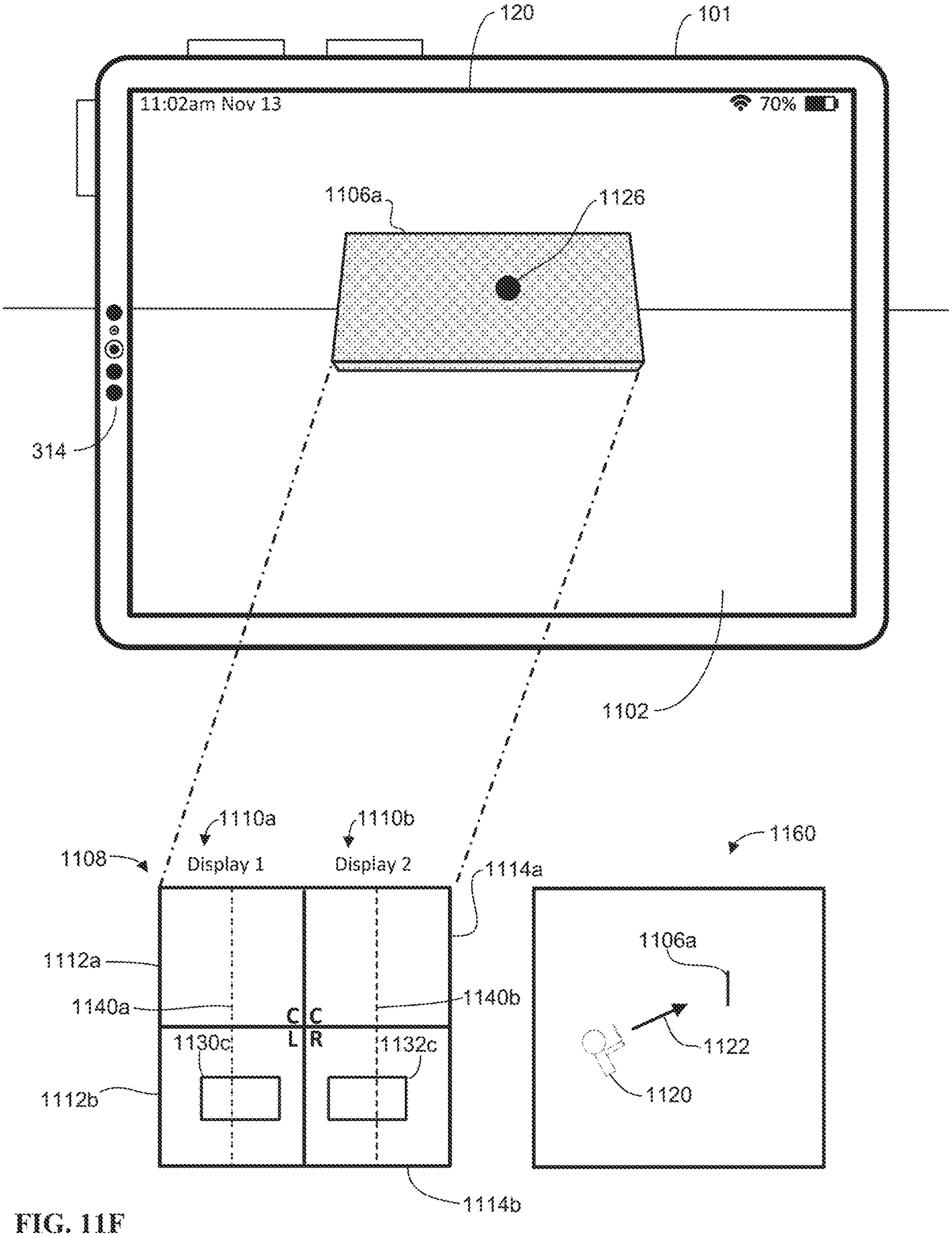

FIG. 11F illustrates user 1120 viewing user interface object 1106*a* from a less direct viewing angle compared to as shown in FIG. 11C. In some embodiments, user 1120 has moved their viewpoint downward (e.g., cause by physical movement of user 1120 in their physical environment) relative to user interface object 1106*a* in three-dimensional environment 1102 compared to as shown in FIG. 11C. In FIG. 11F, a side-view schematic 1160 of three-dimensional environment 1102 is shown illustrating user 1120 with a viewing angle 1122 from a viewpoint relative to user interface object 1106*a* that is below user interface object 1106*a* (e.g., in FIG. 11C, user 1120 is standing and has a direct viewing angle to user interface object 1106*a*, and in FIG. 11F user 1120 is sitting and has an indirect viewing angle to user interface object 1106*a*). Because attention of user 1120 continues to be directed at user interface object 1106*a* (e.g., through gaze 1126), as user 1120 changes their viewpoint relative to user interface object 1106*a*, user interface object 1106*a* maintains the second visual appearance. Based on the new viewpoint of user 1120, user interface object 1106*a* is visible to user 1120 from a different viewing angle 1122 compared to FIG. 11C (e.g., such that user interface object 1106*a* is tilted away from user 1120 relative to the user's new viewpoint because user interface object 1106*a* maintains displayed at the same location relative to three-dimensional environment 1102 while user 1120 changes their viewpoint relative to user interface object 1106*a*).

In FIG. 11F, the three-dimensional stereoscopic effect presented by user interface object 1106*a* includes a reduced magnitude compared to the three-dimensional stereoscopic effect shown in FIG. 11C because viewing angle 1122 is a less direct viewing angle to user interface object 1106*a*. In some embodiments, as user 1120 changes their viewing angle 1122 relative to user interface object 1106*a*, computer system 101 shifts the portions of the content displayed associated with user interface object 1106*a* to become less disparate (e.g., as described with reference to FIG. 11D). For example, as shown in legend 1108, the computer system has shifted the portions displayed from the second portion 1130*b* of second representation 1112*b* and the second portion 1132*b* of second representation 1114*b* (e.g., as shown in FIG. 11C), to third portion 1130*c* of second representation 1112*b* presented by first display 1110*a*, and third portion 1132*c* of second representation 1114*b* presented by second display 1110*b* as a result of the change in viewpoint of user 1120 (e.g., compared to the viewpoint of user 1120 shown in FIG. 11C). In some embodiments, displaying third portion 1130*c* and third portion 1332*c* corresponds to displaying one or more characteristics of the three-dimensional stereoscopic effect with reduced magnitude as described with reference to FIG. 11D, and are not repeated here for brevity. Although third portion 1130*c* and third portion 1132*c* are shown in both FIGS. 11D and 11F, it should be appreciated that in some embodiments, changing the magnitude of the three-dimensional stereoscopic effect from a higher magnitude to a lower magnitude includes a continuous transition that includes displaying other portions of representations of the content associated with user interface object 1106*a* that include less difference in viewing angle to the content and/or region of content presented compared to the difference between second portion 1130*b* and second portion 1132*b* as shown in FIG. 11C.

Figure 11G:
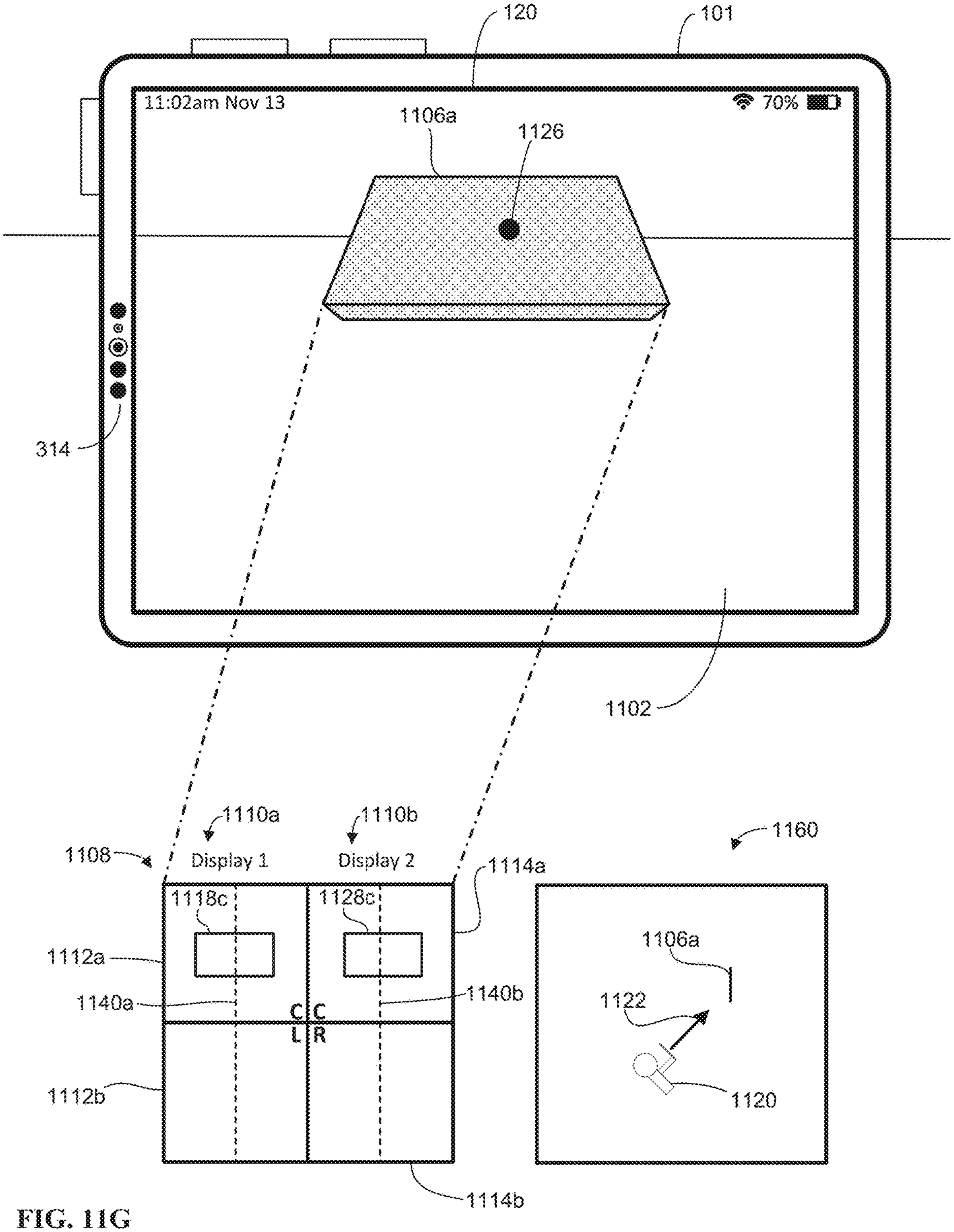

FIG. 11G illustrates user 1120 viewing user interface object 1106*a* from a less direct viewing angle compared to FIG. 11F. In some embodiments, user 1120 has moved their viewpoint more downward (e.g., caused by physical movement of user 1120 in their physical environment) relative to user interface object 1106*a* in the three-dimensional environment 1102 compared to as shown in FIG. 11F. As shown in side-view 11260 user 1120 has a viewing angle 1122 from a viewpoint relative to user interface object 1106*a* that is further below user interface object 1106*a* compared to the viewpoint shown in FIG. 11F. Based on the new viewpoint of user 1120, user interface object 1106*a* is visible to user 1120 from a different viewing angle 1122 compared to FIG. 11F (e.g., such that user interface object 1106*a* appears tilted away from user 1120 by a greater amount compared to as shown in FIG. 11D).

In FIG. 11G, the second visual appearance of user interface object 1106*a* includes a three-dimensional stereoscopic effect with a reduced magnitude compared to the three-dimensional stereoscopic effect as shown in FIG. 11F. In some embodiments, viewing angle 1122 differs from a reference viewing angle (e.g., a viewing angle normal to user interface object 1106*a*) by more than a threshold amount, and three-dimensional stereoscopic effect is removed and/or reduced to its minimum magnitude. As shown in legend 1108, computer system 101 changes the portions of the content display such that portions of the second representation 1112*b* and second representation 1114*b* are no longer displayed by first display 1110*a* and second display 1110*b*, respectively. The computer system 1011 transitions the display to third portion 1118*c* of first representation 1112*a* via first display 1110*a*, and third portion 1128*c* of first representation 1114*a* via second display 1110*b*. In some embodiments, displaying third portion 1118*c* and third portion 1128*c* correspond to displaying one or more characteristics of user interface object 1106*a* as described with reference to FIG. 11E, and are not repeated here for brevity. It should be appreciated that although FIGS. 11F and 11G illustrate user 1120 viewing user interface object 1106*a* from a viewing angle below user interface object 1106*a*, in some embodiments the three-dimensional stereoscopic effect of user interface object 1106*a* is similarly reduced in magnitude as user 1120 changes their viewpoint relative to user interface object 1106*a* from above.

Figure 11H:
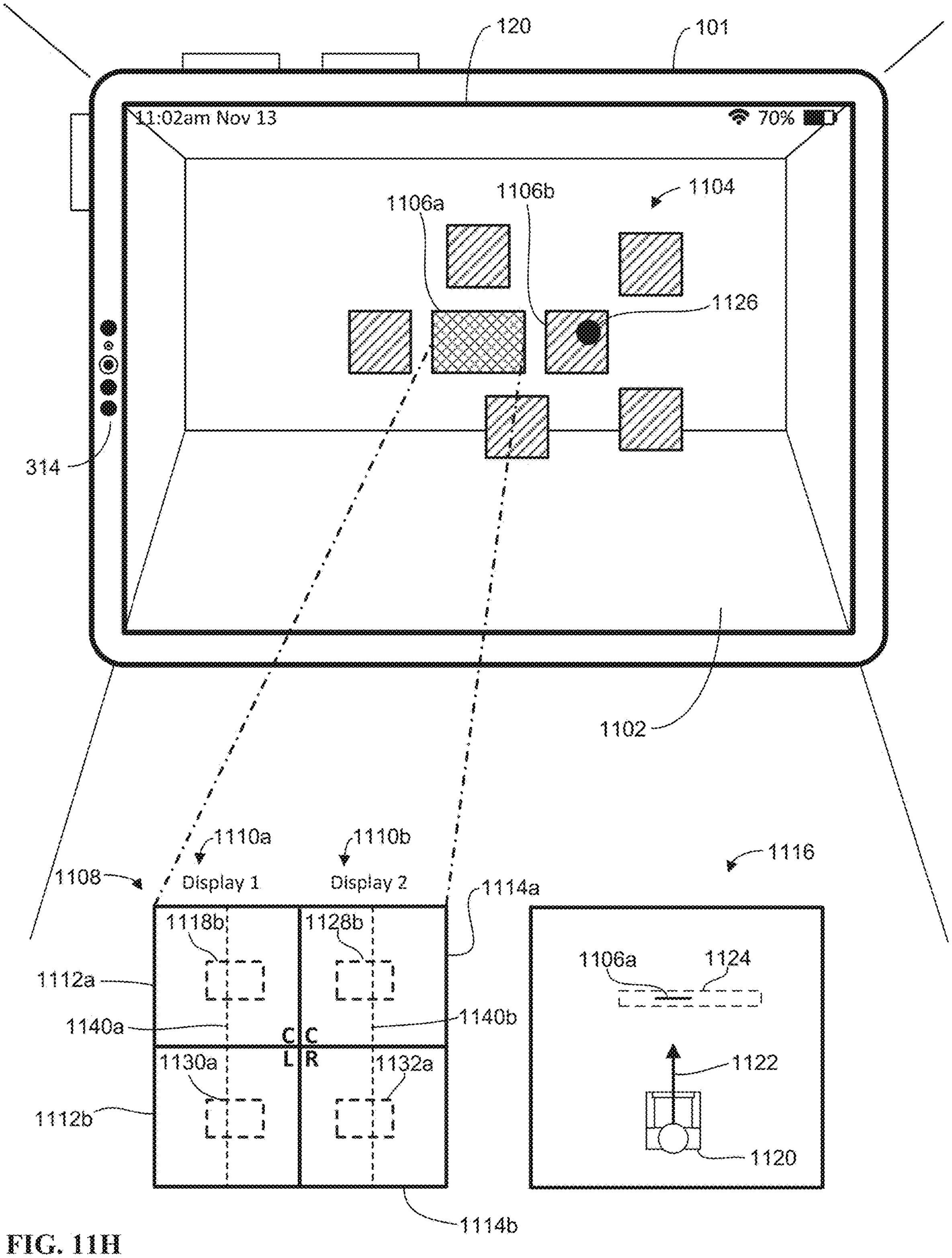

FIG. 11H illustrates user 1120 directing attention toward a different user interface object in three-dimensional environment 1102. Particularly, user 1120 changes the direction of their attention (e.g., by gaze 1126) from user interface object 1106*a* (e.g., as shown in FIG. 11C) to user interface object 1106*b*. In some embodiments, FIG. 11H illustrates the change in visual appearance of user interface object 1106*a* that occurs in response to user 1120 changing the direction of their attention toward user interface object 1106*b*. User interface object 1106*b* is a user interface object of the plurality of user interface objects 1104 and has the first visual appearance. In some embodiments, because attention is directed away from user interface object 1106*a*, the visual appearance of user interface object 1106*a* is gradually modified from the second visual appearance to the first visual appearance (e.g., as described with reference to method 1200). As shown in FIG. 11H, user interface object 1106*a* is reduced in size compared to as shown in FIGS. 11C-11G. In some embodiments, as user interface object 1106*a* transitions from the second visual appearance to the first visual appearance, user interface object 1106*a* reduces in size asymmetrically (e.g., horizontally relative to the viewpoint of user 1120. In some embodiments, as user interface object 1106*a* transitions from the second visual appearance to the first visual appearance, computer system 101 changes the spatial arrangement of the plurality of user interface objects 1104 relative to user interface object 1106*a*. As shown in FIG. 11H, the plurality of user interface objects 1104 have moved toward user interface object 1106*a* compared to the spatial arrangement of the plurality of user interface objects 1104 relative to user interface object 1106*a* as shown in FIG. 11C. As shown in overhead view 1116, region 1124 occupied by the plurality of user interface objects 1104 is reduced in size relative to three-dimensional environment 1102 (e.g., compared to region 1124 as shown in FIG. 11C).

As shown in legend 1108, first display 1110*a* displays a transition between displaying second representation 1112*b* and displaying first representation 1112*a*. In some embodiments, the transition includes one or more characteristics of transitioning between first representation 1112*a* and second representation 1112*b* described with reference to FIG. 11B and are not repeated here for brevity. In FIG. 11H, first portion 1130*a* of second representation 1112*b* and second portion 1118*b* of first representation 1112*a* are displayed by first display 1110*a*. Although the same portions of first representation 1112*a* and second representation 1112*b* are shown in FIG. 11H as shown in FIG. 11B, it should be appreciated that in some embodiments the transition between displaying second representation 1112*b* and first representation 1112*a* is a continuous transition that includes displaying other portions of the content associated with user interface object 1106*a* that are not first portion 1130*a* and second portion 1118*b* as user interface object 1106*a* changes from the second visual appearance and the first visual appearance. In some embodiments, as the transition between displaying second representation 1112*b* and first representation 1112*a* occurs, the respective portions of second representation 1112*b* and first representation 1112*a* displayed by first display 1110*a* continue to reduce in size. In some embodiments, as the transition between displaying second representation 1112*b* and first representation 1112*a* occurs, second representation 1112*b* gradually gains transparency and/or first representation 1112*a* gains opacity.

As shown in legend 1108, second display 1110*b* displays a transition from displaying second representation 1114*b* to displaying first representation 1114*a*. In some embodiments, the transition between second representation 1114*b* and first representation 1114*a* displayed by second display 1110*b* includes one or more characteristics of the transition between second representation 1112*b* and first representation 1112*a* displayed by first display 1110*a* and are not repeated for brevity.

Figure 11I:
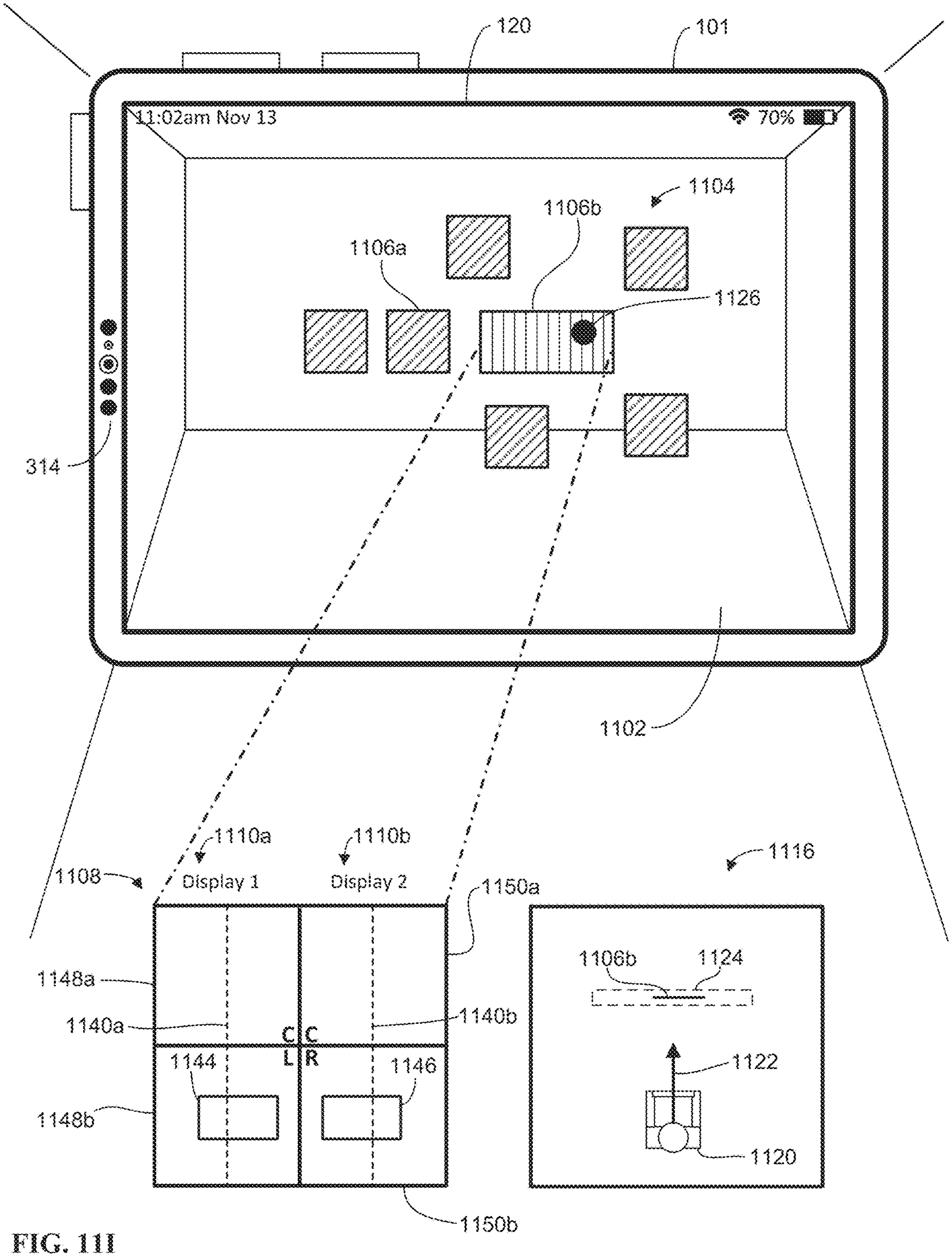
Figure 12A:
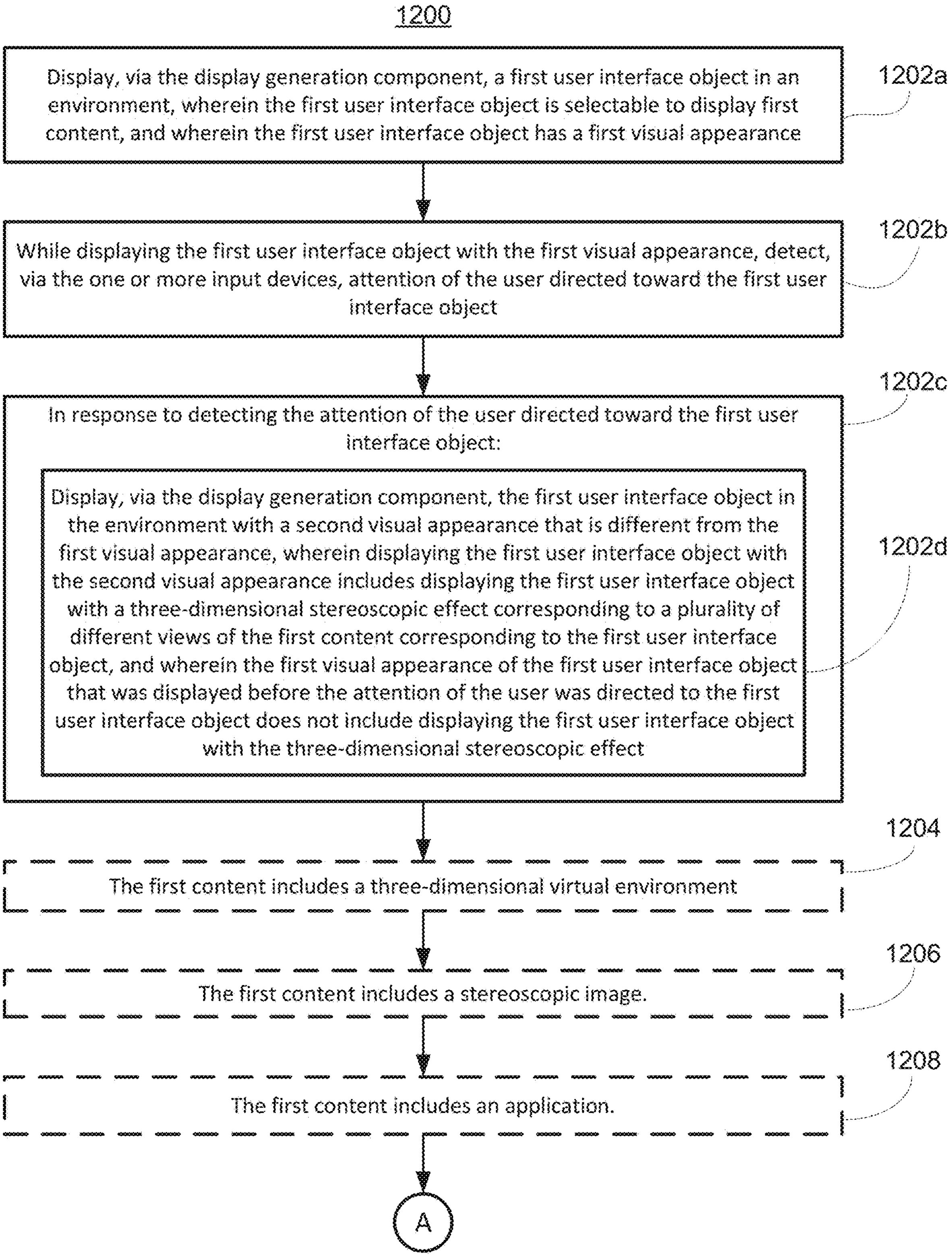
Figure 12C:
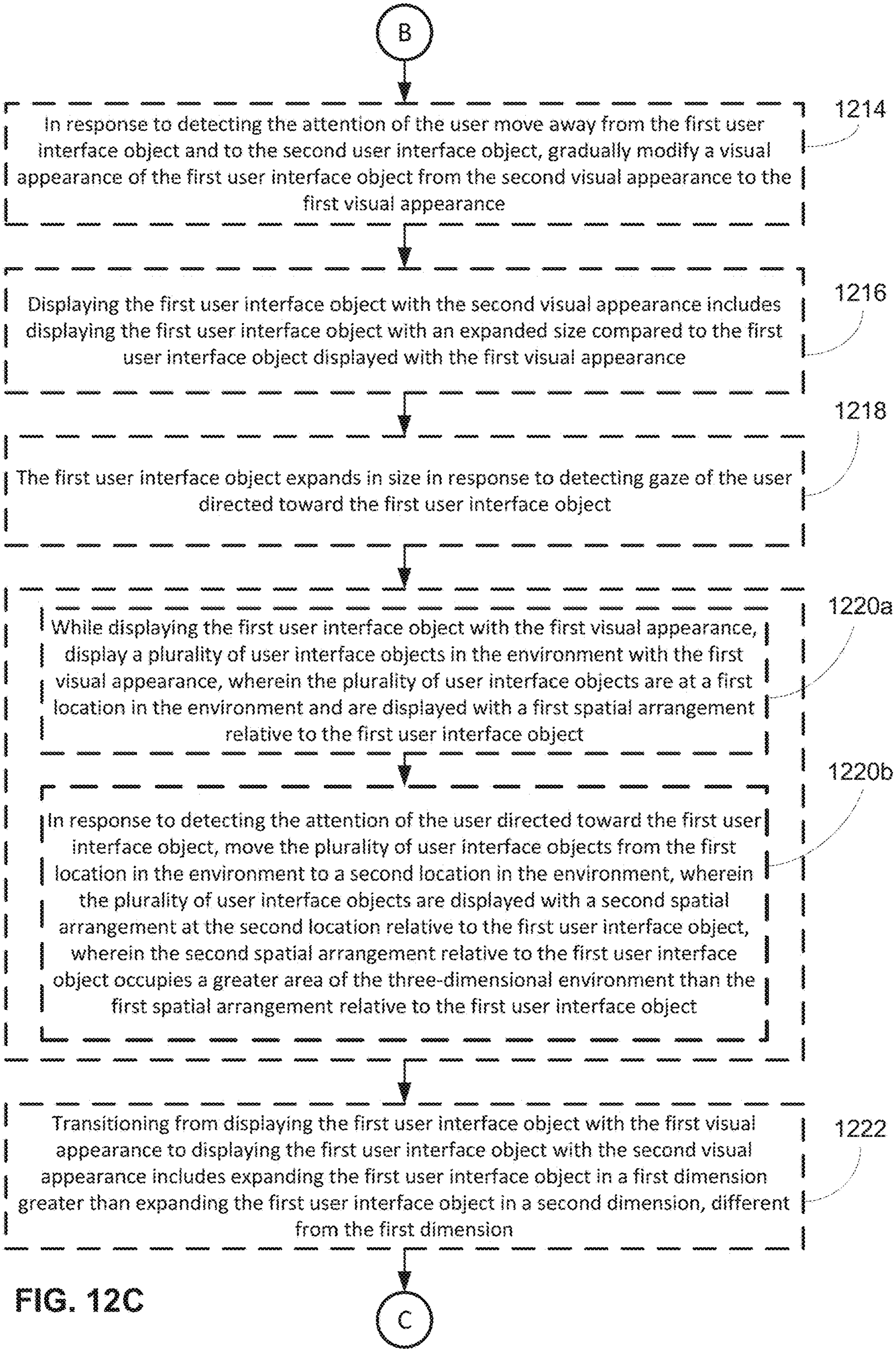
Figure 12D:
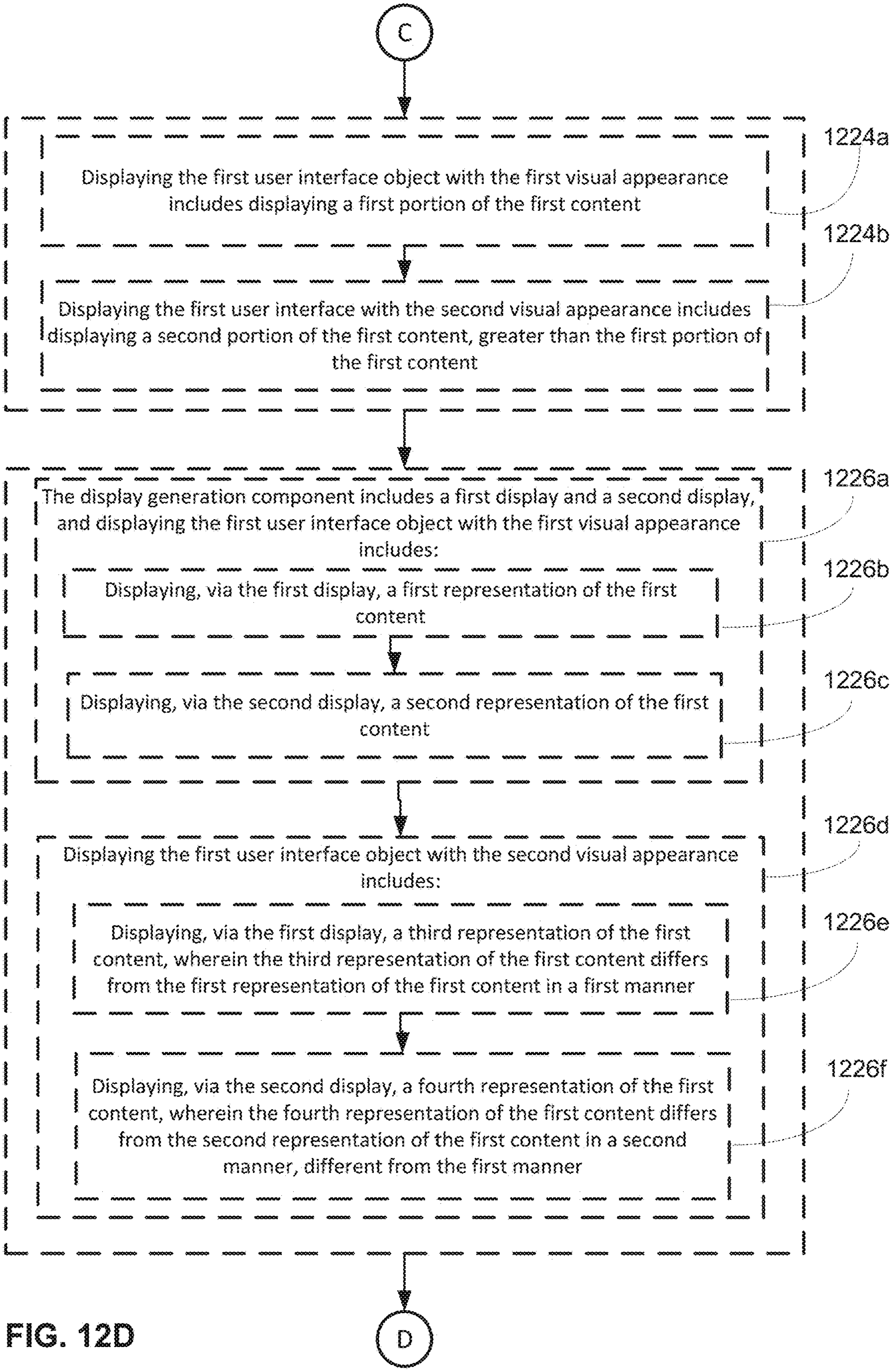
Figure 12E:
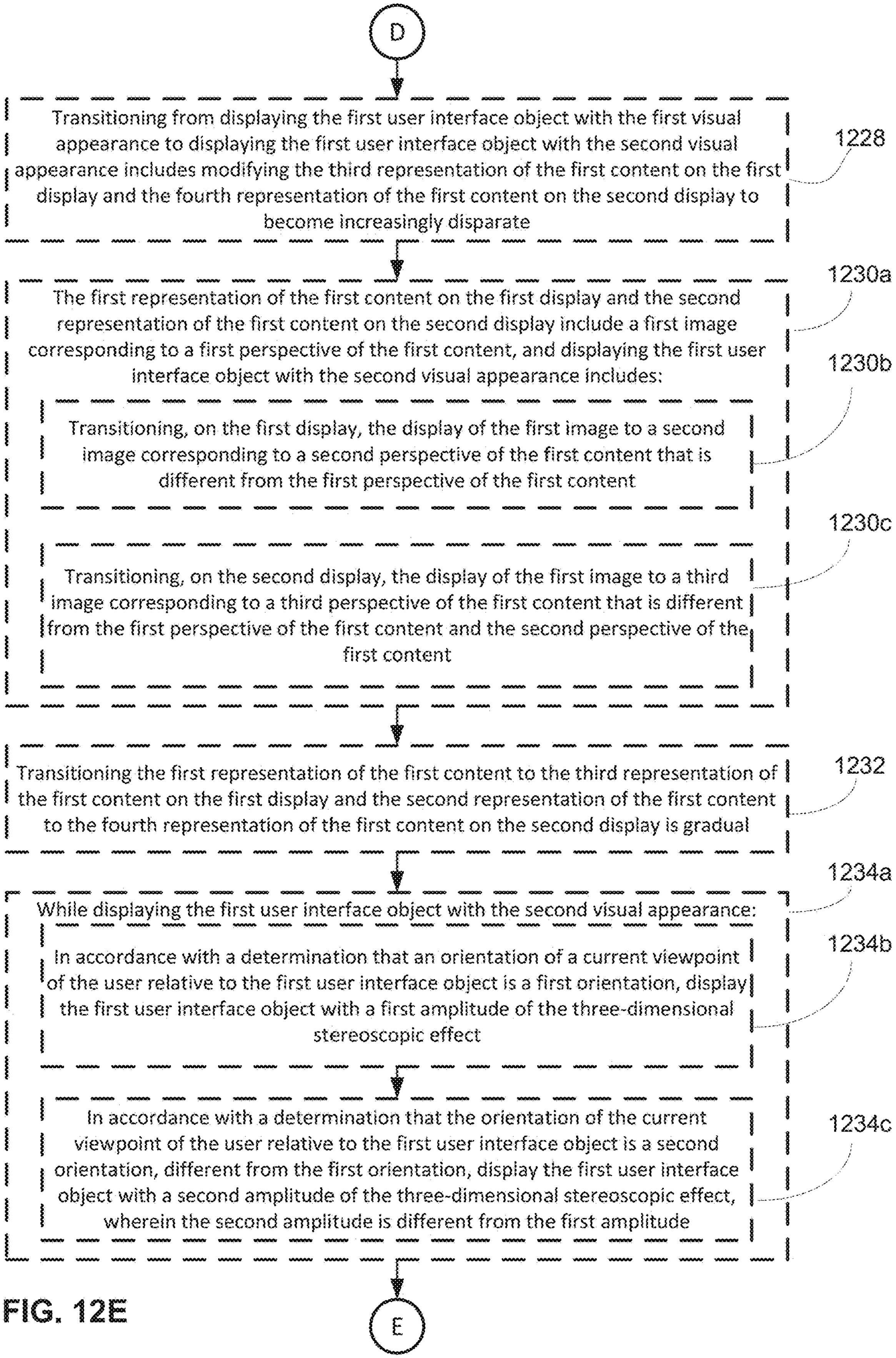
Figure 12F:
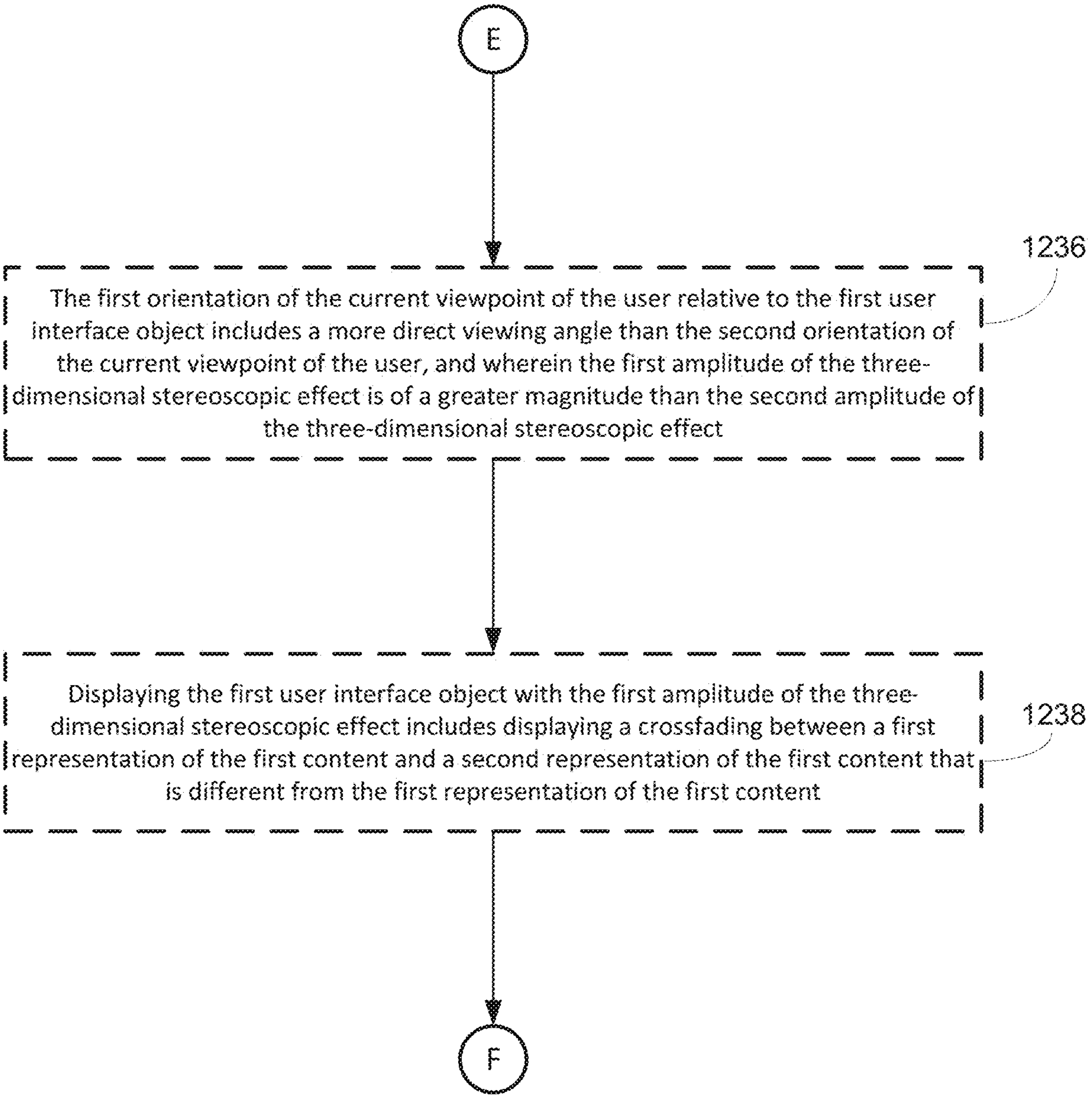
Figure 12G:
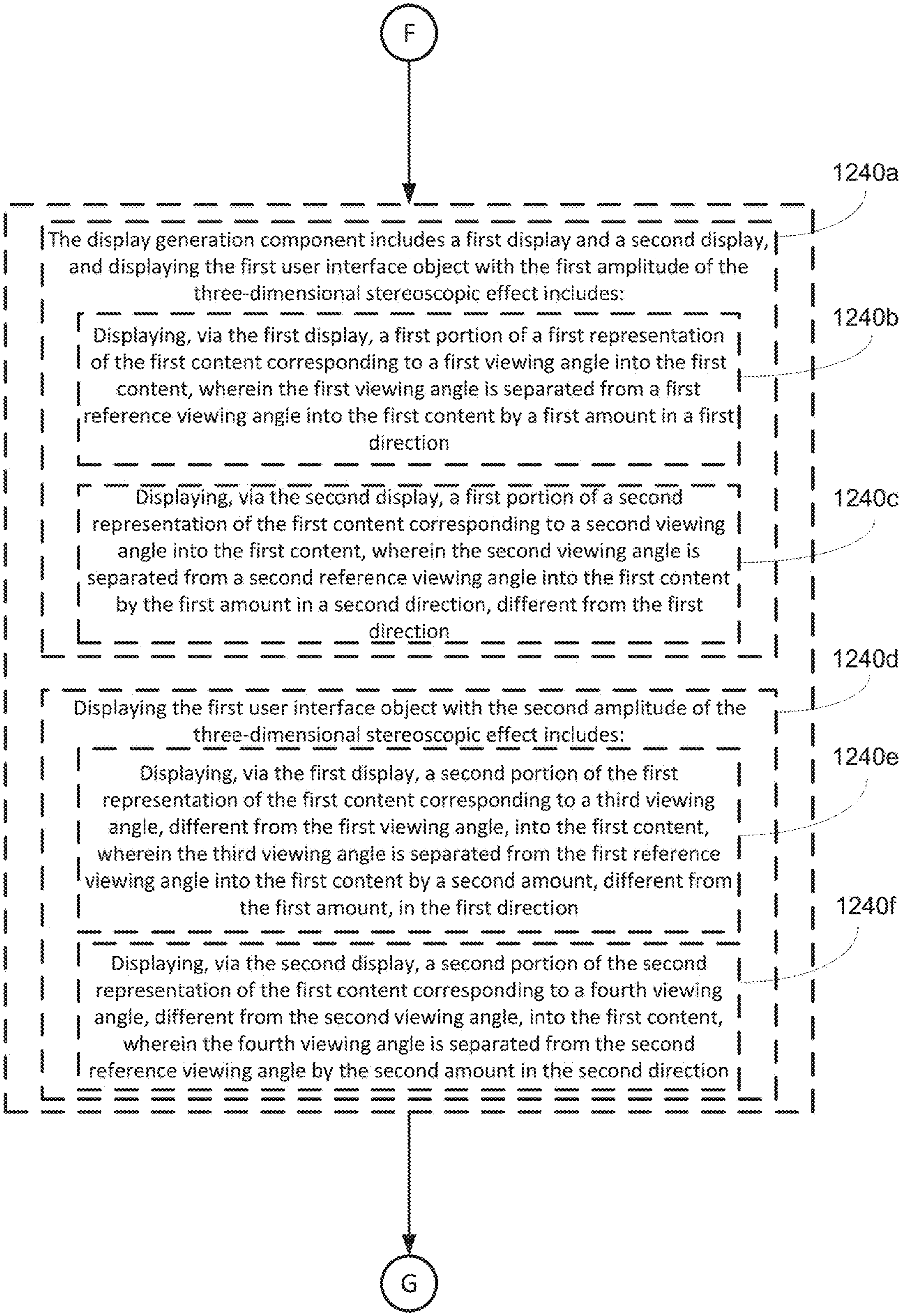
Figure 12H:
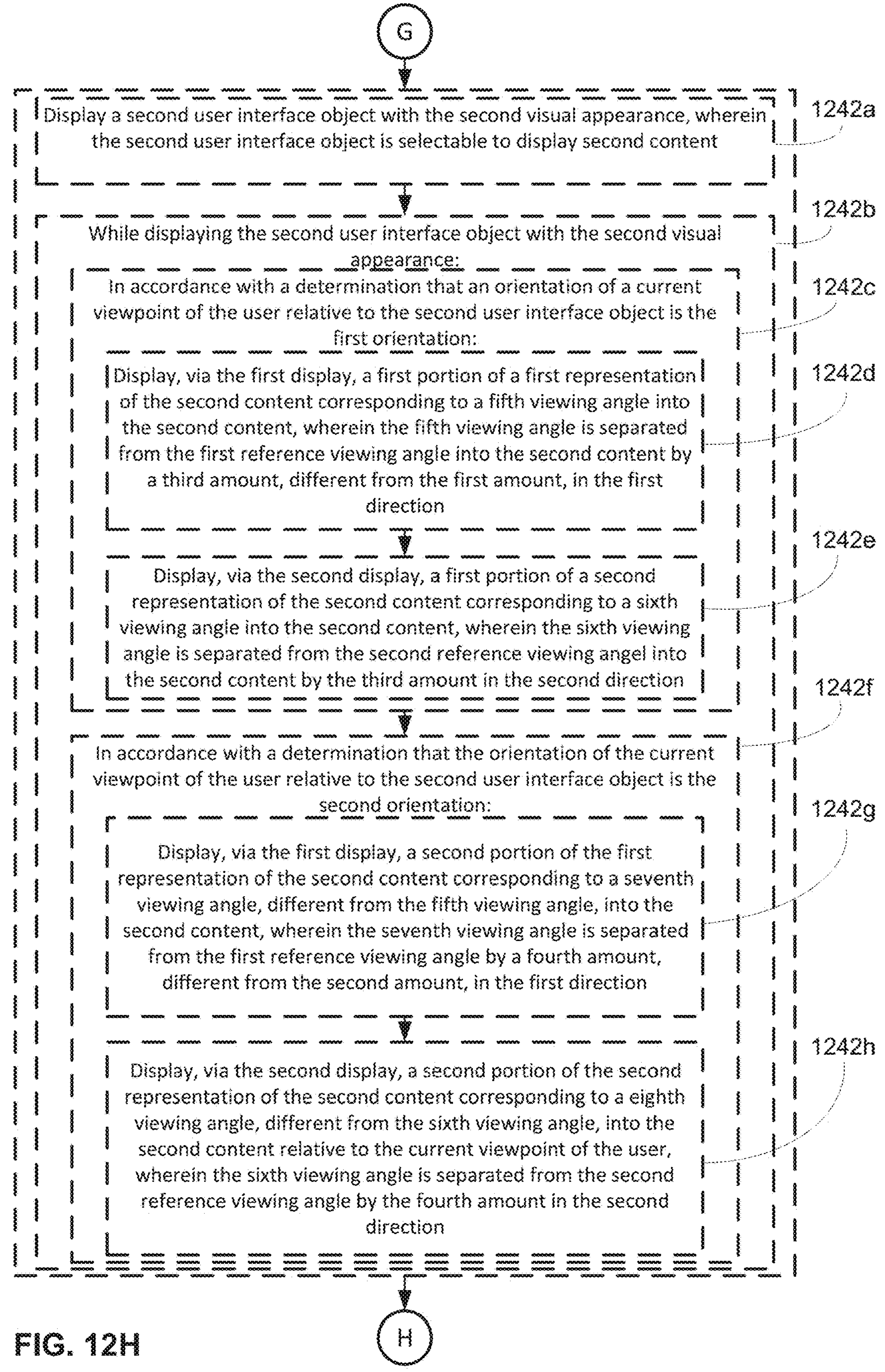
Figure 12I:
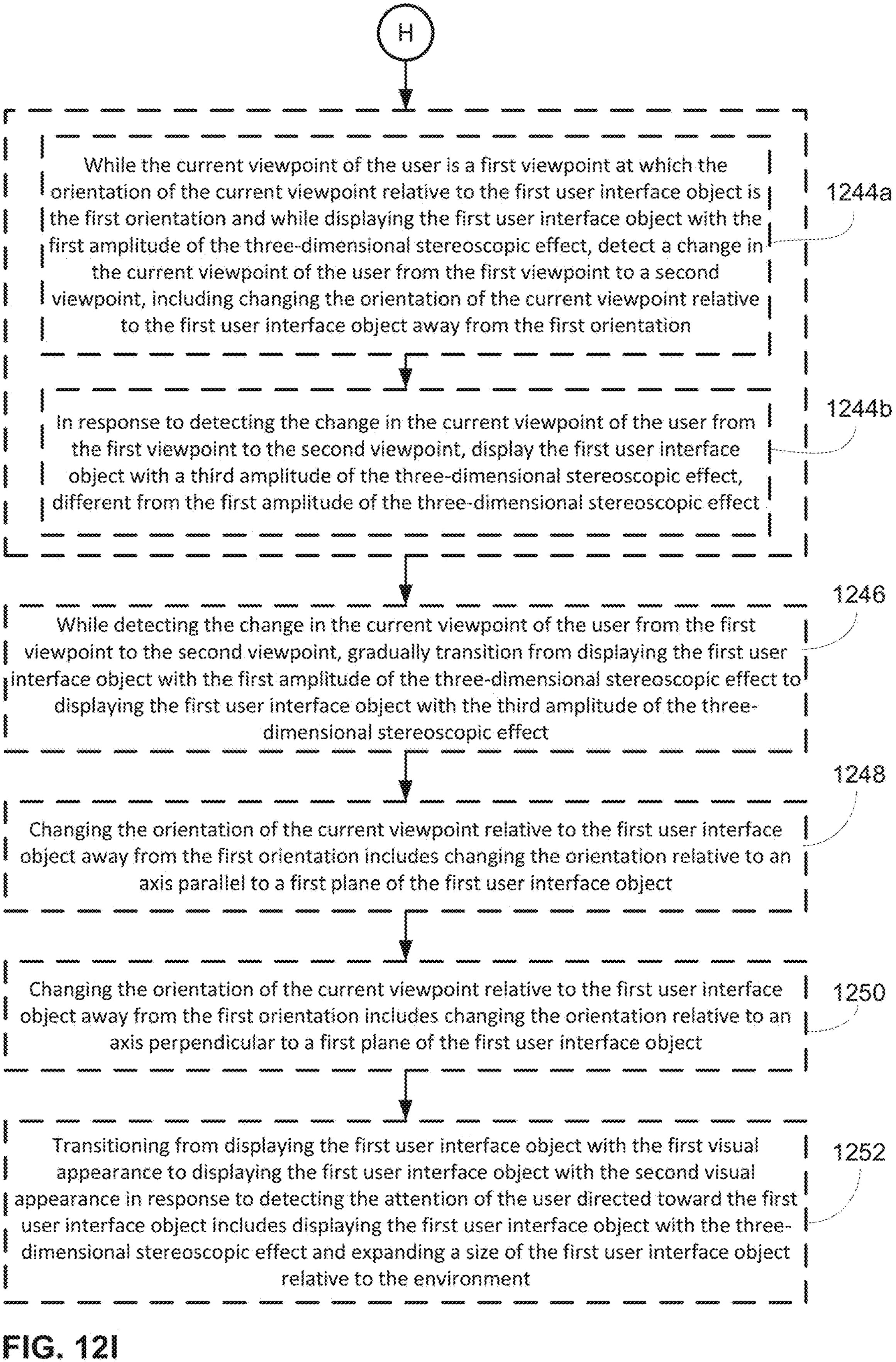

FIG. 11I illustrates a result of the continued gaze 1126 of user 1120 toward user interface object 1106*b*. Particularly, FIG. 11I illustrates that computer system 101 has modified the visual appearance of user interface object 1106*b* to the second visual appearance and user interface object 1106*a* to the first visual appearance. In FIG. 11I, legend 11I corresponds to the visual appearance of user interface object 1106*b* (e.g., as opposed to corresponding to the visual appearance of user interface object 1106*a* as shown in FIGS. 11A-11H). In some embodiments, the second visual appearance of user interface object 1106*b* includes displaying the content associated with user interface object 1106*b* with the three-dimensional stereoscopic effect (e.g., as described with reference to method 1200). In some embodiments, displaying second user interface object 1106*b* with the second visual appearance include one or more characteristics of displaying user interface object 1106*a* with the second visual appearance, and are not repeated for brevity. In some embodiments, the content associated with user interface object 1106*b* is not the same as the content associated with user interface object 1106*a* (e.g., as schematically represented by the different pattern of user interface object 1106*b* shown in FIG. 11I compared to the pattern of user interface object 1106*a* shown in FIG. 11C). In FIG. 11I, the plurality of user interface objects 1104, including user interface object 1106*a* (now displayed with the first visual appearance), are displayed away from user interface object 1106*b*. As shown in overhead view 1116, region 1124 of three-dimensional environment 1102 occupied by the plurality of user interface objects 1104 is expanded in size and positioned in a different portion in three-dimensional environment 1102 compared to when user interface object 1106*a* is displayed with the second visual appearance (e.g., because user interface object 1106*b* is located in a different part of the grid of the plurality of user interface objects 1104, and movement of the plurality of user interface objects 1104 away from user interface object 1106*b* shifts region 1124 to a different portion of three-dimensional environment 1102 compared to as shown in FIG. 11C).

In FIG. 11I, legend 1108 includes first representation 1148*a* and second representation 1148*b* configured to be displayed by first display 1110*a*, and first representation 1150*a* and second representation 1150*b* configured to be displayed by second display 1110*b*. In some embodiments, first representation 1148*a* and first representation 1150*a* correspond to center-capture representations of the content associated with user interface object 1106*b* and include one or more characteristics of first representation 1112*a* and first representation 1114*a* as previously described with reference to FIGS. 11A-11H. In some embodiments, second representation 1148*b* corresponds to a representation of the content associated with user interface object 1106*b* from a left-of-center viewpoint and includes one or more characteristics of second representation 1112*b* as previously described with reference to FIGS. 11A-11H. In some embodiments, second representation 1150*b* corresponds to a representation of the content associated with user interface object 1106*b* from a right-of-center viewpoint and includes one or more characteristics of second representation 1114*b* as previously described with reference to FIGS. 11A-11H.

In FIG. 11I, a portion 1144 of second representation 1148*b* is displayed by first display 1110*a*, and a portion 1146 of second representation 1150*b* is displayed by second display 1110*b*. In some embodiments, displaying portion 1144 and portion 1146 corresponds to displaying a maximum magnitude of the three-dimensional stereoscopic effect of the content associated with user interface object 1106*b* (e.g., because user 1120 has a viewing angle 1122 that is within a threshold distance of a viewing angle normal to user interface object 1106*b*). Portion 1144 includes a portion of second representation 1148*b* that is right-of-center relative to center reference line 1140*a*, and portion 1146 includes a portion of second representation 1150*b* that is left-of-center relative to center reference line 1140*b*. In some embodiments, portion 1144 includes a viewing angle into the content associated with user interface object 1106*b* that is right-of-center relative to a viewing angle normal to the content, and portion 1146 includes a viewing angle into the content associated with user interface object 1106*b* that is left-of-center relative to a viewing angle normal to the content. In some embodiments, because the content associated with user interface object 1106*b* is different from the content associated with user interface object 1106*a*, the difference between the portions of the content displayed when displaying the three-dimensional stereoscopic effect with the maximum magnitude for the content associated with user interface object 1106*b* is different from the difference between the portions of the content displayed when displaying the three-dimensional stereoscopic effect with the maximum magnitude for the content associated with user interface object 1106*a*. For example, in some embodiments, the angular distance between the viewing angle associated with portion 1144 and the viewing angle associated with portion 1146 is different from the angular distance between the viewing angle associated with second portion 1130*b* and the viewing angle associated with second portion 1132*b* due to differences between the content associated with user interface object 1106*a* and the content associated with user interface object 1106*b*.

The visual appearance and/or change in the visual appearance of user interface object 1106*b* (e.g., and/or the other user interface objects of the plurality of user interface objects 1104) optionally includes one or more characteristics of the visual appearance and/or change in visual appearance of user interface object 1106*a* (e.g., in response to directed attention by user 1120 and/or based on changes in the user's viewing angle 1122 relative to user interface object 1106*a*) as described with reference to FIGS. 11A-11H. For example, the three-dimensional stereoscopic effect of user interface object 1106*b* includes one or more characteristics of the three-dimensional stereoscopic effect of user interface object 1106*a*. For example, the magnitude of the three-dimensional stereoscopic effect of user interface object 1106*b* changes based on the user's viewing angle 1122 (e.g., as the viewing angle 1122 increases in difference from the reference viewing angle, the magnitude of the three-dimensional stereoscopic effect displayed decreases) because computer system 101 modifies the portions displayed of the representations (e.g., first representations 1148*a* and 1150*a* and second representations 1148*b* and 1150*b*) of the content associated with user interface object 1106*b* displayed by first display 1110*a* and second display 1110*b* to become less disparate. For example, in response to directed attention (e.g., by gaze 1126) of user 1120 toward another user interface object of the plurality of user interface objects 1104 different from user interface object 1106*b*, computer system 101 transitions the display of the visual appearance of user interface object 1106*b* from the second visual appearance to the first visual appearance.

FIGS. 12A-12I is a flowchart illustrating a method of displaying a user interface object in a three-dimensional environment with a three-dimensional stereoscopic effect corresponding to different views of content associated with the user interface object in accordance with some embodiments. In some embodiments, the method 1200 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 1200 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1200 are, optionally, combined and/or the order of some operations is, optionally, changed.

In some embodiments, method 1200 is performed at a computer system (e.g., 101) in communication with a display generation component (e.g., 120) and one or more input devices (e.g., 314). For example, the computer system optionally has one or more of the characteristics of the computer systems of methods 800, 1000, 1400, 1600, 1800 and/or 2000. In some embodiments, the display generation component has one or more of the characteristics of the display generation components of methods 800, 1000, 1400, 1600, 1800 and/or 2000. In some embodiments, the one or more input devices have one or more of the characteristics of the one or more input devices described with reference to methods 800, 1000, 1400, 1600, 1800 and/or 2000.

In some embodiments, the computer system displays (1202*a*), via the display generation component, a first user interface object in an environment, such as user interface object 1106*a* as shown in FIGS. 11A and 11A1, wherein the first user interface object is selectable to display first content, such as the content shown by first representations 1112*a* and 1114*a* and second representations 1112*b* and 1114*b* shown in FIGS. 11A and 11A1, and wherein the first user interface object has a first visual appearance, such as the visual appearance of user interface object 1106*a* shown in FIGS. 11A and 11A1. In some embodiments, the environment is a three-dimensional environment that is displayed via the display generation component. In some embodiments, the environment is generated, displayed, or otherwise caused to be viewable by the computer system. For example, the environment is an extended reality (XR) environment, such as a virtual reality (VR) environment, a mixed reality (MR) environment, or an augmented reality (AR) environment etc. In some embodiments, the environment has one or more of the characteristics of the environments described with reference to methods 800, 1000, 1400, 1600, 1800 and/or 2000. In some embodiments, the first user interface object is displayed at a first location in the environment that is in the field of view of a user of the environment. In some embodiments, the first user interface object is generated by the computer system. In some embodiments, the first user interface object is selectable by the user, such as through a user input. The user input optionally includes a hand air gesture (e.g., the user moves their hand toward the first user interface object in the environment and grabs the first user interface object with their fingers, or the hand of the user performs an air pinch gesture with the index and thumb coming together and touching while attention of the user is directed to the first user interface object), a voice input and/or a touch input on a touch-sensitive surface of the computer system. In some embodiments, in accordance with selection of the first user interface object, the computer system displays the first content in the environment. In some embodiments, the first user interface object is an icon, and the first virtual appearance indicates the first content that will be displayed if the icon is selected. For example, the icon includes various image previews, lighting, color, transparency and/or saturation corresponding to the first content. In some embodiments, the first visual appearance includes a first size and/or shape that is the same as other selectable user interface objects of the same type displayed in the environment concurrently with the first user interface object. In some embodiments, the first visual appearance is two-dimensional (e.g., lacks depth) from the viewpoint of the user of the environment. In some embodiments, the first visual appearance provides a visual representation of the first content that will be displayed if the first user interface object is selected by the user without providing a preview of the first content itself. For example, the first visual appearance includes a logo or symbol that represents the first content without displaying the first content itself.

In some embodiments, while displaying the first user interface object with the first visual appearance, the computer system detects (1202*b*), via the one or more input devices, attention (for example, based on gaze) of the user directed toward the first user interface object, such as gaze 1126 directed toward user interface object 1106*a* shown in FIGS. 11A and 11A1. In some embodiments, in response to detecting the attention of the user directed toward the first user interface object (1202*c*), the computer system displays (1202*d*), via the display generation component, the first user interface object in the environment with a second visual appearance that is different from the first visual appearance, such as the second visual appearance of user interface object 1106*a* as shown in FIG. 11C, wherein displaying the first user interface object with the second visual appearance includes displaying the first user interface object with a three-dimensional stereoscopic effect (e.g., as represented by legend 1108 in FIG. 11C) corresponding to a plurality of different views of the first content (e.g., such as the second portion 1130*b* of second representation 1112*b* and the second portion 1132*b* of second representation 1114*b* shown in FIG. 11C) corresponding to the first user interface object, and wherein the first visual appearance of the first user interface object that was displayed before the attention of the user was directed to the first user interface object does not include displaying the first user interface object with the three-dimensional stereoscopic effect (e.g., as represented by legend 1108 in FIGS. 11A and 11A1). In some embodiments, if attention of the user directed toward the first user interface object is not detected, the first user interface object continues to have the first visual appearance. In some embodiments, if attention of the user directed toward the first user interface object is not detected, the first user interface object continues to be displayed in the first location in the environment. In some embodiments, the first user interface object is displayed in a second location in the environment that is different from the first location. In some embodiments, the first user interface object has a different size and/or shape from the size and/or shape of the first user interface object before the attention of the user was directed to it. In some embodiments, the second visual appearance is three-dimensional (e.g., includes depth) from the viewpoint of the user of the environment. In some embodiments, the second visual appearances incudes a visual preview of the first content that is displayed if the first user interface object is selected by the user. In some embodiments, the first user interface object is interactable when displayed with the second visual appearance. For example, in response to detecting input to rotate and/or move the first user interface object when displayed with the second visual appearance, the computer system rotates and/or moves the first user interface object in the environment in accordance with such input (e.g., through a hand air gesture input, such as the user grabbing and spinning/rotating the first user interface object with their fingers (e.g., via a direct interaction), or the user performing an air pinch gesture with the index and thumb coming together and touching while directing attention to the first user interface object and then optionally rotating the hand of the user (e.g., via an indirect interaction)). In some embodiments, one or more visual characteristics of the second visual appearance are modified based on an angle of and/or location of attention of the user directed toward the first user interface object. For example, as the computer system detects changes in the angle and/or location of the attention toward the first user interface object, one or more visual characteristics of the second visual appearance are optionally modified. In some embodiments, the three-dimensional stereoscopic effect includes an image that includes at least a partial view of the first content to be displayed in the environment upon selection of the first user interface object by the user. For example, the image provides a preview of one or more views of the first content to the user. In some embodiments, the one or more views of the first content change based on user input. For example, a first view of the first content (e.g., a first portion and/or a first angle into the first content) is displayed when the attention of the user is directed at the first user interface object from a first angle relative to the environment, and a second view of the first content (e.g., a second portion different from the first portion and/or a second angle different from the first angle into the first content) is displayed when the attention of the user is directed at the first user interface object from a second angle different from the first angle relative to the environment. In some embodiments, the three-dimensional stereoscopic effect includes multiple images of a virtual scene of a simulated space and/or object. For example, respective images include different angles of the scene and/or object. The multiple images of the scene and/or object are optionally displayed concurrently. By optionally displaying the multiple images concurrently, the second visual appearance optionally includes greater depth of the scene and/or object than the first visual appearance. The multiple images of the scene and/or object optionally include at least a first image corresponding to the angle of a left eye view of the scene and/or object, and a second image corresponding to the angle of a right eye view of the scene and/or object. Displaying a selectable user interface object in an environment with a visual appearance that includes different views of content corresponding to the user interface object provides a visual preview of the content that will be displayed upon selection of the user interface object prior to selecting the user interface object, thereby reducing errors in interaction and thereby improving user device interaction, and doing so in response to detecting attention of the user directed to the selectable user interface object avoids consuming computing resources when attention is not directed to the selectable user interface object.

In some embodiments, the first content includes a three-dimensional virtual environment (1204) (e.g., as represented by second representation 1112*b* and second representation 1114*b* of the content associated with user interface object 1106*a* shown in FIG. 11C). In some embodiments, the virtual representation is of a simulated physical space, such as a mountain scene or a beach scene. In some embodiments, the three-dimensional virtual environment has one or more of the characteristics of the virtual environments described with reference to methods 800, 1000, 1400, 1600, 1800 and/or 2000. In some embodiments, the three-dimensional stereoscopic effect is based on different views of a representation of the three-dimensional virtual environment. For example, the three-dimensional stereoscopic effect includes displaying, via the display generation component, different portions of the representation of the three-dimensional virtual environment corresponding to different viewing angles into the three-dimensional virtual environment. Displaying a selectable user interface object in an environment with a visual appearance that includes different views of a three-dimensional virtual environment provides a visual preview of the three-dimensional virtual environment that will be displayed upon selection of the user interface object prior to selecting the user interface object, thereby reducing errors in interaction and thereby improving user device interaction.

In some embodiments, the first content includes a stereoscopic image (1206) (e.g., as represented by second representation 1112*b* and second representation 1114*b* of the content associated with user interface object 1106*a* shown in FIG. 11C). In some embodiments, the stereoscopic image includes displaying a first perspective of an image and a second perspective of an image that is different from the first perspective of the image. For example, the first perspective of the image is displayed using a first display of the display generation component, and a second perspective of the image is displayed using a second display of the display generation component. In some embodiments, the three-dimensional stereoscopic effect is based on different views of a representation of the stereoscopic image. For example, the three-dimensional stereoscopic effect includes displaying, via the display generation component, different portions of the representation of the stereoscopic image corresponding to different viewing angles of the stereoscopic image. Displaying a selectable user interface object in an environment with a visual appearance that includes different views of a stereoscopic image provides a visual preview of the stereoscopic image that will be displayed upon selection of the user interface object prior to selecting the user interface object, thereby reducing errors in interaction and thereby improving user device interaction.

In some embodiments, the first content includes an application (1208) (e.g., as represented by second representation 1112*b* and second representation 1114*b* of the content associated with user interface object 1106*a* shown in FIG. 11C). In some embodiments, the application is an exclusive application (e.g., the application is not configured to be operated in parallel with other applications). In some embodiments, the application is a non-exclusive application (e.g., the application is capable of being operated in parallel with other applications). In some embodiments, the three-dimensional stereoscopic effect is based on different views of a representation of the application. For example, the three-dimensional stereoscopic effect includes displaying, via the display generation component, different portions of the representation of the application corresponding to different viewing angles of the application. In some embodiments, the three-dimensional stereoscopic effect is based on different views of one or more portions of content associated with the application. For example, the three-dimensional stereoscopic effect includes displaying, via the display generation component, different portions of the one or more portions of content associated with the application (e.g., representations of messages in the case of a messaging application, or a virtual environment or scene in the case of a virtual scene application) corresponding to different viewing angles of the application. Displaying a selectable user interface object in an environment with a visual appearance that includes different views of an application provides a visual preview of the application that will be displayed upon selection of the user interface object prior to selecting the user interface object, thereby reducing errors in interaction and thereby improving user device interaction.

In some embodiments, while displaying the first user interface object in the environment with the first visual appearance, the computer system displays (1210*a*), via the display generation component, a second user interface object in the environment, such as second user interface object 1106*b* shown in FIG. 11H, wherein the second user interface object is selectable to display second content, such as content represented by first representations 1148*a* and 1150*a* and second representations 1148*b* and 1150*b* shown in FIG. 11I, and wherein the second user interface object has the first visual appearance, such as the visual appearance of user interface object 1106*b* shown in FIG. 11H. In some embodiments, the second user interface object is displayed in a different location in the environment from the first user interface object. In some embodiments, the second user interface object displayed at the second location in the environment is in the user's field of view of the environment. In some embodiments, the second user interface object is generated by the computer system. In some embodiments, the second user interface object is selectable by the user, such as through a user input. In some embodiments, in accordance with selection of the second user interface object, the computer system displays the second content in the environment. In some embodiments, the second user interface object is an icon, and the first visual appearance indicates the second content that will be displayed if the icon is selected, but without the three-dimensional stereoscopic effect. In some embodiments, the first user interface object and the second user interface object are a part of a plurality of user interface objects that are displayed in the three-dimensional environment. For example, the first user interface object and the second user interface object are displayed as part of a grid and/or collection of user interface objects that are selectable by the user to display different content. In some embodiments, the second user interface object and displaying the second user interface object with the first visual appearance have one or more characteristics of the first user interface object and displaying the first user interface object with the first visual appearance.

In some embodiments, while displaying the first user interface object and the second user interface object with the first visual appearance, the computer system detects (1210*b*), via the one or more input devices, attention of the user directed toward the second user interface object, such as gaze 1126 directed toward user interface object 1106*b* shown in FIG. 11H. In some embodiments, if attention of the user directed toward the second user interface object is not detected, the second user interface object continues to have the first visual appearance.

In some embodiments, in response to detecting the attention of the user directed toward the second user interface object, the computer system displays (1210*c*), via the display generation component, the second user interface object in the environment with the second visual appearance while maintaining display of the first user interface object with the first visual appearance, such as shown by the visual appearance of user interface object 1106*b* and the visual appearance of user interface object 1106*a* in FIG. 11I. In some embodiments, the second user interface object having the second visual appearance has a different size and/or shape from the size and/or shape of the second user interface object before the attention of the user was directed to it. In some embodiments, the second visual appearance includes a visual preview of the second content that is displayed if the second user interface object is selected by the user. In some embodiments, the second user interface object is interactable when displayed with the second visual appearance. For example, in response to detecting input to rotate and/or move the second user interface object when displayed with the second visual appearance, the computer system rotates and/or moves the second user interface object in the environment in accordance with such input (e.g., through a hand air gesture input, such as the user grabbing and spinning/rotating the second user interface object with their fingers (e.g., via a direct interaction), or the user performing an air pinch gesture with the index and thumb coming together and touch while directing attention to the second user interface object and the optionally rotating the hand of the user (e.g., via an indirect interaction)). In some embodiments, the second visual appearance includes the three-dimensional stereoscopic effect and includes an image that includes at least a partial view of the second content to be displayed in the environment upon selection of the second user interface object by the user. For example, the image provides a preview of one or more views of the second content to the user. In some embodiments, the one or more views of the second content change based on user input. For example, a first view of the second content (e.g., a first portion and/or a first angle into the second content) is displayed when the attention of the user is directed at the second user interface object from a first angle relative to the environment, and a second view of the second content (e.g., a second portion different from the first portion and/or a second angle different from the first angle into the second content) is displayed when the attention of the user is directed at the second user interface object from a second angle different from the first angle relative to the environment. In some embodiments, the second user interface object and displaying the second user interface object with the second visual appearance have one or more characteristics of the first user interface object and displaying the first user interface object with the second visual appearance. Displaying a selectable user interface object out of a plurality of user interface objects in an environment with a visual appearance that includes different views of content corresponding to the user interface object provides a visual preview of the content that will be displayed upon selection of the user interface object prior to selecting the user interface object, thereby assisting the user in selecting the correct user interface object of the plurality of user interface objects for displaying the content and reducing errors in interaction and thereby improving user device interaction, and provides feedback about which object will be selected upon detecting such a selection input.

In some embodiments, while displaying the first user interface object in the environment with the second visual appearance, the computer system displays (1212*a*), via the display generation component, a second user interface object in the environment, such as one of the plurality of user interface object 1104 displayed concurrently with user interface object 1106*a* shown in FIG. 11C, wherein the second user interface object is selectable to display second content (e.g., such as content represented by first representations 1148*a* and 1150*a* and second representations 1148*b* and 1150*b* shown in FIG. 11I) corresponding to the second user interface object, and wherein the second user interface object has the first visual appearance (e.g., such as described with reference to step(s) 1210). In some embodiments, while displaying the first user interface object with the second visual appearance and the second user interface object with the first visual appearance, the computer system detects (1212*b*), via the one or more input devices, attention of the user move away from the first user interface object and to the second user interface object, such as shown by gaze 1126 directed away from user interface object 1106*a* and toward user interface object 1106*b* in FIG. 11H. In some embodiments, in response to detecting the attention of the user move away from the first user interface object and to the second user interface object, the computer system displays (1212*c*), via the display generation component, the second user interface object in the environment with the second visual appearance (e.g., as described with reference to step(s) 1210), such as shown by the visual appearance of user interface object 1106*b* shown in FIG. 11H. In some embodiments, attention of the user moving away from the first user interface object toward the second user interface object includes a gaze of the user being initially directed toward the first user interface object while the first user interface object is displayed with the second visual appearance, and subsequently being redirected toward the second user interface object while the second user interface object is displayed with the first visual appearance. In some embodiments, if attention of the user directed toward the second user interface object is not detected, the second user interface object continues to have the first appearance. In some embodiments, if attention of the user directed toward the second user interface object is not detected, the second user interface object continues to be displayed in the same location in the environment. In some embodiments, if attention of the user directed toward the second user interface object is not detected and the attention of the user remains on the first user interface object, then the first user interface object will maintain the second visual appearance. Displaying a visual preview in a three-dimensional environment of first content associated with a first user interface object in response to directing attention to the first user interface object and a visual preview of second content associated with a second user interface object in response to directing attention to the second user interface object provides visual feedback to a user regarding which user interface object a user input will be directed to if the user performs an input, thereby reducing errors in interaction and improving user device interaction.

In some embodiments, in response to detecting the attention of the user move away from the first user interface object and to the second user interface object, the computer system gradually modifies (1214) a visual appearance of the first user interface object from the second visual appearance to the first visual appearance, such as shown by the modification of the visual appearance of user interface object 1106*a* in FIG. 11H. In some embodiments, gradually modifying the visual appearance of the first user interface object includes modifying the size and/or shape of the first user interface object to the size and/or shape of the user interface object before the attention of the user was directed to it. In some embodiments, gradually modifying a visual appearance of the first user interface object includes gradually removing the three-dimensional stereoscopic effect. In some embodiments, gradually modifying the visual appearance of the first user interface object includes crossfading from the three-dimensional stereoscopic effect to an icon appearance that includes a different view of the first content from the three-dimensional stereoscopic effect. In some embodiments, gradually modifying the visual appearance of the first user interface object includes steadily changing the appearance (e.g., size, shape, and/or view of the first content) of the first user interface object over a period of time (e.g., 0.05, 0.1, 0.5, 1, 2, 5, or 10 seconds). In some embodiments, modifying the visual appearance of the first user interface object includes a transition effect between displaying the second visual appearance of the first user interface object and displaying the first visual appearance of the first user interface object. For example, the second visual appearance of the first user interface object appears to fade away (e.g., the second visual appearance of the first user interface object gradually becomes more transparent) while the first visual appearance of the first user interface object gradually appears (e.g., the first visual appearance of the first user interface object gradually becomes more opaque) over the period of time. Gradually modifying the display of a selectable user interface object from a first visual appearance displayed in response to directed attention by a user to the user interface object to a second visual appearance that does not correspond to directed attention toward the user interface object indicates to the user that attention is no longer directed to the user interface object and provides the user an opportunity to redirect attention to the user interface object to display the first visual appearance, thereby reducing errors in interaction and improving user device interaction.

In some embodiments, displaying the first user interface object with the second visual appearance includes displaying the first user interface object with an expanded size (relative to the three-dimensional environment) compared to the first user interface object displayed with the first visual appearance (1216), such as the size of user interface object 1106*a* shown in FIG. 11C compared to the size of user interface object 1106*a* shown in FIGS. 11A and 11A1. In some embodiments, displaying the first user interface object with the second visual appearance includes displaying the first user interface object in a larger three-dimensional region of the environment compared to displaying the first user interface object with the first visual appearance. In some embodiments, the expanded size of the first user interface object remains fully in the user's field of view of the environment. In some embodiments, at least a portion of the first user interface object is not displayed in the user's field of view of the environment when the first user interface object is displayed with the expanded size. In some embodiments, expanding the size of the first user interface object includes expanding the length, height and/or depth of the first user interface object. Displaying a selectable user interface object in an environment with a visual appearance that includes different views of content corresponding to the user interface object at an expanded size improves the visual preview of the content that will be displayed upon selection of the user interface object prior to selecting the user interface object, thereby reducing errors in interaction and improving user device interaction.

In some embodiments, the first user interface object expands in size in response to detecting gaze of the user directed toward the first user interface object (1218), such as the size of user interface object 1106*a* in response to gaze 1126 shown in FIG. 11B compared the size of user interface object 1106*a* shown in FIGS. 11A and 11A1. In some embodiments, the first user interface object gradually expands within the environment based on a duration of the gaze of the user directed toward the first user interface object. For example, the first user interface object steadily expands over a duration of gaze directed toward the first user interface object until a threshold duration of gaze (e.g., 0.05, 0.1, 0.5, 1, 2, 5, or 10 seconds) is met. In some embodiments, if the gaze of the user is not directed toward the first user interface object, the first user interface object does not expand in size. In some embodiments, if the gaze of the user is first directed toward the first user interface object and then is directed away from the first user interface object while the first user interface object is expanding in size, the first user interface object returns (e.g., gradually) to the size of the first user interface object prior to the user directing gaze toward the first user interface object. Displaying a selectable user interface object in an environment with an expanded size in response to a user directing gaze toward the user interface object provides clear feedback (e.g., by expanding the relative size of the user interface object) to a user that the user interface object is changing visual appearance to display a preview of content corresponding to the user interface object, thereby providing the user an opportunity to redirect their attention away from the user interface object environment if the user does not desire to view a preview of the content and/or select the user interface object, thereby improving user device interaction.

In some embodiments, while displaying the first user interface object with the first visual appearance, the computer system displays (1220*a*) a plurality of user interface objects in the environment with the first visual appearance, such as the plurality of user interface objects 1104 displayed with the first visual appearance in FIGS. 11A and 11A1, wherein the plurality of user interface objects are at a first location in the environment and are displayed with a first spatial arrangement relative to the first user interface object, such as the spatial arrangement of the plurality of user interface objects 1104 to user interface object 1106*a* shown in FIGS. 11A and 11A1. In some embodiments, the plurality of user interface objects are arranged in various patterns. For example, the plurality of user interface objects is displayed in a grid formation. In some embodiments, there is a consistent spatial arrangement (e.g., distance and/or orientation) between the plurality of user interface objects and the first user interface object when the plurality of user interface objects and the first user interface object are displayed with the first visual appearance. In some embodiments, the first spatial arrangement of the plurality of user interface objects relative to the first user interface object includes a distance (e.g., 0.1, 0.2, 0.5, 1, 2, or 5 cm) and/or orientation (e.g., 1, 10, 15, 30, or 45 degrees) relative to the periphery of the first user interface object. For example, there is a consistent distance between all portions of the periphery of the first user interface object and the plurality of user interface objects. In some embodiments, the plurality of user interface objects all have the same size as the first user interface object when the first user interface object and the plurality of user interface objects are displayed with the first visual appearance.

In some embodiments, in response to detecting the attention of the user directed toward the first user interface object, the computer system moves (1220*b*) the plurality of user interface objects from the first location in the environment to a second location in the environment, such as shown by the difference in location of the plurality of user interface objects 1104 in FIG. 11C compared to FIGS. 11A and 11A1, wherein the plurality of user interface objects are displayed with a second spatial arrangement (e.g., such as the spatial arrangement of the plurality of user interface objects 1104 relative to user interface object 1106*a* shown in FIG. 11C) at the second location relative to the first user interface object, wherein the second spatial arrangement relative to the first user interface object occupies a greater area of the three-dimensional environment than the first spatial arrangement relative to the first user interface object (e.g., as represented by region 1124 shown in FIG. 11C compared to region 1124 shown in FIGS. 11A and 11A1). In some embodiments, the plurality of user interface objects gradually move from the first location in the environment to the second location in the environment as the first user interface object expands in size. For example, as the first user interface object expands in size, the plurality of user interface objects maintain the same threshold distance and/or orientation relative to the periphery of the first user interface object. In some embodiments, the second spatial arrangement of the plurality of user interface objects relative to the first user interface object includes the same distance and/or orientation threshold relative to the periphery of the first user interface object. In some embodiments, a user interface object of the plurality of user interface object is moved to a location in the three-dimensional environment based on the location of the user interface object relative to the first user interface object prior to attention being directed toward the first user interface object. For example, if a user interface object of the plurality of user interface objects is positioned to the left of the first user interface object prior to attention being directed toward the first user interface object, the user interface object is moved leftward relative to the first user interface object. For example, if a user interface object of the plurality of user interface objects is positioned to the right of the first user interface object prior to attention being directed toward the first user interface object, the user interface object is moved rightward relative to the first user interface object. For example, if a user interface object of the plurality of user interface objects is positioned above the first user interface object prior to attention being directed toward the first user interface object, the user interface object is moved upward relative to the first user interface object. For example, if a user interface object of the plurality of user interface objects is positioned below the first user interface object prior to attention being directed toward the first user interface object, the user interface object is moved downward relative to the first user interface object. In some embodiments, if attention of the user directed toward the first user interface object is not detected, the plurality of user interface objects remain at the first location in the environment. Displaying a plurality of user interface objects occupying a greater area of the three-dimensional environment relative to a selectable user interface object in a three-dimensional environment in response to detecting attention toward the user interface object enables the user interface object to expand in size and provide a visual preview of content corresponding to the user interface object without interfering with a visual appearance of the plurality of user interface objects and/or conflicting with the plurality of user interface objects, thereby improving user device interaction.

In some embodiments, transitioning from displaying the first user interface object with the first visual appearance to displaying the first user interface object with the second visual appearance includes expanding the first user interface object in a first dimension greater than expanding the first user interface object in a second dimension, different from the first dimension (1222) (e.g., as shown by the expansion of user interface object 1106*a* from FIGS. 11A and 11A1 to FIG. 11C). In some embodiments, expanding the first user interface object in the first dimension includes expanding the first user interface object in a transverse direction relative to the first user interface object (e.g., horizontally in the three-dimensional environment). In some embodiments, expanding the first user interface object in the second dimension includes expanding the first user interface object toward a longitudinal direction relative to the first user interface object (e.g., vertically in the three-dimensional environment). In some embodiments, displaying the first user interface object with the second visual appearance includes displaying the first user interface object with a size that includes a greater length in the transverse direction relative to the first user interface object compared to the longitudinal direction relative to the first user interface object. In some embodiments, the first user interface object expands in only the first dimension. In some embodiments, the first user interface object expands gradually (e.g., steadily over a period of time (e.g., 0.05, 0.1, 0.5, 1, 2, 5, or 10 seconds)) in the first dimension and optionally in the second dimension. Displaying a selectable user interface object of a plurality of user interface objects in a three-dimensional environment with an expanded size that provides a visual preview of content corresponding to the user interface object by expanding the user interface object in a first dimension greater than a second dimension in response to directed attention to the user interface object provides a visual indication of which user interface object of the plurality of user interface objects that attention is directed to, and does so while reducing the obstruction of view of other areas of the three-dimensional environment (e.g., compared to if the user interface object expanded in a first dimension and a second dimension), thereby reducing errors in interaction and improving user device interaction.

In some embodiments, displaying the first user interface object with the first visual appearance includes displaying a first portion of the first content (1224*a*), such as first portions 1118*a* and/or 1128*a* shown in FIGS. 11A and 11A1, and displaying the first user interface with the second visual appearance includes displaying a second portion of the first content, such as second portions 1130*b* and 1132*b* shown in FIG. 11C, greater than the first portion of the first content (1224*b*). In some embodiments, the second portion of the first content includes the first portion of the first content. In some embodiments, the first visual appearance includes the first portion of the first content, and in response to detecting attention toward the first user interface object, additional portions of the first content are gradually included in the visual appearance of the first user interface object until the first user interface object is displayed with the second visual appearance. For example, as the first user interface object expands relative to the three-dimensional environment, additional lateral and/or vertical portions of the first content are included in the visual appearance of the first user interface object. In some embodiments, as the first user interface object expands, the visual appearance of the first user interface object appears to transition (e.g., by crossfading) between displaying the first portion of the first content and the second portion of the first content. Displaying a selectable user interface object in an environment with a second visual appearance that includes a greater portion of content corresponding to the user interface object compared to a first visual appearance in response to detecting attention of the user directed to the selectable user interface object provides an improved visual preview of the content that will be displayed upon selection of the user interface object prior to selecting the user interface object, thereby reducing errors in interaction and improving user device interaction.

In some embodiments, the display generation component includes a first display and a second display, such as first display 1110*a* and second display 1110*b* shown in FIGS. 11A and 11A1. In some embodiments, displaying the first user interface object with the first visual appearance includes (1226*a*) displaying, via the first display, a first representation of the first content (1226*b*), such as first representation 1112*a* shown in FIGS. 11A and 11A1, and displaying, via the second display, a second representation of the first content (1226*c*), such as first representation 1114*a* shown in FIGS. 11A and 11A1. In some embodiments, displaying the first user interface object with the second visual appearance includes (1226*d*) displaying, via the first display, a third representation of the first content (1226*e*), such as second representation 1112*b* shown in FIG. 11C, wherein the third representation of the first content differs from the first representation of the first content in a first manner, such as shown by the difference between second portion 1130*b* of second representation 1112*b* shown in FIG. 11C and first portion 1118*a* of first representation 1118*a* shown in FIGS. 11A and 11A1, and displaying, via the second display, a fourth representation of the first content (1226*f*), such as second representation 1114*b* shown in FIG. 11C, wherein the fourth representation of the first content differs from the second representation of the first content in a second manner, different from the first manner, such as shown by the difference between second portion 11. In some embodiments, the computer system is a head-mounted display, and the first display corresponds to a display for a first eye of the user and the second display corresponds to a display for a second eye of the user (e.g., a display corresponds to a lens for an eye of the user). In some embodiments, the first representation of the first content and the second representation of the first content include a first image of the first content. In some embodiments, the first image of the first content includes a viewing angle (e.g., directly or normal to a portion of the first content) corresponding to a center view of the first content. For example, a center view of the first content includes a direct (e.g., normal) viewing angle to a middle portion of the first content (e.g., not including certain portions of the first content from a left or right perspective of the first content). For example, the center view is a viewing angle to a center reference line of the first content (a vertical plane that divides the first content in half). In some embodiments, the first representation of the first content and the second representation of the first content are substantially similar (e.g., are the same). In some embodiments, the first representation includes a variation in perspective of the first content from the second representation (e.g., the first representation includes a perspective of the first content from a first viewing angle of the user (e.g., from a left eye of the user), and the second representation includes a perspective of the first content from a second viewing angle of the user (e.g., from a right eye of the user) different from the first viewing angle). In some embodiments, the third representation of the first content includes a second image of the first content that is different from the first image, and the fourth representation of the first content includes a third image of the first content that is different from the first image and the second image of the first content. In some embodiments, the first manner in which the third representation of the first content differs from the first representation of the first content includes displaying a different perspective of the first content from a different viewpoint (e.g., from a left side viewpoint and/or right side viewpoint), a different portion of the first content and/or a larger amount of the first content. In some embodiments, the second manner in which the fourth representation of the first content differs from the second representation of the first content includes displaying a different perspective of the first content from a different viewpoint (e.g., from a left side viewpoint and/or right side viewpoint), a different portion of the first content, and/or a larger amount of the first content. In some embodiments, if the first manner includes displaying a left side viewpoint of the first content, the second manner includes displaying a right side viewpoint of the first content. In some embodiments, if the first manner includes displaying a first portion of the first content, the second manner includes displaying a second portion of the first content that is different from the first portion. In some embodiments, the first representation of the first content and the second representation of the first content include displaying portions of the first content that are the same size. In some embodiments, displaying the third representation of the first content and displaying the fourth representation of the first content include displaying portions of the first content that are the same and larger size than the first representation of the first content and the second representation of the first content. Using a first display and a second display to display a selectable user interface object in an environment with a visual appearance that includes different views of content corresponding to the user interface object enables the content to be displayed with a greater amount of depth, thereby improving the quality of a visual preview of the content that will be displayed upon selection of the user interface object prior to selecting the user interface object, thereby reducing errors in interaction and improving user device interaction.

In some embodiments, transitioning from displaying the first user interface object with the first visual appearance to displaying the first user interface object with the second visual appearance includes modifying the third representation of the first content on the first display and the fourth representation of the first content on the second display to become increasingly disparate (1228), such as shown by displaying second portion 1130*b* of second representation 1112*b* and second portion 1132*b* of second representation 1114*b* in FIG. 11C. In some embodiments, modifying the third representation of the first content and the fourth representation of the first content to become increasingly disparate includes further modifying the third representation by the first manner and the fourth representation by the second manner. In some embodiments, further modifying the third representation by the first manner and the fourth representation by the second manner includes increasing the difference between the first manner and the second manner. In some embodiments, modifying the third representation includes changing (e.g., gradually) the viewing angle to the first content relative to a reference viewing angle (e.g., a viewing angle corresponding to a center view of the first content as described with reference to step(s) 1226). For example, the third representation includes a first viewing angle relative to the first content with a first angular distance relative to the reference viewing angle, and the viewing angle is modified to a second viewing angle relative to the first content with a second angular distance relative to the reference viewing angle that is greater than the first angular distance. In some embodiments, the fourth representation is modified concurrently with the third representation. In some embodiments, modifying the fourth representation includes characteristics of modifying the third representation by changing viewing angle relative to a reference viewing angle. For example, the fourth representation includes a third viewing angle relative to the first content with a third angular distance relative to the reference viewing angle, and the viewing angle is modified to a fourth viewing angle relative to the first content with a fourth angular distance relative to the reference viewing angle that is greater than the third angular distance relative to the reference viewing angle. In some embodiments, the third representation and the fourth representation are modified to become increasingly disparate by changing the viewing angle of the third representation and the fourth representation to become increasingly disparate from the reference viewing angle in an opposite manner (e.g., if the third angular distance is a positive value relative to the reference viewing angle, the fourth angular distance is a negative value relative to the reference viewing angle, and if the third angular distance is a negative value relative to the reference viewing angle, the fourth angular distance is a positive value relative to the reference viewing angle). In some embodiments, the first manner in which the third representation differs from the first representation includes displaying a first portion of the first content, and the second manner in which the fourth representation differs from the second representation includes displaying a second portion of the first content that is different from the first portion of the first content. When the third representation and the fourth representation are optionally modified to become increasingly disparate, the first portion and the second portion become increasingly different. Displaying a selectable user interface object in an environment with a visual appearance that includes increasingly disparate representations of content corresponding to the user interface object using a first display and a second display enables the content to be displayed with a greater amount of depth, thereby improving the quality of a visual preview of the content that will be displayed upon selection of the user interface object prior to selecting the user interface object, thereby reducing errors in interaction and improving user device interaction.

In some embodiments, the first representation of the first content on the first display and the second representation of the first content on the second display include a first image corresponding to a first perspective of the first content (1230*a*), such as first portion 1118*a* of first representation 1112*a* and first portion 1128*a* of second representation 1114*a* shown in FIGS. 11A and 11A1, and displaying the first user interface object with the second visual appearance includes transitioning, on the first display, the display of the first image to a second image corresponding to a second perspective of the first content that is different from the first perspective of the first content (1230*b*), such as transitioning from the display of the first portion 1118*a* of first representation 1112*a* to the display of second portion 1130*b* of second representation 1112*b* on the first display 1110*a* shown in FIGS. 11A-11C, and transitioning, on the second display, the display of the first image to a third image corresponding to a third perspective of the first content that is different from the first perspective of the first content and the second perspective of the first content (1230*c*), such as transitioning from the display of first portion 1128*a* of first representation 1114*a* to the display of second portion 1132*b* of second representation 1114*b* on the second display 1110*b* shown in FIGS. 11A-11C. In some embodiments, the first image includes a first portion of the first content, the second image includes a second portion of the first content that is different from the first portion, and the third image includes a third portion of the first content that is different from the first portion and the second portion. In some embodiments, the first portion is a center portion of the first content (e.g., the center of a stereoscopic image). In some embodiments, the first image is a center image of the first content (e.g., with reference to a center reference line of the first content, as described with reference to step(s) 1226). In some embodiments, the second portion is a left-side or right-side portion (e.g., relative to the center reference line of the first content as described with reference to step(s) 1226) of the first content relative to the current viewpoint of the user, and the third portion is a left-side or right-side portion (e.g., relative to the center reference line) of the first content opposite from the second portion relative to the current viewpoint of the user. In some embodiments, the first perspective, the second perspective, and the third perspective correspond to different viewing angles of the first content. For example, the first perspective corresponds to a viewpoint from a first angle relative to the first content (e.g., and optionally relative to the center reference line of the first content), the second perspective corresponds to a viewpoint from a second angle relative to the first content (e.g., and optionally relative to the center reference line of the first content) that is different from the first angle, and the third perspective corresponds to a viewpoint from a third angle relative to the first content (e.g., and optionally relative to the center reference line of the first content) that is different from the first angle and the second angle. Displaying a selectable user interface object in an environment with a visual appearance corresponding to a visual preview of content corresponding to the user interface object by displaying a first perspective view of the content on a first display and a second perspective view, different from the first perspective view, of the content on a second display provides a greater amount of depth to the visual preview of the content, thereby improving the preview of the content and improving user device interaction.

In some embodiments, transitioning the first representation of the first content to the third representation of the first content on the first display and the second representation of the first content to the fourth representation of the first content on the second display is gradual (1232), such as the transition of the display of the first representations 1112*a* and 1114*a* to the second representations 1112*b* and 1114*b* shown in FIGS. 11A-11C. In some embodiments, the transition of the first representation of the first content to the third representation of the first content and the second representation of the first content to the fourth representation of the first content is performed steadily over a period of time (e.g., 0.05, 0.1, 0.5, 1, 2, 5, or 10 seconds). In some embodiments, the transition of the first representation to the third representation and the second representation to the fourth representation occurs simultaneously. Gradually modifying the visual appearance of a selectable user interface object that includes different views of content corresponding to a selectable user interface object from a first perspective view of the content to a second perspective view enables the content to still be viewable to the user while the visual appearance of the user interface object is modified, thereby improving user device interaction.

In some embodiments, while displaying the first user interface object with the second visual appearance (1234*a*), such as the visual appearance of user interface object 1106*a* shown in FIG. 11C, in accordance with a determination that an orientation of a current viewpoint of the user relative to the first user interface object is a first orientation, the computer system displays (1234*b*) the first user interface object with a first amplitude of the three-dimensional stereoscopic effect, such as the amplitude of the three-dimensional stereoscopic effect of user interface object 1106*a* shown in response to the orientation of the viewpoint of user 1120 in FIG. 11C. In some embodiments, in accordance with a determination that the orientation of the current viewpoint of the user relative to the first user interface object is a second orientation, different from the first orientation, the computer system displays (1234*c*) the first user interface object with a second amplitude of the three-dimensional stereoscopic effect, wherein the second amplitude is different from the first amplitude, such as the amplitude of the three-dimensional stereoscopic effect of user interface object 1106*a* shown in response to the orientation of the viewpoint of user 1120 in FIG. 11E. In some embodiments, the first orientation of the viewpoint of the user includes a first viewing angle relative to the first user interface object, and the second orientation of the viewpoint of the user includes a second viewing angle relative to the first user interface object that is different from the first viewing angle. In some embodiments, based on the degree of the viewing angle, the amplitude of the three-dimensional stereoscopic effect is adjusted. For example, the computer system stores instructions for adjusting the amplitude of the three-dimensional stereoscopic effect based on the orientation of the viewpoint of the user. Additionally, or alternatively, the user may adjust the amplitude of the three-dimensional stereoscopic effect through a user input (e.g., by interacting with a user interface of the computer system (e.g., through a touch-sensitive display, button, knob, dial, and/or voice-recognition or virtual assistant)). Modifying the amplitude of the stereoscopic effect based on viewing angle provides feedback about the spatial arrangement of the viewpoint of the user relative to the user interface object, thereby indicating how the spatial arrangement can be changed, reducing errors in interaction and improving user device interaction.

In some embodiments, the first orientation of the current viewpoint of the user relative to the first user interface object includes a more direct viewing angle (e.g., such as the direct viewing angle of user 1120 shown in FIG. 11C) than the second orientation (e.g., such as the indirect viewing angle of user 1120 to user interface object 1106*a* shown in FIGS. 11D-11G) of the current viewpoint of the user, and wherein the first amplitude of the three-dimensional stereoscopic effect is of a greater magnitude than the second amplitude of the three-dimensional stereoscopic effect (1236), such as the greater magnitude of the three-dimensional stereoscopic effect represented by legend 1108 in FIG. 11C compared to the magnitude of the three-dimensional stereoscopic effect shown in FIGS. 11A and 11A1. In some embodiments, a direct viewing angle includes a viewing angle normal to the first content, or with a threshold orientation (e.g., 0.1, 0.5, 1, 2, 5, or 10 degrees) of the viewing angle normal to the first content. In some embodiments, having a more direct viewing angle includes a viewing angle that is closer in orientation to the viewing angle normal to the first content. In some embodiments, the first orientation of the current viewpoint of the user relative to the first user interface object includes a viewing angle that is closer to the viewing angle normal to the first content than the second orientation of the current viewpoint of the user relative to the first user interface object. In some embodiments, an indirect viewing angle includes a viewing angle that is not normal to the first content, or outside the threshold orientation of the viewing angle normal to the first content. In some embodiments, having a more indirect viewing angle (e.g., such as the viewing angle that corresponds to the second orientation) includes a viewing angle that is farther in orientation to the viewing angle normal to the first content than the more direct viewing angle (e.g., such as the viewing angle that corresponds to the first orientation). In some embodiments, the amplitude of the three-dimensional stereoscopic effect is based on the viewing angle of the first content relative to the current viewpoint of the user. For example, as the orientation of the current viewpoint of the user changes such that the viewing angle relative to the first content is more direct (e.g., in a closer proximity to a normal viewing angle to the first content), the amplitude of the three-dimensional stereoscopic effect increases. For example, as the orientation of the current viewpoint of the user changes such that the viewing angle relative to the first content is less direct (e.g., in a farther proximity to a normal viewing angle to the first content), the amplitude of the three-dimensional stereoscopic effect decreases. In some embodiments, displaying the first user interface object with a greater amplitude of the three-dimensional stereoscopic effect includes displaying the first content with a greater amount of depth (e.g., stereoscopic effect) compared to a lower amplitude of the three-dimensional stereoscopic effect. For example, when the first content is displayed with the first amplitude of the three-dimensional stereoscopic effect, a greater amount of the first content is displayed with a visible amount of clarity and/or structure relative to the viewpoint of the user compared to when the first content is displayed with the second amplitude of the three-dimensional stereoscopic effect. Displaying a greater amount of amplitude of a visual appearance of a user interface object corresponding to a visual preview of content corresponding to the user interface object when a user is at a more direct viewing angle relative to the user interface object compared to when the user is at a less direct viewing angle relative to the user interface object provides visual guidance to the user to view the user interface object at a more direct viewing angle in order to achieve a better visual preview of the content, thereby avoiding errors in movement relative to the user interface object and improving user device interaction.

In some embodiments, displaying the first user interface object with the first amplitude of the three-dimensional stereoscopic effect includes displaying a crossfading between a first representation of the first content and a second representation of the first content that is different from the first representation of the first content (1238), such as shown by the crossfade between first representation 1112*a* and second representation 1112*b* on the first display 1110*a*, and the crossfade between first representation 1114*a* and second representation 1114*b* on the second display 1110*b* shown in FIG. 11B. In some embodiments, crossfading between the first representation of the first content and the second representation of the first content includes gradually (e.g., over a period of time (e.g., 0.05, 0.1, 0.5, 1, 2, 5, or 10 seconds)) increasing the transparency of (e.g., or optionally reducing the opacity of) the display of the first representation of the first content while optionally maintaining the transparency (e.g., and/or opacity) of the second representation. In some embodiments, crossfading between the first representation of the first content and the second representation of the first content includes gradually reducing the transparency of (e.g., or optionally increasing the opacity of) the display of the second representation of the first content while optionally maintaining the transparency (e.g., and/or opacity) of the first representation. In some embodiments, crossfading between the first representation of the first content and the second representation of the first content includes gradually increasing the transparency (e.g., or optionally reducing the opacity of) the display of the first representation of the first content while concurrently reducing the transparency of (e.g., or optionally increasing the opacity of) the display of the second representation. In some embodiments, the first representation of the first content is an image, or a portion of an image, of the first content, and the second representation of the first content is a different image, or a different portion of the image, of the first content. In some embodiments, the display generation component of the display includes a first display and a second display, and crossfading between the first representation of the first content and the second representation of the first content occurs on one or both the first display and the second display (such as the method described with reference to step(s) 1226). In some embodiments, displaying the first user interface object with the second amplitude of the three-dimensional stereoscopic effect includes characteristics of displaying the first user interface object with the first amplitude of the three-dimensional stereoscopic effect. For example, displaying the second amplitude of the three-dimensional stereoscopic effect includes crossfading between the first representation of the content and a third representation of the first content that is different from the second representation of the first content. In some embodiments, the third representation of the first content is a different image, or a different portion of an image of the first content than the second representation of the first content. In some embodiments, displaying the third representation of the first content causes the three-dimensional stereoscopic to be displayed with less amplitude than displaying the second representation of the first content. Displaying a selectable user interface object in a three-dimensional environment with a visual appearance, corresponding to a preview of content corresponding to the user interface object, by crossfading between a first representation and a second representation of the content provides a resource conservative intensive method for presenting the content with depth to enable an improved visual preview experience, thereby preventing the use of unnecessary computing resources and improving user device interaction.

In some embodiments, the display generation component includes a first display and a second display (1240*a*), such as first display 1110*a* and second display 1110*b* shown in FIGS. 11A-11I. In some embodiments, displaying the first user interface object with the first amplitude of the three-dimensional stereoscopic effect (e.g., such as the visual appearance of user interface object 1106*a* in FIG. 11C) includes (1240*b*) displaying, via the first display, a first portion of a first representation of the first content corresponding to a first viewing angle into the first content (optionally relative to the current viewpoint of the user), such as the viewing angle associated with second portion 1130*b* of second representation 1112*b* shown in FIG. 11C, wherein the first viewing angle is separated from a first reference viewing angle into the first content by a first amount in a first direction (1240*c*), as represented by the position of second portion 1130*b* relative to center reference line 1140*a* in FIG. 11C and displaying, via the second display, a first portion of a second representation of the first content corresponding to a second viewing angle into the first content (optionally relative to the current viewpoint of the user), such as the viewing angle associated with second portion 1132*b* of second representation 1114*b* shown in FIG. 11C, wherein the second viewing angle is separated from a second reference viewing angle into the first content by the first amount in a second direction, different from (e.g., opposite from) the first direction (1240*d*), as represented by the position of second portion 1132*b* of second representation 1114*b* relative to center reference line 1140*b* in FIG. 11C. In some embodiments, displaying the first user interface object with the second amplitude of the three-dimensional stereoscopic effect includes (1240*e*) displaying, via the first display, a second portion of the first representation of the first content corresponding to a third viewing angle, different from the first viewing angle, into the first content (optionally relative to the current viewpoint of the user), such as the viewing angle associated with third portion 1130*c* of second representation 1112*b* shown in FIG. 11D, wherein the third viewing angle is separated from the first reference viewing angle into the first content by a second amount, different from (e.g., greater than or less than the first amount), in the first direction, such as represented by the position of third portion 1130*c* of second representation 1112*b* relative to center reference line 1140*a* shown in FIG. 11D, and displaying, via the second display, a second portion of the second representation of the first content corresponding to a fourth viewing angle, different from the second viewing angle, into the first content (optionally relative to the current viewpoint of the user), such as the viewing angle associated with third portion 1132*c* of second representation 1114*b* shown in FIG. 11D, wherein the fourth viewing angle is separated from the second reference viewing angle by the second amount in the second direction (1240*f*) (e.g., as shown by the position of second portion 1132*c* of second representation 1114*b* relative to center reference line 1140*b* in FIG. 11D). In some embodiments, the first display and the second display include characteristics of the first display and second display as described with reference to step(s) 1226. In some embodiments, the first representation of the first content and the second representation of the first content include characteristics of the first representation of the first content and the second representation of the first content as described with reference to step(s) 1226. The first portion of the first representation of the first content and the second portion of the first representation of the first content optionally include the same amount of the first content (e.g., the first portion of the first representation of the first content and the second portion of the first representation of the first content are the same size). In some embodiments, the first portion of the first representation of the first content includes a portion of the first content that is not included in the second portion of the first representation of the first content, and the second portion of the first representation of the first content includes a portion of the first content that is not included in the first portion of the first representation of the first content. In some embodiments, the first portion of the second representation of the first content and the second portion of the second representation of the first content include characteristics of the first portion of the first representation of the first content and the second portion of the first representation of the first content as described above. In some embodiments, the first reference viewing angle and the second reference viewing angle are viewing angles into a center view of the first content (e.g., the center view of the first content as described with reference to step(s) 1226). In some embodiments, the first amount that the first viewing angle is separated from the first reference viewing angle by (and that the second viewing angle is separated from the second reference viewing angle by) corresponds to an angular distance between the first viewing angle and the first reference viewing angle (and the second viewing angle and the second reference viewing angle). In some embodiments, the second amount that the third viewing angle is separated from the first reference viewing angle by (and that the fourth viewing angle is separated from the second reference viewing angle by) corresponds to an angular distance that the third viewing angle is separated from the first reference viewing angle by (and that the fourth viewing angle is separated from the second reference viewing angle by). In some embodiments, the first viewing angle is separated from the first reference viewing angle into the first content by a different amount than the second viewing angle is separated from the second reference viewing angle by (e.g., the first viewing angle is separated from the first reference viewing angle by the first amount, and the second reference viewing angle is separated from the second reference viewing angle by a second amount different from the first amount). Displaying a selectable user interface object in an environment with a visual appearance by displaying different portions of content corresponding to different viewpoints of the content on a first display and a second display provides an improved visual preview of the content by displaying the content with a greater amount of depth, thereby improving user device interaction.

In some embodiments, the computer system displays (1242*a*) a second user interface object with the second visual appearance (e.g., as described with reference to step(s) 1210), wherein the second user interface object is selectable to display second content, such as user interface object 1106*b* shown in FIG. 11H. In some embodiments, the second user interface object is displayed with the second visual appearance after displaying the first user interface object with the second visual appearance. In some embodiments, the second user interface object is displayed with the second visual appearance in response to detecting attention of the user toward the second user interface object. In some embodiments, the first user interface object is no longer displayed with the second visual appearance when the second user interface object is displayed with the second visual appearance. In some embodiments, if the attention of the user is not detected toward the second user interface object, the second user interface object is not displayed with the second visual appearance (e.g., if attention of the user remains directed toward the first user interface object, the first user interface object maintains display with the second visual appearance and the second user interface object is displayed with the first visual appearance). In some embodiments, the second user interface object is displayed in a different location in the environment than the first user interface object. In some embodiments, the second user interface object is selectable to the user, such as through a user input. In some embodiments, in accordance with the selection of the second user interface object, the computer system displays the second content in the environment. In some embodiments, the first user interface object and the second user interface object are part of a plurality of user interface objects that are displayed in the environment. For example, the first user interface object and the second user interface object are displayed as part of a grid and/or collection of user interface objects that are selectable by the user to display different content. In some embodiments, the second user interface object has one or more of the characteristics of the first user interface object.

In some embodiments, while displaying the second user interface object with the second visual appearance (1242*b*), such as the visual appearance of user interface object 1106*b* shown in FIG. 11I, in accordance with a determination that an orientation of a current viewpoint of the user relative to the second user interface object is the first orientation (1242*c*), such as the orientation of viewpoint of user 1120 shown in FIG. 11I, the computer system displays (1242*d*), via the first display, a first portion of a first representation of the second content corresponding to a fifth viewing angle into the second content, such as the portion 1144 of second representation 1148*b* shown in FIG. 11I, wherein the fifth viewing angle is separated from the first reference viewing angle into the second content by a third amount, different from the first amount, in the first direction (e.g., as shown by the position of portion 1144 relative to center reference line 1140*a* in FIG. 11I). In some embodiments, the fifth viewing angle is the first viewing angle as described with reference to step(s) 1240. In some embodiments, displaying the first portion of the first representation of the second content includes characteristics of displaying the first portion of the first representation of the first content as described with reference to step(s) 1240.

In some embodiments, the computer system displays (1242*e*), via the second display, a first portion of a second representation of the second content corresponding to a sixth viewing angle into the second content, such as portion 1146 of second representation 1150*b*, wherein the sixth viewing angle is separated from the second reference viewing angle into the second content by the third amount in the second direction (e.g., as shown by the position of portion 1146 relative to center reference line 1140*b* in FIG. 11I). In some embodiments, the sixth viewing angle is the second viewing angle as described with reference to step(s) 1240. In some embodiments, displaying the first portion of the second representation of the second content includes characteristics of displaying the first portion of the second representation of the first content as described with reference to step(s) 1240.

In some embodiments, in accordance with a determination that the orientation of the current viewpoint of the user relative to the second user interface object is the second orientation (1242*f*), the computer system displays (1242*g*), via the first display, a second portion of the first representation of the second content corresponding to a seventh viewing angle, different from the fifth viewing angle, into the second content (e.g., similar to third portion 1130*c* of second representation 1112*b* of the content associated with user interface object 1106*a* shown in FIG. 11D), wherein the fifth viewing angle is separated from the first reference viewing angle by a fourth amount, different from (e.g., greater than or less than) the second amount, in the first direction (e.g., similar to the position of third portion 1130*c* relative to center reference line 1140*a* shown in FIG. 11D). In some embodiments, displaying the second portion of the first representation of the second content includes characteristics of displaying the second portion of the first representation of the first content, as described with reference to step(s) 1240.

In some embodiments, the computer system displays (1242*h*), via the second display, a second portion of the second representation of the second content corresponding to a eighth viewing angle, different from the sixth viewing angle, into the second content (e.g., similar to third portion 1132*c* of second representation 1114*b* of the content associated with user interface object 1106*a* shown in FIG. 11D), wherein the eighth viewing angle is separated from the second reference viewing angle by the fourth amount in the second direction (e.g., similar to the position of third portion 1132*c* relative to center reference line 1140*a* shown in FIG. 11D). In some embodiments, displaying the second portion of the second representation of the second content includes characteristics of displaying the second portion of the second representation of the first content, as described with reference to step(s) 1240. In some embodiments, the third amount by which the fifth viewing angle is separated from the first reference viewing angle (and by which the sixth viewing angle is separated from the second reference viewing angle) is an angular distance that is different from the angular distance between the third viewing angle and the first reference viewing angle (and that is different from the angular distance between the fourth viewing angle and the second reference viewing angle) relative to the first representation of the first content. In some embodiments, the third amount by which the fifth viewing angle is separated from the first reference viewing angle (and by which the sixth viewing angle is separated from the second reference viewing angle) is greater than the first amount by which the first viewing angle is separated from the first reference viewing angle (and by which the second viewing angle is separated from the second reference viewing angle). Displaying a first selectable user interface object in a three-dimensional environment with a visual appearance that includes different representations of first content corresponding to the first user interface object in a different manner compared to displaying a second selectable user interface object with a visual appearance corresponding to different views of second content corresponding to the second user interface object provides a tailored visual appearance based on the respective content being previewed, thereby improving the visual preview of the respective content and improving user device interaction.

In some embodiments, while the current viewpoint of the user is a first viewpoint at which the orientation of the current viewpoint relative to the first user interface object is the first orientation (e.g., as described with reference to step(s) 1234) and while displaying the first user interface object with the first amplitude of the three-dimensional stereoscopic effect, the computer system detects (1244*a*) a change in the current viewpoint of the user from the first viewpoint to a second viewpoint (e.g., as shown from the change of viewpoint of user 1120 shown in FIGS. 11D-11E), including changing the orientation of the current viewpoint relative to the first user interface object away from the first orientation, such as the orientation of the viewpoint of user 1120 shown in FIG. 11C.

In some embodiments, in response to detecting the change in the current viewpoint of the user from the first viewpoint to the second viewpoint, the computer system displays (1244*b*) the first user interface object with a third amplitude of the three-dimensional stereoscopic effect, different from the first amplitude of the three-dimensional stereoscopic effect, such as the amplitude of the three-dimensional stereoscopic effect of user interface object 1106*a* shown in FIG. 11E. In some embodiments, the change of the current viewpoint of the user from the first viewpoint to the second viewpoint includes the user changing their position and/or field of view relative to the environment. For example, the first user interface object is world-locked at a first location in the environment, and the user moves from a first location in the environment to a second location in the environment, which causes the user's viewpoint relative to the first user interface object to change (e.g., the angle of the viewpoint and/or distance from the user to the first user interface object changes). In some embodiments, the change of the current viewpoint of the user from the first viewpoint to the second viewpoint includes the user changing the position and/or location of the first user interface object in the environment through a user input (e.g., the user moves their hand toward the first user interface object in the environment and grabs the first user interface object with their fingers and releases the first user interface object in a different location, a voice input, and/or a touch input on a touch-sensitive surface of the computer system), which optionally causes the orientation of the first user interface object relative to the viewpoint of the user to change. In some embodiments, based on the orientation of viewpoint of the user relative to the first user interface object, the amplitude of the three-dimensional stereoscopic effect is adjusted (e.g., as described with reference to step(s) 1234). For example, the computer system stores instructions for adjusting the amplitude of the three-dimensional stereoscopic effect based on the orientation of the viewpoint of the user (e.g., based on the angle of the viewpoint and/or distance from the user to the first user interface object). Displaying a user interface object with a visual appearance that includes a visual preview of content corresponding to the user interface object with a different amplitude depending on the viewpoint of a user relative to the user interface object provides visual guidance to the user regarding the angle to view the user interface object at in order to experience an optimal visual preview of the content, thereby avoiding errors in movement relative to the user interface object and improving user device interaction.

In some embodiments, while detecting the change in the current viewpoint of the user from the first viewpoint to the second viewpoint, the computer system gradually transitions (1246) from displaying the first user interface object with the first amplitude of the three-dimensional stereoscopic effect to displaying the first user interface object with the third amplitude of the three-dimensional stereoscopic effect, such as the transition of the visual appearance of user interface object 1106*a* shown in FIG. 11D. In some embodiments, the transition from displaying the first user interface object with the first amplitude of the three-dimensional stereoscopic effect to displaying the first user interface object with the third amplitude of the three-dimensional stereoscopic effect occurs over a period of time (e.g., 0.05, 0.1, 0.5, 1, 2, 5, or 10 seconds). In some embodiments, displaying the first user interface object with the third amplitude of the three-dimensional stereoscopic effect includes displaying the first content with a less amount of depth compared to the first amplitude of the three-dimensional stereoscopic effect. For example, when the first content is displayed with the third amplitude of the three-dimensional stereoscopic effect, a smaller amount of the first content is displayed with a visible amount of clarity and/or structure relative to the viewpoint of the user compared to when the first content is displayed with the second amplitude of the three-dimensional stereoscopic effect. In some embodiments, displaying the first user interface object with the third amplitude of the three-dimensional stereoscopic effect includes displaying the first content with a greater amount of depth compared to the first amplitude. For example, when the first content is displayed with the third amplitude of the three-dimensional stereoscopic effect, a greater amount of the first content is displayed with a visible amount of clarity and/or structure relative to the viewpoint of the user compared to when the first content is displayed with the first amplitude of the three-dimensional stereoscopic effect. In some embodiments, the transition from the first amplitude of the three-dimensional stereoscopic effect to the third amplitude of the three-dimensional stereoscopic effect occurs simultaneously with the change of the viewpoint of the user from the first viewpoint to the second viewpoint (e.g., as the orientation of the viewpoint of the user changes relative to the first user interface object, the amplitude of the three-dimensional stereoscopic effect changes). In some embodiments, the amount of change in the viewpoint of the user (e.g., the amount of change in orientation and/or position between the first viewpoint and the second viewpoint) and/or the rate of change of the viewpoint affects the transition from the first amplitude of the three-dimensional stereoscopic effect to the third amplitude of the three-dimensional stereoscopic effect. For example, the amount of difference between the third amplitude of the three-dimensional stereoscopic effect and the first amplitude of the three-dimensional stereoscopic effect corresponds to the difference (e.g., relative to position and/or orientation) between the first viewpoint and the second viewpoint (e.g., as the difference between the first viewpoint and the second viewpoint is greater, the difference in the amplitude from the first amplitude to the third amplitude is greater). For example, the speed of the transition between the first amplitude of the three-dimensional stereoscopic effect and the third amplitude of the three-dimensional stereoscopic effect corresponds to the rate of change of the viewpoint between the first viewpoint and the second viewpoint (e.g., the greater the rate of change is between the first viewpoint and the second viewpoint, the quicker the transition is between the first amplitude of the three-dimensional stereoscopic effect and the third amplitude of the three-dimensional stereoscopic effect). Displaying a user interface object with a visual appearance that includes a visual preview of content corresponding to the user interface object with a different amplitude depending on the viewpoint of a user relative to the user interface object provides visual guidance to the user regarding the angle to view the user interface object at in order to experience an optimal visual preview of the content, and doing so gradually provides clear feedback to a user that the amplitude of the visual appearance is changing, thereby providing the user an opportunity to stop the change in amplitude of the visual appearance by maintaining or adjusting their viewpoint relative to the user interface object, thereby avoiding errors in interaction and improving user device interaction.

In some embodiments, changing the orientation of the current viewpoint relative to the first user interface object away from the first orientation includes changing the orientation relative to an axis parallel to a first plane of the first user interface object (1248), such as the change in orientation of the viewpoint of user 1120 shown in FIG. 11G compared to FIG. 11C. In some embodiments, the first plane of the first user interface object corresponds to a plane parallel to a surface of the first user interface object that includes the first content. In some embodiments, a viewpoint of the user that includes a direct viewing angle corresponds to a viewing angle that is normal to the first plane. In some embodiments, the axis parallel to the first plane corresponds to a horizontal reference axis relative to the viewpoint of the user. In some embodiments, the relative orientation of the first user interface object about the axis parallel to the first plane corresponds to the amount of vertical tilt of the first user interface object relative to the viewpoint of the user. In some embodiments, changing the orientation of the current viewpoint relative to the first user interface object away from the first orientation includes the user longitudinally changing their position (and/or the position of the viewpoint) in the environment relative to the first user interface object, for example to a location above or below the height of the first user interface object (such that the first user interface object is tilted toward/away from the user relative to the user's current viewpoint). The first user interface object is optionally in the user's field of view relative to the environment when the orientation of the current viewpoint changes away from the first orientation. In some embodiments, changing the orientation relative to the axis parallel to the plane of the first user interface object includes the user tilting the first user interface object relative to the viewpoint of the user through a user input (e.g., having one or more characteristics of the user input(s) described with reference to step(s) 1244). Modifying the amplitude of a visual appearance of a selectable user interface object that includes different views of content corresponding to the user interface object based on vertical viewing angle provides visual feedback regarding the vertical viewing angle and provides the user an opportunity to adjust their viewing angle to obtain a desired amplitude of the visual appearance of the user interface object, thereby reducing errors in interaction and improving user device interaction.

In some embodiments, changing the orientation of the current viewpoint relative to the first user interface object away from the first orientation includes changing the orientation relative to an axis perpendicular to a first plane of the first user interface object (1250), such as the change in orientation of the viewpoint of user 1120 shown in FIG. 11E compared to FIG. 11C. In some embodiments, the first plane of the first user interface object includes characteristics of the first plane as described with reference to step(s) 1248. In some embodiments, the axis parallel to the first plane corresponds to a vertical reference axis (e.g., perpendicular to the horizontal reference axis as described with reference to step(s) 1248) relative to the viewpoint of the user. In some embodiments, the relative orientation of the first user interface object about the axis perpendicular to the first plane corresponds to the amount of horizontal rotation of the first user interface object relative to the viewpoint of the user. In some embodiments, changing the orientation of the current viewpoint relative to the first user interface object away from the first orientation includes the user laterally changing their position (and/or the position of the viewpoint) in the environment relative to the first user interface object (e.g., such that the first user interface object is rotated toward/away from the user relative to the user's current viewpoint). The first user interface object is optionally in the user's field of view relative to the environment when the orientation of the current viewpoint changes away from the first orientation. In some embodiments, the changing the orientation relative to the axis perpendicular to the plane of the first user interface object includes the user rotating the first user interface object relative to the viewpoint to the user through a user input (e.g., having one or more characteristics of the user input(s) described with reference to step(s) 1244). Modifying the amplitude of a visual appearance of a selectable user interface object that includes different views of content corresponding to the user interface object based on lateral viewing angle provides visual feedback regarding the lateral viewing angle and provides the user an opportunity to adjust their viewing angle to obtain a desired amplitude of the visual appearance of the user interface object, thereby reducing errors in interaction and improving user device interaction.

In some embodiments, transitioning from displaying the first user interface object with the first visual appearance to displaying the first user interface object with the second visual appearance in response to detecting the attention of the user directed toward the first user interface object includes displaying the first user interface object with the three-dimensional stereoscopic effect (e.g., as described with reference to step(s) s 1226-1232) and (optionally while) expanding a size of the first user interface object relative to the environment (1252) (e.g., as described with reference to step(s) s 1216-1224 and as shown by the change in visual appearance of user interface object 1106*a* from FIGS. 11A and 11A1 to FIG. 11C). In some embodiments, if attention of the user is not directed toward the first user interface object, the first user interface object is not displayed with the three-dimensional stereoscopic effect and the expanded size. In some embodiments, displaying the three-dimensional stereoscopic effect and expanding the size of the first user interface object both occur gradually (e.g., over a period of time (e.g., 0.05, 0.1, 0.5, 1, 2, 5, or 10 seconds)). Modifying a visual appearance of a selectable user interface object in a three-dimensional environment in response detecting attention of a user toward the user interface object by beginning to display a preview of content corresponding to the user interface object and expanding the size of the user interface object to the three-dimensional environment provides clear feedback to a user that the user interface object is changing visual appearance to display the preview of the content corresponding to the user interface object, thereby providing the user an opportunity to redirect their attention away from the user interface object environment if the user does not desire preview the content and/or select the user interface object, thereby improving user device interaction.

It should be understood that the particular order in which the operations in method 1200 have been described is merely exemplary and is not intended to indicate that the described order is the only order in which the operations could be performed. One of ordinary skill in the art would recognize various ways to reorder the operations described herein.

FIGS. 13A-13G illustrate examples of a computer system facilitating light blending techniques for one or more objects in a three-dimensional environment in accordance with some embodiments.

Figure 13A:
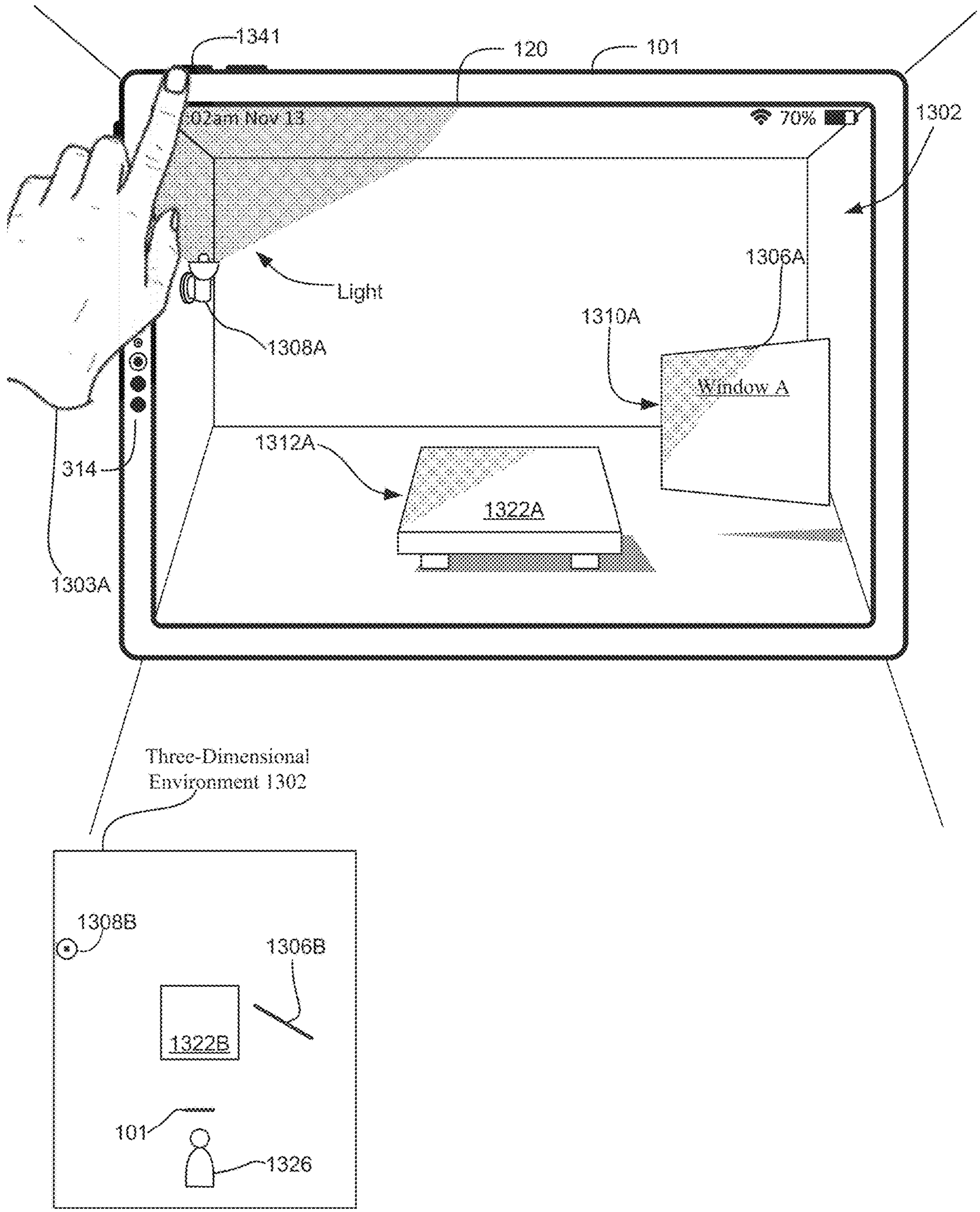
FIGS. 13A-13G illustrate examples of a computer system facilitating light blending techniques for one or more objects in a three-dimensional environment in accordance with some embodiments.

FIG. 13A illustrates a computer system 101 (e.g., an electronic device) displaying, via a display generation component (e.g., display generation component 120 of FIG. 1), a three-dimensional environment 1302 from a viewpoint of the user 1326 of the computer system 101 (e.g., facing the back wall of the physical environment in which computer system 101 is located). In some embodiments, computer system 101 includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user 1326 (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or attention (e.g., including gaze) of the user (e.g., internal sensors facing inwards towards the face of the user).

As shown in FIG. 13A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 1302. For example, three-dimensional environment 1302 includes a representation 1322*a* of a coffee table (corresponding to representation 1322*b* in the overhead view), which is optionally a representation of a physical coffee table in the physical environment, and a representation 1308*a* of a light source (corresponding to representation 1308*b* in the overhead view), which is optionally a representation of a physical light source (e.g., wall-mounted lamp) in the physical environment. Additionally, in some embodiments, as shown in FIG. 13A, the three-dimensional environment 1302 includes representations of the floor, walls, and/or ceiling of the physical environment. In some embodiments, the above discussed representations are visible via virtual passthrough (e.g., are computer-generated representations) or are visible via optical passthrough (e.g., visible in the three-dimensional environment 1302 via a transparent portion of the display of the computer system 101).

In FIG. 13A, three-dimensional environment 1302 also includes virtual object 1306*a* ("Window A," corresponding to object 1306*b* in the overhead view). In some embodiments, the virtual object 1306*a* is or includes one or more of user interfaces of an application (e.g., a respective application operating on the computer system 101) containing content (e.g., quick look windows displaying photographs, web-browsing windows displaying web-based content, media provider windows displaying video content (e.g., movies, television shows, and/or other video clips), and/or word processing windows displaying text), three-dimensional objects (e.g., virtual clocks, virtual balls, and/or virtual cars) or any other element displayed by computer system 101 that is not included in the physical environment of display generation component 120. In some embodiments, the virtual object 1306*a* is world-locked in the three-dimensional environment 1302.

In some embodiments, the computer system 101 displays the representation of the table 1322*a* and/or the virtual object 1306*a* with lighting effects that are based on visual characteristics of the portions of the three-dimensional environment 1302 surrounding the representation of the table 1322*a* and/or the virtual object 1306*a*. In some embodiments, the lighting effects displayed with the representation of the table 1322*a* and/or the virtual object 1306*a* are natural lighting effects (e.g., natural lighting effects that are produced by physical light that is visible in the physical environment surrounding the display generation component 120) and/or are virtual lighting effects (e.g., virtual lighting effects that are generated and displayed by the computer system 101), as discussed below.

In FIG. 13A, as discussed above, the physical environment includes the light source (e.g., visible in the three-dimensional environment 1302 as the representation 1308*a*) that is emitting light ("Light") that is cast onto the left and back walls and the ceiling of the physical environment in which the computer system 101 is located. As shown in FIG. 13A, the representation of the table 1322*a* is optionally displayed with lighting effect 1312*a* that is based on the visual characteristics of the portions of the physical environment that are included in the three-dimensional environment 1302, including the lighting produced by the representation of the light source 1308*a*. In some embodiments, because the representation of the table 1322*a* is a physical object in the physical environment, the lighting effect 1312*a* corresponds to the physical light that is cast onto the representation of the table 1322*a* (e.g., the light reflected by the walls and/or ceiling of the physical environment onto the table and/or the light produced by the light source that is directly hitting the table in the physical environment) and/or reflected off the top surface of the representation of the table 1322*a* (e.g., which is visible to the eye(s) of the user 1326 via the display generation component 120 (e.g., a transparent portion of the display generation component 120)). In FIG. 13A, the light emitted from the representation of the light source 1308*a* causes the representation of the table 1322*a* to cast a shadow onto the floor of the portion of the physical environment that is visible in the three-dimensional environment 1302. Additionally, in FIG. 13A, virtual object 1306*a* is optionally displayed with lighting effect 1310*a* that is based on the visual characteristics of the portions of the physical environment that are included in the three-dimensional environment 1302, including the lighting produced by the representation of the light source 1308*a*. For example, the computer system 101 generates and displays the lighting effect 1310*a* based on a determination of how the light produced by the light source in the physical environment would be cast onto and/or reflected off of the virtual object 1306*a* if the virtual object 1306*a* were a physical object in the physical environment (e.g., similar to the table). In some embodiments, displaying the lighting effect 1310*a* includes displaying the virtual object 1306*a* with a virtual shadow that is displayed on the representation of the floor in the three-dimensional environment 1302 (e.g., in accordance with a determination that the light produced by the light source in the physical environment would cause a physical object located at a location of the virtual object 1306*a* to produce a shadow). Additional details of the above and below with respect to displaying objects with lighting effects are provided with reference to method 1400.

It should be understood that the lighting effects 1312*a* and 1310*a* shown in FIG. 13A are exemplary and that, in some embodiments, a larger amount or a smaller amount of the representation of the table 1322*a* and/or the virtual object 1306*a* is displayed with the lighting effects 1312*a*/1310*a* than that shown in FIG. 13A.

In FIG. 13A, the computer system 101 detects an input corresponding to a request to display a virtual environment within the three-dimensional environment 1302. For example, as shown in FIG. 13A, the computer system 101 detects selection of physical button 1341 of the computer system 101 provided by hand 1303*a*. In some embodiments, the selection of the physical button 1341 includes one or more presses of the physical button 1341. In some embodiments, the selection of the physical button 1341 includes a press and hold of the physical button 1341. In some embodiments, the selection of the physical button 1341 includes a rotation/swipe of the physical button 1341. In some embodiments, as discussed in more detail below, the manner of interaction with the physical button 1341 (e.g., the number of presses, the duration of the press and hold, or the amount of rotation) determines an immersion level of the virtual environment that is displayed, which controls an amount (e.g., a percentage) of the three-dimensional environment 1302 in the field of view of the user 1326 that is occluded by the virtual environment relative to the viewpoint of the user 1326.

Figure 13B:
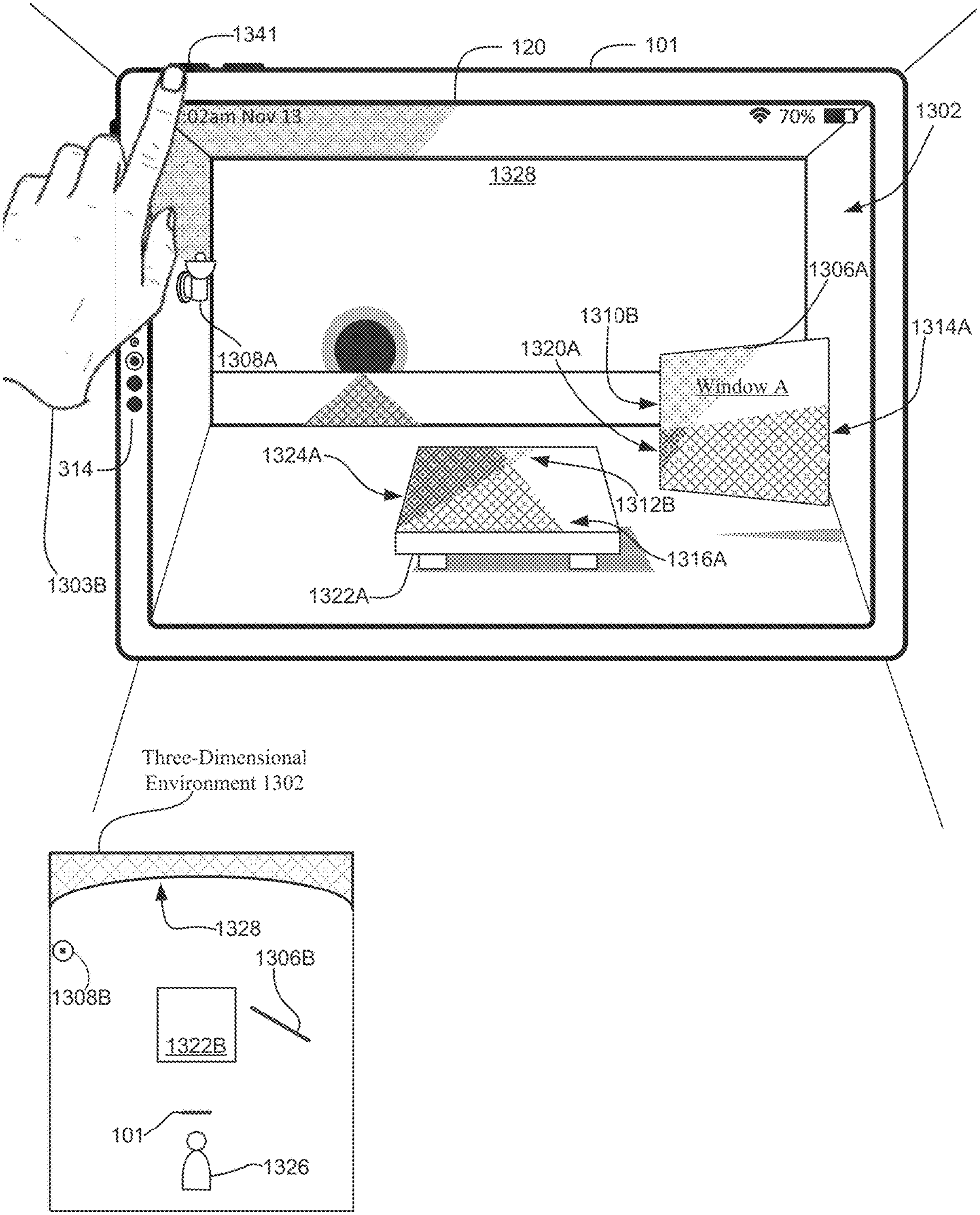

In some embodiments, in response to detecting the selection of the physical button 1341 provided by the hand 1303*a* in FIG. 13A, the computer system 101 displays virtual environment 1328 in the three-dimensional environment 1302, as shown in FIG. 13B. In some embodiments, displaying the virtual environment 1328 includes (optionally displaying an animation of) gradually revealing the virtual environment 1328 in the three-dimensional environment 1302 based on the immersion level defined by the input in FIG. 13A. For example, the immersion level of the virtual environment 1328 is increased from no immersion (e.g., no virtual environment 1328 in FIG. 13A), as shown in FIG. 13B, such that the virtual environment 1328 occupies a portion of the three-dimensional environment 1302 from the viewpoint of the user 1326. As shown in the overhead view of FIG. 13B, the virtual environment 1328 optionally occupies the portion of the three-dimensional environment 1302 that includes the representation of the back wall of the physical environment from the viewpoint of the user 1326.

In some embodiments, as shown in FIG. 13B, the virtual environment 1328 corresponds to a beach environment during sunset. For example, the virtual environment 1328 includes a virtual light source in the form of the setting sun. In some embodiments, when the computer system 101 displays the virtual environment 1328 in the three-dimensional environment 1302, the computer system 101 updates the lighting effects displayed with the representation of the table 1322*a* and/or the virtual object 1306*a* in the three-dimensional environment 1302. In FIG. 13B, when the virtual environment 1328 that includes the virtual lighting source is displayed in the three-dimensional environment 1302, the visual characteristics of the portions of the three-dimensional environment 1302 surrounding the representation of the table 1322*a* and the virtual object 1306*a* change. For example, as shown in FIG. 13B, the computer system 101 displays the representation of the table 1322*a* and the virtual object 1306*a* with virtual lighting effects that are based on the virtual light emitted by the setting sun of the virtual environment 1328. As shown in FIG. 13B, the computer system 101 optionally displays the representation of the table 1322*a* with virtual lighting effect 1316*a* and the virtual object 1306*a* with virtual lighting effect 1314*a*. In some embodiments, the computer system 101 generates and displays the virtual lighting effects 1316*a* and 1314*a* based on the locations of the representation of the table 1322*a* and the virtual object 1306*a* relative to the virtual light source in the virtual environment 1328. Additionally, in some embodiments, the computer system 101 generates and displays the virtual lighting effects 1316*a* and 1314*a* based on a determination of how the virtual light produced by the virtual light source in the virtual environment 1328 would be cast onto and/or reflected off of the representation of the table 1322*a* and/or the virtual object 1306*a* if the virtual light source were a physical light source in the physical environment (e.g., similar to the light source 1308*a*).

In some embodiments, while displaying the light effects 1310B and 1312B that are based on the visual characteristics of the physical environment in the three-dimensional environment 1302 and the virtual light effects 1314*a* and 1316*a* that are based on the visual characteristics of the virtual environment 1328, the computer system 101 displays blended lighting effects 1320*a* and 1324*a* that are based on a combination of the lighting effects based on the visual characteristics of the physical environment and the virtual environment 1328. For example, as shown in FIG. 13B, because a portion of the lighting effect 1312*b* overlaps with a portion of the virtual lighting effect 1316*a* on the representation of the table 1322*a*, the computer system 101 displays blended lighting effect 1324*a* that is based on a combination of the overlapping portions of the lighting effect 1312*b* and the virtual lighting effect 1316*a*. Similarly, in FIG. 13B, because a portion of the lighting effect 1310*b* overlaps with a portion of the virtual lighting effect 1314*a* on the virtual object 1306*a*, the computer system 101 displays blended lighting effect 1320*a* that is based on a combination of the overlapping portions of the lighting effect 1310*b* and the virtual lighting effect 1314*a* in the three-dimensional environment 1302. In some embodiments, the computer system 101 generates and displays the blended lighting effects 1324*a* and 1320*a* based on a determination of how the virtual light produced by the virtual light source in the virtual environment 1328 and the physical light produced by the light source 1308*a* in the physical environment would be blended/combined if portions of the virtual light cast onto and/or reflected off of the representation of the table 1322*a* and/or the virtual object 1306*a* overlapped with portions of the physical light and if the virtual light source were a physical light source in the physical environment (e.g., similar to the light source 1308*a*). Additional details of the above and below with respect to displaying objects with blended lighting effects are provided with reference to method 1400.

In FIG. 13B, the computer system 101 detects an input corresponding to a request to change the immersion level of the virtual environment 1328 within the three-dimensional environment 1302. For example, as shown in FIG. 13B and as previously described above, the computer system 101 detects selection of physical button 1341 of the computer system 101 provided by hand 1303*b*. In some embodiments, as discussed above, the immersion level of the virtual environment 1328 controls the amount (e.g., a percentage) of the three-dimensional environment 1302 in the field of view of the user 1326 that is occluded by the virtual environment 1328 relative to the viewpoint of the user 1326.

Figure 13C:
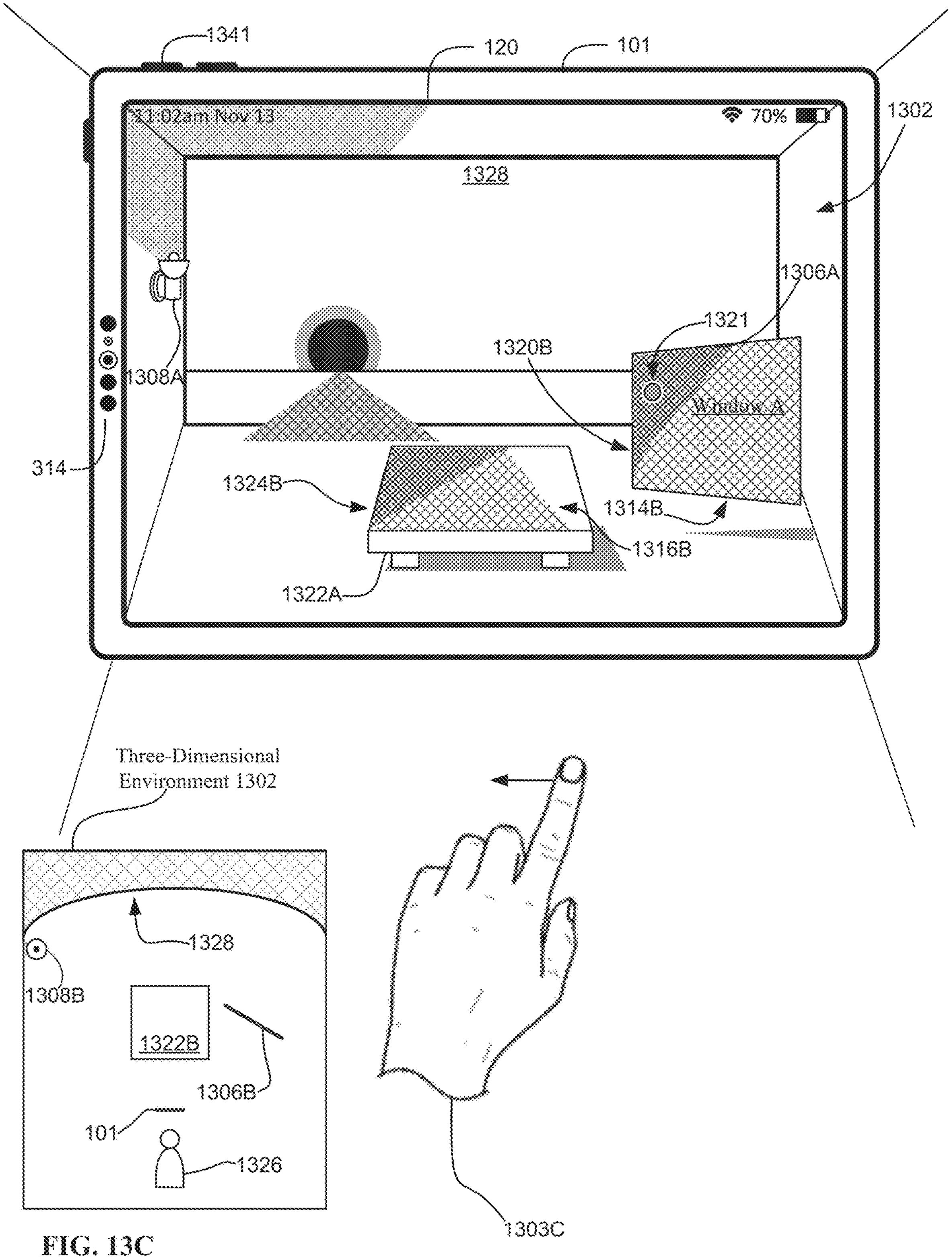

In some embodiments, as shown in FIG. 13C, in response to detecting the selection of the physical button 1341 provided by the hand 1303*b*, the computer system 101 changes the immersion level of the virtual environment 1328 within the three-dimensional environment 1302. For example, as shown in FIG. 13C, the computer system 101 increases the immersion level of the virtual environment 1328 in accordance with the input (e.g., based on a number of presses or a duration of the press and/or rotation of the physical button 1341). As shown in FIG. 13C, increasing the immersion level of the virtual environment 1328 optionally includes increasing the amount of the three-dimensional environment 1302 in the field of view of the user 1326 that is occluded by the virtual environment 1328 relative to the viewpoint of the user 1326. For example, as shown in the overhead view in FIG. 13C, the virtual environment 1328 occludes a larger portion of the rear (e.g., including the back wall) of the physical environment included in the three-dimensional environment 1302 relative to the viewpoint of the user 1326.

In some embodiments, when the computer system 101 increases the immersion level of the virtual environment 1328, one or more visual characteristics of the virtual environment 1328 change in the three-dimensional environment 1302. For example, as shown in FIG. 13C, increasing the immersion level of the virtual environment 1328 causes the virtual light source (e.g., the setting sun) in the virtual environment 1328 to cast more virtual light into the three-dimensional environment 1302. Accordingly, as shown in FIG. 13C, the computer system 101 optionally updates display of the virtual lighting effects 1316*b* and 1314*b* that are based on the visual characteristics of the virtual environment 1328. For example, as shown in FIG. 13C, the computer system 101 increases a size of the virtual lighting effect 1316*b* on the representation of the table 1322*a* and the size of the virtual lighting effect 1314*b* on the virtual object 1306*a* in accordance with the increase in the amount of virtual light cast into the three-dimensional environment 1302 by the virtual light source. Additionally, in some embodiments, the computer system 101 updates the brightness, coloration, and/or opacity of the virtual lighting effects 1316*b* and/or 1314*b* in accordance with the changes in the one or more visual characteristics of the virtual environment 1328.

In some embodiments, in FIG. 13C, when the computer system 101 updates display of the virtual lighting effects 1316*b* and 1314*b*, the computer system 101 also updates display of the blended lighting effects 1324*b* and 1320*b*. For example, as shown in FIG. 13C, the increase in size of the virtual lighting effect 1316*b* on the representation of the table 1322*a* in the three-dimensional environment 1302 causes the overlap between the virtual lighting effect 1316*b* and the lighting effect 1312*b* to increase as well (e.g., in FIG. 13C, the virtual lighting effect 1316*b* has fully overlapped with the lighting effect 1312*b* caused by the physical light source 1308*a*). Accordingly, in FIG. 13C, the computer system 101 optionally increases a size (e.g., and/or brightness, opacity, and/or coloration) of the blended lighting effect 1324*b* on the representation of the table 1322*a* in accordance with the increase in overlap between the virtual lighting effect 1316*b* and the lighting effect 1312*b* of FIG. 13B. Similarly, as shown in FIG. 13C, the increase in size of the virtual lighting effect 1314*b* on the virtual object 1306*a* (e.g., the virtual object 1306*a* is fully illuminated by the virtual light source of the virtual environment 1328) in the three-dimensional environment 1302 causes the overlap between the virtual lighting effect 1314*b* and the lighting effect 1310*b* to increase as well (e.g., in FIG. 13C, the virtual lighting effect 1314*b* has fully overlapped with the lighting effect 1310*b* of FIG. 13B that is based on the physical light source 1308*a*). Accordingly, in FIG. 13C, the computer system 101 optionally increases a size (e.g., and/or brightness, opacity, and/or coloration) of the blended lighting effect 1320*b* on the virtual object 1306*a* in accordance with the increase in overlap between the virtual lighting effect 1314*b* and the lighting effect 1310*b* of FIG. 13B.

Figure 13D:
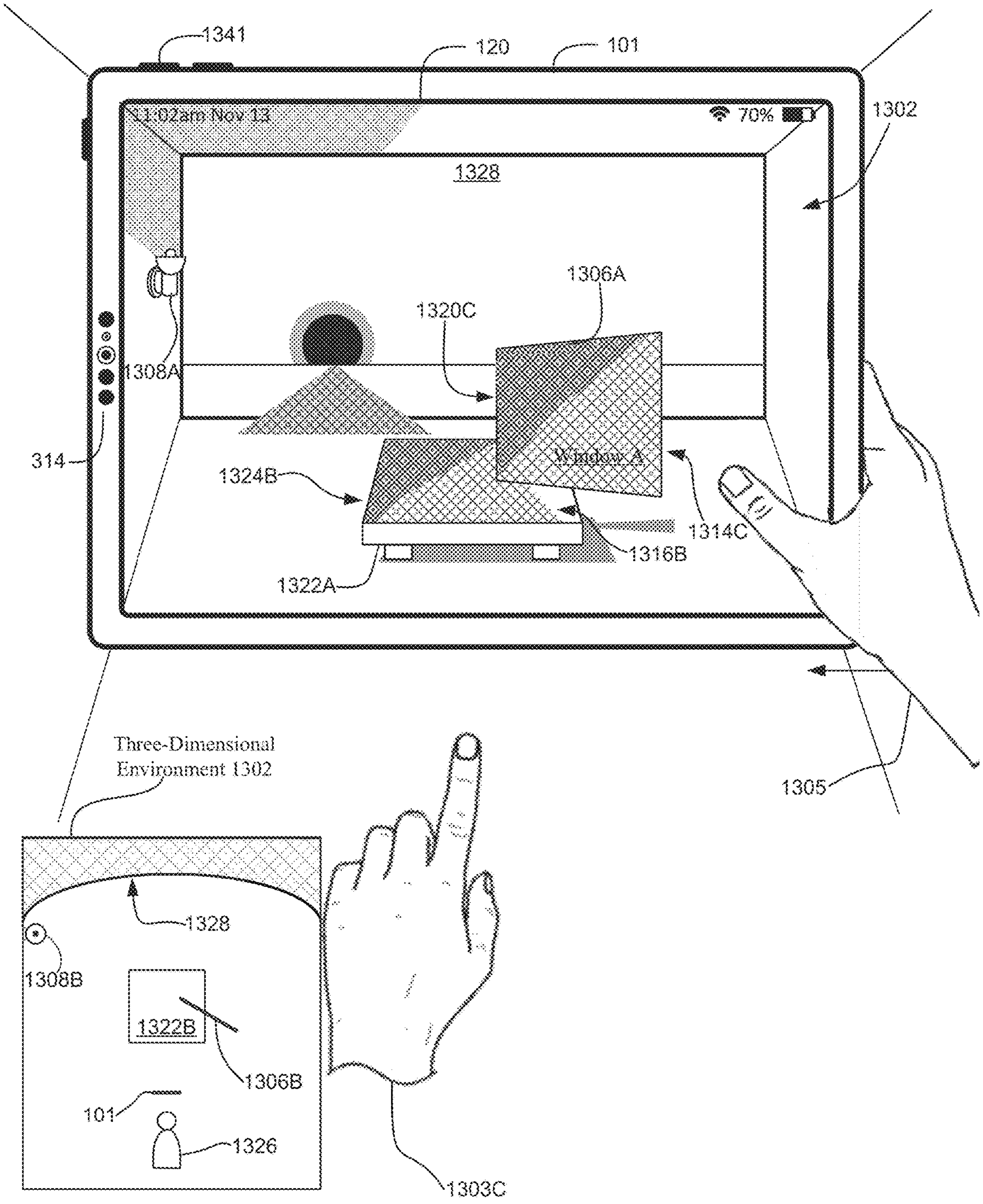

In FIG. 13C, the computer system 101 detects the hand 1303*c* of the user 1326 provide a movement input directed to the virtual object 1306*a*. For example, as shown in FIG. 13C, the computer system 101 detects the hand 1303*c* provide an air pinch gesture while the attention (e.g., including gaze 1321) of the user 1326 is directed to the virtual object 1306*a* in the three-dimensional environment 1302, followed by movement of the hand 1303*c* in a leftward direction with a respective magnitude (e.g., of distance and/or speed) while the hand remains in the pinch hand shape. In some embodiments, as shown in FIG. 13D, in response to detecting the movement input directed to the virtual object 1306*a*, the computer system 101 moves the virtual object 1306*a* within the three-dimensional environment 1302 in accordance with the movement of the hand 1303*c*. For example, as shown in the overhead view of FIG. 13D, the virtual object 1306*a* is moved leftward over the representation of the table 1322*b* in the three-dimensional environment 1302 relative to the viewpoint of the user 1326.

In some embodiments, the movement of the virtual object 1306*a* within the three-dimensional environment 1302 causes the visual characteristics of the physical environment and/or the virtual environment 1328 to change relative to the new location of the virtual object 1306*a* in the three-dimensional environment 1302. For example, when the computer system 101 moves the virtual object 1306*a* leftward in the three-dimensional environment 1302 in accordance with the movement of the hand 1303*c*, the physical light source 1308*a* and the virtual light source (e.g., the setting sun, the rising sun, and/or the moon) are located closer to the virtual object 1306*a* from the viewpoint of the user 1326 and/or the physical light and the virtual light cast onto the virtual object 1306*a* are hitting the surface of the virtual object 1306*a* at different angles and/or magnitudes as well. Accordingly, in some embodiments, the computer system 101 updates display of the lighting effects on the virtual object 1306*a* based on the updated location of the virtual object 1306*a*. For example, in FIG. 13D, when the virtual object 1306*a* is moved leftward in the three-dimensional environment 1302, the computer system 101 updates display of the virtual lighting effect 1314*c*. In FIG. 13D, the virtual object 1306*a* has optionally moved closer to the virtual light source in the virtual environment 1328 from the viewpoint of the user 1326, which causes the computer system 101 to increase the brightness of the virtual lighting effect 1314*c*, change the coloration of the virtual lighting effect 1314*c*, and/or increase an opacity of the virtual lighting effect 1314*c*.

Additionally, as shown in FIG. 13D, the computer system 101 optionally updates the blended lighting effect 1320*c* on the virtual object 1306*a*. For example, when the virtual object 1306*a* is moved leftward, the visual characteristics of the physical environment (e.g., the prominence of light produced by the physical light source 1308*a*) increase relative to the new location of the virtual object 1306*a* from the viewpoint of the user 1326, which causes the size of the lighting effect (e.g., 1312*b* in FIG. 13B) that is based on the visual characteristics of the physical environment to increase, thereby increasing the overlap between the lighting effect that is based on the visual characteristics of the physical environment and the virtual lighting effect 1314*c* that is based on the visual characteristics of the virtual environment 1328. In some embodiments, as similarly discussed above, the computer system 101 increases the size of the blended lighting effect 1320*c* in accordance with the increase in overlap between the two lighting effects. In some embodiments, as shown in FIG. 13D, when the computer system 101 moves the virtual object 1306*a*, the computer system 101 forgoes updating display of the lighting effects on the representation of the table 1322*a*. For example, moving the virtual object 1306*a* does not cause the visual characteristics of the physical environment and/or the virtual environment 1328 to change relative to the location of the representation of the table 1322*a* in the three-dimensional environment 1302 from the viewpoint of the user 1326, so the computer system 101 maintains display of the virtual lighting effect 1316*b* and the blended lighting effect 1324*b*, as shown in FIG. 13D.

In FIG. 13D, the computer system 101 detects movement of the viewpoint of the user 1326. For example, as shown in FIG. 13D, the computer system 101 detects hand 1305 that is holding the computer system 101 move in a leftward direction (e.g., leftward relative to a body of the user 1326). In some embodiments, as described below, movement of the viewpoint of the user 1326 causes the portion of the three-dimensional environment 1302, including the physical environment surrounding the display generation component 120, in the field of view of the user 1326, to change in accordance with the movement of the viewpoint. In some embodiments, the input for changing the viewpoint of the user 1326 corresponds to a movement of the head of the user 1326 in the physical environment (e.g., movement of the head-mounted display worn by the user 1326 in the physical environment).

Figure 13E:
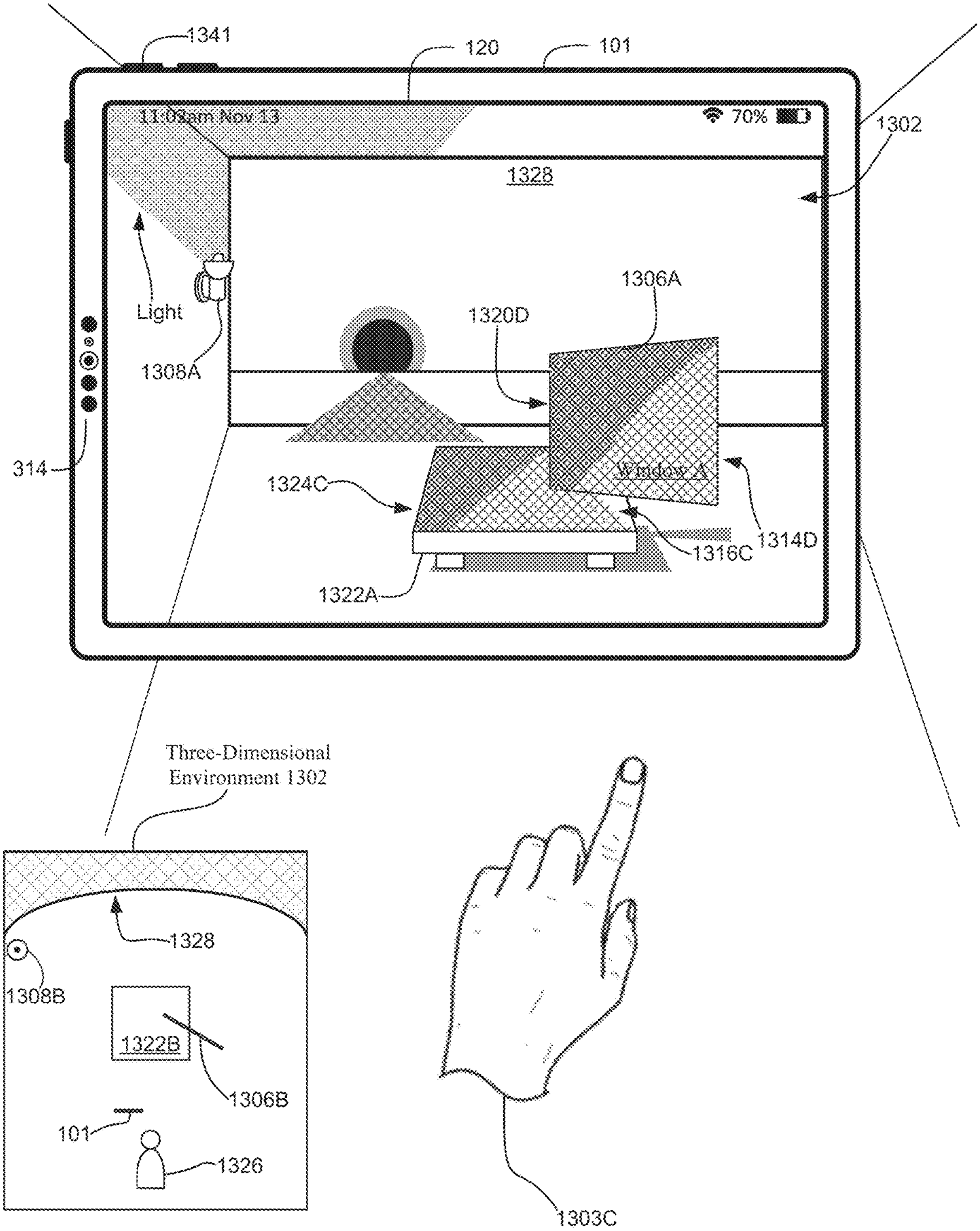

In some embodiments, as shown in FIG. 13E, in response to detecting movement of the hand 1305 in FIG. 13D (e.g., which corresponds to movement of the head of the user 1326 as discussed above), the three-dimensional environment 1302 is shifted relative to the new viewpoint of the user 1326 in accordance with the movement. For example, as shown in the overhead view in FIG. 13E, the computer system 101 is moved leftward relative to the body of the user 1326, such that the computer system 101 is shifted relative to the representation of the table 1322*b* and the virtual object 1306*b* in the three-dimensional environment 1302. Accordingly, as shown in FIG. 13E, the three-dimensional environment 1302, including the representation of the table 1322*a* and the virtual object 1306*a*, is shifted rightward from the new viewpoint of the user 1326. Additionally, in some embodiments, as shown in FIG. 13E, when the viewpoint of the user 1326 moves, the portion of the physical environment that is visible via the display generation component 120 changes in accordance with the movement of the viewpoint (e.g., a greater portion of the left side wall is visible in the three-dimensional environment 1302 relative to the new viewpoint of the user 1326).

In some embodiments, the movement of the viewpoint of the user 1326 causes one or more visual characteristics of the physical environment and/or the virtual environment 1328 to change relative to the new viewpoint of the user 1326. For example, as mentioned above, the movement of the viewpoint of the user 1326 causes the representation of the table 1322*a* and the virtual object 1306*a* to shift rightward in accordance with the movement of the viewpoint, which optionally causes the characteristics of the physical light from the light source 1308*a* and/or the virtual light from the virtual light source (e.g., the setting sun) to appear to change with respect to the representation of the table 1322*a* and/or the virtual object 1306*a* from the new viewpoint of the user 1326 (e.g., the physical light and the virtual light cast onto the virtual object 1306*a* are hitting the surface of the virtual object 1306*a* at different angles and/or magnitudes). In FIG. 13E, in response to detecting a change in the visual characteristics of the physical environment and/or the virtual environment 1328 from the new viewpoint of the user 1326, the computer system 101 optionally updates display of the lighting effects on the representation of the table 1322*a* and/or the virtual object 1306*a*. For example, as shown in FIG. 13E, the size (e.g., and/or brightness, coloration, and/or opacity) of the lighting effect from the light source 1308*a* and/or the virtual lighting effect 1316*c* from the virtual light source on the representation of the table 1322*a* are increased in a similar manner as described above, which causes the computer system 101 to also increase the size (e.g., and/or brightness, coloration, and/or opacity) of the blended lighting effect 1324*c* that is displayed on the representation of the table 1322*a* in the three-dimensional environment 1302. Additionally or alternatively, in FIG. 13E, the size (e.g., and/or brightness, coloration, and/or opacity) of the lighting effect from the light source 1308*a* and/or the virtual lighting effect 1314*d* from the virtual light source on the virtual object 1306*a* are increased in a similar manner as described above, which optionally causes the computer system 101 to also increase the size (e.g., and/or brightness, coloration, and/or opacity) of the blended lighting effect 1320*d* that is displayed on the virtual object 1306*a* in the three-dimensional environment 1302. Additional details regarding updating display of the lighting effects in response to detecting the movement of the viewpoint of the user are given below with reference to method 1400.

Figure 13F:
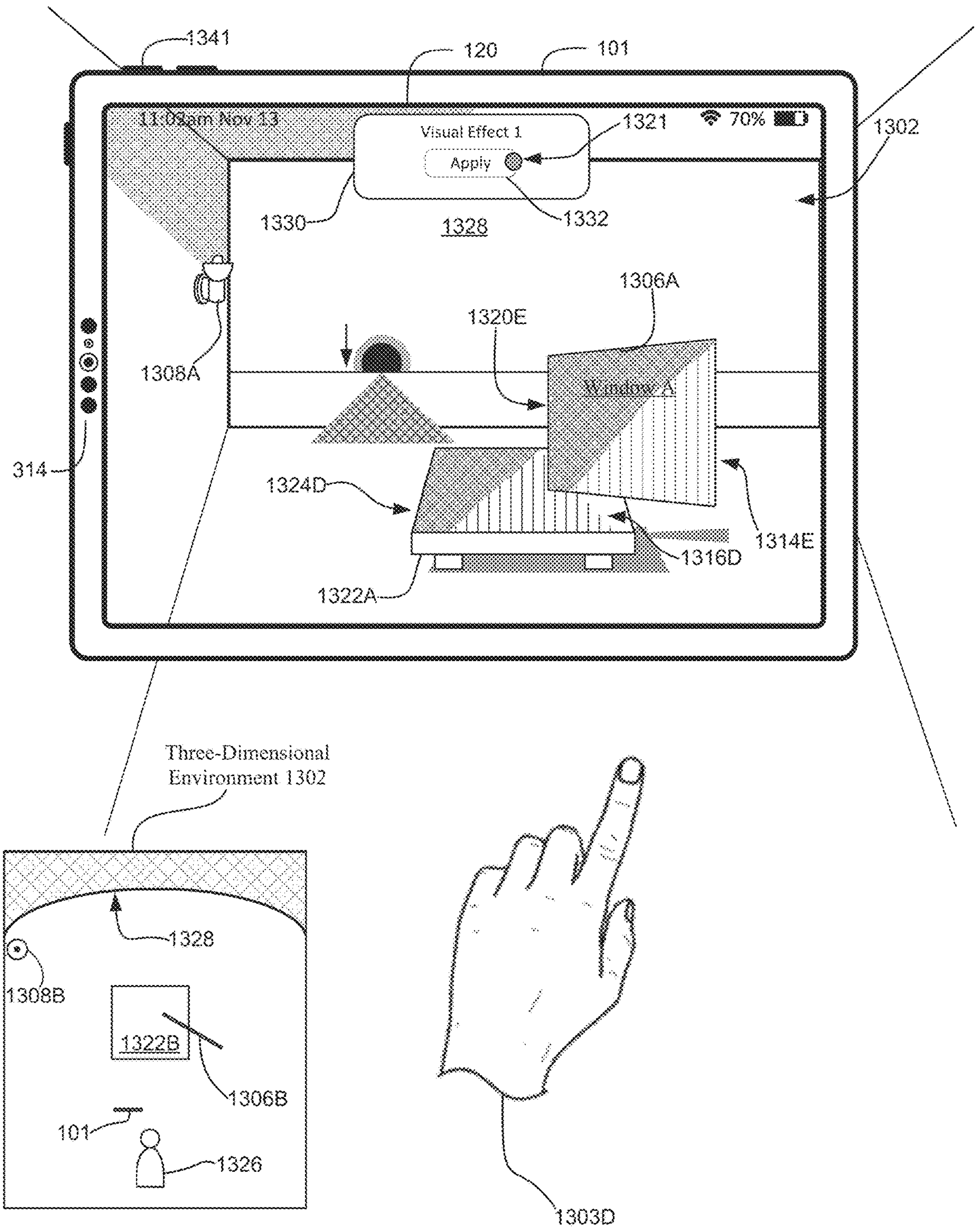

From FIGS. 13E-13F, the computer system 101 detects a change in one or more visual characteristics of the virtual environment 1328 in the three-dimensional environment 1302. For example, as shown in FIG. 13F, the computer system 101 detects a decrease in size (e.g., and/or brightness) of the virtual light source in the virtual environment 1328 (e.g., the sun has progressed in setting over the beach environment of the virtual environment 1328). In some embodiments, when the size of the virtual light source decreases in the virtual environment 1328, the virtual light that is cast into the three-dimensional environment 1302 decreases as well (e.g., decreases in amount, brightness, opacity, and/or coloration) and/or the virtual light cast onto the virtual object 1306*a* hits the surface of the virtual object 1306*a* at different angles and/or magnitudes.

In FIG. 13F, in response to detecting the change in the one or more visual characteristics of the virtual environment 1328, the computer system 101 updates display of the lighting effects on the representation of the table 1322*a* and/or the virtual object 1306*a* in the three-dimensional environment 1302. Particularly, in some embodiments, the computer system 101 updates the virtual lighting effects 1316*d* and 1314*e* that are displayed on the representation of the table 1322*a* and the virtual object 1306*a*, respectively. As shown in FIG. 13F, the computer system 101 optionally changes the size (e.g., decreases the size), brightness (e.g., decreases the brightness), and/or coloration (e.g., adjusts the coloration from an orange hue to a red hue) of the virtual lighting effect 1316*d* on the representation of the table 1322*a* based on the change in the one or more visual characteristics of the virtual environment 1328. As similarly discussed above, in some embodiments, when the computer system 101 updates display of the virtual lighting effect 1316*d* on the representation of the table 1322*a*, the computer system 101 updates display of the blended lighting effect 1324*d* based on the changes in the virtual lighting effect 1316*d* in a similar manner as discussed above. Additionally, in FIG. 13F, the computer system 101 optionally changes the size (e.g., decreases the size), brightness (e.g., decreases the brightness), and/or coloration (e.g., adjusts the coloration from an orange hue to a red hue) of the virtual lighting effect 1314*e* on the virtual object 1306*a* based on the change in the one or more visual characteristics of the virtual environment 1328. In some embodiments, when the computer system 101 updates display of the virtual lighting effect 1314*e* on the virtual object 1306*a*, the computer system 101 updates display of the blended lighting effect 1320*e* based on the changes in the virtual lighting effect 1314*e* in a similar manner as discussed above.

Similarly, in some embodiments, the computer system 101 updates display of the lighting effects on the representation of the table 1322*a* and/or the virtual object 1306*a* in the three-dimensional environment 1302 in response to detecting a change in one or more visual characteristics of the physical environment that is visible in the three-dimensional environment 1302. For example, in FIG. 13F, if the computer system 101 alternatively detects a change in the light source 1308*a* of the physical environment (e.g., an increase or decrease in the amount of light emitted by the light source 1308*a*), the computer system 101 would alternatively update display of the lighting effects that are based on the visual characteristics of the physical environment based on the change in the light source 1308*a*. Additionally, as similarly discussed above, in some embodiments, when the computer system 101 updates display of the lighting effects (e.g., 1312*b* and/or 1310*b* in FIG. 13B) that are based on the visual characteristics of the physical environment, the computer system 101 would update display of the blended lighting effects 1324*d* and/or 1320*e* based on the changes in the lighting effects that are based on the visual characteristics of the physical environment in a similar manner as discussed above.

In FIG. 13F, the computer system 101 detects an input corresponding to a request to apply a visual effect to one or more portions of the three-dimensional environment 1302. For example, as shown in FIG. 13F, the three-dimensional environment 1302 includes user interface object 1330 that is associated with a first visual effect ("Visual Effect 1"). In some embodiments, the user interface object 1330 includes selectable option 1332 that is selectable to cause the computer system 101 to apply the first visual effect to the portions of the three-dimensional environment 1302 that include the physical environment surrounding the display generation component 120. As shown in FIG. 13F, the input includes a selection input directed to the selectable option 1332 in the user interface object 1330. For example, in FIG. 13F, the computer system 101 detects an air pinch gesture provided by the hand 1303*d* while the attention (e.g., including the gaze 1321) of the user is directed toward the selectable option 1332 in the three-dimensional environment 1302.

FIG. 13F1 illustrates similar and/or the same concepts as those shown in FIG. 13F (with many of the same reference numbers). It is understood that unless indicated below, elements shown in FIG. 13F1 that have the same reference numbers as elements shown in FIGS. 13A-13G have one or more or all of the same characteristics. FIG. 13F1 includes computer system 101, which includes (or is the same as) display generation component 120. In some embodiments, computer system 101 and display generation component 120 have one or more of the characteristics of computer system 101 shown in FIGS. 13F and 13A-13G and display generation component 120 shown in FIGS. 1 and 3, respectively, and in some embodiments, computer system 101 and display generation component 120 shown in FIGS. 13A-13G have one or more of the characteristics of computer system 101 and display generation component 120 shown in FIG. 13F1.

In FIG. 13F1, display generation component 120 includes one or more internal image sensors 314*a* oriented towards the face of the user (e.g., eye tracking cameras 540 described with reference to FIG. 5). In some embodiments, internal image sensors 314*a* are used for eye tracking (e.g., detecting a gaze of the user). Internal image sensors 314*a* are optionally arranged on the left and right portions of display generation component 120 to enable eye tracking of the user's left and right eyes. Display generation component 120 also includes external image sensors 314*b* and 314*c* facing outwards from the user to detect and/or capture the physical environment and/or movements of the user's hands. In some embodiments, image sensors 314*a*, 314*b*, and 314*c* have one or more of the characteristics of image sensors 314 described with reference to FIGS. 13A-13G.

In FIG. 13F1, display generation component 120 is illustrated as displaying content that optionally corresponds to the content that is described as being displayed and/or visible via display generation component 120 with reference to FIGS. 13A-13G. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 13F1.

Display generation component 120 has a field of view (e.g., a field of view captured by external image sensors 314*b* and 314*c* and/or visible to the user via display generation component 120, indicated by dashed lines in the overhead view) that corresponds to the content shown in FIG. 13F1. Because display generation component 120 is optionally a head-mounted device, the field of view of display generation component 120 is optionally the same as or similar to the field of view of the user.

In FIG. 13F1, the user is depicted as performing an air pinch gesture (e.g., with hand 1303D) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 13A-13G.

In some embodiments, computer system 101 responds to user inputs as described with reference to FIGS. 13A-13G.

In the example of FIG. 13F1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 13A-13G and/or described with reference to the corresponding method(s) are optionally implemented on computer system 101 and display generation unit 120 in a manner similar or analogous to that shown in FIG. 13F1.

Figure 13G:
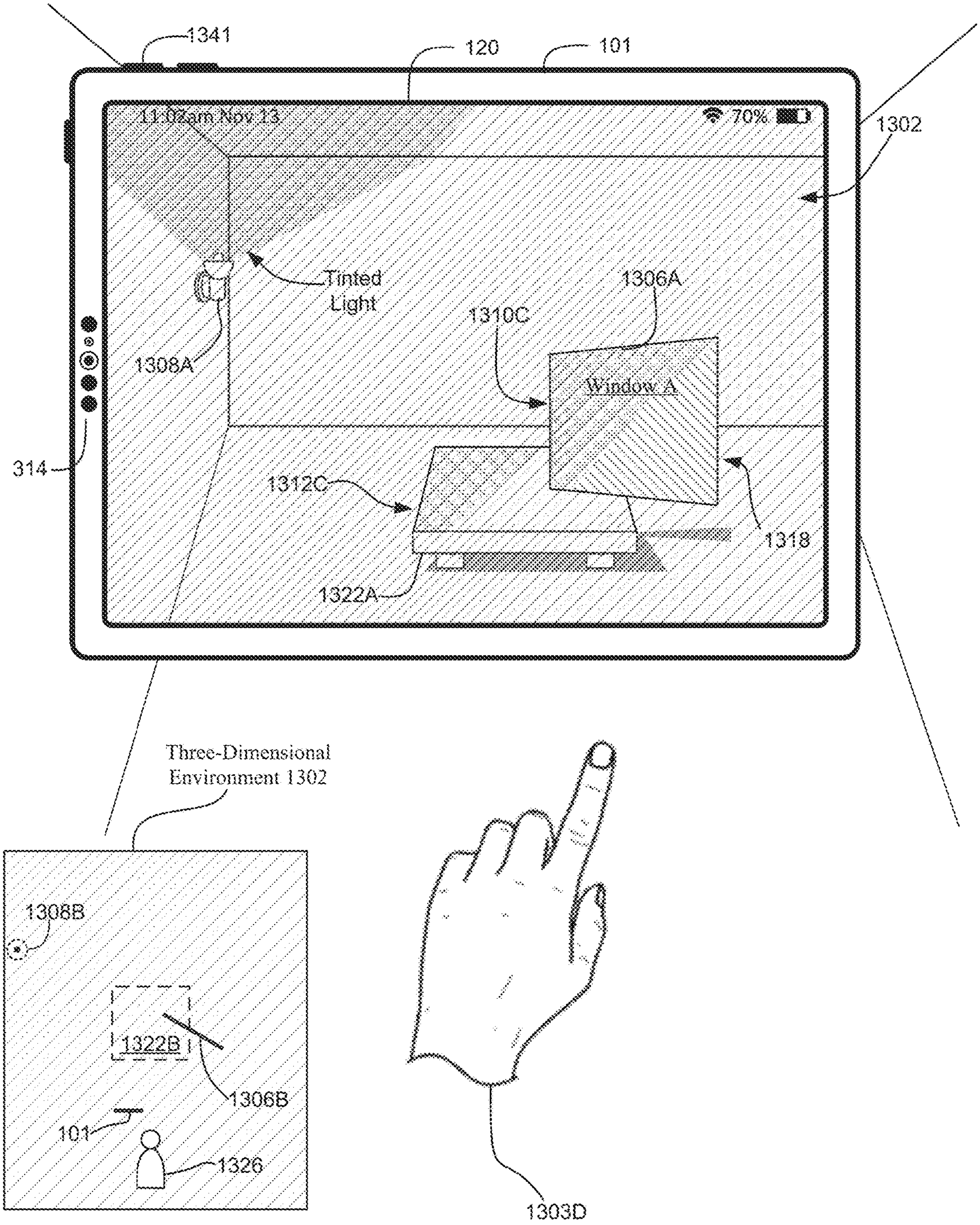
Figure 14A:
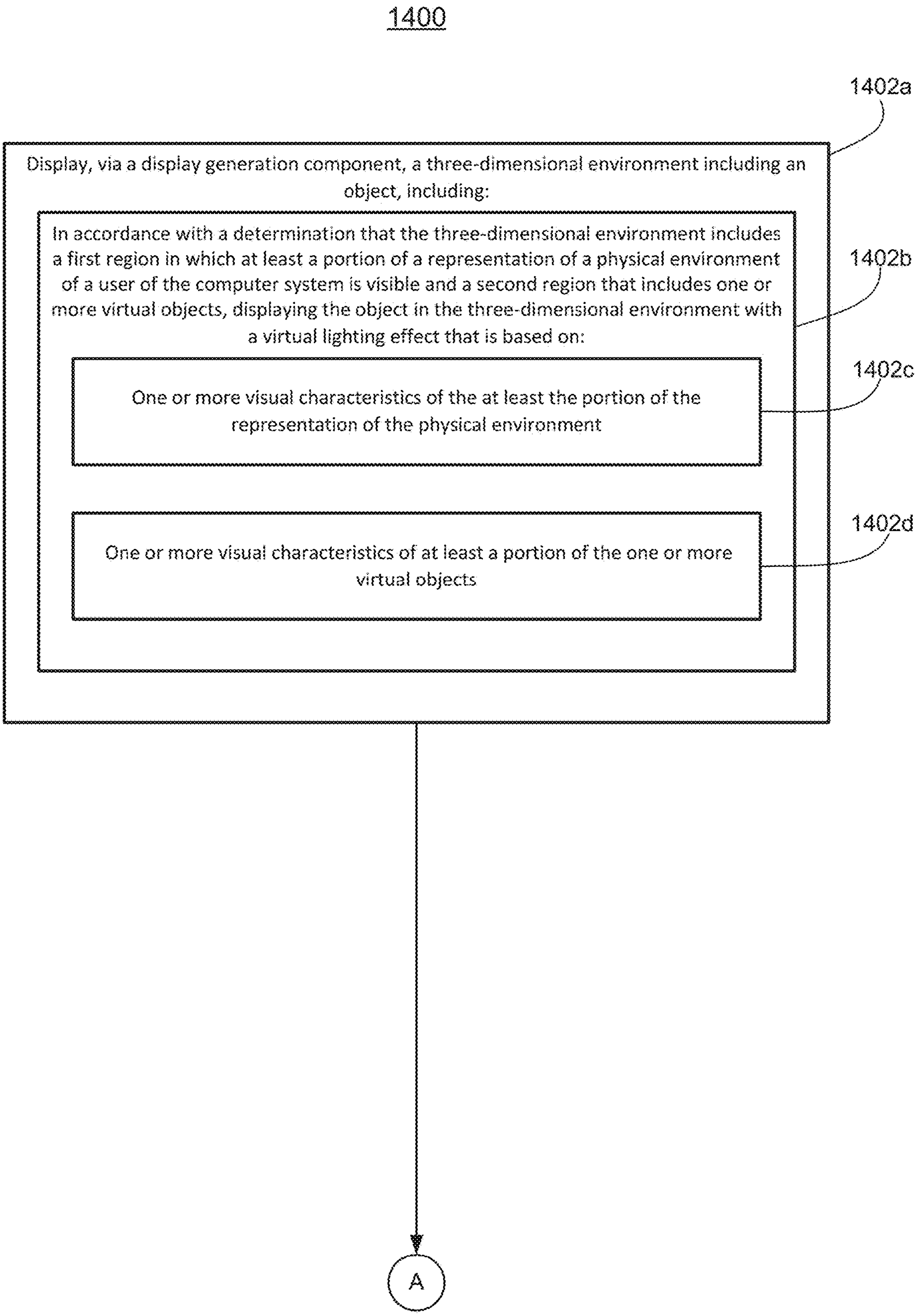
FIGS. 14A-14J is a flowchart illustrating a method of facilitating light blending techniques for one or more objects in a three-dimensional environment in accordance with some embodiments.
Figure 14B:
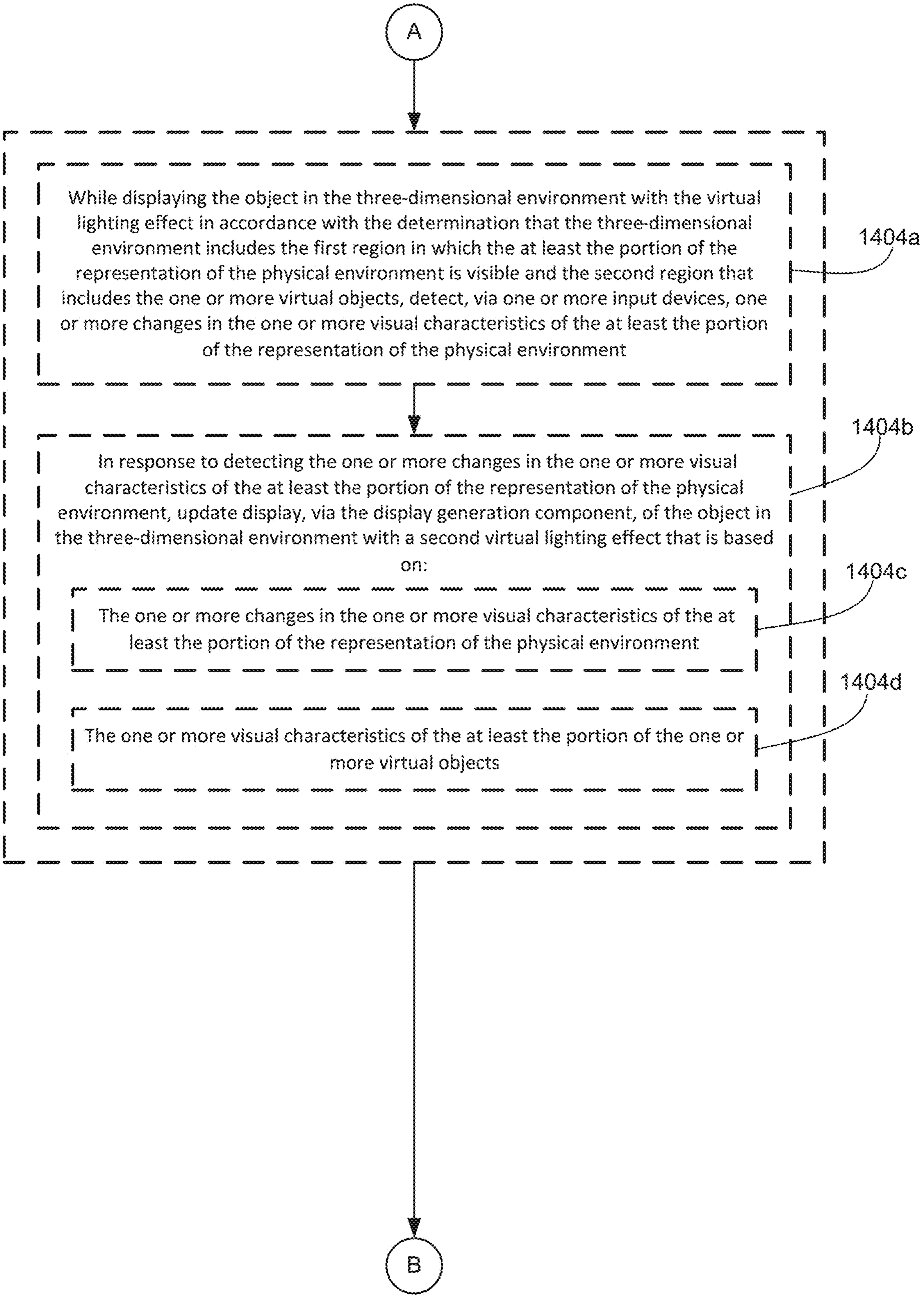
Figure 14C:
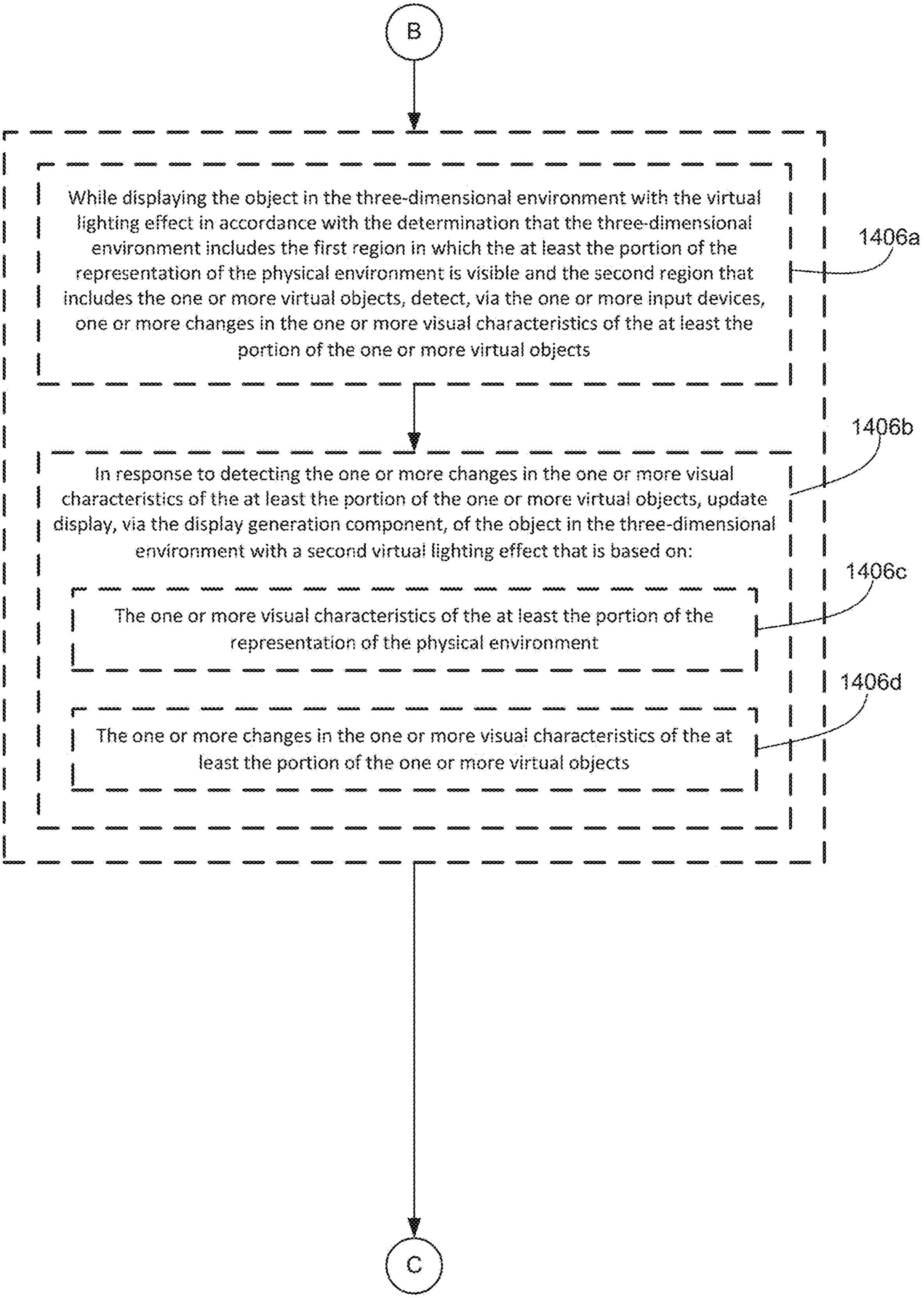
Figure 14D:
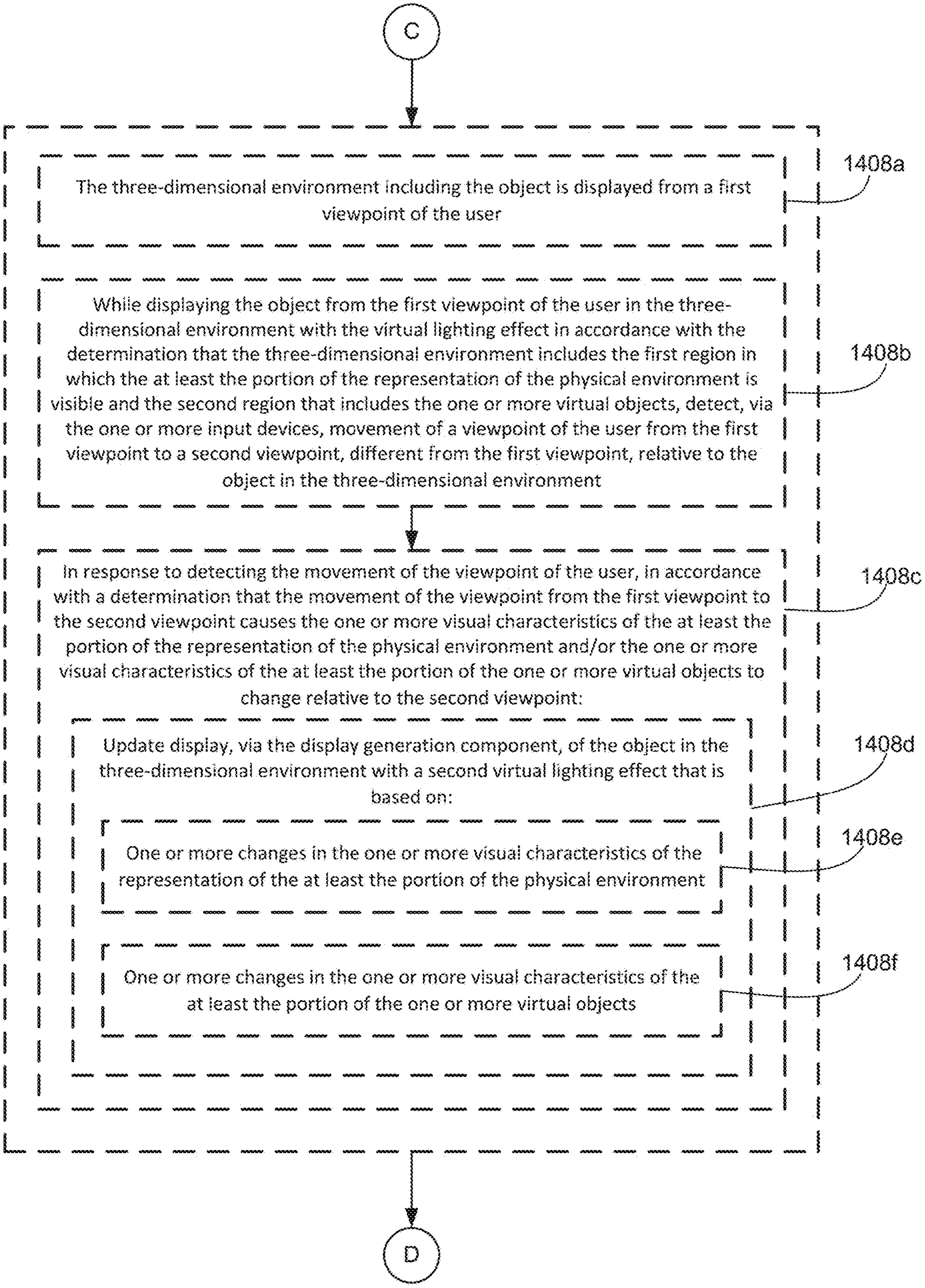
Figure 14E:
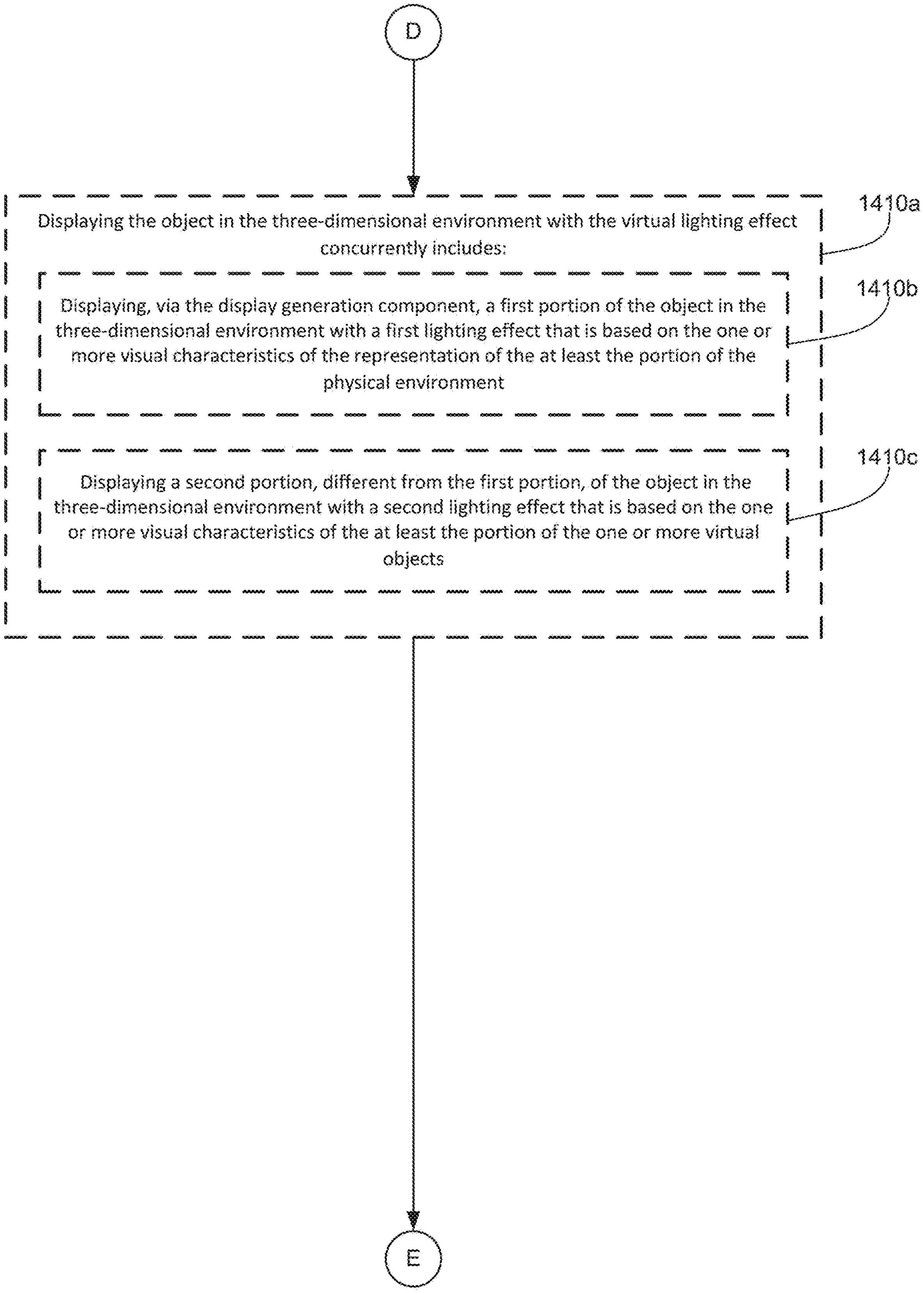
Figure 14F:
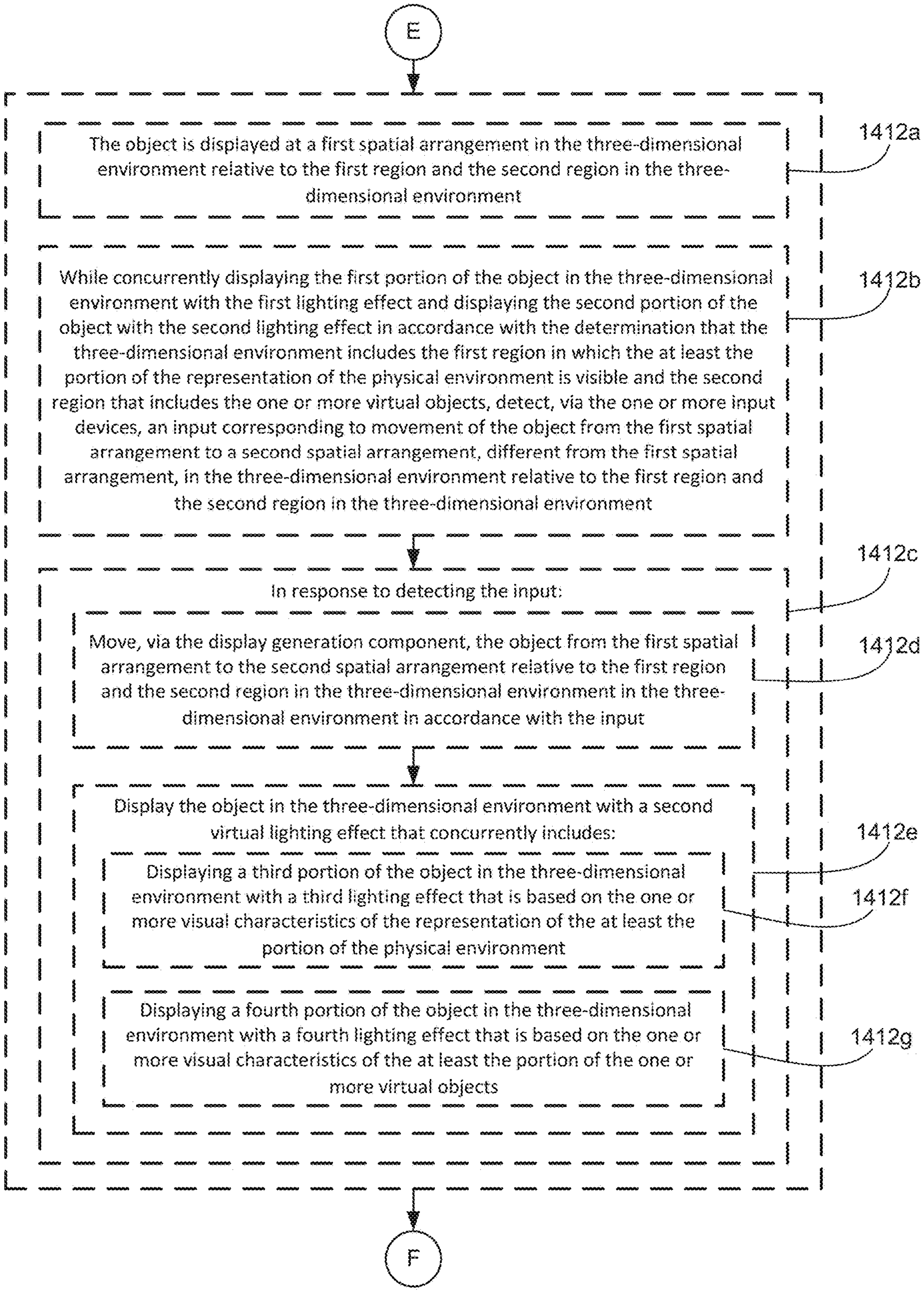
Figure 14G:
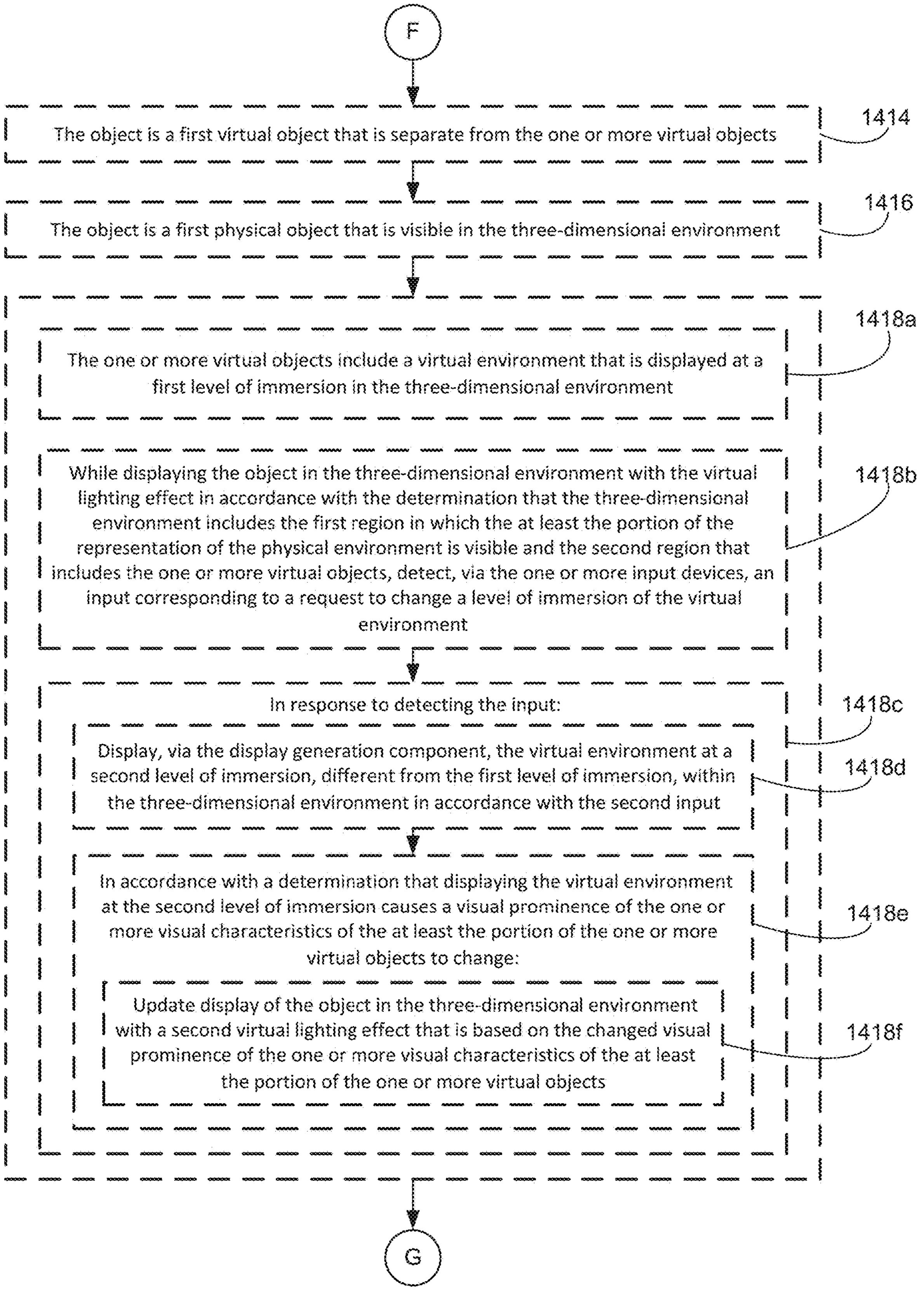
Figure 14H:
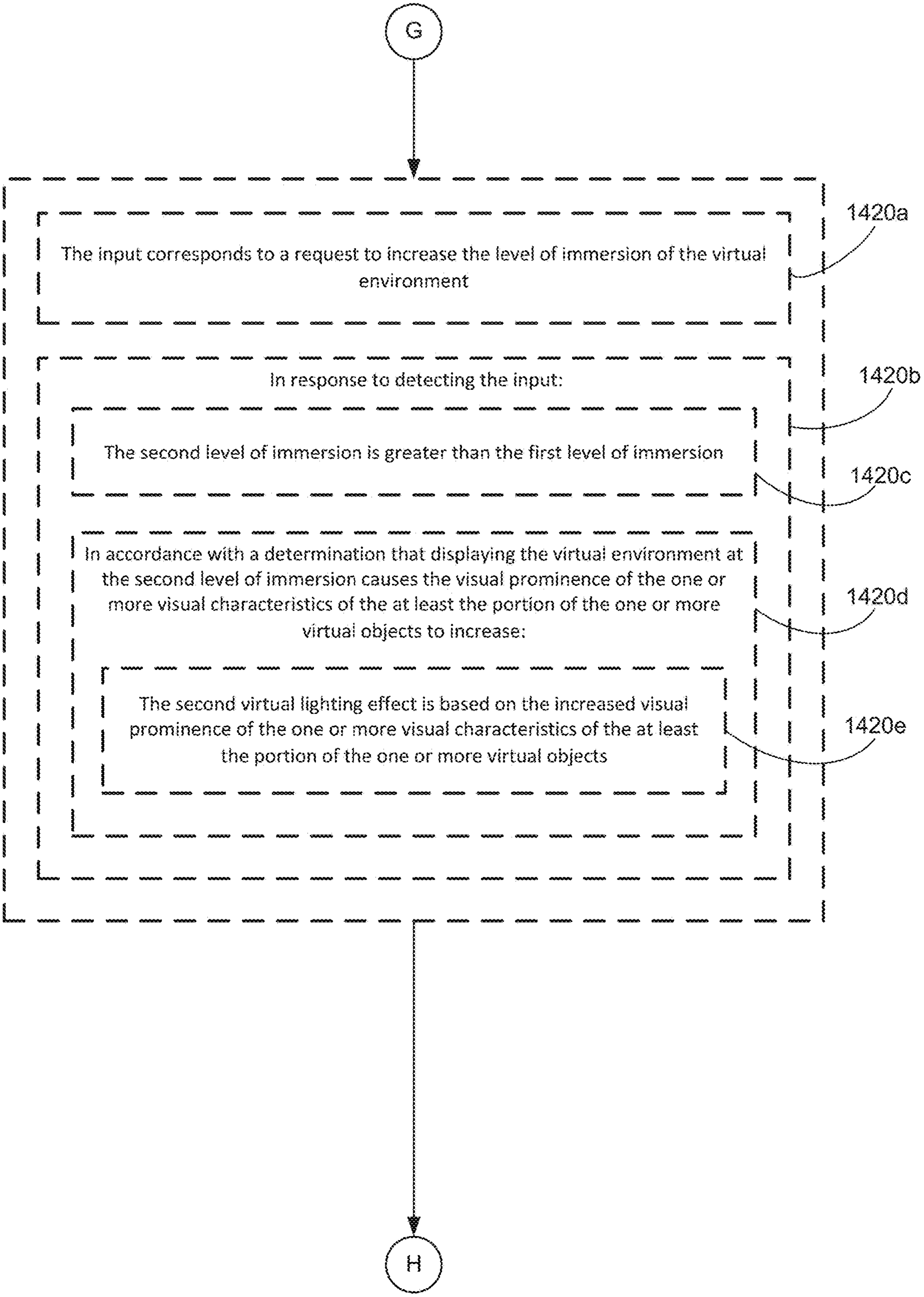
Figure 14I:
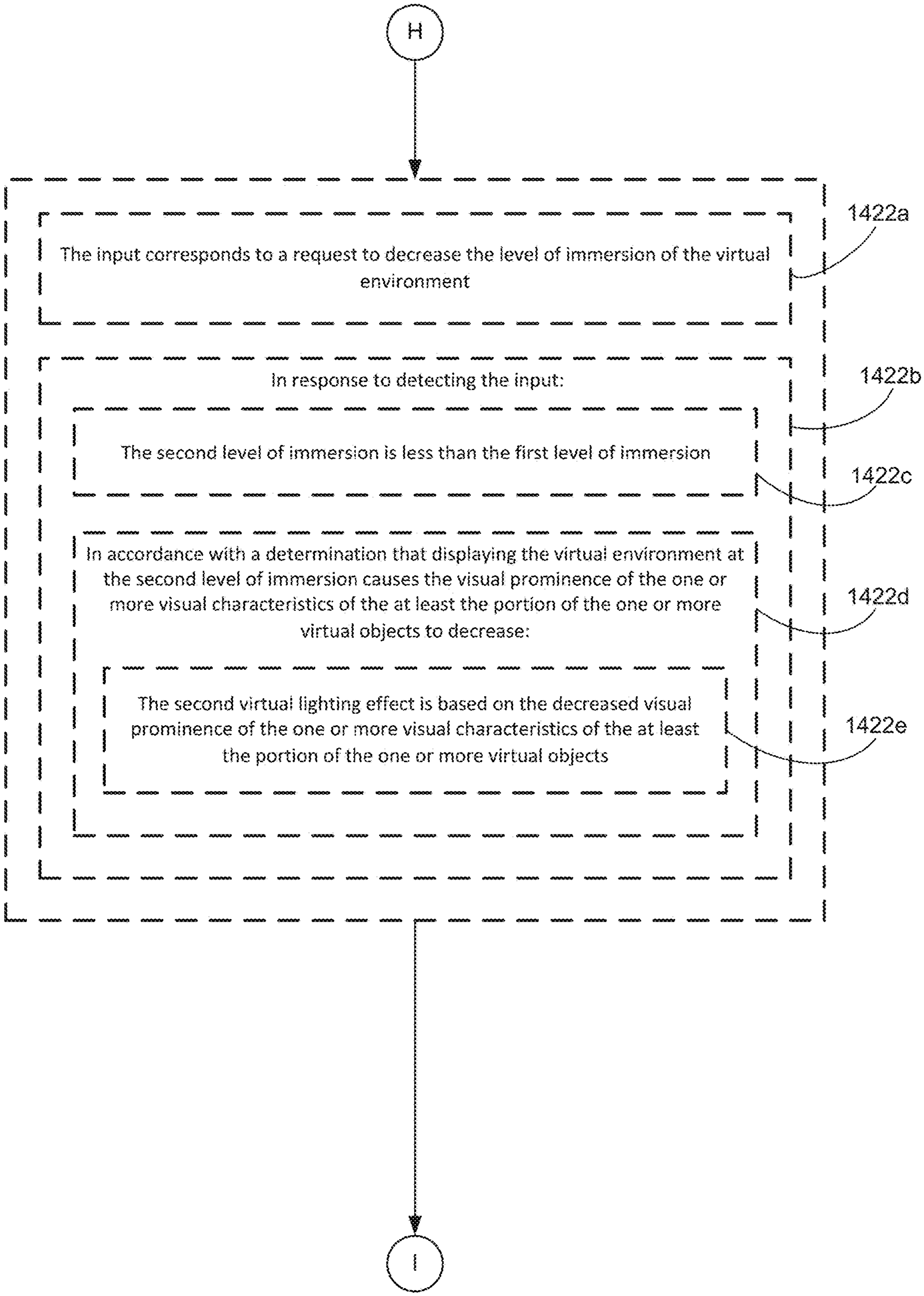
Figure 14J:
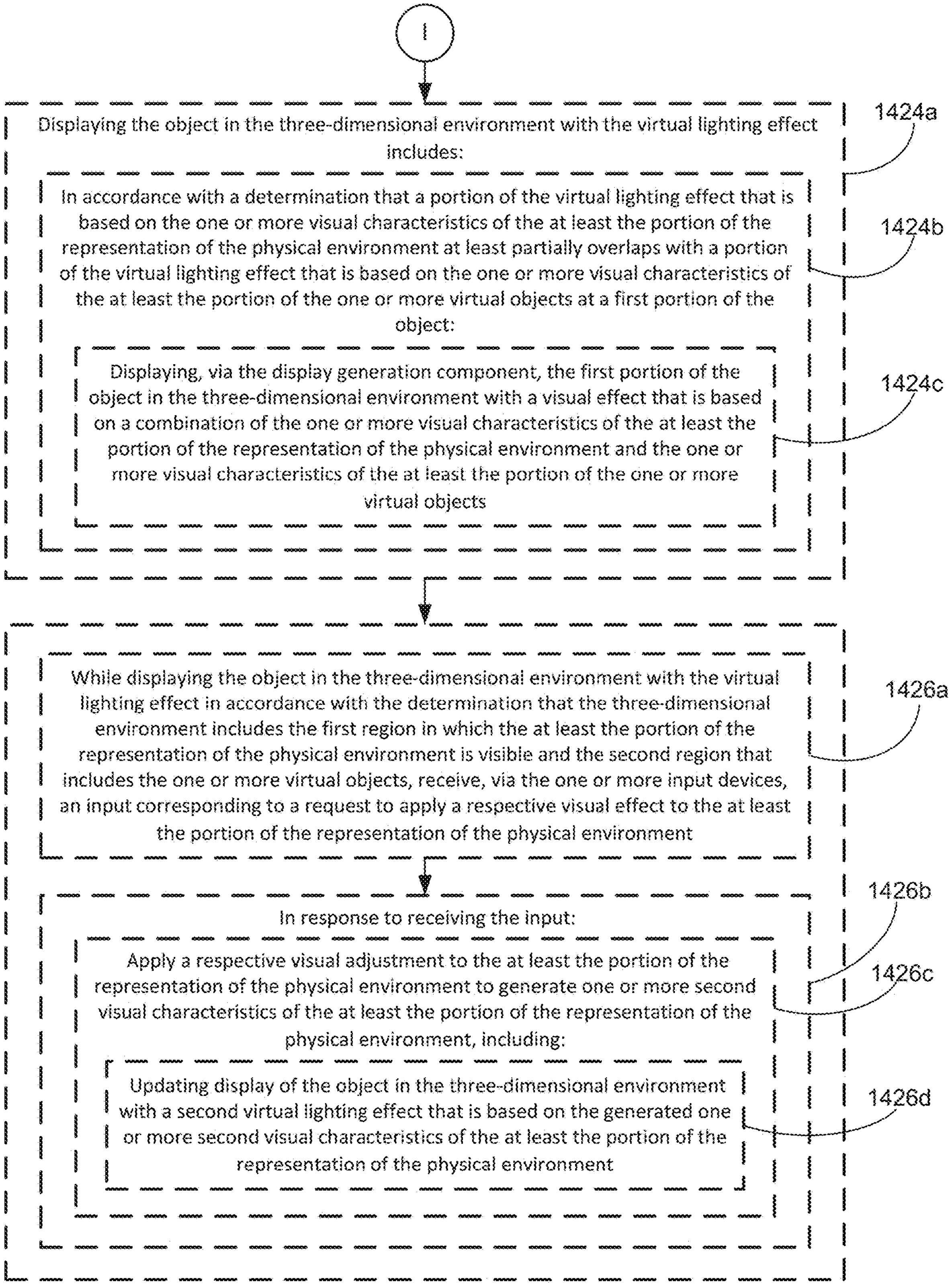

In some embodiments, as shown in FIG. 13G, in response to detecting the selection of the selectable option 1332 provided by the hand 1303*d*, the computer system 101 applies the first visual effect to the physical environment included in the three-dimensional environment 1302, as shown in the overhead view. For example, as shown in FIG. 13G, computer system 101 applies the first visual effect to the representations of the walls, floor, and ceiling, the representation of the light source 1308*a*, and the representation of the table 1322*a*. In some embodiments, applying the first visual effect includes applying a tint (e.g., of a respective color) to the physical environment included in the three-dimensional environment 1302. In some embodiments, applying the first visual effect includes displaying an atmospheric environment and/or effect in the three-dimensional environment 1302 that causes a tint (or other visual effect) to be applied to the physical environment included in the three-dimensional environment 1302. In some embodiments, the first visual effect is applied to the virtual object 1306*a* as well, as indicated by tinting effect 1318 in FIG. 13G. Additional details regarding applying a visual effect to one or more portions of the three-dimensional environment are provided with reference to methods 1000, 1400, and/or 1800.

In some embodiments, as shown in FIG. 13G, when the computer system 101 applies the first visual effect to the portions of the three-dimensional environment 1302 that include the physical environment, the computer system 101 ceases display of the virtual environment 1328 in the three-dimensional environment 1302. In some embodiments, because the virtual environment 1328 is no longer displayed in the three-dimensional environment 1302 in FIG. 13G, the computer system 101 ceases display of the virtual lighting effects (e.g., 1316*d* and 1314*e* in FIG. 13F) on the representation of the table 1322*a* and the virtual object 1306*a*. Further, in FIG. 13G, because the virtual lighting effects that are based on the visual characteristics of the virtual environment 1328 are no longer displayed, the computer system 101 ceases display of the blended lighting effects (e.g., 1324*d* and 1320*e* in FIG. 13F) on the representation of the table 1322*a* and the virtual object 1306*a* in the three-dimensional environment 1302. For example, as shown in FIG. 13G, the representation of the table 1322*a* is displayed with the lighting effect 1312*c* that is based on the visual characteristics of the physical environment and the virtual object 1306*a* is displayed with the lighting effect 1310*c* that is based on the visual characteristics of the physical environment in the three-dimensional environment 1302, as discussed below.

In some embodiments, when the computer system 101 applies the first visual effect to the portions of the three-dimensional environment 1302 that include the physical environment, the computer system 101 updates display of the lighting effects 1312*c* and 1310*c* based on the applied first visual effect. For example, as indicated in FIG. 13G, applying the first visual effect to the portions of the three-dimensional environment 1302 that include the physical environment causes the light emitted by the light source 1308*a* to become visually tinted ("Tinted Light") in the three-dimensional environment 1302. In some embodiments, the lighting effect 1312*c* that is displayed on the representation of the table 1322*a* and the lighting effect 1310*c* that is displayed on the virtual object 1306*a* are based on the tinted visual characteristics of the physical environment in the three-dimensional environment 1302. For example, the brightness, coloration, and/or opacity of the lighting effects 1312*c* and 1310*c* are based on the tint applied to the light emitted by the representation of the light source 1308*a* in the three-dimensional environment 1302.

FIGS. 14A-14J is a flowchart illustrating a method 1400 of facilitating light blending techniques for one or more objects in a three-dimensional environment in accordance with some embodiments. In some embodiments, the method 1400 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 1400 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1400 are, optionally, combined and/or the order of some operations is, optionally, changed.

In some embodiments, method 1400 is performed at a computer system (e.g., 101) in communication with a display generation component (e.g., 120) and one or more input devices (e.g., 314). For example, the computer system optionally has one or more of the characteristics of the computer systems of methods 800, 1000, 1200, 1600, 1800, and/or 2000. In some embodiments, the display generation component has one or more of the characteristics of the display generation components of methods 800, 1000, 1200, 1600, 1800, and/or 2000. In some embodiments, the one or more input devices have one or more of the characteristics of the one or more input devices described with reference to methods 800, 1000, 1200, 1600, 1800, and/or 2000.

In some embodiments, the computer system displays (1402*a*), via the display generation component, a three-dimensional environment including an object, such as virtual object 1306*a* or table 1312*a* in three-dimensional environment 1302 in FIG. 13A. In some embodiments, the three-dimensional environment has one or more characteristics of the environments described with reference to methods 800, 1000, 1200, 1600, 1800, and/or 2000. In some embodiments, the object is a virtual object generated by the computer system and/or is or includes content, such as a window of a web browsing application displaying content (e.g., text, images, or video), a window displaying a photograph or video clip, a media player window for controlling playback of content items on the computer system, a contact card in a contacts application displaying contact information (e.g., phone number email address, and/or birthday) and/or a virtual boardgame of a gaming application. In some embodiments, the virtual object has an at least partially reflective surface. For example, the computer system displays the top, side, and/or bottom surfaces of the virtual object with a simulated coating that reflects light from the three-dimensional environment surrounding (e.g., above and/or behind) the virtual object. In some embodiments, the object is displayed at a first location in the three-dimensional environment that is in the field of view of a user of the computer system from a current viewpoint of the user of the three-dimensional environment. In some embodiments, the object is a physical (e.g., real-world) object located in a physical environment surrounding the display generation component and/or the computer system, such as a table, chair, desk, lamp, sofa, bookcase, or shelf that is in the physical environment. In some embodiments, the physical environment is visible through a transparent portion of the display generation component (e.g., true or real passthrough). In some embodiments, a representation of the physical environment, including a representation of the object, is displayed in the three-dimensional environment via the display generation component (e.g., virtual or video passthrough).

In some embodiments, displaying the three-dimensional environment includes, in accordance with a determination that the three-dimensional environment includes a first region in which at least a portion of a representation of a physical environment of a user of the computer system is visible (e.g., the physical environment visible in the three-dimensional environment 1302 in FIG. 13B) and a second region that includes one or more virtual objects (e.g., within a virtual environment), such as virtual environment 1328 in FIG. 13B, displaying the object in the three-dimensional environment with a virtual lighting effect (1402*b*), such as virtual lighting effects 1324*a* and 1316*a* and/or 1320*a* and 1314*a* as shown in FIG. 13B. For example, the three-dimensional environment concurrently includes a portion of the physical environment surrounding the display generation component and a portion of a virtual environment. In some embodiments, the one or more virtual objects include portions of a virtual environment displayed in the three-dimensional environment. For example, the one or more virtual objects include virtual wildlife (e.g., plant life and/or animal life), portions of a virtual outdoor location (e.g., portions of a virtual beach, lake or riverbed, dessert, field, mountain range, and/or forest), and/or portions of a virtual indoor location (e.g., virtual furniture, virtual ceilings, floor, and/or walls, virtual windows and/or doors, and/or virtual auditorium or theater). In some embodiments, the one or more virtual objects are separate (e.g., and/or different) from the object in the three-dimensional environment. In some embodiments, the one or more virtual objects correspond to the virtual environment (or virtual environments) itself (or themselves). In some embodiments, the virtual environment has one or more characteristics of the environments described with reference to methods 800, 1000, 1200, 1600, 1800, and/or 2000. In some embodiments, the object is displayed in the first region in which at least the portion of the physical environment is visible. For example, the object is displayed and/or is located in the portion of the physical environment occupying the first region of the three-dimensional environment. In some embodiments, the object is displayed in the second region that includes the virtual environment. For example, the object is displayed and/or is located in the portion of the virtual environment (e.g., with the one or more virtual objects) occupying the second region of the three-dimensional environment. In some embodiments, the object is displayed at a respective location that includes at least a portion of the first region and at least a portion of the second region (e.g., a location at an intersection between the first region and the second region, or at a boundary between the first region and the second region).

In some embodiments, the virtual lighting effect is based one or more visual characteristics of the at least the portion of the representation of the physical environment (1402*c*) (e.g., a first lighting effect portion or component that is based on one or more visual characteristics of the at least the portion of the physical environment), such as light produced by physical light source 1308*a* in FIG. 13B. For example, while displaying the object in the three-dimensional environment, the computer system displays the object with the virtual lighting effect that is based on (e.g., includes and/or incorporates) a first lighting effect that is based on one or more visual characteristics of the physical environment in the first region of the three-dimensional environment. In some embodiments, the first lighting effect includes properties of brightness, coloration, saturation, and/or darkness. In some embodiments, the one or more visual characteristics of the physical environment are characterized by one or more physical objects (e.g., lamps, ceiling, walls, fans, overhead lights, tables, chairs, and/or other furniture) in the physical environment (e.g., separate from the object). For example, the one or more visual characteristics include lighting originating from, enveloped over, and/or reflected off the one or more physical objects in the physical environment, shadows produced by the one or more physical objects in the physical environment, and/or natural lighting present in the physical environment (e.g., present in and/or entering the physical environment via windows, doors, and/or skylights). In some embodiments, if the object is a virtual object in the three-dimensional environment, the first lighting effect is selected automatically by the computer system for display with the object based on the one or more visual characteristics discussed above. For example, the brightness, coloration, saturation, and/or darkness of the first lighting effect is determined by the computer system based on the light produced by and/or reflected off the one or more physical objects, shadows produced by the one or more physical objects, and/or natural light in the physical environment. In some embodiments, the computer system detects (e.g., via one or more sensors, such as image sensors, infrared sensors, temperature sensors, and/or light sensors) the one or more visual characteristics of the physical environment and virtually replicates the one or more visual characteristics to generate the first lighting effect that is displayed with the object. In some embodiments, the first lighting effect displayed with the object in the three-dimensional environment is selected by the computer system such that the one or more visual characteristics of the physical environment perceptually affect a visual appearance of the object in the three-dimensional environment as if the object were a physical object in the physical environment rather than a virtual object. In some embodiments, if the object is a physical object that is visible in the three-dimensional environment, the first lighting effect is naturally displayed with the object based on the one or more visual characteristics discussed above. For example, the brightness, coloration, saturation, and/or darkness of the first lighting effect that is visible with the object in the three-dimensional environment is actually influenced by the one or more visual characteristics of the physical environment, rather than being selected by the computer system (e.g., because the object is a physical object, rather than a virtual object). As discussed below, the first lighting effect is optionally displayed with one or more first portions of the object (e.g., based on a location of the physical environment relative to the object in the three-dimensional environment).

In some embodiments, the virtual lighting effect is based on one or more visual characteristics of at least a portion of the one or more virtual objects (1402*d*) (e.g., a second lighting effect portion or component that is based on one or more visual characteristics of the at least the portion of the one or more virtual objects), such as virtual characteristics of the virtual environment 1328 in FIG. 13B. For example, while displaying the object in the three-dimensional environment, the computer system displays the object with the virtual lighting effect that is based on (e.g., includes and/or incorporates) a second lighting effect (optionally different and/or independent from the first lighting effect discussed above) that is based on one or more visual characteristics of the one or more virtual objects of the virtual environment in the second region of the three-dimensional environment. In some embodiments, the second lighting effect includes properties of brightness, coloration, saturation, and/or darkness. In some embodiments, the one or more visual characteristics of the virtual environment are characterized by the one or more virtual objects (e.g., virtual light sources, such as a virtual sun or sky, virtual lamps, or virtual overhead lights) or background portions of the virtual environment (e.g., virtual water (e.g., sea, lake, river, ocean, and/or stream), virtual sand or grass, virtual hills and/or mountains, and/or other virtual scenery in the virtual environment (e.g., separate from the object)). For example, the one or more visual characteristics include lighting originating from, enveloped over, and/or reflected off the one or more virtual objects and/or virtual scenery in the virtual environment, shadows produced by the one or more virtual objects and/or virtual scenery (e.g., by virtual clouds) in the virtual environment, and/or virtual natural lighting present in the virtual environment (e.g., present in and/or entering the virtual environment via a virtual sun and/or sky). In some embodiments, the second lighting effect is selected automatically by the computer system for display with the object based on the one or more visual characteristics discussed above irrespective of whether the object is a virtual object or a physical object in the three-dimensional environment. For example, the brightness, coloration, saturation, and/or darkness of the second lighting effect is determined by the computer system based on the virtual light produced by and/or reflected off the one or more virtual objects and/or the virtual scenery of the virtual environment, virtual shadows produced by the one or more virtual objects and/or the virtual scenery of the virtual environment, and/or virtual natural light in the virtual environment, such that the one or more visual characteristics of the virtual environment perceptually affect the visual appearance of the object in the three-dimensional environment in a same or similar way that those of a physical environment would affect the visual appearance of a physical object (e.g., shadows from a cloud cast onto a bench). In some embodiments, displaying the object with the virtual lighting effect includes concurrently displaying the object with the first lighting effect and the second lighting effect discussed above in the three-dimensional environment. For example, the first lighting effect (e.g., the one or more visual characteristics of the physical environment) is displayed on/over one or more first portions of the object and the second lighting effect (e.g., the one or more visual characteristics of the one or more virtual objects) is separately displayed on/over one or more second portions (optionally different from the one or more first portions) of the object in the three-dimensional environment. In some embodiments, the one or more first portions of the object with which the first lighting effect is displayed is based on a location of the first region relative to the object, and the one or more second portions of the object with which the second lighting effect is displayed is based on a location of the second region relative to the object. For example, if the first region occupies a left half of the three-dimensional environment from the viewpoint of the user, (e.g., at least) a left half of the object would be displayed with the first lighting effect. Similarly, if the second region occupies a right half of the three-dimensional environment from the viewpoint of the user, (e.g., at least) a right half of the object would be displayed with the second lighting effect. In some embodiments, the virtual lighting effect is a blending of the one or more visual characteristics of the physical environment and the one or more visual characteristics of the one or more virtual objects. For example, the computer system displays the object with a single lighting effect that accounts for the visual characteristics of both the physical environment and the virtual environment as discussed above, rather than necessarily displaying the object with separate lighting effects (e.g., the first lighting effect and the second lighting effect discussed above). In some embodiments, displaying the object with the virtual lighting effect that includes the first lighting effect and the second lighting effect discussed above in the three-dimensional environment also includes displaying the object with a third lighting effect that is a combination of (e.g., a blending between) the first lighting effect and the second lighting effect. For example, if the first region and the second region of the three-dimensional environment are both located above the object from the viewpoint of the user, at least a portion of the object (e.g., a top edge/side of the object at which the first region and the second region overlap/intersect) would be displayed with a lighting effect that is based on both (e.g., is a blending of) the visual characteristics of the physical environment and the visual characteristics of the one or more virtual objects in the virtual environment. In some embodiments, in accordance with a determination that the three-dimensional environment does not include the first region in which the at least the portion of the physical environment of the user of the computer system is visible and the second region that includes the one or more virtual objects, the computer system forgoes concurrently displaying the virtual object with the first lighting effect and the second lighting effect. Concurrently displaying an object in a three-dimensional environment with a first lighting effect that is based on visual characteristics of a physical environment in a first region of the three-dimensional environment and a second lighting effect that is based on visual characteristics of a virtual environment in a second region of the three-dimensional environment improves visibility of the object in the three-dimensional environment, and/or provides visual feedback of the relative placement of the object in the three-dimensional environment, thereby reducing errors in movement of the object within the three-dimensional environment, which improves user-device interaction.

In some embodiments, while displaying the object in the three-dimensional environment with the virtual lighting effect in accordance with the determination that the three-dimensional environment includes the first region in which the at least the portion of the representation of the physical environment is visible and the second region that includes the one or more virtual objects, the computer system detects (1404*a*), via the one or more input devices, one or more changes in the one or more visual characteristics of the at least the portion of the representation of the physical environment, such as a dimming of the physical light source 1308*a* that is shown in FIG. 13A. For example, the computer system detects (e.g., via sensors, such as image sensors and/or infrared sensors in communication with the computer system) a change in a visual prominence or other change of the one or more visual characteristics of the physical environment described above with reference to step 1402. Particularly, in some embodiments, the computer system detects an increase or decrease in lighting originating from, enveloped over, and/or reflected off the one or more physical objects in the physical environment, shadows produced by the one or more physical objects in the physical environment, and/or natural lighting present in the physical environment (e.g., present in and/or entering the physical environment via windows, doors, and/or skylights). In some embodiments, the one or more changes in the one or more virtual characteristics of the at least the portion of the representation of the physical environment include one or more changes in a configuration of the physical environment. For example, the computer system detects a change in one or more objects/persons in the physical environment, such as a new object (e.g., pet, machine, robot, and/or other object) or another user enter the portion of the physical environment that is visible in the three-dimensional environment, which causes the one or more visual characteristics of the physical environment to change as similarly described above.

In some embodiments, in response to detecting the one or more changes in the one or more visual characteristics of the at least the portion of the representation of the physical environment, the computer system updates (1404*b*) display, via the display generation component, of the object in the three-dimensional environment with a second virtual lighting effect (e.g., different from the virtual lighting effect described above with reference to step 1402) that is based on the one or more changes in the one or more visual characteristics of the at least the portion of the representation of the physical environment (1404*c*), such as the virtual lighting effect 1312*b* in FIG. 13B. For example, the computer system updates display of the object in the three-dimensional-environment with the second virtual lighting effect that reflects the changes discussed above. In some embodiments, if the object is a virtual object in the three-dimensional environment, the portion of the second virtual lighting effect that is based on the visual characteristics of the physical environment is selected automatically by the computer system for display with the object based on the changes in the one or more visual characteristics discussed above. For example, the brightness, coloration, saturation, and/or darkness of the second virtual lighting effect is determined by the computer system based on changes in the light produced by and/or reflected off the one or more physical objects, shadows produced by the one or more physical objects, and/or natural light in the physical environment. In some embodiments, if the object is a physical object that is visible in the three-dimensional environment, the portion of the second virtual lighting effect that is based on the visual characteristics of the physical environment is naturally updated on the object based on the changes one or more visual characteristics discussed above. For example, the brightness, coloration, saturation, and/or darkness of the portion of the second visual lighting effect that is visible with the object in the three-dimensional environment is actually influenced by changes in the one or more visual characteristics of the physical environment, rather than being selected by the computer system (e.g., because the object is a physical object, rather than a virtual object).

In some embodiments, the second virtual lighting effect is based on the one or more visual characteristics of the at least the portion of the one or more virtual objects (1404*d*) (e.g., as similarly described above with reference to step 1402), such as virtual lighting effect 1316*a* in FIG. 13B. In some embodiments, displaying the object with the second virtual lighting effect that is based on the one or more changes in the one or more visual characteristics of the physical environment and the one or more visual characteristics of the one or more virtual objects also includes displaying the object with a fourth lighting effect that is an update of the combination of (e.g., a blending between) the two of the one or more visual characteristics previously described above with reference to step 1402. For example, the change in the one or more visual characteristics of the at least the portion of the representation of the physical environment causes the overlap between the one or more visual characteristics of the at least the portion of the representation of the physical environment and the one or more visual characteristics of the at least the portion of the one or more virtual objects to change as well. As an example, if the visual prominence of the one or more visual characteristics of the physical environment increases, and the magnitude (e.g., brightness, size, location, and/or opacity) of the lighting effect from the one or more visual characteristics of the physical environment increases on the object, a magnitude (e.g., brightness, size, location, and/or opacity) of the overlap between the lighting effect from the one or more visual characteristics of the physical environment and the lighting effect from the virtual environment increases as well, and vice versa. Updating a lighting effect that is based on visual characteristics of a physical environment in a respective region of a three-dimensional environment and that is displayed with an object in the three-dimensional environment in response to detecting a change in the visual characteristics of the physical environment improves visibility of the object in the three-dimensional environment when the visual characteristics change, and/or provides visual feedback of the relative placement of the object in the three-dimensional environment, thereby reducing errors in movement of the object within the three-dimensional environment after the change in the visual characteristics, which improves user-device interaction.

In some embodiments, while displaying the object in the three-dimensional environment with the virtual lighting effect in accordance with the determination that the three-dimensional environment includes the first region in which the at least the portion of the representation of the physical environment is visible and the second region that includes the one or more virtual objects, the computer system detects (1406*a*), via the one or more input devices, one or more changes in the one or more visual characteristics of the at least the portion of the one or more virtual objects, such as a decrease in size of a virtual light source of the virtual environment 1328 as shown in FIGS. 13F and 13F1. For example, the computer system detects a change in a visual prominence or other change of the one or more visual characteristics of the virtual environment described above with reference to step 1402. Particularly, in some embodiments, the computer system detects an increase or decrease in lighting originating from, enveloped over, and/or reflected off the one or more virtual objects and/or virtual scenery in the virtual environment, shadows produced by the one or more virtual objects and/or virtual scenery (e.g., by virtual clouds) in the virtual environment, and/or virtual natural lighting present in the virtual environment (e.g., present in and/or entering the virtual environment via a virtual sun and/or sky). In some embodiments, the one or more changes in the one or more virtual characteristics of the at least the portion of the one or more virtual objects include one or more changes in a configuration of the one or more virtual objects (e.g., the virtual environment). For example, the computer system detects a change in a number of one or more virtual objects in the virtual environment, such as a new virtual object (e.g., virtual pet, virtual machine, virtual robot, virtual user and/or other virtual object) user enter/become displayed in the portion of the virtual environment that is displayed in the three-dimensional environment, which causes the one or more visual characteristics of the virtual environment to change as similarly described above.

In some embodiments, in response to detecting the one or more changes in the one or more visual characteristics of the at least the portion of the one or more virtual objects, the computer system updates (1406*b*) display, via the display generation component, of the object in the three-dimensional environment with a second virtual lighting effect (e.g., different from the virtual lighting effect described above with reference to step 1402) that is based on the one or more visual characteristics of the at least the portion of the representation of the physical environment (1406*c*) (e.g., as similarly described above with reference to step 1402), such as virtual lighting effect 1320*e* as shown in FIGS. 13F and 13F1. In some embodiments, displaying the object with the second virtual lighting effect that is based on the one or more visual characteristics of the physical environment and the one or more changes in the one or more visual characteristics of the one or more virtual objects also includes displaying the object with a fourth lighting effect that is an update of the combination of (e.g., a blending between) the two of the one or more visual characteristics previously described above with reference to step 1402. For example, the change in the one or more visual characteristics of the at least the portion of the one or more virtual objects causes the overlap between the one or more visual characteristics of the at least the portion of the representation of the physical environment and the one or more visual characteristics of the at least the portion of the one or more virtual objects to change as well. As an example, if the visual prominence of the one or more visual characteristics of the virtual environment increases, and the magnitude (e.g., brightness, size, location, and/or opacity) of the lighting effect from the one or more visual characteristics of the virtual environment increases on the object, a magnitude (e.g., brightness, size, location, and/or opacity) of the overlap between the lighting effect from the one or more visual characteristics of the virtual environment and the lighting effect from the physical environment increases as well, and vice versa.

In some embodiments, the second virtual lighting effect is based on the one or more changes in the one or more visual characteristics of the at least the portion of the one or more virtual objects (1406*d*), such as virtual lighting effect 1314*e* as shown in FIGS. 13F and 13F1. For example, the computer system updates display of the object in the three-dimensional-environment with the second virtual lighting effect that reflects the changes discussed above. In some embodiments, the second virtual lighting effect is selected automatically by the computer system for display with the object based on the changes in the one or more visual characteristics discussed above irrespective of whether the object is a virtual object or a physical object in the three-dimensional environment. For example, the brightness, coloration, saturation, and/or darkness of the second virtual lighting effect is determined by the computer system based on the changes in the virtual light produced by and/or reflected off the one or more virtual objects and/or the virtual scenery of the virtual environment, virtual shadows produced by the one or more virtual objects and/or the virtual scenery of the virtual environment, and/or virtual natural light in the virtual environment, such that the changes in the one or more visual characteristics of the virtual environment perceptually affect the visual appearance of the object in the three-dimensional environment in a same or similar way that changes in those of a physical environment would affect the visual appearance of a physical object (e.g., shadows from a cloud cast onto a bench). Updating a lighting effect that is based on visual characteristics of a virtual environment in a respective region of a three-dimensional environment and that is displayed with an object in the three-dimensional environment in response to detecting a change in the visual characteristics of the virtual environment improves visibility of the object in the three-dimensional environment when the visual characteristics change, and/or provides visual feedback of the relative placement of the object in the three-dimensional environment, thereby reducing errors in movement of the object within the three-dimensional environment after the change in the visual characteristics, which improves user-device interaction.

In some embodiments, the three-dimensional environment including the object is displayed from a first viewpoint of the user (1408*a*), such as the viewpoint of user 1326 in FIG. 13D. In some embodiments, while displaying the object from the first viewpoint of the user in the three-dimensional environment with the virtual lighting effect in accordance with the determination that the three-dimensional environment includes the first region in which the at least the portion of the representation of the physical environment is visible and the second region that includes the one or more virtual objects, the computer system detects (1408*b*), via the one or more input devices, movement of a viewpoint of the user from the first viewpoint to a second viewpoint, different from the first viewpoint, relative to the object in the three-dimensional environment, such as movement of the viewpoint caused by movement of hand 1305 as shown in FIG. 13D. For example, the computer system detects movement of a head of the user, which moves the viewpoint of the user in the three-dimensional environment. In some embodiments, the movement of the head of the user causes the display generation component to move in the physical environment, which causes the object to appear to shift in the user's field of view of the three-dimensional environment. In some embodiments, the movement of the viewpoint corresponds to translation of the viewpoint in the three-dimensional environment. For example, the computer system detects the user walk to a different location in the physical environment surrounding the computer system, which moves the viewpoint of the user in the three-dimensional environment.

In some embodiments, in response to detecting the movement of the viewpoint of the user, in accordance with a determination that the movement of the viewpoint from the first viewpoint to the second viewpoint causes the one or more visual characteristics of the at least the portion of the representation of the physical environment and/or the one or more visual characteristics of the at least the portion of the one or more virtual objects to change relative to the second viewpoint (1408*c*), the computer system updates (1408*d*) display, via the display generation component, of the object in the three-dimensional environment with a second virtual lighting effect, such as virtual lighting effect 1320*d* in FIG. 13E. For example, because the user's viewpoint changes in the three-dimensional environment, an orientation and/or position of the object appear to shift/change in the three-dimensional environment based on the amount and/or direction of the movement of the viewpoint of the user, which optionally causes the visual characteristics of the physical environment and/or the visual characteristics of the virtual environment to change relative to the object from the user's new viewpoint. In some embodiments, an amount of and/or a direction in which the orientation and/or position of the object that changes in the user's field of view of the three-dimensional environment relative to the new viewpoint is based on the movement of the viewpoint of the user. For example, if the computer system detects the head of the user move in a first direction (e.g., clockwise) relative to the three-dimensional environment (which causes the viewpoint to shift in the first direction), the object appears to shift in a first respective direction (e.g., leftward) in the three-dimensional environment based on the movement of the viewpoint in the first direction relative to the new viewpoint of the user, which optionally causes a new portion (e.g., side) of the object to be visible in the three-dimensional environment. If the computer system detects the head of the user move in a second direction (e.g., counterclockwise), different from the first direction, the object optionally appears to shift in a second respective direction (e.g., rightward) in the three-dimensional environment based on the movement of the viewpoint in the second direction relative to the new viewpoint of the user.

In some embodiments, if the movement of the viewpoint of the user, which optionally causes the object to shift and/or rotate in the three-dimensional environment from the second viewpoint as discussed above, causes the visual characteristics of the physical environment and/or the visual characteristics of the virtual environment to change relative to the object from the second viewpoint, the computer system displays the object with the second virtual lighting effect. For example, as similarly described above with reference to step 1402, if the object includes a reflective surface, the movement of the viewpoint of the user causes a physical light source of the physical environment and/or a virtual light source of the virtual environment to shift relative to the object relative to the viewpoint, which causes light (e.g., physical light or virtual light) to appear to hit the reflective surface of the object from new locations, as discussed below.

In some embodiments, the second virtual lighting effect is based on one or more changes in the one or more visual characteristics of the representation of the at least the portion of the physical environment (1408*c*), such as a change in a position of the physical light source 1308*a* relative to the new viewpoint of the user 1326 in FIG. 13E. For example, during the movement of the viewpoint, the computer system detects (e.g., via sensors, such as image sensors and/or infrared sensors in communication with the computer system) a change in a visual prominence of the one or more visual characteristics of the physical environment described above with reference to step 1402. Particularly, in some embodiments, the computer system detects an increase or decrease in lighting originating from, enveloped over, and/or reflected off the one or more physical objects in the physical environment, shadows produced by the one or more physical objects in the physical environment, and/or natural lighting present in the physical environment (e.g., present in and/or entering the physical environment via windows, doors, and/or skylights). In some embodiments, the computer system updates display of the object in the three-dimensional-environment with the second virtual lighting effect that reflects the changes discussed above. In some embodiments, if the object is a virtual object in the three-dimensional environment, the portion of the second virtual lighting effect that is based on the visual characteristics of the physical environment is selected automatically by the computer system for display with the object based on the changes in the one or more visual characteristics discussed above. For example, the brightness, coloration, saturation, and/or darkness of the second virtual lighting effect is determined by the computer system based on changes in the light produced by and/or reflected off the one or more physical objects, shadows produced by the one or more physical objects, and/or natural light in the physical environment. In some embodiments, if the object is a physical object that is visible in the three-dimensional environment, the portion of the second virtual lighting effect that is based on the visual characteristics of the physical environment is naturally updated on the object based on the changes one or more visual characteristics discussed above. For example, the brightness, coloration, saturation, and/or darkness of the portion of the second visual lighting effect that is visible with the object in the three-dimensional environment is actually influenced by changes in the one or more visual characteristics of the physical environment, rather than being selected by the computer system (e.g., because the object is a physical object, rather than a virtual object).

In some embodiments, the second virtual lighting effect is based on one or more changes in the one or more visual characteristics of the at least the portion of the one or more virtual objects (**1408*f*), such as change in a position of virtual light source of the virtual environment 1328 relative to the new viewpoint of the user 1326 in FIG. 13E. For example, during the movement of the viewpoint, the computer system detects a change in a visual prominence of the one or more visual characteristics of the virtual environment described above with reference to step 1402. Particularly, in some embodiments, the computer system detects an increase or decrease in lighting originating from, enveloped over, and/or reflected off the one or more virtual objects and/or virtual scenery in the virtual environment, shadows produced by the one or more virtual objects and/or virtual scenery (e.g., by virtual clouds) in the virtual environment, and/or virtual natural lighting present in the virtual environment (e.g., present in and/or entering the virtual environment via a virtual sun and/or sky). In some embodiments, in accordance with a determination that the movement of the viewpoint from the first viewpoint to the second viewpoint does not cause the one or more visual characteristics of the at least the portion of the representation of the physical environment and/or the one or more visual characteristics of the at least the portion of the one or more virtual objects to change relative to the second viewpoint, the computer system maintains display of the object with the virtual lighting effect described above with reference to step 1402**. In some embodiments, the computer system updates display of the object in the three-dimensional-environment with the second virtual lighting effect that reflects the changes discussed above. In some embodiments, the second virtual lighting effect is selected automatically by the computer system for display with the object based on the changes in the one or more visual characteristics discussed above irrespective of whether the object is a virtual object or a physical object in the three-dimensional environment. For example, the brightness, coloration, saturation, and/or darkness of the second virtual lighting effect is determined by the computer system based on the changes in the virtual light produced by and/or reflected off the one or more virtual objects and/or the virtual scenery of the virtual environment, virtual shadows produced by the one or more virtual objects and/or the virtual scenery of the virtual environment, and/or virtual natural light in the virtual environment, such that the changes in the one or more visual characteristics of the virtual environment perceptually affect the visual appearance of the object in the three-dimensional environment in a same or similar way that changes in those of a physical environment would affect the visual appearance of a physical object (e.g., shadows from a cloud cast onto a bench). Updating display of an object in a three-dimensional environment with a lighting effect that is based on visual characteristics of a physical environment in a first region of the three-dimensional environment and visual characteristics of a virtual environment in a second region of the three-dimensional environment in response to movement of a viewpoint of the user improves visibility of the object in the three-dimensional environment, and/or provides visual feedback of the relative placement of the object in the three-dimensional environment after the movement of the viewpoint, thereby reducing errors in movement of the object within the three-dimensional environment after the movement of the viewpoint, which improves user-device interaction.

In some embodiments, displaying the object in the three-dimensional environment with the virtual lighting effect concurrently includes (**1410*a*) displaying, via the display generation component, a first portion of the object in the three-dimensional environment with a first lighting effect that is based on the one or more visual characteristics of the representation of the at least the portion of the physical environment (1410*b*), such as lighting effect 1310*b* in FIG. 13B, and displaying a second portion, different from the first portion, of the object in the three-dimensional environment with a second lighting effect that is based on the one or more visual characteristics of the at least the portion of the one or more virtual objects (1410*c*) (e.g., as similarly described above with reference to step 1402), such as virtual lighting effect 1314*a* in FIG. 13B. In some embodiments, the first lighting effect is displayed on the object separately from the second lighting effect (e.g., because the first portion of the object does not overlap or intersect with the second portion of the object). For example, the computer system displays the virtual object or the physical object in the three-dimensional environment with the first lighting effect and the second lighting effect without displaying the object with a combination of (e.g., blending between) the two lighting effects (e.g., because light of the visual characteristics of the physical environment does not overlap or intersect with light of the visual characteristics of the virtual environment). In some embodiments, as similarly described above with reference to step 1402**, displaying the object with the first lighting effect and the second lighting effect discussed above in the three-dimensional environment also includes displaying the object with a third lighting effect that is a combination of (e.g., a blending between) the first lighting effect and the second lighting effect. Concurrently displaying an object in a three-dimensional environment with a first lighting effect that is based on visual characteristics of a physical environment in a first region of the three-dimensional environment and a second lighting effect that is based on visual characteristics of a virtual environment in a second region of the three-dimensional environment improves visibility of the object in the three-dimensional environment, and/or provides visual feedback of the relative placement of the object in the three-dimensional environment, thereby reducing errors in movement of the object within the three-dimensional environment, which improves user-device interaction.

In some embodiments, the object is displayed at a first spatial arrangement in the three-dimensional environment relative to the first region and the second region in the three-dimensional environment (1412*a*) (e.g., the object is displayed at a first location, a first orientation, and/or a first elevation relative to the first region and the second region), such as the display of the virtual object 1306*a* in the three-dimensional environment 1302 as shown in FIG. 13C. In some embodiments, while concurrently displaying the first portion of the object in the three-dimensional environment with the first lighting effect (e.g., lighting effect 1320*b*) and displaying the second portion of the object with the second lighting effect (e.g., virtual lighting effect 1314*b*) in accordance with the determination that the three-dimensional environment includes the first region in which the at least the portion of the representation of the physical environment is visible and the second region that includes the one or more virtual objects, the computer system detects (1412*b*), via the one or more input devices, an input corresponding to movement of the object from the first spatial arrangement to a second spatial arrangement, different from the first spatial arrangement, in the three-dimensional environment relative to the first region and the second region in the three-dimensional environment, such as movement of the virtual object 1306*a* provided by hand 1303*c* in FIG. 13C. For example, if the object is a virtual object, the computer system detects an air pinch gesture performed by a hand of the user of the computer system-such as the thumb and index finger of the hand of the user starting more than a threshold distance (e.g., 0.1, 0.2, 0.5, 1, 2, or 5 cm) apart and coming together and touching at the tips—that is detected by the one or more input devices (e.g., a hand tracking device) in communication with the computer system while the attention (e.g., including gaze) of the user is directed toward the object. In some embodiments, the computer system detects the air pinch gesture directed toward a selection element (e.g., a grabber or handlebar element) associated with the first virtual object that is selectable to initiate movement of the first virtual object in the three-dimensional environment. In some embodiments, after detecting the air pinch gesture, the computer system detects movement of a predefined portion of the user. For example, the computer system detects movement of the hand of the user in space, such as a movement while the hand is holding the pinch hand shape (e.g., the tips of the thumb and index finger remain touching) such as an air drag gesture. In some embodiments, the movement of the hand of the user is in a respective direction (e.g., in a vertical direction, a horizontal direction, or a diagonal direction) in space that is toward a second location in the three-dimensional environment. In some embodiments, the computer system detects movement of a head of the user, which moves the viewpoint of the user in the three-dimensional environment. In some embodiments, the computer system detects the first input via a hardware input device (e.g., a controller operable with six degrees of freedom of movement, or a touchpad or mouse) in communication with the computer system. For example, the computer system detects a selection input (e.g., a tap, touch, or click) via the input device provided by one or more fingers of the hand of the user. In some embodiments, after detecting the selection input, the computer system detects movement via the hardware input device, such as movement of the controller in space, movement of a mouse across a surface (e.g., a tabletop), or movement of a finger of the hand of the user across the touchpad. In some embodiments, if the object is a physical object in the three-dimensional environment, detecting the input includes detecting the user physically move the object within the three-dimensional environment. For example, the computer system detects the user's hand(s) grip, lift, and subsequently move the object to a second location in the three-dimensional environment. In some embodiments, the input has one or more characteristics of inputs in methods 800, 1000, 1200, 1600, 1800, and/or 2000.

In some embodiments, in response to detecting the input (1412*c*), the computer system moves (1412*d*), via the display generation component, the object from the first spatial arrangement to the second spatial arrangement relative to the first region and the second region in the three-dimensional environment in accordance with the input, such as movement of the virtual object 1306*a* in the three-dimensional environment 1302 as shown in FIG. 13D. For example, the computer system moves the object in accordance with the movement of the hand of the user and/or the hardware input device and displays the object at a second location, a second orientation, and/or a second elevation relative to the first region and the second region.

In some embodiments, the computer system displays (1412*e*) the object in the three-dimensional environment with a second virtual lighting effect that concurrently includes displaying a third portion of the object in the three-dimensional environment with a third lighting effect that is based on the one or more visual characteristics of the representation of the at least the portion of the physical environment (1412*f*), such as lighting effect 1320*c* in FIG. 13D, and displaying a fourth portion of the object in the three-dimensional environment with a fourth lighting effect that is based on the one or more visual characteristics of the at least the portion of the one or more virtual objects (1412*g*), such as virtual lighting effect 1314*c* in FIG. 13D. For example, when the computer system moves the object to the second spatial arrangement relative to the first region and the second region in the three-dimensional environment, the computer system detects a change in the visual characteristics of the physical environment at the second spatial arrangement. In some embodiments, the change in the visual characteristics of the physical environment has one or more characteristics of the changes described above with reference to step 1404. In some embodiments, when the object is displayed at the second spatial arrangement, a respective magnitude (e.g., of size and/or brightness), coloration, and/or saturation of the light cast onto the object changes, as similarly described above with reference to step 1404. Additionally, or alternatively, in some embodiments, when the object is displayed at the second spatial arrangement, a location of the lighting from the physical environment that is cast onto the object changes. For example, if the movement of the object to the second spatial arrangement causes the first region of the three-dimensional environment in which the physical environment is visible to be located farther away from the object, the magnitude, coloration, and/or saturation of the lighting effect that is based on the visual characteristics of the physical environment decreases and/or the location of the lighting effect on the object shifts based on the location, orientation, and/or elevation of the object in the second spatial arrangement. In some embodiments, displaying the third portion of the object in the three-dimensional environment with the third lighting effect includes changing the first lighting effect described with reference to step 1410 in one or more of the manners described above.

In some embodiments, when the computer system moves the object to the second spatial arrangement relative to the first region and the second region in the three-dimensional environment, the computer system detects a change in the visual characteristics of the virtual environment at the second spatial arrangement. In some embodiments, the change in the visual characteristics of the virtual environment has one or more characteristics of the changes described above with reference to step 1406. In some embodiments, when the object is displayed at the second spatial arrangement, a respective magnitude (e.g., of size and/or brightness), coloration, and/or saturation of the virtual light cast onto the object changes, as similarly described above with reference to step 1406. Additionally, or alternatively, in some embodiments, when the object is displayed at the second spatial arrangement, a location of the lighting from the virtual environment that is cast onto the object changes. For example, if the movement of the object to the second spatial arrangement causes the second region of the three-dimensional environment in which the virtual environment is displayed to be located farther away from the object, the magnitude, coloration, and/or saturation of the lighting effect that is based on the visual characteristics of the physical environment decreases and/or the location of the lighting effect on the object shifts based on the location, orientation, and/or elevation of the object in the second spatial arrangement. In some embodiments, displaying the fourth portion of the object in the three-dimensional environment with the fourth lighting effect includes changing the second lighting effect described with reference to step 1410 in one or more of the manners described above. In some embodiments, displaying the object with the third lighting effect and the fourth lighting effect discussed above in the three-dimensional environment also includes displaying the object with a fifth lighting effect that is a combination of (e.g., a blending between) the third lighting effect and the fourth lighting effect. For example, the computer system changes the visual characteristics (e.g., the brightness, coloration, size, and/or saturation) of the blending between the first lighting effect and the second lighting effect described above with reference to step 1410 based on the second spatial arrangement. In some embodiments, the computer system changes the location of the blending between the first lighting effect and the second lighting effect described above with reference to step 1410 based on the second spatial arrangement. For example, the blending between the third lighting effect and the fourth lighting effect is optionally displayed on a different portion of the object than that of the blending between the first lighting effect and the second lighting effect before the input. Updating display of an object in a three-dimensional environment with a lighting effect that is based on visual characteristics of a physical environment in a first region of the three-dimensional environment and a lighting effect that is based on visual characteristics of a virtual environment in a second region of the three-dimensional environment in response to movement of the object improves visibility of the object in the three-dimensional environment, and/or provides visual feedback of the relative placement of the object in the three-dimensional environment after the movement of the viewpoint, thereby reducing errors in further interaction with the object in the three-dimensional environment, which improves user-device interaction.

In some embodiments, the object is a first virtual object that is separate from the one or more virtual objects (1414) (e.g., as similarly described above with reference to step 1402), such as the virtual object 1306*a* in FIG. 13A. Concurrently displaying a virtual object in a three-dimensional environment with a first lighting effect that is based on visual characteristics of a physical environment in a first region of the three-dimensional environment and a second lighting effect that is based on visual characteristics of a virtual environment in a second region of the three-dimensional environment improves visibility of the virtual object in the three-dimensional environment, and/or provides visual feedback of the relative placement of the virtual object in the three-dimensional environment, thereby reducing errors in movement of the virtual object within the three-dimensional environment, which improves user-device interaction.

In some embodiments, the object is a first physical object that is visible in the three-dimensional environment (1416) (e.g., as similarly described above with reference to step 1402), such as the table 1322*a* in FIG. 13A. Concurrently displaying a physical object in a three-dimensional environment with a first lighting effect that is based on visual characteristics of a physical environment in a first region of the three-dimensional environment and a second lighting effect that is based on visual characteristics of a virtual environment in a second region of the three-dimensional environment improves visibility of the physical object in the three-dimensional environment, and/or provides visual feedback of the relative placement of the physical object in the three-dimensional environment, thereby reducing errors in interaction with the physical object within the three-dimensional environment, which improves user-device interaction.

In some embodiments, the one or more virtual objects include a virtual environment that is displayed at a first level of immersion in the three-dimensional environment (1418*a*), such as the virtual environment 1328 in FIG. 13B. For example, a level of immersion includes an associated degree to which the virtual environment or other virtual content displayed by the computer system obscures background content (e.g., the three-dimensional environment including the physical environment) around/behind the virtual environment or the other virtual content, optionally including the number of items of background content displayed and the visual characteristics (e.g., colors, contrast, and/or opacity) with which the background content is displayed, and/or the angular range of the content displayed via the display generation component (e.g., 60 degrees of content displayed at low immersion, 120 degrees of content displayed at medium immersion, and/or 180 degrees of content displayed at high immersion), and/or the proportion of the field of view displayed via the display generation consumed by the virtual environment or the other virtual content (e.g., 33% of the field of view consumed by the virtual environment at low immersion, 66% of the field of view consumed by the virtual environment at medium immersion, and/or 100% of the field of view consumed by the virtual environment at high immersion). In some embodiments, at a first (e.g., high) level of immersion, the background, virtual and/or real objects are displayed in an obscured manner. For example, a respective virtual environment with a high level of immersion is displayed without concurrently displaying the background content (e.g., in a full screen or fully immersive mode). In some embodiments, at a second (e.g., low) level of immersion, the background, virtual and/or real objects are displayed in an obscured manner (e.g., dimmed, blurred, and/or removed from display). For example, a virtual environment with a low level of immersion is optionally displayed concurrently with the background content, which is optionally displayed with full brightness, color, and/or translucency. As another example, a virtual environment displayed with a medium level of immersion is optionally displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed.

In some embodiments, while displaying the object in the three-dimensional environment with the virtual lighting effect in accordance with the determination that the three-dimensional environment includes the first region in which the at least the portion of the representation of the physical environment is visible and the second region that includes the one or more virtual objects, the computer system detects (1418*b*), via the one or more input devices, an input corresponding to a request to change a level of immersion of the virtual environment, such as selection of button 1341 of the computer system 101 provided by hand 1303*b* as shown in FIG. 13B. In some embodiments, the request to change the level of immersion of the virtual environment or the other virtual content includes a manipulation of a rotational element, such as a mechanical dial or a virtual dial, of or in communication with the computer system. In some embodiments, the input includes a selection of a selectable option displayed in the three-dimensional environment and/or a manipulation of a displayed control element to change the immersion level of the computer system and/or the virtual environment. In some embodiments, the input includes a predetermined gesture (e.g., an air gesture) recognized as a request to change the immersion level of the computer system and/or the virtual environment.

In some embodiments, in response to detecting the input (1418*c*), the computer system displays (1418*d*), via the display generation component, the virtual environment at a second level of immersion, different from the first level of immersion, within the three-dimensional environment in accordance with the input, such as increasing the immersion level of the virtual environment 1328 as shown in FIG. 13C. For example, the computer system increases or decreases the level of immersion of the computer system and/or the virtual environment. In some embodiments, as similarly described above, an increase in the level of immersion increases the proportion of the field of view visible via the display generation that is consumed by the virtual environment or the other virtual content. For example, additional portions of the three-dimensional environment (including the physical environment surrounding the display generation component) in the field of view of the user are obscured (e.g., no longer displayed/visible) when the level of immersion increases for the virtual environment. Additionally, in some embodiments, a decrease in the level of immersion decreases the proportion of the field of view visible via the display generation component that is consumed by the virtual environment or the other virtual content. For example, additional portions of the three-dimensional environment (including the physical environment surrounding the display generation component) in the field of view of the user are unobscured (e.g., displayed/visible) when the level of immersion decreases for the virtual environment. In some embodiments, the computer system changes the level of immersion for the virtual environment without moving, shifting, or obscuring the object in the three-dimensional environment.

In some embodiments, in accordance with a determination that displaying the virtual environment at the second level of immersion causes a visual prominence of the one or more visual characteristics of the at least the portion of the one or more virtual objects to change (1418*c*), such as an increase in virtual light cast by the virtual environment 1328 as shown in FIG. 13C, the computer system updates (1418*f*) display of the object in the three-dimensional environment with a second virtual lighting effect that is based on the changed visual prominence of the one or more visual characteristics of the at least the portion of the one or more virtual objects, such as virtual lighting effect 1314*b* as shown in FIG. 13C. For example, if changing the immersion level of the virtual environment or other virtual content causes the visual prominence of the one or more visual characteristics (e.g., brightness of lighting from light source(s) in the virtual environment, location(s) of the light source(s), and/or a size of the light source(s)) of the virtual environment to change with respect to the object, the computer system displays the object with a second virtual lighting effect that is different from the first virtual lighting effect described above. In some embodiments, the second level of immersion of the virtual environment or other virtual content causes a greater or lesser portion of the virtual environment or other virtual content to surround (e.g., wrap around) the object in the three-dimensional environment, which causes the visual prominence of the one or more visual characteristics of the virtual environment or other virtual content to change in the three-dimensional environment. In some embodiments, the second virtual lighting effect is based on the changed visual prominence of the one or more visual characteristics of the virtual environment and the one or more visual characteristics of the at least the portion of the representation of the physical environment. For example, if changing the immersion level of the virtual environment causes the visual prominence of the one or more visual characteristics of the virtual environment to increase, the portion of the second lighting effect that is based on the one or more visual characteristics of the virtual environment increases (e.g., a greater portion of the object is displayed with virtual lighting, shadow, and/or coloration from the virtual environment than before the immersion level was increased). Alternatively, if changing the immersion level of the virtual environment causes the visual prominence of the one or more visual characteristics of the virtual environment to decrease, the portion of the second lighting effect that is based on the one or more visual characteristics of the virtual environment decreases (e.g., a smaller portion of the object is displayed with virtual lighting, shadow, and/or coloration from the virtual environment than before the immersion level was decreased). In some embodiments, in accordance with a determination that displaying the virtual environment at the second level of immersion causes the visual prominence of the one or more visual characteristics of the at least the portion of the one or more virtual objects to change, the computer system maintains display of the object in the three-dimensional environment with the virtual lighting effect described above with reference to step 1402. Updating a lighting effect that is based on visual characteristics of a virtual environment in a respective region of a three-dimensional environment and that is displayed with an object in the three-dimensional environment in response to detecting a change in immersion level of the virtual environment improves visibility of the object in the three-dimensional environment when the immersion level changes, and/or provides visual feedback of the relative placement of the object in the three-dimensional environment, thereby reducing errors in movement of the object within the three-dimensional environment after the change in immersion level, which improves user-device interaction.

In some embodiments, the input corresponds to a request to increase the level of immersion of the virtual environment (1420*a*), as similarly described with reference to FIG. 13C. In some embodiments, the request to increase the level of immersion of the virtual environment includes a manipulation of the rotational element, such as the mechanical dial or the virtual dial, of or in communication with the computer system in a respective direction (e.g., clockwise). In some embodiments, the input includes a selection of a selectable option displayed in the three-dimensional environment and/or a manipulation of a displayed control element to increase the immersion level of the computer system and/or the virtual environment. In some embodiments, the input includes a predetermined gesture (e.g., an air gesture) recognized as a request to increase the immersion level of the computer system and/or the virtual environment.

In some embodiments, in response to detecting the input (1420*b*), the second level of immersion is greater than the first level of immersion (1420*c*), such as the increased level of immersion of the virtual environment 1328 as shown in FIG. 13C. For example, as similarly described above with reference to step 1418, the increase in the level of immersion increases the proportion of the field of view visible via the display generation that is consumed by the virtual environment. In some embodiments, in accordance with a determination that displaying the virtual environment at the second level of immersion causes the visual prominence of the one or more visual characteristics of the at least the portion of the one or more virtual objects to increase (1420*d*), the second virtual lighting effect is based on the increased visual prominence of the one or more visual characteristics of the at least the portion of the one or more virtual objects (1420*e*) (e.g., as similarly described above with reference to step 1418), such as an increase in size of the virtual lighting effect 1314*b* as shown in FIG. 13C. Updating a lighting effect that is based on visual characteristics of a virtual environment in a respective region of a three-dimensional environment and that is displayed with an object in the three-dimensional environment in response to detecting an increase in immersion level of the virtual environment improves visibility of the object in the three-dimensional environment when the immersion level increases, and/or provides visual feedback of the relative placement of the object in the three-dimensional environment, thereby reducing errors in movement of the object within the three-dimensional environment after the increase in immersion level, which improves user-device interaction.

In some embodiments, the input corresponds to a request to decrease the level of immersion of the virtual environment (1422*a*), as similarly described with reference to FIG. 13B. In some embodiments, the request to decrease the level of immersion of the virtual environment includes a manipulation of the rotational element, such as the mechanical dial or the virtual dial, of or in communication with the computer system in a respective direction (e.g., counterclockwise). In some embodiments, the input includes a selection of a selectable option displayed in the three-dimensional environment and/or a manipulation of a displayed control element to decrease the immersion level of the computer system and/or the virtual environment. In some embodiments, the input includes a predetermined gesture (e.g., an air gesture) recognized as a request to decrease the immersion level of the computer system and/or the virtual environment.

In some embodiments, in response to detecting the input (1422*b*), the second level of immersion is less than the first level of immersion (1422*c*), such as the decrease in size of the virtual light source of the virtual environment 1328 as shown in FIGS. 13F and 13F1. For example, as similarly described above with reference to step 1418, the decrease in the level of immersion decreases the proportion of the field of view visible via the display generation that is consumed by the virtual environment. In some embodiments, in accordance with a determination that displaying the virtual environment at the second level of immersion causes the visual prominence of the one or more visual characteristics of the at least the portion of the one or more virtual objects to decrease (1422*d*), the second virtual lighting effect is based on the decreased visual prominence of the one or more visual characteristics of the at least the portion of the one or more virtual objects (1422*e*) (e.g., as similarly described above with reference to step 1418), such as virtual lighting effect 1314*e* as shown in FIGS. 13F and 13F1. Updating a lighting effect that is based on visual characteristics of a virtual environment in a respective region of a three-dimensional environment and that is displayed with an object in the three-dimensional environment in response to detecting a decrease in immersion level of the virtual environment improves visibility of the object in the three-dimensional environment when the immersion level decreases, and/or provides visual feedback of the relative placement of the object in the three-dimensional environment, thereby reducing errors in movement of the object within the three-dimensional environment after the decrease in immersion level, which improves user-device interaction.

In some embodiments, displaying the object in the three-dimensional environment with the virtual lighting effect includes (1424*a*), in accordance with a determination that a portion of the virtual lighting effect that is based on the one or more visual characteristics of the at least the portion of the representation of the physical environment at least partially overlaps with a portion of the virtual lighting effect that is based on the one or more visual characteristics of the at least the portion of the one or more virtual objects at a first portion of the object (1424*b*), displaying, via the display generation component, the first portion of the object in the three-dimensional environment with a visual effect that is based on a combination of (e.g., a blending between) the one or more visual characteristics of the at least the portion of the representation of the physical environment and the one or more visual characteristics of the at least the portion of the one or more virtual objects (1424*c*) (e.g., as similarly described above with reference to step 1402), such as virtual lighting effect 1320*a* that is a combination of the lighting effect 1310*b* and the virtual lighting effect 1314*a* as shown in FIG. 13B. For example, as similarly described above with reference to step 1402, the computer system determines that a portion of the physical lighting of the physical environment overlaps or intersects with a portion of the virtual lighting of the virtual environment at the first portion of the object in the three-dimensional environment.

In some embodiments, blending the one or more visual characteristics of the physical environment and the one or more visual characteristics of the virtual environment includes blending colors, brightness, shadows, and/or saturations. In some embodiments, the combined brightness, coloration, saturation, and/or darkness of the visual effect is determined automatically by the computer system based on how the overlap between the physical lighting of the physical environment and the virtual lighting of the virtual environment would perceptually affect the visual appearance of the object in the three-dimensional environment if the virtual lighting were characteristic of another physical environment. In some embodiments, in accordance with a determination that the portion of the virtual lighting effect that is based on the one or more visual characteristics of the at least the portion of the representation of the physical environment does not at least partially overlaps with a portion of the virtual lighting effect that is based on the one or more visual characteristics of the at least the portion of the one or more virtual objects at the first portion of the object, displaying the object in the three-dimensional environment with the virtual lighting effect includes: displaying a second portion of the object in the three-dimensional environment with a first lighting effect that is based on the one or more visual characteristics of the representation of the at least the portion of the physical environment; and displaying a third portion, different from the first portion, of the object in the three-dimensional environment with a second lighting effect that is based on the one or more visual characteristics of the at least the portion of the one or more virtual objects, as similarly described above with reference to step 1410. Concurrently displaying an object in a three-dimensional environment with a lighting effect that is based on a combination of visual characteristics of a physical environment in a first region of the three-dimensional environment visual characteristics of a virtual environment in a second region of the three-dimensional environment improves visibility of the object in the three-dimensional environment, and/or provides visual feedback of the relative placement of the object in the three-dimensional environment, thereby reducing errors in movement of the object within the three-dimensional environment, which improves user-device interaction.

In some embodiments, while displaying the object in the three-dimensional environment with the virtual lighting effect in accordance with the determination that the three-dimensional environment includes the first region in which the at least the portion of the representation of the physical environment is visible and the second region that includes the one or more virtual objects, the computer system receives (1426*a*), via the one or more input devices, an input corresponding to a request to apply a respective visual effect to the at least the portion of the representation of the physical environment, such as selection of option 1332 provided by hand 1303*d* as shown in FIGS. 13F and 13F1. In some embodiments, the input includes a tap or a hand air gesture in space such as air pointing or air pinching at an icon or other selectable option that is displayed in the three-dimensional environment. In some embodiments, the input is detected using an interface controller that provides input to select an icon or other selectable option for applying the respective visual effect to the physical environment. In some embodiments, the input has one or more characteristics of inputs described in method 1000, 1600, and/or 1800.

In some embodiments, in response to receiving the input (1426*b*), the computer system applies (1426*c*) a respective visual adjustment to the at least the portion of the representation of the physical environment to generate one or more second visual characteristics of the at least the portion of the representation of the physical environment, as similarly shown in FIG. 13G. For example, the computer system adjusts the visual appearance (e.g., coloration, tint, and/or brightness) of the physical environment in the three-dimensional environment. In some embodiments, the computer system adjusts the visual appearance of the physical environment by neutralizing the visual appearance of the physical environment (e.g., removing natural and/or ambient lighting characteristics from the physical environment) and subsequently adding a tint (e.g., a blue tint, a yellow tint, a red tint, an orange tint, and so on) that causes the physical environment to have one or more second visual characteristics (e.g., different from the one or more visual characteristics described above with reference to step 1402). In some embodiments, applying the respective visual adjustment to the physical environment has one or more characteristics of applying visual adjustments in methods 1000, 1600, and/or 1800.

In some embodiments, the computer system updates (1426*d*) display of the object in the three-dimensional environment with a second virtual lighting effect that is based on the generated one or more second visual characteristics of the at least the portion of the representation of the physical environment, such as virtual lighting effect 1318 in FIG. 13G. For example, the lighting effect that is displayed on the object in the three-dimensional environment is based on the adjusted (e.g., tinted) visual appearance of the physical environment. As an example, if applying the visual adjustment to the physical environment includes applying a blue tint to the visual appearance of the physical environment, the second virtual lighting effect is based on the blue-tinted visual appearance of the physical environment (e.g., the second virtual lighting effect has a blue coloration). Additionally, in some embodiments, in response to receiving the input, the computer system also ceases display of the one or more virtual objects in the three-dimensional environment when the respective visual adjustment is applied to the at least the portion of the representation of the physical environment. In some embodiments, while the one or more virtual objects (e.g., including the virtual environment) are no longer displayed in the three-dimensional environment, the second virtual lighting effect is not based on one or more visual characteristics of the one or more virtual objects. In some embodiments, if the computer system receives an input corresponding to a request to redisplay the one or more virtual objects in the three-dimensional environment, the computer system updates the second virtual lighting effect to also be based on one or more visual characteristics of the one or more virtual objects, as similarly described above with reference to step 1402. Applying a visual adjustment to a visual appearance of a physical environment based on the visual appearance of the physical environment and/or the object displayed ensures accurate and consistent display of the object by the computer system in different physical environments, provides a more realistic and immersive user experience, reduces the number of inputs needed to update the visual appearance of the physical environment based on changes in ambient light and/or the respective content, and simplifies user interaction with the computer system.

It should be understood that the particular order in which the operations in method 1400 have been described is merely exemplary and is not intended to indicate that the described order is the only order in which the operations could be performed. One of ordinary skill in the art would recognize various ways to reorder the operations described herein.

FIGS. 15A-15O illustrate examples of a computer system transitioning from displaying a first three-dimensional environment to displaying a second three-dimensional environment in accordance with some embodiments.

FIG. 15A illustrates a computer system 101 (e.g., an electronic device) displaying, via a display generation component (e.g., display generation component 120 of FIG. 1), a three-dimensional environment 1502 from a viewpoint of the user 1510 of the computer system 101 (e.g., the user is facing the back wall of the physical environment in which computer system 101 is located). In the example of FIG. 15A, three-dimensional environment 1502 includes a representation of a physical environment 1505 of the computer system 101 as captured by computer system 101.

In some embodiments, computer system 101 includes a display generation component (e.g., a touch screen), a physical button 1503, and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user 1510 or a part of the user 1510 (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or attention (e.g., including gaze) of the user (e.g., internal sensors facing inwards towards the face of the user). The figures herein illustrate a three-dimensional environment that is presented to the user by computer system 101 (e.g., and displayed by the display generation component of computer system 101) and an overhead view of the physical and/or three-dimensional environment associated with computer system 101 (e.g., such as overhead view 1514 in FIG. 15A) to illustrate the relative location of physical objects in the physical environment of computer system 101 and the location of virtual objects in the three-dimensional environment 1502.

As shown in FIG. 15A, computer system 101 captures one or more images of the physical environment around computer system 101 (e.g., operating environment 100), including one or more objects in the physical environment around computer system 101. In some embodiments, computer system 101 displays a representation of the physical environment 1505 in three-dimensional environment 1502, such as a virtual pass-through environment. In some embodiments, one or more portions of the physical environment 1505 are visible via optical passthrough via the display generation component 120. Three-dimensional environment 1502 includes a representation 1504*a* of a coffee table (corresponding to representation 1504*b* in the overhead view), which is optionally a representation of a physical coffee table in the physical environment, and a representation 1506*a* of a physical light source (e.g., a floor lamp) (corresponding to representation 1506*b* in the overhead view). Additionally, in some embodiments, as shown in FIG. 15A, the three-dimensional environment 1502 includes representations of the floor, walls, and/or ceiling of the physical environment.

In the example of FIG. 15A, computer system 101 displays, in three-dimensional environment 1502, selectable icons 1508*a*-1508*d* that represent different selectable environments. For example, icon 1508*a* represents a first environment, icon 1508*b* represents a second environment that is different from the first environment, and so on. It should be understood that, in some embodiments, computer system 101 displays more or fewer selectable icons than the quantity shown in FIG. 15A. In some embodiments, computer system 101 displays icons 1508*a*-1508*d* in response to a user input requesting display of icons 1508*a*-1508*d*.

In some embodiments, the environments represented by icons 1508*a*-1508*d* include one or more types of environments that optionally include: a representation of a physical environment of the computer system 101 as captured by computer system 101, such as a virtual or optical pass-through environment; a three-dimensional computer-generated virtual environment, such as a virtual forest or virtual beach; a three-dimensional atmosphere environment that includes an atmospheric effect that is applied to a representation of a physical environment (e.g., such as an environment in which one or more physical objects in the environment are virtually tinted a first color), and/or a combination of these types of environments such as a mixed virtual and atmosphere environment type (e.g., a mixed environment) that includes a virtual environment having one or more virtual animated elements and an associated atmospheric effect (e.g., a virtual sky environment that includes virtual animated clouds and a corresponding atmospheric effect, such as a tint corresponding to a color of the sky, that is applied to a representation of a physical environment). Optionally, one or more of the environments represented by icons 1508*a*-1508*d* include one or more virtual animated elements, such as virtual animated clouds, grass, or water. Additional details regarding various types of environments are provided in the description of method 1600.

In FIG. 15A, the computer system 101 detects an input 1530*a* indicating a selection of icon 1508*a*, where icon 1508*a* represents a first virtual environment. The input 1530*a* is optionally provided by a hand 1516 of user 1510, and optionally includes a hand gesture (e.g., a hand raise, air pinch gesture, air pinch and release, and/or a pointing air gesture in which the index finger of the hand of the user is extended from the palm while the other fingers are curled towards the palm) and/or a touch input (e.g., a tap or long press on a touch-sensitive input device). In some embodiments, input 1530*a* includes an attention of the user 1510 directed to an icon 1508*a*, optionally for a threshold duration. In some embodiments, detecting an attention direction of the user 1510 includes detecting a gaze direction of the user 1510 (e.g., detecting whether the user 1510 is looking at a respective icon 1508*a*). In some embodiments, an input such as input 1530*a* includes a combination of an input provided by hand 1516 and an attention direction.

Figure 15B:
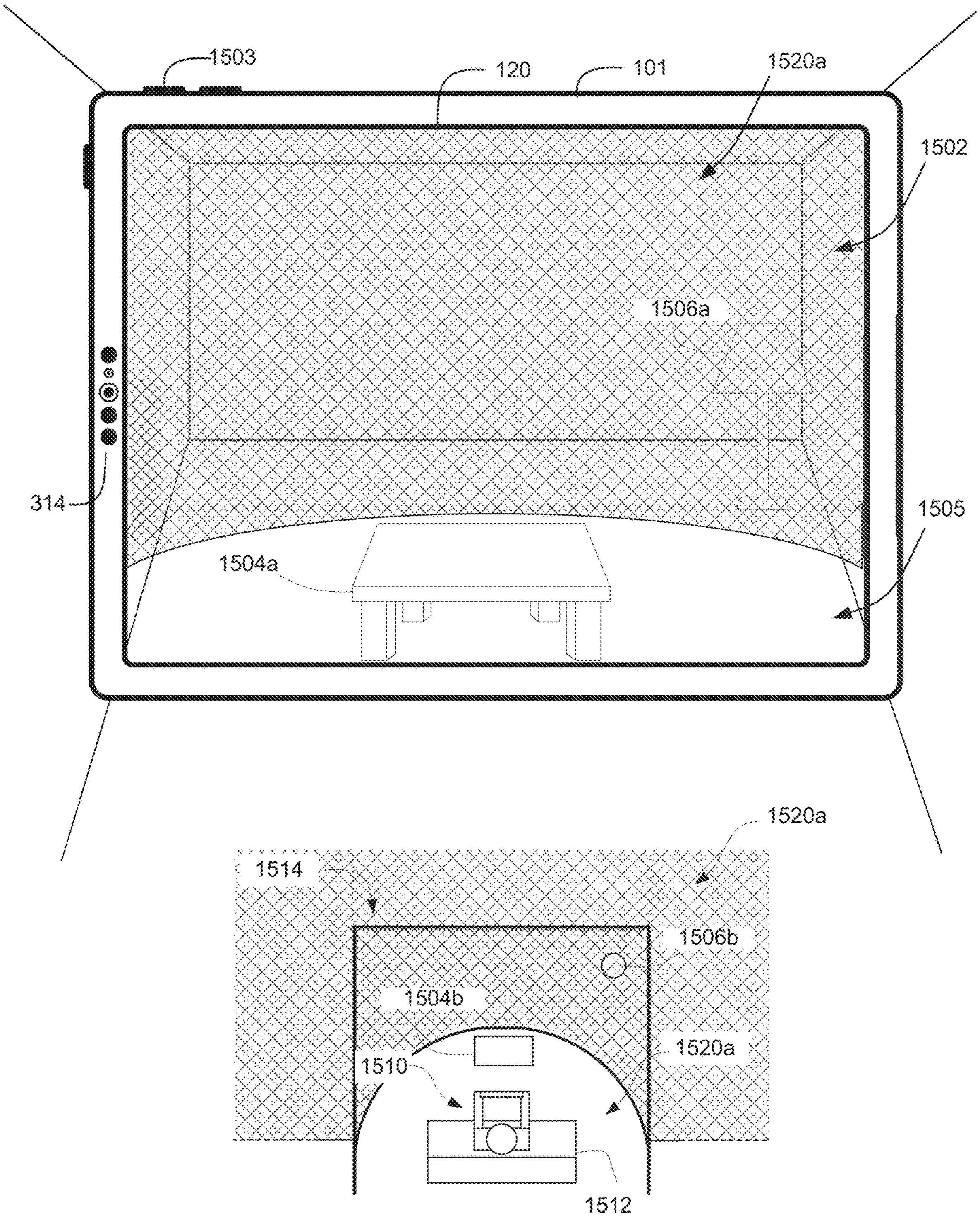
Figure 15C:
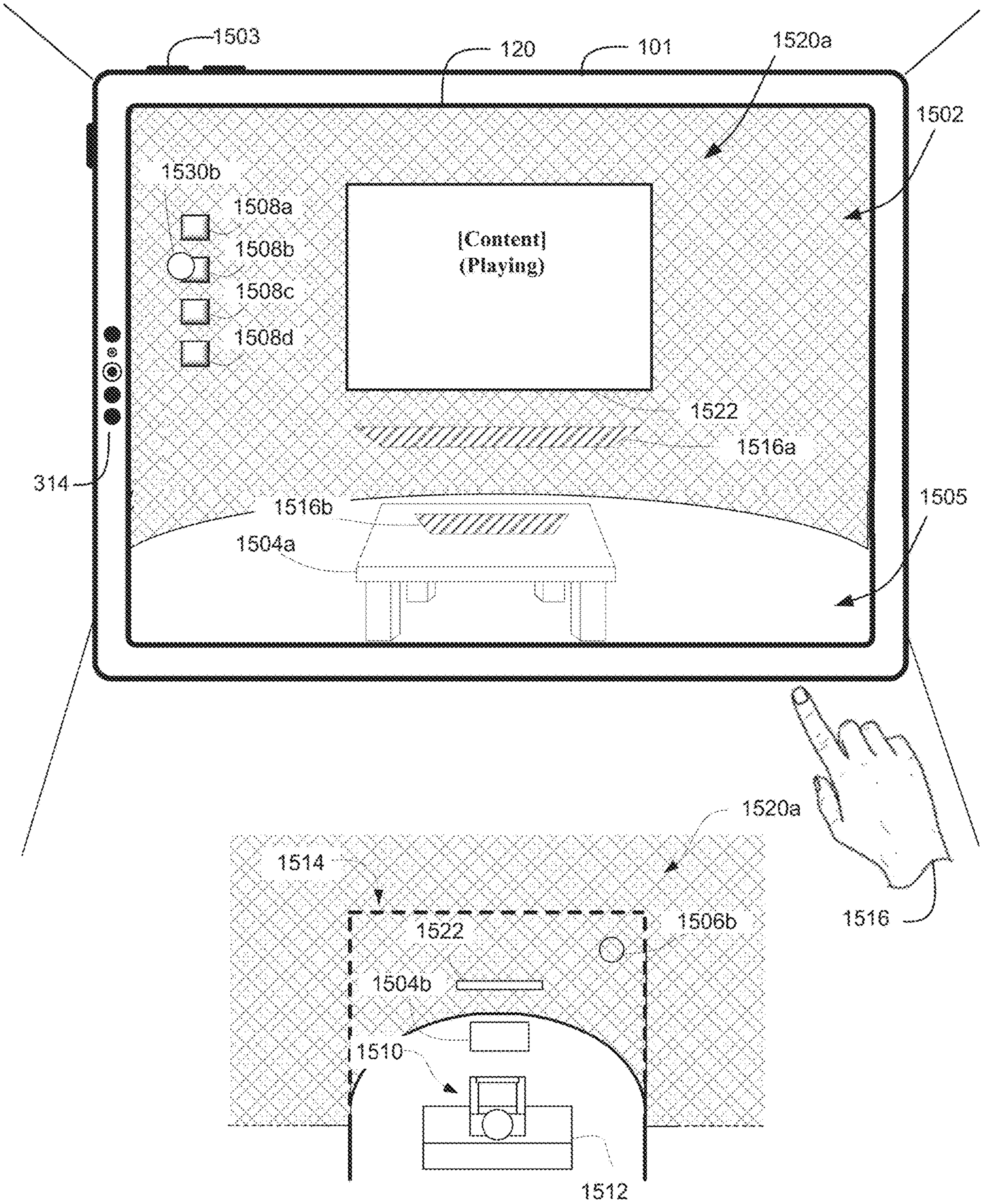
Figure 15D:
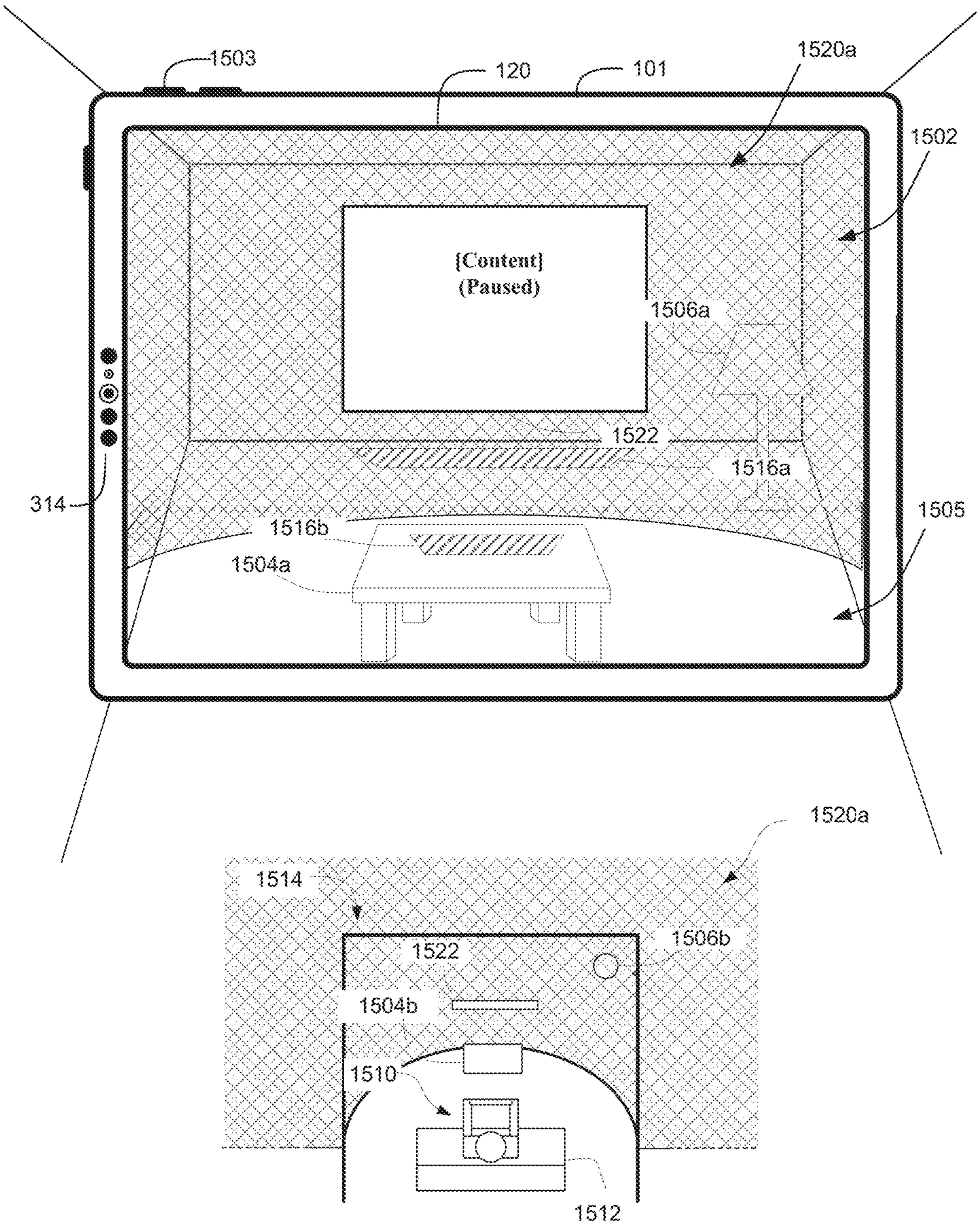
Figure 15E:
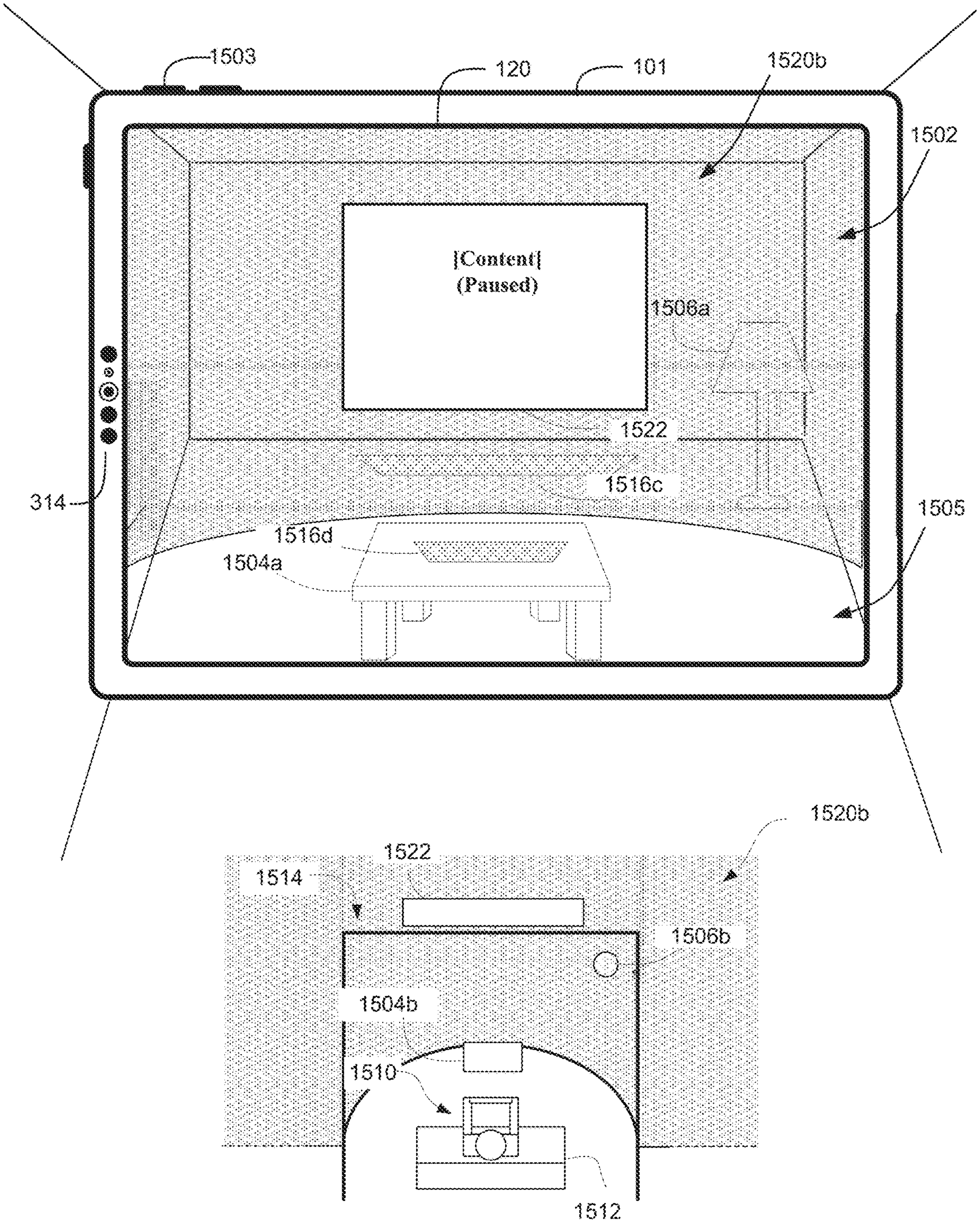
Figure 15F:
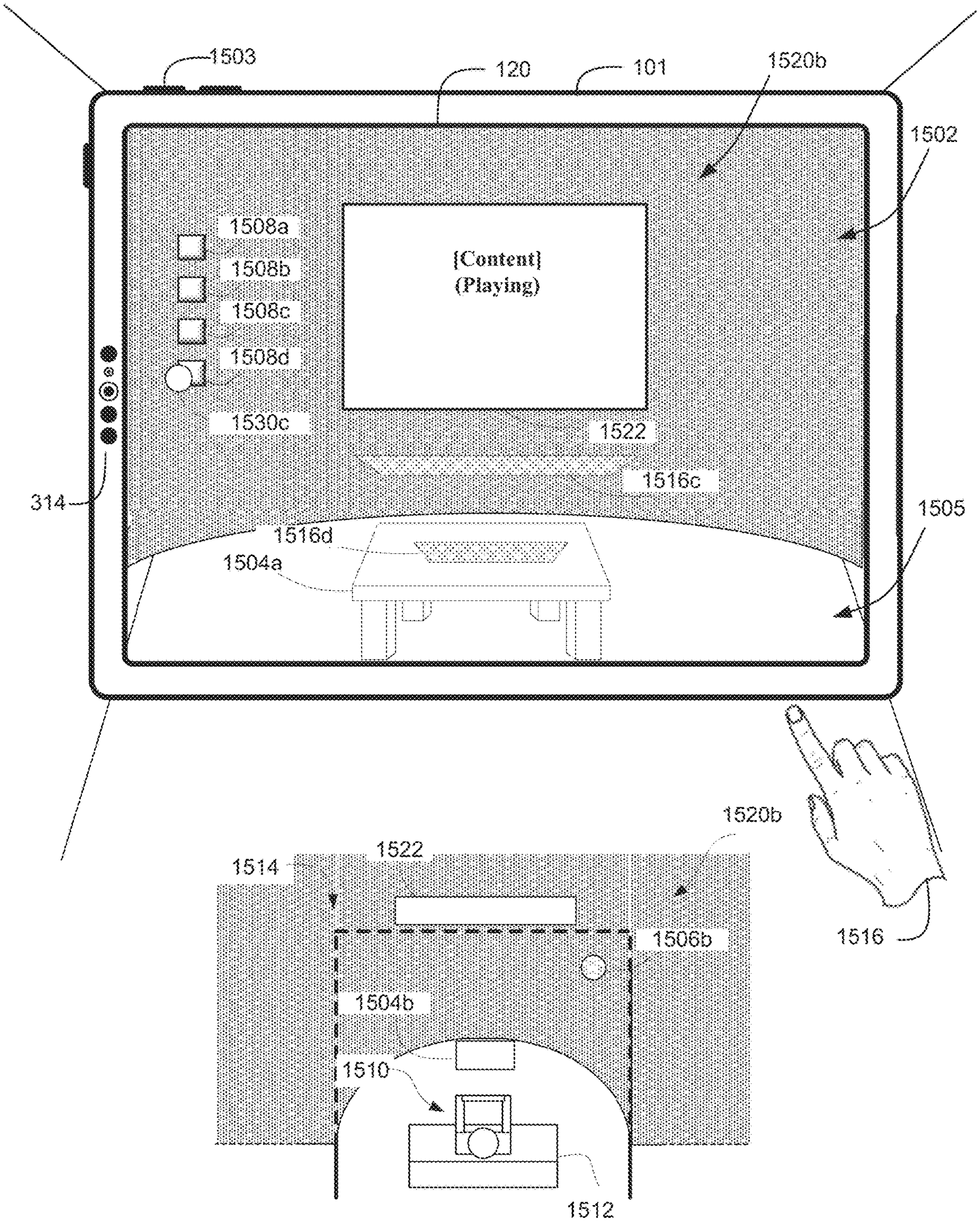
Figure 15G:
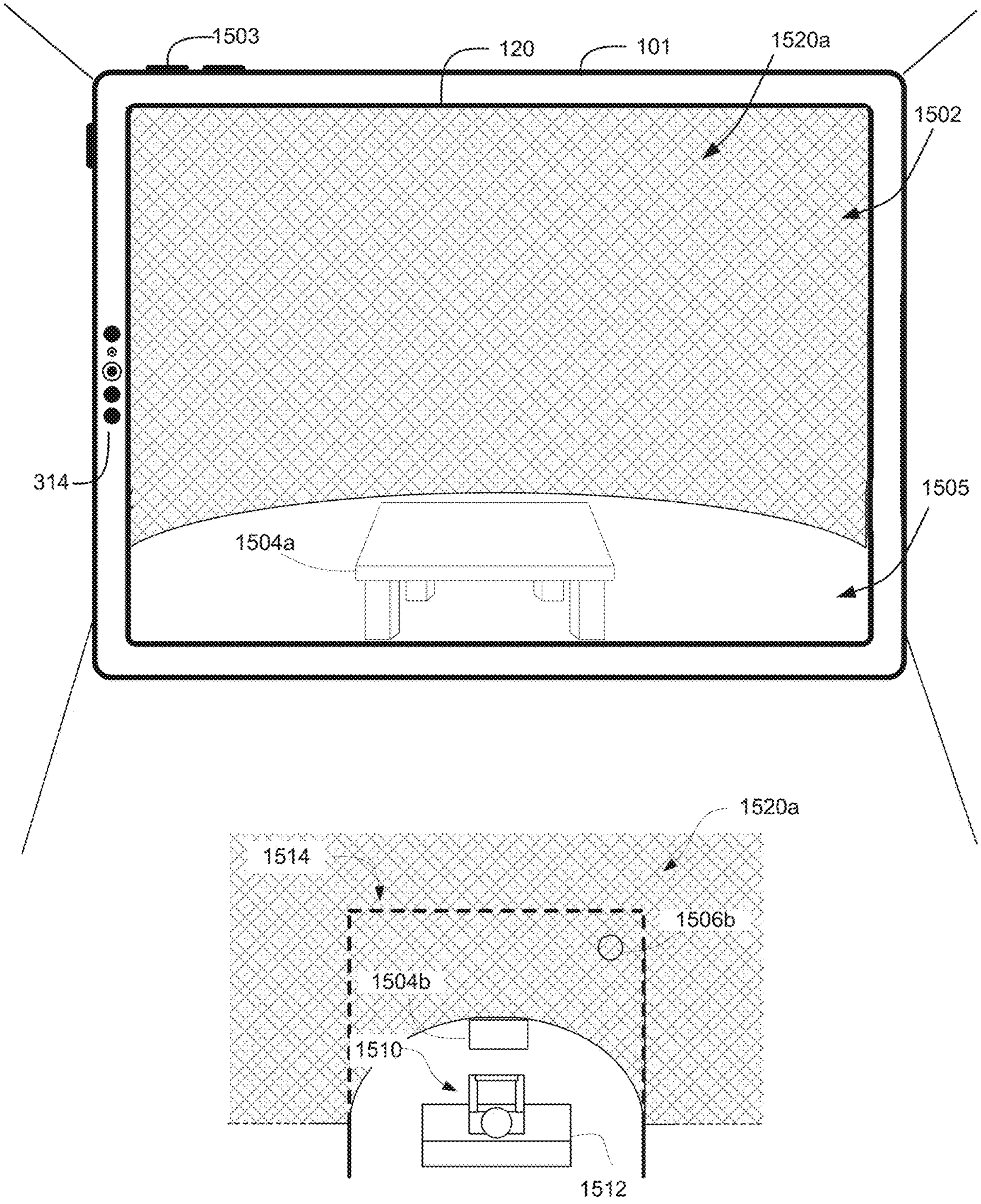
Figure 15H:
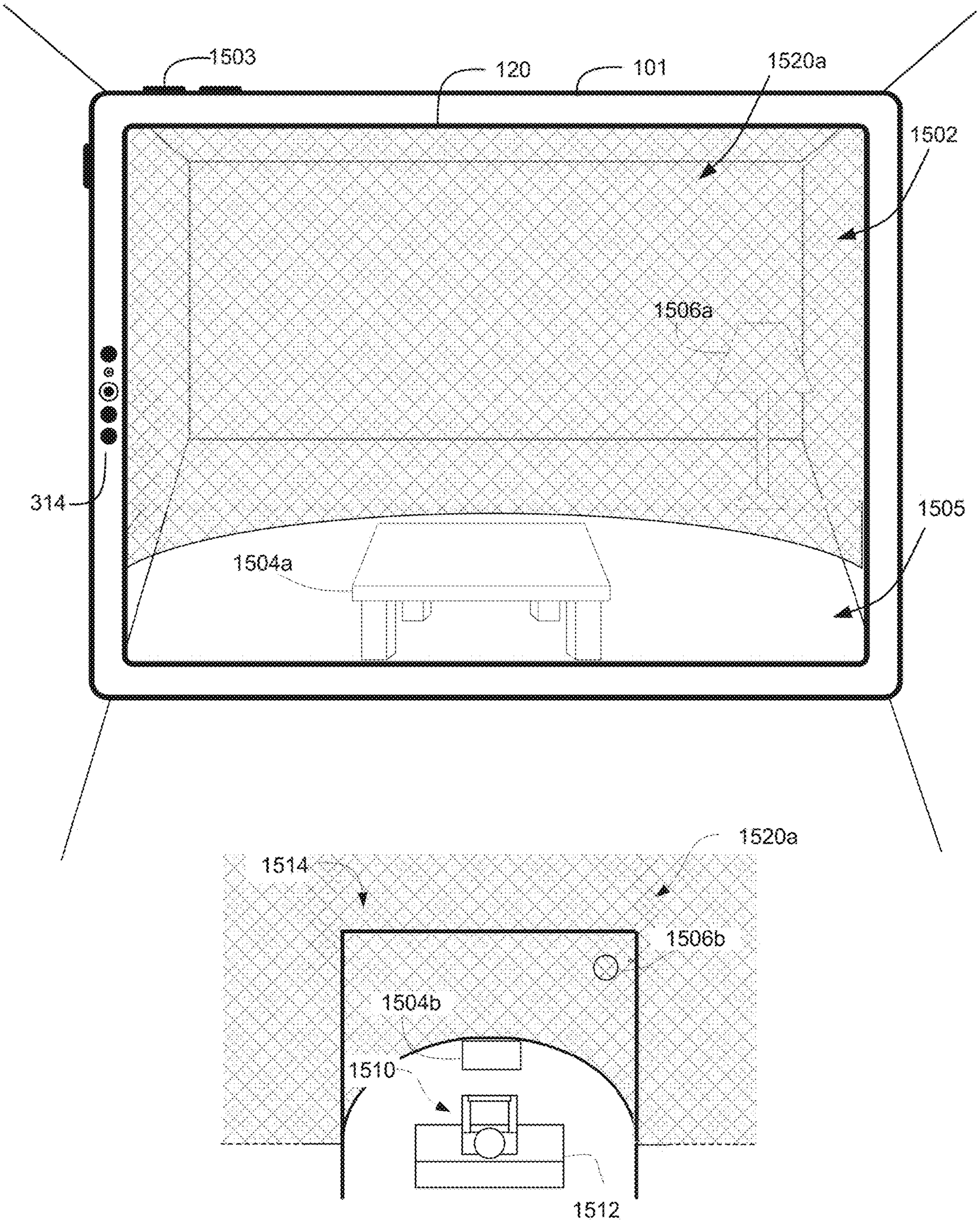
Figure 15I:
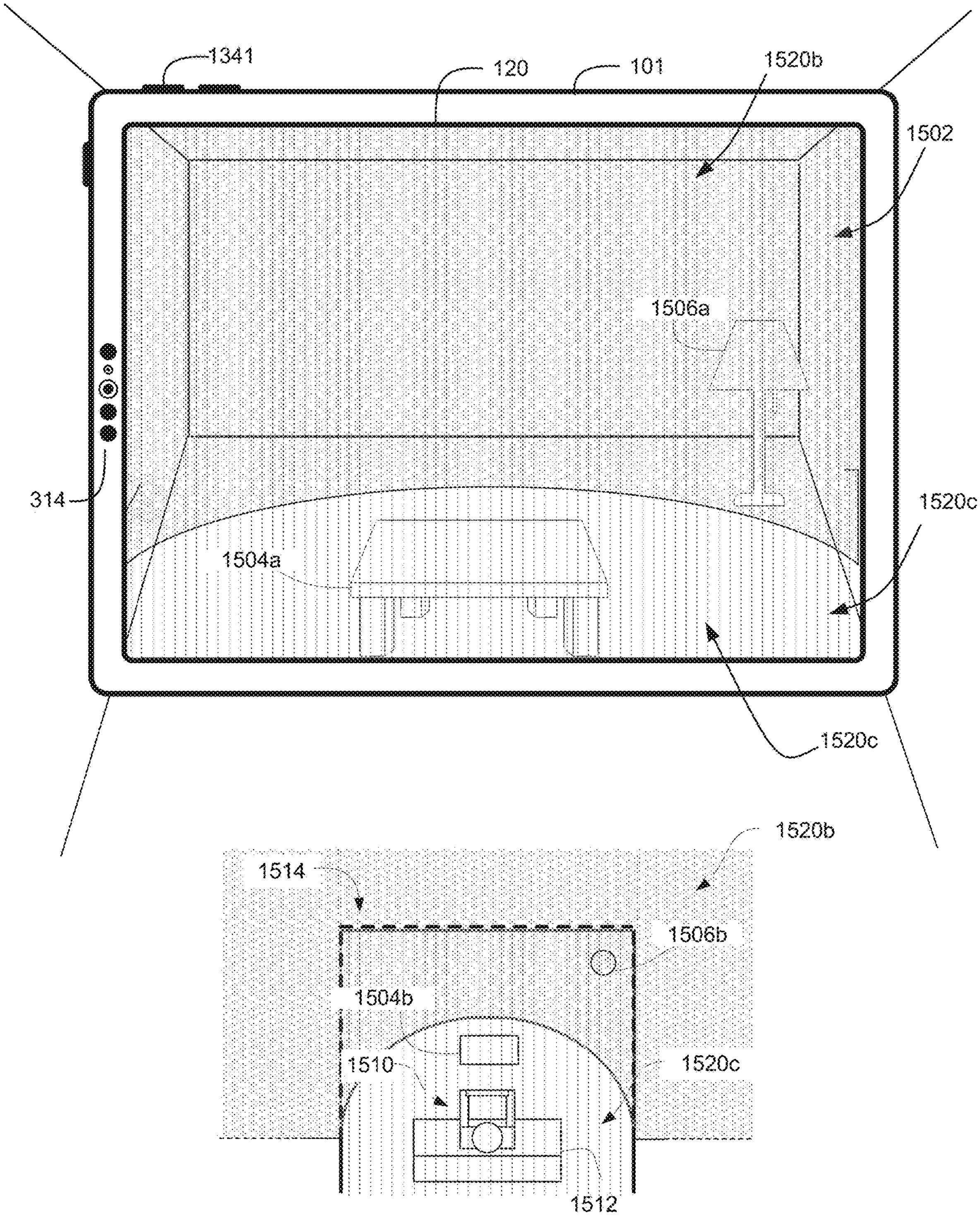
Figure 15J:
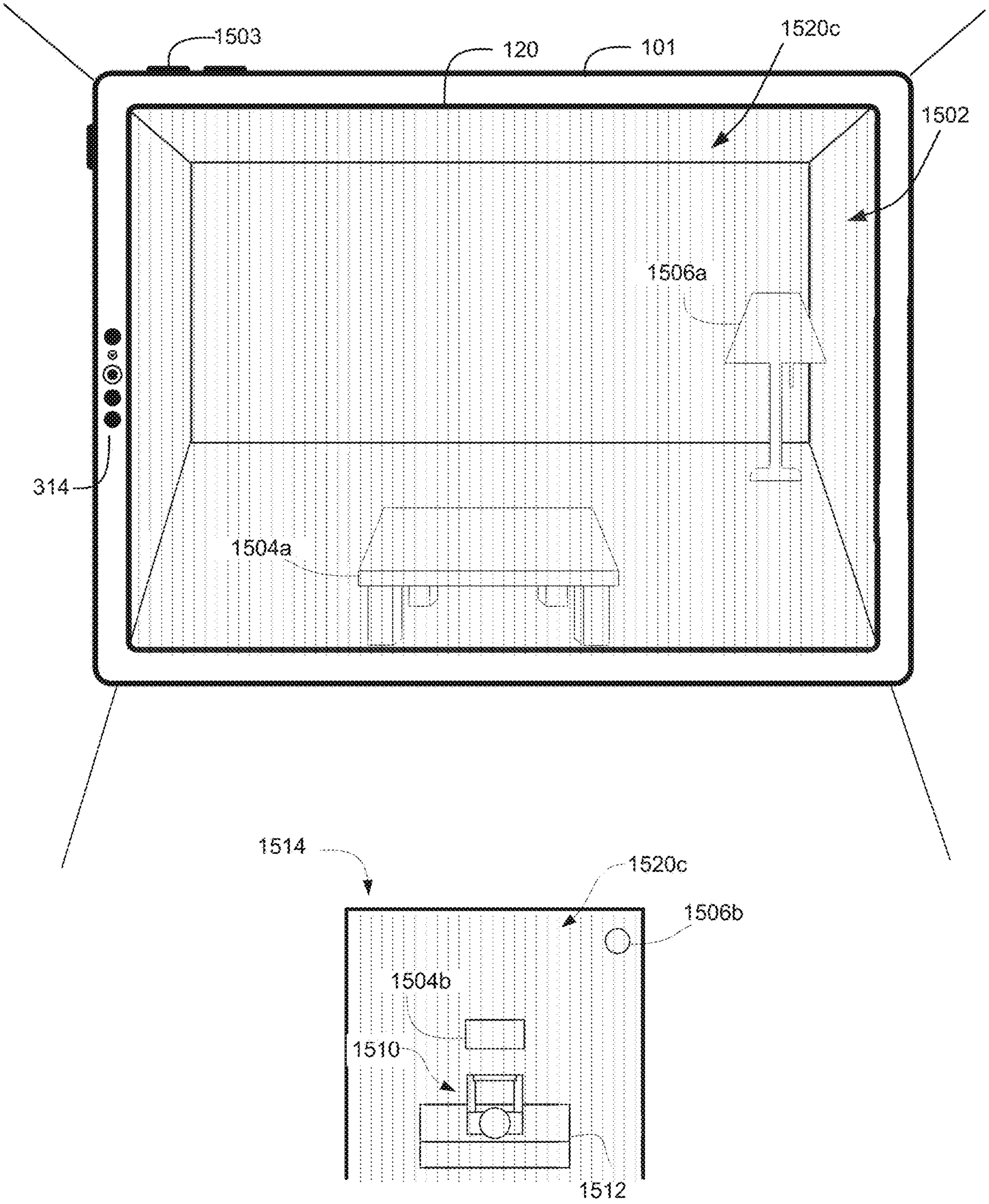
Figure 15K:
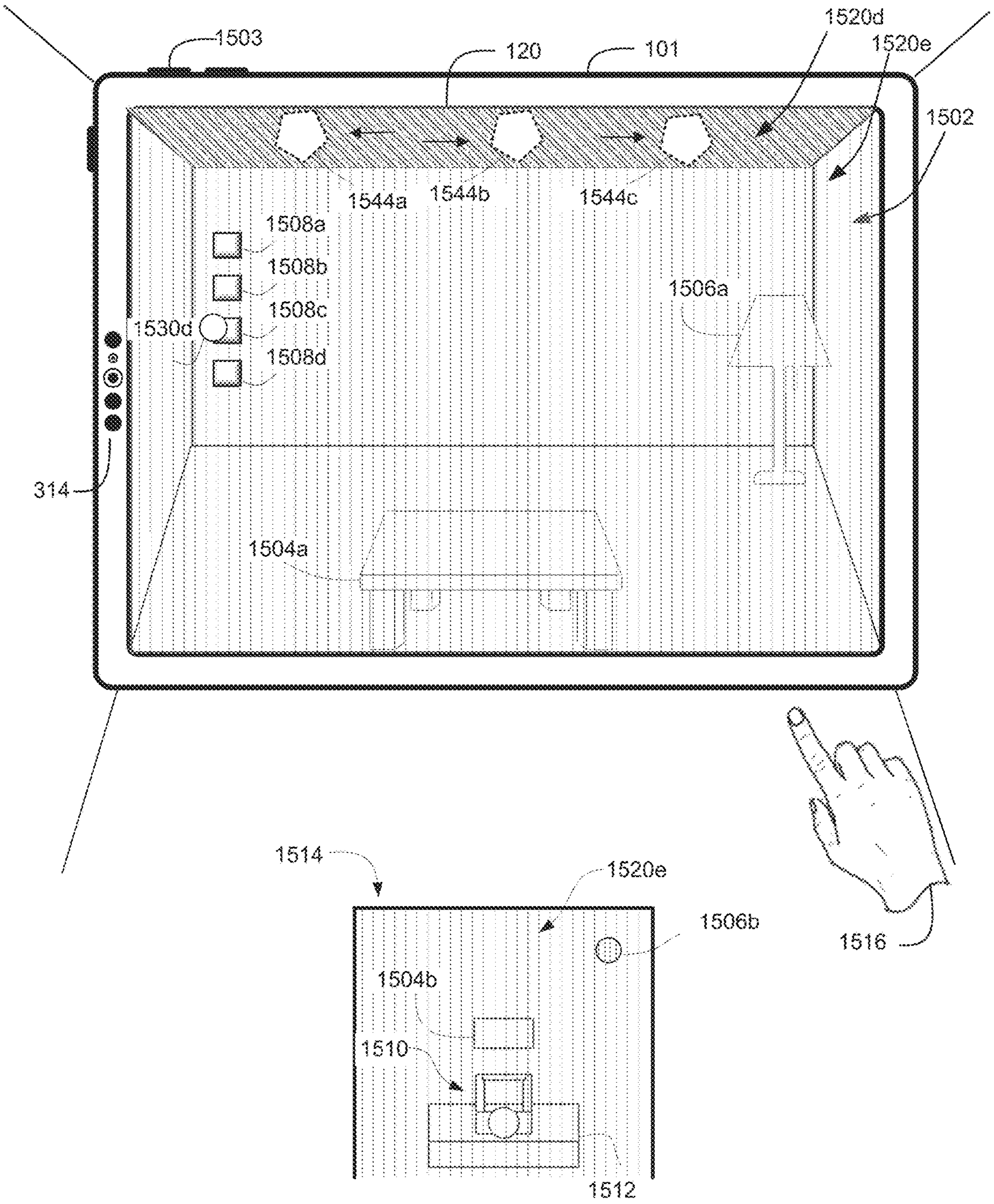
Figure 15L:
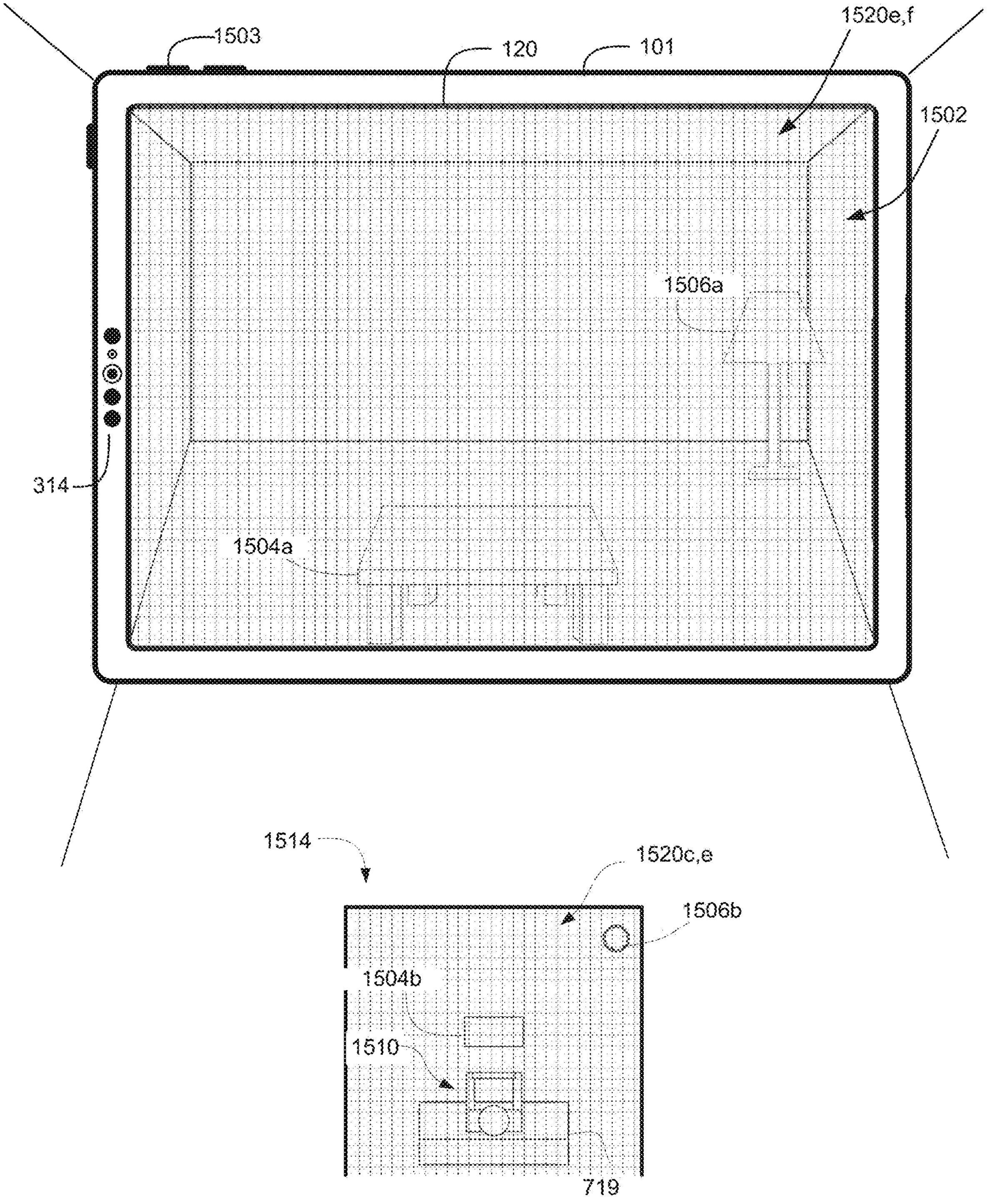
Figure 15M:
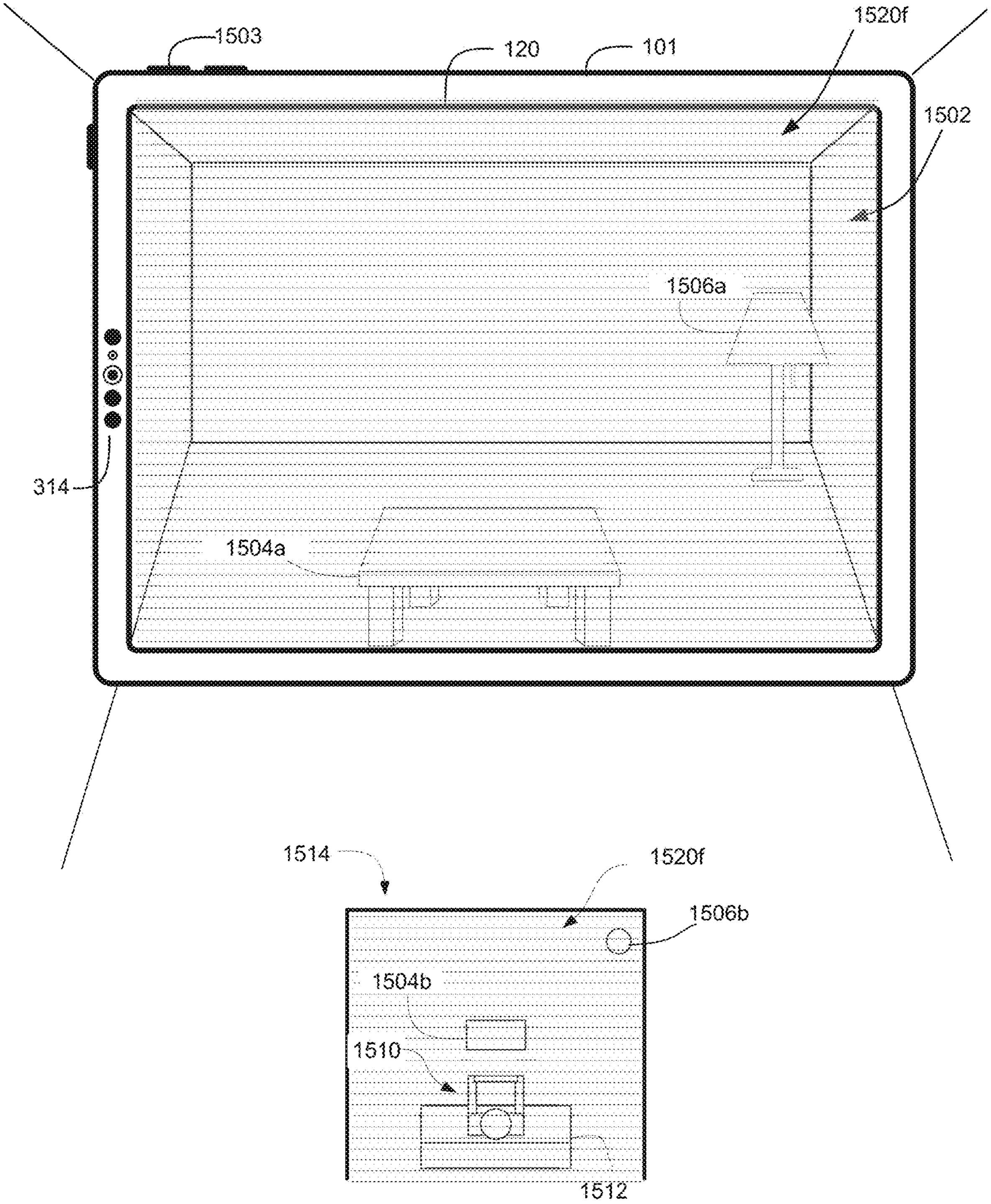

In some embodiments, in response to detecting the input 1530*a* indicating a selection of icon 1508*a* as shown in FIG. 15A, the computer system 101 transitions from displaying, in three-dimensional environment 1502, the representation of the physical environment 1505 to displaying a first virtual environment 1520*a* that is, optionally, superimposed on and/or occludes the representation of the physical environment 1505, as shown in FIGS. 15B-15C.

In some embodiments, computer system 101 transitions (e.g., automatically, without additional user inputs after selection of icon 1508*a*) from displaying the representation of the physical environment 1505 (e.g., as shown in FIG. 15A) to displaying the first virtual environment 1520*a* (e.g., as shown in FIG. 15C) using a visual transition that includes gradually increasing the visual prominence of the first virtual environment 1520*a* over a time duration e.g., 0.01, 0.05, 0.1, 0.3, 0.5, 1, 2, 5, or 10 seconds). Optionally, increasing the visual prominence of the first virtual environment 1520*a* includes fading in the colors of the first virtual environment 1520*a* as a temporal gradient transition. Optionally, increasing the visual prominence of the first virtual environment 1520*a* includes decreasing a transparency of the first virtual environment 1520*a* (e.g., fading out the first virtual environment 1520*a*). For example, in FIG. 15B, the first virtual environment 1520*a* has begun to fade in and is displayed with a first transparency that enables objects in the representation of the physical environment 1505 (e.g., lamp 1506*a*) to be visible through the first virtual environment 1520*a*.

In some embodiments, computer system 101 continues to increase the visual prominence of the first virtual environment 1520*a* until the first virtual environment 1520*a* is displayed at a final visual prominence (e.g., final opacity and/or brightness), such as until the first virtual environment 1520*a* is displayed opaquely and/or with its final colors, as represented by FIG. 15C.

Additional details regarding techniques that computer system 101 optionally uses to increase or decrease the visual prominence of environments during visual transitions between environments are discussed with reference to method 1600. For brevity, such details are not repeated in the following discussion of FIGS. 15B-15O. It should be understood, however, that subsequent descriptions of transitions that include "fading in" or "fading out" an environment optionally include additional or alternative techniques for increasing or decreasing the visual prominence of an environment as described with reference to method 1600.

In some embodiments, displaying the first virtual environment 1520*a* (e.g., as shown in FIGS. 15B-15C) includes displaying the first virtual environment 1520*a* at a particular immersion level. The immersion level optionally controls an amount (e.g., a percentage) of the representation of the physical environment 1505 in the field of view of the user 1510 that is occupied or occluded by the first virtual environment 1520*a* relative to the viewpoint of the user 1510. In the example of FIGS. 15B-15C, the first virtual environment 1520*a* is displayed at an immersion level that is less than full immersion such that the first virtual environment 1520*a* does not occupy all of three-dimensional environment 1502 (or all of the representation of the physical environment 1505) from the viewpoint of user 1510. As shown in the overhead view 1514 of FIGS. 15B-15C, the first virtual environment 1520*a* occupies the portion of representation of the physical environment 1505 that includes the representation of the back wall of the physical environment from the viewpoint of the user 1510.

Figure 15N:
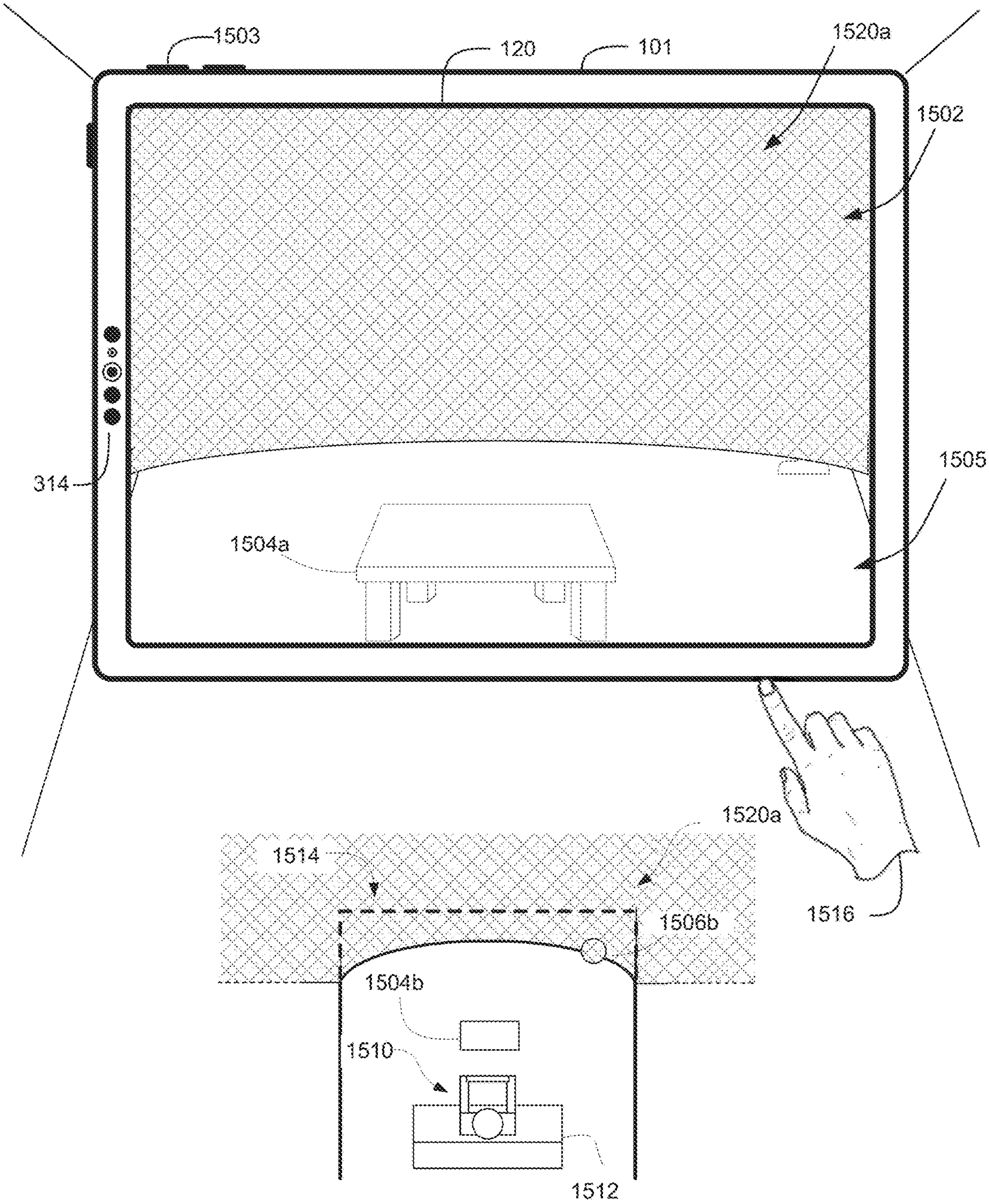
Figure 15O:
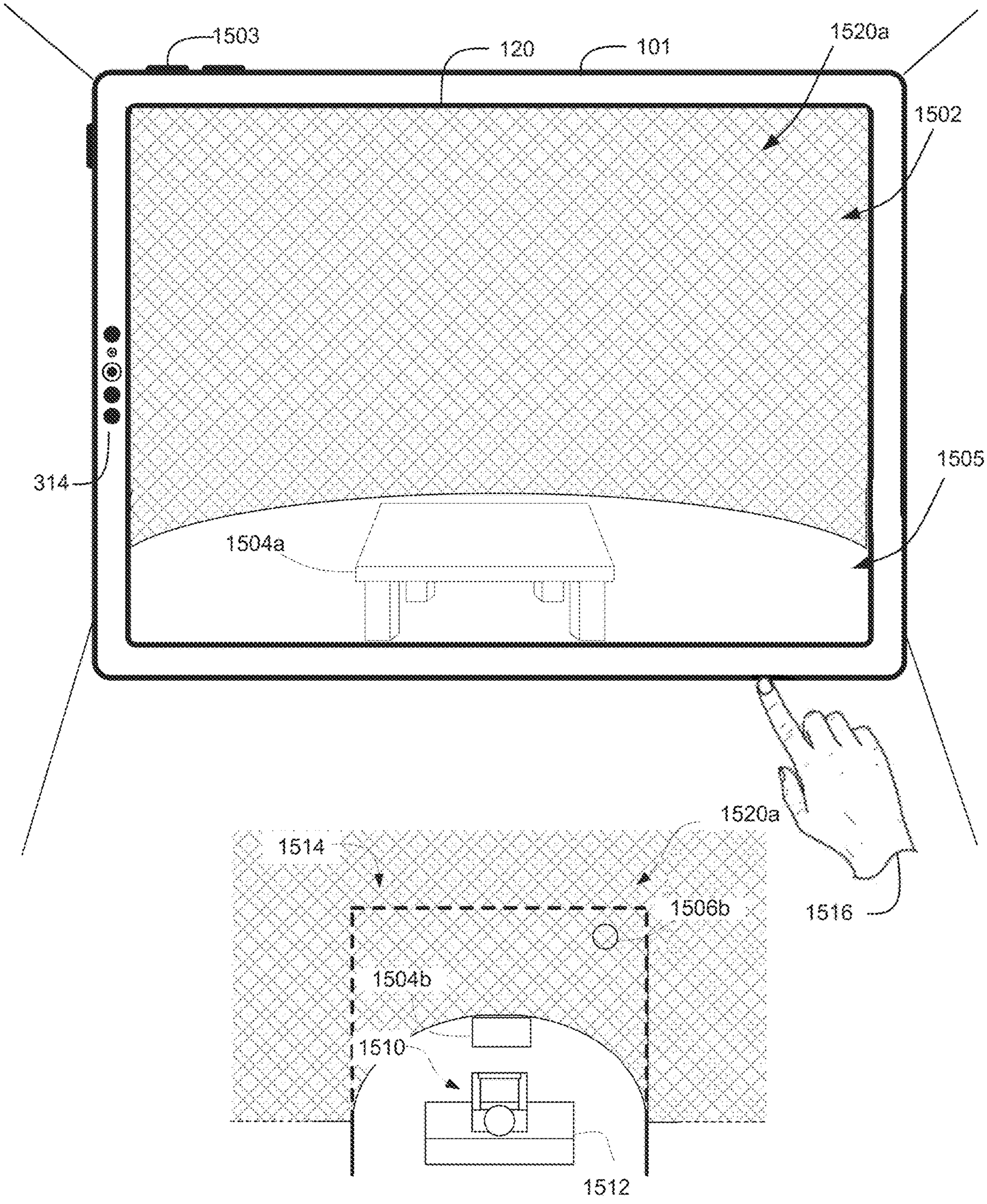
Figure 16A:
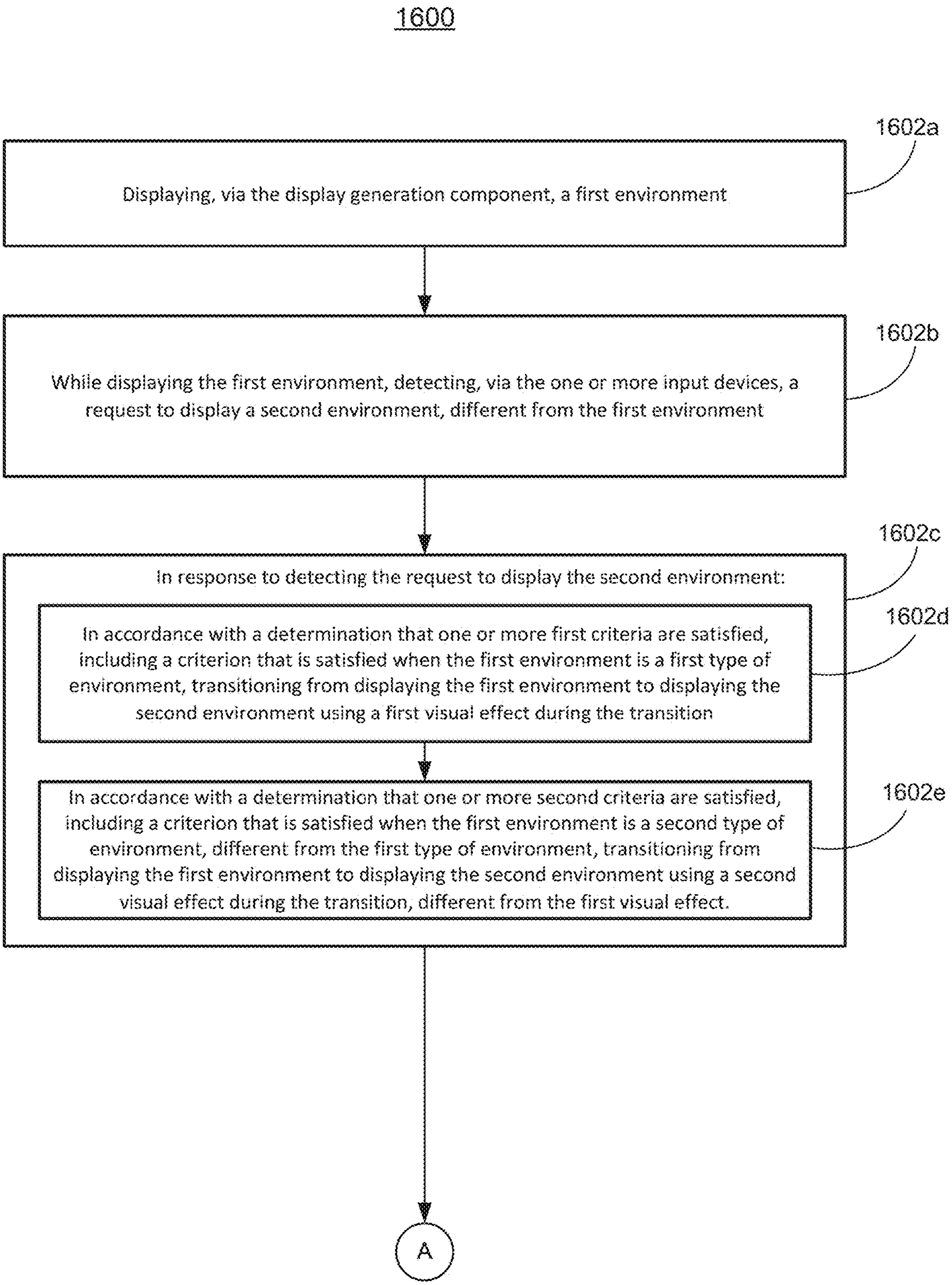
FIGS. 16A-16J depict a flowchart illustrating a method of transitioning between display of different three-dimensional environments in accordance with some embodiments.
Figure 16B:
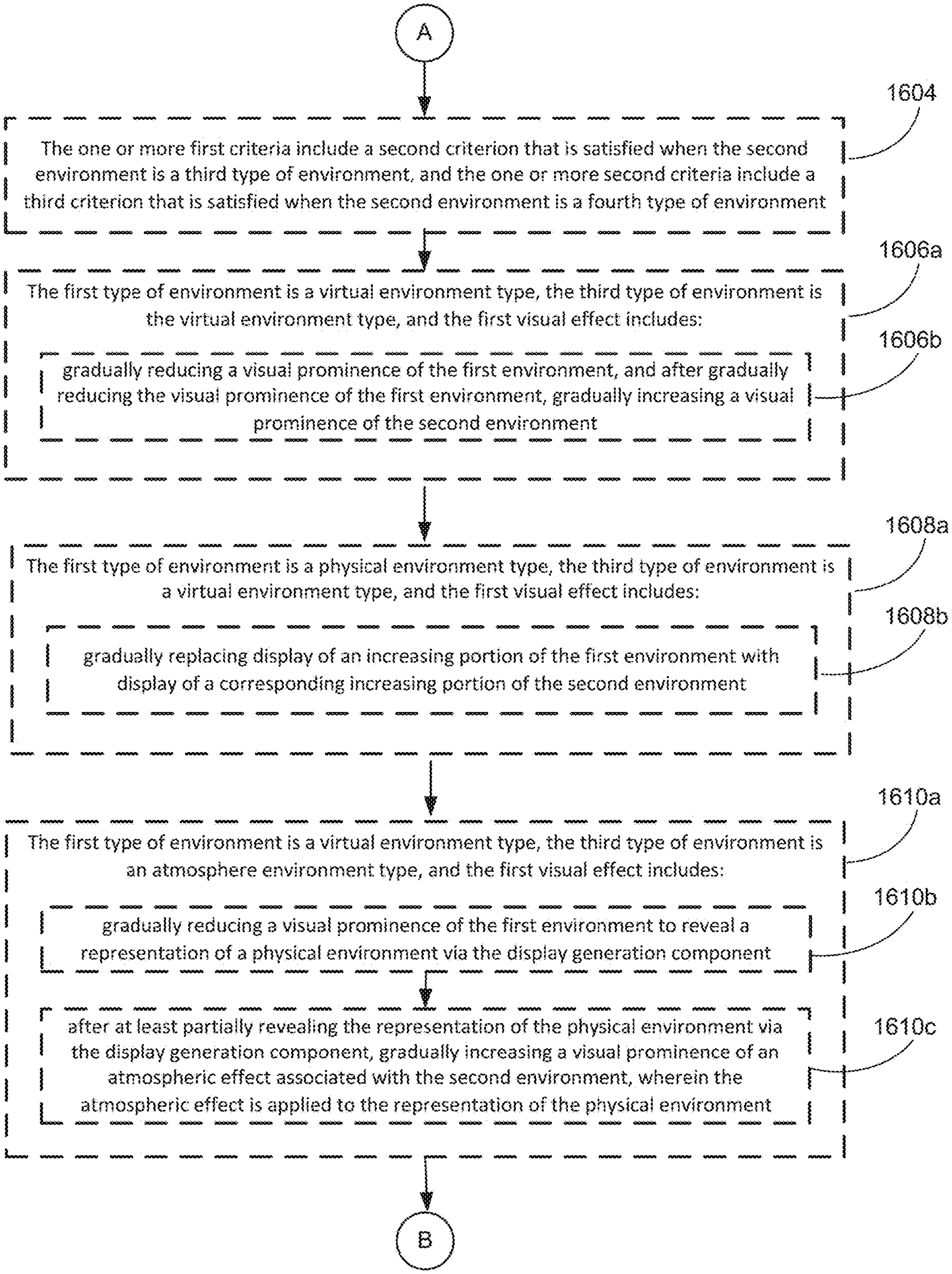
Figure 16C:
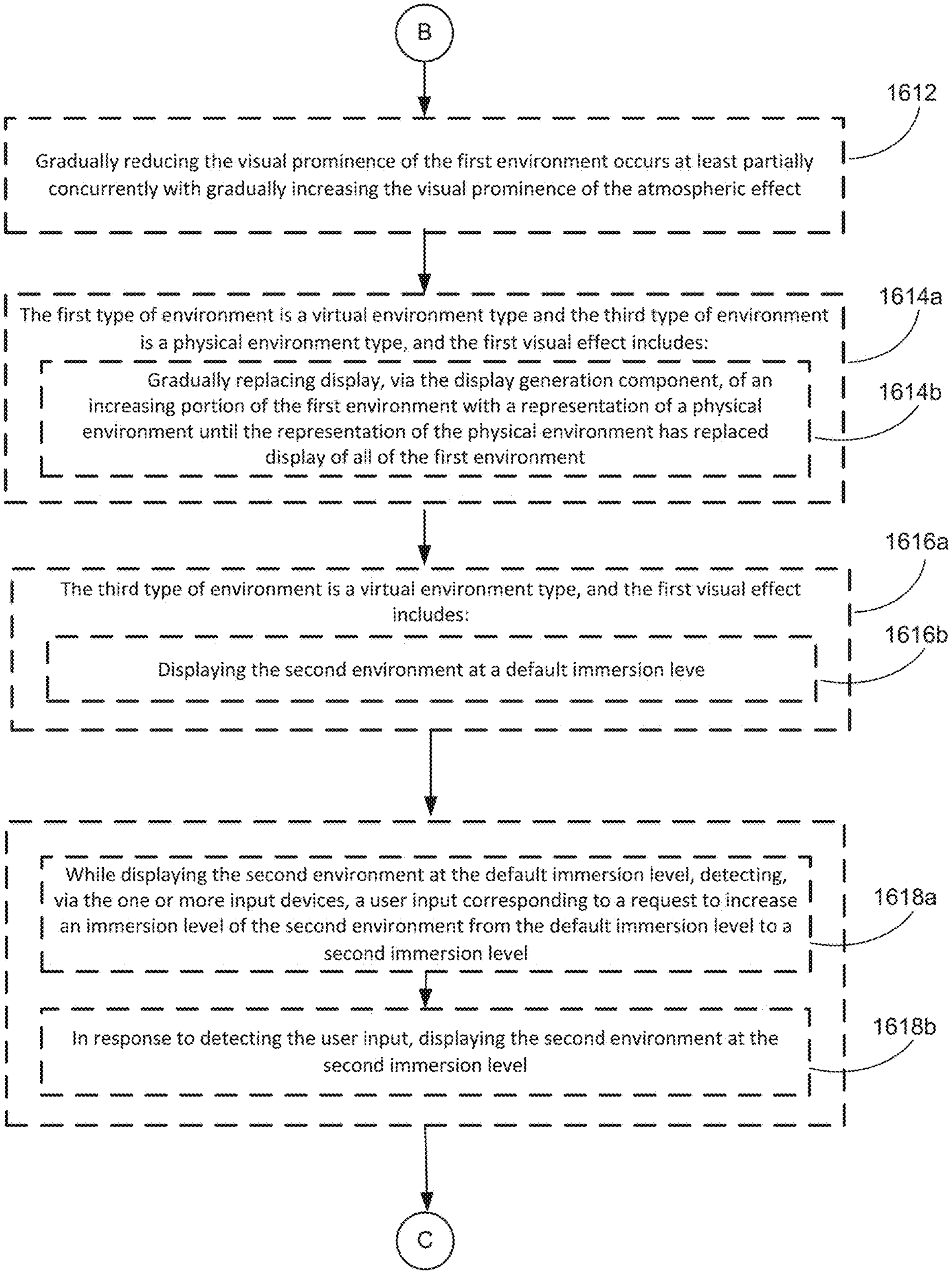
Figure 16D:
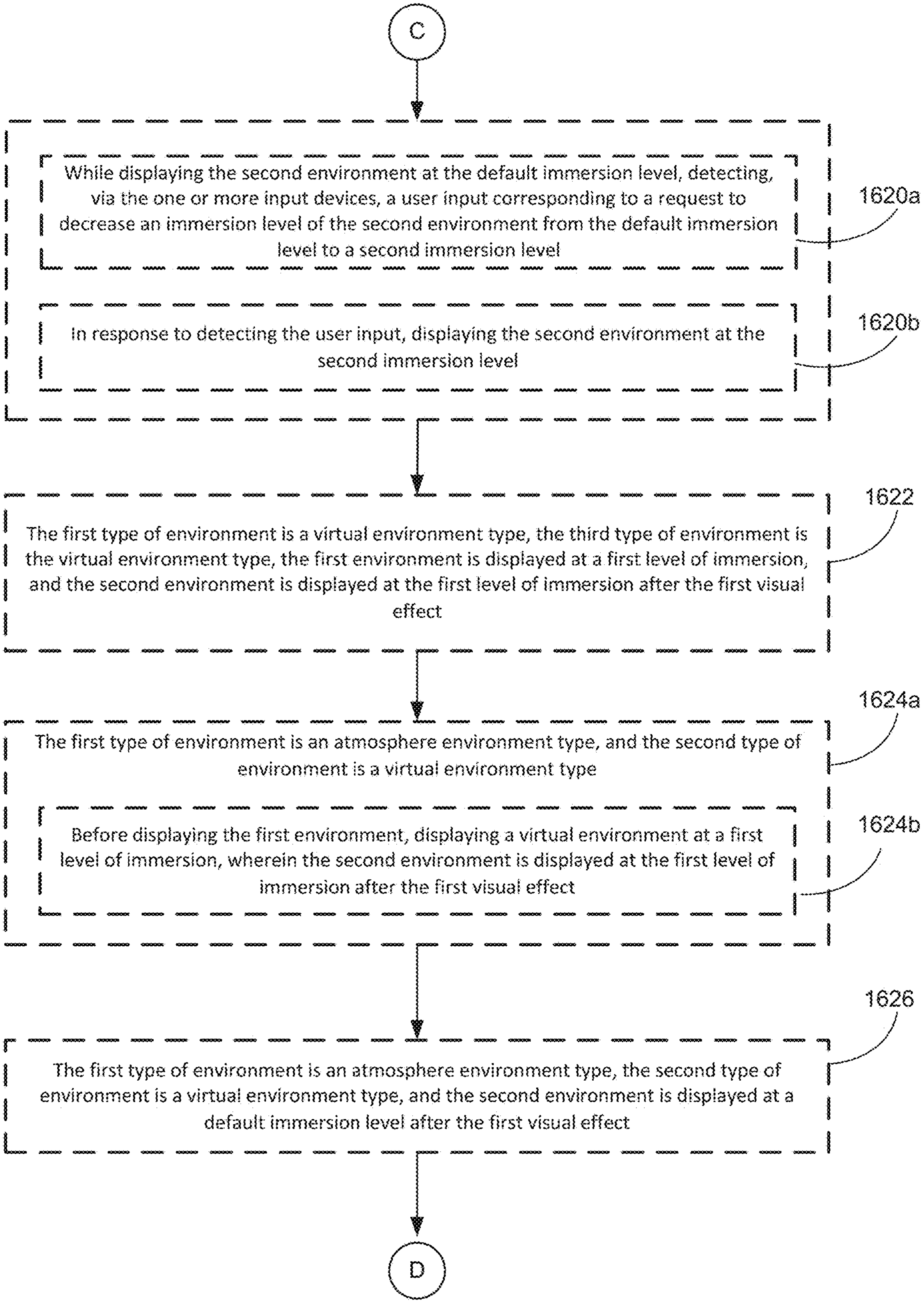
Figure 16E:
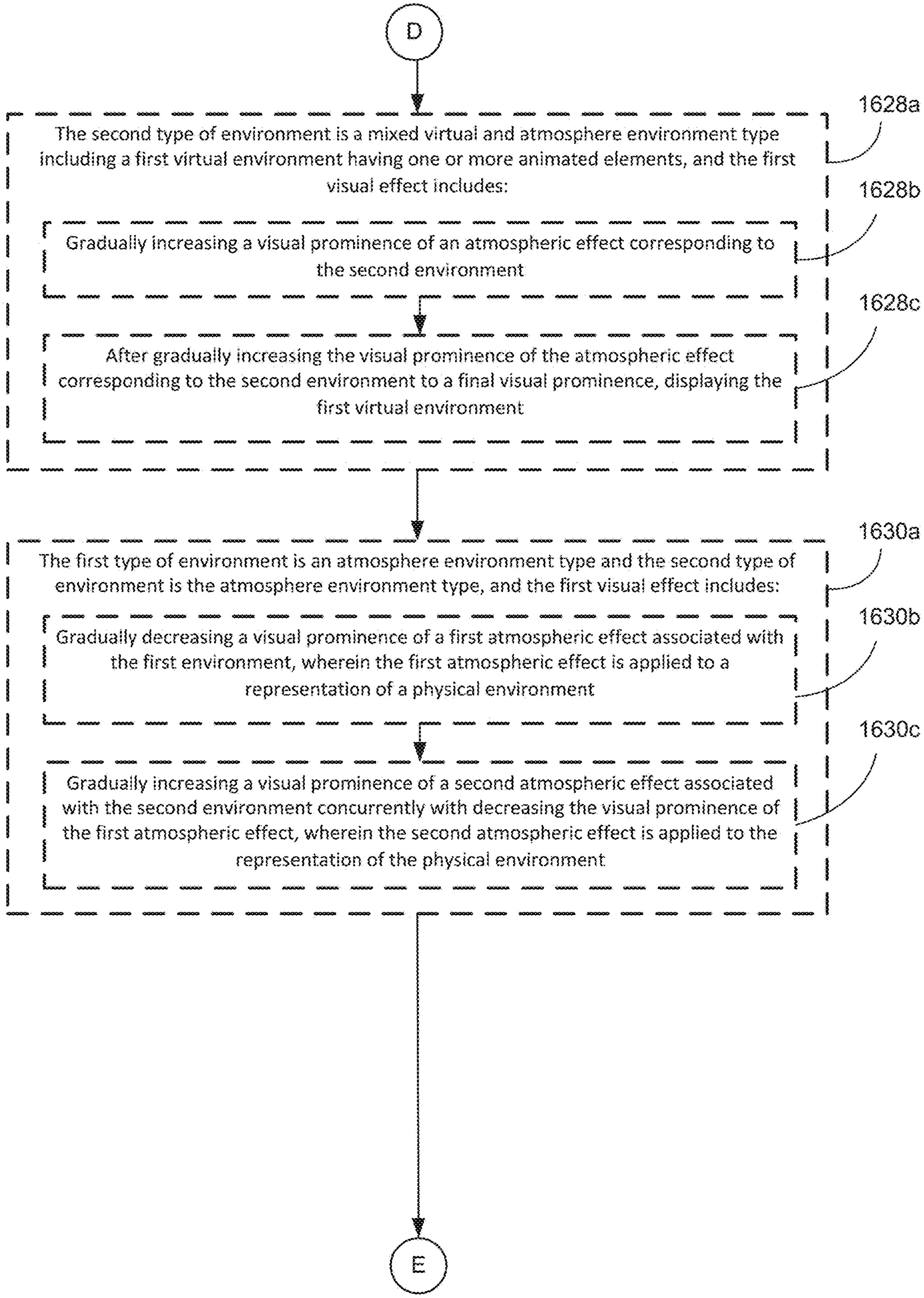
Figure 16F:
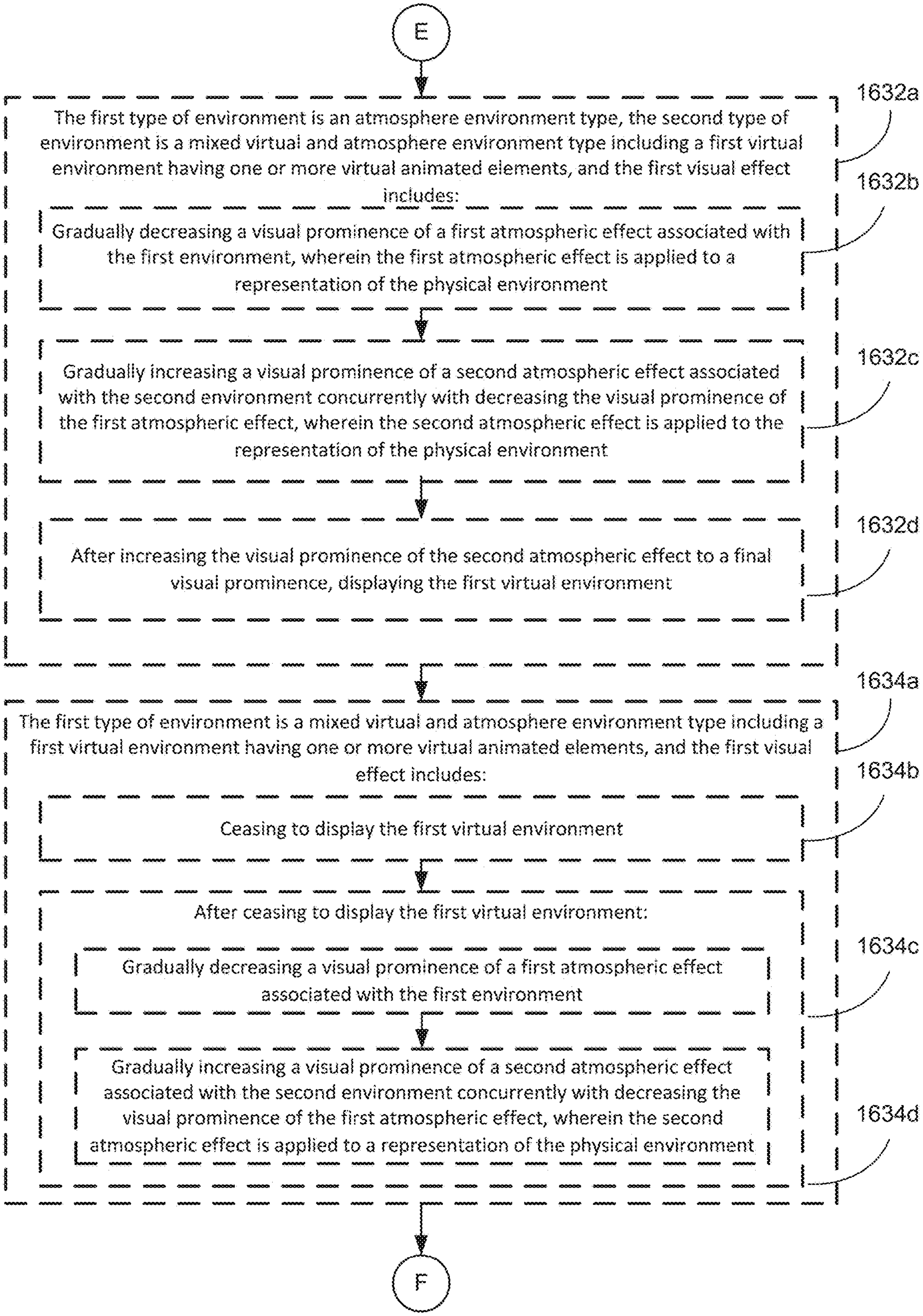
Figure 16G:
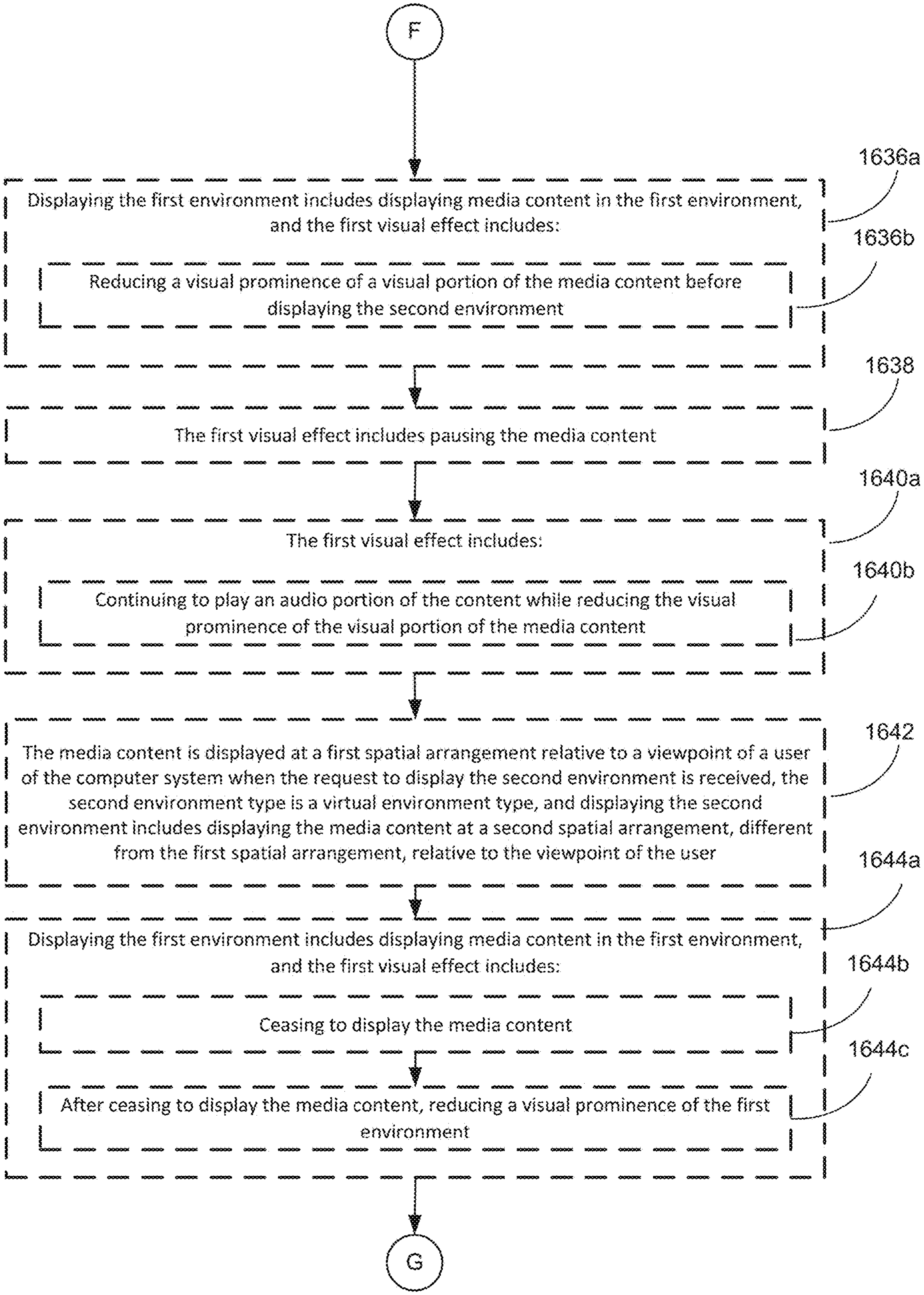
Figure 16H:
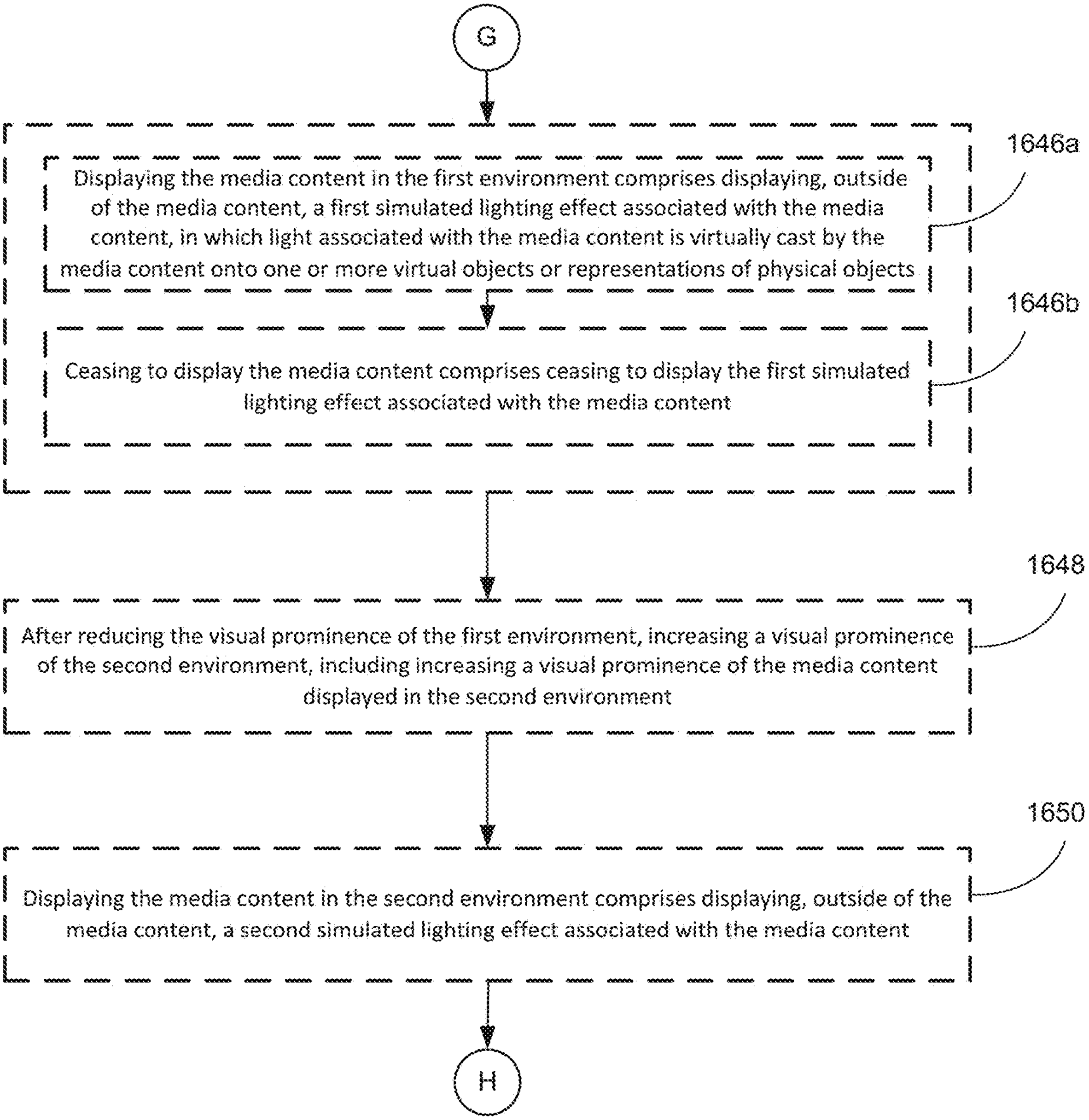
Figure 16I:
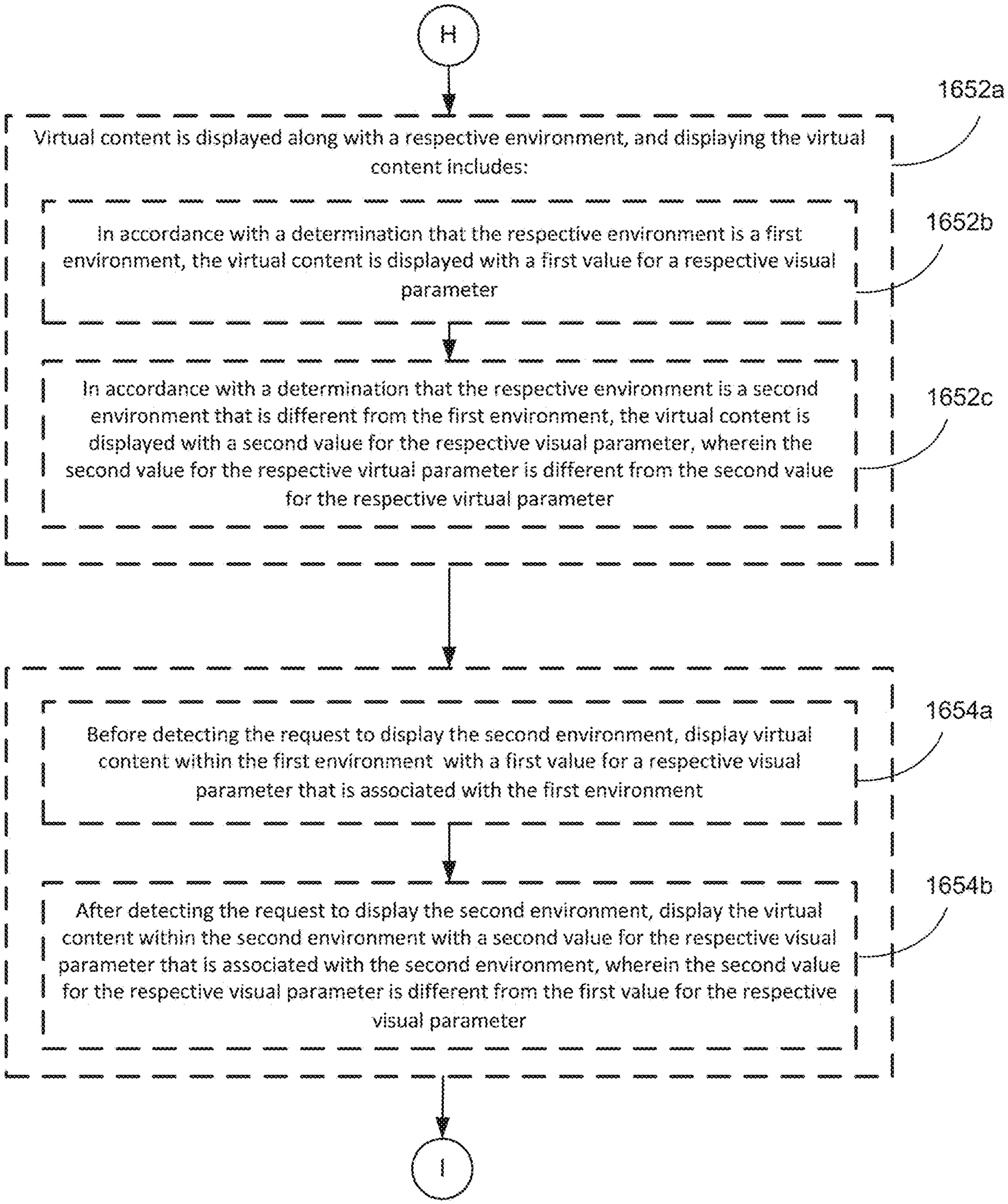
Figure 16J:
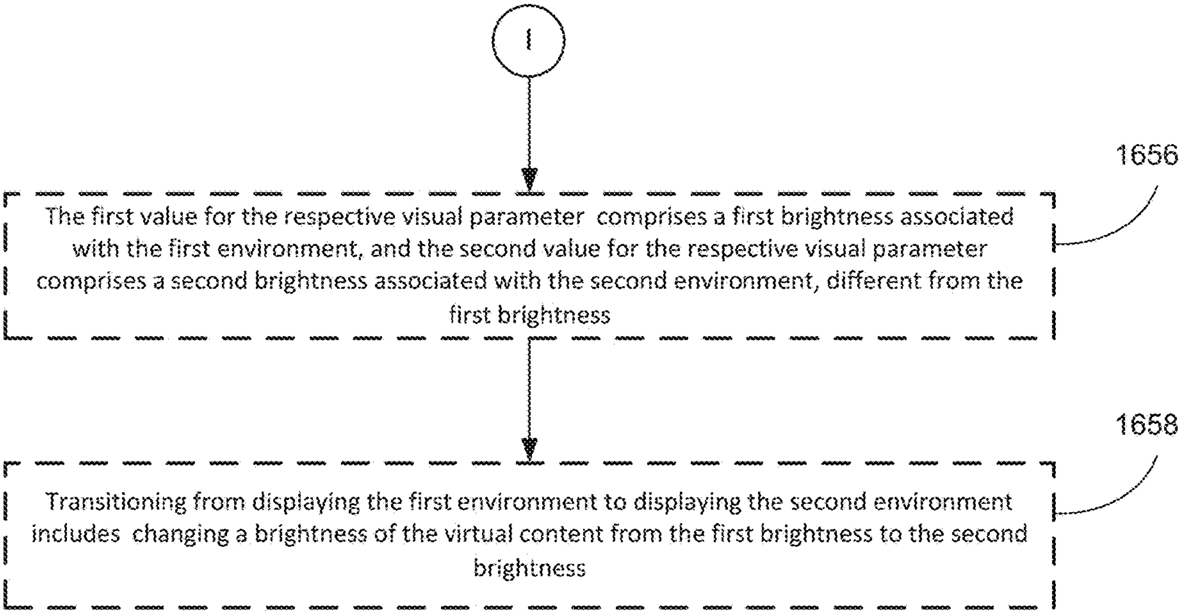

FIG. 15N depicts an example of displaying the first virtual environment 1520*a* at a lower immersion level than is shown in FIGS. 15B-15C, in which more of the representation of the physical environment 1505 is visible to the user 1510.

In some embodiments, when computer system 101 transitions from displaying a representation of a physical environment 1505 to displaying a first virtual environment 1520*a*, computer system 101 displays the first virtual environment 1520*a* at a default immersion level. The default immersion level is optionally set by the user 1510 or is pre-programmed into computer system 101. In some embodiments, when computer system 101 transitions to displaying a virtual environment (e.g., from another virtual environment, from a representation of a physical environment, or from an atmosphere environment), computer system 101 displays the virtual environment at an immersion level that was selected by the user 1510 during a previous display of a different virtual environment, as discussed in more detail with reference to FIGS. 15E-15F.

In FIG. 15C, the first virtual environment 1520*a* is depicted as it appears after the visual transition is complete; e.g., after the colors of the first virtual environment 1520*a* have been fully faded in and the first virtual environment 1520*a* is displayed opaquely. In FIG. 15C, because the height of the first virtual environment 1520*a* is coincident with the middle of the surface of the back wall (e.g., the boundary of first virtual environment 1520*a* is directly in front of the back wall), the first virtual environment 1520*a* may appear as if it begins at the surface of the back wall. In FIG. 15C, overhead view 1514 indicates that the center of the back wall of the representation of the physical environment 1505 is no longer visible (e.g., is no longer displayed) in three-dimensional environment 1502 (e.g., as indicated by the dotted lines), and in its place is a view into the first virtual environment 1520*a*, which optionally appears to extend into the distance in accordance with the size, dimensions, and/or depth of the first virtual environment 1520*a* (e.g., extending outwards from the back wall at a normal angle from the viewpoint of user 1510).

As shown in FIG. 15C, displaying a first virtual environment 1520*a* optionally includes displaying content 1522 (e.g., virtual content) within the first virtual environment 1520*a*, such as displaying audio-visual media content that changes over time, or other types of virtual content such as virtual application windows. The content 1522 is optionally displayed in the first virtual environment 1520*a* at a first spatial arrangement within the first virtual environment 1520*a* such that it appears at a particular location, height, and/or depth to the user 1510 (e.g., as illustrated by the content 1522 in the overhead view 1514). For example, in FIG. 15C, the content 1522 may appear to the user 1510 to be displayed at a depth in the first virtual environment 1520*a* that is between the representation of the coffee table 1504*a* and the back wall.

In some embodiments, if content 1522 is displayed within first virtual environment 1520*a*, computer system 101 simulates the effect of light emitted by content 1522 into three-dimensional environment 1502. For example, simulated light effects (such as virtual illumination, tints, reflections, and/or shadows) associated with the content 1522 are optionally displayed by computer system 101 within the first virtual environment 1520*a*, as represented by simulated light effect 1516*a*. In some embodiments, simulated light effects associated with content 1522 are, additionally or alternatively, displayed by computer system 101 in areas of three-dimensional environment 1502 that are outside of the first virtual environment 1520*a* (e.g., if the first virtual environment 1520*a* is not displayed at full immersion, such as shown in FIG. 15C). For example, simulated light effect 1516*b* represents simulated light effects associated with content 1522 that are displayed in the portion of the representation of the physical environment 1505 that is not occluded by the first virtual environment 1520*a*, optionally including virtual tints or reflections that are cast on the representation of coffee table 1504*a* by the content 1522. In some embodiments, simulated light effects 1516*a*-1516*b* change over time based on the content 1522 changing over time. Additional details regarding simulated light effects are described with reference to method 1600.

In some embodiments, the content is displayed with a first value of a respective visual parameter. For example, the content is optionally displayed with a first value of a tint, hue brightness, saturation, and/or contrast. In some embodiments, the first value of the respective visual parameter is associated with the first virtual environment 1520*a*, such as by being a configuration setting associated with the first virtual environment 1520*a* and/or being determined by various characteristics of the first virtual environment 1520*a* (such as colors of the first virtual environment, a brightness of the first virtual environment, and/or other characteristics of the first virtual environment).

In FIG. 15C, while displaying the first virtual environment 1520*a*, computer system 101 detects an input 1530*b* indicating a selection of icon 1508*b*, where icon 1508*b* represents a second virtual environment. The input 1530*b* optionally has one or more of the characteristics of input 1530*a* described with reference to FIG. 15A.

In some embodiments, in response to detecting the input 1530*b* indicating a selection of icon 1508*b* as shown in FIG. 15C, computer system 101 transitions (e.g., automatically, without additional user inputs after selection of icon 1508*b*) from displaying the first virtual environment 1520*a* (e.g., as shown in FIG. 15C) within the three-dimensional environment 1502 to displaying the second virtual environment 1520*b* (e.g., as shown in FIG. 15F) within the three-dimensional environment 1502 by gradually decreasing the visual prominence of virtual environment 1520*a* until the first virtual environment 1520*a* is no longer visible and then gradually increasing the visual prominence of virtual environment 1520*b*. This transition is depicted by FIGS. 15D-15F, which represent discrete times during the transition from displaying the first virtual environment 1520*a* to displaying the second virtual environment 1520*b*.

FIG. 15C1 illustrates similar and/or the same concepts as those shown in FIG. 15C (with many of the same reference numbers). It is understood that unless indicated below, elements shown in FIG. 15C1 that have the same reference numbers as elements shown in FIGS. 15A-15O have one or more or all of the same characteristics. FIG. 15C1 includes computer system 101, which includes (or is the same as) display generation component 120. In some embodiments, computer system 101 and display generation component 120 have one or more of the characteristics of computer system 101 shown in FIGS. 15C and 15A-15O and display generation component 120 shown in FIGS. 1 and 3, respectively, and in some embodiments, computer system 101 and display generation component 120 shown in FIGS. 15A-15O have one or more of the characteristics of computer system 101 and display generation component 120 shown in FIG. 15C1.

In FIG. 15C1, display generation component 120 includes one or more internal image sensors 314*a* oriented towards the face of the user (e.g., eye tracking cameras 540 described with reference to FIG. 5). In some embodiments, internal image sensors 314*a* are used for eye tracking (e.g., detecting a gaze of the user). Internal image sensors 314*a* are optionally arranged on the left and right portions of display generation component 120 to enable eye tracking of the user's left and right eyes. Display generation component 120 also includes external image sensors 314*b* and 314*c* facing outwards from the user to detect and/or capture the physical environment and/or movements of the user's hands. In some embodiments, image sensors 314*a*, 314*b*, and 314*c* have one or more of the characteristics of image sensors 314 described with reference to FIGS. 15A-15O.

In FIG. 15C1, display generation component 120 is illustrated as displaying content that optionally corresponds to the content that is described as being displayed and/or visible via display generation component 120 with reference to FIGS. 15A-15O. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 15C1.

Display generation component 120 has a field of view (e.g., a field of view captured by external image sensors 314*b* and 314*c* and/or visible to the user via display generation component 120, indicated by dashed lines in the overhead view) that corresponds to the content shown in FIG. 15C1. Because display generation component 120 is optionally a head-mounted device, the field of view of display generation component 120 is optionally the same as or similar to the field of view of the user.

In FIG. 15C1, the user is depicted as performing an air pinch gesture (e.g., with hand 1516) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 15A-15O.

In some embodiments, computer system 101 responds to user inputs as described with reference to FIGS. 15A-15O.

In the example of FIG. 15C1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 15A-15O and/or described with reference to the corresponding method(s) are optionally implemented on computer system 101 and display generation unit 120 in a manner similar or analogous to that shown in FIG. 15C1.

In FIG. 15D, the first virtual environment 1520*a* has begun to fade out (relative to FIG. 15C) and is displayed with a transparency level that enables objects in the representation of the physical environment 1505 (e.g., lamp 1506*a*) to be visible through the first virtual environment 1520*a*.

As shown in FIG. 15D, if displaying the first virtual environment 1520*a* includes displaying content 1522 (e.g., as described with reference to FIG. 15C) and the content is (for example) content that changes over time, such as media content, computer system 101 optionally pauses the playback of the content 1522 during some or all of the transition from the first virtual environment 1520*a* to the second virtual environment 1520*b* (e.g., while continuing to display the paused content 1522 and, optionally, the simulated light effects 1516*a*, 1516*b*). In some embodiments, computer system 101 pauses playback of a visual portion of the content 1522 during the transition and does not pause playback of an audio portion of the content 1522 during the transition (e.g., computer system 101 continues to play the audio portion during the transition). In some embodiments, fading out the first virtual environment 1520*a* includes fading out the content 1522 and/or the simulated light effects 1516*a*-1516*b*.

Optionally, the computer system changes (e.g., increases or decreases) a brightness of the content before, during, and/or after transitions between environments, such as during the transition from the first virtual environment 1520*a* to the second virtual environment. 1520*b*.

In FIG. 15E, the first virtual environment 1520*a* has faded out completely (e.g., is no longer displayed) and the second virtual environment 1520*b* has begun to fade in and is displayed with a first transparency that enables objects in the representation of the physical environment 1505 (e.g., lamp 1506*a*) to be visible through the second virtual environment 1520*b*.

In the example of FIG. 15E, the content 1522 continues to be displayed in the second virtual environment 1520*b* and remains paused as the second virtual environment 1520*b* fades in. Optionally, displaying the content 1522 in the second virtual environment 1520*b* includes displaying simulated light effects associated with the content 1522 in the three-dimensional environment 1502, which is optionally the same or different as the simulated light effects displayed in the first virtual environment 1520*a*. For example, simulated light effects associated with the content 1522 are optionally displayed within the second virtual environment 1520*b*, as represented by simulated light effect 1516*c*, and/or outside the second virtual environment 1520*b*, as represented by simulated light effect 1516*d*. In some embodiments, fading in the second virtual environment 1520*b* includes fading in the content 1522 and/or the simulated light effects 1516*c*, 1516*d*. Optionally, computer system 101 displays the content 1522 and/or simulated light effects 1516*c*, 1516*d* in different virtual locations in the second virtual environments 1520*b* than the virtual locations in which the content 1522 and/or simulated light effects 1516*a*, 1516*b* were displayed in the first virtual environment 1520*a*. For example, in FIG. 15E-15F, the content 1522 may appear to the user 1510 to be displayed at a depth in the first virtual environment 1520*a* that is behind the back wall of rather than between the representation of the coffee table 1504*a* and the back wall as shown in FIG. 15C.

Optionally, the content 1522 is displayed in the second virtual environment 1520*b* with a second value for the respective visual parameter, different from the first value for the respective visual parameter. For example, the content 1522 is optionally displayed with increased or decreased brightness in the second virtual environment 1520*b* relative to the brightness at which it is displayed in the first virtual environment 1520*b*. In some embodiments, the second value of the respective visual parameter is associated with the second virtual environment 1520*b*, such as by being a configuration setting associated with the second virtual environment 1520*b* and/or being determined by various characteristics of the second virtual environment 1520*b* (such as colors of the second virtual environment, a brightness of the second virtual environment, and/or other characteristics of the second virtual environment).

FIG. 15F depicts the second virtual environment 1520*b* as it is displayed after the visual transition is complete; e.g., after the colors of the second virtual environment 1520*b* have been fully faded in and the second virtual environment 1520*b* is displayed opaquely. As shown in FIG. 15F, displaying the content 1522 within the second virtual environment 1520*b* optionally includes resuming playback of the content 1522 (e.g., resuming playback of the visual and/or audio portions of the content 1522) after the second virtual environment is faded in (e.g., if the content 1522 was paused while the first virtual environment 1520*a* faded out and while the second virtual environment 1520*b* faded in). In some embodiments, when computer system 101 transitions from displaying a first virtual environment (e.g., first virtual environment 1520*a*) to displaying a second virtual environment (e.g., second virtual environment 1520*b*), computer system 101 maintains the immersion level such that the second virtual environment is displayed at the same immersion level as the first virtual environment, as shown in the example of FIGS. 15C-15F. For example, if the user 1510 selected a particular immersion level for displaying the first virtual environment, computer system 101 maintains the selected immersion level when it displays the second virtual environment. In some embodiments, when computer system 101 transitions to displaying a virtual environment (e.g., from another virtual environment, from a representation of a physical environment, or from an atmosphere environment), computer system 101 displays the virtual environment at a default immersion level.

FIGS. 15G and 15H depict an alternative to FIGS. 15D and 15E, in which computer system 101 ceases to display the content 1522 and the simulated light effects 1516*a*-1516*b* before the first virtual environment 1520*a* begins to fade out (e.g., rather than pausing content 1522 and/or fading out content 1522). For example, in FIG. 15G, in response to detecting the input 1530*b* indicating a selection of icon 1508*b* as shown in FIG. 15C, computer system 101 ceases to display content 1522 and simulated light effects 1516*a*, 1516*b*. In FIG. 15H, after ceasing to display the content 1522 and simulated light effects 1516*a*, 1516*b*, computer system 101 begins to fade out the first virtual environment 1520*a* and/or increase the transparency of the first virtual environment 1520*a*. Optionally, after fading out the first virtual environment 1520*a*, computer system 101 fades in the second virtual environment 1520*b* without displaying the content 1522 or associated simulated light effects in the second virtual environment 1520*b* while the second virtual environment 1520*b* is fading in, and then displays the content 1522 and simulated light effects 1516*c*, 1516*d* in the second virtual environment 1520*b* after the second virtual environment 1520*b* is fully faded in (e.g., displaying the content 1522 as shown in FIG. 15F).

Returning to FIG. 15F, while displaying the second virtual environment 1520*b*, the computer system 101 optionally detects an input 1530*c* indicating a selection of icon 1508*d*, where icon 1508*d* represents a first atmosphere environment. The input 1530*c* optionally has one or more of the characteristics of input 1530*a* described with reference to FIG. 15A. In some embodiments, in response to detecting the input 1530*c* indicating a selection of icon 1508*d*, computer system 101 transitions (e.g., automatically, without additional user inputs after selection of icon 1508*d*) from displaying the second virtual environment 1520*b* to displaying the first atmosphere environment, as shown in FIGS. 151-15K.

In FIG. 15I, in response to detecting input 1530*c* in FIG. 15F, computer system 101 begins to cross-fade the second virtual environment 1520*b* with the first atmosphere environment 1520*c*; e.g., by fading out the second virtual environment 1520*b* concurrently with (e.g., at the same time as) fading in the first atmosphere environment 1520*c*. As previously discussed, displaying an atmosphere environment includes displaying a representation of a physical environment with a virtual tint (e.g., an atmospheric effect) applied to the representation of the physical environment. Thus, cross-fading the second virtual environment 1520*b* with the first atmosphere environment 1520*c* optionally includes cross-fading the colors of the second virtual environment 1520 with a tint associated with the first atmosphere environment 1520*c* to display a blended lighting effect in the three-dimensional environment 1502.

In FIG. 15J, the second virtual environment 1520*b* has faded out completely (e.g., is no longer displayed in three-dimensional environment 1502) and the first atmosphere environment 1520*c* has fully faded in.

As previously discussed, mixed environments can optionally include a virtual environment that includes one or more virtual animated elements, an associated atmospheric effect. For example, a three-dimensional virtual sky displayed as replacing a ceiling (e.g., a ceiling of representation of physical environment 1505) optionally includes animated clouds that move across the sky, and is associated with an atmospheric effect (e.g., a tint) that is applied to the representation of the physical environment beneath the virtual sky, where the tint corresponds to the color of the virtual sky. In some embodiments, computer system 101 waits to display the virtual environment and/or the virtual animated elements in the mixed environment until after the associated atmospheric effect is fully faded in; that is, the virtual environment and/or virtual animated elements are, optionally, the last part of the mixed environment to be displayed (e.g., at the end of the transition).

FIG. 15K depicts a mixed environment that includes virtual environment 1520*d* and atmospheric effect 1520*e* and is optionally displayed in response to detecting a user input corresponding to a selection of an icon (such as icon 1508*a*-1508*d*) associated with the mixed environment. Atmospheric effect 1520*e* is applied to the portion of the representation of the physical environment that is not replaced by virtual environment 1520*d* (e.g., excluding the portion of the environment occupied by virtual environment 1520*d*). Virtual environment 1520*d* includes virtual animated elements 1544*a*, 1544*b*, 1544*c* that are displayed, in virtual environment 1520*d*, after atmospheric effect 1520*e* has fully faded in. For example, virtual environment 1520*d* (including virtual animated elements 1544*a*-1544*c*) is optionally displayed after atmospheric effect 1520*e* has fully faded in (such as described with reference to the atmosphere environment shown in FIG. 15J). Similarly, such virtual animated elements 1544*a*-1544*c* and/or a virtual environment 1520*d* including virtual animated elements are, optionally, the first part of a mixed environment to cease to be displayed when transitioning from the mixed environment to a different environment. Thus, virtual environment 1520*d*, including virtual animated elements 1544*a*-1544*c*, optionally ceases to be displayed before corresponding atmospheric effect 1520*e* is faded in or out (and therefore is not displayed during the fading).

While displaying the mixed environment that includes virtual environment 1520*d* and atmospheric effect 1520*e* as shown in FIG. 15K, the computer system 101 optionally detects an input 1530*d* indicating a selection of icon 1508*c*, where icon 1508*c* represents a second atmosphere environment. The input 1530*d* optionally has one or more of the characteristics of input 1530*a* described with reference to FIG. 15A. In some embodiments, in response to detecting the input 1530*d* indicating a selection of icon 1508*c*, computer system 101 transitions (e.g., automatically, without requiring additional user inputs) from displaying the mixed environment of FIG. 15K to displaying the second atmosphere environment 1520*f* of FIG. 15M, as shown in FIGS. 15L-15M.

In FIG. 15L, in response to detecting input 1530*d* in FIG. 15K, computer system 101 optionally ceases to display the virtual environment 1520*d* including virtual animated elements 1544*a*, 1544*b*, 1544*c* and then, after ceasing to display the virtual environment 1520*d*, begins to cross-fade the atmospheric effect 1520*e* with the second atmosphere environment 1520*f*, e.g., by fading out a tint of atmospheric effect 1520*e* concurrently with (e.g., at the same time as) fading in a tint associated with the second atmosphere environment 1520*f*, thereby blending the tints of the atmospheric effect 1520*e* with the second atmosphere environment 1520*f*.

In FIG. 15M, the atmospheric effect 1520*e* has faded out completely and the second atmosphere environment 1520*f* has fully faded in.

In some embodiments, when computer system 101 transitions to displaying a virtual environment from displaying a representation of a physical environment (e.g., representation of physical environment 1505 shown in FIG. 15A) and/or from an atmosphere environment (e.g., first atmosphere environment 1520*c* shown in FIG. 15J), computer system 101 transitions to displaying the virtual environment using a transition animation. Such a transition animation reduces the likelihood that the user experiences disorientation or motion sickness when the virtual environment is first displayed by gradually increasing the immersion level of the virtual environment from a first, lower immersion level to a second, higher immersion level (e.g., a final immersion level at which the virtual environment is displayed, such as a default immersion level or an immersion level selected by the user, unless subsequent inputs related to changing the immersion level are detected)). In some embodiments, computer system 101 uses a transition animation in addition to or instead of the visual transitions described with reference to FIGS. 15A-15N. For example, computer system 101 optionally fades in a virtual environment concurrently with displaying the transition animation of the virtual environment.

FIGS. 15O and 15P illustrate a transition animation for transitioning to displaying the first virtual environment 1520*a* in the three-dimensional environment 1502, such as in response to detecting input 1530*a* of FIG. 15A. During the transition animation, the first virtual environment 1520*a* is initially displayed at a first immersion level (e.g., as shown in FIG. 15N) and then is gradually expanded towards and/or around the user 1510 to be displayed at a second, higher immersion level (e.g., as shown in FIG. 15O) (e.g., a final immersion level such as described above).

The transitions between environments depicted in FIGS. 15A-15O are intended to be illustrative and are not exhaustive. In some embodiments, computer system 101 transitions between various environments using the reverse of the transitions depicted in FIGS. 15A-15O; for example, computer system 101 optionally transitions from displaying an atmosphere environment (e.g., first atmosphere environment 1520*c* of FIG. 15J) to displaying a virtual environment (e.g., second virtual environment 1520B of FIG. 15G) using a transition depicted by the sequence of FIGS. 15J, 151, 15H, and 15G (the reverse of the sequence used to transition from second virtual environment 1520B to first atmosphere environment 1520*c*). Similarly, transitions from a virtual environment to a representation of a physical environment (e.g., representation of physical environment 1505 of FIG. 15A) or atmosphere environment (e.g., first atmosphere environment 1520*c* of FIG. 15J) optionally include a transition animation in which the virtual environment is gradually contracted away from the user 1510 until it is no longer displayed, such as the reverse of what is illustrated in FIGS. 15N-15O.

FIGS. 16A-16J depict a flowchart illustrating a method 1600 of transitioning between display of different three-dimensional environments in accordance with some embodiments. In some embodiments, the method 1600 is performed at a computer system (e.g., computer system 101 in FIG. 1 such as a tablet, smartphone, wearable computer, or head mounted device) including a display generation component (e.g., display generation component 120 in FIGS. 1, 3, and/or 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 1600 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1600 are, optionally, combined and/or the order of some operations is, optionally, changed.

In some embodiments, method 1600 is performed at a computer system (e.g., computer system 101) in communication with (e.g., including and/or communicatively linked with) a display generation component (e.g., display generation component 120) and one or more input devices (e.g., image sensors 314 and/or other input devices). In some embodiments, the computer system has one or more of the characteristics of the computer system of methods 800, 1000, 1200, 1400, 1800, and/or 2000. In some embodiments, the display generation component has one or more of the characteristics of the display generation component of method 800, 1000, 1200, 1400, 1800, and/or 2000. In some embodiments, the one or more input devices have one or more of the characteristics of the one or more input devices of method 800, 1000, 1200, 1400, 1800, and/or 2000.

In some embodiments, the computer system displays (1602*a*), via the display generation component, a first environment, such as, for example, first virtual environment 1520*a* in FIG. 15B, second virtual environment 1520 of FIG. 15F, or first atmosphere environment 1520*c* in FIG. 15J. In some embodiments, the first environment is or includes a three-dimensional computer-generated environment such as a virtual environment. In some embodiments, a virtual environment represents a simulated physical space (e.g., the virtual environment optionally has one or more of the characteristics of the environments and/or virtual environments of methods 800, 1000, 1200, 1400, 1800, and/or 2000). In some embodiments, the virtual environment is a simulated three-dimensional environment that is displayed via the display generation component, optionally instead of a view of a representation of a physical environment (e.g., full immersion) or optionally concurrently with a view of the representation of the physical environment (e.g., partial immersion). Some examples of a virtual environment include a lake environment, a mountain environment, a sunset scene, a sunrise scene, a nighttime environment, a grassland environment, and/or a concert scene. In some embodiments, a virtual environment is based on a real physical location, such as a museum and/or an aquarium. In some embodiments, a virtual environment is an artist-designed location. Thus, displaying a virtual environment in the three-dimensional environment optionally provides the user with a virtual experience as if the user is physically located in the virtual environment.

In some embodiments, the first environment is or includes a representation of a physical environment of the user as captured by the one or more input devices, such as a pass-through environment. In some embodiments, the first environment is an environment that includes an atmospheric effect that is applied to a representation of a physical environment of the user (e.g., such as an environment in which one or more physical objects in the representation of the physical environment) are tinted a first color) that is visible in the first environment and/or via the display generation component. Optionally, an environment including an atmospheric effect also includes one or more virtual objects that are tinted the first color. In some embodiments, a request to display an atmospheric effect modifies one or more visual characteristics of the physical environment such that it appears as if the physical environment is enhanced via color and/or exposure adjustments and/or particle effects and/or volumetric effects. In some embodiments, applying the atmospheric effect to the physical environment modifies one or more visual characteristics of the physical environment such that it appears as if the physical environment is located at a different time, place, and/or condition (e.g., morning lighting instead of afternoon lighting, or sunny instead of overcast). In some embodiments, applying the atmospheric effect to the physical environment modifies the physical environment to appear dimly lit, and/or humid. In some embodiments, the first environment is a mixed virtual and atmosphere environment type that includes a virtual environment having one or more virtual animated elements and an atmospheric effect (e.g., a virtual sky environment that includes virtual animated clouds and a corresponding atmospheric effect, such as a tint corresponding to a color of the sky, that is applied to a representation of a physical environment). In some embodiments, the first environment has one or more of the characteristics of the environments (e.g., virtual environments, physical environments, environments having one or more atmospheric effects and/or mixed virtual and atmosphere environments) of methods 800, 1000, 1200, 1800, and/or 2000.

In some embodiments, while displaying the first environment, the computer system detects (1602*b*), via the one or more input devices, a request to display a second environment, different from the first environment, such as by detecting input 1530*b* in FIGS. 15C and 15C1. In some embodiments, the second environment optionally has one or more of the characteristics of the first environment). In some embodiments, the request includes an input indicating a selection of an icon representing the second environment, or includes a verbal request. For example, the selected icon is optionally displayed in a menu of icons displayed by the computer system in and/or overlaid on the first environment, where the icons are selectable to cause display of their corresponding virtual environments, an environments including atmospheric effects, and/or environments including animated elements. The input optionally includes a hand gesture (e.g., a hand raise, air pinch gesture, air pinch and release, and/or a pointing air gesture in which the index finger of the hand of the user is extended from the palm while the other fingers are curled towards the palm), touch input (e.g., a tap or long press on a touch-sensitive input device), and/or attention and/or a gaze (e.g., attention in the direction of an icon representing an environment, optionally for a threshold duration).

In some embodiments, in response to detecting the request to display the second environment (1602*c*) and in accordance with a determination that one or more first criteria are satisfied, including a criterion that is satisfied when the first environment is a first type of environment, the computer system transitions (1602*d*) from displaying the first environment to displaying the second environment using a first visual effect during the transition, such as illustrated by the sequence of FIGS. 15C-15F, in which the computer system transitions from displaying first virtual environment 1520*a* to displaying second virtual environment 1520*b*. The types of environments optionally include a physical environment type, a virtual environment type, and an atmospheric environment type (e.g., an environment having an atmospheric effect applied thereto). Optionally, the first criteria includes a criterion that is satisfied when the second environment is a second type of environment that is the same as or different from the first type of environment (e.g., the transition is based on both the first environment and the second environment being of the same type or being of different types). Optionally, the first visual effect includes a temporal gradient transition of the first environment (e.g., fading out the first environment) followed by a temporal gradient transition of the second environment (e.g., fading in the second environment). Optionally, the first visual effect includes cross-fading the tint and/or other atmospheric effect of the first environment with the tint and/or other atmospheric effect of the second environment. Optionally, the first visual effect includes fading out an animated portion of the first environment (e.g., clouds) and then cross-fading the tint and/or other atmospheric effect of the first environment with the tint and/or other atmospheric effect of the second environment. Optionally, the first visual effect includes cross-fading the tint and/or other atmospheric effect of the first environment with the tint and/or other atmospheric effect of the second environment and then fading in an animated portion of the second environment (e.g., clouds).

In some embodiments, in response to detecting the request to display the second environment (1602*c*) and in accordance with a determination that one or more second criteria are satisfied, including a criterion that is satisfied when the first environment is a second type of environment, different from the first type of environment, the computer system transitions (1602*c*) from displaying the first environment to displaying the second environment using a second visual effect during the transition, different from the first visual effect, such as illustrated by the sequence of FIGS. 151-15J, in which the computer system transitions from displaying second virtual environment 1520*b* to displaying first atmosphere environment 1520*c*. Optionally, the second visual effect includes a gradient transition of the first environment (e.g., fading out the first environment) followed by a gradient transition of the second environment (e.g., fading in the second environment). Optionally, the second visual effect includes cross-fading the tint and/or other atmospheric effect of the first environment with the tint and/or other atmospheric effect of the second environment. Optionally, the second visual effect includes ceasing to display in a binary manner (e.g., without fading out) or fading out an animated portion of the first environment (e.g., clouds) and then cross-fading the tint and/or other atmospheric effect of the first environment with the tint and/or other atmospheric effect of the second environment. Optionally, the second visual effect includes cross-fading the tint and/or other atmospheric effect of the first environment with the tint and/or other atmospheric effect of the second environment and then displaying in a binary manner (e.g., without fading in) or fading in animated elements of the second environment (e.g., clouds). The above techniques for transitioning from one environment to another provide transitions that are visually smooth and non-jarring for the user, thereby improving the user experience and reducing errors in interaction due to more consistent and/or less disjointed display of the environment transitions.

In some embodiments, the one or more first criteria include a second criterion that is satisfied when the second environment is a third type of environment (e.g., a type of environment as described with reference to steps 1602*d* and 1602*e*, optionally different from or the same as the first type and/or the second type of environments), and the one or more second criteria include a third criterion that is satisfied when the second environment is a fourth type of environment (e.g., a type of environment as described with reference to steps 1602*d* and 1602*e*, optionally different from or the same as the first type, the second type, and/or the third type of environments) (1604). Selecting a visual effect based on both the first type of environment and the second type of environment enables the computer system to tailor the visual effect based on both environments such that it is visually smooth and non-jarring for the user, thereby improving the user experience and reducing errors in interaction due to more consistent display of and/or less disjointed display of the environment transitions.

In some embodiments, the first type of environment is a virtual environment type (e.g., as described with reference to step 1602*d* and shown in FIGS. 15C and 15C1) and the third type of environment is the virtual environment type (1606*a*), and the first visual effect includes gradually reducing a visual prominence of the first environment, and after gradually reducing the visual prominence of the first environment, gradually increasing a visual prominence of the second environment (1606*b*), such as shown in the sequence of FIGS. 15C-15F. Gradually reducing the visual prominence of the first environment optionally includes gradually (e.g., over a time duration such as 0.01, 0.05, 0.1, 0.15, 0.2, 0.5, 1.0, 1.5, 2, 5, 10, 20, 45, 60, 75, 90, or 100 seconds) fading out colors of the first environment, increasing a transparency of the first environment, and/or reducing simulated lighting effects associated with the first environment (e.g., a lighting tint, lighting reflections, and/or shadows). In some embodiments, gradually reducing the visual prominence of the first environment includes reducing the visual prominence of the first environment until the first environment is no longer displayed (e.g., 0 visual prominence). Gradually increasing the visual prominence of the second environment optionally includes gradually (e.g., over a time duration such as 0.01, 0.05, 0.1, 0.15, 0.2, 0.5, 1.0, 1.5, 2, 5, 10, 20, 45, 60, 75, 90, or 100 seconds) fading in colors of the second environment, decreasing a transparency of the second environment, and/or increasing simulated lighting effects associated with the second environment (e.g., tints, reflections, and/or shadows) that are displayed, via the display generation component, in the second environment. In some embodiments, gradually increasing the visual prominence of the second environment includes starting from not displaying the second environment at all (e.g., 0 visual prominence). In some embodiments, gradually increasing the visual prominence of the first environment includes increasing the visual prominence of the second environment to a final visual prominence, after which the visual prominence is not further increased. Gradually fading out one virtual environment before fading in another virtual environment results in a transition that is visually smooth and non-jarring for the user, thereby improving the user experience and reducing errors in interaction due to more-consistent and/or less-disjointed display of the environment transitions.

In some embodiments, the first type of environment is a physical environment type (e.g., as described with reference to step 1602*d* and shown in FIG. 15A) and the third type of environment is a virtual environment type (e.g., as described with reference to step 1602*d* and shown in FIGS. 15C and 15C1) (1608*a*), and the first visual effect includes (1608*b*) gradually replacing display of an increasing portion of the first environment with display of a corresponding increasing portion of the second environment, such as shown in the sequence of FIGS. 15A and 15N-15O. In some embodiments, the display of the increasing portion of the first environment is replaced by the display of the corresponding increasing portion of the second environment until display of the second environment has entirely replaced display of the first environment in accordance with an immersion level of the first and/or second environment, as described in more detail with reference to method 1400. In some embodiments, the transition to displaying the second environment includes a volumetric transition in which an area or volume within which the second environment is displayed gradually expands, with increasing portions of the second environment gradually displayed based on distance from the electronic device and/or user. For example, the area of the second environment that is farthest from the user is displayed first, then the next closest area is displayed second (e.g., with a smooth transition between displaying the first and second areas of the second environment), and so on and so forth, optionally until reaching the user and/or the electronic device or until reaching a predetermined distance in front of the user and/or electronic device based on the selected immersion level (e.g., 6 inches in front of the user, 1 foot in front of the user, 3 feet in front of the user, or another distance). In some embodiments, different portions of the respective environment appear (e.g., are displayed) at different times (e.g., the closer portions appear after the farther portions). In some embodiments, non-adjacent areas of the second environment appear at the same time (e.g., the different portions of the second environment are not adjacent, but are the same distance away from the user and/or electronic device). In some embodiments, the transition to displaying the second environment includes displaying the second environment such that it appears to start from the farthest location and expand towards the user (e.g., as a plane that moves towards the user or in a circular manner towards the user, for example, such that the boundary of the simulated environment optionally is equidistant from the user and/or device throughout the transition). Thus, in some embodiments, the transition to the second environment depends on the differences in depth of objects in the first environment (e.g., the order of what transitions first, second, third, last, or at other times is based on depth information). In some embodiments, transitioning to the second environment includes dissolving the respective portion of the first environment into the respective portion of the second environment. In some embodiments, other transition animations are possible. In some embodiments, the portions of the first environment that transition to portions of the second environment are additive to previously transitioned portions of the second environment. For example, the first portion of the first environment transitions into a first portion of the second environment and then a second portion of the first environment transitions into a second portion of the second environment and the first and second portions of the second environment together form a contiguous virtual environment. Using a volumetric transition to switch from displaying a representation of a physical environment to displaying a virtual environment provides a smooth and non-jarring experience for the user, thereby improving the user experience and reducing errors in interaction due to more consistent and/or less disjointed display of the environment transitions.

In some embodiments, the first type of environment is a virtual environment type (e.g., as described with reference to step 1602*d* and shown in FIG. 15G) and the third type of environment is an atmosphere environment type (e.g., as described with reference to step 1602*d* and shown in FIG. 15J) (1610*a*), and the first visual effect includes gradually reducing (1610*b*) a visual prominence of the first environment (e.g., as described with reference to step 1606*b*) to reveal (e.g., display) a representation of a physical environment (e.g., as described with reference to step 1602*a* and shown in FIG. 15I) via the display generation component, and after at least partially revealing the representation of the physical environment via the display generation component (1610*c*), gradually increasing (1610*c*) a visual prominence (e.g., as described with reference to step 1606*b*) of an atmospheric effect (e.g., as described with reference to step 1602*a*) associated with the second environment, wherein the atmospheric effect is applied to the representation of the physical environment (e.g., as described with reference to step 1602*a* and shown in FIG. 15J). In some embodiments, revealing a representation of a physical environment includes displaying the representation of the physical environment in place of the display of the first environment and/or or displaying the representation of the physical environment underneath the first environment as the first environment increases in transparency. In some embodiments, the visual prominence of the first environment is reduced without gradually replacing display of an increasing portion of the first environment with display of a corresponding increasing portion of the second environment; e.g., a volume or area in which the first environment is displayed remains constant as the visual prominence of the first environment is reduced. In some embodiments, the visual prominence of the first environment is reduced concurrently with gradually replacing display of an increasing portion of the first environment with display of a corresponding increasing portion of the second environment; e.g., an area or volume in which the first environment is displayed is gradually reduced while the visual prominence of the first environment is reduced. In some embodiments, the visual prominence of the first environment is reduced until the first environment is no longer displayed (e.g., 0 visual prominence). In some embodiments, gradually increasing the visual prominence of the atmospheric effect of the second environment includes increasing the visual prominence of the atmospheric effect of the second environment from 0 visual prominence (e.g., the atmospheric effect is not displayed at all) to a final visual prominence, after which the visual prominence is not further increased. In some embodiments, the visual prominence of the atmospheric effect is uniformly increased across the full representation of the physical environment, without the use of a volumetric transition such as described above. Gradually fading out a virtual environment before fading in an atmosphere environment results in a transition that is visually smooth and non-jarring for the user, thereby improving the user experience and reducing errors in interaction due to more consistent and/or less disjointed display of the environment transitions.

In some embodiments, gradually reducing the visual prominence of the first environment occurs at least partially concurrently with (e.g., at the same time as) gradually increasing the visual prominence of the atmospheric effect (1612), such as shown in FIG. 15I. In some embodiments, the visual prominence of the atmospheric effect is increased over the same time duration during which the visual prominence of the first environment is decreased. In some embodiments, a time duration over which the visual prominence of the atmospheric effect is increased overlaps with a time duration over which the visual prominence of the first environment is decreased but is not the same time duration. In some embodiments, during a time duration over which the visual prominence of the first environment is being reduced and the visual prominence of the atmospheric effect is being concurrently increased, simulated lighting effects associated with the first environment (e.g., as described with reference to step 1602*a*) are applied to the representation of the physical environment in combination with the atmospheric effect, such as by cross-fading a tint associated with the first environment with the atmospheric effect. Overlapping the fading out of a virtual environment with the fading in of an atmosphere environment allows for a faster transition that is still visually smooth and non-jarring for the user, thereby improving the user experience and reducing errors in interaction due to more consistent and/or less disjointed display of the environment transitions.

In some embodiments, the first type of environment is a virtual environment type (e.g., as described with reference to step 1602*a*) and the third type of environment is a physical environment type (e.g., as described with reference to step 1602*a*) (1614*a*), and the first visual effect includes (1614*b*) gradually replacing display, via the display generation component, of an increasing portion of the first environment with a representation of a physical environment (e.g., as described with reference to step 1602*a*) until the representation of the physical environment has replaced display of all of the first environment, such as shown in the reverse sequence of FIGS. 15O-15N and FIG. 15A. (e.g., such that the first environment ceases to be displayed). In some embodiments, the transition from displaying the first environment to displaying the second environment includes a volumetric transition in which an area or volume within which the first environment is displayed gradually contracts; e.g., increasing portions of the first environment gradually cease to be displayed based on distance from the electronic device and/or user such that the first environment appears to gradually shrink away from the user and then disappear entirely (e.g., in an opposite process to that described with reference to step 1614*d*). Using a volumetric transition to switch away from displaying a virtual environment provides a smooth and non-jarring experience for the user, thereby improving the user experience and reducing errors in interaction due to more consistent and/or less disjointed display of the environment transitions.

In some embodiments, the third type of environment is a virtual environment type (e.g., as described with reference to step 1620*a*) (1616*a*), and the first visual effect includes displaying the second environment at a default immersion level (1616*b*). For example, the immersion level of virtual environment 1520*a* as depicted in FIGS. 15C and 15C1 or FIG. 15N is optionally a default immersion level. In some embodiments, the immersion level has one or more of the characteristics of the immersion level described with reference to method 1400. In some embodiments, the default immersion level is selected by the user (e.g., prior to the request to display the virtual environment). In some embodiments, the default immersion level is pre-set on the computer system and/or by the operating system of the computer system. Displaying the virtual environment with the default level of immersion provides a consistent and predictable result for the user, thereby avoiding errors in interaction with the computer system.

In some embodiments, while displaying the second environment at the default immersion level (e.g., as described with reference to step 1616*b*), the computer system detects (1618*a*), via the one or more input devices, a user input corresponding to a request to increase an immersion level of the second environment from the default immersion level to a second immersion level (e.g., hand input 1516 in FIG. 15N). In some embodiments, the user input corresponding to the request to increase the immersion level has one or more of the characteristics of the input corresponding to a request to change the level of immersion of a virtual environment as described with reference to method 1400. In some embodiments, in response to detecting the user input, the computer system displays (1618*b*) the second environment at the second immersion level, such as shown in FIG. 15O. In some embodiments, displaying the second environment at the second immersion level includes replacing display of a portion of a representation of a physical environment with display of a corresponding portion of the second environment in accordance with the second immersion level, such that the second environment occupies additional area and/or volume relative to when the second environment is displayed at, for example, the default level of immersion. Allowing the user to manually increase the level of immersion provides a consistent and predictable result for the user, thereby avoiding errors in interaction with the computer system.

In some embodiments, while displaying the second environment at the default immersion level (e.g., as described with reference to step 1616*b*), the computer system detects (1620*a*), via the one or more input devices (e.g., as described with reference to step 1602*b*), a user input corresponding to a request to decrease the immersion level from the default immersion level to a second immersion level. For example, the default immersion level is optionally the immersion level of virtual environment 1502*a* as shown in FIG. 15O, and the input is optionally a hand input 1516 as shown in FIG. 15O. In some embodiments, the user input corresponding to the request to increase the immersion level has one or more of the characteristics of the input corresponding to a request to change the level of immersion of a virtual environment as described with reference to method 1400.

In some embodiments, in response to detecting the user input, the computer system displays (1620*b*) the second environment at the second immersion level (e.g., as shown in FIG. 15N). In some embodiments, displaying the second environment at the second immersion level includes replacing display of a portion of the second environment with display of a corresponding portion of a representation of a physical environment, wherein a size of the portion of the representation of the physical environment is based on the second immersion level. Allowing the user to manually decrease the level of immersion provides a consistent and predictable result for the user, thereby avoiding errors in interaction with the computer system.

In some embodiments, the first type of environment is a virtual environment type (e.g., as described with reference to step 1602*a*), the third type of environment is the virtual environment type (e.g., as described with reference to step 1602*a*), the first environment is displayed at a first level of immersion (e.g., as described with reference to step 1616*b*), and the second environment is displayed at the first level of immersion after the first visual effect (e.g., without detecting user input indicating that the level of immersion should be maintained when transitioning from the first environment to the second environment) (1622). For example, the computer system maintains the (same) immersion level when transitioning between first virtual environment 1520*a* of FIGS. 15C and 15C1 and second virtual environment 1520*b* of FIG. 15F. Maintaining the immersion level when switching between virtual environments allows the user to switch virtual environments and keep their preferred immersion level without providing additional inputs and provides a consistent and predictable result for the user, thereby avoiding errors in interaction with the computer system.

In some embodiments, the first type of environment is an atmosphere environment type (e.g., as described with reference to step 1602*a*), and the second type of environment is a virtual environment type (e.g., as described with reference to step 1620*a*) (1624*a*). In some embodiments, before displaying the first environment, the computer system displays (1624*b*) a virtual environment (e.g., the second environment or a different virtual environment) at a first level of immersion (e.g., as described with reference to step 1616*b*), where the second environment is displayed at the first level of immersion after the first visual effect (e.g., without detecting user input indicating that the second environment should be displayed at the first level of immersion). For example, the computer system optionally transitions from displaying second virtual environment 1520*b* at a first immersion level as shown in FIG. 15F to displaying atmosphere environment 1520*c* as shown in FIG. 15J. Optionally, if computer system subsequently transitions to displaying another virtual environment (e.g., virtual environment 1520*a* of FIG. 15C), the computer system uses the same level of immersion at which second virtual environment 1520*b* was displayed. In some embodiments, the computer system preserves the immersion level of the most recently displayed virtual environment when transitioning to a new virtual environment when an atmosphere environment is displayed in the interim. For example, if a user sets a first immersion level when viewing a first virtual environment, then requests display of an atmosphere environment, and then later requests display of a second virtual environment, the computer system displays the second virtual environment at the first immersion level (e.g., the same immersion level as the first virtual environment) in the absence of receiving any additional inputs requesting a change to the immersion level. Maintaining the same immersion level as selected for a previously displayed virtual environment when switching to a new virtual environment after displaying a different type of environment allows the user to keep their preferred immersion level without providing additional inputs and provides a consistent and predictable result for the user, thereby avoiding errors in interaction with the computer system.

In some embodiments, the first type of environment is an atmosphere environment type (e.g., as described with reference to step 1602*a*), the second type of environment is a virtual environment type (e.g., as described with reference to step 1602*a*), and the second environment is displayed at a default immersion level (e.g., as described with reference to step 1616*b*) after the first visual effect, such as shown in the reverse sequence of FIG. 15J-15G (e.g., without detecting user input indicating that the second environment should be displayed at the default level of immersion) (1626). In some embodiments, the computer system displays the requested virtual environment at the default immersion level when transitioning from displaying an atmosphere environment, regardless of whether a previously displayed virtual environment (e.g., a virtual environment displayed before the atmosphere environment) was displayed at a different immersion level. Using a default immersion level when switching to a new virtual environment after displaying a different type of environment provides a consistent and predictable result for the user, thereby avoiding errors in interaction with the computer system.

In some embodiments, the second type of environment is a mixed virtual and atmosphere environment type (e.g., as described with reference to step 1602*a* and shown in FIG. 15K) including a first virtual environment (e.g., virtual environment 1520*d*) having one or more animated elements (e.g., animated elements 1544*a*-1544*c*) (1628*a*), and the first visual effect includes gradually increasing (1628*b*) a visual prominence of an atmospheric effect (e.g., atmospheric effect 1520*e*) corresponding to the second environment (e.g., as described with reference to step 1606*b*), and after gradually increasing the visual prominence of the atmospheric effect corresponding to the second environment to a final visual prominence (e.g., a visual prominence after which the visual prominence ceases to be increased and/or a full visual prominence, such as shown in FIG. 15J), displaying (1628*c*) the first virtual environment (e.g., concurrently with the atmospheric effect, as shown in FIG. 15K). In some embodiments, the visual prominence of the atmospheric effect is increased (e.g., uniformly, non-uniformly, and/or in accordance with a spatial gradient) across the representation of the physical environment (e.g., across the full representation or across one or more portions of the representation), without the use of a volumetric transition such as described with respect to step 1608*b*. In some embodiments, displaying the first virtual environment includes gradually increasing a visual prominence of the first virtual environment from 0 visual prominence to a final visual prominence. In some embodiments, displaying the first virtual environment includes gradually increasing the visual prominence of the first virtual environment excluding the animated elements, and after increasing the visual prominence of the first virtual environment excluding the animated elements to a final visual prominence, displaying the animated elements within the first virtual environment. In some embodiments, the transition to displaying the second environment includes a volumetric transition of the first virtual environment in which an area or volume within which the first virtual environment is displayed gradually increases, such as described with reference to step 1608*b*. Waiting to display a virtual environment with animated elements until after a corresponding atmospheric effect is displayed at a final visual prominence reduces the computational overhead and storage associated with the transition by separating the display (and animation) of animated elements (e.g., animated clouds) from the simpler color-based transitions (e.g., fading tints in or out).

In some embodiments, the first type of environment is an atmosphere environment type (e.g., as described with reference to step 1602*d*), and the second type of environment is the atmosphere environment type (e.g., as described with reference to step 1602*d*) (1630*a*), and the first visual effect includes gradually decreasing (1630*b*) a visual prominence of a first atmospheric effect (e.g., as described with reference to step 1606*b* and shown in FIG.) associated with the first environment, where the first atmospheric effect is applied to a representation of the physical environment (e.g., as described with reference to step 1602*d*), and gradually increasing (1630*c*) a visual prominence (e.g., as described with reference to step 1606*d*) of a second atmospheric effect associated with the second environment concurrently with decreasing the visual prominence of the first atmospheric effect, wherein the second atmospheric effect is applied to the representation of the physical environment. FIG. 15L depicts an example in which in which a first atmospheric effect 1520*e* is faded out while a second atmospheric effect 1520*f* is faded in. In some embodiments, the visual prominence of the first atmospheric effect is reduced until the first atmospheric effect is no longer displayed (e.g., 0 visual prominence). In some embodiments, decreasing the visual prominence of the first atmospheric effect while increasing the visual prominence of the second atmospheric effect includes cross-fading a first tint associated with the first atmospheric effect with a second tint associated with the second atmospheric effect such that a gradually changing combination of the first atmospheric effect and the second atmospheric effect are applied to the representation of the physical environment. In some embodiments, gradually increasing the visual prominence of the second atmospheric effect includes increasing the visual prominence of the second atmospheric effect from 0 visual prominence (e.g., the second atmospheric effect is not displayed at all) to a final visual prominence, after which the visual prominence is not further increased. Overlapping the fading out of a first atmospheric effect with the fading in of a second atmospheric effect allows for a faster transition that is still visually smooth and non-jarring for the user, thereby improving the user experience and reducing errors in interaction due to more consistent and/or less disjointed display of the environment transitions.

In some embodiments, the first type of environment is an atmosphere environment type (e.g., as described with reference to step 1602*d*), the second type of environment is a mixed virtual and atmosphere environment type (e.g., as shown in FIG. 15K) including a first virtual environment (e.g., virtual environment 1520*d*) having one or more virtual animated elements (e.g., virtual animated elements 1544*a*-*c*) (1632*a*), and the first visual effect includes gradually decreasing (1632*b*) a visual prominence (e.g., as described with reference to step 1606*b*) of a first atmospheric effect (e.g., atmospheric effect 1520*c*) associated with the first environment, where the first atmospheric effect is applied to a representation of the physical environment (e.g., as described with reference to step 1602*a*), gradually increasing (1632*c*) a visual prominence (e.g., as described with reference to step 1606*b*) of a second atmospheric effect associated with the second environment concurrently with decreasing the visual prominence of the first atmospheric effect (e.g., as shown in FIG. 15L), where the second atmospheric effect is applied to the representation of the physical environment (e.g., as described with reference to step 1630*c*), and after increasing the visual prominence of the second atmospheric effect to a final visual prominence, displaying (1632*d*) the first virtual environment (e.g., as described with reference to step 1628*c*). For example, a transition from an atmosphere environment type to a mixed virtual and atmosphere environment type is represented by the reverse sequence of FIGS. 15M-15K. Overlapping the fading out of the first atmospheric effect with the fading in the second atmospheric effect allows for a faster transition that is still visually smooth and non-jarring for the user, thereby improving the user experience and reducing errors in interaction due to more consistent and/or less disjointed display of the environment transitions. Waiting to display a virtual environment with animated elements until the second atmospheric effect is fully faded in reduces the computational overhead and storage associated with the transition by separating the display (and animation) of animated elements (e.g., animated clouds) from the simpler color-based transitions (e.g., fading tints in or out).

In some embodiments, the first type of environment is a mixed virtual and atmosphere environment type including a first virtual environment having one or more virtual animated elements (e.g., as described with reference to step 1602*a* and depicted in FIG. 15K) (1634*a*), and the first visual effect includes ceasing to display (1634*b*) the first virtual environment, and after ceasing to display the first virtual environment, gradually decreasing (1634*c*) a visual prominence (e.g., as described with reference to step 1606*b*) of a first atmospheric effect associated with the first environment and gradually increasing (1634*d*) a visual prominence (e.g., as described with reference to step 1606*b*) of a second atmospheric effect associated with the second environment concurrently with decreasing the visual prominence of the first atmospheric effect (e.g., as shown in FIG. 15L), where the second atmospheric effect is applied to the representation of the physical environment (e.g., as described with reference to step 1602*a* and 1630*c*). In some embodiments, ceasing to display the first virtual environment includes ceasing to display the virtual animated elements, and then gradually decreasing a visual prominence of the first virtual environment excluding the animated elements. In some embodiments, ceasing to display the first virtual environment includes a volumetric transition in which an area or volume within which the first virtual environment is displayed gradually contracts; e.g., increasing portions of the first virtual environment cease to be displayed such that the first virtual environment appears to gradually shrink and then disappear entirely. In some embodiments, gradually increasing the visual prominence of the second atmospheric effect includes increasing the visual prominence of the second atmospheric effect from 0 visual prominence (e.g., the second atmospheric effect is not displayed at all) to a final visual prominence, after which the visual prominence is not further increased. Overlapping the fading out of the first atmospheric effect with the fading in of the second atmospheric effect allows for a faster transition that is still visually smooth and non-jarring for the user, thereby improving the user experience and reducing errors in interaction due to more consistent and/or less disjointed display of the environment transitions. Ceasing to display the first virtual environment at the beginning of the transition (e.g., before cross-fading the atmospheric effects) reduces the computational overhead and storage associated with the transition by separating the display (and animation) of animated elements (e.g., animated clouds) from the simpler color-based transitions (e.g., fading tints in or out).

In some embodiments, displaying the first environment includes displaying (1636*a*) media content (e.g., audio and/or visual content that changes over time, such as a movie, a television show, or a video; in some embodiments, the media content is or is displayed in a user interface of a media playback application) in the first environment (e.g., at a location corresponding to and/or within a representation of the physical environment that is visible in the first environment, or at a location corresponding to and/or within a virtual environment that is visible in the first environment such as shown in FIGS. 15C and 15C1), and the first visual effect includes reducing (1636*b*) a visual prominence (e.g., as described with reference to step 1606*b*) of a visual portion (e.g., a video portion) of the media content before displaying the second environment (such as described with reference to FIGS. 15D-15E). In some embodiments, reducing the visual prominence of the visual portion of the media content includes fading out the visual portion of the media content until it ceases to be displayed entirely (e.g., 0 visual prominence) or until it is displayed with some level of reduced prominence that is greater than 0 visual prominence (e.g., the content continues to be displayed at a reduced prominence). Because the media content is optionally displayed in a new location in the second environment, it is faded out with the first environment so that it does not appear to "jump" locations when the second environment is faded in, thus smoothing the visual effect and reducing errors in interaction due to more consistent and/or less disjointed display of the transition.

In some embodiments, the first visual effect includes pausing (e.g., stopping playback of) the media content (1638), such as shown in FIGS. 15D-15E (optionally while, before, or after reducing the visual prominence of the visual portion of the media content). Pausing the media content during the transition ensures that the user does not miss any content during the transition and reduces the computational overhead associated with the transition since the media is not playing during the transition.

In some embodiments, the first visual effect includes (1640*a*) continuing to play an audio portion of the content (e.g., the audio track of the movie, the television show or the video) while (and/or after) reducing (1640*b*) the visual prominence of the visual portion of the media content (e.g., as described with reference to step 1636*b*), such as described with reference to FIGS. 15D-15E. In some embodiments, the volume of the audio content is reduced during the first visual effect. In some embodiments, the volume of the audio content is not reduced during the first visual effect. Continuing to play the audio portion of the content allows the user to continue to be engaged with the media content without overly increasing the computational overhead of the computer system during the transition.

In some embodiments, the media content is displayed (1642) at a first spatial arrangement (e.g., a first depth and/or a first location) relative to a viewpoint of a user (and/or the first environment) of the computer system when the request to display the second environment is received, the second environment type is a virtual environment type (e.g., as described with reference to step 1602*a*), and displaying the second environment includes displaying the media content at a second spatial arrangement (e.g., at a second depth and/or a second location), different from the first spatial arrangement, relative to the viewpoint of the user (and/or the second environment). For example, the media content of FIG. 15E is displayed at a different spatial arrangement, relative to the user, than the media content of FIGS. 15C and 15C1. Optionally, displaying the media content at the second spatial arrangement includes displaying the media content at the same angular size as displaying the media content at the first spatial arrangement; that is, the size of the media content appears, to the user, to be unchanged. In some embodiments, displaying the media content at the second spatial arrangement includes changing the size of the media (e.g., relative to the first and/or second environments) to be able to maintain the same angular size (e.g., to maintain the same size from the perspective/viewpoint of the user). In some embodiments, displaying the media content includes gradually increasing a visual prominence of the media content until the media content is displayed at a final visual prominence, optionally concurrently with or after increasing the visual prominence of the second environment. In some embodiments, displaying the media content in the second environment includes resuming playback of the video content and/or the audio content (if the video content and/or audio content was paused during the transition) or continuing playback of the video content and/or the audio content (if the video content and/or audio content continued to be played during the transition). Displaying the content in a new location allows the content to be displayed in a location that is tailored to the particular virtual environment such that the content is easily visible to the user, reducing errors in interaction due to more consistent and/or less disjointed display of the transition.

In some embodiments, displaying (1644*a*) the first environment includes displaying media content in the first environment (e.g., as described with reference to step 1636*a* and FIGS. 15C and 15C1), and the first visual effect includes ceasing (1644*b*) to display the media content (e.g., as described with reference to FIG. 15G), and after ceasing to display the media content, reducing (1644*c*) a visual prominence of the first environment (e.g., as described with reference to step 1606*b* and FIG. 15H). In some embodiments, ceasing to display the media content includes displaying a portion of the first environment that was previously occluded by the display of the media content. In some embodiments, ceasing to display the media content includes gradually reducing a visual prominence (e.g., as described with reference to step 1636*b*) of a visual portion of the media content until the media content is no longer displayed. In some embodiments, media content that is displayed within a virtual environment ceases to be displayed before reducing the visual prominence of the virtual environment during a transition away from the virtual environment. In some embodiments, media content that is displayed within a representation of a physical environment or within an atmosphere environment continues to be displayed while the visual prominence of the environment is reduced during a transition away from the environment. In some embodiments, the process of ceasing to display media content before reducing the visual prominence of the environment functions separately from the description of steps 1602*a*-1602*e*. For example, in some embodiments, ceasing to display an environment in which content is displayed includes first ceasing to display the media content, and then reducing the visual prominence of the environment (e.g., fading out a virtual environment, an atmosphere environment, and/or a mixed environment) until the environment is no longer displayed, regardless of whether the computer system is transitioning to a different environment (or to a particular environment type). Ceasing to display the media content before fading out the first environment reduces computational overhead during the transition, helps smooth the visual effect, and reduces errors in interaction due to more consistent and/or less disjointed display of the transition.

In some embodiments, displaying the media content in the first environment includes displaying (1646*a*), outside of the media content, a first simulated lighting effect (e.g., simulated lighting effect 1516*a*-1516*b* of FIGS. 15C and 15C1) associated with the media content, in which light associated with the media content is virtually cast by the media content onto one or more virtual objects or representations of physical objects, and ceasing to display the media content includes ceasing (1646*b*) to display the first simulated lighting effect associated with the media content (e.g., as described with reference to FIG. 15G). In some embodiments, simulated lighting effects generated from the content are applied to portions of the three-dimensional environment, optionally including portions of the first environment outside of the content and/or a representation of a physical environment that is displayed concurrently with the first environment. In some embodiments, the simulated lighting effects appear to be virtually cast by the content onto portions of the three-dimensional environment outside the content. In some embodiments, the simulated lighting effects correspond in color, brightness, and/or saturation level with the color, brightness, and/or saturation level of the content. In some embodiments, the simulated lighting effect includes a simulation of the divergence of light of the media content outside of the media content into other parts of the first environment and/or into a representation of a physical environment that is displayed concurrently with the first environment, such that the light of the media content pollutes one or more areas beyond the media content in the first environment and/or into a representation of a physical environment, such as with a glare. Ceasing to display simulated lighting effects associated with the media content when the media content ceases to be displayed helps smooth the visual effect and reduces errors in interaction due to more consistent and/or less disjointed display of the transition.

In some embodiments, after reducing the visual prominence of the first environment (e.g., as described with reference to step 1606*b*), the computer system increases (1648) a visual prominence of the second environment (e.g., as described with reference to step 1606*b*), including increasing a visual prominence of the media content displayed in the second environment (such as described with reference to FIGS. 15E-15F). In some embodiments, the visual prominence of the media content is increased concurrently with the visual prominence of the second environment, optionally by the same amount, such that when the second environment is displayed at a final visual prominence, the media content is also displayed at the final visual prominence (e.g., the visual prominence of the second environment and the media content stop being increased at the same time). In some embodiments, increasing the visual prominence of the media content includes increasing the visual prominence from a first visual prominence (e.g., 0 visual prominence, in which the media content is not displayed at all, or another visual prominence in which the media content is already displayed) to a final visual prominence. In some embodiments, the media content is displayed in the second environment in a different spatial arrangement relative to the display of the media content in the first environment (e.g., as described with reference to step 1642). In some embodiments, playback of a visual portion of the media content is paused while the visual prominence of the media content is increased (e.g., as described with reference to FIG. 15E). Fading the content in with the second environment helps smooth the visual effect to the second environment and reduces errors in interaction due to more consistent and/or less disjointed display of the transition.

In some embodiments, displaying the media content in the second environment (e.g., as described with reference to steps 1642 and/or 1648) includes displaying (1650), outside of the media content (e.g., in the second environment and/or other parts of the second environment other than the media content), a second simulated lighting effect associated with the media content, such as described with reference to FIGS. 15E-15F (e.g., display of a simulated lighting effect having one or more of the characteristics of the first simulated lighting effect as described with reference to step 1646*a*, and optionally the same as or different from the first simulated lighting effect, is initiated concurrently with initiation of the display of the media content). In some embodiments, increasing the visual prominence of the media content includes increasing the visual prominence of the second simulated lighting effect, such as by increasing an area and/or size of the lighting effect, increasing a brightness of the simulated lighting effect, and/or decreasing a diffusion of the simulated lighting effect within the environment. In some embodiments, the second simulated lighting effect is displayed after the visual prominence of the media content has been increased to a final visual prominence; e.g., the second environment and/or media content fades in and then the second simulated lighting effect is displayed. Displaying simulated lighting effects associated with the media content when the media content is displayed helps smooth the visual effect to the second environment and reduces errors in interaction due to more consistent and/or less disjointed display of the transition.

In some embodiments, virtual content is displayed (1652*a*) along with a respective environment (such as the content 1522 shown in FIGS. 15C and 15C1, or other types of virtual content) and displaying the virtual content includes: in accordance with a determination that the respective environment is a first environment, the virtual content is displayed (1652*b*) with a first value for a respective visual parameter (e.g., tint, hue, brightness, saturation, and/or contrast), and in accordance with a determination that the respective environment is a second environment that is different from the first environment, the virtual content is displayed (1652*c*) with a second value for the respective visual parameter, where the second value for the respective virtual parameter is different from the second value for the respective virtual parameter. Displaying virtual content with a visual appearance that is based on the environment in which it is displayed enables better visibility of the elements of the virtual content, thereby reducing errors in interaction with the computer system.

In some embodiments, before detecting the request to display the second environment (e.g., as described with reference to step 1602*b*), the computer system displays (1654*a*) virtual content within the first environment with a first value for a respective visual parameter (e.g., as described with reference to step 1652*b*) that is associated with the first environment.

In some embodiments, after detecting the request to display the second environment, the computer system displays (1654*b*) the virtual content within the second environment with a second value for the respective visual parameter (e.g., as described with reference to step 1652*c*) that is associated with the second environment, where the second value for the respective visual parameter is different from the first value for the respective visual parameter. Displaying virtual content with a visual appearance that is based on the environment in which it is displayed enables better visibility of the elements of the virtual content, thereby reducing errors in interaction with the computer system.

In some embodiments, the first value for the respective visual parameter (e.g., as described with reference to step 1652*b*) includes a first brightness (e.g., a first amount of light emitted by the virtual content, such as in units of lumens) (e.g., a first amount of light emitted by the virtual content, such as in units of lumens), associated with the first environment, and the second value for the respective visual parameter (e.g., as described with reference to step 1652*c*) comprises a second brightness (e.g., a second amount of light emitted by the virtual content, such as in units of lumens) associated with the second environment, different from the first brightness (1656). For example, the second brightness is optionally brighter (e.g., more lumens) or darker (e.g., fewer lumens) than the first brightness. Using environmentally modulated brightness for displaying virtual content improves the visibility of elements of the virtual content and reduces the likelihood of user eye strain, thereby reducing the likelihood of errors in interaction with the computer system. For example, if an environment is relatively dark, the virtual content is optionally displayed with a lower amount of brightness than if the environment is relatively light.

In some embodiments, transitioning from displaying the first environment to displaying the second environment (e.g., as described with reference to step 1602*d* and 1602*e*) includes changing (e.g., increasing, gradually increasing, decreasing, or gradually decreasing) a brightness of the virtual content from the first brightness (e.g., as described with reference to step 1656) to the second brightness (e.g., as described with reference to step 1656) (1658). In some embodiments, increasing and/or decreasing the brightness of the virtual content (optionally gradually) includes increasing and/or decreasing the brightness over a time duration such as 0.01, 0.1, 0.3, 0.5, 1, 3, 5, 10, 50, 100, or 300 seconds and/or over some or all of the time duration of the transition. Changing the brightness of the displayed virtual content while the computer system transitions from displaying the first environment to displaying the second environment provides a smooth, less-jarring transition while maintaining visibility of elements of the virtual content, thereby reducing the likelihood of errors in interaction with the computer system.

It should be understood that the particular order in which the operations in method 1600 have been described is merely exemplary and is not intended to indicate that the described order is the only order in which the operations could be performed. One of ordinary skill in the art would recognize various ways to reorder the operations described herein.

FIGS. 17A-17M illustrate examples of a computer system displaying a portal to a virtual environment in accordance with some embodiments.

Figure 17A:
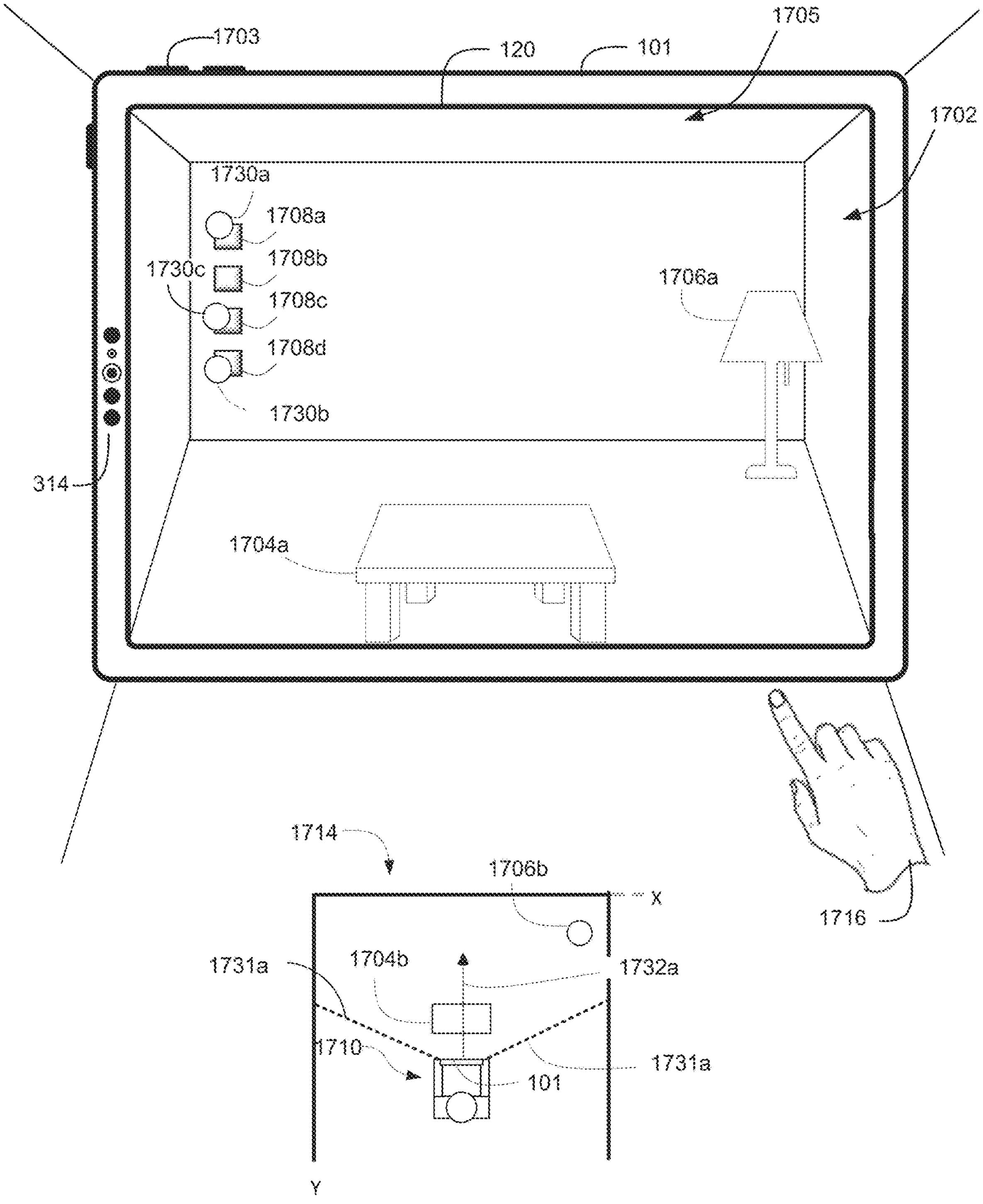
FIGS. 17A-17M illustrate examples of a computer system displaying and ceasing to display portals to virtual environments in accordance with some embodiments.

FIG. 17A illustrates a computer system 101 (e.g., an electronic device) displaying, via a display generation component (e.g., display generation component 120 of FIG. 1), a three-dimensional environment 1702 from a viewpoint of the user 1710 of the computer system 101 (e.g., facing the back wall of the physical environment in which computer system 101 is located). In the example of FIG. 17A, three-dimensional environment 1702 includes a representation of a physical environment 1705 of the computer system 101 as captured by computer system 101.

In some embodiments, computer system 101 includes a display generation component (e.g., a touch screen, a head-mounted device, or other type of display generation component), a physical button 1703, and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user 1710 or a part of the user 1710 (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or attention (e.g., including gaze) of the user (e.g., internal sensors facing inwards towards the face of the user). The figures herein illustrate a three-dimensional environment that is presented to the user by computer system 101 (e.g., and displayed by the display generation component of computer system 101) and an overhead view of the physical and/or three-dimensional environment associated with computer system 101 (e.g., such as overhead view 1714 in FIG. 17A) to illustrate the relative location of physical objects in the physical environment of computer system 101 and the location of virtual objects in the three-dimensional environment 1702.

As shown in FIG. 17A, computer system 101 captures one or more images of the physical environment around computer system 101 (e.g., operating environment 100), including one or more objects in the physical environment around computer system 101. In some embodiments, computer system 101 displays a representation of the physical environment 1705 in three-dimensional environment 1702, such as a virtual pass-through environment. In some embodiments, one or more portions of the physical environment 1705 are visible via optical passthrough via the display generation component 120. Three-dimensional environment 1702 includes a representation **1704*a* of a coffee table (corresponding to representation 1704*b* in the overhead view), which is optionally a representation of a physical coffee table in the physical environment, and a representation 1706*a* of a physical light source (e.g., a floor lamp) (corresponding to representation 1706*b* in the overhead view). Additionally, in some embodiments, as shown in FIG. 17A, the three-dimensional environment 1702** includes representations of the floor, walls, and/or ceiling of the physical environment.

In the example of FIG. 17A, computer system 101 displays, in three-dimensional environment 1702, selectable icons **1708*a*-1708*d* that represent different selectable environments, such as the environments discussed with reference to method 1600. In some embodiments, computer system 101 displays icons 1708*a*-1708*d* in response to a user input requesting display of icons 1708*a*-1708*d*. In some embodiments, icons 1708*a*-1708*d* have one or more of the characteristics of icons 1508*a*-1508*d* described with reference to FIG. 15A and method 1600**.

In FIG. 17A, the computer system 101 detects an input **1730*a* indicating a selection of icon 1708*a*, where icon 1708*a* represents a first virtual environment. The input 1730*a* is optionally provided by a hand 1716 of user 1710, and optionally includes a hand air gesture (e.g., a hand raise, air pinch gesture, air pinch and release, and/or a pointing air gesture in which the index finger of the hand of the user is extended from the palm while the other fingers are curled towards the palm) and/or a touch input (e.g., a tap or long press on a touch-sensitive input device). In some embodiments, input 1730 includes an attention of the user 1710 directed to an icon 1708*a*-1708*d*, optionally for a threshold duration as described with reference to method 1600. In some embodiments, detecting an attention of the user 1710 includes detecting a gaze direction of the user 1710 (e.g., detecting whether the user 1710 is looking at a respective icon 1708*a*-1708*d*). In some embodiments, an input 1730*a* includes a combination of an input provided by hand 1716 and attention of the user, such as a hand raise or air pinch while the user is looking at an icon 1708*a*-1708*d***.

In the example of FIG. 17A, when input **1730*a* is detected, the user 1710 of computer system 101 (and/or computer system 101 itself) is oriented with a facing direction 1732*a* towards the back wall of three-dimensional environment 1702. For embodiments in which the computer system 101 is a head-mounted device, the facing direction, field of view, viewpoint, and movement of the viewpoint of the user and of the computer system can be assumed to be essentially the same and/or corresponding, since forward-facing sensors (e.g., cameras) of the computer system 101 are roughly aligned to the facing direction of the user. For embodiments in which the computer system 101 is a hand-held device, such as depicted in FIG. 17A, the facing direction, field of view, viewpoint, and movement of a viewpoint of the user and of the computer system 101 may differ; in this case, references to such quantities apply to the computer system 101 rather than to the user 1710**.

In FIG. 17A, the viewpoint of the user 1710 (e.g., corresponding to the field of view **1731*a* of computer system 101) is indicated in overhead view 1714 using a pair of dashed lines, which correspond to the view of three-dimensional environment 1702 presented to the user 1710 via display generation component 120**.

Figure 17B:
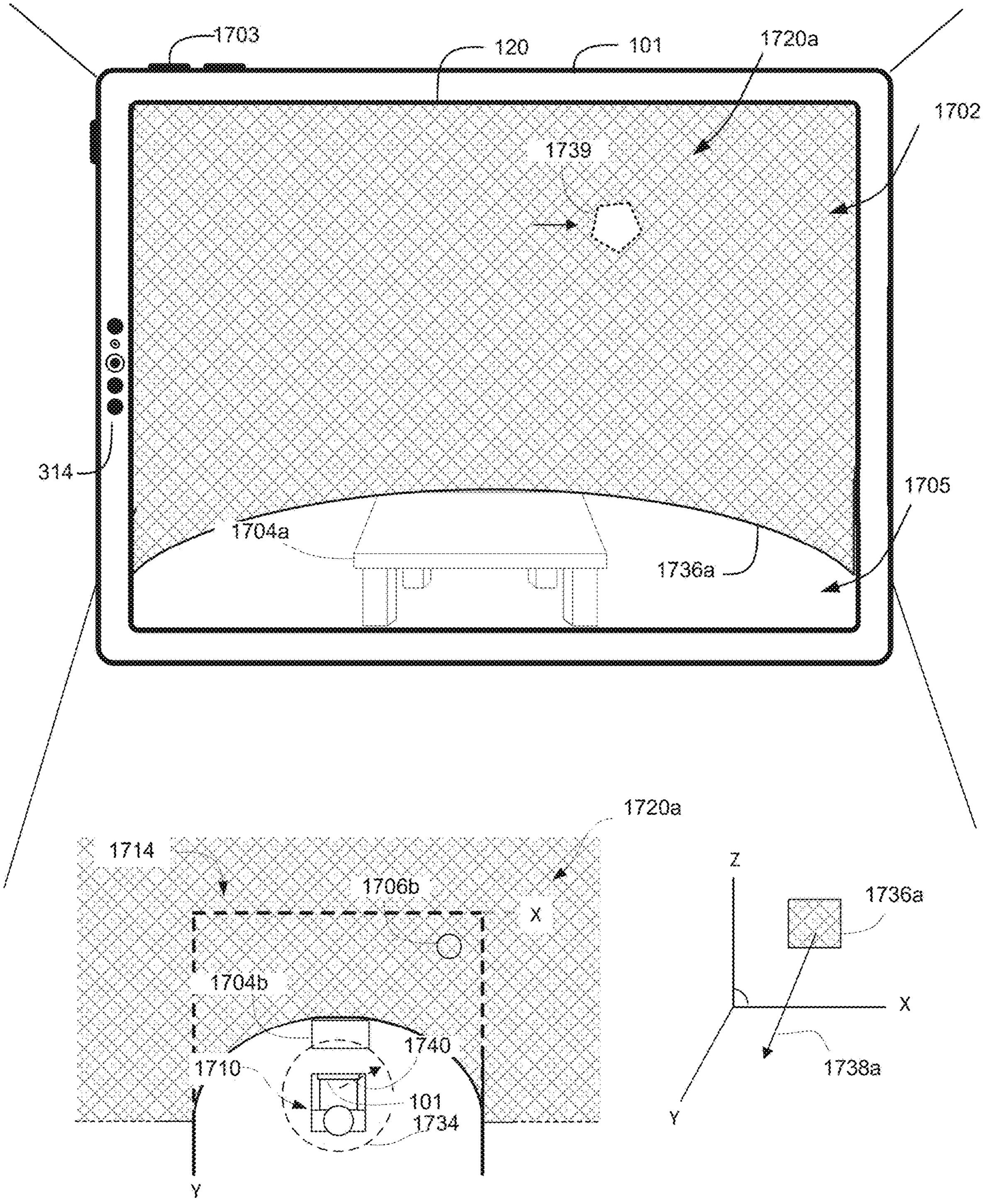

In some embodiments, in response to detecting the input **1730*a* indicating a selection of icon 1708*a* as shown in FIG. 17A, the computer system 101 transitions from displaying, in three-dimensional environment 1702, the representation of the physical environment 1705 to displaying a first virtual environment 1720*a* that is, optionally, superimposed on and/or obscures the representation of the physical environment 1705 and optionally displayed at less than full immersion, as shown in FIG. 17B. Optionally, first virtual environment 1720***a* includes one or more virtual animated elements 1739 that move within the first virtual environment 1720*a*. Optionally, computer system 101 transitions from displaying the representation of the physical environment 1705 (e.g., as shown in FIG. 17A) to displaying the first virtual environment 1720*a* (e.g., as shown in FIG. 17B) as described with reference to method 1600, such as by gradually fading in virtual environment 1720*a* and/or using a volumetric transition. In some embodiments, displaying the first virtual environment 1720*a* (e.g., as shown in FIG. 17B) includes displaying the first virtual environment 1720*a* at a particular immersion level, such as described with reference to method 1600. In some embodiments, if a virtual environment is displayed using a volumetric transition, the virtual environment is initially displayed with a portal that opens in a particular direction and the display of the virtual environment gradually expands until, optionally, the virtual environment is displayed at a final immersion level.

In some embodiments, computer system 101 displays first virtual environment 1720*a* by displaying a portal 1736*a* to first virtual environment 1720*a*, as shown in three-dimensional environment 1702 and represented in the coordinate system view in the lower right-hand corner of FIG. 17B and described in more detail below. In some embodiments, the first virtual environment 1720*a* is visible through the portal; for example, the portal is optionally similar to a virtual "window" through which the first virtual environment 1720*a* is viewed and/or visible, thereby constituting a boundary or edge of the first virtual environment 1720 (and/or boundary or edge between the first virtual environment 1720 and portion(s) of three-dimensional environment 1702 in which the physical environment of the user is visible) when the first virtual environment 1720 is displayed at less than full immersion. Additional details regarding portals to virtual environments are provided with reference to method 1800.

In some embodiments, some virtual environments have portals that open in front of the user 1710 and/or in front of a forward-facing camera of computer system 101. For example, some portals open in a horizontal direction from in front of the user; e.g., a direction that is horizontally towards and/or along a line-of-sight of the user 1710, such as a direction that is parallel to a ceiling or floor of the physical environment or orthogonal to a wall of the physical environment. In some embodiments, other virtual environments have portals that open in a vertical direction, such as opening from above or below the user 1710 in a vertical direction that is orthogonal to a floor or ceiling of the physical environment of the user.

By way of an example, a virtual beach optionally has a portal that opens horizontally, in front of the user, such that the user 1710 sees the virtual beach when looking forward. In contrast, a virtual sky optionally has a portal that opens vertically, above the user, such that the user sees the virtual sky when looking upward. In some embodiments, the opening direction associated with a virtual environment corresponds to the direction in which a user would naturally view the virtual environment if the virtual environment was a physical place. Additional details regarding portal opening directions are provided with reference to method 1800.

In the example of FIG. 17B, portal 1736*a* to first virtual environment 1720*a* opens in a first direction 1738*a*. As shown in the coordinate system of FIG. 17B, which optionally represents a coordinate system associated with (e.g., corresponding to) a coordinate system of the physical environment (e.g., as indicated by the X, Y axes in the overhead view 1714), first direction 1738*a* is a horizontal direction that is roughly orthogonal to the back wall (not shown in FIG. 17B) of the representation of the physical environment 1705 and portal 1736*a* opens toward the face and/or viewpoint of the user 1710 (e.g., the direction in which the portal opens is based on the facing direction 1732*a* of the user 1710—corresponding to the orientation of the viewpoint of the user—when the user 1710 provided the input 1730*a* indicating a selection of icon 1708*a* as shown in FIG. 17A).

In some embodiments, as described in more detail with reference to FIGS. 17C-17D, computer system 101 optionally ceases to display virtual environment 1720*a* having a portal 1736 that opens in the first direction if the viewpoint of the user 1710 (and/or computer system 101) moves more than a movement threshold from an initial viewpoint of the user 1710 (e.g., the viewpoint of the user when the user 1710 invoked display of first virtual environment 1720*a*). For example, as shown in the overhead view of FIG. 17B, if computer system 101 detects that the viewpoint of user 1710 has moved more than movement threshold 1740 (e.g., if the user 1710 moves outside of boundary 1734, which optionally represents a circle or sphere having a radius of movement threshold 1740) while the computer system 101 is displaying the first virtual environment 1720*a*, computer system 101 optionally ceases to display first virtual environment 1720*a*, as described in more detail with reference to FIG. 17C. Ceasing to display a virtual environment that opens in a first direction (e.g., horizontally, towards a facing direction of the user) in response to detecting that the user has moved more than a movement threshold provides additional safety and convenience for the user by allowing the user to see the representation of the physical environment in which the user is moving.

In some embodiments, the value of movement threshold 1740 depends on the direction of movement; for example, the movement threshold 1740 is optionally lower for movement in a horizontal direction (which may indicate that the user is walking within the room and needs to be able to see the room) than for movement in a vertical direction (which may indicate that the user is standing up but is not navigating the room). Additional details regarding the movement threshold 1740 are provided with reference to method 1800.

Figure 17C:
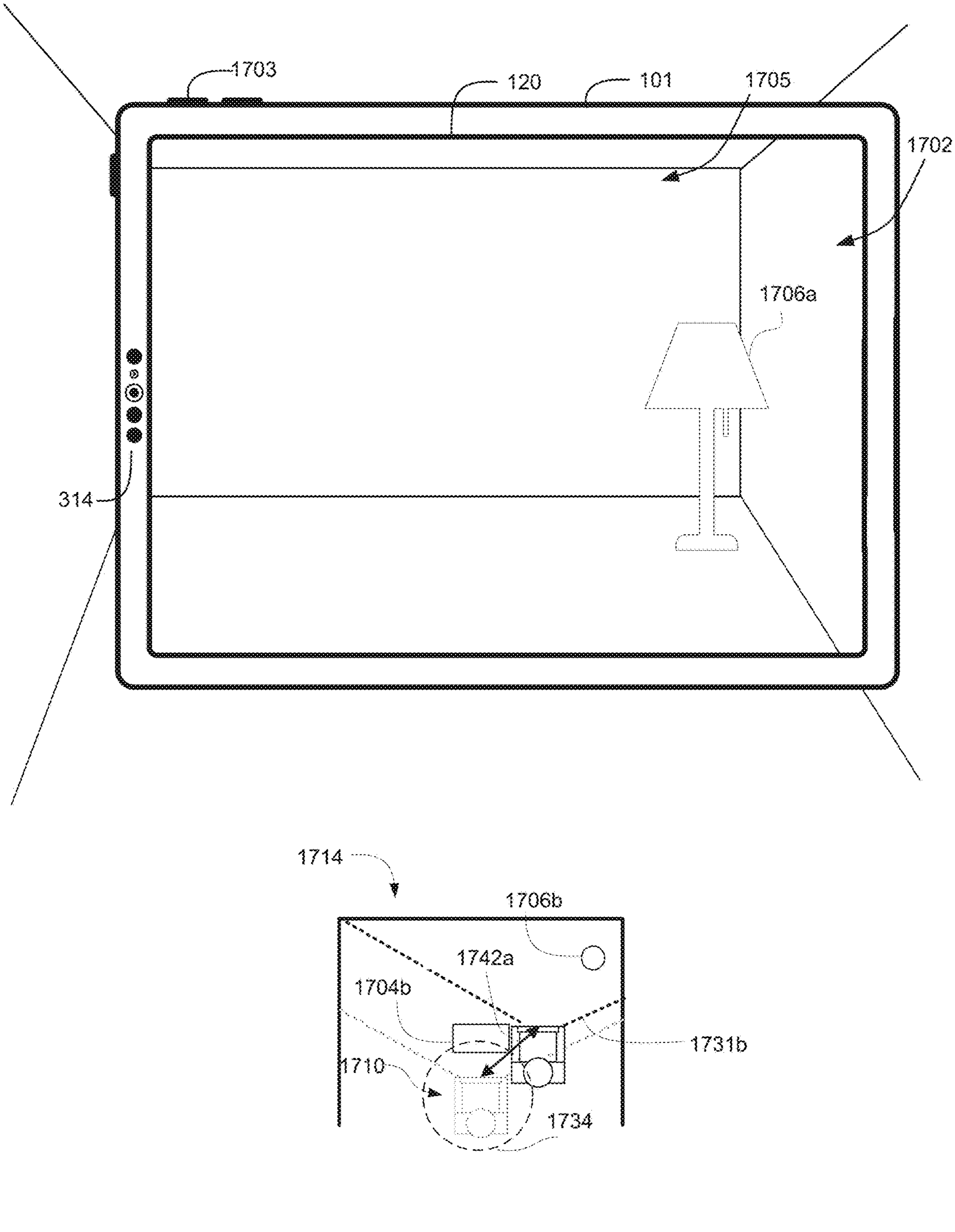

FIG. 17C depicts a scenario in which, while displaying the first virtual environment 1720*a* as shown in FIG. 17B, computer system 101 detects that the viewpoint of the user 1710 (e.g., a viewpoint of the user 1710 and/or of the computer system 101) has moved a first distance 1742*a* that is more than movement threshold 1740; e.g., the user 1710 has moved outside of boundary 1734. In response to detecting that the movement of the viewpoint of the user 1710 exceeds the movement threshold 1740, computer system 101 ceases to display virtual environment 1720*a* and instead displays an additional portion of representation of physical environment 1705 (e.g., in a volume or area previously occupied by the display of virtual environment 1720*a*, that would continue to display virtual environment 1720*a* if the viewpoint of the user had not exceeded the movement threshold). Optionally, computer system 101 dynamically updates the view of the representation of physical environment 1705 in accordance with the movement of the viewpoint of the user 1710, such that the view of the representation of the physical environment 1705 corresponds to the new field of view 1731*b* of the user 1710 (and/or of the computer system 101), as shown in FIG. 17C.

Figure 17D:
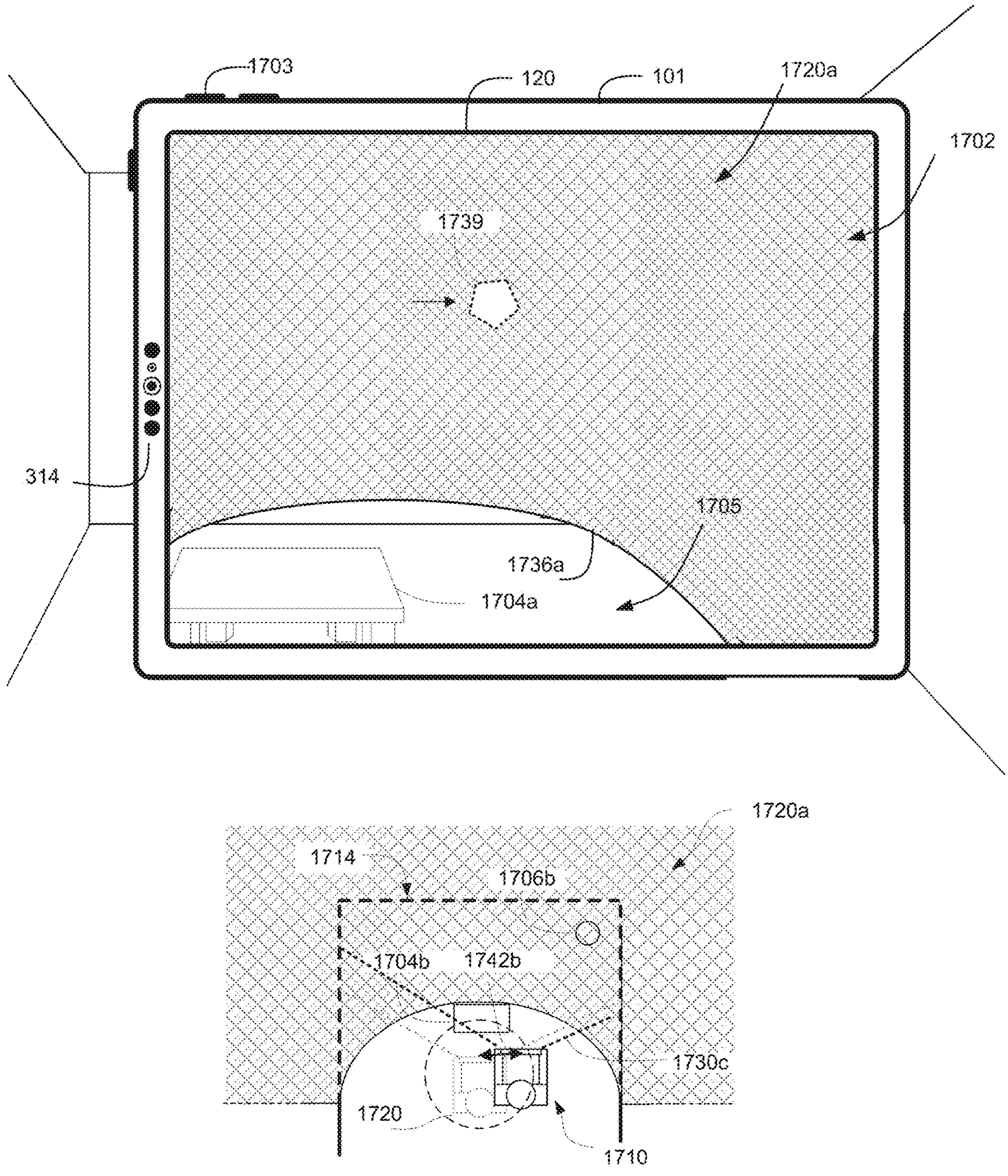

FIG. 17D depicts an alternative to FIG. 17C in which, while displaying first virtual environment 1720*a* having a portal 1736 that opens in the first direction 1738*a*, computer system 101 detects that the viewpoint of the user 1710 (e.g., a viewpoint of the user 1710 and/or of the computer system 101) has moved a second distance 1742*b* that is less than movement threshold 1740. Such a scenario may occur, for example, when the user moves their head a small amount (e.g., if computer system 101 is a head-mounted device) or otherwise moves computer system 101 a small amount that may not suggest that the user is trying to navigate the physical environment. In this case, in response to detecting the movement of the viewpoint of the user 1710 and determining that the second distance 1742*b* is less than the movement threshold 1740, computer system 101 continues to display first virtual environment 1720*a* as shown in FIG. 17D. As shown in FIG. 17D, computer system 101 optionally updates the display of portal 1736 and first virtual environment 1720*a* in accordance with the movement of the viewpoint of the user 1710, such that computer system 101 optionally displays a different portion of the portal 1736 and/or of the first virtual environment 1720*a* and/or displays portal 1736 and/or first virtual environment 1720*a* as seen from a different viewing angle.

Figure 17E:
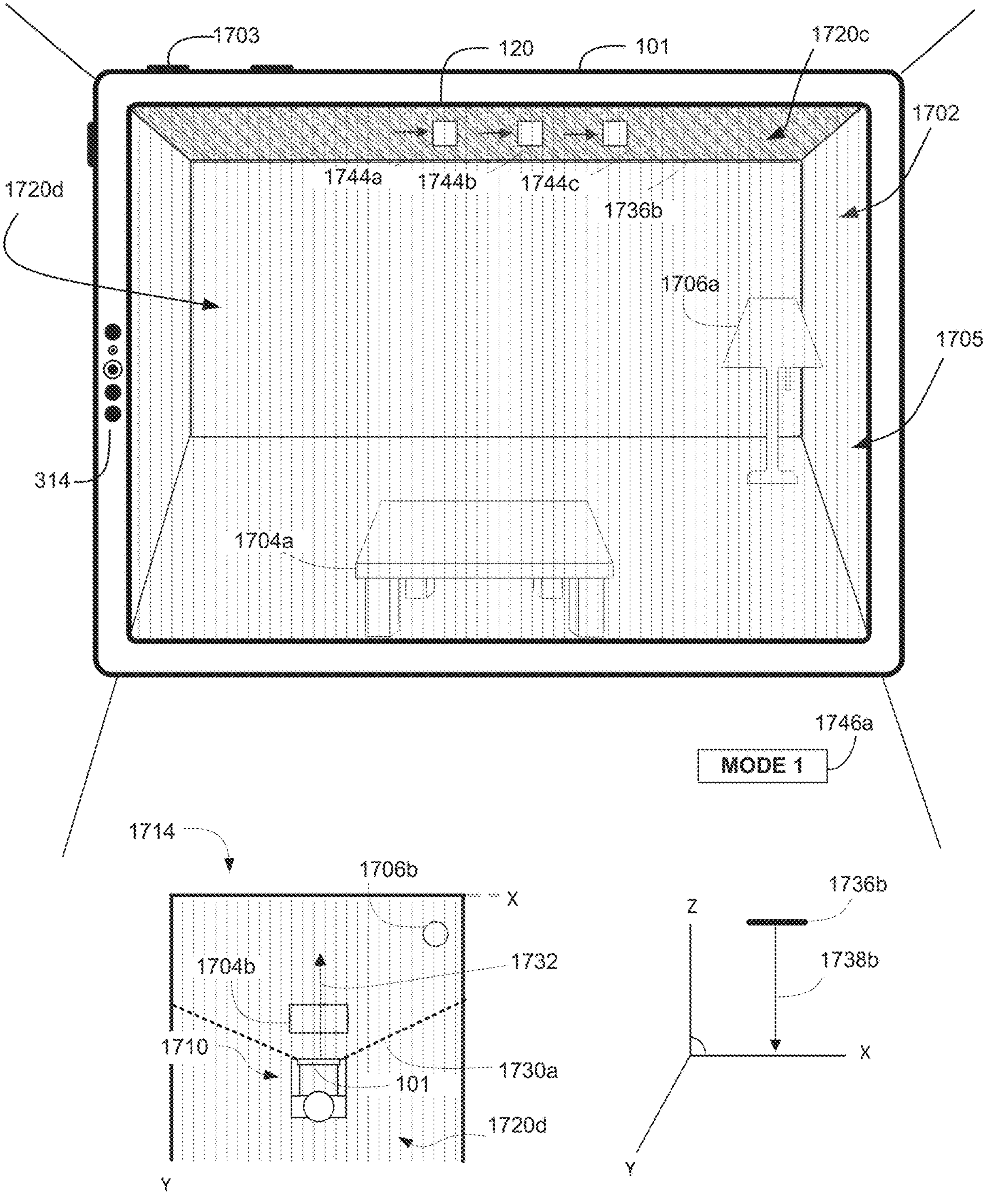

FIG. 17E depicts an alternative to FIG. 17B, when, in FIG. 17A, the computer system 101 detects an input 1730*b* indicating a selection of icon 1708*d*, where icon 1708*d* represents a first mixed environment that includes both a virtual environment and an atmospheric effect (e.g., such as a virtual sky that casts a tint on the representation of the physical environment displayed and/or visible in three-dimensional environment 1702). In response to detecting input 1730*b*, computer system 101 displays the first mixed environment, which includes a second virtual environment 1720*c* having a portal 1736*b* that opens in a second direction 1738*b* (e.g., vertically downwards, orthogonally to the ceiling) and a corresponding first atmospheric effect 1720*d* displayed in the representation of physical environment displayed in three-dimensional environment 1702. Second virtual environment 1720*c* optionally includes one or more virtual animated elements, such as virtual animated elements 1744*a*-1744*c* (e.g., virtual clouds in a virtual sky).

In some embodiments, virtual and/or mixed environments that are associated with portals that open in a vertical direction (e.g., downwards as shown in FIG. 17D) are displayed with the portal opening in the same direction regardless of the orientation of the viewpoint of the user or the facing direction of the user 1710 (and/or of computer system 101) when the input (e.g., input 1730*b* of FIG. 17A) requesting display of the virtual or mixed environment is detected. For example, second virtual environment 1720*c* is optionally displayed with portal 1736*b* opening in the second direction 1738*b* independent of the viewpoint of the user and/or the facing direction of user 1710 when input 1730*b* is detected.

Virtual environments having portals that open in a vertical direction may not visually occlude the portions of the representation of the physical environment displayed in three-dimensional environment 1702 in which the user may move, and therefore may not interfere with a user's ability to navigate a physical environment. Thus, computer system 101 optionally maintains display of such virtual environments regardless of movement of the viewpoint of the user, as described in more detail below.

In some embodiments, virtual and/or mixed environments having portals that open in a vertical direction (e.g., downwards as shown in FIG. 17E) continue to be displayed regardless of movement of the viewpoint of the user. For example, as shown in FIG. 17F, if computer system 101 detects, while displaying second virtual environment 1720*c* having portal 1736*b* opening in direction 1738*b* and its associated first atmospheric effect 1720*d*, that the viewpoint of the user 1710 has moved the first distance 1742*a* that is more than movement threshold 1740, computer system 101 maintains display of second virtual environment 1720*c*.

Figure 17F:
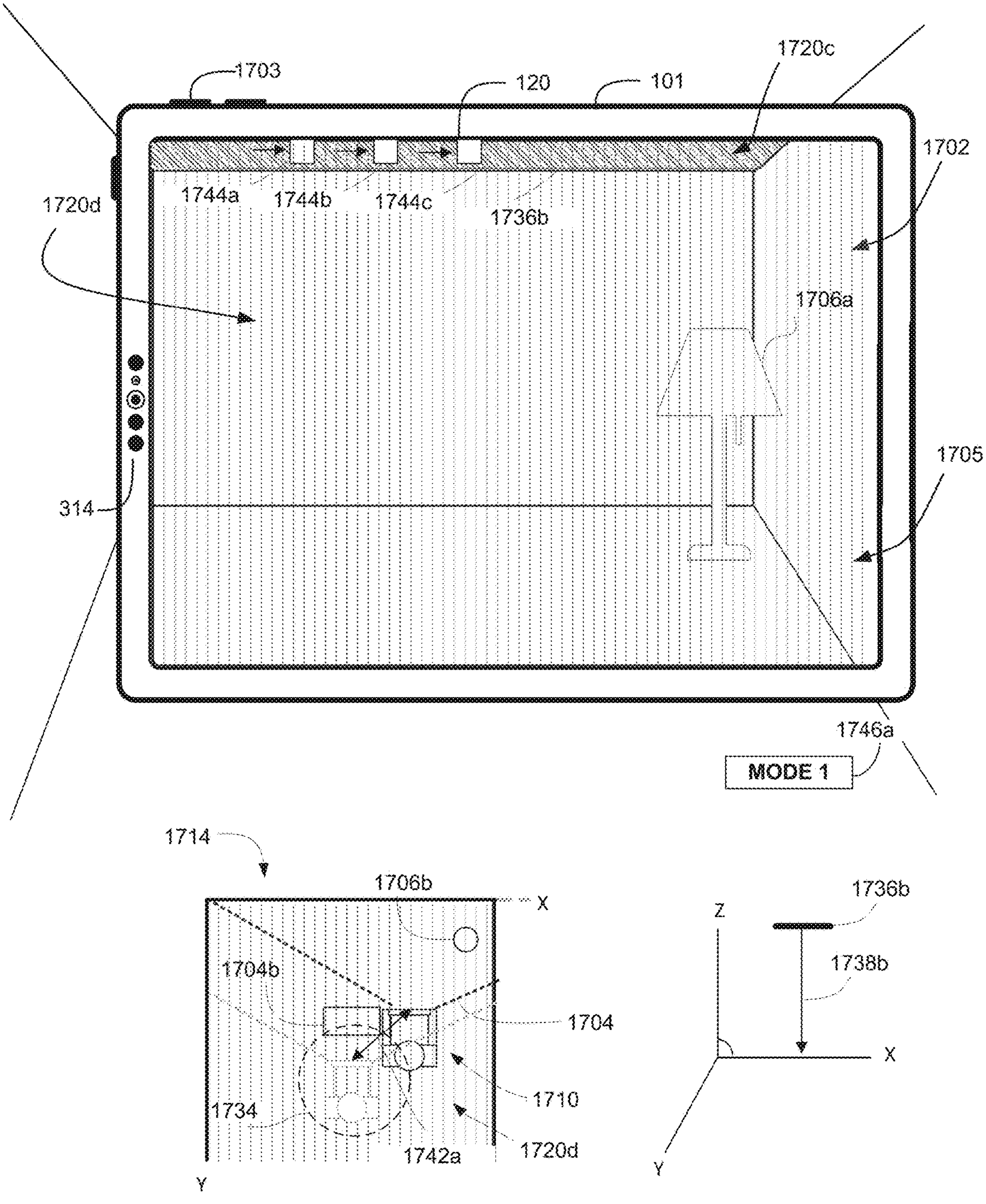

As shown in FIG. 17F, when computer system 101 maintains display of second virtual environment 1720*c* and first atmospheric effect 1720*d*, computer system 101 optionally updates the display of portal 1736 and second virtual environment 1720*c* in accordance with the movement of the viewpoint of the user 1710, such that computer system 101 optionally displays a different portion of the portal 1736*b* and/or second virtual environment 1720*c*, and/or displays portal 1736*b* and/or second virtual environment 1720*c* as seen from a different viewing angle.

Similarly, displaying atmospheric effects (e.g., first atmospheric effect 1720*d*) in the representation of the physical environment displayed in three-dimensional environment 1702 optionally does not visually occlude the representation of the physical environment displayed in three-dimensional environment 1702 and therefore may not interfere with a user's ability to navigate a physical environment. Thus, computer system 101 optionally maintains display of atmospheric effects regardless of movement of the viewpoint of the user, as shown in FIG. 17F.

In some embodiments, mixed environments that include both a virtual environment and an associated atmospheric effect (e.g., in which the virtual environment and atmospheric effect are displayed concurrently, where the atmospheric effect simulates a tint cast by the virtual environment) are displayed differently by computer system 101 depending on a mode of operation of computer system 101. The mode of operation optionally corresponds to a time of day, such as sunrise, daytime, sunset, nighttime, light, or dark, and computer system 101 optionally displays the virtual environment and/or associated atmospheric effect in a manner that simulates the lighting and/or other characteristics of the time of day associated with the operating mode. For example, when computer system is operating in a first mode (e.g., a daytime or "light" mode), computer system 101 optionally displays a virtual environment as it would appear during daylight hours and/or displays an associated atmospheric effect that simulates the tint that would be cast by the virtual environment during the day. Similarly, when computer system is operating in a second mode (e.g., a nighttime or "dark" mode), computer system 101 optionally displays the virtual environment as it would appear during nighttime hours and/or displays an associated second atmospheric effect that simulates the tint that would be cast by the virtual environment at night. In some embodiments, computer system 101 selects a mode of operation based on a physical time of day (e.g., as determined by a clock of computer system 101). In some embodiments, the mode of operation is selected by the user, such as by providing inputs in a user interface of the computer system 101.

In the examples of FIGS. 17E and 17F, computer system 101 is operating in a first mode (e.g., as indicated by legend 1746*a*), such as a daytime mode. For example, computer system optionally is operating in the second mode based on a physical time of day or an input from the user. Thus, computer system 101 optionally displays second virtual environment 1720*c*, including virtual animated elements 1744*a*-1744*c*, as it would appear during the daytime (e.g., a virtual daytime sky with animated clouds) and displays corresponding first atmospheric effect 1720*d* that simulates a tint that would be cast by second virtual environment 1720*c* during daytime.

Figure 17G:
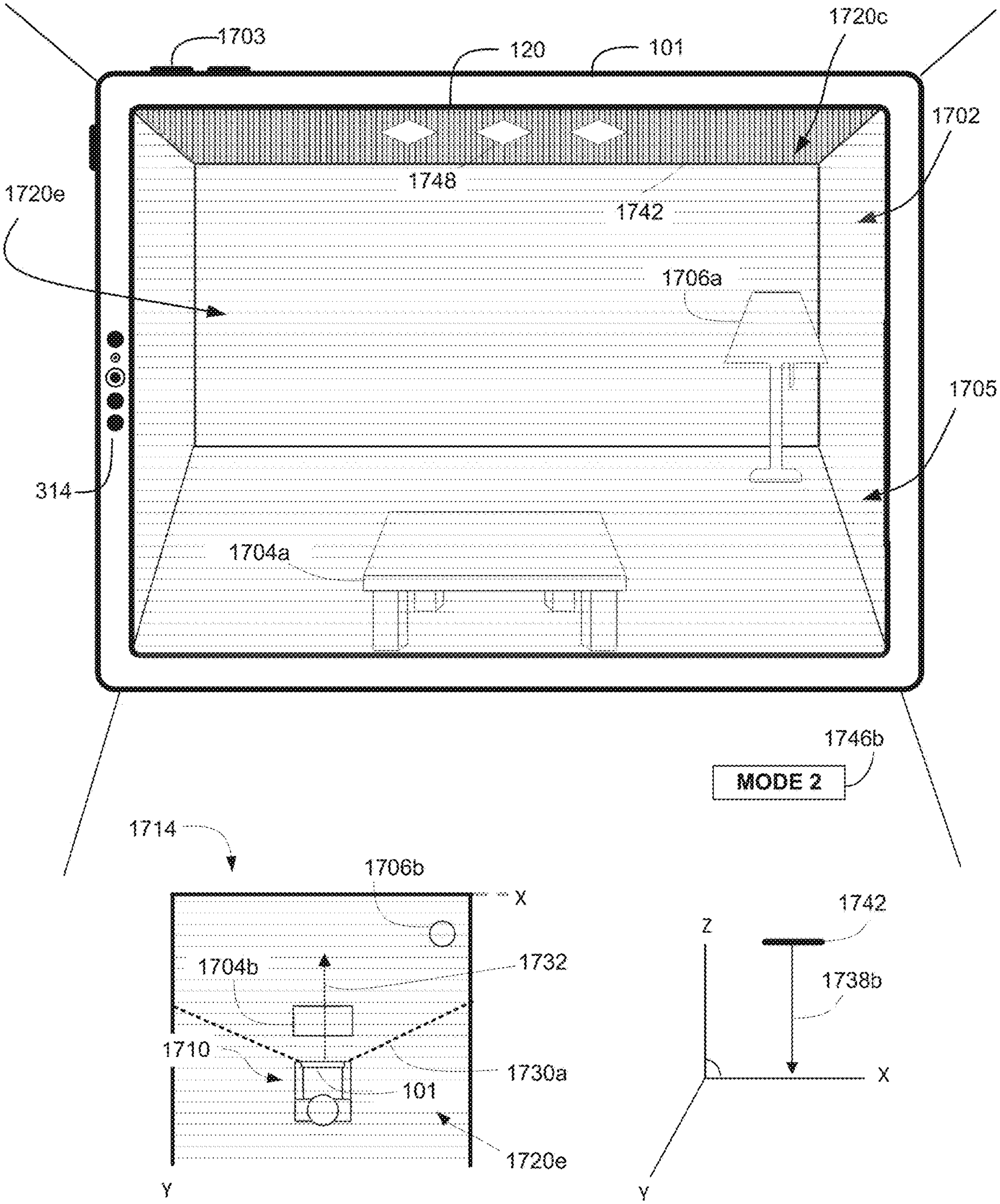

In the example of FIG. 17G, computer system 101 is operating in a second mode (e.g., as indicated by legend 1746*b*), such as a nighttime mode. For example, computer system optionally is operating in the second mode based on a physical time of day or an input from the user. In this case, computer system 101 optionally displays second virtual environment 1720*c*, including virtual element 1748, as it would appear during the nighttime (e.g., a virtual nighttime sky with stars that are optionally animated) and displays associated second atmospheric effect 1720*e* that simulates a tint that would be cast by second virtual environment 1720*c* during nighttime.

Figure 17H:
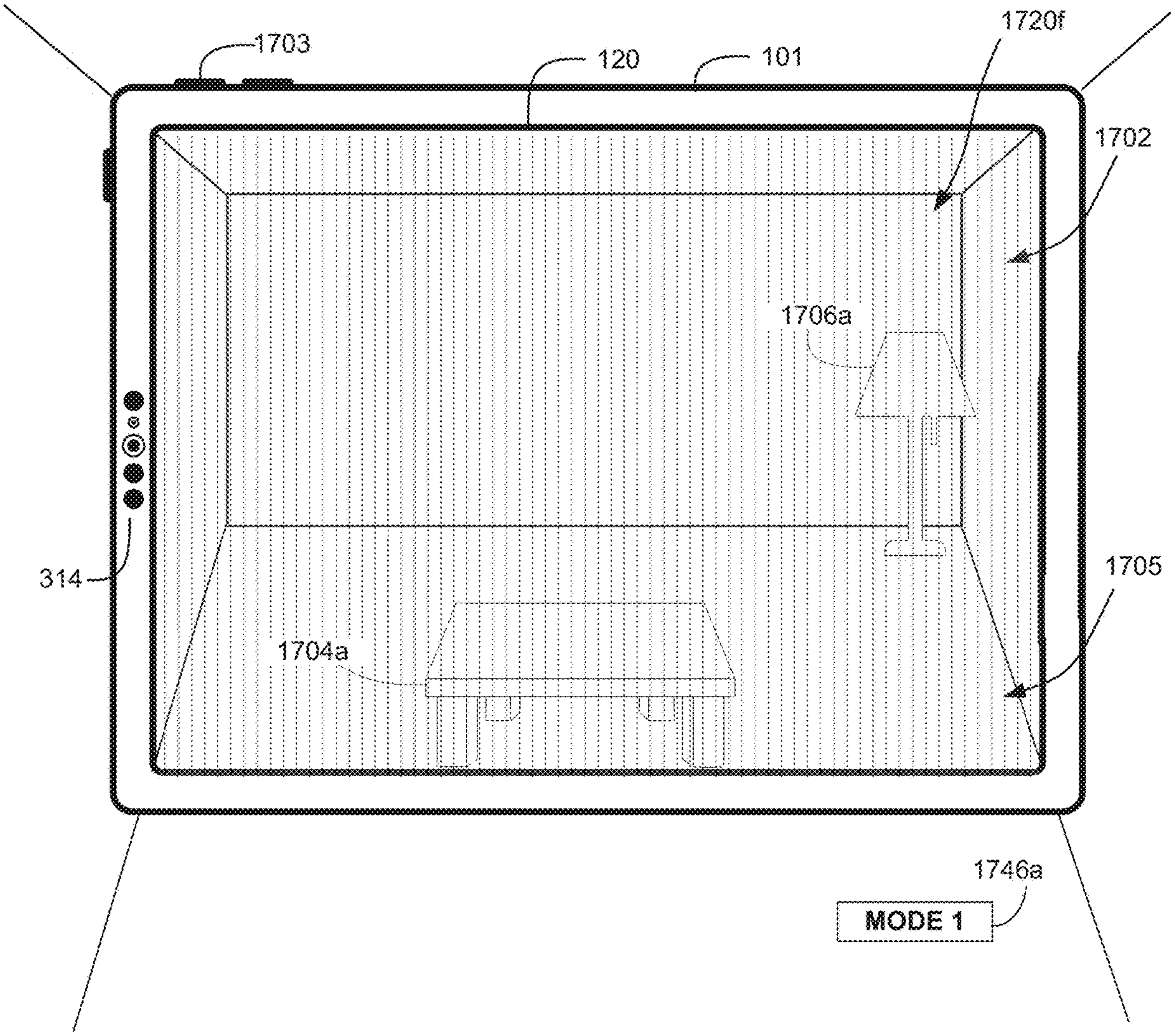
Figure 17I:
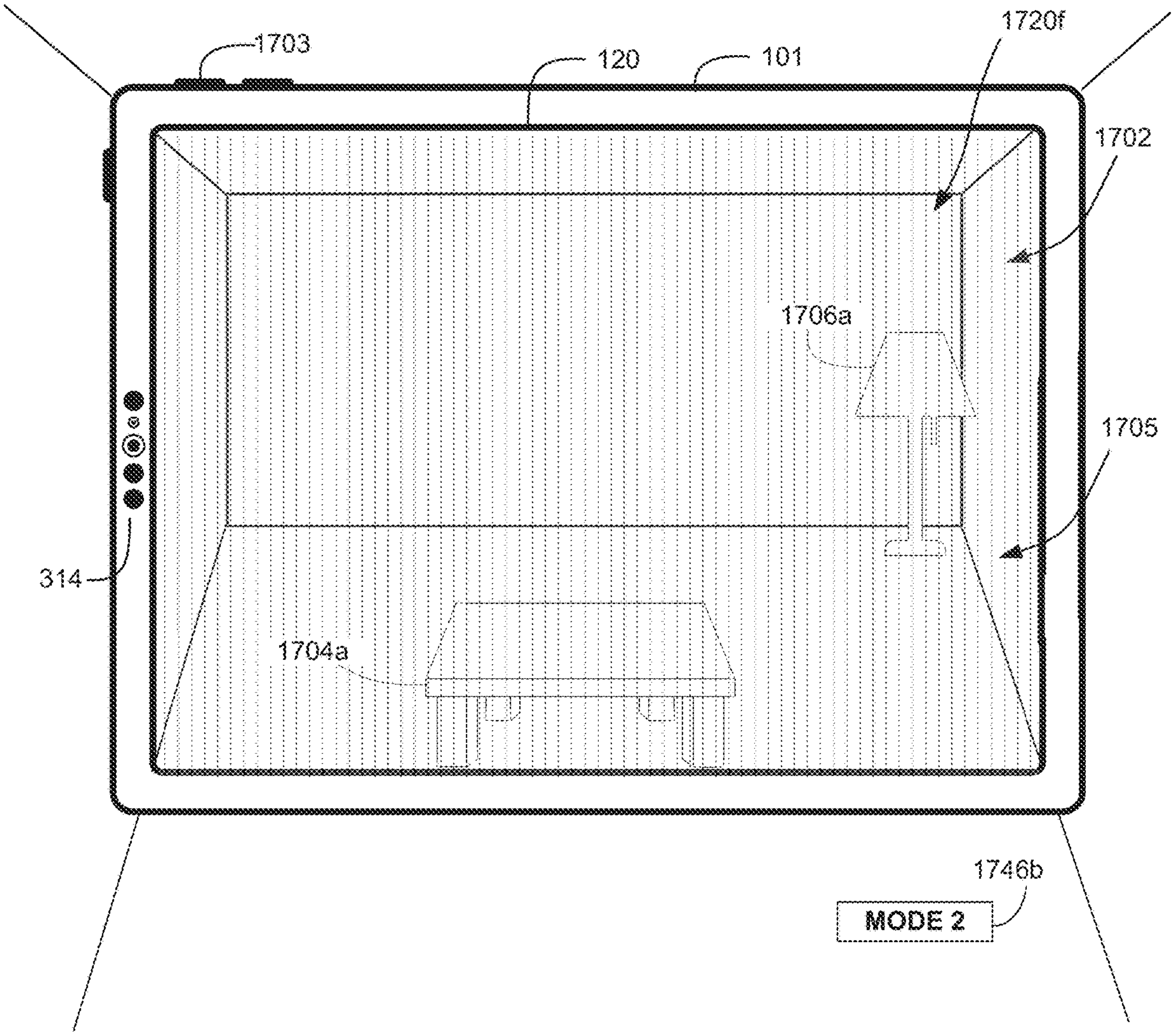

In some embodiments, atmospheric effects that are not associated with virtual environments (e.g., that are not part of a mixed environment and/or are not displayed concurrently with a virtual environment) are displayed by computer system 101 in the same way regardless of whether computer system 101 is operating in the first mode or the second mode, as illustrated by FIGS. 17H and 17I.

For example, if computer system 101 is operating in the first mode (as indicated by legend 1746*a* of FIG. 17H) when computer system 101 detects an input corresponding to a request to display a particular atmospheric effect (e.g., input 1730*c* of FIG. 17A indicating selection of icon 1708*c*, which represents the particular atmospheric effect), computer system 101 responds by displaying the particular atmospheric effect 1720*f* as shown in FIG. 17H.

If computer system 101 is operating in the second mode (as indicated by legend 1746*b* of FIG. 17I) when computer system 101 detects the input 1730*c*, computer system 101 responds by displaying the particular atmospheric effect 1720*f* in the same manner as shown in FIG. 17H (e.g., as shown in FIG. 17I).

In some embodiments, computer system 101 displays the atmospheric effect 1720*f* as shown in FIG. 17H when computer system 101 is operating in the first mode, and continues to display atmospheric effect 1720*f* as shown in FIG. 17I if computer system 101 detects that computer system 101 has received an input corresponding to a request to change from the first mode to the second mode. For example, changing the mode does not cause a change in the display of the atmospheric effect 1720*f*.

Figure 17J:
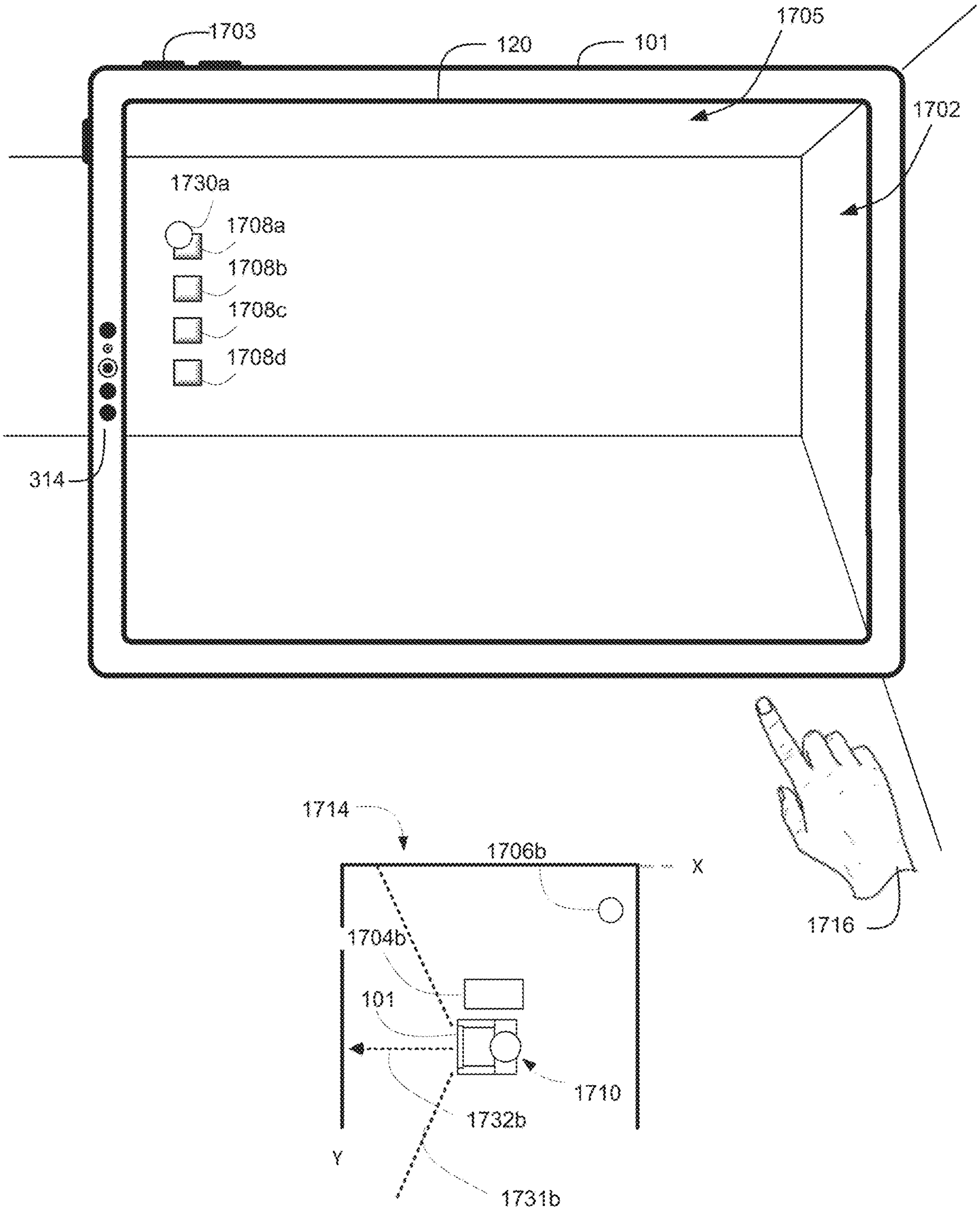
Figure 17K:
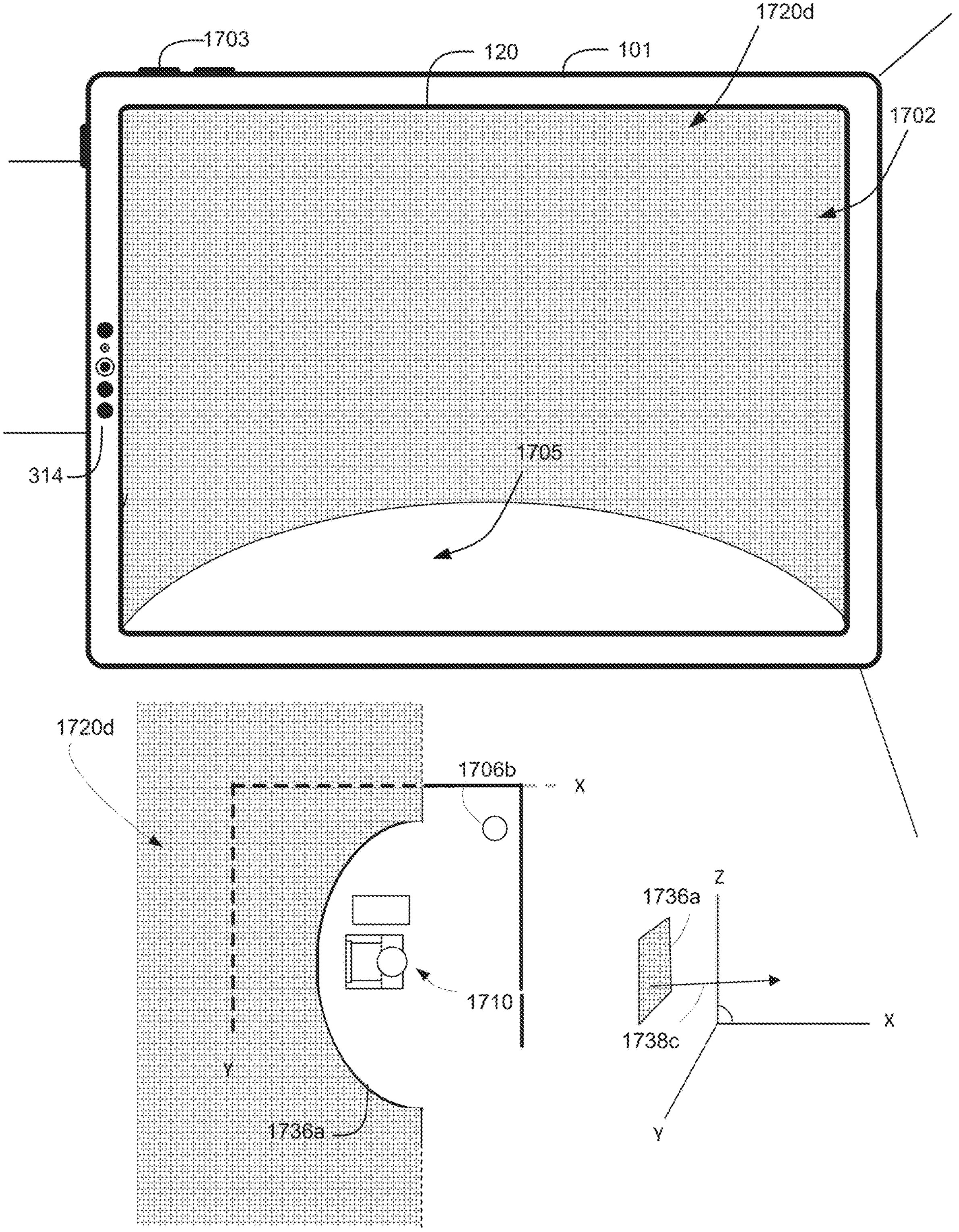

FIGS. 17J and 17K depict an alternative to FIGS. 17A and 17B, in which the user is facing a different direction when the user provides an input to select an icon representing a virtual environment having a portal that opens in a horizontal direction.

FIG. 17J depicts an alternative to FIG. 17A in which the user is facing in a different direction (e.g., facing direction 1732*b*)—corresponding to the viewpoint of the user being oriented in a different direction—when the user 1710 provides an input requesting display of the first virtual environment (e.g., input 1730*a*). In FIG. 17J, the user 1710 is facing a side wall of the room instead of facing the back wall as shown in FIG. 17A.

In some embodiments, in response to detecting the input 1730*a* indicating a selection of icon 1708*a* as shown in FIG. 17J, the computer system 101 transitions from displaying, in three-dimensional environment 1702, the representation of the physical environment 1705 to displaying the first virtual environment 1720*a* having portal 1736*a* as shown in FIG. 17K. In the example of FIG. 17K, the portal 1736*a* opens in a third direction 1738*c* (e.g., different than direction 1738*a* in FIG. 17B) that is selected by computer system 101 based on the facing direction 1732*b* of the user and/or the viewpoint of the user 1710 such that portal 1736*a* opens in front of the user 1710 and/or in front of the viewpoint of the user. In some embodiments, the third direction is a horizontal direction.

FIG. 17J1 illustrates similar and/or the same concepts as those shown in FIG. 17J (with many of the same reference numbers). It is understood that unless indicated below, elements shown in FIG. 17J1 that have the same reference numbers as elements shown in FIGS. 17A-17M have one or more or all of the same characteristics. FIG. 17J1 includes computer system 101, which includes (or is the same as) display generation component 120. In some embodiments, computer system 101 and display generation component 120 have one or more of the characteristics of computer system 101 shown in FIGS. 17J and 17A-17M and display generation component 120 shown in FIGS. 1 and 3, respectively, and in some embodiments, computer system 101 and display generation component 120 shown in FIGS. 17A-17M have one or more of the characteristics of computer system 101 and display generation component 120 shown in FIG. 17J1.

In FIG. 17J1, display generation component 120 includes one or more internal image sensors 314*a* oriented towards the face of the user (e.g., eye tracking cameras 540 described with reference to FIG. 5). In some embodiments, internal image sensors 314*a* are used for eye tracking (e.g., detecting a gaze of the user). Internal image sensors 314*a* are optionally arranged on the left and right portions of display generation component 120 to enable eye tracking of the user's left and right eyes. Display generation component 120 also includes external image sensors 314*b* and 314*c* facing outwards from the user to detect and/or capture the physical environment and/or movements of the user's hands. In some embodiments, image sensors 314*a*, 314*b*, and 314*c* have one or more of the characteristics of image sensors 314 described with reference to FIGS. 17A-17M.

In FIG. 17J1, display generation component 120 is illustrated as displaying content that optionally corresponds to the content that is described as being displayed and/or visible via display generation component 120 with reference to FIGS. 17A-17M. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 17J1.

Display generation component 120 has a field of view (e.g., a field of view captured by external image sensors 314*b* and 314*c* and/or visible to the user via display generation component 120, indicated by dashed lines in the overhead view) that corresponds to the content shown in FIG. 17J1. Because display generation component 120 is optionally a head-mounted device, the field of view of display generation component 120 is optionally the same as or similar to the field of view of the user.

In FIG. 17J1, the user is depicted as performing an air pinch gesture (e.g., with hand 1716) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 17A-17M.

In some embodiments, computer system 101 responds to user inputs as described with reference to FIGS. 17A-17M.

In the example of FIG. 17J1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 17A-17M and/or described with reference to the corresponding method(s) are optionally implemented on computer system 101 and display generation unit 120 in a manner similar or analogous to that shown in FIG. 17J1.

Figure 17L:
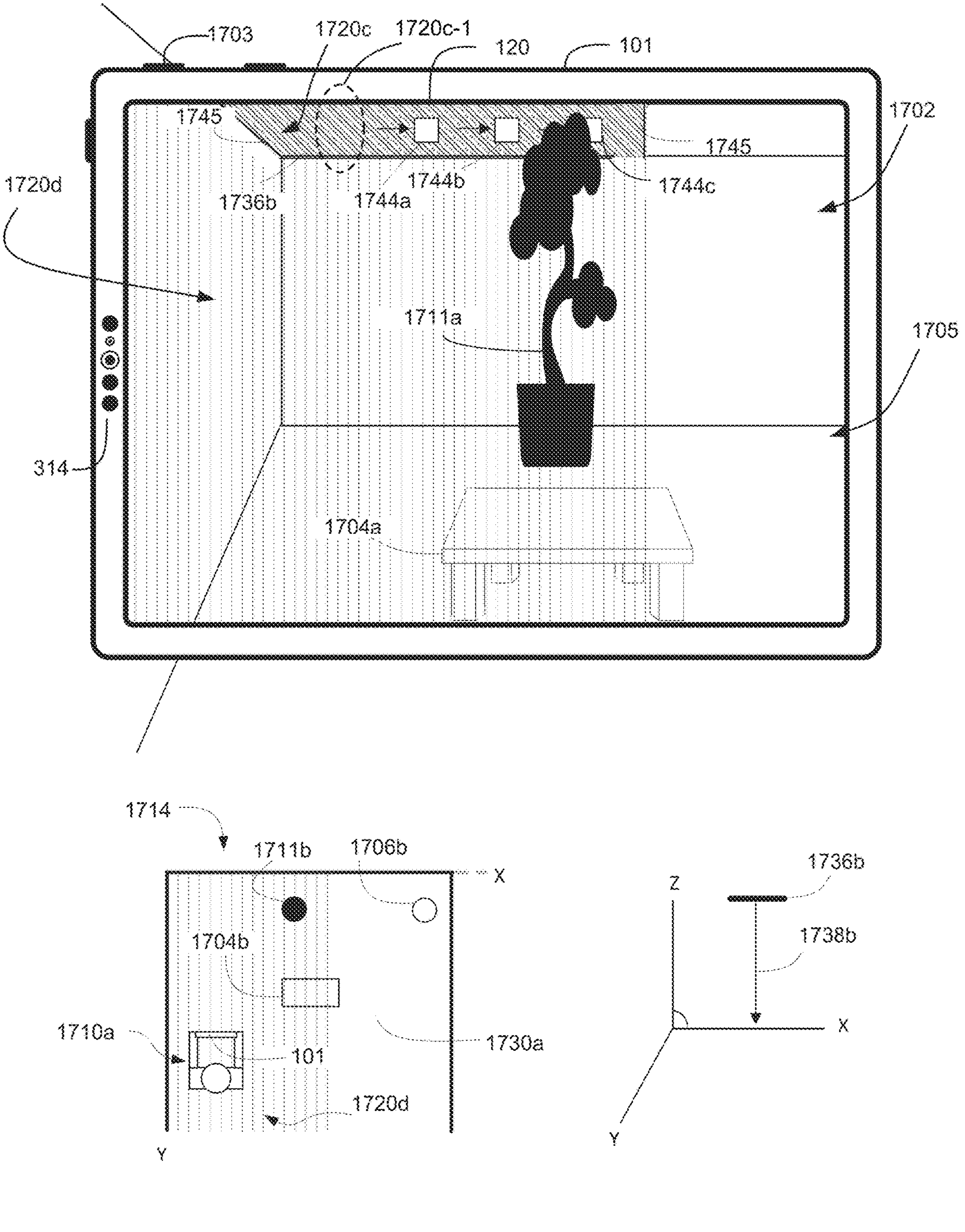
Figure 17M:
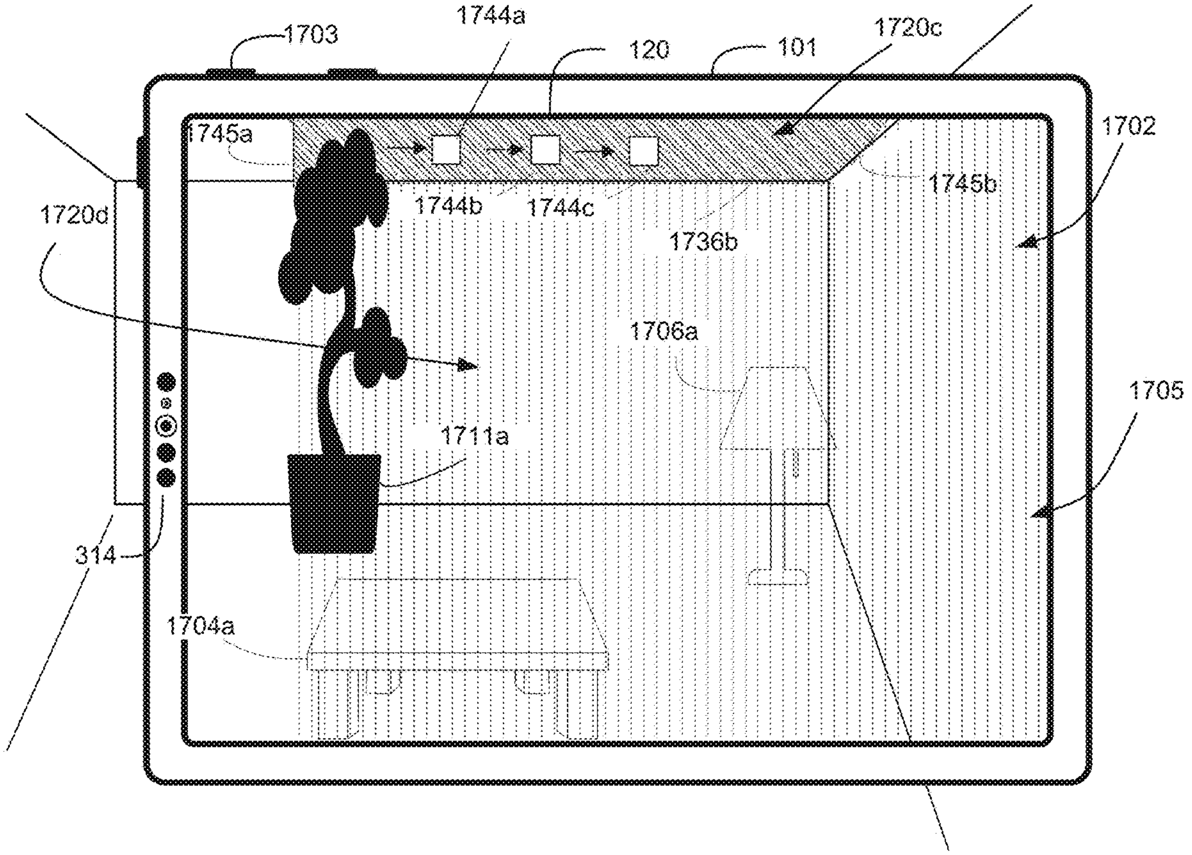
Figure 17M:
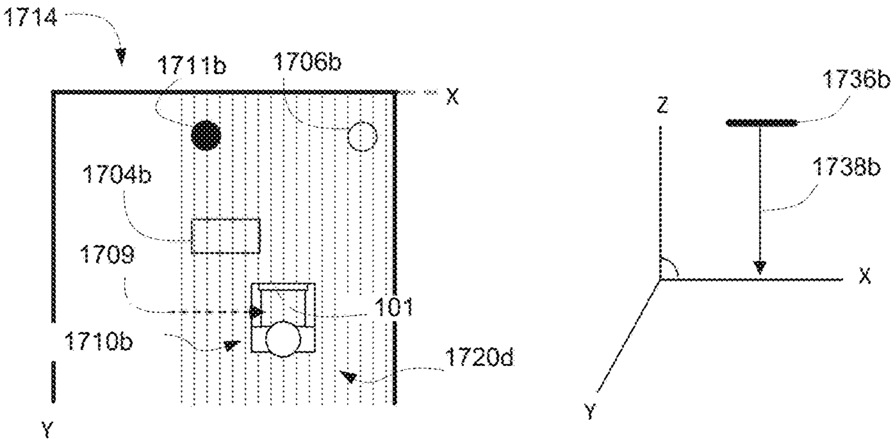
Figure 18A:
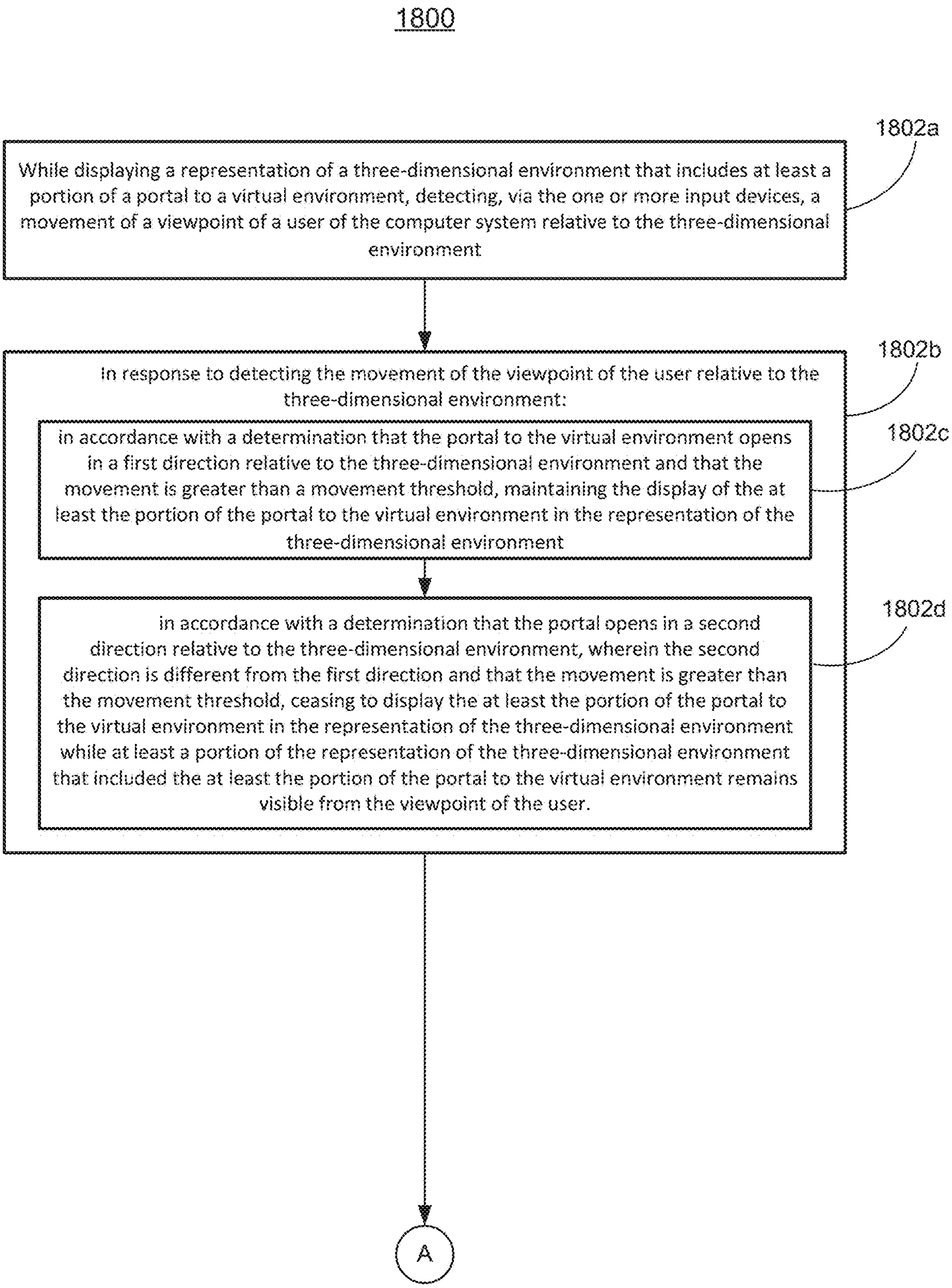
Figure 18B:
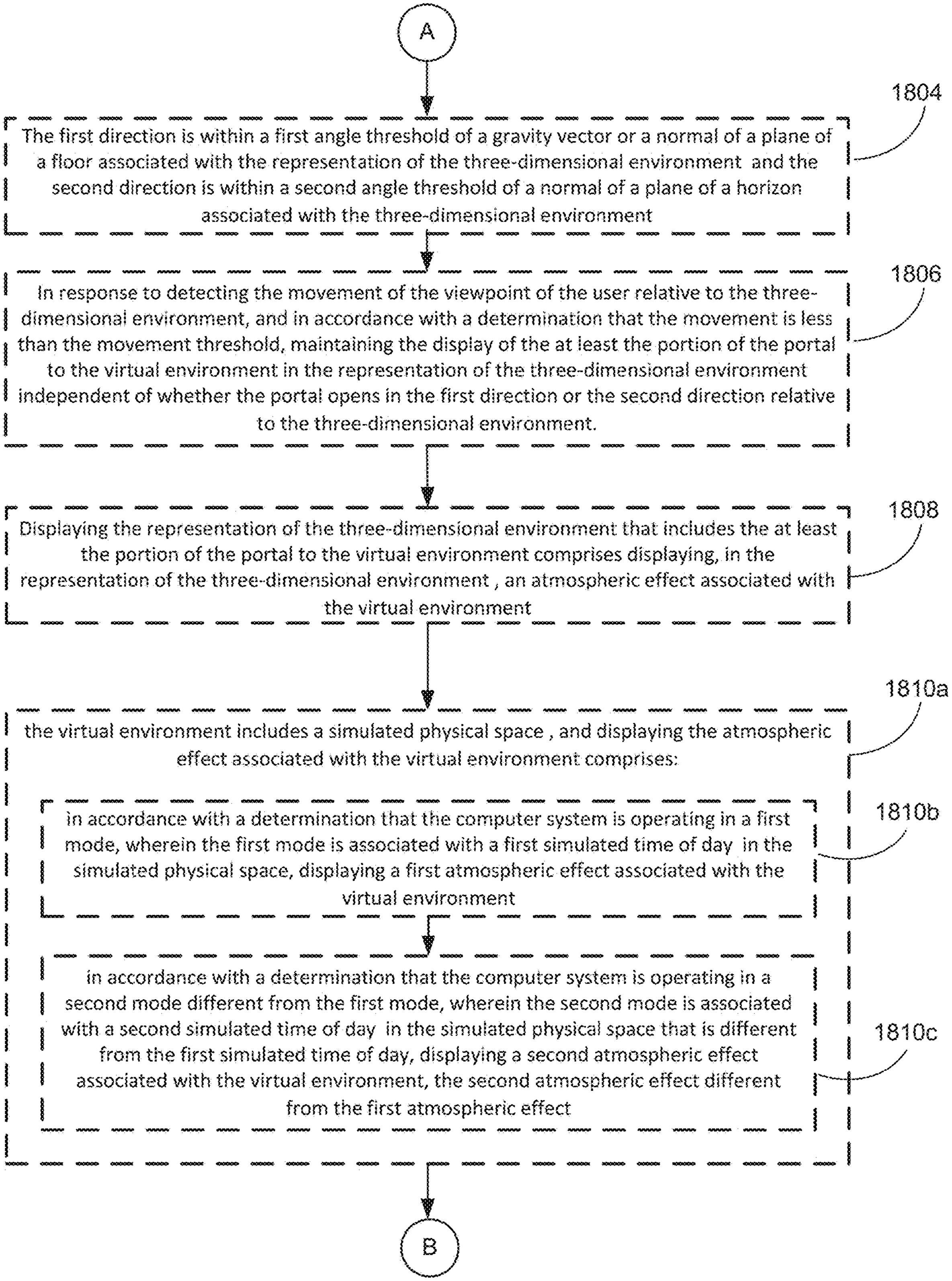
Figure 18C:
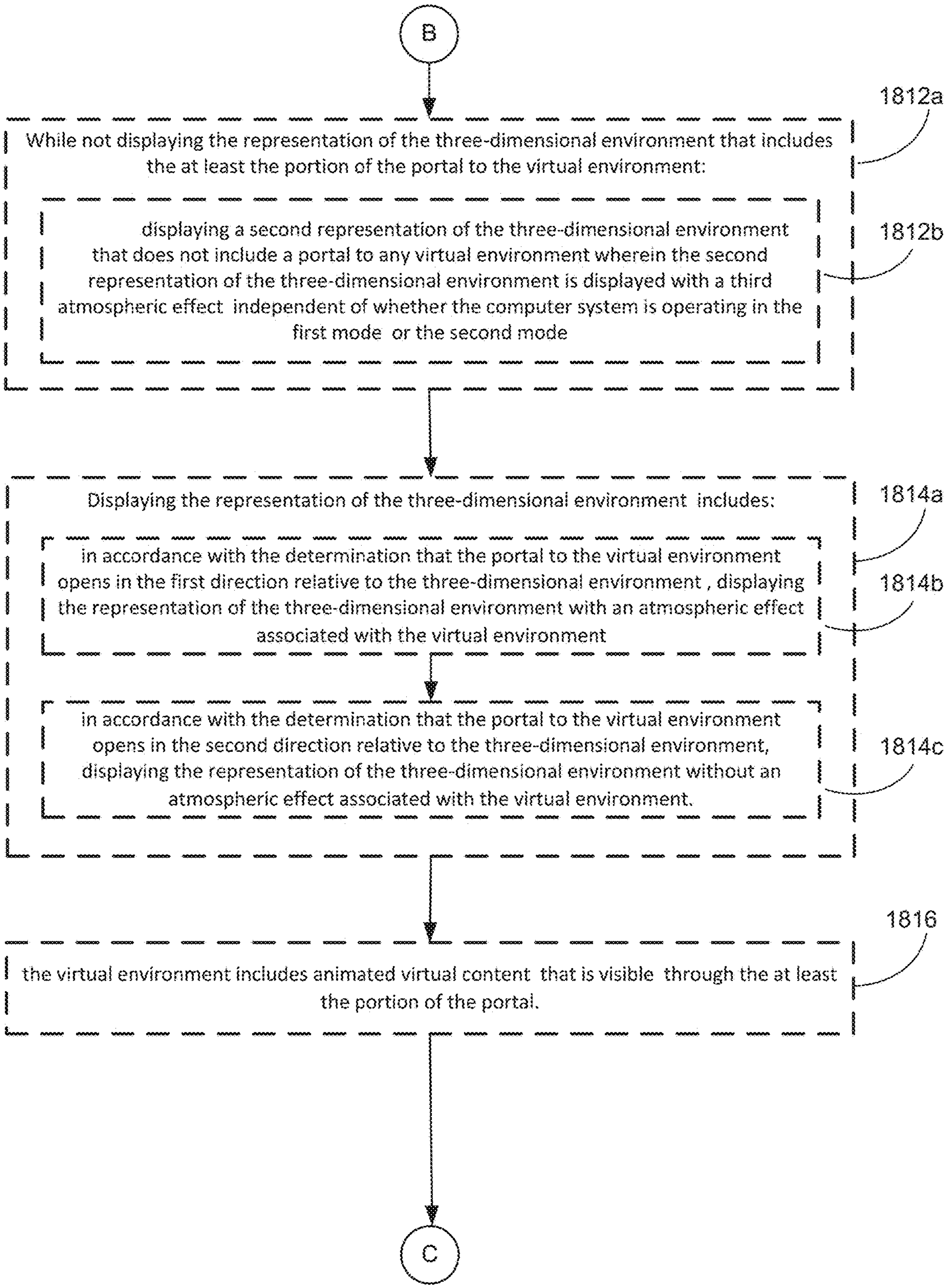
Figure 18D:
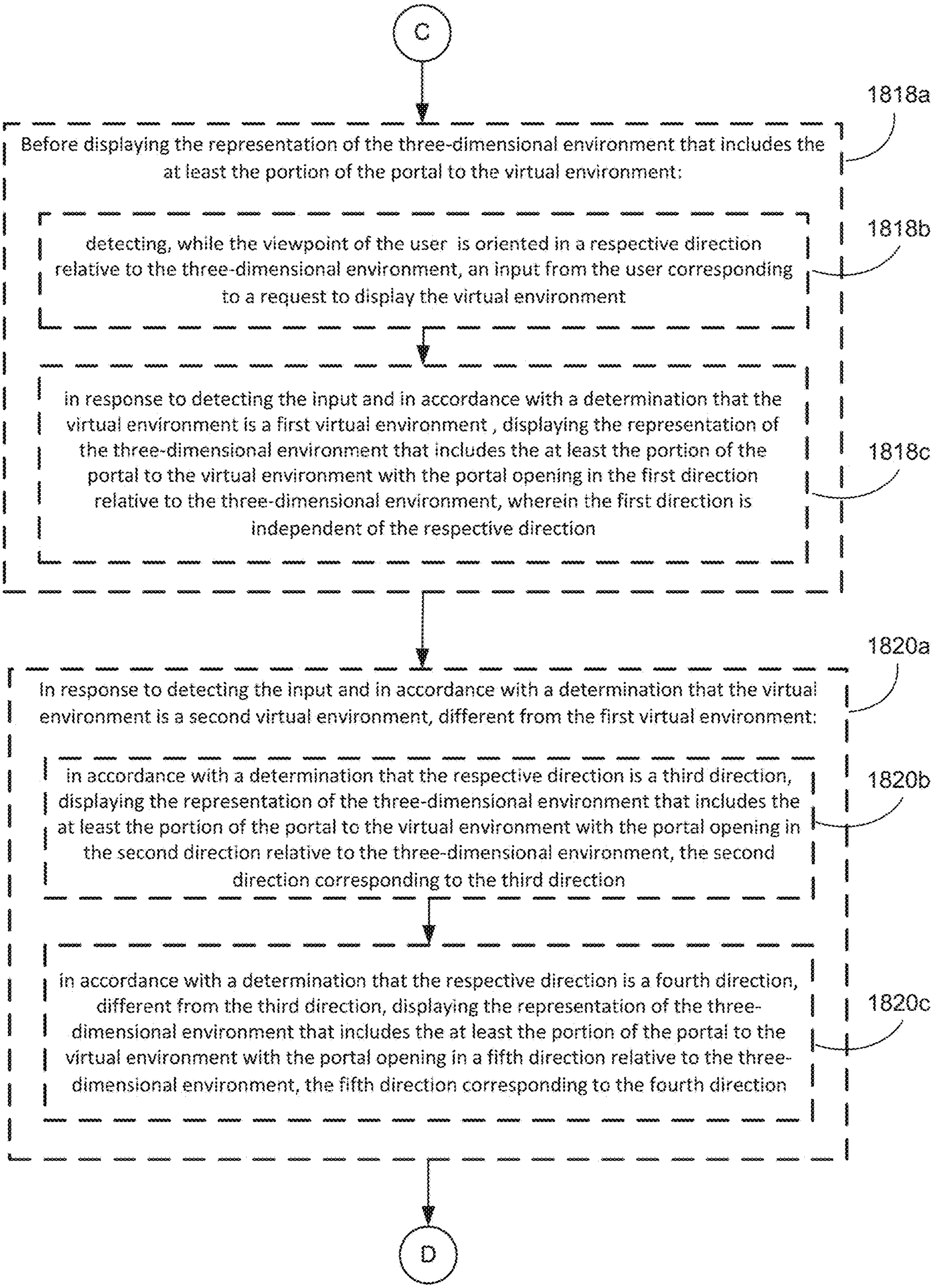
Figure 18F:
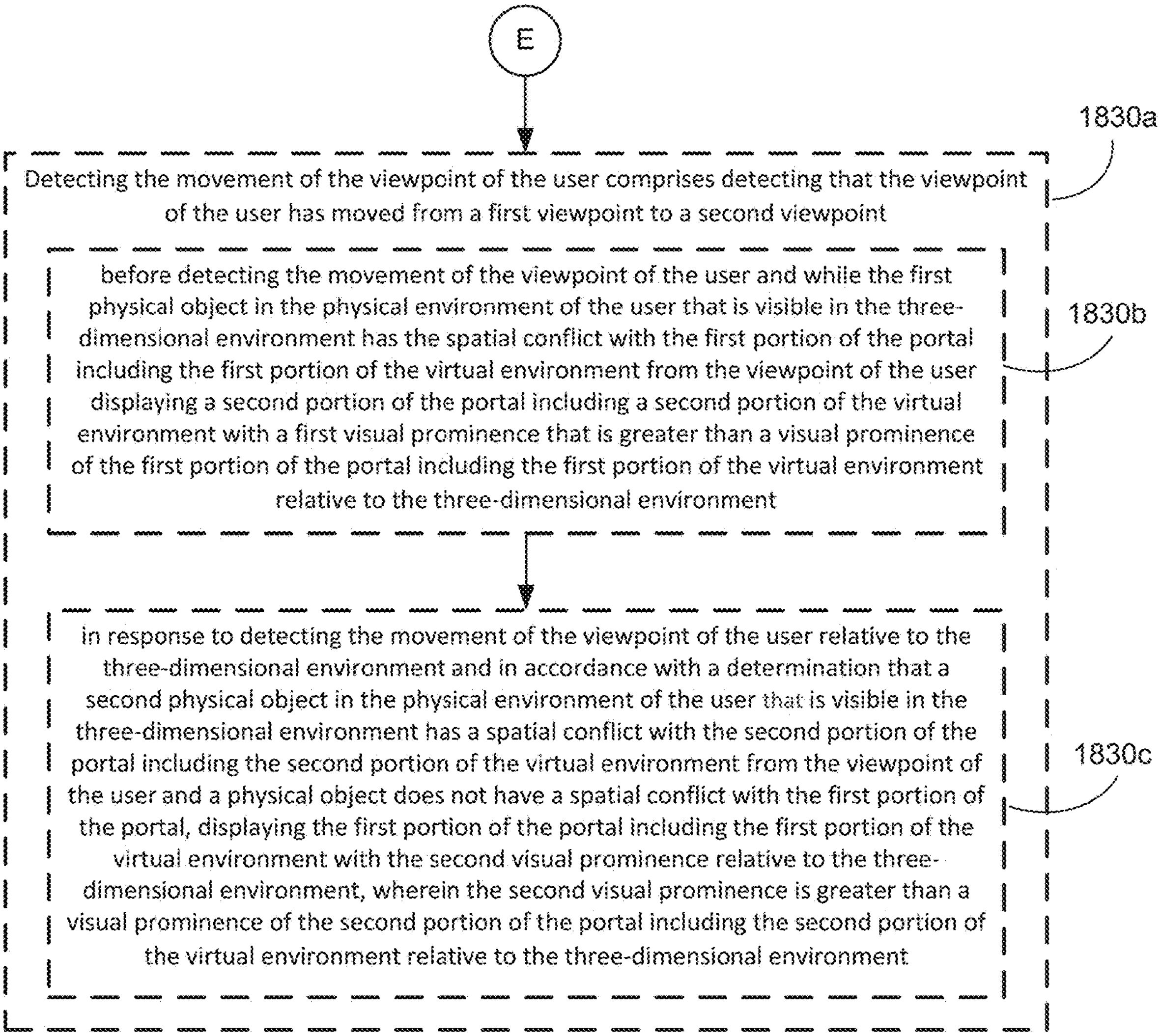

In some embodiments, in response to detecting a movement in the viewpoint of the user and in accordance with a determination that the portal opens in the second direction (e.g., downwards, such as in the case of a virtual sky), the computer system shifts a boundary of the portal based on the movement of the user. For example, FIGS. 17L-17M depict a shift in the boundary 1745 of portal 1736*b* that opens in the second direction based on the movement of the user shown in overhead view 1714. In some embodiments, shifting the boundary of a portal includes shifting the display of an atmospheric effect associated with the portal 1736*b* and virtual environment 1736*b*, such as shifting the display of atmospheric effect 1720*d* associated with virtual environment 1736*b*. In some embodiments, in response to detecting a movement in the viewpoint of the user and in accordance with a determination that the portal opens in the second direction (e.g., downwards, such as in the case of a virtual sky), the computer system continues to display the portal at a same location in the environment (e.g., the appearance of the portal is shifted to maintain an environment-locked position relative to the physical environment).

In some embodiments, the boundary 1745 of at least a portion of the portal 1736 expands in the movement direction of the movement of the viewpoint of the user. For example, from FIG. 17L to FIG. 17M, the user moves in the rightward direction and the boundary 1745 of the right-side portion of portal 1736*b* expands in the rightward direction such that visibility of additional portions of the ceiling are replaced with display of the portal 1736*b*.

In some embodiments, the boundary 1745 of the portal 1736 contracts in the movement direction of the movement of the viewpoint of the user. For example, from FIG. 17L to FIG. 17M, the user moves in the rightward direction and the boundary 1745 of the left-side portion of portal 1736*b* contracts (e.g., shrinks) in the rightward direction such that additional portions of the ceiling of the environment become visible (e.g., portions where the portal 1636*b* ceases to be displayed based on the movement of the viewpoint of the user).

In some embodiments, the boundary 1745 of the portal 1736*b* shifts uniformly such that the portal 1736*b* maintains its shape and/or area when (e.g., during and/or after) it is shifted (e.g., the portal is displayed as a circle, oval, square, rectangle, or other regular or irregular geometric shape before the movement is detected and continues to be displayed at the same size and shape after the portal has shifted. In some embodiments, the boundary 1745 of the portal 1736*b* expands non-uniformly such that the portal 1736*b* changes its shape and/or area when (e.g., during and/or after) it is shifted.

In some embodiments, when there is a physical object (e.g., a wall, a light fixture, a tall potted plant) blocking a portion of the portal (e.g., in the line of sight of the user), the computer system hides (e.g., forgoes displaying) the portion of the portal that is blocked by the physical object.

For example, in FIG. 17L, a portion of a potted tree 1711*a* is blocking a portion of portal 1736*b*. Instead of displaying that portion of portal 1736*b*, which would undesirably appear to the user to be in front of and/or occluding visibility of that portion of the potted tree 1711*a*, the computer system forgoes displaying the portion of the portal 1736*b* such that the portion of the potted tree 1711 is visible to the user (as shown in FIG. 17L), thereby maintaining the realism of the spatial relationships between physical objects and the portal 1736*b*. Similarly a wall, such a floor to ceiling wall or a wall that extends from a ceiling as part of a doorway could also block a portion of portal 1736*b*.

In some embodiments, if the viewpoint of the user changes (due to a movement in the viewpoint of the user) such that the portion of the portal 1736*b* is no longer blocked by the portion of the potted tree 1711 (or by any other physical object), the computer system displays the portion of portal 1736*b* that previously was not displayed. That is, when the user moves their viewpoint, the computer system changes which portions of the portal 1736*b* are displayed.

As shown in FIG. 17M, if a different portion of the portal 1736*b* (such as portion 1720*c*-1 of FIG. 17L, which is blocked by potted tree 1711*a* in FIG. 17M) is blocked by a physical object after the movement of the viewpoint of the user, the computer system optionally forgoes displaying the different portion of the portal 1736*b* that is blocked by the physical object. For example, in FIG. 17M, portion 1720*c*-1 of portal 1736*b* is not displayed because it is blocked by potted trec 1711*a*.

FIGS. 18A-18F depict a flowchart illustrating a method 1800 of facilitating light blending techniques for one or more objects in a three-dimensional environment in accordance with some embodiments. In some embodiments, the method 1800 is performed at a computer system (e.g., computer system 101 in FIG. 1 such as a tablet, smartphone, wearable computer, or head-mounted device) including a display generation component (e.g., display generation component 120 in FIGS. 1, 3, and/or 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 1800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1800 are, optionally, combined and/or the order of some operations is, optionally, changed.

In some embodiments, method 1800 is performed at a computer system (e.g., computer system 101) in communication with (e.g., including and/or communicatively linked with) a display generation component (e.g., display generation component 120) and one or more input devices (e.g., image sensors 314 and/or other input devices). In some embodiments, the computer system has one or more of the characteristics of the computer system of methods 800, 1000, 1200, 1400, 1600, and/or 2000. In some embodiments, the display generation component has one or more of the characteristics of the display generation component of method 800, 1000, 1200, 1400, 1600, and/or 2000. In some embodiments, the one or more input devices have one or more of the characteristics of the one or more input devices of method 800, 1000, 1200, 1400, 1600, and/or 2000.

In some embodiments, while displaying a representation of a three-dimensional environment that includes at least a portion of a portal to a virtual environment (e.g., portal 1736*a* as shown in FIG. 17B), the computer system detects (1802*a*), via the one or more input devices, a movement of a viewpoint of a user of the computer system relative to the three-dimensional environment (e.g., a movement of the viewpoint of the user of a distance 1742*a*-1742*b*, as shown in the overhead views of FIGS. 17C, 17D, and 17F). In some embodiments, the representation of the three-dimensional environment has one or more of the characteristics of the environments of methods 800, 1000, 1200, 1400, 1600, and/or 2000. In some embodiments, the virtual environment has one or more of the characteristics of the virtual environments and/or environments with animated effects of methods 800, 1000, 1200, 1400, 1600, and/or 2000. In some embodiments, the virtual environment is visible through the portal; for example, the portal is optionally similar to a virtual "window" through which the virtual environment is viewed and/or visible. In some embodiments, the portal is movable in the environment, and optionally provides different viewing angles and/or directions into the virtual environment depending on its position in the environment. In some embodiments, movement of the viewpoint of the user is detected based on a change in the user's location, position, and/or orientation relative to the physical environment of the user, such as based on the user walking to a different location in the physical environment, changing body position (e.g., from sitting to standing), and/or changing orientation of at least a portion of the user's body, such as by tilting and/or rotating the user's head and/or body.

In some embodiments, in response to detecting the movement of the viewpoint of the user relative to the three-dimensional environment (1802*b*) and in accordance with a determination that the portal to the virtual environment opens in a first direction relative to the three-dimensional environment (e.g., second direction 1738*b* as shown in FIG. 17E relative to three-dimensional environment 1702, which is optionally a vertical direction) and that the movement is greater than a movement threshold (e.g., a movement of first distance 1742*a* as shown in FIG. 17F is greater than movement threshold 1740 of FIG. 17B such that the viewpoint of the user has moved outside of boundary 1734), the computer system maintains (1802*c*) the display of the at least the portion of the portal to the virtual environment in the representation of the three-dimensional environment (e.g., the display of second virtual environment 1720*c* is maintained as shown in FIG. 17F). In some embodiments, the movement threshold includes a distance and/or angle between a first viewpoint of the user (e.g., prior to the movement of the user) and a second viewpoint of the user (e.g., resulting from the movement of the user). In some embodiments, the movement threshold is or includes a distance threshold between a first location (e.g., of the user and/or the device) and a second location in the physical environment, such as 0.05, 0.1, 0.5, 0.75, 1, 1.5, 2, 5, 10, 25, or 50 m. In some embodiments, the movement threshold is or includes an angle threshold between a first angle relative to a reference coordinate system (e.g., an angle of a portion of the user and/or of the device) and a second angle relative to the reference coordinate system, such as 5, 15, 30, 45, 60, 75, or 90 degrees. In some embodiments, in accordance with a determination that the movement is not greater than the movement threshold, the computer system maintains the display of the portal in the environment. In some embodiments, the direction in which the portal opens is determined based on an angle into the displayed virtual environment (or an angle out of the displayed virtual environment), optionally normal to the surface and/or plane of the portal, relative to a normal direction of a horizon (or other reference, such as a ground plane) in the virtual environment and/or relative to a normal direction of a horizon (or other reference, such as a ground plane) in the physical environment of the user. In some embodiments, the first direction corresponds to a first angle that is approximately 0 degrees relative to (e.g., within an angle threshold such as 0.1, 0.5, 1, 3, 5, 10, 20, or 30 degrees of) a normal of the (virtual or physical) ceiling, such as when the portal opens from a ceiling of the (physical) environment. In some embodiments, the movement of the viewpoint of the user causes a corresponding change in the appearance of the portal, such as by changing the portion of the virtual environment that is within the field of view of (visible to) the user and/or changing the perceived distance to the portal and/or changing the perspective from which the portal is displayed.

In some embodiments, in response to detecting the movement of the viewpoint of the user relative to the three-dimensional environment (1802*b*) (e.g., a movement of the viewpoint of the user of a distance 1742*a*-1742*b*, as shown in the overhead views of FIGS. 17C, 17D, and 17F) and in accordance with a determination that the portal opens in a second direction relative to the three-dimensional environment (e.g., as shown by first direction 1738*a* of FIG. 17B relative to three-dimensional environment 1702, which is optionally a horizontal direction), where the second direction is different from the first direction, and that the movement is greater than the movement threshold (e.g., a movement of first distance 1742*a* as shown in FIG. 17C is greater than movement threshold 1740 of FIG. 17B such that the viewpoint of the user is outside of boundary 1734), the computer system ceases (1802*d*) to display the at least the portion of the portal to the virtual environment (e.g., portal 1736*a* to virtual environment 1720*a* of FIG. 17B ceases to be displayed in FIG. 17C) in the representation of the three-dimensional environment while at least a portion of the representation of the three-dimensional environment that included the at least the portion of the portal to the virtual environment remains visible from the viewpoint of the user (e.g., the user can see the representation of the physical environment 1705 that was previously occupied and/or occluded by portal 1736*a*, as shown in FIG. 17C). In some embodiments, the second direction corresponds to a second angle that is approximately 0 degrees relative to (e.g., within an angle threshold such as 0.1, 0.5, 1, 3, 5, 10, 20, or 30 degrees of) a normal of the (virtual or physical) horizon, such as when the portal opens from (or in front of) a wall of the environment. In some embodiments, ceasing to display the portal to the virtual environment causes display and/or visibility of additional portions of the environment, such as (virtual or physical) areas or objects that were previously hidden or obscured by the portal. The above techniques for ceasing to display portals that open in front of the user (for example) when the user moves around the environment enable the user to see and/or interact with physical objects as they move within a room, thereby improving the user's ability to navigate a room or engage in other activities without requiring the user to remove the computer system (e.g., by removing a head-mounted device) or provide separate input to explicitly close the portal, and reducing the likelihood of collision with objects in the physical environment. Maintaining display of portals that open in directions that don't interfere with the user's ability to navigate a room (such as portals that open downwards from the ceiling) provides continuity to the display of the environment and avoids distraction that might occur due to not maintaining such continuity, thereby enhancing the user experience and reducing the likelihood of erroneous interactions with the computer system.

In some embodiments, the first direction is within a first angle threshold (e.g., within an angle threshold such as 0.1, 0.5, 1, 3, 5, 10, 20, or 30 degrees) of a gravity vector or a normal of a plane of a floor associated with the representation of the three-dimensional environment (e.g., as described with reference to step 1802*c*) and the second direction is within a second angle threshold (e.g., within an angle threshold such as 0.1, 0.5, 1, 3, 5, 10, 20, or 30 degrees) of a normal of a plane of a horizon associated with the three-dimensional environment (e.g., as described with reference to step 1802*d*) (1804). For example, second direction 1738*b* of FIG. 17E is approximately parallel to (e.g., within 5 degrees of) a gravity vector (e.g., a vector pointing towards the plane of the floor, represented by the X-Y plane) of three-dimensional environment 1702. For example, first direction 1738*a* of FIG. 17B is approximately parallel to a normal of a plane of a horizon (e.g., the X-Z plane shown in FIG. 17B, which may correspond to a plane of the back wall of three-dimensional environment 1702). In some embodiments, a plane of a horizon (e.g., the X-Z plane or Y-Z plane) is orthogonal to a plane of the floor (e.g., the X-Y plane). Ceasing to display portals that open in front of the user (e.g., from a wall in front of the user, in the second direction) when the user moves around the environment enable the user to see and/or interact with physical objects as they move within a room, thereby improving the user's ability to navigate a room or engage in other activities without requiring the user to remove the computer system or provide separate input to explicitly close the portal, and reducing the likelihood of collision with objects in the physical environment. Maintaining display of portals that open downwards (e.g., from above the user, in the first direction) that don't interfere with the user's ability to navigate a room provides continuity to the display of the environment and avoids distraction that might occur due to not maintaining such continuity, thereby enhancing the user experience and reducing the likelihood of erroneous interactions with the computer system.

In some embodiments, in response to detecting the movement of the viewpoint of the user relative to the three-dimensional environment (e.g., as described with reference to step 1802*b*), and in accordance with a determination that the movement is less than the movement threshold (e.g., a movement threshold as described with reference to 1802*c*), the computer system maintains (1806) the display of the at least the portion of the portal to the virtual environment in the representation of the three-dimensional environment independent of whether the portal opens in the first direction or the second direction relative to the three-dimensional environment. For example, in FIG. 17D, the movement of the viewpoint of the user of distance 1742*b* is less than the movement threshold 1740, and thus the computer system maintains the display of portal 1736*a* and virtual environment 1720*a*. In some embodiments, if the user moves a small amount within the three-dimensional environment, the portal continues to be displayed regardless of whether the portal opens in the first direction (e.g., downwards) or in the second direction (e.g., horizontally towards the user). In some embodiments, the display of the portal is updated in accordance with the change in the viewpoint and/or orientation of the user (e.g., based on the movement of the viewpoint of the user), such that the user optionally sees the portal from a different perspective or sees different portions of the portal. Maintaining display of the virtual environment when the user's viewpoint has moved a relatively small amount (and is therefore unlikely to be attempting to navigate in the room or avoid physical objects) prevents the virtual environment from unexpectedly disappearing based on small movements of the user's head or body, thereby reducing the likelihood that the user inadvertently dismisses the virtual environment.

In some embodiments, displaying the representation of the three-dimensional environment that includes the at least the portion of the portal to the virtual environment (e.g., as described with reference to step 1802*a*) includes displaying, in the representation of the three-dimensional environment (and concurrently with displaying the at least the portion of the portal to the virtual environment), an atmospheric effect (e.g., as described with reference to the mixed virtual and atmospheric environment of method 1600) associated with the virtual environment (e.g., such as the first atmospheric effect 1720*d* shown in FIG. 17E, which is associated with virtual environment 1720*c*) (1808). Displaying an atmospheric effect associated with the virtual environment increases the realism of the display of the virtual environment, and also facilitates communication of spatial arrangements of objects in the three-dimensional environment, thereby improving the user experience and reducing the likelihood of erroneous interactions with the computer system.

In some embodiments, the virtual environment includes a simulated physical space (e.g., a simulated sky, a simulated beach, a simulated forest, or another simulated physical space), and displaying the atmospheric effect associated with the virtual environment includes (1810*a*), in accordance with a determination that the computer system is operating in a first mode (e.g., as indicated by legend 1746*a* of FIGS. 17E and 17F), where the first mode is associated with a first simulated time of day (e.g., daytime, dawn, or afternoon) in the simulated physical space, displaying (1810*b*) a first atmospheric effect associated with the virtual environment (e.g., first atmospheric effect 1720*d* associated with virtual environment 1720*c* as shown in FIGS. 17E and 17F). In some embodiments, displaying the first atmospheric effect includes displaying the simulated physical space with a first tint, brightness, reflection, and/or shadow that simulate the combination of daytime lighting (e.g., natural lighting received from a virtual sun and/or via virtual windows in the virtual environment) and lighting associated with colors and/or virtual objects in the virtual environment. For example, if the virtual environment is a sky (e.g., as seen through a portal opening downwards) and the computer system is operating in the first mode, the sky is displayed as a daytime sky with animated clouds and a lighter color palette (e.g. a lighter shade of blue), and the displayed atmospheric effect associated with the daytime sky optionally corresponds to (e.g., simulates the lighting from) the lighter color palette.

In some embodiments, displaying the atmospheric effect associated with the virtual environment includes (1810*a*), in accordance with a determination that the computer system is operating in a second mode different from the first mode (e.g., indicated by legend 1746*b* of FIG. 17G), where the second mode is associated with a second simulated time of day (e.g., nighttime, evening, or dusk) in the simulated physical space that is different from the first simulated time of day, displaying (1810*c*) a second atmospheric effect associated with the virtual environment, the second atmospheric effect different from the first atmospheric effect (e.g., second atmospheric effect 1720*e* associated with virtual environment 1720*c*, as shown in FIG. 17G). In some embodiments, displaying the second atmospheric effect includes displaying the simulated physical space with a second tint, brightness, reflection, and/or shadow that simulate the combination of nighttime lighting, if any (e.g., lighting received from real or virtual electric lights within the three-dimensional environment, and/or from a virtual moon via a virtual window in the virtual environment) and lighting associated with colors and/or virtual objects in the virtual environment. For example, if the virtual environment is a sky and the computer system is operating in the second mode, the sky is displayed as a nighttime sky with stars and a darker color palette (e.g. black or a darker shade of blue relative to when the computing system is operating in the first mode). Similarly, the displayed atmospheric effect associated with the night sky optionally corresponds to (e.g., simulates the lighting from) the darker color palette. Adjusting the atmospheric effects based on the simulated time of day ensures that different parts of the environment are displayed in consistent manners, thereby improving the user experience and reducing the likelihood of erroneous interactions with the computer system.

In some embodiments, while not displaying the representation of the three-dimensional environment that includes the at least the portion of the portal to the virtual environment (1812*a*) (e.g., before invoking display of the virtual environment or after transitioning from display of the virtual environment to display of an atmosphere environment and/or a representation of a physical environment, without displaying the virtual environment), the computer system displays (1812*b*) a second representation of the three-dimensional environment that does not include a portal to any virtual environment (e.g., displaying an atmosphere environment or a representation of a physical environment such as described with reference to method 1600, without displaying any portal to a virtual environment), where the second representation of the three-dimensional environment is displayed with a third atmospheric effect (e.g., as described with reference to method 1600) independent of whether the computer system is operating in the first mode (e.g., as described with reference to step 1810*b*) or the second mode (e.g., as described with reference to step 1810*c*). For example, the computer system displays the same atmospheric effect 1720*f* in FIG. 17H and FIG. 17I independent of the mode indicated by legend 1746*a* and 1746*b*. In some embodiments, the display of an atmosphere environment (e.g., as described with reference to method 1600) does not change based on whether the computer system is operating in the first mode or the second mode. For example, a "fall" atmospheric effect is optionally displayed in the same manner, with the same tint, regardless of whether the computer system is operating in the first mode or the second mode, such that the simulated time of day does not affect the display of the atmospheric effect. Maintaining the same (user-selected) atmospheric effects when no portal is displayed ensures consistent display of the three-dimensional environment, thereby reducing errors in interaction with the computer system.

In some embodiments, displaying the representation of the three-dimensional environment (e.g., as described with reference to step 1802*a*) includes (1814*a*), in accordance with the determination that the portal to the virtual environment opens in the first direction relative to the three-dimensional environment (e.g., as described with reference to step 1802*c* and shown in FIG. 17E), displaying (1814*b*) the representation of the three-dimensional environment with an atmospheric effect associated with the virtual environment (e.g., as described with reference to method 1600 and/or step 1808, and as shown by atmospheric effect 1720*d* associated with virtual environment 1720*c* in FIG. 17E).

In some embodiments, displaying the representation of the three-dimensional environment includes (1814*a*), in accordance with the determination that the portal to the virtual environment opens in the second direction relative to the three-dimensional environment, (e.g., as described with reference to step 1802*d* and shown in FIG. 17B) displaying the representation of the three-dimensional environment without an atmospheric effect associated with the virtual environment (1814*c*) (e.g., three-dimensional environment 1702 is displayed without an atmospheric effect in FIG. 17B). In some embodiments, displaying the representation of the three-dimensional environment without an atmospheric effect includes displaying the representation of the three-dimensional environment without any atmospheric effect associated with the virtual environment. For example, the representation of the three-dimensional environment is optionally displayed without any tint, reflections, lighting, or shadows associated with the virtual environment. In some embodiments, displaying the representation of the three-dimensional environment without the atmospheric effect includes displaying the representation of the three-dimensional environment without some atmospheric effects associated with the virtual environment but not without other atmospheric effects associated with the virtual environment, such as by displaying the representation of the three-dimensional environment with reflections, lighting, and shadows associated with the virtual environment without displaying the representation of the three-dimensional environment with a tint associated with the virtual environment.

As discussed with reference to step(s) 1802 and 1804, portals opening in the first direction (e.g., downwards) optionally do not cease to be displayed based on the user's movement, whereas portals opening in the second direction (e.g., horizontally, in front of the user) optionally do cease to be displayed if the user moves more than a threshold amount. Forgoing display of an atmospheric effect associated with a virtual environment having a portal that opens in the second direction reduces the disruption in display continuity if the virtual environment ceases to be displayed due to movement of the user, thereby reducing visual distractions and errors in interaction with the computer system. In contrast, such disruption is not a concern for portals opening in the first direction (which do not cease to be displayed based on movement of the user), so an atmospheric effect associated with the virtual environment is displayed.

In some embodiments, the virtual environment includes animated virtual content (e.g., virtual animated elements that move within the virtual environment, such as virtual animated elements 1744*a*-1744*c* shown in FIGS. 17D and 17E) that is visible (e.g., displayed on the display generation component) through the at least the portion of the portal (e.g., displayed within the virtual environment 1720*c*) (1816). In some embodiments, the animated virtual content includes animated elements such as animated trees, animated grass, animated bodies of water, animated clouds, or other animated virtual content, such as described with reference to method 1600. The inclusion of animated virtual content in the virtual environment provides a more realistic experience for the user.

In some embodiments, before displaying the representation of the three-dimensional environment that includes the at least the portion of the portal to the virtual environment (1818*a*) (e.g., before invoking display of the virtual environment) the computer system detects (1818*b*), while the viewpoint of the user (e.g., as described with reference to step 1802*b*) is oriented in a respective direction (e.g., facing direction 1732*b* of FIGS. 17J and 17J1) relative to the three-dimensional environment (e.g., when the user holding or wearing the computer system is facing in a respective direction in the physical environment of the user), the computer system detects (1818*b*) an input from the user corresponding to a request to display the virtual environment (e.g., inputs 1730*a*-1730*c* as shown in FIGS. 17A and 17J). In some embodiments, the input indicates a selection of an icon representing the virtual environment, or includes a verbal request to display the virtual environment. For example, the selected icon is optionally displayed in a menu of icons displayed by the computer system in and/or overlaid on the first environment, where the icons are selectable to cause display of their corresponding virtual environments. The input optionally includes a hand gesture (e.g., a hand raise, air pinch gesture, air pinch and release, and/or a pointing air gesture in which the index finger of the hand of the user is extended from the palm while the other fingers are curled towards the palm), touch input (e.g., a tap or long press on a touch-sensitive input device), a rotation of a rotatable mechanical input element of the computer system, and/or attention and/or a gaze (e.g., attention in the direction of an icon representing an environment, optionally for a threshold duration).

In some embodiments, in response to detecting the input and in accordance with a determination that the virtual environment is a first virtual environment (e.g., a virtual environment or a type of virtual environment whose portal opens in the first direction, as described with reference to step 1802*c* and shown in FIG. 17E), the computer system displays (1818*c*) the representation of the three-dimensional environment that includes the at least the portion of the portal to the virtual environment with the portal opening in the first direction (e.g., downwards as described with reference to step 1802*c* and shown in FIG. 17E) relative to the three-dimensional environment, where the first direction is independent of the respective direction (e.g., such as by displaying virtual environment 1720*c* as shown in FIG. 17E). In some embodiments, the first virtual environment opens in the first direction regardless of which direction the viewpoint of the user and/or the user holding or wearing the computer system was oriented. Displaying some virtual environments, such as a virtual sky or outer space, with the portal opening in the same direction (e.g., downwards) regardless of the orientation of the viewpoint of the user ensures consistent display of the three-dimensional environment, thereby reducing errors in interaction with the three-dimensional environment.

In some embodiments, in response to detecting the input and in accordance with a determination that the virtual environment is a second virtual environment, different from the first virtual environment (e.g., a virtual environment or a type of virtual environment whose portal opens in a different direction than the first direction, such as in the second direction as described with reference to step 1802*d*) (1820*a*), and in accordance with a determination that the respective direction is a third direction (e.g., facing direction 1732*a* of FIG. 17A), the computer system displays (1820*b*) the representation of the three-dimensional environment that includes the at least the portion of the portal to the virtual environment with the portal opening in the second direction relative to the three-dimensional environment, the second direction corresponding to the third direction (e.g., portal 1736 opens in direction 1738*a* as shown in FIG. 17B, where direction 1738*a* corresponds to facing direction 1732*a* in FIG. 17A). In some embodiments, the second direction is the same as or within an angle threshold (such as 0.1, 0.5, 1, 3, 5, 10, 20, or 30 degrees) of the third direction and/or the opposite of the third direction such that the virtual environment opens towards (e.g., facing) the user; e.g., the direction in which the portal opens is based on the direction in which the user was facing when the user requested display of the virtual environment.

In some embodiments, in response to detecting the input and in accordance with a determination that the virtual environment is a second virtual environment, different from the first virtual environment (1820*a*), and in accordance with a determination that the respective direction is a fourth direction (e.g., facing direction 1732*b* of FIGS. 17J and 17J1), different from the third direction, the computer system displays the representation of the three-dimensional environment that includes the at least the portion of the portal to the virtual environment with the portal opening in a fifth direction relative to the three-dimensional environment, the fifth direction corresponding to the fourth direction (1820*c*) (e.g., portal 1736*b* opens in direction 1738*c* as shown in FIG. 17K, where direction 1738*c* corresponds to facing direction 1732*b* in FIGS. 17J and 17J1). In some embodiments, the fifth direction corresponds to an angle that is approximately 0 degrees relative to (e.g., within an angle threshold such as 0.1, 0.5, 1, 3, 5, 10, 20, or 30 degrees of) a normal of the (virtual or physical) horizon, such as when the portal opens from (or in front of) a wall of the environment. In some embodiments, the fifth direction is the same as or within an angle threshold (such as 0.1, 0.5, 1, 3, 5, 10, 20, or 30 degrees) of the fourth direction and/or the opposite of the fourth direction such that the virtual environment opens towards (e.g., facing) the user; e.g., the direction in which the portal opens is based on the direction in which the user was facing when the user requested display of the virtual environment. Displaying some virtual environments, such as a virtual beach or forest, with the portal opening in the direction the user is facing (e.g., opening towards the user) when the user invokes display of the virtual environment allows the portal to open in front of the user, providing a more realistic and predictable user experience, thereby reducing errors in interaction with the three-dimensional environment.

In some embodiments, in response to detecting the movement of the viewpoint of the user relative to the three-dimensional environment (e.g., as described with reference to step 1802*a*), and in accordance with the determination that the portal to the virtual environment opens in the first direction relative to the three-dimensional environment (e.g., as described with reference to step 1802*c* and shown in FIGS. 17L-17M), the computer system shifts (1822) (e.g., automatically, without user input to do so) a boundary (e.g., boundary 1745 of FIGS. 17L-17M) of the at least the portion of the portal (e.g., portal 1736*b*) relative to the three-dimensional environment in accordance with the movement of the viewpoint of the user. In some embodiments, the movement of the viewpoint of the user comprises movement from a first location to a second location along a movement direction (e.g., a direction that points from the first location towards the second location). In some embodiments, the movement direction includes movement along a plane of a floor or ground of the three-dimensional environment, such as when the user walks left, right, forward, or backward within a room of the three-dimensional environment (e.g., in a direction along a plane that is orthogonal to the plane of the first direction). In some embodiments, shifting the boundary of the at least the portion of the portal in accordance with the movement of the user includes uniformly moving the entire boundary of the least the portion of the portal in the movement direction without changing the area or shape of the portal. In some embodiments, shifting the boundary of the portion of the portal in accordance with the movement of the viewpoint of the user includes non-uniformly moving different portions of the portal (e.g., expanding the portal) in the movement direction (e.g., the direction of movement of the viewpoint of the user) and/or changing an area and/or shape of the portal during and/or after shifting the boundary of the at least the portion of the portal. In some embodiments, shifting the boundary of the at least the portion of the portal includes changing a view (e.g., a perspective) of the virtual environment (e.g., by displaying a different portion of the virtual environment and/or by changing a viewing angle into the portal based on the movement of the viewpoint of the user). In some embodiments, shifting the boundary of the at least the portion of the portal in accordance with the movement of the viewpoint of the user includes shifting (e.g., relocating) the portal above the user (e.g., for a virtual sky or virtual outer space environment, such as shown in FIGS. 17L-17M) in accordance with the movement of the viewpoint of the user; e.g., such that the computer system displays an additional and/or different portion(s) of a representation of a physical environment outside of the portal (optionally with a tint or other atmospheric effect) based on the shift in the boundary of the portal. For example, in accordance with a shift of a boundary of a portal to a virtual sky, the computer system optionally displays or otherwise makes visible a portion of the ceiling that was previously occluded by the display of the portal to the virtual sky. In some embodiments, shifting the boundary of the at least the portion of the portal includes shifting a boundary of an atmospheric effect (e.g., atmospheric effect 1720*d* associated with the virtual environment 1720*c* as shown in FIGS. 17L-17M). In some embodiments, the computer system shifts the boundary of the portal with a magnitude, speed, and/or acceleration that corresponds to the magnitude, speed, and/or acceleration of the movement of the viewpoint of the user; e.g., such that the portal essentially "keeps up" with the movement of the viewpoint of the user. In some embodiments, the computer system shifts the boundary of the portal at a speed that is independent of the speed of the movement of the viewpoint of the user, such as at a uniform and/or pre-defined speed. In some embodiments, the computer system shifts the boundary of the portal using a spatial and/or temporal gradient transition, such as by gradually fading in additional portions of the portal and/or the virtual environment and/or gradually fading out previously displayed portions of the portal and/or virtual environment in accordance with the movement of the viewpoint of the user. In some embodiments, in accordance with a determination that the movement of the viewpoint of the user has ceased, the computer system ceases to shift the boundary of the at least the portion of the portal. In some embodiments, in accordance with a determination that the movement of the viewpoint of the user has ceased (e.g., for a threshold duration, such as 0.01, 0.1, 0.5, 1, 3, 5, or 10 seconds), the computer system gradually slows the shift of the boundary of the at least the portion of the portal until the computer system ceases to shift the boundary of the at least the portion of the portal (e.g., the computer system gradually stops shifting the boundary of the portal rather than abruptly ceasing to shift the boundary of the portal). Automatically shifting the boundary of the portal to the virtual environment (e.g., without user inputs requesting the shift) based on movement of the viewpoint of the user provides a more realistic and predictable user experience, thereby reducing errors in interaction with the three-dimensional environment. In addition, shifting the boundary of the portal based on movement of the viewpoint of the user reduces the computational overhead associated with displaying the virtual environment because the computer system can cease to display portions of the virtual environment that are no longer relevant to the user.

In some embodiments, the movement of the viewpoint of the user is in a first movement direction relative to the three-dimensional environment, and shifting the boundary of the at least the portion of the portal (e.g., as described with reference to step 1822) comprises expanding (1824) a first portion of the portal in the first movement direction in accordance with the movement of the viewpoint of the user, such as shown in FIGS. 17L-17M, in which the right-side portion of portal 1736*b* is expanded based on the movement of the user in the rightward direction. In some embodiments, expanding the first portion of the portal in accordance with the movement of the viewpoint of the user includes expanding the first portion of the portal concurrently with detecting the movement of the viewpoint of the user, such that the portal expands as (and/or while) the user moves within the three-dimensional environment. In some embodiments, expanding the first portion of the portal in accordance with the movement of the viewpoint of the user includes expanding the first portion of the portal after detecting the movement of the viewpoint of the user and/or after detecting that the movement of the viewpoint of the user has ceased, such that the portal expands once the user has stopped moving (e.g., for a threshold duration, such as 0.01, 0.1, 0.5, 1, 3, 5, or 10 seconds). In some embodiments, the computer system expands the first portion of the portal by expanding a portion of a boundary of the portal in the first movement direction, such as by expanding a portion of the boundary of the portal in front of the viewpoint of the user along the first direction (e.g., a leading edge from the viewpoint of the user). For example, the portal optionally appears, to the user, to be expanding in front of and/or above the user as the user moves within the three-dimensional environment such that the portal appears to follow the user's movement. In some embodiments, if the movement of the user is in a second movement direction different from the first movement direction, the computer system expands a portion (e.g., the first portion or a different portion) of the portal in the second movement direction in accordance with the movement of the viewpoint of the user. Expanding the portal in the direction of the movement of the user's viewpoint and in accordance with the movement of the viewpoint ensures continues accessibility of the virtual environment, thereby reducing errors in interaction with the three-dimensional environment.

In some embodiments, the movement of the viewpoint of the user is in a first movement direction relative to the three-dimensional environment, and shifting the boundary of the at least the portion of the portal (e.g., as described with reference step 1822) comprises contracting (1826) a second portion of the portal in the first movement direction in accordance with the movement of the viewpoint of the user, such as shown in FIGS. 17L-17, in which the left-side portion of portal 1736*b* is contracted based on the movement of the user in the rightward direction (e.g., contracting the portion of the portal that is in the opposite direction from the direction in which the user is moving and/or is behind the user as the user moves in the movement direction). In some embodiments, contracting the second portion of the portal includes ceasing to display the second portion of the portal and/or displaying the second portion of the portal with reduced visual prominence, such as with reduced opacity, reduced brightness, reduced color saturation, reduced lighting effects (such as fewer shadows and/or reflections), and/or increased blurring relative to other portions of the portal and/or relative to the three-dimensional environment. In some embodiments, contracting the second portion of the portal includes displaying (or otherwise increasing the visibility of) a portion of the physical environment that was previously (e.g., before the contraction) occluded by the second portion of the portal. In some embodiments, the computer system contracts the second portion of the portal concurrently with expanding the first portion of the portal. In some embodiments, contracting the second portion of the portal in accordance with the movement of the viewpoint of the user includes contracting the second portion of the portal concurrently with detecting the movement of the viewpoint of the user, such that the portal contracts as (while) the user moves within the three-dimensional environment. In some embodiments, contracting the second portion of the portal in accordance with the movement of the viewpoint of the user includes contracting the second portion of the portal after detecting that the movement of the viewpoint of the user has ceased, such that the portal contracts after the user has stopped moving (e.g., for a threshold duration, such as 0.01, 0.1, 0.5, 1, 3, 5, or 10 seconds). In some embodiments, the computer system contracts the second portion of the portal at the same rate as the computer system expands the first portion of the portal, optionally while maintaining the same area and/or shape of the portal during the expansion/contraction. In some embodiments, the computer system contracts the second portion of the portal at a different rate as the computer system expands the first portion of the portal, optionally changing the area and/or shape of the portal during the transition. In some embodiments, the computer system contracts the second portion of the portal by contracting a second portion of a boundary of the portal in the first movement direction, such as by contracting a second portion of the boundary of the portal that is farthest from the viewpoint of the user opposite the first direction (e.g., a trailing edge of the portal from the viewpoint of the user, such as an edge of the portal that is behind the user as the user moves in the three-dimensional environment). For example, the portal optionally appears, to the user, to be contracting behind and/or above the user as the user moves within the three-dimensional environment such that the portal appears to follow the user's movement. In some embodiments, if the movement of the user is in a second movement direction different from the first movement direction, the computer system contracts a portion (e.g., the second portion or a different portion) of the portal in the second movement direction in accordance with the movement of the viewpoint of the user. Contracting the portal in the direction of the movement of the user's viewpoint and in accordance with the movement of the viewpoint reduces the computational overhead associated with displaying the virtual environment since the computer system ceases to display portions of the virtual environment that are no longer relevant (e.g., visible) to the user based on the movement of the viewpoint of the user.

In some embodiments, displaying the representation of the three-dimensional environment that includes the at least the portion of the portal to the virtual environment (e.g., as described with reference to step 1802*a*, before detecting the movement of the viewpoint of the user and optionally in accordance with the determination that the portal to the virtual environment opens in the first direction relative to the three-dimensional environment) comprises: in accordance with a determination that a first physical object in a physical environment of the user that is visible in the three-dimensional environment has a spatial conflict with a first portion of the portal including a first portion of the virtual environment from the viewpoint of the user (e.g., if the first portion of the virtual environment were to be displayed it would have a simulated depth that is further away from a viewpoint of the user than the first physical object but occludes the user's view of the physical object, which would create an undesirable appearance that the first portion of the virtual environment that is further away was occluding the physical object that is closer), the computer system reduces (1828) a visual prominence (e.g., by reducing opacity, reducing brightness, reducing color saturation, reducing lighting effects, and/or increasing blurring relative to the display of the virtual environment and/or the three-dimensional environment, such as described with reference to step 1826) of the first portion of the portal including the first portion of the virtual environment (e.g., by not displaying such portions at all, such as shown in FIG. 17L, or by displaying such portions with lower visual prominence, such as with reduced level of detail, reduced opacity, reduced brightness, reduced simulated lighting effects, and/or increased blurring) relative to the three-dimensional environment. In some embodiments, detecting that a physical object has a spatial conflict with a portion of the virtual environment includes detecting that the physical object would impede or block visibility of the portion of the virtual environment if it were to be displayed behind the physical object, and/or that displaying the portion of the virtual environment would occlude or block visibility of the physical object if it were displayed (e.g., overlaid on the physical object), and/or the physical object is in the line of sight of the user between the user and the portion of the virtual environment. For example, the computer system optionally detects that a lighting fixture (e.g., a wall or ceiling light) or a wall of a room visually blocks a portion of the three-dimensional environment that would otherwise include the first portion of the virtual environment. Hiding (e.g., not fully displaying) portions of the virtual environment (such as a virtual sky) that have a spatial conflict with physical objects that would be occluded if the portion of the virtual environment were to be displayed provides the user with better visibility of the physical environment around them (e.g., to enable more efficient and/or safer interactions with the physical environment) while still providing the desired virtual experience.

In some embodiments, detecting the movement of the viewpoint of the user (e.g., as described with reference to step 1802*a* and as shown in, for example, FIGS. 17L-17M), and optionally in accordance with the determination that the portal to the virtual environment opens in the first direction relative to the three-dimensional environment (e.g., as described with reference to step 1802*c*) comprises detecting that the viewpoint of the user has moved from a first viewpoint (e.g., viewpoint 1710*a* in FIG. 17L, corresponding to a first physical location and/or orientation of the user) to a second viewpoint (e.g., second viewpoint 1710*b* in FIG. 17M, corresponding to a second physical location and/or orientation of the user). In some embodiments, before detecting the movement of the viewpoint of the user and while the first physical object (e.g., potted tree 1711*a*) in the physical environment of the user that is visible in the three-dimensional environment has the spatial conflict with the first portion of the portal including the first portion of the virtual environment (not shown in FIG. 17L because it is not displayed, but would be the portion of the virtual environment 1720*c* overlaid by the potted tree 1711*a*) from the viewpoint of the user (e.g., as described with reference to step 1828), the computer system displays (1830*b*) a second portion (e.g., portion 1720*c*-1 of FIG. 17L) of the portal including a second portion of the virtual environment with a first visual prominence (e.g., with an increased visual prominence, such as higher opacity, higher brightness, greater color saturation, increased simulated lighting effects, and/or reduced blurring) that is greater than a visual prominence of the first portion of the portal including the first portion of the virtual environment (such as, for example, by displaying the first portion of the virtual environment with a reduced visual prominence and/or forgoing displaying the first portion of the virtual environment) relative to the three-dimensional environment. For example, the computer system optionally detects that a wall light is blocking a portion of the portal from the viewpoint of the user, and in response, either forgoes displaying the blocked portion of the portal or displays the blocked portion of the portal with reduced visual prominence relative to other portions of the portal and/or relative to three-dimensional environment, such that the wall light is visible to the user through the displayed portion of the portal.

In some embodiments, in response to detecting the movement of the viewpoint of the user relative to the three-dimensional environment (e.g., as described with reference to step 1802*a*) and in accordance with a determination that a second physical object in the physical environment of the user (e.g., a physical object such as described with reference to step 1828, which is optionally the same object as the first physical object or a different object) that is visible in the three-dimensional environment has a spatial conflict with the second portion of the portal including the second portion of the virtual environment (e.g., portion 1720*c*-1 of FIG. 17L) from the viewpoint of the user (e.g., as described with reference to step 1828) and a physical object does not have a spatial conflict with the first portion of the portal, the computer system displays the first portion of the portal including the first portion of the virtual environment with the second visual prominence relative to the three-dimensional environment, wherein the second visual prominence is greater than (e.g., increased, such as described with reference to step 1830*b*) a visual prominence of the second portion of the portal including the second portion of the virtual environment relative to the three-dimensional environment. For example, the computer system optionally detects that, based on the movement of the viewpoint of the user, the wall light is no longer blocking the portion of the portal from the viewpoint of the user, and in response, displays that portion of the portal with increased visual prominence relative to the level of visual prominence at which it was displayed when the wall light was blocking the portion of the portal. For example, the computer system detects that, based on the movement of the viewpoint of the user, the wall light (and/or a different physical object) is now blocking a different portion of the portal from the viewpoint of the user, and displays that portion of the portal with reduced visual prominence (and/or forgoes displaying that portion of the portal at all). In some embodiments, in response to a determination that the second physical object does not have a spatial conflict, from the viewpoint of the user, with the second portion of the portal including the second portion of the virtual environment, the computer system displays both the first portion of the portal and the second portion of the portal with the second visual prominence. In some embodiments, the computer system displays portions of the portal that do not have a spatial conflict with a physical object with the second (increased) visual prominence, and displays portions of the portal that do have a spatial conflict with a physical object with the first (reduced) visual prominence, which optionally includes not displaying those portions at all. Changing which portions of the portal and/or virtual environment (such as a virtual sky) that are hidden or otherwise displayed with reduced visual prominence based on the user's changing viewpoint within the room as the user moves within the room provides the user with better visibility of the physical environment around them as they move within the room (e.g., to enable more efficient and/or safer interactions with the physical environment) while still providing the desired virtual experience.

It should be understood that the particular order in which the operations in method 1800 have been described is merely exemplary and is not intended to indicate that the described order is the only order in which the operations could be performed. One of ordinary skill in the art would recognize various ways to reorder the operations described herein.

FIGS. 19A-19I illustrate examples of a computer system outputting a different sound effect when initiating display of different virtual three-dimensional environments.

Figure 19A:
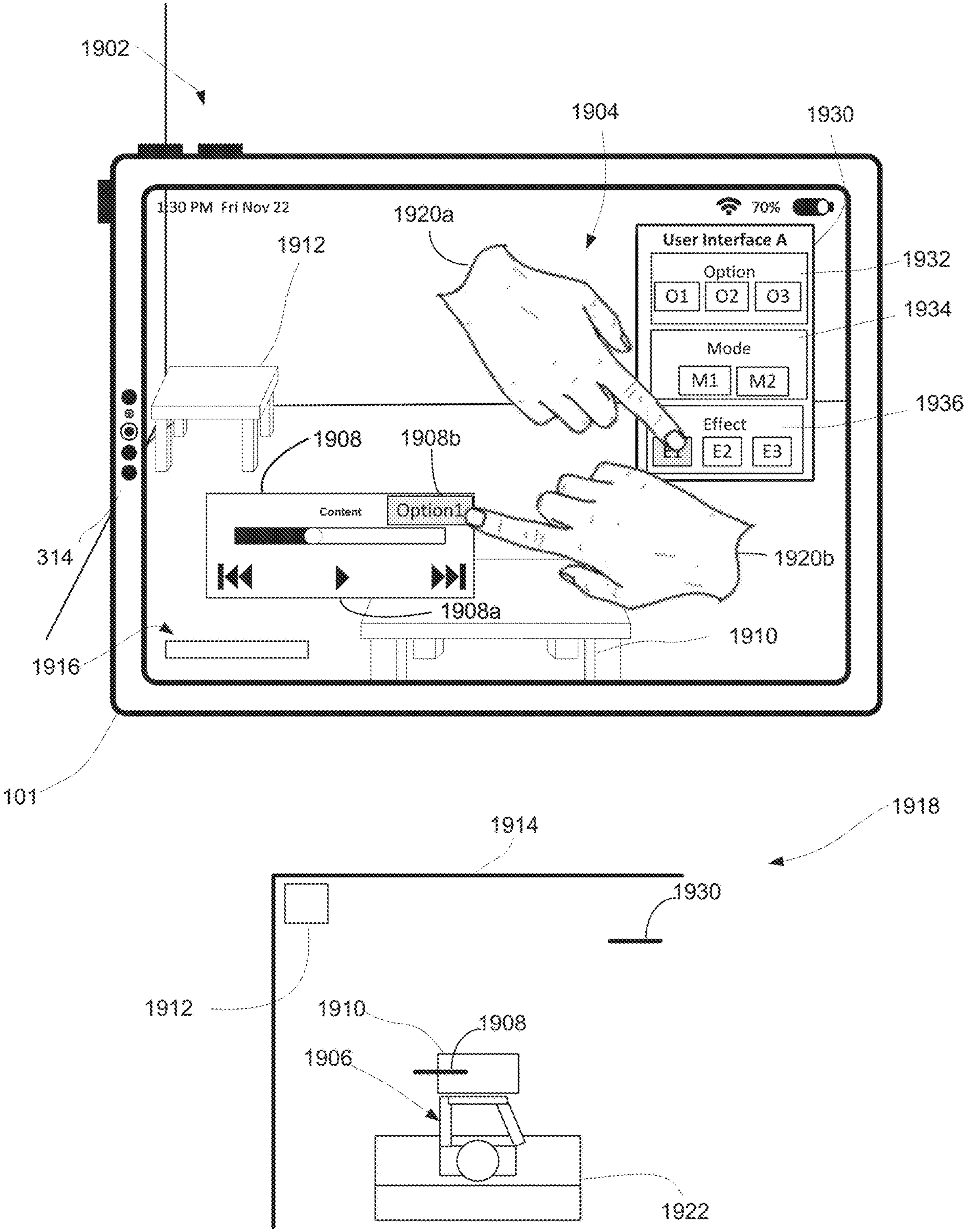
FIGS. 19A-19I illustrate examples of a computer system outputting a different sound effect when initiating display of different virtual three-dimensional environments in accordance with some embodiments.

FIG. 19A illustrates a computer system 101 (e.g., an electronic device) displaying, via a display generation component (e.g., display generation component 120 of FIG. 1), a three-dimensional environment 1904 from a viewpoint of a user of the computer system 101 (e.g., facing the back wall of the physical environment in which computer system 101 is located). In some embodiments, the computer system 101 includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or attention (e.g., including gaze) of the user (e.g., internal sensors facing inwards towards the face of the user). The figures herein illustrate a three-dimensional environment that is presented to the user by computer system 101 (e.g., and displayed by the display generation component of computer system 101) and an overhead view of the three-dimensional environment associated with computer system 101 (e.g., such as overhead view 1918 in FIG. 19A) to illustrate the relative locations of real-world elements from the physical environment and virtual elements (e.g., virtual content, virtual objects, and/or virtual environment) in the three-dimensional environment.

As shown in FIG. 19A, the computer system 101 captures one or more images of a physical environment around computer system 101 (e.g., operating environment 100), including one or more objects (e.g., table 1910 and corner table 1912) in the physical environment 1902 around computer the system 101. In some embodiments, the computer system 101 displays representations of the physical environment in the three-dimensional environment or portions of the physical environment are visible via the display generation component 120 of computer system 101. For example, the three-dimensional environment 1904 includes the table 1910, the corner table 1912, and portions of the floor in the physical environment 1902.

Figure 19B:
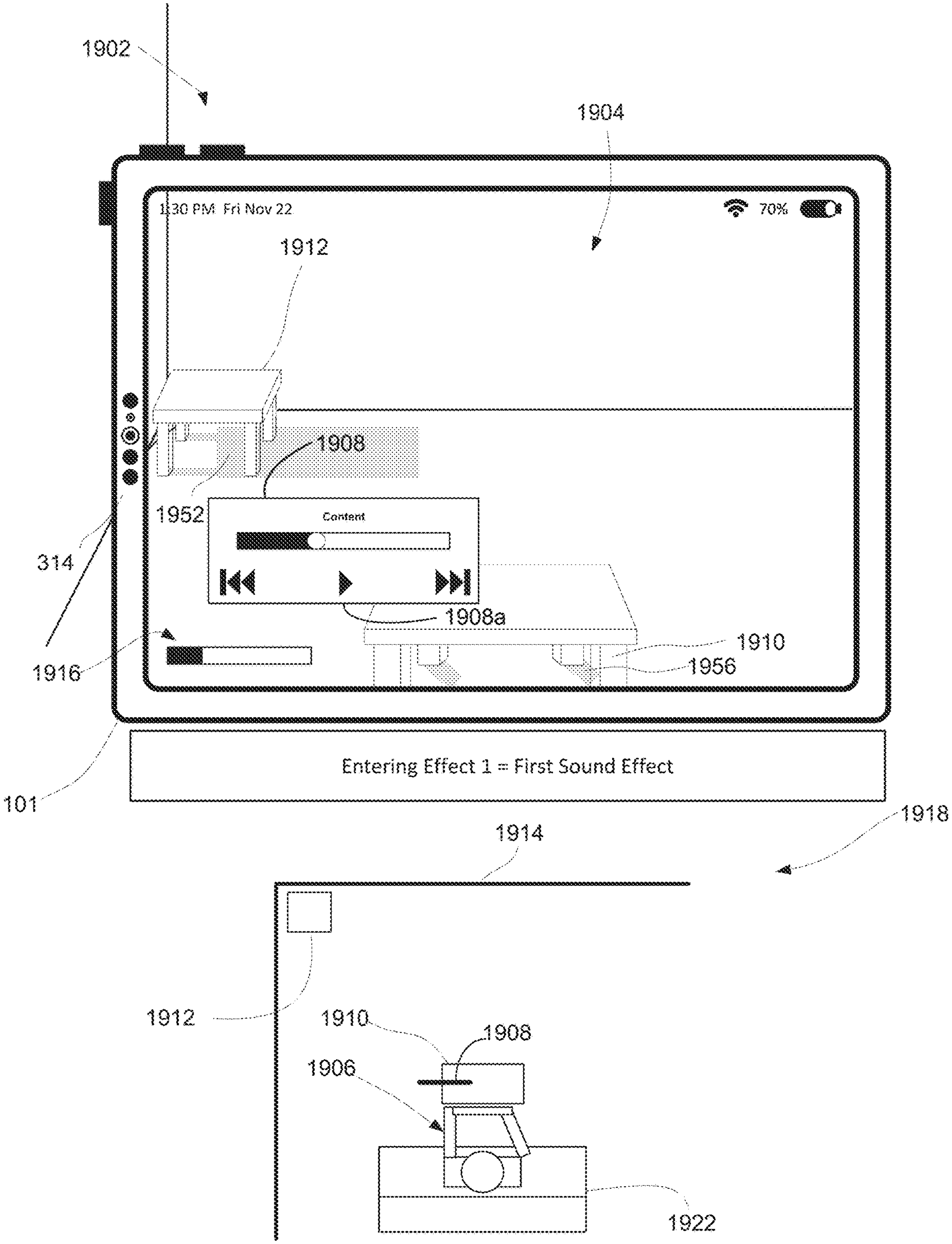
Figure 19C:
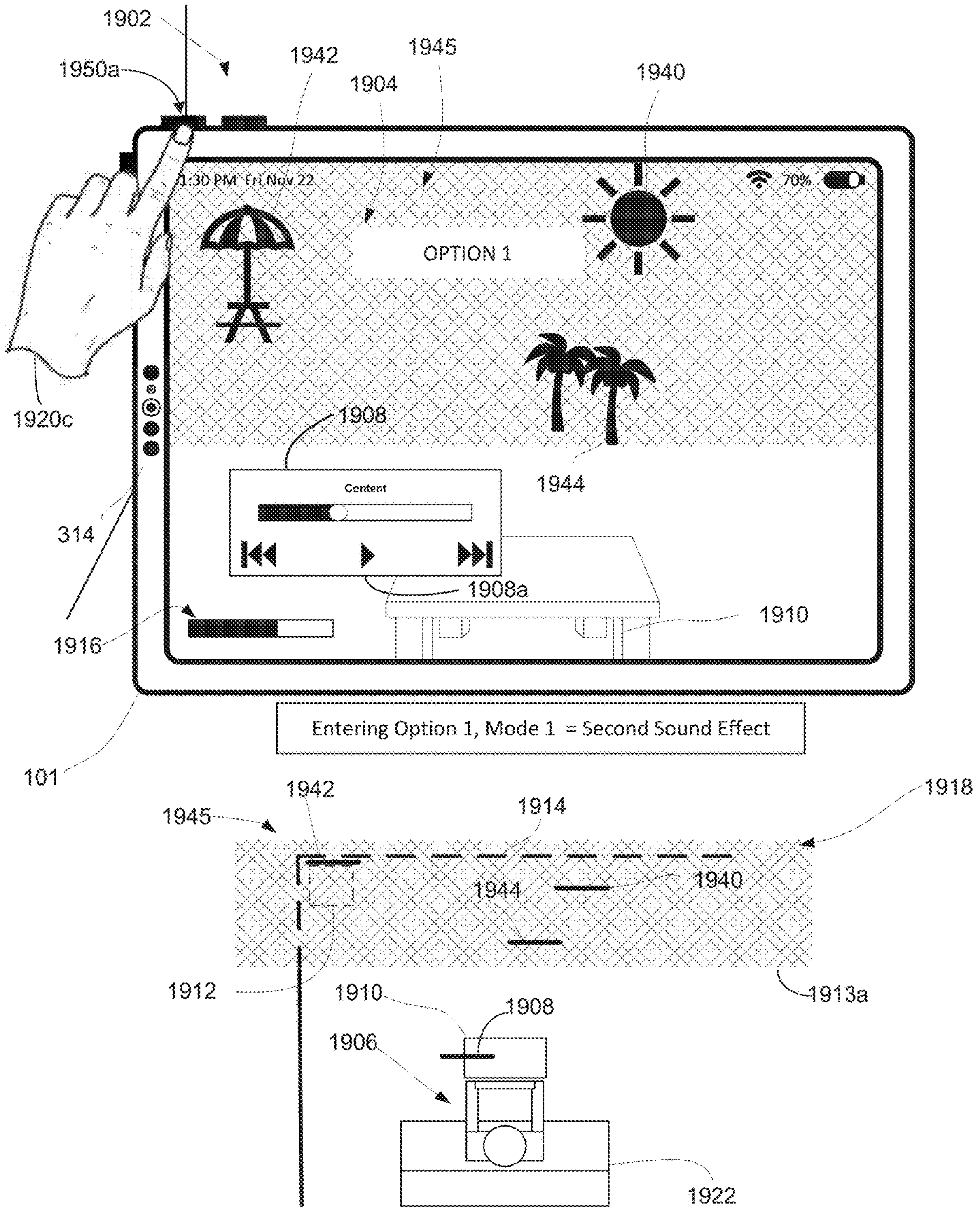
Figure 19D:
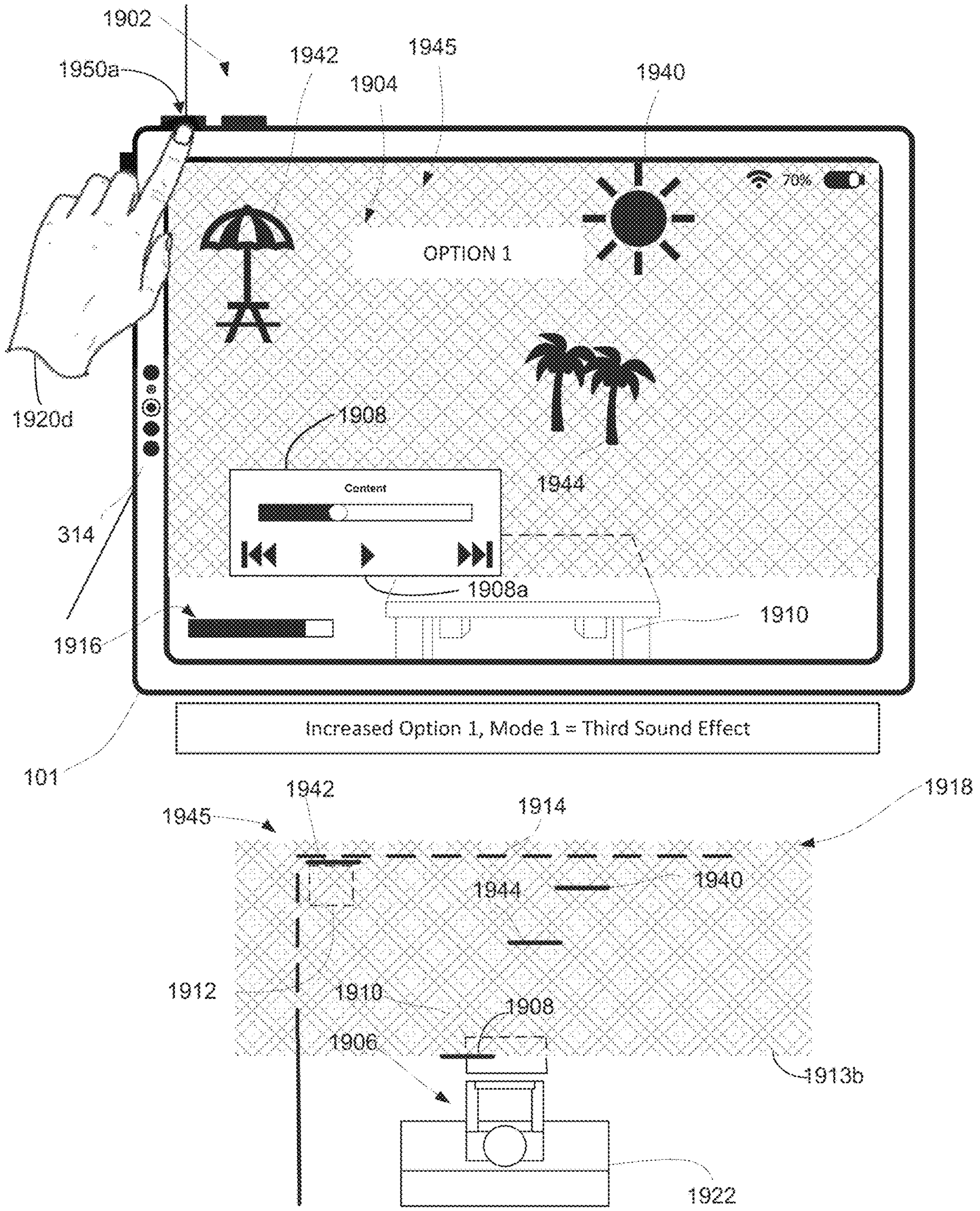
Figure 19E:
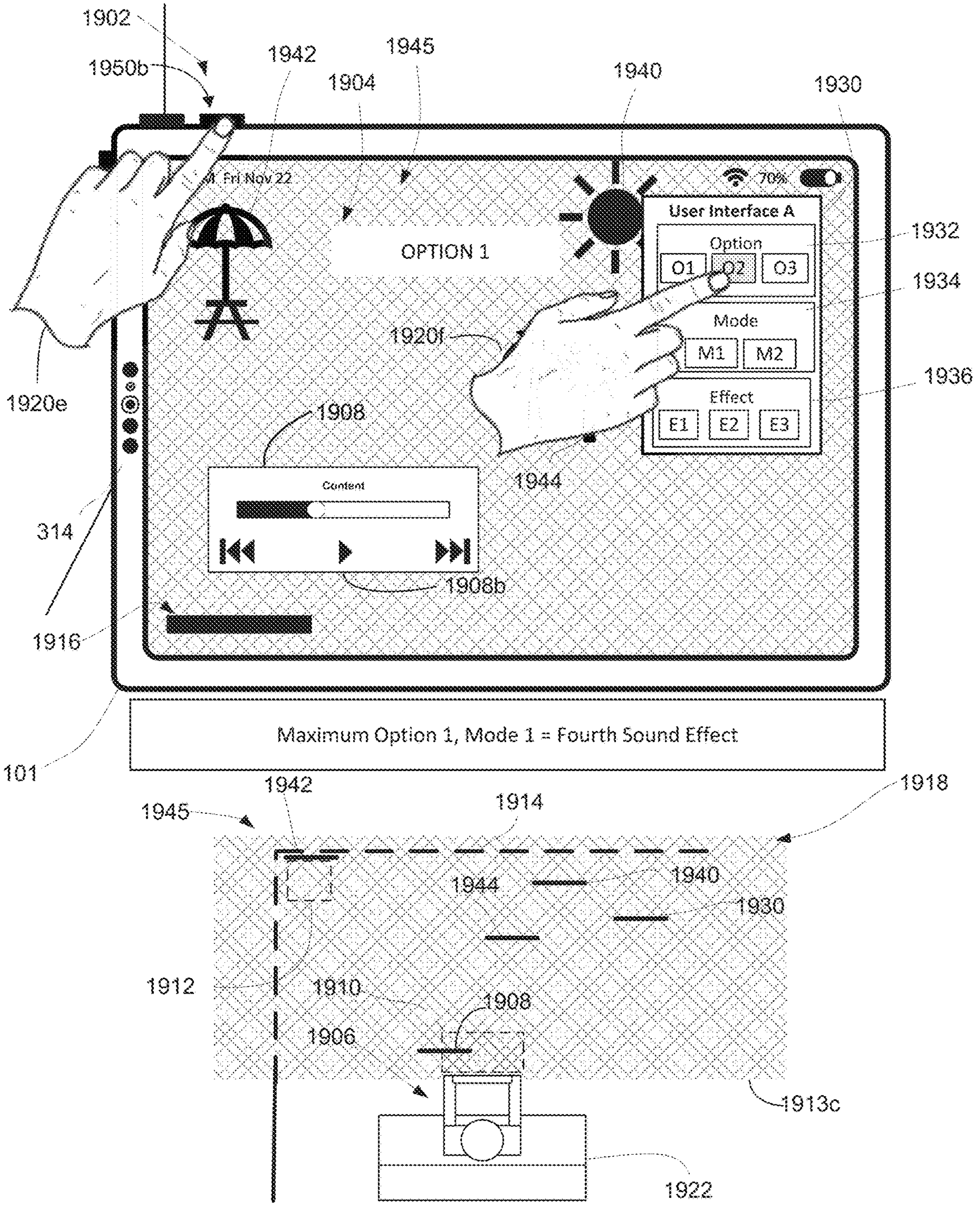
Figure 19F:
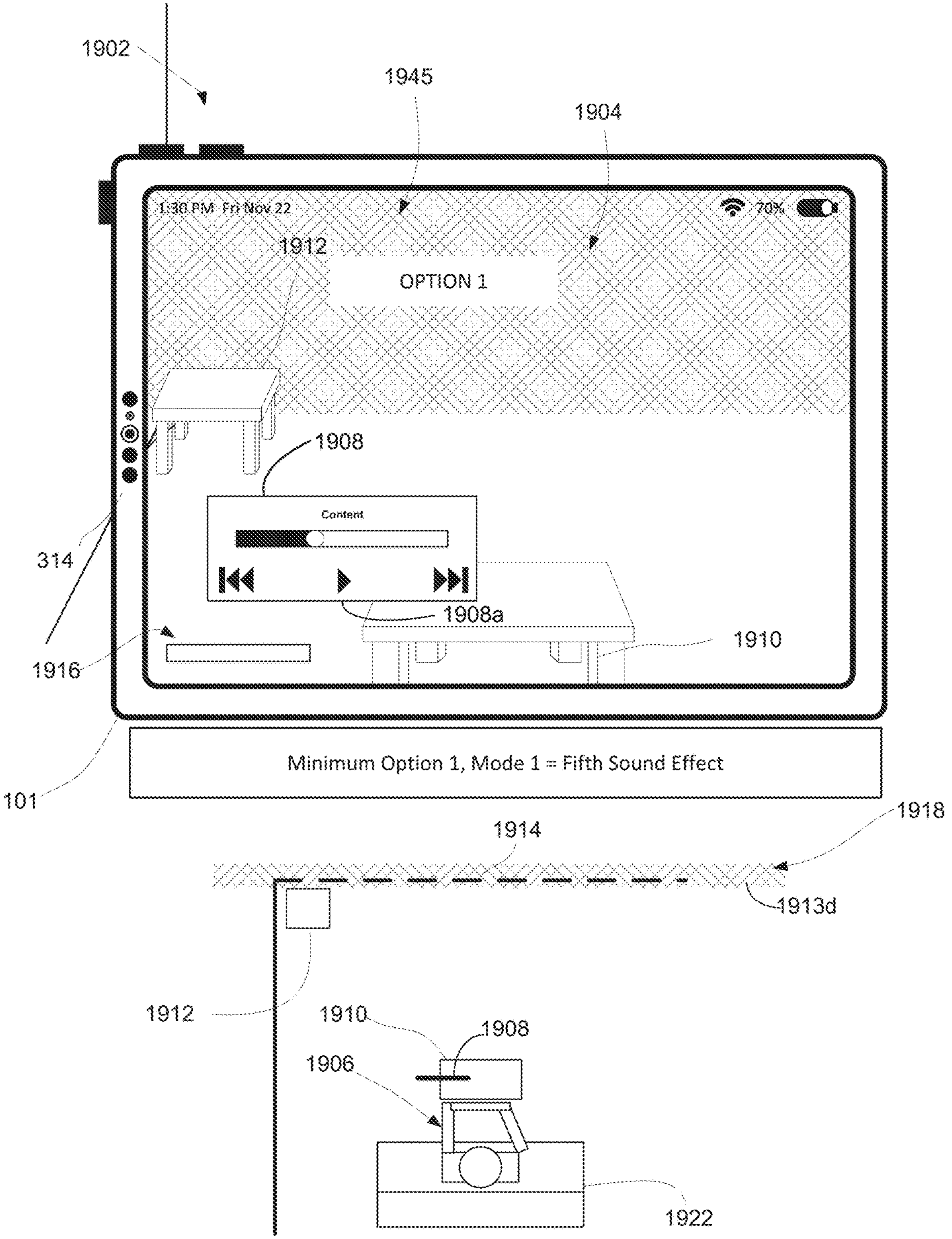

In some embodiments, a virtual environment, optionally a simulated three-dimensional environment, is displayed in three-dimensional environment 1904, optionally concurrently with the representation of the physical environment 1902 (e.g., partial immersion as illustrated in FIG. 19C) or optionally instead of the representations of the physical environment 1902 (e.g., full immersion as illustrated in FIG. 19E). Some examples of the virtual environment include beach background as illustrated in FIG. 19C or a mountain background as illustrated in FIG. 19H. In some embodiments, the virtual environment is based on a physical location. In some embodiments, a virtual environment is an artist-designed location and/or a simulated physical space. Thus, displaying a virtual environment in the three-dimensional environment 1904 provides the user with a virtual experience as if the user is physically located in the virtual environment as described with reference to methods 800, 1000, 1200, 1400, 1600, 1800, and/or 2000.

In FIG. 19A, the three-dimensional environment 1904 also includes virtual content, such as virtual content 1908 and user interface 1930. The virtual content 1908 optionally includes a user interface of an application (e.g., content browsing user interface) for playback of content (e.g., movie, television show, and/or photo). In FIG. 19A, the virtual content 1908 (e.g., content browsing user interface) for playback of content includes a playback control toggle 1908*b* to play or pause the content. The virtual content 1908 also includes a selectable option 1908*b* for displaying a virtual environment (e.g., Option 1). In some embodiments, the three-dimensional environment 1904 includes a three-dimensional object (e.g., virtual clock, virtual ball, or virtual car), user interfaces of other application (e.g., messaging user interface), or any other element displayed by computer system 101 that is not included in the physical environment 1902 of computer system 101.

As illustrated in the overhead view 1918, the user 1906 is seated on a couch 1922 in the physical environment 1902 while interacting with the computer system 101. In the overhead view 1918, tables 1910 and 1912 are real-world objects in the physical environment 1902, which has been captured by the one or more sensors of computer system 101, and representations of tables 1910 and 1912 are included in the three-dimensional environment 1904 (e.g., photorealistic representations, simplified representations, cartoons, or caricatures), or tables 1910 and 1912 are visible via passive passthrough via display generation component 120.

In FIG. 19A, the computer system 101 is displaying an immersion level indicator 1916. In some embodiments, the immersion level indicator 1916 indicates the current level of immersion (e.g., out of a maximum number of levels of immersion) with which computer system 101 is displaying the three-dimensional environment 1904. In some embodiments, a level of immersion includes an amount of view of the physical environment that is obscured (e.g., replaced) by the virtual environment. In some embodiments, the level of immersion includes one or more characteristics of immersion described with reference to methods 1400, 1600, and/or 2000. In FIG. 19A, the immersion level indicator 1916 indicates no immersion; thus, the physical environment is fully visible in the three-dimensional environment 1904. In some embodiments, the computer system does not display immersion level indicator 1916 in the three-dimensional environment 1904.

In FIG. 19A, the computer system 101 displays user interface 1930 (e.g., user interface A). In some embodiments, the user interface 1930 includes a first set of options 1932 for displaying virtual environments (e.g., backgrounds such as a beach background (Option 1) or a mountain background (Option 2)). In some embodiments, the user interface includes a second set of options 1934 a first time of day (e.g., Mode 1 or daytime) or a second time of day (e.g., Mode 2 or nighttime) setting of the virtual environment(s). Further, in some embodiments, the user interface includes a third set of options 1936 for displaying atmospheric effects (e.g., Effect 1, Effect 2, or Effect 3). In some embodiments, the first time of day, the second time, and the atmospheric effect include one or more characteristics of the first time of day, the second time of day, and the atmospheric effect as described with reference to method 2000. As indicated in FIG. 19A, and throughout this disclosure as described with reference to method 200, the first time of day corresponds to Mode 1 (e.g., daytime), and the second time of day corresponds to Mode 2 (e.g., nighttime).

In FIG. 19A, the computer system 101 receives input from hand 1920*a* of the user 1906 corresponding to a selection of displaying atmospheric effects (e.g., Effect 1) (e.g., an air pinch gesture from hand 1920*a* while attention of the user is directed to option E1 in options 1936 or air tapping option E1). Alternatively, the computer system receives input from hand 1920*b* of the user 1906 corresponding to displaying a virtual environment (e.g., Option 1) (e.g., an air pinch gesture from hand 1920*b* while attention of the user is directed to selectable option 1908*b* (e.g., Option 1) in the virtual content 1908 or air tapping the selectable option 1908*b* (e.g., Option 1)).

In response to receiving the selection of the atmospheric effect (e.g., E1) in FIG. 19A, the computer system 101 in FIG. 19B applies atmospheric effects simulating changes in lighting, simulated particle effects, or other simulated effects that change the appearance of the physical environment of the user, optionally without ceasing or obscuring display of the physical environment 1902 of the user 1906 (e.g., as described with respect to method 2000). For example in FIG. 19B, the computer system 101 displays shadow 1952 corresponding to the corner table 1912 and shadow 1956 corresponding to table 1910. As indicated in FIG. 19B and described with reference to method 200, the computer system 101 outputs a sound effect (e.g., first sound effect) when initiating display of the atmospheric effects (e.g., Effect 1).

In response to receiving the input directed to selectable option 1908*b* corresponding to the virtual environment (e.g., Option 1) in FIG. 19A, the computer system 101 in FIG. 19B displays a virtual environment 1945 (e.g., beach background or Option 1). In FIG. 19A, the virtual environment 1945 corresponding to the beach background includes virtual elements such as a virtual umbrella 1942 and virtual palm trees 1944. As illustrated, the computer system 101 displays the virtual environment 1945 according to a first time of day (e.g., daytime) as described with respect to method 2000. Accordingly, the virtual environment 1945 includes the beach background illuminated by a virtual sun 1940.

In the overhead view 1918, table 1910 is a real-world object in the physical environment 1902 as described above in FIG. 19A. In the overhead view 1918, the corner table 1912*b* from the physical environment 1902 is represented as dashed lines because the corner table 1912 is not visible in the three-dimensional environment 1904. That is, the portion of the physical environment 1902 which includes the corner table 1912 is not visible to the user 1906 because the virtual environment 1945 has replaced the portion of the physical environment 1902 that includes the corner table 1912. As shown in the overhead view 1918, at the immersion level for virtual environment 1945 displayed in FIG. 19C, the virtual environment 1945 optionally extends from a boundary 1913*a* to a far wall 1914 in three-dimensional environment 1904. Accordingly, the immersion level indicator 1916 indicates partial immersion. As indicated in FIG. 19C, the computer system 101 outputs a sound effect (e.g., second sound effect different from the first sound effect) when initiating display of the virtual environment (e.g., Option 1). In some embodiments, the second sound effect moves spatially in three-dimensional environment 1904 based on spatial movement (e.g., angular position) of the virtual environment 1945 relative to a field of view of the user 1906 as the virtual environment 1945 is displayed. In some embodiments, movement of the second sound effect in three-dimensional environment 1904 does not correspond to a spatial movement of the virtual environment 1945 as described with reference to method 2000. In FIG. 19C, the computer system 101 receives input from hand 1920*c* directed to physical button 1950*a* of computer system 101, that when depressed, causes an increase in an immersion level of the virtual environment 1945.

In response to receiving the input for the increase in the immersion level of the virtual environment 1945 in FIG. 19C, the computer system 101 increases the immersion level of the virtual environment 1945 in FIG. 19D (as indicated by the immersion level indicator 1916). As shown in the overhead view 1918, a first portion of the table 1910 is represented as dashed lines because the first portion is not visible in the three-dimensional environment 1904 while a second portion of the table 1910 is represented as solid lines because the second portion is visible in the three-dimensional environment 1904. In the overhead view 1918, the corner table 1912 from the physical environment 1902 is represented as dashed lines because the corner table 1912 is not visible in the three-dimensional environment 1904. That is, the portion of the physical environment 1902 that includes the first portion of the table 1910 and the corner table 1912 is not visible to the user 1906 because the virtual environment 1945 has replaced the portion of the physical environment 1902 that includes the first portion of the table 1910 and the corner table 1912. As shown in the overhead view 1918, at the immersion level for virtual environment 1945 displayed in FIG. 19D, the virtual environment 1945 optionally extends from a boundary 1913*b* (e.g., closer to the viewpoint of the user 1906 compared to boundary 1913*a* in FIG. 19C) to a far wall 1914 in three-dimensional environment 1904. As indicated in FIG. 19D, the computer system 101 outputs a sound effect (e.g., third sound effect different from the first sound effect and/or the second sound effect) when increasing the immersion level of the virtual environment 1945 (e.g., Option 1). In FIG. 19D, the computer system 101 receives input from hand 1920*d* directed to physical button 1950*a*, that when depressed again, causes a further increase in an immersion level of the virtual environment 1945 such as to a maximum level of immersion.

In response to receiving the input for the increase in the immersion level of the virtual environment 1945 to a maximum level in FIG. 19D, the computer system 101 increases the immersion level of the virtual environment 1945 to a maximum level in FIG. 19E (e.g., full immersion as indicated by the immersion level indicator 1916). As shown in the overhead view 1918, the table 1910 and the corner table 1912 from the physical environment 1902 are represented as dashed lines because the table 1910 and the corner table 1912 are no longer visible in the three-dimensional environment 1904 at full immersion. That is, the portion of the physical environment 1902 that includes the table 1910 and the corner table 1912 are not visible to the user 1906 because the virtual environment 1945 has replaced the portion of the physical environment 1902 that includes the table 1910 and the corner table 1912. As shown in the overhead view 1918, at the immersion level for virtual environment 1945 displayed in FIG. 19E, the virtual environment 1945 optionally extends from a boundary 1913*c* (e.g., closer to the viewpoint of the user 1906 compared to boundary 1913*b* in FIG. 19D) to a far wall 1914 in three-dimensional environment 1904. As indicated in FIG. 19E, the computer system 101 outputs a sound effect (e.g., fourth sound effect different from the first sound effect, the second sound effect, and/or the third sound effect) when increasing the immersion level of the virtual environment 1945 (e.g., Option 1) to a maximum level. In FIG. 19E, the computer system 101 receives input from hand 1920*e* directed to physical button 1950*b*, that when depressed, causes a decrease in an immersion level of the virtual environment 1945 such as to a minimum level of immersion. In FIG. 19E, the computer system 101 displays user interface 1930 (e.g., user interface A) as described with reference to 19A. Therefore, alternatively, in FIG. 19E, the computer system receives input from hand 1920*f* corresponding to displaying a different virtual environment 1945 (e.g., Option 2 in options 1932 in user interface 1930) (e.g., an air pinch gesture from hand 1920*f* while attention of the user is directed to O2 in options 1932 of user interface 1930 or air tapping option O2).

In response to receiving the input for the decrease in the immersion level of the virtual environment 1945 to a minimum level in FIG. 19E, the computer system 101 decreases the immersion level of the virtual environment 1945 to a minimum level in FIG. 19E (e.g., little to no immersion as indicated by the immersion level indicator 1916). As shown in the overhead view 1918, the table 1910 and the corner table 1912 from the physical environment 1902 are represented as solid lines because the table 1910 and the corner table 1912 are real-world objects and visible in the three-dimensional environment 1904 at the minimum immersion level. That is, the portion of the physical environment 1902 that includes the table 1910 and the corner table 1912 are visible to the user 1906 because the virtual environment 1945 has not replaced the portion of the physical environment 1902 that includes the table 1910 and the corner table 1912. As shown in the overhead view 1918, at the immersion level for virtual environment 1945 displayed in FIG. 19F, the virtual environment 1945 optionally extends from a boundary 1913*d* (e.g., farther away from the viewpoint of the user 1906 compared to boundary 1913*c* in FIG. 19E) to a far wall 1914 in three-dimensional environment 1904. As indicated in FIG. 19F, the computer system 101 outputs a sound effect (e.g., fifth sound effect different from the first sound effect, the second sound effect, the third sound effect, and/or the fourth sound effect) when decreasing the immersion level of the virtual environment 1945 (e.g., Option 1) to a minimum level.

Figure 19G:
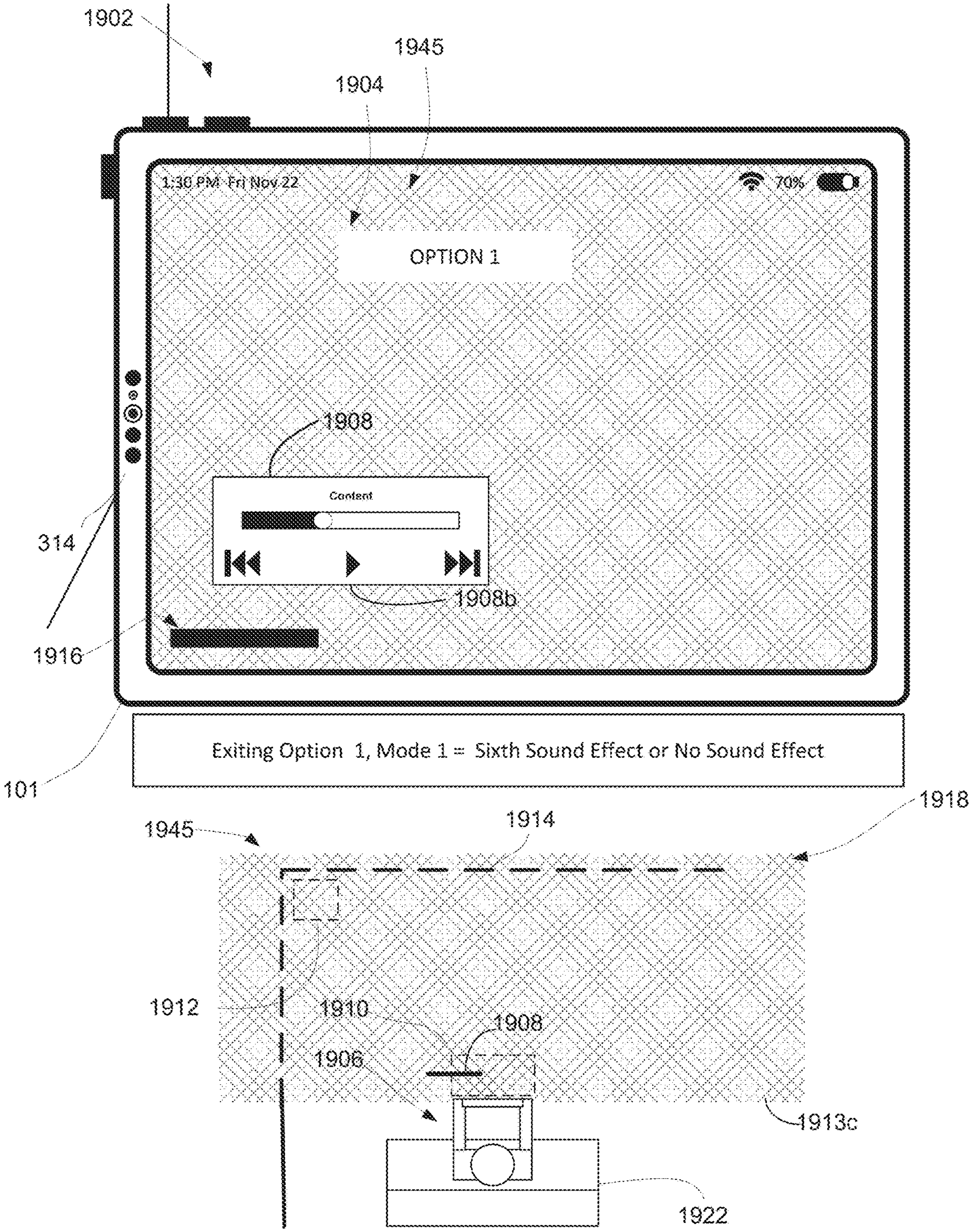
Figure 19H:
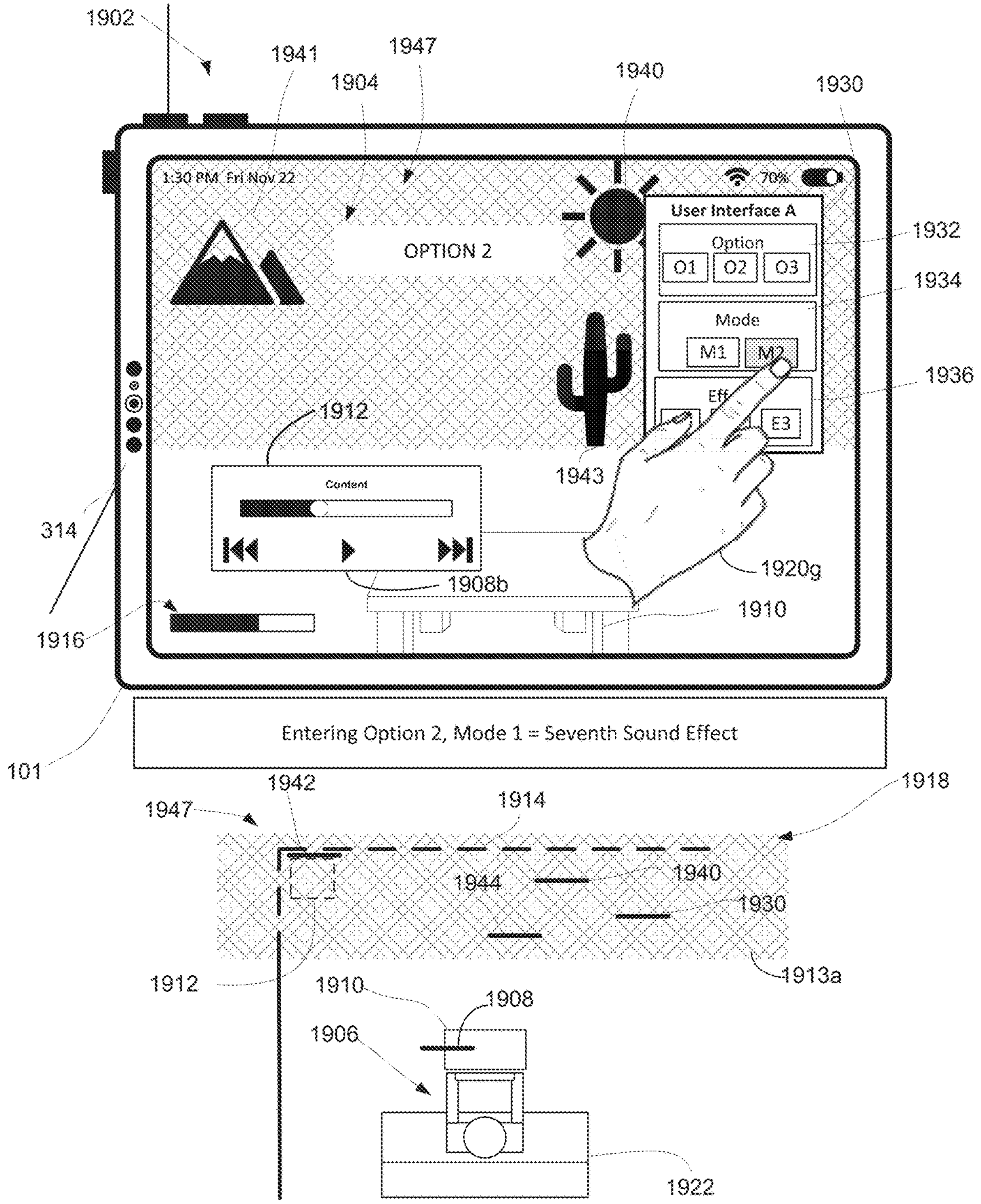

In response to receiving the alternative input for displaying a different virtual environment 1945 (e.g., mountain background or Option 2) in FIG. 19E, the computer system 101 in FIG. 19G gradually ceases display of the beach background (e.g., Option 1). FIG. 19G illustrates an intermediate phase between switching from display of the beach background (e.g., Option 1) to the mountain background (e.g., Option 2). While the virtual environment 1945 (e.g., Option 1) is still displayed at full immersion in this intermediate phase, the computer system has ceased display of the virtual elements corresponding to the beach background (e.g., Option 1), such as the virtual umbrella 1942 and the virtual palm trees 1944. The immersion level in FIG. 19G is the same as the immersion level in FIG. 19E. Accordingly, as shown in the overhead view 1918, at the immersion level (e.g., full immersion) for virtual environment 1945 displayed in FIG. 19G, the virtual environment 1945 optionally extends from the boundary 1913*c* (e.g., same as in FIG. 19E) to the far wall 1914 in three-dimensional environment 1904. In some embodiments, the computer system 101 outputs a sound effect (e.g., sixth sound effect different from the first sound effect, the second sound effect, the third sound effect, the fourth sound effect, and/or the fifth sound effect) when ceasing display of the virtual environment 1945 (e.g., Option 1). In some embodiments, the computer system 101 forgoes outputting a sound effect when ceasing display of the virtual environment 1945 (e.g., Option 1) when ceasing display of the virtual environment 1945 is going to be followed by displaying a different virtual environment.

After ceasing display of the virtual environment 1945 (e.g., Option 1), the computer system 101 displays the mountain background or Option 2 in FIG. 19H. Further, as shown in FIG. 19H, the computer 101 displays user interface 1930 (e.g., user interface A) as described with reference to 19A. In FIG. 19H, the virtual environment 1947 corresponding to the mountain background includes virtual elements such as a virtual mountain 1941 and virtual cacti 1943 As illustrated in FIG. 19H, the computer system 101 displays the virtual environment 1947 according to a first time of day (e.g., daytime) as described with respect to method 2000. Accordingly, the virtual environment 1947 includes the mountain background illuminated by a virtual sun 1940.

The immersion level in FIG. 19H is the same as the immersion level in FIG. 19A. Accordingly, as shown in the overhead view 1918, at the immersion level (e.g., partial immersion as indicated by the immersion level indicator) for virtual environment 1947 displayed in FIG. 19H, the virtual environment 1947 optionally extends from the boundary 1913*a* (e.g., same as in FIG. 19A) to the far wall 1914 in three-dimensional environment 1904. As indicated in FIG. 19H, the computer system 101 outputs a sound effect (e.g., seventh sound effect different from the first sound effect, the second sound effect, the third sound effect, the fourth sound effect, the fifth sound effect, and/or the sixth sound effect) when initiating display of the virtual environment 1947 (e.g., mountain background or Option 2). In FIG. 19H, the computer system 101 receives input from hand 1920*g* of the user 1906 corresponding to a selection of applying a second time of day (e.g., nighttime or Mode 2) (e.g., an air pinch gesture from hand 1920*g* while attention of the user is directed to option M2 in options 1934 or air tapping option M2).

FIG. 19H1 illustrates similar and/or the same concepts as those shown in FIG. 19H (with many of the same reference numbers). It is understood that unless indicated below, elements shown in FIG. 19H1 that have the same reference numbers as elements shown in FIGS. 19A-19I have one or more or all of the same characteristics. FIG. 19H1 includes computer system 101, which includes (or is the same as) display generation component 120. In some embodiments, computer system 101 and display generation component 120 have one or more of the characteristics of computer system 101 shown in FIGS. 19H and 19A-19I and display generation component 120 shown in FIGS. 1 and 3, respectively, and in some embodiments, computer system 101 and display generation component 120 shown in FIGS. 19A-19I have one or more of the characteristics of computer system 101 and display generation component 120 shown in FIG. 19H1.

In FIG. 19H1, display generation component 120 includes one or more internal image sensors 314*a* oriented towards the face of the user (e.g., eye tracking cameras 540 described with reference to FIG. 5). In some embodiments, internal image sensors 314*a* are used for eye tracking (e.g., detecting a gaze of the user). Internal image sensors 314*a* are optionally arranged on the left and right portions of display generation component 120 to enable eye tracking of the user's left and right eyes. Display generation component 120 also includes external image sensors 314*b* and 314*c* facing outwards from the user to detect and/or capture the physical environment and/or movements of the user's hands. In some embodiments, image sensors 314*a*, 314*b*, and 314*c* have one or more of the characteristics of image sensors 314 described with reference to FIGS. 19A-19I.

In FIG. 19H1, display generation component 120 is illustrated as displaying content that optionally corresponds to the content that is described as being displayed and/or visible via display generation component 120 with reference to FIGS. 19A-19I. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 19H1.

Display generation component 120 has a field of view (e.g., a field of view captured by external image sensors 314*b* and 314*c* and/or visible to the user via display generation component 120, indicated by dashed lines in the overhead view) that corresponds to the content shown in FIG. 19H1. Because display generation component 120 is optionally a head-mounted device, the field of view of display generation component 120 is optionally the same as or similar to the field of view of the user.

In FIG. 19H1, the user is depicted as performing an air pinch gesture (e.g., with hand 1920*g*) to provide an input to content displayed by computer system 101 (e.g., an air pinch input from hand 1920*g* while attention of the user is directed to the element M2, indicated by gaze point 1960). Such depiction is intended to be exemplary rather than limiting; the user optionally provides user inputs using different air gestures and/or using other forms of input as described with reference to FIGS. 19A-19I.

In some embodiments, computer system 101 responds to user inputs as described with reference to FIGS. 19A-19I.

In the example of FIG. 19H1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 19A-19I and/or described with reference to the corresponding method(s) are optionally implemented on computer system 101 and display generation unit 120 in a manner similar or analogous to that shown in FIG. 19H1.

Figure 19I:
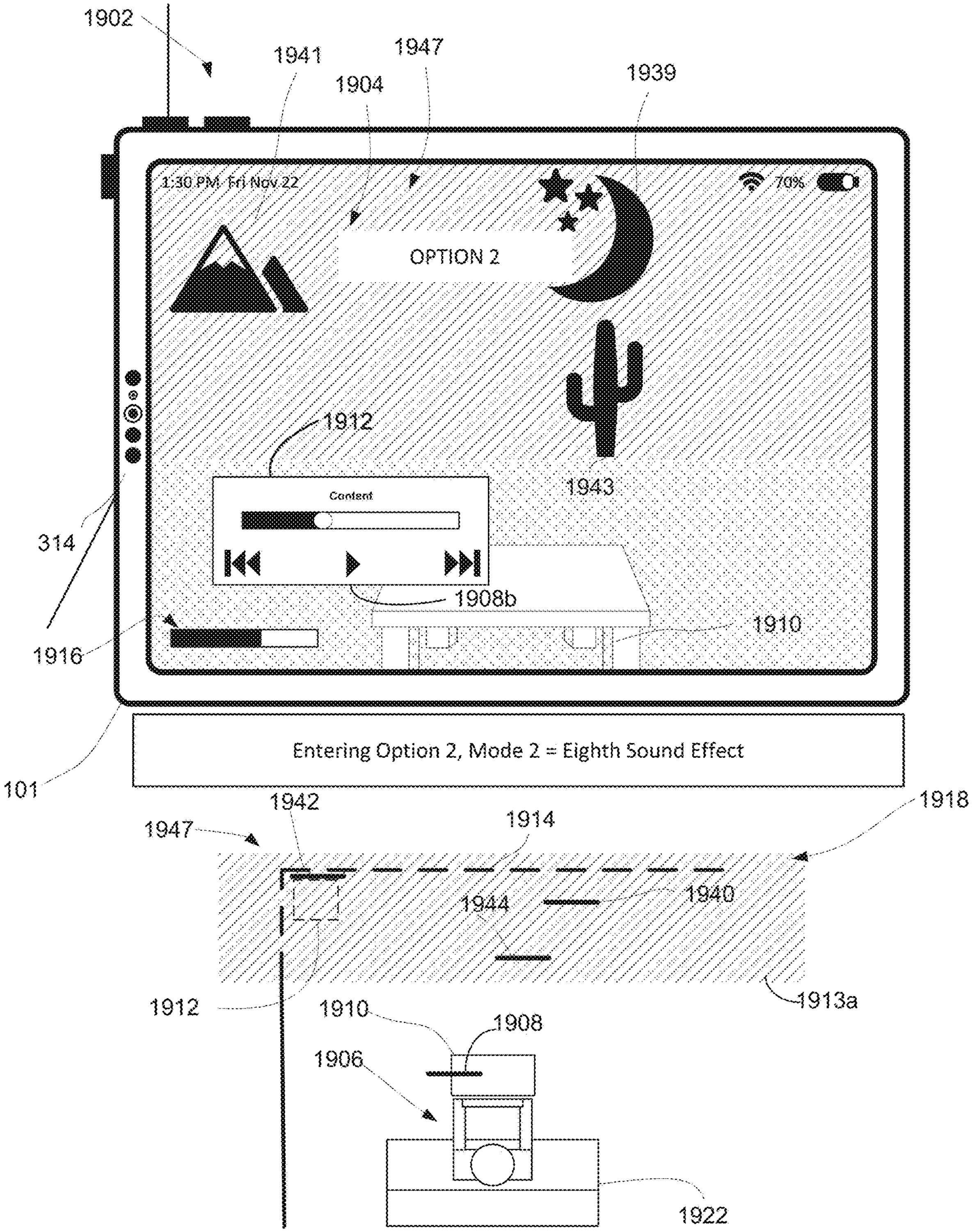
Figure 20A:
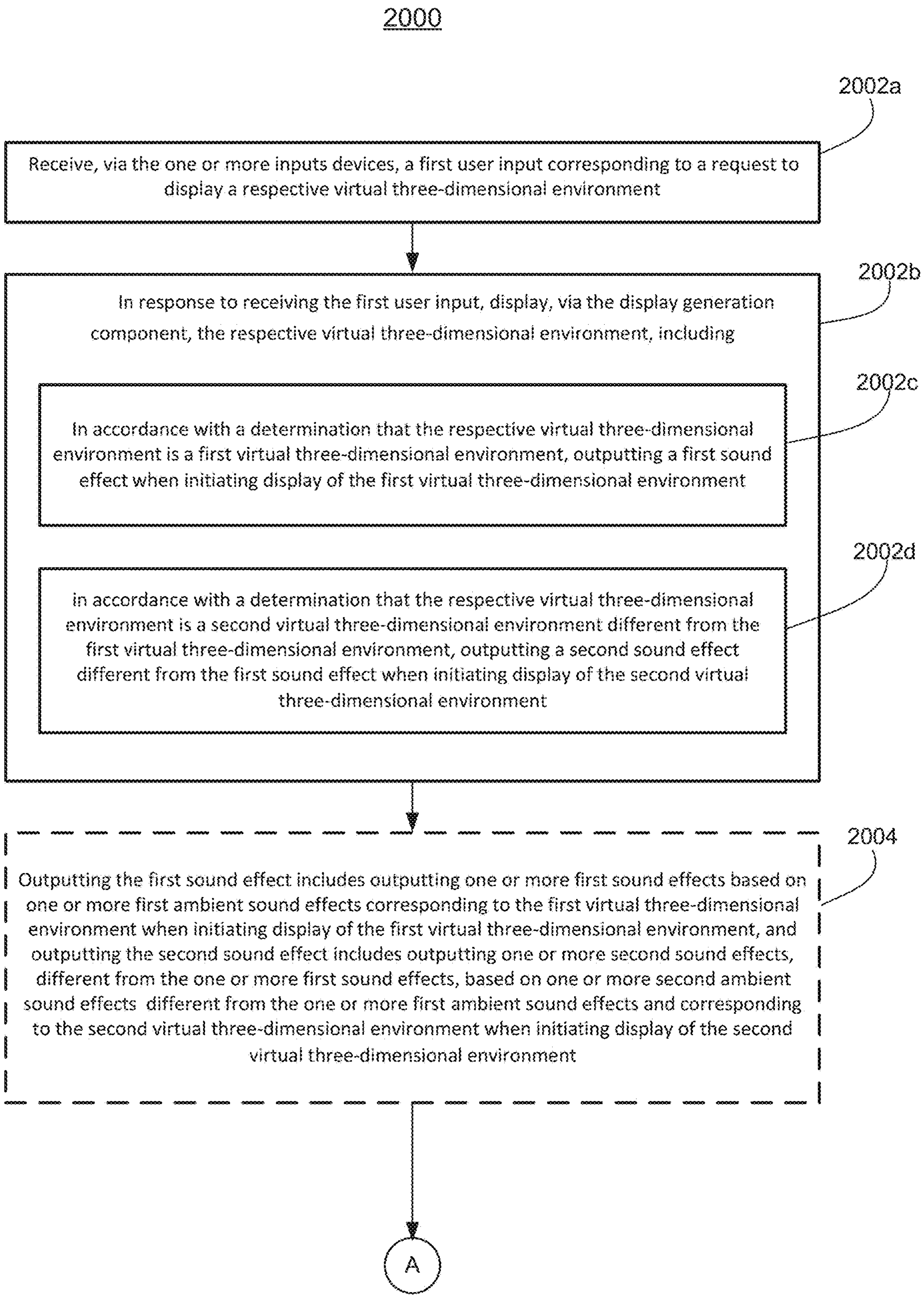
Figure 20B:
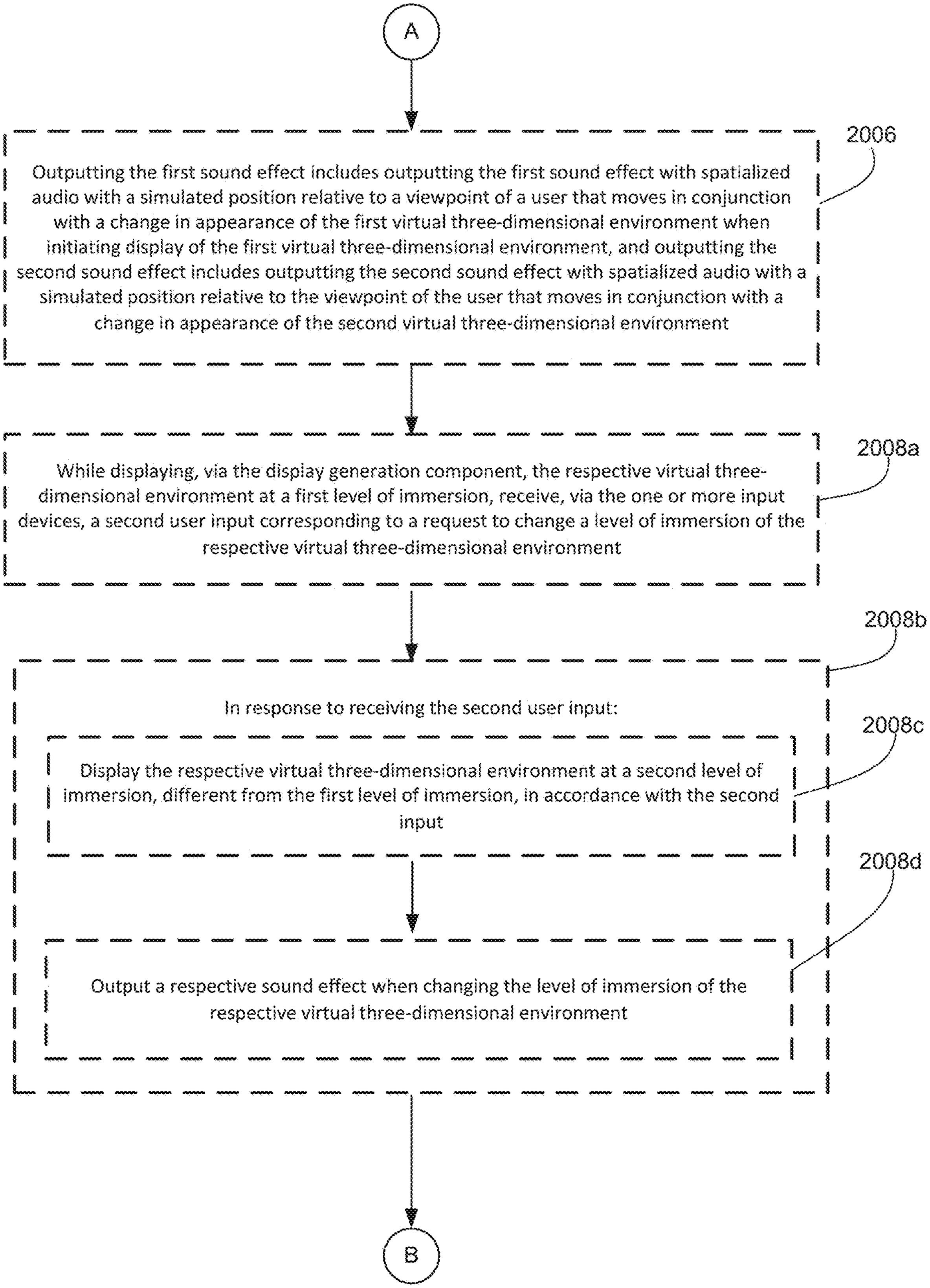
Figure 20D:
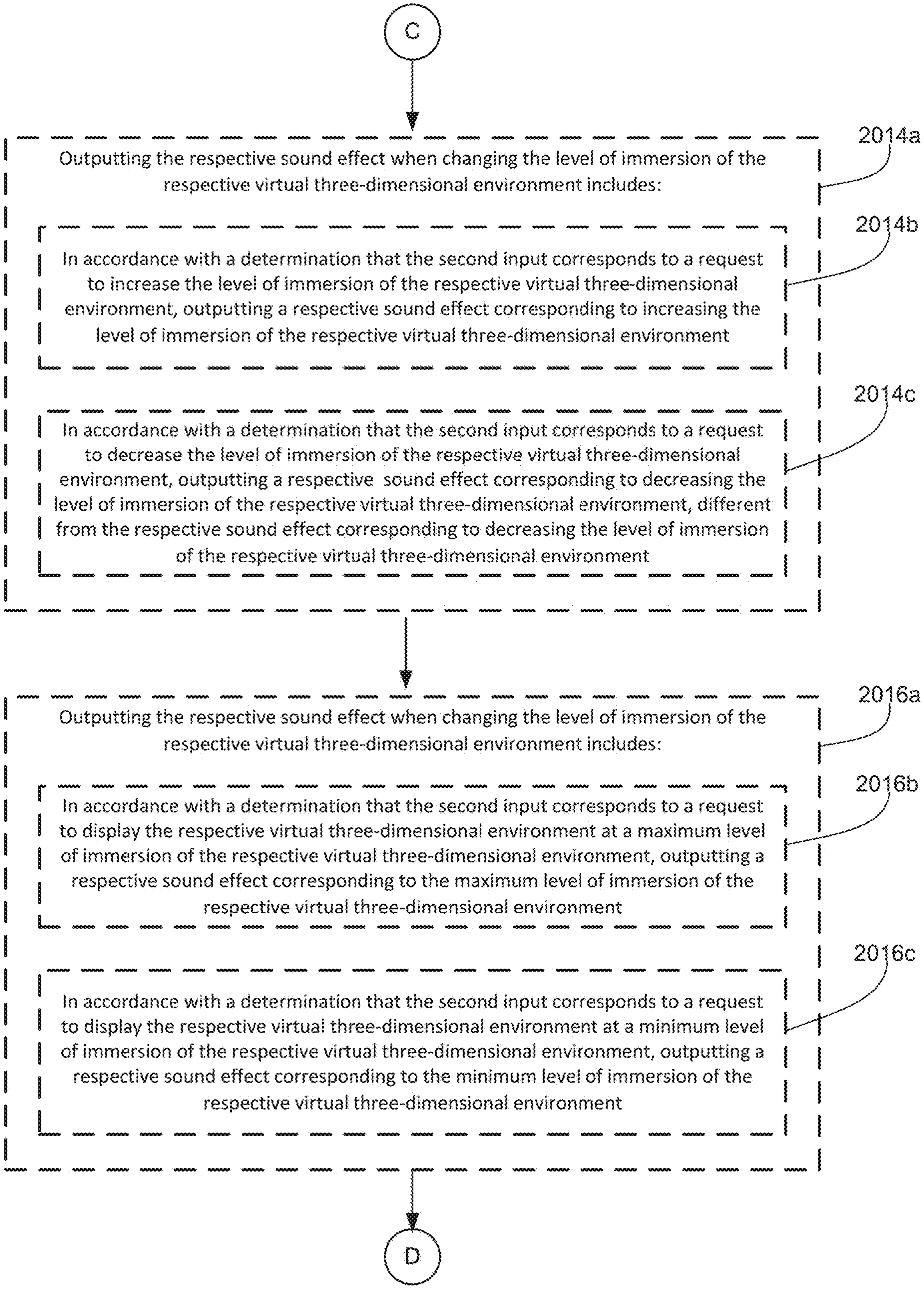
Figure 20E:
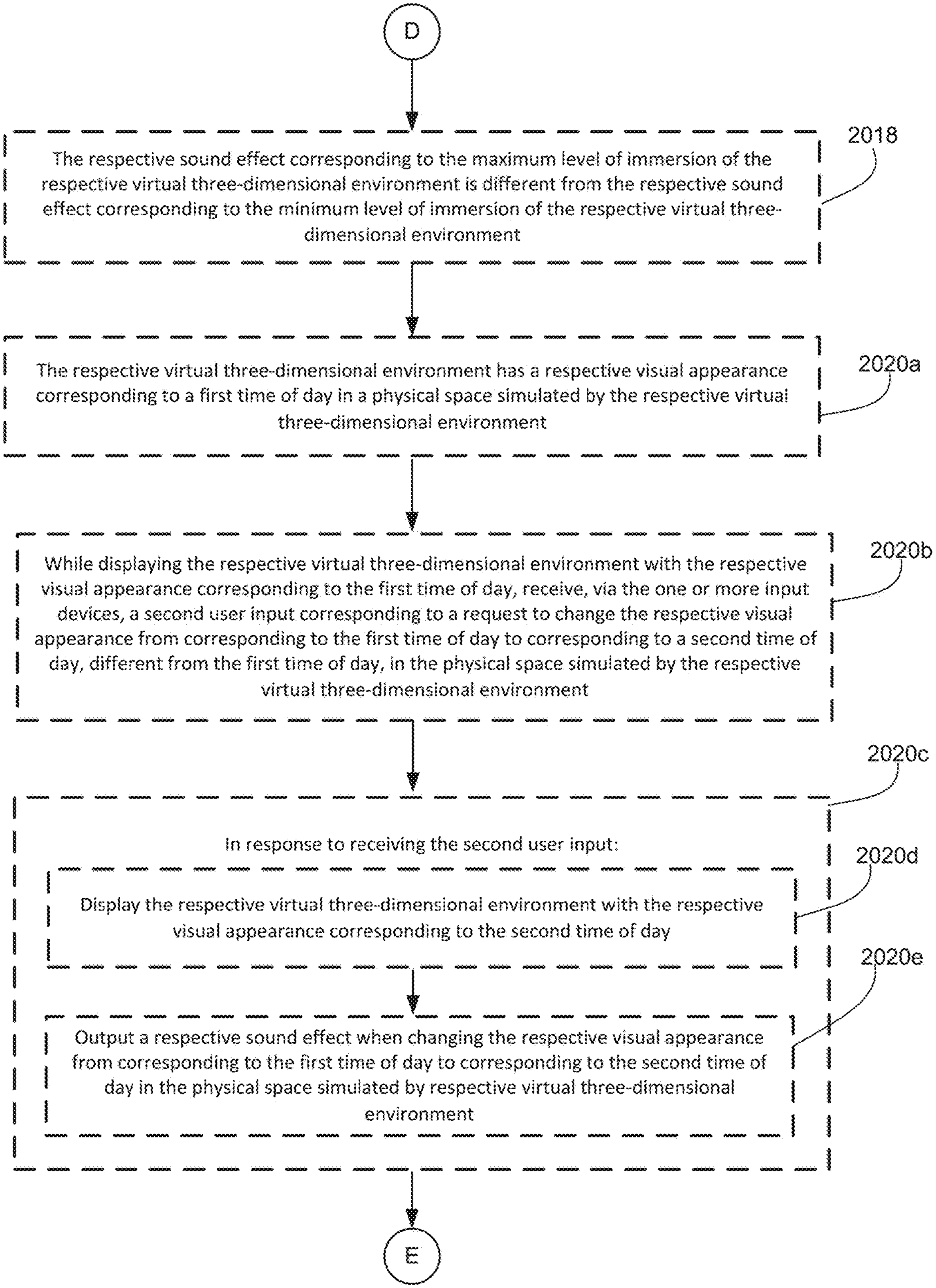
Figure 20G:
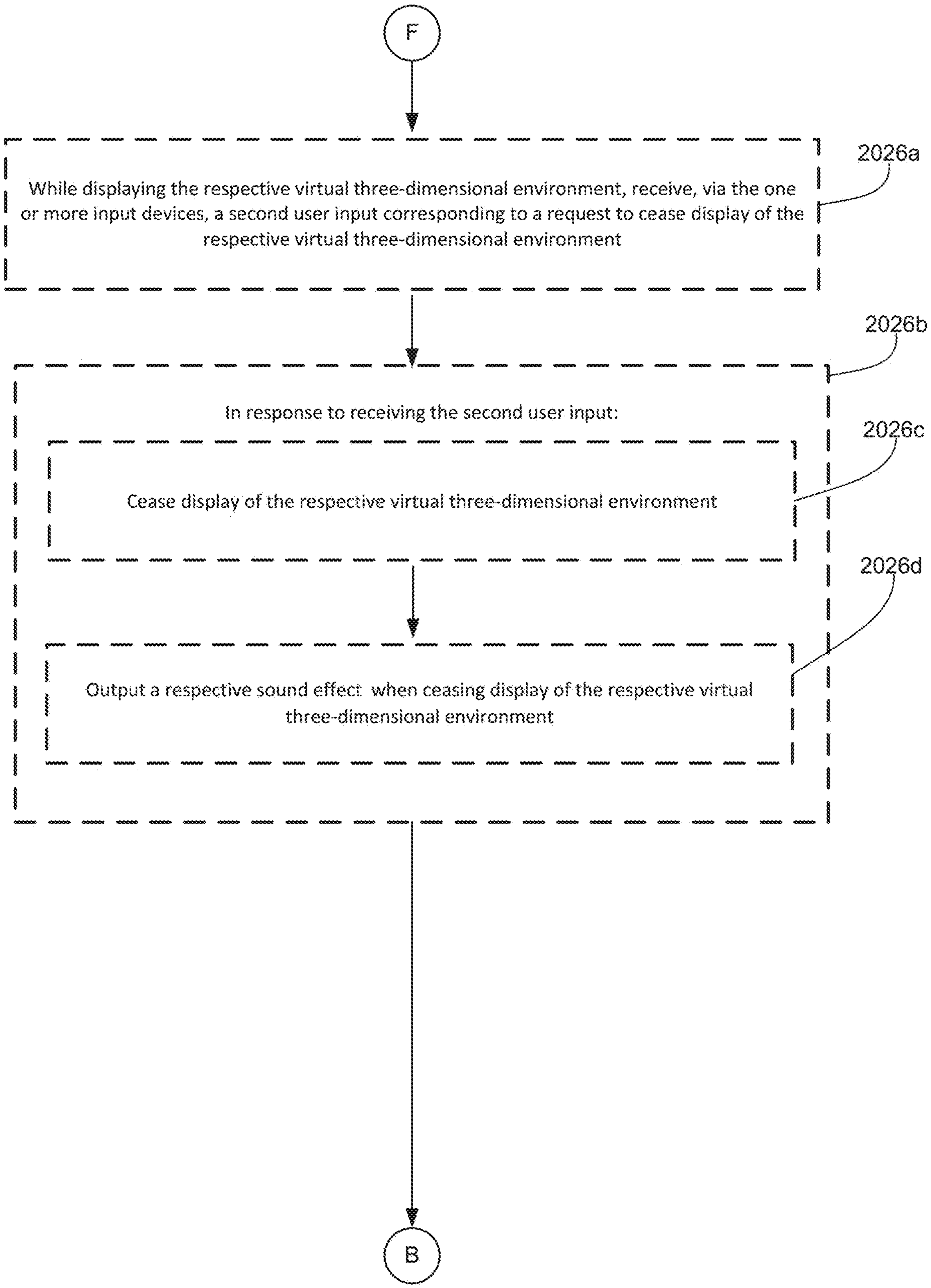
Figure 20H:
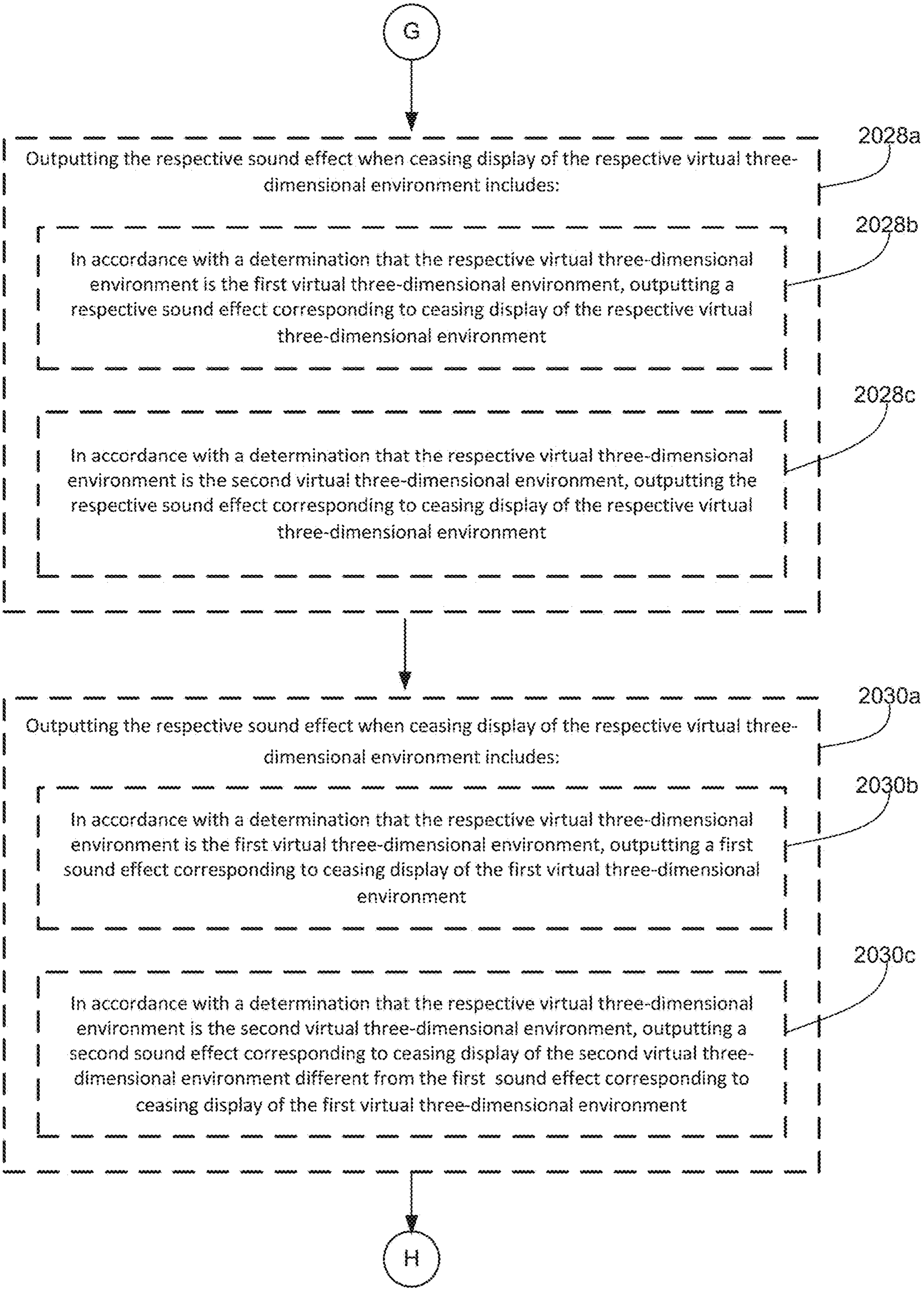
Figure 20I:
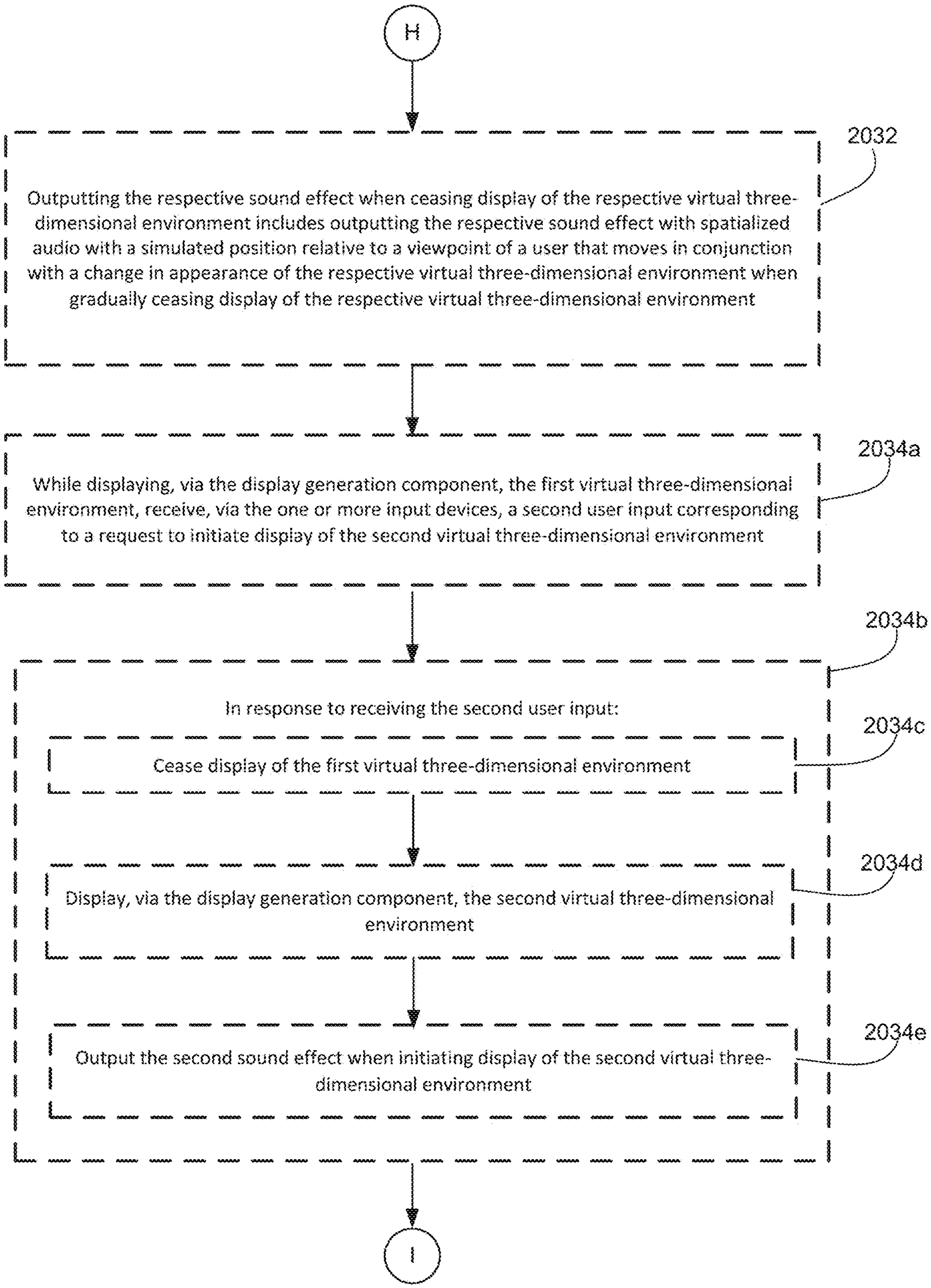
Figure 20J:
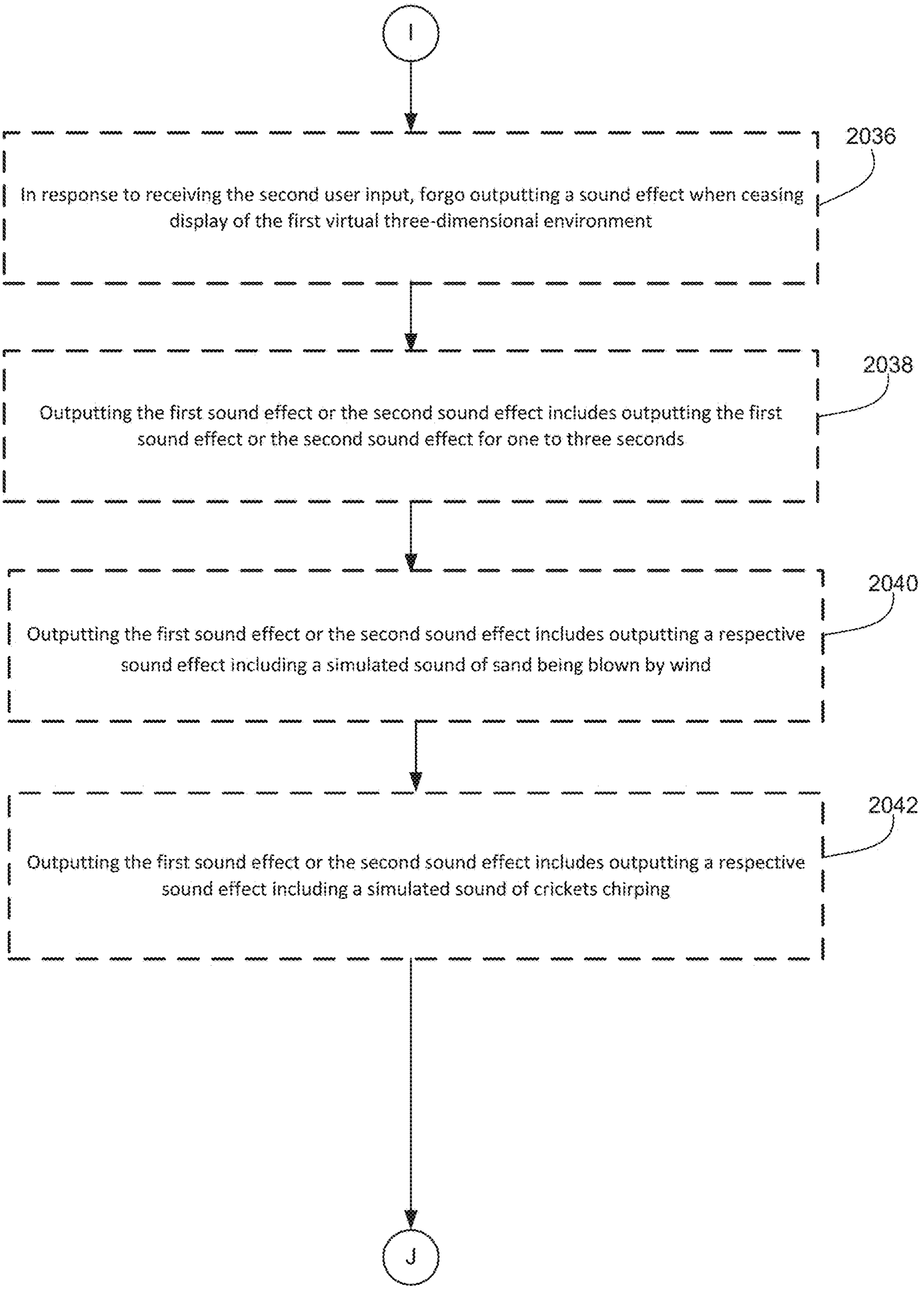
Figure 20K:
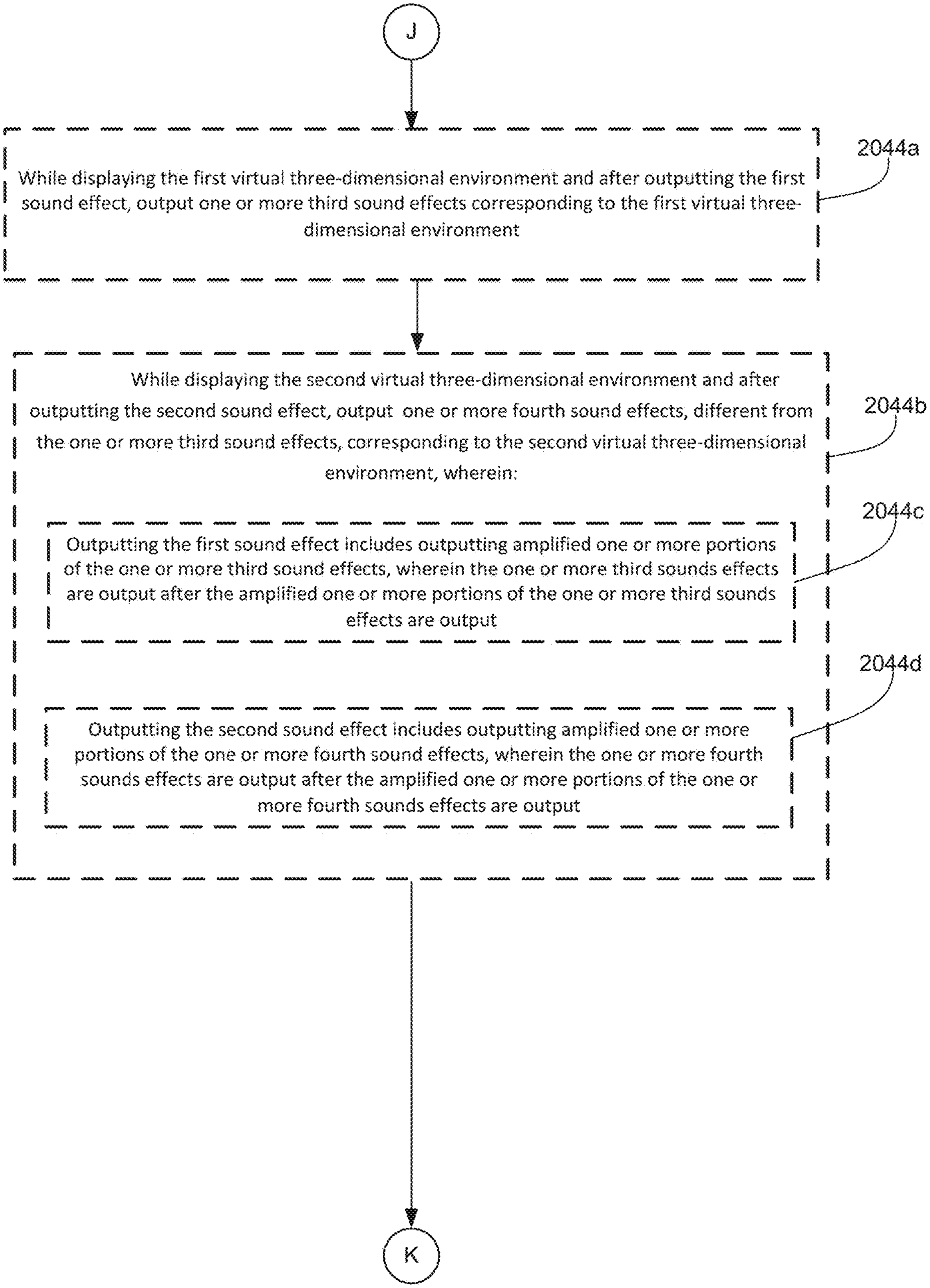
Figure 20L:
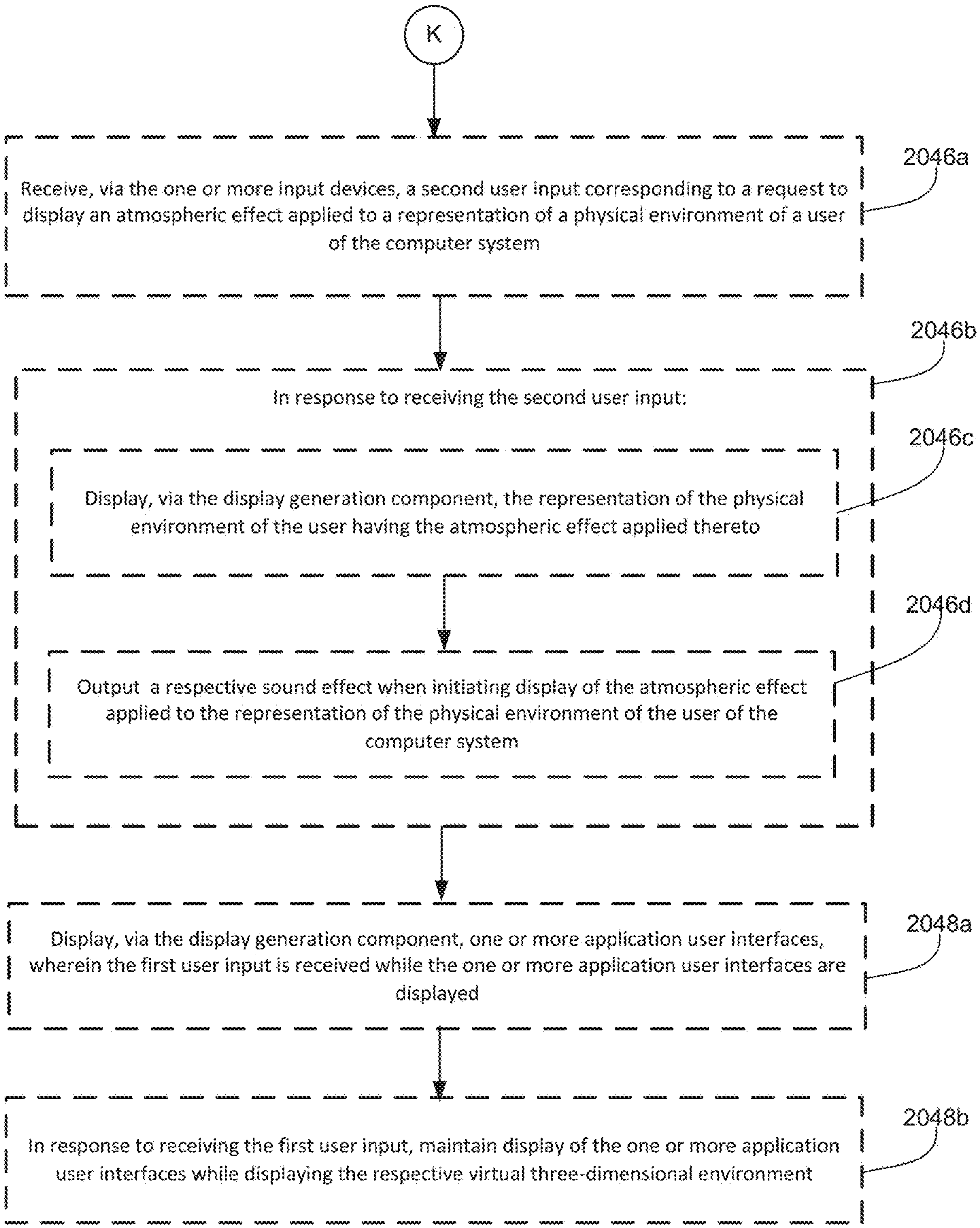

In response to receiving the input for applying the second time of day in FIG. 19H, the computer system 101 updates a visual appearance of the virtual environment 1947 from the first time of day (e.g., daytime) to a second time of day (e.g., nighttime) from FIG. 19H to FIG. 19I. For example, the visual appearance of the virtual environment 1947 is darkened (as illustrated by the diagonal pattern in FIG. 19I) and/or includes virtual moon and stars 1939 corresponding to the second time of day (e.g., nighttime) rather than the virtual sun 1940. In particular, the virtual environment 1947 is optionally updated to be the same simulated physical space as before, but with a visual appearance corresponding to that physical space during nighttime rather than that physical space during daytime. In some embodiments, the computer system 101 dims (e.g., darkens) portions of the physical environment (as illustrated by the dotted pattern in FIG. 19I) displayed and/or visible in the three-dimensional environment 1904. In some embodiments, the computer system 101 outputs a sound effect (e.g., eighth sound effect different from the first sound effect, the second sound effect, the third sound effect, the fourth sound effect, the fifth sound effect, the sixth sound effect, and/or the seventh sound effect) when switching from displaying the virtual environment 1947 at the first time of day to the second time of day. Further, from FIG. 19H to 19I, the immersion level remains the same despite the change in time of day. Accordingly, as shown in the overhead view 1918, at the immersion level (e.g., partial immersion as indicated by the immersion level indicator) for virtual environment 1947 displayed in FIG. 19I, the virtual environment 1947 optionally extends from the boundary 1913*a* (e.g., same as in FIGS. 19A and 19H) to the far wall 1914 in three-dimensional environment 1904. In some embodiments and as illustrated in FIGS. 19A-19I, the computer system 101 maintains display of the virtual content 1908 while displaying different virtual environments, displaying different atmospheric effects, and/or outputting different sound effects. In some embodiments, the computer system 101 ceases display of the virtual content 1908 when displaying a different virtual environment, displaying a different atmospheric effect, and/or outputting a different sound effect (e.g., when not needed).

FIGS. 20A-20L depict a flowchart illustrating a method 2000 of outputting a different sound effect when initiating display of different virtual three-dimensional environments in accordance with some embodiments. In some embodiments, the method 2000 is performed at a computer system (e.g., computer system 101 in FIG. 1 such as a tablet, smartphone, wearable computer, or head-mounted device) including a display generation component (e.g., display generation component 120 in FIGS. 1, 3, and/or 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 2000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 2000 are, optionally, combined and/or the order of some operations is, optionally, changed.

In some embodiments, the method 2000 is performed at a computer system, such as computer system 101 in FIG. 1, in communication with a display generation component and one or more input devices. In some embodiments, the computer system has one or more of the characteristics of the computer systems of methods 800, 1000, 1200, 1400, 1600, and/or 1800. In some embodiments, the display generation component has one or more of the characteristics of the display generation component of methods 800, 1000, 1200, 1400, 1600, and/or 1800. In some embodiments, the one or more input devices have one or more of the characteristics of the one or more input devices of methods 800, 1000, 1200, 1400, 1600, and/or 1800.

In some embodiments, the computer system receives (2002*a*), via the one or more inputs devices, a first user input corresponding to a request to display a respective virtual three-dimensional environment, such as input from hand 1920*b* directed to selectable option 1908*b* in FIG. 19A. In some embodiments, the first user input has one or more characteristics of the first input of method 1000 and/or an input to display an environment in method 1200. In some embodiments, the first user input includes a selection input directed to an icon or selectable option corresponding to the respective virtual three-dimensional environment from an environment selection user interface. In some embodiments, the first user input is based on depression of a physical button on the computer system or rotation of a physical dial on the computer system. For example, rotating the physical dial by varying degrees optionally initiates display of different environments and/or changes an immersion level of the respective virtual three-dimensional environment, such as described with reference to method 1400. In some embodiments, the respective virtual three-dimensional environment has one or more characteristics of (virtual) environments described with respect to methods 800, 1000, 1200, 1400, 1600, and/or 1800.

In some embodiments, in response to receiving the first user input (2002*b*), the computer system displays (2002*c*), via the display generation component, the respective virtual three-dimensional environment, including in accordance with a determination that the respective virtual three-dimensional environment is a first virtual three-dimensional environment, such as virtual environment 1945 in FIG. 19A, the computer system outputs a first sound effect, such as sound effect in FIG. 19C (e.g., corresponding to the first virtual three-dimensional environment), when initiating display of the first virtual three-dimensional environment. For example, if the first virtual three-dimensional environment is a virtual desert, then the computer system outputs a sand whooshing sound when initiating display of the virtual desert. The computer system optionally does not output a second sound effect corresponding to a second virtual three-dimensional environment described below when initiating display of the first virtual three-dimensional environment.

In some embodiments, in response to receiving the first user input (2002*b*), the computer system displays (2002*c*), via the display generation component, the respective virtual three-dimensional environment, including in accordance with a determination that the respective virtual three-dimensional environment is a second virtual three-dimensional environment, such as virtual environment 1947 in FIG. 19H, different from the first virtual three-dimensional environment, outputting a second sound effect, such as sound effect in FIGS. 19H and 19H1 (e.g., corresponding to the second virtual three-dimensional environment) different from the first sound effect when initiating display of the second virtual three-dimensional environment. For example, if the second virtual three-dimensional environment is a virtual beach, then the computer system outputs sound of waves when initiating display of the virtual beach. The computer system optionally does not output the first sound effect when initiating display of the second virtual three-dimensional environment. In some embodiments, the computer system does not output the first sound effect and/or the second sound effect before receiving the first user input. The first sound effect and/or the second sound effect optionally increase in volume as the first virtual three-dimensional environment and/or second virtual three-dimensional environment are gradually displayed via the display generation component. For example, the first sound effect and/or the second sound effect are optionally at a maximum volume when the first virtual three-dimensional environment and/or second virtual three-dimensional environment are fully displayed. The first sound effect and/or the second sound effect are optionally at a minimum volume when the computer system initially begins displaying the first virtual three-dimensional environment and/or second virtual three-dimensional environment. In some embodiments, the computer system ceases outputting the first sound effect and/or the second sound effect after the first virtual three-dimensional environment and/or the second virtual three-dimensional environment are fully displayed in accordance with the first user input. In some embodiments, the computer system outputs the first sound effect and/or the second sound effect for a threshold amount of time (e.g., 0.5, 1, 2, 3, 5, or 10 s) while initiating display of the first virtual three-dimensional environment and/or the second virtual three-dimensional environment. In some embodiments, the computer system outputs the first sound effect and/or the second sound effect for longer than the threshold amount of time after the first virtual three-dimensional environment and/or second virtual three-dimensional environment are fully displayed in accordance with the first user input. Outputting audio in response to initiating display of a respective virtual three-dimensional environment provides auditory feedback that the respective virtual three-dimensional environment has been selected, thereby improving user-device interaction.

In some embodiments, outputting the first sound effect includes outputting one or more first sound effects based on one or more first ambient sound effects corresponding to the first virtual three-dimensional environment, such as one or more ambient sound effects corresponding to the virtual environment 1945 in FIG. 19C (e.g., one or more sound effects that occur periodically while the first virtual three-dimensional environment is displayed) when initiating display of the first virtual three-dimensional environment, and wherein outputting the second sound effect includes outputting one or more second sound effects, different from the one or more first sound effects, based on one or more second ambient sound effects, such as one or more ambient sound effects corresponding to the virtual environment 1947 in FIGS. 19H and 19H1 (e.g., one or more sound effects that occur periodically while the first virtual three-dimensional environment is displayed) different from the one or more first ambient sound effects and corresponding to the second virtual three-dimensional environment when initiating display of the second virtual three-dimensional environment (2004). In some embodiments, the one or more first or second ambient sound effects include one or more sound effects that occur automatically while the first or second virtual three-dimensional environment are displayed. For example, if the first virtual three-dimensional environment is a virtual desert, then the computer system outputs a sand whooshing sound and/or a hissing sound from rattlesnakes based on ambient sounds corresponding to the virtual desert. For example, if the second virtual three-dimensional environment is a virtual beach, then the computer system outputs sound of waves and/or a squawking sound from seagulls based on ambient sounds corresponding to the virtual beach. In some embodiments, the one or more first or second ambient sounds exist in steady-state of the first of second virtual three-dimensional environments, and the one or more first or second ambient sounds are output even after outputting the first sound effect or the second sound effect when initiating display of the first of second virtual three-dimensional environments (e.g., ambient sounds effects corresponding to the a virtual three-dimensional environment are maintained even after an entry sound effect for entering a virtual three-dimensional environment has been output). Steady-state of the first or second virtual three-dimensional environment optionally includes additional sound effects that do not affect or are not included in the first or second sound effect when entering the first or second virtual three-dimensional environment. Outputting audio based on ambient sounds corresponding to a respective virtual three-dimensional environment when initiating display of the respective virtual three-dimensional environment provides auditory feedback that the respective virtual three-dimensional environment has been selected, thereby improving user-device interaction.

In some embodiments, outputting the first sound effect includes outputting the first sound effect with spatialized audio with a simulated position relative to a viewpoint of a user that moves in conjunction with a change in appearance (e.g., change in level of immersion, change in position, change in opacity, and/or change in size) of the first virtual three-dimensional environment when initiating display of the first virtual three-dimensional environment, such as outputting sound effect with spatialized audio if the virtual environment 1945 were to change in appearance in FIG. 19C, and wherein outputting the second sound effect includes outputting the second sound effect with spatialized audio with a simulated position relative to the viewpoint of the user that moves in conjunction with a change in appearance (e.g., change in level of immersion, change in position, change in opacity, and/or change in size) of the second virtual three-dimensional environment (2006), such as outputting sound effect with spatialized audio if the virtual environment 1947 were to change in appearance in FIGS. 19H and 19H1. In some embodiments, a respective sound effect (e.g., one or more first or second sound effects) is generated by the computer system such as if it is emanating from a location of physical object and/or a location of virtual content corresponding to a virtual object in the three-dimensional environment, and is optionally not generated as if it is emanating from a location that does not correspond to the physical object. Therefore, in some embodiments, the direction from which the respective sound effect is generated (optionally relative to the first virtual content) is different depending on the location of the physical object relative to the virtual content. In some embodiments, the respective sound effect is or includes audio (e.g., one or more first or second ambient sound effects) generated by a respective physical object. In some embodiments, movement of the spatialized audio does not correspond to a spatial movement of a respective virtual three-dimensional environment. For example, the spatialized audio optionally moves in conjunction with the respective virtual three-dimensional environment fading in rather than moving relative to a viewpoint of the user. For example, the spatialized audio optionally moves in a direction opposite of the movement of the respective virtual three-dimensional environment. In some embodiments, movement of the spatialized audio does not correspond to a spatial movement of a respective virtual three-dimensional environment. In some embodiments, spatial movement (e.g., angular position) of the first sound effect or the second sound effect depends on spatial movement (e.g., angular position) of the first or second virtual three-dimensional environment relative to a field of view displayed via the display generation. In some embodiments, when initiating display of the first or second virtual three-dimensional environment (e.g., minimum level of the field of view consumed by the first or second virtual three-dimensional environment and/or the first or second virtual three-dimensional environment is retracted or far from the viewpoint of the user), the first sound effect or the second sound effect is output with a simulated location at a position and/or direction far away from the viewpoint of the user (e.g., optionally output with a simulated location that corresponds to a position where the first or second virtual three-dimensional environment is initially displayed) such that the first sound effect or the second sound effect appears to be at a lower volume to the user. As the first or second virtual three-dimensional environment gradually consumes a larger portion of the field of view (and/or the first or second virtual three-dimensional moves closer to the viewpoint of the user), the first sound effect or the second sound effect is optionally output with a simulated location closer to the viewpoint of the user (e.g., optionally output at location where the first or second virtual three-dimensional environment is partially or fully displayed) such that the first sound effect or the second sound effect appears louder to the user. In some embodiments, when the first or second virtual three-dimensional environment is fully displayed (e.g., maximum level of the field of view consumed by the first or second virtual three-dimensional environment), the first sound effect or the second sound effect is optionally output with a simulated location that is close to the viewpoint of the user such that the first sound effect or the second sound effect appears to be at a higher volume. In some embodiments, the first sound effect or the second sound effect are output at a certain angle relative to the viewpoint of the user based on the angle at which the first or second virtual three-dimensional environment is displayed relative to the viewpoint of the user. In some embodiments, if a viewpoint of the user is at a first angle relative to the first or second virtual three-dimensional environments, the computer system outputs the first or second sound effect with spatialized audio that is placed at and/or moves at a simulated position having the first angle (e.g., 1, 15, 30, 90, 180, or 360 degrees) relative to the viewpoint. In some embodiments, if a viewpoint of the user is at a second angle different from the first angle relative to the first or second virtual three-dimensional environments, the computer system outputs the first or second sound effect with spatialized audio that is placed at and/or moves at a simulated position having the second angle (e.g., 1, 15, 30, 90, 180, or 360 degrees) relative to the viewpoint. In some embodiments, the increase in display of the first or second virtual three-dimensional environment corresponds to an increase in immersion level as described with reference to step(s) 2008. For example, when initiating display of the first or second virtual three-dimensional environment and/or far from the viewpoint of the user, the first or second virtual three-dimensional environment is optionally displayed with low immersion. As the first or second virtual three-dimensional environment moves closer to the viewpoint of the user, the immersion level of the first or second virtual three-dimensional environment optionally increases. For example, when the first or second virtual three-dimensional environment is more fully displayed and/or closer to the viewpoint of the user, the first or second virtual three-dimensional environment is optionally displayed with higher level of immersion. Outputting audio with spatial movement corresponding to spatial movement of a respective virtual three-dimensional environment provides auditory feedback indicative of changes in movement of the respective virtual three-dimensional environment relative to the viewpoint of the user (e.g., respective virtual three-dimensional environment appearing as audio output farther away from the user), thereby improving user-device interaction.

In some embodiments, while displaying, via the display generation component, the respective virtual three-dimensional environment at a first level of immersion, the computer system receives (2008*a*), via the one or more input devices, a second user input (e.g., having one or more characteristics of the first user input) corresponding to a request to change a level of immersion of the respective virtual three-dimensional environment, such as input from hand 1920*c* directed to physical button 1950*a* in FIG. 19C. In some embodiments, the first level of immersion has one or more of the characteristics of the level of immersion of methods 1400 and/or 1600. For example, a level of immersion includes an associated degree to which the respective virtual three-dimensional environment displayed by the computer system obscures background content (e.g., the three-dimensional environment including the physical environment) around/behind virtual content, optionally including the number of items of background content displayed and the visual characteristics (e.g., colors, contrast, and/or opacity) with which the background content is displayed, and/or the angular range of the content displayed via the display generation component (e.g., 60 degrees of content displayed at low immersion, 120 degrees of content displayed at medium immersion, and/or 180 degrees of content displayed at high immersion), and/or the proportion of the field of view displayed via the display generation consumed by the respective virtual three-dimensional environment (e.g., 33% of the field of view consumed by the respective virtual three-dimensional environment at low immersion, 66% of the field of view consumed by the respective virtual three-dimensional environment at medium immersion, and/or 100% of the field of view consumed by the respective virtual three-dimensional environment at high immersion). In some embodiments, at a first (e.g., high) level of immersion, the background, virtual and/or real objects are displayed in an obscured manner. For example, a respective virtual three-dimensional environment with a high level of immersion is displayed without concurrently displaying the background content (e.g., in a full screen or fully immersive mode). In some embodiments, at a second (e.g., low) level of immersion, the background, virtual and/or real objects are displayed in an obscured manner (e.g., dimmed, blurred, and/or removed from display). For example, a respective virtual three-dimensional environment with a low level of immersion is optionally displayed concurrently with the background content, which is optionally displayed with full brightness, color, and/or translucency. As another example, a respective virtual three-dimensional environment displayed with a medium level of immersion is optionally displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a level of immersion of the respective virtual three-dimensional environment corresponds a distance of the respective virtual three-dimensional environment from the viewpoint of the user. For example, a higher immersion corresponds to the respective virtual three-dimensional environment optionally displayed closer to the viewpoint of the user. For example, a lower immersion corresponds to the respective virtual three-dimensional environment optionally displayed farther from the viewpoint of the user. In some embodiments, the request to change the level of immersion of the respective virtual three-dimensional environment includes the second user input from a button or manipulation of a rotational element, such as a mechanical dial or a virtual dial, of or in communication with the computer system. In some embodiments, the second user input includes a selection of a selectable option displayed in the respective virtual three-dimensional environment and/or a manipulation of a displayed control element to change the immersion level of the computer system and/or the respective virtual three-dimensional environment. In some embodiments, the second user input includes a predetermined gesture (e.g., an air gesture) recognized as a request to change the immersion level of the computer system and/or the respective virtual three-dimensional environment. In some embodiments, the second user input includes a predetermined gesture (e.g., an air gesture) recognized as a request to change the immersion level of the respective virtual three-dimensional environment. For example, the second user input optionally includes a hand of a user of the computer system performing a pinch air gesture in which the index finger and thumb of the hand of the user come together and touch while attention of the user is directed to the selectable option for changing (e.g., increasing or decreasing) the level of immersion. In some embodiments, the control element is a slider-bar where a finger of the user can contact the slider-bar and manually adjust the immersion level. In another example, attention directed at the slider-bar and an air tap in space followed by movement of the hand of the user optionally causes adjustment of the slider bar for immersion. In another example, attention directed at the slider-bar and an air pinch gesture performed by a hand of the user, followed by movement of the hand while maintaining the air pinch hand shape, optionally causes adjustment of the slider-bar for immersion.

In some embodiments, in response to receiving the second user input (2008*b*), the computer system displays (2008*c*) the respective virtual three-dimensional environment at a second level of immersion, such as an increased level of immersion of virtual environment 1945 in FIG. 19D, different from the first level of immersion, in accordance with the second input. For example, the computer system increases or decreases the level of immersion of the computer system and/or the respective virtual three-dimensional environment. In some embodiments, as similarly described above, an increase in the level of immersion increases the proportion of the field of view visible via the display generation that is consumed by the respective virtual three-dimensional environment or the other virtual content. For example, portions of a three-dimensional environment (including the physical environment surrounding the display generation component) in the field of view of the user are obscured (e.g., no longer displayed/visible) when the level of immersion increases for the respective virtual three-dimensional environment. Additionally, in some embodiments, a decrease in the level of immersion decreases the proportion of the field of view visible via the display generation component that is consumed by the respective virtual three-dimensional environment or the other virtual content. For example, portions of the three-dimensional environment (including the physical environment surrounding the display generation component) in the field of view of the user are unobscured (e.g., displayed/visible) when the level of immersion decreases for the respective virtual three-dimensional environment. In some embodiments, the computer system changes the level of immersion for the respective virtual three-dimensional environment without moving, shifting, or obscuring the object in the three-dimensional environment.

In some embodiments, in response to receiving the second user input (2008*b*), the computer system outputs (2008*d*) a respective sound effect when changing the level of immersion of the respective virtual three-dimensional environment, such as outputting sound effect when increased the level of immersion of the virtual environment 1945 in FIG. 19D. In some embodiments, the respective sound effect output when changing the level of immersion of the respective virtual three-dimensional environment to the second level of immersion is different from the sound effect output when initiating display of the respective virtual three-dimensional environment at the first level of immersion. For example, if the respective virtual three-dimensional environment is a virtual desert, then the computer system optionally outputs a sand whooshing sound when initiating display of the respective virtual three-dimensional environment at the first level of immersion. The computer system optionally outputs a hissing sound from rattlesnakes when changing the level of immersion of the virtual desert to the second level of immersion. In some embodiments, the respective sound effect output when changing the level of immersion of the respective virtual three-dimensional environment to the second level of immersion is the same as the sound effect output when initiating display of the respective virtual three-dimensional environment at the first level of immersion. Outputting audio when changing a level of immersion of a respective virtual three-dimensional environment provides auditory feedback or confirmation that the level of immersion of the respective virtual three-dimensional environment has indeed changed, thereby improving user-device interaction.

In some embodiments, outputting the respective sound effect when changing the level of immersion of the respective virtual three-dimensional environment includes (2010*a*) in accordance with a determination that the respective virtual three-dimensional environment is the first virtual three-dimensional environment, such as virtual environment 1945 in FIG. 19D (e.g., a virtual desert or a virtual forest), outputting a respective sound effect corresponding to changing the level of immersion (e.g., a bell ringing, sound from wind chimes, or a sound different from the sound effect output (e.g., sand whooshing or birds chirping) when initiating display of the first virtual three-dimensional environment) when changing a level of immersion, such as outputting a sound effect when increasing the immersion level in FIG. 19D, of the first virtual three-dimensional environment (2010*b*).

In some embodiments, outputting the respective sound effect when changing the level of immersion of the respective virtual three-dimensional environment includes (2010*a*) in accordance with a determination that the respective virtual three-dimensional environment is the second virtual three-dimensional environment, such as if virtual environment 1947 were displayed in FIG. 19D (e.g., a virtual beach or a virtual city), outputting the respective sound effect corresponding to changing the level of immersion (e.g., a bell ringing, sound from wind chimes, or a sound different from the sound effect output (e.g., sound of waves or sound from construction work) when initiating display of the second virtual three-dimensional environment) when changing a level of immersion, such as outputting the same sound effect when increasing the immersion level in FIG. 19D, of the second virtual three-dimensional environment (2010*c*).

In some embodiments, the sound effect output when changing the level of immersion of the respective virtual three-dimensional environment is independent of ambient sound effects corresponding to the respective virtual three-dimensional environment. Outputting the same audio when changing a level of immersion for various virtual three-dimensional environments provides auditory feedback or confirmation that the level of immersion of a virtual three-dimensional environment has indeed changed, thereby improving user-device interaction.

In some embodiments, outputting the respective sound effect when changing the level of immersion of the respective virtual three-dimensional environment includes (2012*a*) in accordance with a determination that the respective virtual three-dimensional environment is the first virtual three-dimensional environment, such as virtual environment 1945 in FIG. 19D (e.g., a virtual desert or a virtual forest), outputting a first sound effect corresponding to changing the level of immersion, such as outputting a sound effect when increasing the immersion level in FIG. 19D (e.g., a hissing sound from rattlesnakes or a tiger roaring) (e.g., and different from the sound effect output (e.g., sand whooshing or birds chirping) when initiating display of the first virtual three-dimensional environment) of the first virtual three-dimensional environment (2012*b*).

In some embodiments, outputting the respective sound effect when changing the level of immersion of the respective virtual three-dimensional environment includes (2012*a*) in accordance with a determination that the respective virtual three-dimensional environment is the second virtual three-dimensional environment, such as virtual environment 1947 in FIGS. 19H and 19H1 (e.g., a virtual beach or a virtual city), outputting a second sound effect corresponding to changing the level of immersion of the second virtual three-dimensional environment (e.g., a squawking sound from seagulls or cars honking) different from the first sound effect corresponding to changing the level of immersion (e.g., and different from the sound effect output (e.g., sound of waves or sound from construction work) when initiating display of the second virtual three-dimensional environment), such as outputting a different sound effect if immersion level was increased in FIGS. 19H and 19H1 compared to FIG. 19D, of the first virtual three-dimensional environment (2012*c*). In some embodiments, the sound effect output when changing the level of immersion of the respective virtual three-dimensional environment is based on ambient sound effects corresponding to the respective virtual three-dimensional environment. Outputting different audio when changing level of immersion of different virtual three-dimensional environments provides auditory feedback or confirmation indicating for which respective virtual three-dimensional environment the level of immersion has changed, thereby improving user-device interaction.

In some embodiments, outputting the respective sound effect when changing the level of immersion of the respective virtual three-dimensional environment includes (2014*a*) in accordance with a determination that the second input corresponds to a request to increase the level of immersion of the respective virtual three-dimensional environment (e.g., a virtual desert or a virtual forest), outputting a respective sound effect (e.g., a bell ringing, hissing sound from rattlesnakes, or a tiger roaring) corresponding to increasing the level of immersion of the respective virtual three-dimensional environment (2014*b*), such as outputting sound effect when increasing immersion level of the virtual environment 1945 in FIG. 19D.

In some embodiments, outputting the respective sound effect when changing the level of immersion of the respective virtual three-dimensional environment includes (2014*a*) in accordance with a determination that the second input corresponds to a request to decrease the level of immersion of the respective virtual three-dimensional environment, outputting a respective sound effect (e.g., sound of wind chimes or sound of a lizard) corresponding to decreasing the level of immersion of the respective virtual three-dimensional environment, different from the respective sound effect corresponding to decreasing the level of immersion of the respective virtual three-dimensional environment (2014*c*), such as outputting different sound effect in FIG. 19F when decreasing immersion level of the virtual environment 1945 compared to sound effect in FIG. 19D. In some embodiments, the sound effect output when increasing or decreasing the level of immersion of the respective virtual three-dimensional environment is independent of ambient sound effects corresponding to the respective virtual three-dimensional environment. In some embodiments, the sound effect output when increasing or decreasing the level of immersion of the respective virtual three-dimensional environment depends on ambient sound effects corresponding to the respective virtual three-dimensional environment. In some embodiments, the sound effect output when increasing or decreasing the level of immersion of the respective virtual three-dimensional environment is different from the sound effect when initiating display of the respective virtual three-dimensional environment. In some embodiments, even if the initial immersion level of the respective virtual three-dimensional environment corresponds to a particular immersion level (e.g., mid-point immersion level or 50% of the field of view consumed by the respective virtual three-dimensional environment), the computer system outputs different sound effects when increasing immersion compared to decreasing immersion from the initial immersion level. Outputting different audio when increasing a level of immersion compared to decreasing the level of immersion of a respective virtual three-dimensional environment provides auditory feedback or confirmation that the level of immersion of the respective virtual three-dimensional environment has increased or decreased, thereby improving user-device interaction.

In some embodiments, outputting the respective sound effect when changing the level of immersion of the respective virtual three-dimensional environment includes (2016*a*) in accordance with a determination that the second input, such as input from hand 1920*d* in FIG. 19D, corresponds to a request to display the respective virtual three-dimensional environment at a maximum level of immersion of the respective virtual three-dimensional environment, outputting a respective sound effect corresponding to the maximum level of immersion of the respective virtual three-dimensional environment (2016*b*), such as outputting sound effect corresponding to maximum level of immersion of the virtual environment 1945 in FIG. 19E.

In some embodiments, outputting the respective sound effect when changing the level of immersion of the respective virtual three-dimensional environment includes (2016*a*) in accordance with a determination that the second input, such as input from hand 1920*e* in FIG. 19E, corresponds to a request to display the respective virtual three-dimensional environment at a minimum level of immersion of the respective virtual three-dimensional environment, outputting a respective sound effect corresponding to the minimum level of immersion of the respective virtual three-dimensional environment (2016*c*), such as outputting sound effect corresponding to minimum level of immersion of the virtual environment 1945 in FIG. 19F. In some embodiments, the sound effect output when displaying the respective virtual three-dimensional environment at a maximum or minimum level of immersion is independent of ambient sound effects corresponding to the respective virtual three-dimensional environment. In some embodiments, the sound effect output when displaying the respective virtual three-dimensional environment at a maximum or minimum level of immersion depends on ambient sound effects corresponding to the respective virtual three-dimensional environment. In some embodiments, the sound effect output when displaying the respective virtual three-dimensional environment at a maximum level of immersion is the same as the sound effect output when displaying the respective virtual three-dimensional environment at a minimum level of immersion. In some embodiments, the sound effect output when displaying the respective virtual three-dimensional environment at a maximum or minimum level of immersion is different from the sound effect output when increasing or decreasing the level of immersion of the respective virtual three-dimensional environment. In some embodiments, the sound effect output when displaying the respective virtual three-dimensional environment at a maximum or minimum level of immersion is different from the sound effect output when initiating display of the respective virtual three-dimensional environment. In some embodiments, the respective virtual three-dimensional environment defines the maximum or minimum levels of immersion. In some embodiments, the maximum and/or minimum levels of immersion are the same for different respective virtual three-dimensional environments. In some embodiments, the maximum and/or minimum levels of immersion are different for different respective virtual three-dimensional environments. Outputting audio when a respective virtual three-dimensional environment is displayed at a maximum or minimum level of immersion provides auditory feedback or confirmation when the level of immersion of the respective virtual three-dimensional environment is at a maximum or minimum level, thereby improving user-device interaction.

In some embodiments, the respective sound effect corresponding to the maximum level of immersion of the respective virtual three-dimensional environment is different from the respective sound effect corresponding to the minimum level of immersion of the respective virtual three-dimensional environment (2018), such as sound effect in FIG. 19E is different from the sound effect in FIG. 19F. Outputting different audio for a maximum level of immersion compared to a minimum level of immersion of a respective virtual three-dimensional environment provides auditory feedback or confirmation of whether the respective virtual three-dimensional environment corresponds to a maximum or a minimum level of immersion, thereby improving user-device interaction.

In some embodiments, the respective virtual three-dimensional environment has a respective visual appearance (e.g., a size, a brightness, an opacity, a level of clarity (or blurriness) and/or a level of immersion) corresponding to a first time of day in a physical space simulated by the respective virtual three-dimensional environment (2020*a*), such as Mode 1 of the virtual environment 1947 in FIGS. 19H and 19H1 (e.g., the first time of day optionally corresponds to a simulated time of the day such as light mode (e.g., 10:00 AM in the morning when it is partly cloudy and sunny, or 3:00 PM in the afternoon when it is clear and sunny)). For example, the respective visual appearance at the first time of day optionally includes a first brightness, a first opacity, a first level of clarity (or blurriness), and/or a first amount of virtual objects (e.g., rainbows, sunlight rays, and/or birds flying) corresponding to the appearance of the simulated physical space at the first time of day.

In some embodiments, while displaying the respective virtual three-dimensional environment with the respective visual appearance corresponding to the first time of day, the computer system receives (2020*b*), via the one or more input devices, a second user input, such as input from hand 1920*g* in FIGS. 19H and 19H1 (e.g., having one or more of the characteristics of the first user input) corresponding to a request to change the respective visual appearance from corresponding to the first time of day to corresponding to a second time of day (e.g., the second time of day optionally corresponds to a simulated time of the day such as a dark mode (e.g., 11:00 PM in the evening when the sun has set and the moon and stars are shining in the sky)), different from the first time of day, in the physical space simulated by the respective virtual three-dimensional environment. In some embodiments, the request to change the respective visual appearance from corresponding to the first time of day to corresponding to the second time of day includes manipulation of a virtual toggle that switches between the first time of day and the second time of day. In some embodiments, the input includes a selection of a selectable option displayed in the respective virtual three-dimensional environment and/or a manipulation of a displayed control element to change the respective visual appearance from corresponding to the first time of day to corresponding to a second time of day. In some embodiments, the second user input includes a predetermined gesture (e.g., an air gesture) recognized as a request to cease display of the respective virtual three-dimensional environment. For example, the second user input optionally includes a hand of a user of the computer system performing a pinch air gesture in which the index finger and thumb of the hand of the user come together and touch while attention of the user is directed to the selectable option for ceasing display of the respective virtual three-dimensional environment or displaying another virtual three-dimensional environment. In another example, air tapping a control element for ceasing display of the respective virtual three-dimensional environment or displaying another virtual three-dimensional environment optionally ceases display of the respective virtual three-dimensional environment.

In some embodiments, in response to receiving the second user input (2020*c*), the computer system displays (2020*d*) the respective virtual three-dimensional environment with the respective visual appearance corresponding to the second time of day, such as displaying Mode 2 of the virtual environment 1947 in FIG. 19I. For example, the respective visual appearance at the second time of day optionally corresponds to a second size in the three-dimensional environment, a second brightness (or second darkness), a second opacity, a second level of clarity (or blurriness) and/or a second level of immersion. In some embodiments, the respective visual appearance at the second time of day is associated with a darker visual appearance than the respective visual appearance at the first time of day. In some embodiments, the respective visual appearance at the second time of day is associated with a second amount of virtual objects in the respective virtual three-dimensional environment that correspond to a darker visual appearance (e.g., moon and stars shining in the sky) corresponding to the appearance of the simulated physical space at the second time of day. In some embodiments, the respective visual appearance at the first time of day is associated with a brighter (e.g., more intensity) and/or lighter display value than the respective visual appearance at the second time of day.

In some embodiments, in response to receiving the second user input (2020*c*), the computer system outputs (2020*c*) a respective sound effect (e.g., crickets chirping or sound from a night owl) when changing the respective visual appearance from corresponding to the first time of day to corresponding to the second time of day in the physical space simulated by respective virtual three-dimensional environment, such as outputting sound effect in FIG. 19I. In some embodiments, the sound effect output when changing the respective visual appearance from corresponding to the first time of day to corresponding to the second time of day is different from the sound effect output when initiating display of the respective virtual three-dimensional environment. In some embodiments, the sound effect output when changing the respective visual appearance from corresponding to the first time of day to corresponding to the second time of day is different from the sound effect output when changing the level of immersion (e.g., increasing level of immersion, maximum level of immersion, decreasing level of immersion, or minimum level of immersion) of the respective virtual three-dimensional environment. In some embodiments, the computer system outputs a different sound effect (e.g., birds chirping or an alarm beeping) when changing the respective visual appearance from corresponding to the second time of day to corresponding to the first time of day compared to changing the respective visual appearance from corresponding to the first time of day to corresponding to the second time of day. In some embodiments, the sound effect output when changing the respective visual appearance from corresponding to the second time of day to corresponding to the first time of day is different from the sound effect output when initiating display of the respective virtual three-dimensional environment and/or changing the level of immersion of the respective virtual three-dimensional environment. Outputting audio when changing the respective visual appearance from corresponding to the first time of day to corresponding to the second time of day provides auditory feedback or confirmation that the respective visual appearance has indeed changed from corresponding to the first time of day to corresponding to the second time of day, thereby improving user-device interaction.

In some embodiments, outputting the respective sound effect when changing the respective visual appearance from corresponding to the first time of day to corresponding to the second time of day in the physical space simulated by the respective virtual three-dimensional environment includes (2022*a*) in accordance with a determination that the respective virtual three-dimensional environment is the first virtual three-dimensional environment (e.g., a virtual desert or a virtual forest), outputting a respective sound effect corresponding to changing the respective visual appearance (e.g., sound of crickets chirping or sound from bats) from corresponding to the first time of day to corresponding to the second time of day in the physical space simulated by first virtual three-dimensional environment (2022*b*), such as outputting sound effect in FIG. 19I when displaying Mode 2 of the virtual environment 1947 in FIG. 19I.

In some embodiments, outputting the respective sound effect when changing the respective visual appearance from corresponding to the first time of day to corresponding to the second time of day in the physical space simulated by the respective virtual three-dimensional environment includes (2022*a*) in accordance with a determination that the respective virtual three-dimensional environment is the second virtual three-dimensional environment (e.g., a virtual beach or a virtual city), outputting the respective sound effect corresponding to changing the respective visual appearance (e.g., sound of crickets chirping or sound from bats) from corresponding to the first time of day to corresponding to the second time of day in the physical space simulated by the second virtual three-dimensional environment (2022*c*), such as outputting the same sound effect in FIG. 19I if Mode 2 of the virtual environment 1945 was displayed in FIG. 19I. In some embodiments, the sound effect output when changing the respective visual appearance from corresponding to the first time of day to corresponding to the second time of day is independent of ambient sound effects corresponding to the respective virtual three-dimensional environment. Outputting the same audio when changing the respective visual appearance from corresponding to the first time of day to corresponding to the second time of day provides auditory feedback or confirmation that respective visual appearance has indeed changed from the first time of day to the second time of day, thereby improving user-device interaction.

In some embodiments, outputting the respective sound effect when changing the respective visual appearance from corresponding to the first time of day to corresponding to the second time of day in the physical space simulated by the respective virtual three-dimensional environment includes (2024*a*) in accordance with a determination that the respective virtual three-dimensional environment is the first virtual three-dimensional environment (e.g., a virtual desert or a virtual forest), outputting a first sound effect corresponding to changing the respective visual appearance (e.g., sound from a night owl or sound of leaves rustling) from corresponding to the first time of day to corresponding to the second time of day in the physical space simulated by the first virtual three-dimensional environment (2024*b*), such as outputting sound effect in FIG. 19I when displaying Mode 2 of the virtual environment 1947 in FIG. 19I.

In some embodiments, outputting the respective sound effect when changing the respective visual appearance from corresponding to the first time of day to corresponding to the second time of day in the physical space simulated by the respective virtual three-dimensional environment includes (2024*a*) in accordance with a determination that the respective virtual three-dimensional environment is the second virtual three-dimensional environment (e.g., a virtual beach or a virtual city), outputting a second sound effect corresponding to changing the respective visual appearance (e.g., sound from waves crashing on the shore or sound of sirens) from corresponding to the first time of day to corresponding to the second time of day in the physical space simulated by the second virtual three-dimensional environment different from the first sound effect corresponding to changing the respective visual appearance from corresponding to the first time of day to corresponding to the second time of day in the physical space simulated by the first virtual three-dimensional environment, such as outputting a different sound effect in FIG. 19I if Mode 2 of the virtual environment 1945 was displayed in FIG. 19I (2024*c*). In some embodiments, the sound effect output when changing the respective visual appearance from corresponding to the first time of day to corresponding to the second time of day is based on ambient sound effects corresponding to the respective virtual three-dimensional environment. Outputting different audio when changing the respective visual appearance from corresponding to the first time of day to corresponding to the second time of day for different virtual three-dimensional environments provides auditory feedback or confirmation indicating for which respective virtual three-dimensional environment the respective visual appearance has changed from the first time of day to the second time of day, thereby improving user-device interaction.

In some embodiments, while displaying the respective virtual three-dimensional environment, the computer system receives (2026*a*), via the one or more input devices, a second user input (e.g., having one or more characteristics of the first user input) corresponding to a request to cease display of the respective virtual three-dimensional environment. In some embodiments, the request to cease display of the respective virtual three-dimensional environment includes a selection of a selectable option displayed in the respective virtual three-dimensional environment and/or a manipulation of a displayed control element to cease display of the respective virtual dimensional environment. In some embodiments, the selectable option is directed to initiating display of a virtual three-dimensional environment different from the respective virtual three-dimensional environment. In some embodiments, the second user input includes a predetermined gesture (e.g., an air gesture) recognized as a request to cease display of the respective virtual three-dimensional environment. For example, the second user input optionally includes a hand of a user of the computer system performing a pinch air gesture in which the index finger and thumb of the hand of the user come together and touch while attention of the user is directed to the selectable option for ceasing display of the respective virtual three-dimensional environment or displaying another virtual three-dimensional environment. In another example, air tapping a control element for ceasing display of the respective virtual three-dimensional environment or displaying another virtual three-dimensional environment optionally ceases display of the respective virtual three-dimensional environment.

In some embodiments, in response to receiving the second user input (2026*b*), the computer system ceases (2026*c*) (e.g., partial or full) display of the respective virtual three-dimensional environment.

In some embodiments, in response to receiving the second user input (2026*b*), the computer system outputs (2026*d*) a respective sound effect (e.g., exit sound effect) when ceasing display of the respective virtual three-dimensional environment. In some embodiments, the sound effect output when ceasing display of the respective virtual three-dimensional environment is different from the sound effect output when initiating display of the respective virtual three-dimensional environment. In some embodiments, the sound effect output when ceasing display of the respective virtual three-dimensional environment is different from the sound effect output when changing the level of immersion (e.g., increasing level of immersion, maximum level of immersion, decreasing level of immersion, or minimum level of immersion) of the respective virtual three-dimensional environment. In some embodiments, the sound effect output when ceasing display of the respective virtual three-dimensional environment is different from the sound effect output when changing the respective visual appearance from corresponding to the first time of day to corresponding to the second time of day. Outputting audio when ceasing display of the respective virtual three-dimensional environment provides auditory feedback or confirmation that the respective virtual three-dimensional environment is no longer displayed, thereby improving user-device interaction.

In some embodiments, outputting the respective sound effect when ceasing display of the respective virtual three-dimensional environment includes (2028*a*) in accordance with a determination that the respective virtual three-dimensional environment is the first virtual three-dimensional environment, outputting a respective sound effect corresponding to ceasing display of the respective virtual three-dimensional environment (2028*b*), such as outputting sound effect when exiting virtual environment 1945 in FIG. 19G.

In some embodiments, outputting the respective sound effect when ceasing display of the respective virtual three-dimensional environment includes (2028*a*) in accordance with a determination that the respective virtual three-dimensional environment is the second virtual three-dimensional environment, outputting the respective sound effect corresponding to ceasing display of the respective virtual three-dimensional environment (2028*c*), such as outputting the same sound effect when exiting virtual environment 1947 in FIG. 19G if virtual environment 1947 was displayed. In some embodiments, the sound effect output when ceasing display of the respective virtual three-dimensional environment is independent of ambient sound effects corresponding to the respective virtual three-dimensional environment. Outputting the same audio when ceasing display of the respective virtual three-dimensional environment provides auditory feedback or confirmation that the respective virtual three-dimensional environment is no longer displayed, thereby improving user-device interaction.

In some embodiments, outputting the respective sound effect when ceasing display of the respective virtual three-dimensional environment includes (2030*a*) in accordance with a determination that the respective virtual three-dimensional environment is the first virtual three-dimensional environment, outputting a first sound effect corresponding to ceasing display of the first virtual three-dimensional environment (2030*b*), such as outputting sound effect when exiting virtual environment 1945 in FIG. 19G.

In some embodiments, outputting the respective sound effect when ceasing display of the respective virtual three-dimensional environment includes (2030*a*) in accordance with a determination that the respective virtual three-dimensional environment is the second virtual three-dimensional environment, outputting a second sound effect corresponding to ceasing display of the second virtual three-dimensional environment different from the first sound effect corresponding to ceasing display of the first virtual three-dimensional environment (2030*c*), such as outputting a different sound effect when exiting virtual environment 1947 in FIG. 19G if virtual environment 1947 was displayed. In some embodiments, the sound effect output when ceasing display of the respective virtual three-dimensional environment depends on ambient sound effects corresponding to the respective virtual three-dimensional environment. Outputting different audio when ceasing display of the different virtual three-dimensional environments provides auditory feedback or confirmation indicating which respective virtual three-dimensional environment is no longer displayed, thereby improving user-device interaction.

In some embodiments, outputting the respective sound effect when ceasing display of the respective virtual three-dimensional environment includes outputting the respective sound effect with spatialized audio with a simulated position relative to a viewpoint of a user that moves in conjunction with a change in appearance (e.g., change in level of immersion, change in position, change in opacity, and/or change in size) of the respective virtual three-dimensional environment when gradually ceasing display of the respective virtual three-dimensional environment (2032), such as outputting sound effect with spatialized audio when exiting virtual environment 1945 in FIG. 19G. In some embodiments, movement of the spatialized audio does not correspond to a spatial movement of the respective virtual three-dimensional environment. For example, the spatialized audio optionally moves in conjunction with the respective virtual three-dimensional environment fading in rather than moving relative to a viewpoint of the user. The spatialized audio optionally moves in a direction opposite of the movement of the respective virtual three-dimensional environment. In some embodiments, movement of the spatialized audio does correspond to a spatial movement of the respective virtual three-dimensional environment. As the respective virtual three-dimensional environment gradually consumes a smaller portion of the field of view and/or is farther (e.g., retracted) from the viewpoint of the user, the respective sound effect is optionally output farther from the viewpoint of the user such that the respective sound effect appears softer to the user. In some embodiments, when the respective virtual three-dimensional environment is no longer displayed (e.g., 0% of the field of view consumed by the respective virtual three-dimensional environment or the respective virtual three-dimensional environment is displayed farthest away from the viewpoint of the user), the respective sound effect is no longer output. Outputting audio with spatial movement corresponding to spatial movement of a respective virtual three-dimensional environment provides auditory feedback indicative of changes in movement of the respective virtual three-dimensional environment relative to the viewpoint of the user (e.g., respective virtual three-dimensional environment disappearing as audio output farther away from the user), thereby improving user-device interaction.

In some embodiments, while displaying, via the display generation component, the first virtual three-dimensional environment, the computer system receives (2034*a*), via the one or more input devices, a second user input, such as input from hand 1920*f* in FIG. 19E (e.g., having one or more of the characteristics of the first user input) corresponding to a request to initiate display of the second virtual three-dimensional environment. In some embodiments, the request to initiate display of the respective virtual three-dimensional environment includes a selection of a selectable option displayed in the respective virtual three-dimensional environment and/or a manipulation of a displayed control element to initiate display of the second virtual dimensional environment. In some embodiments, the second user input includes a predetermined gesture (e.g., an air gesture) recognized as a request to display the second virtual three-dimensional environment. For example, the second user input optionally includes a hand of a user of the computer system performing a pinch air gesture in which the index finger and thumb of the hand of the user come together and touch while attention of the user is directed to the selectable option for displaying the second virtual three-dimensional environment. In another example, air tapping a control element for displaying the second virtual three-dimensional environment optionally causes display of the second virtual three-dimensional environment.

In some embodiments, in response to receiving the second user input (2034*b*), the computer system ceases (2034*b*) display of the first virtual three-dimensional environment, such as ceasing display of virtual environment 1945 in FIG. 19G. In some embodiments, the request to initiate display of the second virtual three-dimensional environment includes ceasing display of the previously displayed virtual three-dimensional environment (e.g., first virtual three-dimensional environment).

In some embodiments, in response to receiving the second user input (2034*b*), the computer system displays (2034*c*), via the display generation component, the second virtual three-dimensional environment such displaying virtual environment 1947 in FIGS. 19H and 19H1 (e.g., similar to as described with reference to the display of the first and/or second virtual three-dimensional environment in step(s) 2002).

In some embodiments, in response to receiving the second user input (2034*b*), the computer system outputs (2034*d*) the second sound effect when initiating display of the second virtual three-dimensional environment, such as outputting sound effect when displaying virtual environment 1947 in FIGS. 19H and 19H1 (e.g., similar to as described with reference to the second sound effect for the second virtual three-dimensional environment in step(s) 2002). In some embodiments, the second sound effect is different from a first sound effect when initiating display of the first virtual three-dimensional environment. In some embodiments, the second sound effect is not output unless the second user input is received. Outputting audio when switching between respective virtual three-dimensional environments provides auditory feedback indicative of a change in the respective virtual three-dimensional environment having occurred, thereby improving user-device interaction.

In some embodiments, in response to receiving the second user input, the computer system forgoes (2036) outputting a sound effect when ceasing display of the first virtual three-dimensional environment, such as outputting no sound effect when exiting virtual environment 1945 in FIG. 1945. In some embodiments, the exit sound effect with reference to step(s) 2026 is not output when switching to another virtual three-dimensional environment (e.g., ceasing display of the first virtual three-dimensional environment and initiating display of another virtual three-dimensional environment). For example, the respective sound effect when ceasing display of the respective virtual three-dimensional environment with reference to step(s) 2026 is optionally not output when ceasing display of the first virtual three-dimensional environment and subsequently initiating display of another virtual three-dimensional environment. However, the respective sound effect with reference to step(s) 2026 is optionally output if the computer system ceases display of the first virtual three-dimensional environment without initiating display of another virtual three-dimensional environment. Forgoing outputting audio when exiting a respective virtual three-dimensional environment indicates display of another virtual three-dimensional environment without producing auditory clutter and consuming unnecessary computing resources, thereby improving user-device interaction In some embodiments, outputting the first sound effect or the second sound effect includes outputting the first sound effect or the second sound effect for one to three seconds (2038), such as outputting sound effect for one to three seconds in FIG. 19C. In some embodiments, the transition to display a new virtual three-dimensional environment is (1.1×, 1.3×, 1.5×, 2×, 3×, 5×, 10× or 30×) shorter than outputting the first or second sound effects. Accordingly, in some embodiments, a portion of the entry sound effect (e.g., the first or second sound effects) is output after the new virtual three-dimensional environment is fully displayed. Outputting audio for one to three seconds (including even after the new virtual three-dimensional environment has been fully displayed) ensures the transition to the new virtual three-dimensional environment is detected, thereby reducing errors in interaction with the computer system.

In some embodiments, outputting the first sound effect or the second sound effect includes outputting a respective sound effect including a simulated sound of sand being blown by wind (2040), such as optionally outputting simulated sound of sand being blown by wind in FIG. 19C. In some embodiments, when changing the respective visual appearance from corresponding to the first time of day to corresponding to the second time of day as described with reference to step(s) 2020, the computer system outputs a sand whooshing sound. In some embodiments, when initiating display of a respective virtual three-dimensional environment (e.g., virtual desert) as described with reference to step(s) 2020, the computer system outputs a sand whooshing sound. Outputting a sand whooshing sound provides auditory feedback regarding changes in display of a respective virtual three-dimensional environment, thereby improving user-device interaction.

In some embodiments, outputting the first sound effect or the second sound effect includes outputting a respective sound effect including a simulated sound of crickets chirping (2042), such as optionally outputting simulated sound of crickets chirping in FIG. 19I. In some embodiments, when changing the respective visual appearance from corresponding to the first time of day to corresponding to the second time of day as described with reference to step(s) 2020, the computer system outputs a crickets chirping sound. In some embodiments, when initiating display of a respective virtual three-dimensional environment (e.g., virtual forest) as described with reference to step(s) 2020, the computer system outputs a crickets chirping sound. Outputting a crickets chirping sound provides auditory feedback regarding changes in display of a respective virtual three-dimensional environment, thereby improving user-device interaction.

In some embodiments, while displaying the first virtual three-dimensional environment and after outputting the first sound effect, the computer system outputs (2044*a*) one or more third sound effects corresponding to the first virtual three-dimensional environment, such as optionally outputting non-amplified sound effects corresponding to virtual environment 1945 in FIG. 19C. The one or more third sound effects correspond to audio, such as ambient sounds, of a steady-state first virtual three-dimensional environment.

In some embodiments, while displaying the second virtual three-dimensional environment and after outputting the second sound effect, the computer system outputs (2044*b*) one or more fourth sound effects, different from the one or more third sound effects, corresponding to the second virtual three-dimensional environment, such as optionally outputting non-amplified sound effects corresponding to the virtual environment 1947 in FIGS. 19H and 19H1 (e.g., the one or more fourth sound effects correspond to audio, such as ambient sounds of a steady-state second virtual three-dimensional environment).

In some embodiments, outputting the first sound effect includes outputting amplified one or more portions of the one or more third sound effects (for a threshold period of time such as 0.5, 1, 5, or 10 s), wherein the one or more third sounds effects are output after the amplified one or more portions of the one or more third sounds effects are output (2044*c*), such as optionally outputting amplified sound effects followed by non-amplified sound effects corresponding to the virtual environment 1945 in FIG. 19C. In some embodiments, the computer system outputs amplified (e.g., increases amplitude of) portions of the one or more third sound effects or the one or more fourth sound effects as described below by outputting audio closer to the viewpoint of the user (e.g., near the user's head). In some embodiments, the computer system outputs non-amplified sound effects by outputting the one or more third sound effects or the one or more fourth sound effects as described below farther away from the viewpoint of the user (e.g., away from the user's head).

In some embodiments, outputting the second sound effect includes outputting amplified one or more portions of the one or more fourth sound effects (for a threshold period of time such as 0.5, 1, 5, or 10 s), wherein the one or more fourth sounds effects are output after the amplified one or more portions of the one or more fourth sounds effects are output (2044*d*), such as optionally outputting amplified sound effects followed by non-amplified sound effects corresponding to the virtual environment 1947 in FIGS. 19H and 19H1. In some embodiments, when initiating display of the first or the second virtual three-dimensional environment, the computer system outputs exaggerated sound effects (e.g., corresponding to ambient sound effects) of the first or the second virtual three-dimensional environment, respectively. In some embodiments, as the first or second virtual three-dimensional environment gradually consumes a larger portion of the field of view, the computer system transitions to outputting the non-exaggerated sound effects (e.g., corresponding to ambient sound effects) of the first or the second virtual three-dimensional environment, respective. Outputting exaggerated audio when initially displaying of a respective virtual three-dimensional environment but outputting non-exaggerated audio afterwards ensures that the transition in audio feedback is detected, thereby reducing errors in interaction with the computer system.

In some embodiments, the computer system receives (2046*a*), via the one or more input devices, a second user input, such as input from hand 1920*a* in FIG. 19A (e.g., having one or more of the characteristics of the first user input) corresponding to a request to display an atmospheric effect applied to a representation of a physical environment of a user of the computer system. In some embodiments, the request to display an atmospheric effect includes a selection of a virtual selectable option displayed in the physical environment and/or a manipulation of a displayed control element to initiate display of atmospheric effect. In some embodiments, the second user input includes a predetermined gesture (e.g., an air gesture) recognized as a request to display the atmospheric effect. For example, the second user input optionally includes a hand of a user of the computer system performing a pinch air gesture in which the index finger and thumb of the hand of the user come together and touch while attention of the user is directed to the selectable option for displaying the atmospheric effect. In another example, air tapping a control element for displaying the atmospheric effect optionally causes display of the atmospheric effect. In some embodiments, displaying an atmospheric effect modifies one or more visual characteristics of the physical environment of the user such that it appears as if the physical environment is enhanced via color and/or exposure adjustments via the display generation component in the three-dimensional environment. In some embodiments, applying the atmospheric effect to the physical environment modifies one or more visual characteristics of the physical environment such that it appears as if the physical environment is located at a different time, place, and/or condition (e.g., morning lighting instead of afternoon lighting, or sunny instead of overcast). In some embodiments, applying the atmospheric effect to the physical environment modifies the physical environment to appear dimly lit, and/or humid.

In some embodiments, in response to receiving the second user input (2046*b*), the computer system displays (2046*c*), via the display generation component, the representation of the physical environment of the user having the atmospheric effect applied thereto, such as displaying virtual shadows 1952 and 1956 in FIG. 19B.

In some embodiments, in response to receiving the second user input (2046*b*), the computer system outputs (2046*d*) a respective sound effect when initiating display of the atmospheric effect applied to the representation of the physical environment of the user of the computer system, such as outputting sound effect when displaying virtual shadows 1952 and 1956 in FIG. 19B. In some embodiments, the sound effect output when initiating display of the atmospheric effect is different from or the same as the sound effect output when initiating display of the respective virtual three-dimensional environment. In some embodiments, the sound effect output when initiating display of the atmospheric effect is different from or the same as the sound effect output when changing the level of immersion (e.g., increasing level of immersion, maximum level of immersion, decreasing level of immersion, or minimum level of immersion) of the respective virtual three-dimensional environment. In some embodiments, the sound effect output when initiating display of the atmospheric effect is different from or the same as the sound effect output when changing the respective visual appearance from corresponding to the first time of day to corresponding to the second time of day. In some embodiments, the sound effect output when initiating display of the atmospheric effect is different from or the same as the sound effect output when ceasing display of the respective virtual three-dimensional environment. In some embodiments, the sound effect output when initiating display of the atmospheric effect is independent of ambient sound effects corresponding to the respective virtual three-dimensional environment. In some embodiments, the sound effect output when initiating display of the atmospheric effect depends on ambient sound effects corresponding to the respective virtual three-dimensional environment. In some embodiments, the characteristics of sound effects described with reference to step(s) 2002 to 2046 optionally apply to outputting of the respective sound effect when initiating display of the atmospheric effect. Outputting audio when initiating display of the atmospheric effect provides auditory feedback or confirmation that the atmospheric effect is applied to the representation of the physical environment, thereby improving user-device interaction.

In some embodiments, the computer system displays (2048*a*), via the display generation component, one or more application user interfaces (e.g., a media application (e.g., television or photos), a messages application, a health application, and/or a web browsing application user interface), such as displaying virtual content 1908 while displaying virtual environment 1945 in FIG. 19A, wherein the first user input is received while the one or more application user interfaces are displayed. In some embodiments, displaying the one or more application user interfaces includes displaying respective content corresponding to (e.g., within) the one or more application user interfaces and/or displaying the one or more application user interfaces at respective positions relative to a viewpoint of the user.

In some embodiments, in response to receiving the first user input, the computer system maintains (2048*b*) display of the one or more application user interfaces while displaying the respective virtual three-dimensional environment, such as maintaining display of virtual content 1908 while displaying the virtual environment 1947 in FIGS. 19H and 19H1. In some embodiments, maintaining display of one or more application user interfaces includes maintaining display of the respective content corresponding to the one or more application user interfaces and/or maintaining display of the one or more application user interfaces at the respective positions relative to a viewpoint of the user. In some embodiments, the computer system maintains display of the one or more application user interfaces in response to ceasing display of the respective virtual three-dimensional environment (e.g., in response to detecting an input to cease display of the respective virtual three-dimensional environment) as described with reference to step(s) 2034. In some embodiments, the computer system maintains display of the one or more application user interfaces when switching between display of different virtual three-dimensional environments (e.g., first and second virtual three-dimensional environments) as described with reference to step(s) 2034. Maintaining display of application user interfaces despite changes in respective virtual three-dimensional environments that are displayed ensures continuity of display of the application user interface, facilitates continued interaction with the application user interfaces, and reduces the need for user input to redisplay the application user interfaces, and thereby improving user-device interactions.

FIG. 21 depicts a flowchart illustrating a method 2100 of displaying simulated clouds in an environment in accordance with some embodiments. In some embodiments, the method 2100 is performed at a computer system (e.g., computer system 101 in FIG. 1 such as a tablet, smartphone, wearable computer, or head-mounted device) including a display generation component (e.g., display generation component 120 in FIGS. 1, 3, and/or 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 2100 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 2100 are, optionally, combined and/or the order of some operations is, optionally, changed.

In some embodiments, method 2100 is performed at a computer system in communication with a display generation component and one or more input devices. For example, the computer system optionally has one or more of the characteristics of the computer systems of methods 800, 1000, 1200, 1400, 1600, 1800, 2000 and/or 2200. In some embodiments, the display generation component has one or more of the characteristics of the display generation components of methods 800, 1000, 1200, 1400, 1600, 1800, 2000 and/or 2200. In some embodiments, the one or more input devices have one or more of the characteristics of the one or more input devices described with reference to methods 800, 1000, 1200, 1400, 1600, 1800, 2000 and/or 2200.

In some embodiments, while an environment (e.g., an environment having one or more of the characteristics of the environments described with reference to methods 800, 1000, 1200, 1400, 1600, 1800, 2000 and/or 2200) is visible, via the display generation component, the computer system displays (2102*a*) a first simulated shadow corresponding to a first virtual object in the environment (e.g., a simulated shadow such as described with reference to method 800), such as shadow 746*b* in FIG. 7F, wherein the first simulated shadow has a size and shape based on a size and shape of the virtual object casting the first simulated shadow and a respective portion of the environment (e.g., a virtual object or surface or a representation of a real object or surface) on which the first simulated shadow appears (e.g., is being cast) and has a respective visual appearance that is based on a shadow texture of the first simulated shadow. In some embodiments, the size and shape of the first simulated shadow is also based on a position and/or direction of light or simulated light in the environment. In some embodiments, the first simulated shadow corresponds to the first virtual object because the first simulated shadow is virtually cast by the first virtual object, and the first simulated shadow optionally has a visual appearance (e.g., size, shape, diffusiveness, color, opacity and/or brightness) that is based on the first virtual object (e.g., based on the size, shape and/or opacity of the first virtual object). In some embodiments, the first simulated shadow is virtually cast by the first virtual object based one or more simulated or physical artificial or natural light sources in the environment, such as a simulated sun, a simulated moon, a physical sun, a physical moon and/or an artificial, physical light fixture. In some embodiments, the first virtual object is a virtual cloud, a virtual tree, a virtual house, or any other virtual object in the environment that has non-zero opacity. The first simulated shadow is optionally displayed on (e.g., overlaid on) one or more surfaces of the respective virtual element when it is virtually cast onto the respective virtual element. The visual appearance of the first simulated shadow is optionally based on the shadow texture, which is optionally the graphical or visual texture that makes up (or composes) the first simulated shadow. For example, the shadow texture is optionally what is displayed by the computer system as overlaying the respective virtual element (e.g., the virtual element on which the first simulated shadow is cast). In some embodiments, the shadow texture has a diffusiveness, color, opacity, intensity and/or brightness that define the visual appearance of the shadow texture. In some embodiments, the shadow texture is a property of the first simulated shadow, and is independent of one or characteristics (e.g., size, shape, texture(s), and/or color) of the virtual element on which the first simulated shadow is virtually cast.

In some embodiments, displaying the first simulated shadow includes in accordance with a determination that the respective portion of the environment is a first portion of the environment (e.g., a surface of simulated water), such as the portion of the simulated water on which shadow 746*b* is displayed in FIG. 7F, displaying (2102*b*) the first simulated shadow on the respective virtual element with the shadow texture having a first visual appearance (e.g., a first diffusiveness, a first color, a first opacity, a first intensity and/or a first brightness), such as shown with shadow 746*b* in FIG. 7F, and in accordance with a determination that the respective portion of the environment is a second portion of the environment (e.g., a surface of land, such as virtual sand at a virtual beach), different from the first portion of the environment, such as the portion of the simulated water on which shadow 746*b* is displayed in FIG. 7G, displaying (2102*c*) the first simulated shadow on the respective virtual element with the shadow texture having a second visual appearance, different from the first visual appearance, such as shown with shadow 746*b* in FIG. 7G (e.g., a second diffusiveness, a second color, a second opacity, a second intensity and/or a second brightness). Therefore, in some embodiments, the visual appearance of the first simulated shadow is optionally different depending on whether the first simulated shadow is virtually cast onto a first virtual element or a second virtual element. Changing a visual appearance of a simulated shadow by changing the shadow texture that makes up the simulated shadow generates a precise simulated shadow with increased flexibility for adjustments to the appearance of the simulated shadow and/or the element having the simulated shadow cast onto it while being resource-efficient (e.g., to reduce power usage by the computer system for displaying simulated shadows), and thus improves user-device interactions.

In some embodiments, the first portion of the environment is virtual water having a first simulated depth (e.g., depth from a surface of the simulated water to simulated ground below the surface of the simulated water), such as the portion of simulated water on which shadow 746*a* is displayed in FIG. 7F, and the second portion of the environment is virtual water (e.g., optionally the same simulated body of water as the first portion, or a different simulated body of water as the first portion) having a second simulated depth, different from the first simulated depth, such as the portion of simulated water on which shadow 746*b* is displayed in FIG. 7F. Changing a visual appearance of a simulated shadow in accordance with the simulated depth of simulated water generates a precise simulated shadow with increased flexibility for adjustments to the appearance of the simulated shadow while being resource-efficient (e.g., to reduce power usage by the computer system for displaying simulated shadows), and thus improves user-device interactions.

In some embodiments, the shadow texture having the first visual appearance includes (and/or is) a first color, such as with shadow 746*a* in FIG. 7F, and the shadow texture having the second visual appearance includes (and/or is) a second color, different from the first color, such as with shadow 746*b* in FIG. 7F. In some embodiments, the shadow textures used by the computer system when displaying the simulated shadow on simulated have different colors or color distributions for different simulated depths of the simulated water. Changing a color of a simulated shadow in accordance with the simulated depth of simulated water generates a precise simulated shadow with increased flexibility for adjustments to the color of the simulated shadow while being resource-efficient (e.g., to reduce power usage by the computer system for displaying simulated shadows), and thus improves user-device interactions.

In some embodiments, the shadow texture having the first visual appearance has a first visual prominence (e.g., diffusiveness, density, brightness, color saturation and/or opacity) relative to the environment, such as with shadow 746*a* in FIG. 7F, and the shadow texture having the second visual appearance has a second visual prominence (e.g., diffusiveness, density, brightness, color saturation and/or opacity), different from the first visual prominence, relative to the environment, such as with shadow 746*b* in FIG. 7F. In some embodiments, the visual prominence of the simulated shadow on shallower simulated water is more or less than the visual prominence of the simulated shadow on deeper simulated water. Changing a visual prominence of a simulated shadow in accordance with the simulated depth of simulated water generates a precise simulated shadow with increased flexibility for adjustments to the prominence of the simulated shadow while being resource-efficient (e.g., to reduce power usage by the computer system for displaying simulated shadows), and thus improves user-device interactions.

In some embodiments, the first portion of the environment is virtual water, such as with shadow 746*b* in FIG. 7F, and the second portion of the environment is virtual land (e.g., sand, dirt, grass, snow, or concrete), such as with shadow 746*b* in FIG. 7G. Thus, in some embodiments, the computer system displays the simulated shadow with different color, brightness, prominence, diffusion, color saturation and/or opacity depending on whether the simulated shadow is on simulated water or on simulated land. In some embodiments, the visual appearance of the texture of the shadow is based on the visual appearance of the simulated water or the visual appearance of the simulated land, accordingly. Changing a visual appearance of a simulated shadow in accordance with whether the simulated shadow is on simulated water or land generates a precise simulated shadow with increased flexibility for adjustments to the appearance of the simulated shadow while being resource-efficient (e.g., to reduce power usage by the computer system for displaying simulated shadows), and thus improves user-device interactions.

In some embodiments, the first portion of the environment is associated with a second simulated shadow (e.g., the second simulated shadow is cast on the first portion of the environment concurrently with the first simulated shadow), such as shadow 748*a* in FIG. 7F, and the second portion of the environment is not associated with a simulated shadow different from the first simulated shadow (e.g., the second portion of the environment does not have any simulated shadows cast on it other than the first simulated shadow). In some embodiments, the second simulated shadow has one or more of the characteristics of the first simulated shadow. In some embodiments, the first simulated shadow would have the same texture and/or visual appearance when displayed on the first portion and the second portion of the environment except that the first portion of the environment also has the second simulated shadow cast on it. In some embodiments, the first simulated shadow would have a different texture and/or visual appearance when displayed on the first portion and the second portion of the environment separate from the first portion of the environment also having the second simulated shadow cast on it. In some embodiments, when two (or more) simulated shadows are cast onto the same portion of the environment, one or more of the shadows in the portion of the environment have different textures and/or visual appearances than they would have if the other simulated shadows were not also cast onto the same portion of the environment. In some embodiments, the second simulated shadow is a simulated cloud shadow (e.g., the same as the first simulated shadow). In some embodiments, the second simulated shadow is a shadow from a virtual element other than a cloud in the environment (e.g., a virtual tree, a virtual umbrella, or a virtual house), thus being a different type of shadow than the first simulated shadow. In some embodiments, the change in visual appearance of a given simulated shadow is for the region(s) where the multiple simulated shadows overlap, and not for other regions of the simulated shadow(s). Changing a visual appearance of a simulated shadow in accordance with whether the simulated shadow is cast on the same portion of the environment as other simulated shadows generates a precise simulated shadow with increased flexibility for adjustments to the appearance of the simulated shadow while being resource-efficient (e.g., to reduce power usage by the computer system for displaying simulated shadows), and thus improves user-device interactions.

In some embodiments, the respective portion of the environment is the first portion of the environment. In some embodiments, prior to displaying the first simulated shadow on the first portion of the environment, the computer system displays the second simulated shadow on the first portion of the environment, wherein a shadow texture of the second simulated shadow has a third visual appearance, such as displaying shadow 748*a* in FIG. 7F (e.g., similar to as described with reference to the visual appearance of the shadow texture of the first simulated shadow). In some embodiments, in response to displaying the first simulated shadow on the first portion of the environment and while the first portion of the environment is also associated with the second simulated shadow, such as with shadows 746*b* and 748*a* overlapping in FIG. 7G (e.g., the first and second simulated shadows are being cast onto the same portion of the environment at the same time), the computer system changes a visual appearance of the shadow texture of the second simulated shadow (e.g., the portion of the second simulated shadow that overlaps with the first simulated shadow) away from the third visual appearance (e.g., to a fourth visual appearance, different from the third visual appearance), such as changing the visual appearance of shadow 746*b* in overlap region 746*x* in FIG. 7G. For example, the density, diffusiveness, color, opacity, intensity and/or brightness of the shadow texture of the second simulated shadow, optionally in the area of overlap between the first and second simulated shadows, changes (e.g., decreased density, increased diffusiveness, decreased color, increased opacity, decreased intensity and/or decreased brightness). In some embodiments, the portions of the second simulated shadow that are outside of the area of overlap do not change in visual appearance. Changing a visual appearance of a simulated shadow in accordance with being overlapped with a simulated cloud shadow generates a precise simulated shadow with increased flexibility for adjustments to the appearance of the simulated shadow while being resource-efficient (e.g., to reduce power usage by the computer system for displaying simulated shadows), and thus improves user-device interactions.

In some embodiments, prior to displaying the first simulated shadow on the respective portion of the environment, the computer system displays the second simulated shadow on the respective portion of the environment (e.g., as described above), such as displaying shadow 748*a* in FIG. 7F. In some embodiments, in response to displaying the first simulated shadow on the respective portion of the environment and while the first portion of the environment is also associated with the second simulated shadow (e.g., as described above) and in accordance with a determination that one or more criteria are satisfied, the computer system ceases display of at least a portion of the second simulated shadow on the respective portion of the environment, such as ceasing display of shadow 746*b* in overlap region 746*x* in FIG. 7G (e.g., optionally ceasing display of the portion of the second simulated shadow that is overlapped by the first simulated shadow, but maintaining display of other portions of the second simulated shadow). In some embodiments, the one or more criteria include a criterion that is satisfied when the visual prominence of the texture of the first simulated shadow (e.g., as described previously with respect to the shadow texture having the first or second visual prominence) in the area of overlap with the second simulated shadow is greater than the visual prominence of the texture of the second simulated shadow (e.g., as described previously with respect to the shadow texture having the first or second visual prominence) in the area of overlap with the first simulated shadow. In some embodiments, the criterion is not satisfied when the visual prominence of the texture of the first simulated shadow (e.g., as described previously with respect to the shadow texture having the first or second visual prominence) in the area of overlap with the second simulated shadow is less than the visual prominence of the texture of the second simulated shadow (e.g., as described previously with respect to the shadow texture having the first or second visual prominence) in the area of overlap with the first simulated shadow. In some embodiments, in accordance with a determination that the one or more criteria are not satisfied, display of the first simulated shadow on the respective portion of the environment is ceased (e.g., optionally ceasing display of the portion of the first simulated shadow that is overlapped by the second simulated shadow, but maintaining display of other portions of the first simulated shadow) and display of the second simulated shadow is maintained. In some embodiments, the computer system does not additively combine the visual prominences of the portions of the shadow textures that overlap between the first and second simulated shadows. In some embodiments, in accordance with a determination that the first simulated shadow completely overlaps the second simulated shadow (or the second simulated shadow completely overlaps the first simulated shadow), the computer system responds differently depending on whether the visual prominence of the texture of the smaller or the larger of the first and second simulated shadows has more visual prominence. In accordance with a determination that the visual prominence of the texture of the smaller simulated shadow has less visual prominence than the texture of the larger simulated shadow, the computer system optionally ceases display of the smaller simulated shadow and optionally maintains display of the larger simulated shadow. In accordance with a determination that the visual prominence of the texture of the larger simulated shadow has less visual prominence than the texture of the smaller simulated shadow, the computer system optionally maintains display of both the larger and the smaller simulated shadows. Ceasing display of a simulated shadow in accordance with being overlapped with a simulated cloud shadow generates a precise simulated shadow with increased flexibility for adjustments to the appearance of the simulated shadow while being resource-efficient (e.g., to reduce power usage by the computer system for displaying simulated shadows), and thus improves user-device interactions.

In some embodiments, the shadow texture of the first simulated shadow has a third visual appearance (e.g., density, diffusiveness, color, opacity, intensity and/or brightness) in a central region of the first simulated shadow, and the shadow texture of the first simulated shadow has a fourth visual appearance (e.g., density, diffusiveness, color, opacity, intensity and/or brightness), different from the third visual appearance, in an outer region of the first simulated shadow that surrounds the central region of the first simulated shadow, such as described with reference to shadows 746*a*, 746*b* and 748*a*. In some embodiments, the central region of the first simulated shadow has greater visual prominence (e.g., as described previously with respect to the shadow texture having the first or second visual prominence) than the outer region of the first simulated shadow. Displaying a simulated shadow with different visual appearances in different portions of the simulated shadow generates a precise simulated shadow with increased flexibility for adjustments to the appearance of the simulated shadow while being resource-efficient (e.g., to reduce power usage by the computer system for displaying simulated shadows), and thus improves user-device interactions.

In some embodiments, a shadow texture of the second simulated shadow has a third visual appearance (e.g., density, diffusiveness, color, opacity, intensity and/or brightness) in a central region of the second simulated shadow, and the shadow texture of the second simulated shadow has a fourth visual appearance (e.g., density, diffusiveness, color, opacity, intensity and/or brightness), different from the third visual appearance, in an outer region of the second simulated shadow that surrounds the central region of the second simulated shadow, such as described with reference to shadows 746*a*, 746*b* and 748*a*. In some embodiments, the central region of the first simulated shadow has greater visual prominence (e.g., as described previously with respect to the shadow texture having the first or second visual prominence) than the outer region of the first simulated shadow. Displaying a simulated shadow with different visual appearances in different portions of the simulated shadow generates a precise simulated shadow with increased flexibility for adjustments to the appearance of the simulated shadow while being resource-efficient (e.g., to reduce power usage by the computer system for displaying simulated shadows), and thus improves user-device interactions.

In some embodiments, the computer system displays the first simulated shadow moving away from the respective portion of the environment on which the first simulated shadow appears to a second respective portion of the environment, such as shown with respect to shadows 746*a* and 746*b* from FIG. 7F to FIG. 7G. In some embodiments, the first simulated shadow moves an amount, with a speed and/or in a direction corresponding to the amount, speed and/or direction of movement of the simulated cloud corresponding to the first simulated shadow. In some embodiments, the computer system displays both the movement of the simulated cloud and the movement of the corresponding simulated shadow. Displaying movement of a simulated shadow generates a precise simulated shadow with increased flexibility for adjustments to the appearance of the simulated shadow while being resource-efficient (e.g., to reduce power usage by the computer system for displaying simulated shadows), and thus improves user-device interactions.

In some embodiments, the computer system displays the first simulated shadow changing from having a first size and/or shape to having a second size and/or shape, different from the first size and shape, such as the change in size and/or shape of shadow 746*b* from FIG. 7F to FIG. 7G. In some embodiments, the first simulated shadow changes size and/or shape corresponding to the change in size and/or shape of the simulated cloud corresponding to the first simulated shadow. In some embodiments, the computer system displays both the change in the size and/or shape of the simulated cloud and the change in the size and/or shape of the corresponding simulated shadow. In some embodiments, the visual prominence of the simulated shadow changes along with the change in the size and/or shape of the simulated cloud. Displaying a change in a size and/or shape of a simulated shadow generates a precise simulated shadow with increased flexibility for adjustments to the appearance of the simulated shadow while being resource-efficient (e.g., to reduce power usage by the computer system for displaying simulated shadows), and thus improves user-device interactions.

In some embodiments, while displaying the first simulated shadow corresponding to the first virtual object on the respective portion of the environment, the computer system displays, via the display generation component, a second simulated shadow on a second respective portion of the environment (optionally the same as or different from the respective portion of the environment), such as shown with shadows 746*a* and 746*b*. In some embodiments, the second respective portion of the environment has one or more characteristics of the respective portion of the environment. In some embodiments, the second simulated shadow has one or more characteristics of the first simulated shadow. In some embodiments, the first simulated shadow and the second simulated shadow are cast by different objects of the same type (e.g., both virtual clouds, both virtual trees or both virtual structures). In some embodiments, the first simulated shadow and the second simulated shadow are cast by different object of different types (e.g., one virtual cloud and one virtual tree). In some embodiments, the first simulated shadow and the second simulated shadow are cast by the same object. Displaying multiple simulated shadows concurrently generates a precise simulated environment with increased flexibility for adjustments to the appearance of the environment while being resource-efficient (e.g., to reduce power usage by the computer system for displaying the environment), and thus improves user-device interactions.

In some embodiments, prior to displaying the first simulated shadow on the respective portion of the environment, the computer system displays one or more simulated reflections corresponding to one or more light sources on the respective portion of the environment, such as reflection 752*b* to the right of shadow 746*a* in FIG. 7F. For example, the one or more simulated reflections are one or more lighting effects that simulate reflection of light from the one or more light sources off of the respective portion of the environment. In some embodiments, the one or more light sources have one or more of the characteristics of the light sources described with reference to step(s) 2102.

In some embodiments, displaying the first simulated shadow on the respective portion of the environment includes forgoing displaying (and/or ceasing display of) the one or more simulated reflections corresponding to the one or more light sources on the respective portion of the environment, such as forgoing display of reflection 752*b*, which was to the right of shadow 746*a* in FIG. 7F, in FIG. 7G. Ceasing display of the one or more simulated reflections when the simulated shadow is displayed on the respective portion of the environment generates a precise appearance of the simulated shadow while being resource-efficient (e.g., to reduce power usage by the computer system for displaying the simulated shadow), and thus improves user-device interactions.

In some embodiments, the respective portion of the environment includes simulated sand, and the one or more simulated reflections correspond to one or more simulated reflections from a surface of the simulated sand, such as reflections 752*a* and 752*c* on the simulated sand in FIG. 7F. For example, simulated reflections from simulated grains of sand, ridges of sand and/or shapes of sand. In some embodiments, the one or more simulated reflections have a visual appearance (e.g., color and/or intensity) based on the visual appearance of the one or more light sources and/or simulated sand in the respective portion of the environment. Ceasing display of the one or more simulated sand reflections when the simulated shadow is displayed on the simulated sand generates a precise appearance of the simulated shadow while being resource-efficient (e.g., to reduce power usage by the computer system for displaying the simulated shadow), and thus improves user-device interactions.

In some embodiments, the respective portion of the environment includes simulated water, and the one or more simulated reflections correspond to one or more simulated reflections from a surface of the simulated water, such as reflections 752*a-c* on the simulated water in FIG. 7F. For example, simulated reflections from simulated ripples of water and/or the shape of the surface of the simulated water. In some embodiments, the one or more simulated reflections have a visual appearance (e.g., color and/or intensity) based on the visual appearance of the one or more light sources and/or simulated water in the respective portion of the environment. Ceasing display of the one or more simulated water reflections when the simulated shadow is displayed on the simulated water generates a precise appearance of the simulated shadow while being resource-efficient (e.g., to reduce power usage by the computer system for displaying the simulated shadow), and thus improves user-device interactions.

In some embodiments, while displaying the one or more simulated reflections corresponding to the one or more light sources on the respective portion of the environment from a first viewpoint of a user of the computer system, such as reflections 752*a-c* shown in FIG. 7G, the computer system detects an event corresponding to changing a viewpoint of the user from the first viewpoint to a second viewpoint, wherein the respective portion of the environment is visible from the second viewpoint of the user (e.g., the respective portion of the environment is in the viewport from the first viewpoint and the second viewpoint), such as the change in viewpoint from FIG. 7G to FIG. 7H. For example, the computer system detects movement of the user and/or the head of the user from a first position and/or orientation to a second, different position and/or orientation corresponding to the change from the first viewpoint to the second viewpoint.

In some embodiments, in response to detecting the event, (optionally displays the respective portion of the environment from the second viewpoint and) the computer system changes the display of the one or more simulated reflections corresponding to the one or more light sources on the respective portion of the environment, such as shown with reflections 752*a-c* in FIG. 7H. For example, the intensity, number, existence, position and/or other characteristics of the one or more simulated reflections optionally change based on the change in the viewpoint of the user. Changing the display of simulated reflections that are displayed based on a change in viewpoint of the user generates a precise appearance of the simulated reflections while being resource-efficient (e.g., to reduce power usage by the computer system for displaying the simulated reflections), and thus improves user-device interactions.

In some embodiments, changing the display of the one or more simulated reflections corresponding to the one or more light sources on the respective portion of the environment includes gradually (e.g., over a period of time, such as 0.01, 0.05, 0.1, 0.3, 0.5, 1, 3, 5, 10, 30 or 60 seconds) changing the display of the one or more simulated reflections after the viewpoint of the user changes to the second viewpoint, such as gradually changing reflections 752*a-c* from FIGS. 7G to 7H. For example, in some embodiments, the one or more simulated reflections start changing in one or more of the ways described herein before the viewpoint of the user reaches the second viewpoint (after the viewpoint of the user moves away from the first viewpoint), but continue changing after the viewpoint of the user reaches the second viewpoint. In some embodiments, the one or more simulated reflections start changing in one or more of the ways described herein only after the viewpoint of the user reaches the second viewpoint. Gradually changing the display of simulated reflections that are displayed based on a change in viewpoint of the user reduces abrupt changes in user context, thus reducing errors in interaction with the respective environment, and thus improves user-device interactions.

In some embodiments, changing the display of the one or more simulated reflections corresponding to the one or more light sources on the respective portion of the environment includes ceasing display of first one or more simulated reflections on the respective portion of the environment (e.g., one or more or all of the simulated reflections that were displayed when the viewpoint of the user was the first viewpoint), and initiating display of second one or more simulated reflections on the respective portion of the environment (e.g., simulated reflections that were not displayed when the viewpoint of the user was the first viewpoint), such as shown with reflections 752*a-c* from FIGS. 7G to 7H. Changing which simulated reflections are displayed based on a change in viewpoint of the user generates a precise appearance of the simulated reflections while being resource-efficient (e.g., to reduce power usage by the computer system for displaying the simulated reflections), and thus improves user-device interactions.

In some embodiments, the computer system concurrently displays, in the environment, media content and the first simulated shadow, such as if element 726*d* in FIG. 7G were media content. In some embodiments, the media content is a representation of a television show, a movie, a video, a photograph or any other content that can be displayed in the environment. In some embodiments, the media content has a location in the environment, and the first simulated shadow has a second location (optionally the same as or different from the first location) in the environment. In some embodiments, the media content is playing while the first simulated shadow is displayed. Displaying media content in the environment along with the simulated shadow provides for flexibility in the use of the environment while being resource-efficient and reduces context-loss for a user that would result from having to cease displaying the environment to display the media content, thus reducing errors in interaction, and thus improving user-device interactions.

In some embodiments, the computer system concurrently displays, in the environment, the first simulated shadow and one or more virtual elements corresponding to a communication session between a user of the computer system and one or more other participants of the communication session, such as if environment 706 in FIG. 7G included the one or more virtual elements of the communication session. In some embodiments, the communication session is a real-time (e.g., or nearly real-time) communication session that includes audio (e.g., real-time voice audio from the user and/or a participant, and/or audio content from media shared between the user and the participant), video (e.g., real-time video of the environment of the user and/or participant, and/or video content from media shared between the user and the participant) and/or other shared content (e.g., images, applications, and/or interactive media (e.g., video game media)). In some embodiments, the one or more virtual elements include one or more of the above. In some embodiments, the computer system optionally initiates and/or receives a request to join the communication session with a second computer system. In some embodiments, in response to initiating and/or receiving the request to join the communication session, the computer system initiates display of the three-dimensional environment to facilitate communication between the user of the computer system and the participant of the second computer system. In some embodiments, the one or more virtual elements are a virtual representation of the participant that is or is not an avatar (e.g., the one or more virtual elements do or do not include virtual representations of one or more physical characteristics of the participant, a person and/or an animal). In some embodiments, the one or more virtual elements include a virtual representation of a shape, such as a circle (e.g., a coin), oval, square, diamond, triangle, sphere, cylinder, cube, cone or cuboid. For example, the shape of the one or more virtual elements include three dimensions (e.g., length, width and depth relative to the three-dimensional environment). In some embodiments, the one or more virtual elements have one or more standard visual characteristics (e.g., shape and/or size) used by the computer system to represent one or more different participants in the three-dimensional environment (e.g., the size, shape, color and/or brightness of the one or more virtual elements are not different based on, and/or customizable to, different participants in the communication session (e.g., the communication session includes the user, the participant and optionally one or more additional participants)). Displaying virtual elements of a communication session in the environment along with the simulated shadow provides for flexibility in the use of the environment while being resource-efficient and reduces context-loss for a user that would result from having to cease displaying the environment to engage in the communication session, thus reducing errors in interaction, and thus improving user-device interactions.

In some embodiments, while displaying the first simulated shadow on the respective portion of the environment, wherein the environment is visible from a first viewpoint of a user of the computer system, the environment has a first environment appearance (e.g., the overall appearance of the environment, including one or more or all of the aspects of appearance described above), such as the appearance of environment 706 in FIG. 7G. In some embodiments, while the environment has the first environment appearance, the computer system detects an event corresponding to changing a viewpoint of the user from the first viewpoint to a second viewpoint, such as the change in the viewpoint from FIG. 7G to FIG. 7H. For example, the computer system detects movement of the user and/or the head of the user from a first position and/or orientation to a second, different position and/or orientation corresponding to the change from the first viewpoint to the second viewpoint.

In some embodiments, while the environment is visible from the second viewpoint, the environment has a second environment appearance (e.g., the overall appearance of the environment, including one or more or all of the aspects of appearance described above), different from the first environment appearance, such as the appearance of environment 706 in FIG. 7H. In some embodiments, the change in appearance of the environment is based on a direction, magnitude and/or speed of the change in the viewpoint of the user (e.g., a different resulting appearance for different directions, magnitudes and/or speeds of change in the viewpoint of the user). Changing the visual appearance of the environment based on a change in viewpoint of the user generates a precise appearance of the environment and avoids unexpected results from viewpoint changes, thus reducing errors in interaction, and thus improves user-device interactions.

FIG. 22 depicts a flowchart illustrating a method 2200 of displaying a background element in an environment in accordance with some embodiments. In some embodiments, the method 2200 is performed at a computer system (e.g., computer system 101 in FIG. 1 such as a tablet, smartphone, wearable computer, or head-mounted device) including a display generation component (e.g., display generation component 120 in FIGS. 1, 3, and/or 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 2200 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 2200 are, optionally, combined and/or the order of some operations is, optionally, changed.

In some embodiments, method 2200 is performed at a computer system in communication with a display generation component and one or more input devices. For example, the computer system optionally has one or more of the characteristics of the computer systems of methods 800, 1000, 1200, 1400, 1600, 1800, 2000 and/or 2100. In some embodiments, the display generation component has one or more of the characteristics of the display generation components of methods 800, 1000, 1200, 1400, 1600, 1800, 2000 and/or 2100. In some embodiments, the one or more input devices have one or more of the characteristics of the one or more input devices described with reference to methods 800, 1000, 1200, 1400, 1600, 1800, 2000 and/or 2100.

In some embodiments, while an environment is visible, via the display generation component, the computer system displays (2202*a*) a background element, such as the virtual sky in FIG. 7I, comprising one or more first virtual elements (e.g., virtual stars, virtual moon and/or virtual sun) in a first layer, such as elements 740*a-b*, elements 760*a-e* and/or element 762*a* in FIG. 7I, and one or more second virtual elements (e.g., virtual clouds, virtual birds and/or virtual airplanes) in a second layer (e.g., in some embodiments, the first and/or the second layer have one or more of the characteristics of the layers of the flow map described with reference to method 800), such as elements 740*a-b*, elements 760*a-e* and/or element 762*a* in FIG. 7I, wherein a visual appearance of the background element from a current viewpoint of a user of the computer system is based on a combination of a visual appearance of the one or more first virtual elements in the first layer and a visual appearance of the one or more second virtual elements in the second layer. In some embodiments, the background element is a virtual sky in the environment, such as described with reference to methods 800, 1000, 1600 and/or 1800, a virtual landscape, or any other background element that is or can be displayed behind one or more virtual objects (e.g., as described with reference to methods 800, 1000, 1200, 1400, 1600, 1800, 2000 and/or 2100) in the environment from the current viewpoint of the user of the computer system. In some embodiments, the first layer (and/or the one or more first virtual elements) is further from the current viewpoint of the user and/or a ground element in the environment than the second layer (and/or the one or more second virtual elements). In some embodiments, one or more portions of the second layer have non-zero transparency such that one or more portions of the first layer are visible through the one or more portions of the second layer from the current viewpoint of the user, such that the visual appearance of the background element is based on the visual appearance of the first layer and the visual appearance of the second layer.

In some embodiments, displaying the background element includes changing (2202*b*) the visual appearance (e.g., size, shape, diffusiveness, color, opacity, position and/or brightness) of the one or more first virtual elements in a first manner over time (e.g., over a time period, such as 0.1, 0.5, 1, 3, 5, 10, 30, 60 or 240 seconds, or as long as the background element is displayed) relative to a visual appearance of the one or more second virtual elements (e.g., differently than a change (or non-change) to the visual appearance of the one or more second virtual elements), such as shown with elements 740*a-b*, elements 760*a-e* and/or element 762*a* from FIG. 7I to FIG. 7J. Because the visual appearances of the one or more first virtual elements change over time, the visual appearance of the background element optionally changes over time, accordingly. Changing a visual appearance of a background element by changing the visual appearances for respective layers of the background element differently generates a precise simulated background element with a higher level of detail and provides increased flexibility for adjustments to the background element while being resource-efficient (e.g., to reduce power usage by the computer system for displaying the background element), and thus improves user-device interactions.

In some embodiments, the one or more first virtual elements are one or more simulated astronomical light sources, such as elements 706*a-e* or element 762*a* in FIG. 7I. For example, the first virtual elements include one or more of a simulated sun, a simulated moon, one or more simulated stars or one or more simulated planets, optionally in combination with one or more gradients displayed in a virtual sky that corresponds to the simulated light emitted by those light sources. In some embodiments, changing the visual appearance of the one or more simulated astronomical light sources in the first manner includes changing positions, sizes, colors and/or intensities of the one or more astronomical light sources, and optionally correspondingly updating the visual appearance of the one or more gradients. Changing a visual appearance of a background element by changing the visual appearances for one or more simulated astronomical light sources generates a precise simulated background element with a higher level of detail and provides increased flexibility for adjustments to the background element while being resource-efficient (e.g., to reduce power usage by the computer system for displaying the background element), and thus improves user-device interactions.

In some embodiments, the one or more first virtual elements are simulated clouds (e.g., such as described with reference to claim 1 and method 2100), such as elements 740*a-b* in FIG. 7I, and changing the visual appearance of the one or more simulated clouds includes moving the one or more simulated clouds relative to the environment, such as shown from FIG. 7I to FIG. 7J. In some embodiments, the simulated clouds are moved relative to the one or more light sources described above and/or relative to the gradient described above and/or without the one or more light sources described above and/or the gradient described above moving relative to the environment. Changing a visual appearance of a background element by changing the visual appearances for one or more simulated clouds generates a precise simulated background element with a higher level of detail and provides increased flexibility for adjustments to the background element while being resource-efficient (e.g., to reduce power usage by the computer system for displaying the background element), and thus improves user-device interactions.

In some embodiments, the one or more first virtual elements are simulated clouds (e.g., such as described with reference to claim 1 and method 2100), such as elements 740*a-b* in FIG. 7I, and changing the visual appearance of the one or more simulated clouds includes changing a size and/or shape of the one or more simulated clouds, such as shown with respect to cloud 740*b* FIG. 7F to FIG. 7G. In some embodiments, the simulated clouds distort over the time period. In some embodiments, the simulated clouds distort relative to the one or more light sources described above and/or relative to the gradient described above and/or without the one or more light sources described above and/or the gradient described above distorting (e.g., changing size and/or shape). In some embodiments, changing the size and/or shape of the one or more simulated clouds includes stretching or contracting the one or more simulated clouds in one direction only, in two directions only, or in three directions. Changing a visual appearance of a background element by changing the size and/or shape for one or more simulated clouds generates a precise simulated background element with a higher level of detail and provides increased flexibility for adjustments to the background element while being resource-efficient (e.g., to reduce power usage by the computer system for displaying the background element), and thus improves user-device interactions.

In some embodiments, displaying the background element includes changing the visual appearance (e.g., size, shape, diffusiveness, color, opacity, position and/or brightness) of the one or more second virtual elements in a second manner, different from the first manner, over the time, such as shown with element 762*a* from FIG. 7I to FIG. 7J (e.g., over the same or different time period, such as 0.1, 0.5, 1, 3, 5, 10, 30, 60 or 240 seconds, or as long as the background element is displayed). In some embodiments, the changes in the visual appearances of the one or more first virtual elements and the one or more second virtual elements is concurrent, at least partially concurrent, or not concurrent (e.g., sequential). In some embodiments, the change in the visual appearance of the one or more first virtual elements is independent from the change in the visual appearance of the one or more second virtual elements. In some embodiments, the change in the visual appearance of the one or more first virtual elements is based on the change in the visual appearance of the one or more second virtual elements. In some embodiments, the one or more second virtual elements move in a first direction relative to the environment, while the one or more first virtual elements move in a second, different, direction relative to the environment, or do not move relative to the environment. As another example, in some embodiments, the one or more second virtual elements additionally or alternatively change shape while the one or more first virtual elements do not change shape. Any combination of changes or maintaining of any aspects of visual appearance of the one or more first virtual elements and/or the one or more second virtual elements is optionally within the scope of the disclosure. Because the visual appearances of the one or more first virtual elements and/or the one or more second virtual elements change over time, the visual appearance of the background element optionally changes over time, accordingly. Changing a visual appearance of a background element by changing the visual appearances for respective layers of the background element differently generates a precise simulated background element with a higher level of detail and provides increased flexibility for adjustments to the background element while being resource-efficient, and thus improves user-device interactions.

In some embodiments, displaying the background element includes displaying the one or more first virtual elements with one or more animations over the time, such as animations of elements 760*a-c*, 740*a-b* and/or element 762*a* in FIG. 7I and/or FIG. 7J. In some embodiments, the animations are random. In some embodiments, the animations are sequential (e.g., repeating). In some embodiments, the animations include changing one or more visual properties of the one or more first virtual elements over the time, such as changing location, intensity, color, size and/or any other visual properties of the first virtual elements described herein. In some embodiments, the one or more animations simulated an atmospheric shimmer in a virtual sky in the environment that can affect the visual appearance of light emitted and/or reflected from those elements from the viewpoint of the user. Changing a visual appearance of a background element by displaying animations for respective layers of the background element generates a precise simulated background element with a higher level of detail and provides increased flexibility for adjustments to the background element while being resource-efficient (e.g., to reduce power usage by the computer system for displaying the background element), and thus improves user-device interactions.

In some embodiments, the one or more first virtual elements include a simulated sun, and the one or more animations include an animation of the simulated sun, such as if the environment in FIG. 7I included a simulated sun. In some embodiments, the animations include changing one or more visual properties of the simulated sun over the time, such as changing intensity, color, size, location and/or any other visual properties of the simulated sun described herein. Changing a visual appearance of a background element by displaying animations for a simulated sun of the background element generates a precise simulated background element with a higher level of detail and provides increased flexibility for adjustments to the background element while being resource-efficient (e.g., to reduce power usage by the computer system for displaying the background element), and thus improves user-device interactions.

In some embodiments, the one or more first virtual elements include one or more simulated stars, and the one or more animations include one or more animations of the one or more simulated stars, such as elements 760*a-e* in FIG. 7I. In some embodiments, the animations include changing one or more visual properties of the simulated stars over the time, such as changing intensity, color, size, location and/or any other visual properties of the simulated stars described herein. Changing a visual appearance of a background element by displaying animations for simulated stars of the background element generates a precise simulated background element with a higher level of detail and provides increased flexibility for adjustments to the background element while being resource-efficient (e.g., to reduce power usage by the computer system for displaying the background element), and thus improves user-device interactions.

In some embodiments, the one or more first virtual elements include a simulated light source (e.g., such as one or more of the simulated light sources described with reference to method 2100), and the one or more animations include an animation of one or more simulated lighting effects (e.g., such as described with reference to method 2100) in the environment based on the simulated light source, such as simulated lighting effect 764 in FIG. 7I and FIG. 7J. In some embodiments, the simulated lighting effects include simulated light rays in the environment, such as through simulated atmosphere (e.g., air), optionally due to the simulated light passing through one or more simulated clouds (e.g., such as described with reference to method 2100). In some embodiments, the animations include changing one or more visual properties of the simulated light rays over the time, such as changing intensity, color, size, location and/or any other visual properties of the simulated stars described herein, optionally based on and/or in correspondence with changes to the simulated light sources and/or other elements (e.g., simulated clouds) in the environment. In some embodiments, the simulated lighting effects and/or light rays are additionally or alternatively displayed as passing or extending outward from a surface or a region that corresponds to a boundary of the environment (e.g., such as from a background, or the background element, in the environment). Changing a visual appearance of a background element by displaying animations for simulated light rays of the background element generates a precise simulated background element with a higher level of detail and provides increased flexibility for adjustments to the background element while being resource-efficient (e.g., to reduce power usage by the computer system for displaying the background element), and thus improves user-device interactions.

In some embodiments, the one or more first virtual elements include a simulated moon, and the one or more animations include an animation of the simulated moon, such as element 762*a* in FIG. 7I. In some embodiments, the animations include changing one or more visual properties of the simulated moon over the time, such as changing intensity, color, size, location and/or any other visual properties of the simulated moon described herein. Changing a visual appearance of a background element by displaying animations for a simulated moon of the background element generates a precise simulated background element with a higher level of detail and provides increased flexibility for adjustments to the background element while being resource-efficient (e.g., to reduce power usage by the computer system for displaying the background element), and thus improves user-device interactions.

In some embodiments, the one or more animations include changing one or more of a color, a location, a brightness and/or a speed of movement of the one or more virtual elements over the time (e.g., relative to the environment), such as if the color, location, brightness and/or speed of movement of elements 740*a*-*b*, 760*a*-*e* and/or element 762*a* changed from FIG. 7I to FIG. 7J. Changing a visual appearance of a background element by displaying animations for one or more of a color, a location, a brightness and/or a speed of movement of the one or more virtual elements generates a precise simulated background element with a higher level of detail and provides increased flexibility for adjustments to the background element while being resource-efficient (e.g., to reduce power usage by the computer system for displaying the background element), and thus improves user-device interactions.

In some embodiments, while displaying the background element in the environment, the computer system displays, in the environment, one or more simulated lighting effects on a simulated ground element in the environment based on one or more simulated light sources, such as reflections 752*a*-*c* in FIGS. 7I and 7J. In some embodiments, the simulated lighting effects (e.g., simulated reflections) have one or more of the characteristics of the simulated reflections described with reference to method 2100. Displaying simulated reflections from a simulated ground element in the environment generates a precise simulated background element with a higher level of detail and provides increased flexibility for adjustments to the background element while being resource-efficient (e.g., to reduce power usage by the computer system for displaying the background element), and thus improves user-device interactions.

In some embodiments, the simulated ground element includes simulated sand (e.g., having one or more of the characteristics of simulated sand described with reference to method 2100), and the one or more simulated lighting effects include a simulated lighting effect corresponding to reflection of simulated light from a simulated light source from the simulated sand, such as reflections 752*a*-*c* in FIGS. 7F-7H. In some embodiments, the simulated lighting effects (e.g., simulated reflections from the simulated sand) have one or more of the characteristics of the simulated reflections described with reference to method 2100. Displaying simulated reflections from simulated sand in the environment generates a precise simulated background element with a higher level of detail and provides increased flexibility for adjustments to the background element while being resource-efficient (e.g., to reduce power usage by the computer system for displaying the background element), and thus improves user-device interactions.

In some embodiments, the simulated ground element includes simulated snow, and the one or more simulated lighting effects include a simulated lighting effect corresponding to reflection of simulated light from a simulated light source from the simulated snow, such as if the environment in FIG. 7I included simulated snow. In some embodiments, the simulated lighting effects (e.g., simulated reflections) have one or more of the characteristics of the simulated reflections described with reference to method 2100. In some embodiments, simulated reflections are from simulated flakes of snow, ridges of snow, collections of snow and/or shapes of snow. In some embodiments, the one or more simulated reflections have a visual appearance (e.g., color and/or intensity) based on the visual appearance of the one or more light sources and/or simulated snow in the environment. Displaying simulated reflections from simulated snow in the environment generates a precise simulated background element with a higher level of detail and provides increased flexibility for adjustments to the background element while being resource-efficient (e.g., to reduce power usage by the computer system for displaying the background element), and thus improves user-device interactions.

In some embodiments, the simulated ground element includes simulated water (e.g., having one or more of the characteristics of simulated water described with reference to method 2100), and the one or more simulated lighting effects include a simulated lighting effect corresponding to reflection of simulated light from a simulated light source from the simulated water, such as reflections 752*a*-*c* in FIGS. 7I and 7J. In some embodiments, the simulated lighting effects (e.g., simulated reflections from the simulated water) have one or more of the characteristics of the simulated reflections described with reference to method 2100. Displaying simulated reflections from simulated water in the environment generates a precise simulated background element with a higher level of detail and provides increased flexibility for adjustments to the background element while being resource-efficient (e.g., to reduce power usage by the computer system for displaying the background element), and thus improves user-device interactions.

In some embodiments, while displaying the background element in the environment from a first viewpoint of the user, the computer system displays, in the environment, one or more first simulated lighting effects on the simulated ground element in the environment based on the one or more simulated light sources (e.g., displaying one or more simulated reflections, as described above), such as shown in FIG. 7G. In some embodiments, while displaying, in the environment, the one or more first simulated lighting effects on the simulated ground element in the environment based on the one or more simulated light sources, the computer system detects an event corresponding to changing a viewpoint of the user from the first viewpoint to a second viewpoint, wherein the simulated ground element is visible from the second viewpoint of the user (e.g., the same portion of the simulated ground element of the environment is in the viewport from the first viewpoint and the second viewpoint), such as the change in viewpoint from FIG. 7G to FIG. 7H. For example, the computer system detects movement of the user and/or the head of the user from a first position and/or orientation to a second, different position and/or orientation corresponding to the change from the first viewpoint to the second viewpoint.

In some embodiments, in response to detecting the event, (the computer system optionally displays the same portion of the simulated ground element of the environment from the second viewpoint and) the computer system displays, in the environment, one or more second simulated lighting effects, different from the one or more first simulated lighting effects, on the simulated ground element in the environment based on the one or more simulated light sources, such as shown with reflections 752*a-c* from FIG. 7G to FIG. 7H. For example, the intensity, number, existence, position and/or other characteristics of the one or more simulated reflections optionally change based on the change in the viewpoint of the user. In some embodiments, the change in the simulated reflections is based on a direction, magnitude and/or speed of the change in the viewpoint of the user (e.g., a different resulting state for the simulated lighting effects for different directions, magnitudes and/or speeds of change in the viewpoint of the user). Changing the display of simulated reflections that are displayed based on a change in viewpoint of the user generates a precise appearance of the simulated reflections while being resource-efficient (e.g., to reduce power usage by the computer system for displaying the simulated reflections), and thus improves user-device interactions.

In some embodiments, the computer system concurrently displays, in the environment, the background element and media content, such as if element 726*d* in FIG. 7I were media content. In some embodiments, the media content is a representation of a television show, a movie, a video, a photograph or any other content that can be displayed in the environment. In some embodiments, the media content has a location in the environment, and the background element has a second location different from the first location. In some embodiments, the media content is closer to the viewpoint of the user than the background element. In some embodiments, the media content is displayed as overlaying and/or at least partially obscuring the background element from the viewpoint of the user. In some embodiments, the media content has one or more of the characteristics of the media content described with reference to method 2100. In some embodiments, displaying the media content in the environment with the background element has one or more of the characteristics of displaying the media content in the environment described with reference to method 2100. Displaying media content in the environment along with the background element provides for flexibility in the use of the environment while being resource-efficient and reduces context-loss for a user that would result from having to cease displaying the background element to display the media content, thus reducing errors in interaction, and thus improving user-device interactions.

In some embodiments, the computer system concurrently displays, in the environment, the background element and one or more virtual elements corresponding to a communication session between the user of the computer system and one or more other participants of the communication session, such as if the environment in FIG. 7I included the one or more virtual elements of the communication session. In some embodiments, the communication session, the virtual elements and the participants have one or more characteristics of the communication session, the virtual elements and the participants described with reference to 2100. In some embodiments, displaying the communication session in the environment with the background element has one or more of the characteristics of displaying the communication session in the environment described with reference to method 2100. Displaying virtual elements of a communication session in the environment along with the background element provides for flexibility in the use of the environment while being resource-efficient and reduces context-loss for a user that would result from having to cease displaying the background element to engage in the communication session, thus reducing errors in interaction, and thus improving user-device interactions.

In some embodiments, while displaying the background element in the environment from a first viewpoint of the user, the computer system displays, in the environment, the background element with a first visual appearance (e.g., the overall appearance of the background element, including one or more or all of the aspects of appearance described above), such as the appearance of the environment in FIG. 7I. In some embodiments, while displaying, in the environment, the background element with the first visual appearance, the computer system detects an event corresponding to changing a viewpoint of the user from the first viewpoint to a second viewpoint, such as the change in viewpoint from FIG. 7G to FIG. 7H. For example, the computer system detects movement of the user and/or the head of the user from a first position and/or orientation to a second, different position and/or orientation corresponding to the change from the first viewpoint to the second viewpoint.

In some embodiments, in response to detecting the event, the computer system displays, in the environment, the background element with a second visual appearance (e.g., the overall appearance of the background element, including one or more or all of the aspects of appearance described above), different from the first visual appearance, such as if the appearance of the environment in FIG. 7I changed, similar to the change in the appearance of environment 706 from FIG. 7G to FIG. 7H. In some embodiments, the change in appearance of the background element is based on a direction, magnitude and/or speed of the change in the viewpoint of the user (e.g., a different resulting appearance for different directions, magnitudes and/or speeds of change in the viewpoint of the user). Changing the visual appearance of the background element based on a change in viewpoint of the user generates a precise appearance of the background element and avoids unexpected results from viewpoint changes, thus reducing errors in interaction, and thus improves user-device interactions.

One of ordinary skill in the art would recognize various ways to reorder the operations described herein. In some embodiments, aspects/operations of methods 800, 1000, 1200, 1400, 1600, 1800, 2000, 2100 and/or 2200 may be interchanged, substituted, and/or added between these methods. For example, various lighting effects, user interface elements, environments, environment display techniques, environment transition techniques, background elements, animations, and/or simulated shadows of methods 800, 1000, 1200, 1400, 1600, 1800, 2000, 2100 and/or 2200 are optionally interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can be generated by inferring preferences based on non-personal information data or a bare minimum amount of personal information, such as the content being requested by the device associated with a user, other non-personal information available to the service, or publicly available information.

The invention claimed is:

1. A method comprising:

at a computer system in communication with a display generation component and one or more input devices:

while displaying, via the display generation component, a respective environment that is available as a background for one or more applications, detecting a change in a number of application user interfaces, of the one or more applications, that are being displayed concurrently with the respective environment, wherein the respective environment is different from the application user interfaces of the one or more applications; and in response to detecting the change in the number of application user interfaces that are being displayed concurrently with the respective environment, changing a level of detail with which the respective environment is being displayed.

2. The method of claim 1, wherein displaying the respective environment at a respective level of detail includes:

in accordance with a determination that a first set of one or more application user interfaces are concurrently displayed with the respective environment, displaying the respective environment with a first level of detail while concurrently displaying the first set of one or more application user interfaces; and in accordance with a determination that a second set of one or more application user interfaces, different from the first set of one or more application user interfaces, are concurrently displayed with the respective environment, displaying the respective environment with a second level of detail concurrently with the second set of one or more application user interfaces, wherein the second level of detail is different from the first level of detail.

3. The method of claim 1, wherein displaying, via the display generation component, the respective environment includes displaying, via the display generation component, a three-dimensional virtual environment.

4. The method of claim 1, further comprising in response to detecting the change in the number of application user interfaces that are being displayed concurrently with the respective environment and in accordance with a determination that the number of application user interfaces that are being displayed concurrently with the respective environment has decreased, increasing the level of detail with which the respective environment is being displayed.

5. The method of claim 4, wherein the number of application user interfaces that are being displayed concurrently with the respective environment has decreased to zero in response to detecting the change in the number of application user interfaces that are being displayed concurrently with the respective environment.

6. The method of claim 1, further comprising in response to detecting the change in the number of application user interfaces that are being displayed concurrently with the respective environment and in accordance with a determination that the number of application user interfaces that are being displayed concurrently with the respective environment has increased, decreasing the level of detail with which the respective environment is being displayed.

7. The method of claim 6, wherein the number of application user interfaces that are being displayed concurrently with the respective environment has increased to one in response to detecting the change in number of application user interfaces that are being displayed concurrently with the respective environment.

8. The method of claim 1, wherein changing the level of detail with which the respective environment is being displayed includes changing respective frame rates of one or more animations being displayed in the respective environment.

9. The method of claim 8, wherein changing the level of detail with which the respective environment is being displayed includes:

in accordance with a determination that at least one active application user interface is being displayed concurrently with the respective environment, maintaining a frame rate of the at least one active application user interface at a higher level than a frame rate of the respective environment.

10. The method of claim 1, wherein changing the level of detail with which the respective environment is being displayed includes changing one or more characteristics of one or more animations for one or more ambient elements being displayed in the respective environment.

11. The method of claim 10, wherein changing the one or more characteristics of one or more animations for one or more ambient elements being displayed in the respective environment includes changing a distortion effect applied to one or more flat surfaces in the respective environment.

12. The method of claim 11, wherein changing the distortion effect applied to the one or more flat surfaces includes changing a rippling effect animation for simulated water in the respective environment.

13. The method of claim 10, wherein changing the one or more characteristics of the one or more animations includes:

in accordance with a determination that the number of application user interfaces that are being displayed concurrently with the respective environment exceeds a threshold number of application user interfaces, ceasing to animate the one or more ambient elements.

14. The method of claim 13, further comprising after ceasing to animate the one or more ambient elements:

detecting that the number of application user interfaces that are being displayed concurrently with the respective environment has reduced to being within the threshold number of application user interfaces; and in response to detecting that the number of application user interfaces that are being displayed concurrently with the respective environment has reduced to being within the threshold number of application user interfaces, resuming the one or more animations of the one or more ambient elements.

15. The method of claim 10, wherein changing the one or more characteristics of the one or more animations includes:

in response to detecting that the number of application user interfaces that are being displayed concurrently with the respective environment exceeds a threshold number of application user interfaces, ceasing to animate at least one ambient element of the one or more ambient elements while maintaining at least one animation for another ambient element of the one or more ambient elements.

16. The method of claim 15, wherein maintaining the at least one animation for the other ambient element includes maintaining the animation for simulated water, an animation for a simulated sky, or both.

17. The method of claim 10, wherein changing the level of detail with which the respective environment is being displayed includes changing a level of detail corresponding to a simulated sky in the respective environment with a flow map.

18. The method of claim 17, wherein the flow map includes more than one layer corresponding to the simulated sky, and changing the level of detail corresponding to the simulated sky includes changing a level of detail corresponding to one or more layers of the flow map.

19. The method of claim 1, wherein changing the level of detail with which the respective environment is displayed includes changing a pixel density of the respective environment.

20. The method of claim 19, wherein changing the level of detail with which the respective environment is being displayed includes:

in accordance with a determination that at least one active application user interface is being displayed concurrently with the respective environment, maintaining a pixel density of the at least one active application user interface at a higher level than a pixel density of the respective environment.

21. The method of claim 1, wherein changing the level of detail with which the respective environment is being displayed includes ceasing to display, in the respective environment, one or more ambient elements that are based on simulated light.

22. The method of claim 21, wherein changing the level of detail with which the respective environment is being displayed includes ceasing to display, in the respective environment, at least one ambient element that is based on simulated light while maintaining display, in the respective environment, of at least another ambient element that is based on simulated light.

23. The method of claim 1, wherein changing the level of detail with which the respective environment is being displayed includes changing the level of detail based on an amount of processing power required by the number of application user interfaces concurrently displayed with the respective environment.

24. The method of claim 1, wherein changing the level of detail with which the respective environment is being displayed includes changing a resolution of one or more virtual elements in the respective environment.

25. The method of claim 1, further comprising:

while displaying the respective environment with a first level of detail, higher than a second level of detail at which the respective environment can be displayed:

displaying a first portion of the respective environment with a texture that includes a first level of animation, displaying a second portion of the respective environment with a texture that includes a second level of animation, less than the first level of animation, wherein the first portion of the respective environment is closer to a viewpoint of a user in the respective environment than the second portion.

26. The method of claim 25, wherein the respective environment includes a third portion, the second portion of the respective environment is closer to the viewpoint of the user in the respective environment than the third portion of the respective environment, and the third portion of the respective environment is displayed with a texture that does not include animation.

27. The method of claim 25, wherein the texture that includes the first level of animation and the texture that includes the second level of animation correspond to a surface of simulated water in the respective environment.

28. The method of claim 1, wherein changing the level of detail with which the respective environment is displayed from a first level of detail to a second level of detail includes changing the level of detail such that display of the respective environment requires at most a respective amount of power corresponding to the second level of detail, wherein the respective amount of power corresponding to the second level of detail is the same whether the respective environment is a first environment or a second environment different from the first environment.

29. A computer system that is in communication with a display generation component and one or more input devices, the computer system comprising:

one or more processors;

memory; and one or more programs, wherein the one or more programs are stored in the memory and configured to be executed by the one or more processors, the one or more programs including instructions for:

while displaying, via the display generation component, a respective environment that is available as a background for one or more applications, detecting a change in a number of application user interfaces, of the one or more applications, that are being displayed concurrently with the respective environment, wherein the respective environment is different from the application user interfaces of the one or more applications; and in response to detecting the change in the number of application user interfaces that are being displayed concurrently with the respective environment, changing a level of detail with which the respective environment is being displayed.

30. A non-transitory computer readable storage medium storing one or more programs, the one or more programs comprising instructions, which when executed by one or more processors of a computer system that is in communication with a display generation component and one or more input devices, cause the computer system to perform a method comprising:

while displaying, via the display generation component, a respective environment that is available as a background for one or more applications, detecting a change in a number of application user interfaces, of the one or more applications, that are being displayed concurrently with the respective environment, wherein the respective environment is different from the application user interfaces of the one or more applications; and in response to detecting the change in the number of application user interfaces that are being displayed concurrently with the respective environment, changing a level of detail with which the respective environment is being displayed.

31. The computer system of claim 29, wherein displaying the respective environment at a respective level of detail includes:

in accordance with a determination that a first set of one or more application user interfaces are concurrently displayed with the respective environment, displaying the respective environment with a first level of detail while concurrently displaying the first set of one or more application user interfaces; and in accordance with a determination that a second set of one or more application user interfaces, different from the first set of one or more application user interfaces, are concurrently displayed with the respective environment, displaying the respective environment with a second level of detail concurrently with the second set of one or more application user interfaces, wherein the second level of detail is different from the first level of detail.

32. The computer system of claim 29, wherein the one or more programs further comprise instructions for:

in response to detecting the change in the number of application user interfaces that are being displayed concurrently with the respective environment and in accordance with a determination that the number of application user interfaces that are being displayed concurrently with the respective environment has decreased, increasing the level of detail with which the respective environment is being displayed.

33. The computer system of claim 29, wherein the one or more programs further comprise instructions for:

in response to detecting the change in the number of application user interfaces that are being displayed concurrently with the respective environment and in accordance with a determination that the number of application user interfaces that are being displayed concurrently with the respective environment has increased, decreasing the level of detail with which the respective environment is being displayed.

34. The computer system of claim 29, wherein changing the level of detail with which the respective environment is being displayed includes changing respective frame rates of one or more animations being displayed in the respective environment.

35. The computer system of claim 34, wherein changing the level of detail with which the respective environment is being displayed includes:

in accordance with a determination that at least one active application user interface is being displayed concurrently with the respective environment, maintaining a frame rate of the at least one active application user interface at a higher level than a frame rate of the respective environment.

36. The computer system of claim 29, wherein changing the level of detail with which the respective environment is being displayed includes changing one or more characteristics of one or more animations for one or more ambient elements being displayed in the respective environment.

37. The computer system of claim 36, wherein changing the one or more characteristics of the one or more animations includes:

in accordance with a determination that the number of application user interfaces that are being displayed concurrently with the respective environment exceeds a threshold number of application user interfaces, ceasing to animate the one or more ambient elements.

38. The computer system of claim 29, wherein changing the level of detail with which the respective environment is displayed includes changing a pixel density of the respective environment.

39. The computer system of claim 38, wherein changing the level of detail with which the respective environment is being displayed includes:

in accordance with a determination that at least one active application user interface is being displayed concurrently with the respective environment, maintaining a pixel density of the at least one active application user interface at a higher level than a pixel density of the respective environment.

40. The non-transitory computer readable storage medium of claim 30, wherein displaying the respective environment at a respective level of detail includes:

in accordance with a determination that a first set of one or more application user interfaces are concurrently displayed with the respective environment, displaying the respective environment with a first level of detail while concurrently displaying the first set of one or more application user interfaces; and in accordance with a determination that a second set of one or more application user interfaces, different from the first set of one or more application user interfaces, are concurrently displayed with the respective environment, displaying the respective environment with a second level of detail concurrently with the second set of one or more application user interfaces, wherein the second level of detail is different from the first level of detail.

41. The non-transitory computer readable storage medium of claim 30, wherein the one or more programs further comprise instructions for:

in response to detecting the change in the number of application user interfaces that are being displayed concurrently with the respective environment and in accordance with a determination that the number of application user interfaces that are being displayed concurrently with the respective environment has decreased, increasing the level of detail with which the respective environment is being displayed.

42. The non-transitory computer readable storage medium of claim 30, wherein the one or more programs further comprise instructions for:

in response to detecting the change in the number of application user interfaces that are being displayed concurrently with the respective environment and in accordance with a determination that the number of application user interfaces that are being displayed concurrently with the respective environment has increased, decreasing the level of detail with which the respective environment is being displayed.

43. The non-transitory computer readable storage medium of claim 30, wherein changing the level of detail with which the respective environment is being displayed includes changing respective frame rates of one or more animations being displayed in the respective environment.

44. The non-transitory computer readable storage medium of claim 43, wherein changing the level of detail with which the respective environment is being displayed includes:

in accordance with a determination that at least one active application user interface is being displayed concurrently with the respective environment, maintaining a frame rate of the at least one active application user interface at a higher level than a frame rate of the respective environment.

45. The non-transitory computer readable storage medium of claim 30, wherein changing the level of detail with which the respective environment is being displayed includes changing one or more characteristics of one or more animations for one or more ambient elements being displayed in the respective environment.

46. The non-transitory computer readable storage medium of claim 45, wherein changing the one or more characteristics of the one or more animations includes:

in accordance with a determination that the number of application user interfaces that are being displayed concurrently with the respective environment exceeds a threshold number of application user interfaces, ceasing to animate the one or more ambient elements.

47. The non-transitory computer readable storage medium of claim 30, wherein changing the level of detail with which the respective environment is displayed includes changing a pixel density of the respective environment.

48. The non-transitory computer readable storage medium of claim 47, wherein changing the level of detail with which the respective environment is being displayed includes:

in accordance with a determination that at least one active application user interface is being displayed concurrently with the respective environment, maintaining a pixel density of the at least one active application user interface at a higher level than a pixel density of the respective environment.

* * * * *